United States Patent
Monari et al.

(10) Patent No.: US 10,509,213 B1
(45) Date of Patent: Dec. 17, 2019

(54) APPARATUS FOR OBSERVING, ACQUIRING AND SHARING OPTICAL IMAGERY PRODUCED BY OPTICAL IMAGE SOURCES

(71) Applicants: Lawrence Maxwell Monari, Palm Bay, FL (US); Lawrence Scott Monari, Palm Bay, FL (US)

(72) Inventors: Lawrence Maxwell Monari, Palm Bay, FL (US); Lawrence Scott Monari, Palm Bay, FL (US)

( * ) Notice: Subject to any disclaimer, the term of this patent is extended or adjusted under 35 U.S.C. 154(b) by 0 days.

(21) Appl. No.: 16/041,889

(22) Filed: Jul. 23, 2018

(51) Int. Cl.
*G02B 15/14* (2006.01)
*G02B 15/16* (2006.01)
*G02B 15/163* (2006.01)

(52) U.S. Cl.
CPC .............. *G02B 15/16* (2013.01); *G02B 15/14* (2013.01); *G02B 15/163* (2013.01)

(58) Field of Classification Search
CPC ....... G02B 15/14; G02B 15/16; G02B 15/163
See application file for complete search history.

(56) References Cited

U.S. PATENT DOCUMENTS

| | | | | |
|---|---|---|---|---|
| 7,962,035 B2* | 6/2011 | Arai | ........................ | G03B 19/12 359/431 |
| 2003/0012567 A1* | 1/2003 | Itoh | ...................... | G02B 15/177 396/72 |
| 2006/0056050 A1* | 3/2006 | Caldwell | .............. | G02B 15/177 359/686 |
| 2011/0141340 A1* | 6/2011 | Yumiki | .................... | G02B 7/08 348/345 |
| 2011/0221976 A1* | 9/2011 | Kikkawa | ............ | H04N 21/4436 348/739 |
| 2016/0062133 A1* | 3/2016 | Espersen | ................ | G02B 7/102 359/557 |

* cited by examiner

*Primary Examiner* — Charlie Y Peng

(57) ABSTRACT

The present invention is a modular electronic-optical-mechanical apparatus, to be used by observers in combination with a wide variety of optical image sources, for observing, acquiring and sharing the optical imagery of objects, and the audio and sounds derived from observing sessions bi-directionally in real time with audiences both remote and local. The apparatus enables observers who are local or remote from optical image sources to control and acquire optical imagery from optical image sources, where those optical image sources include microscopes, telescopes, IR scopes, spotting scopes, polarimeters, interferometer microscopes, interferometers, rifle scopes, surveillance scopes, drone optics, binoculars, theodolites, autocollimators, alignment telescopes, camera lenses, periscopes, slit lamp bio microscopes and dioptometers. The observer's audiences span the fields of training, teaching, surveying, bird watching, hunting, target shooting, photography, law enforcement, remote surveillance, local surveillance, drone flight, national defense, medicine, metrology, interferometry, astronomy, geology, biology, bacteriology, ophthalmology, entertainment, et al.

22 Claims, 64 Drawing Sheets

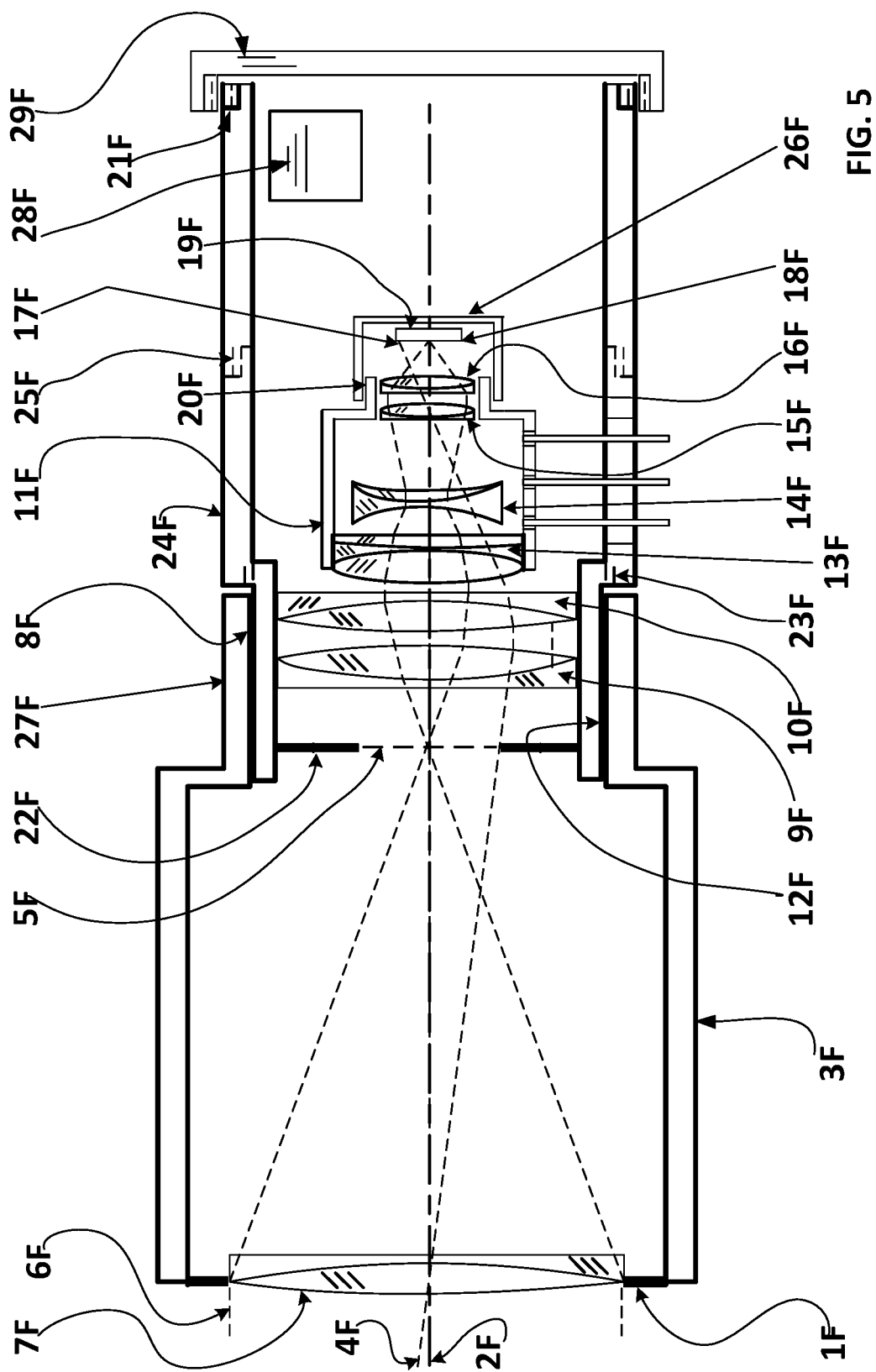

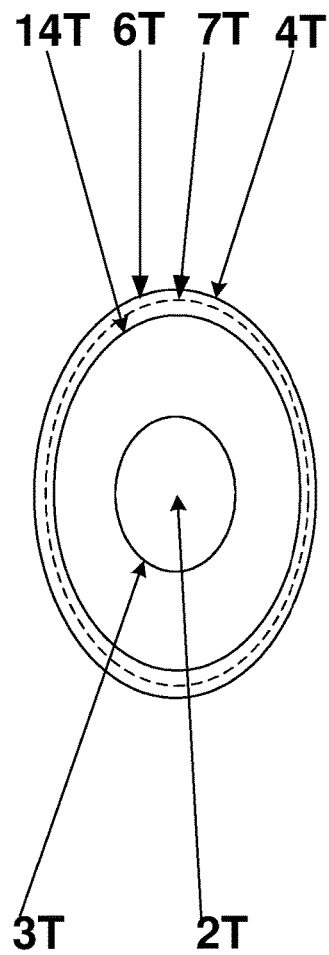
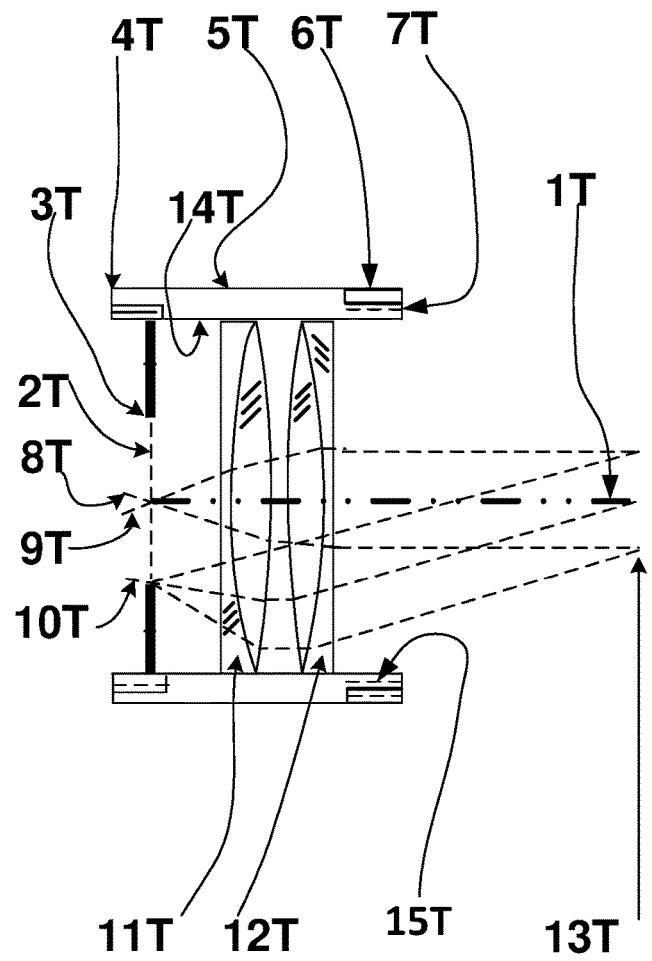
FIG. 17D
FIG. 17C

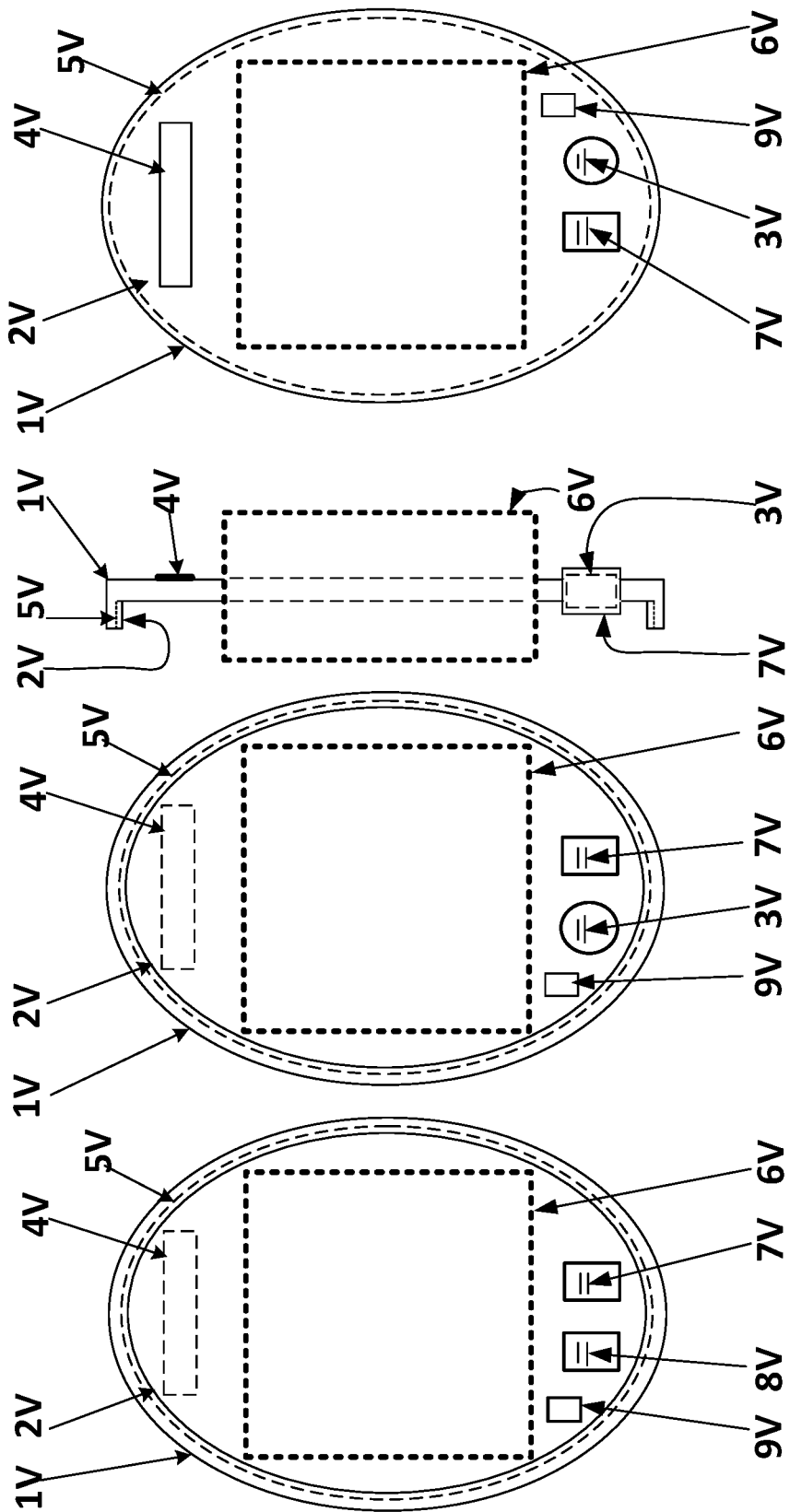

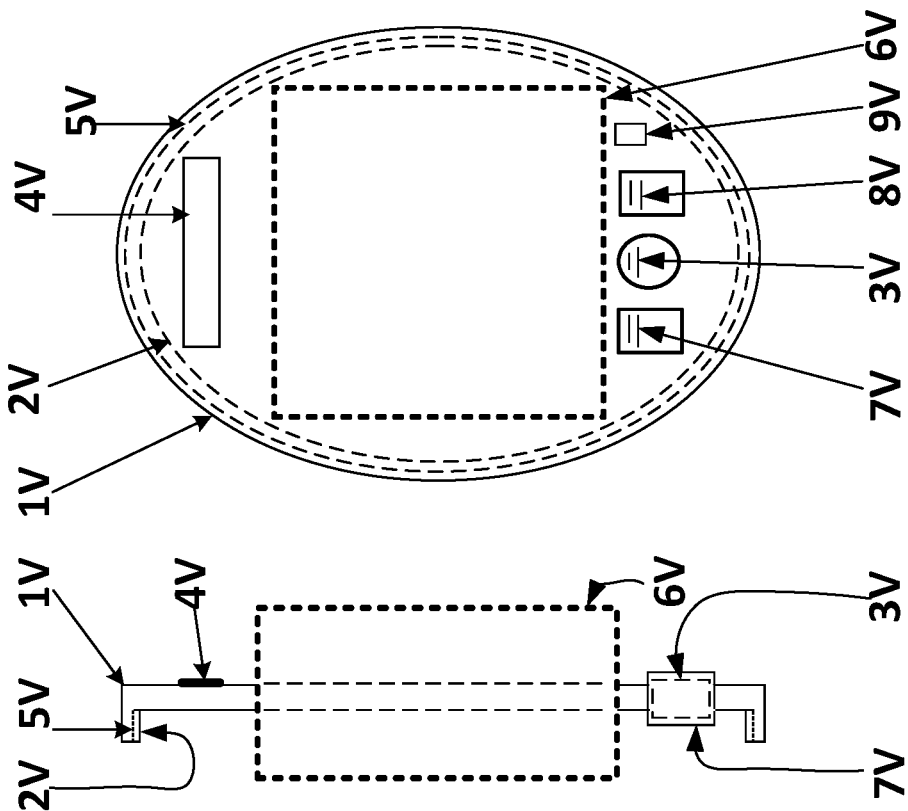
FIG. 18G
FIG. 18F
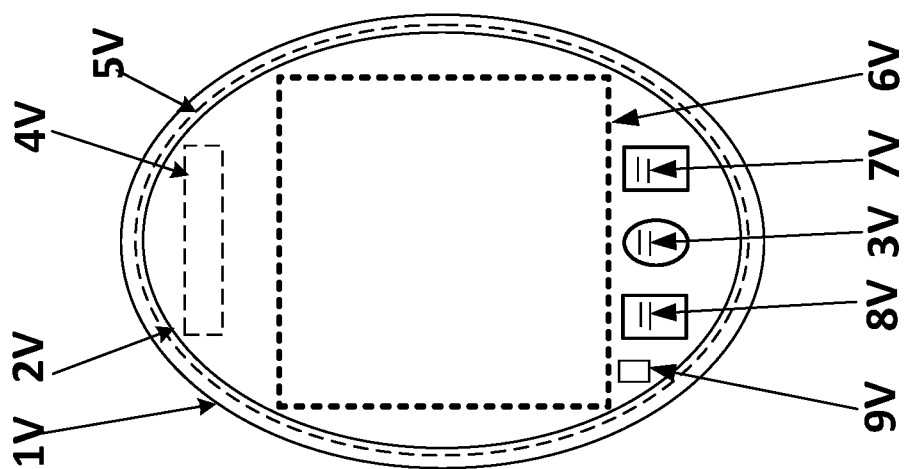
FIG. 18E

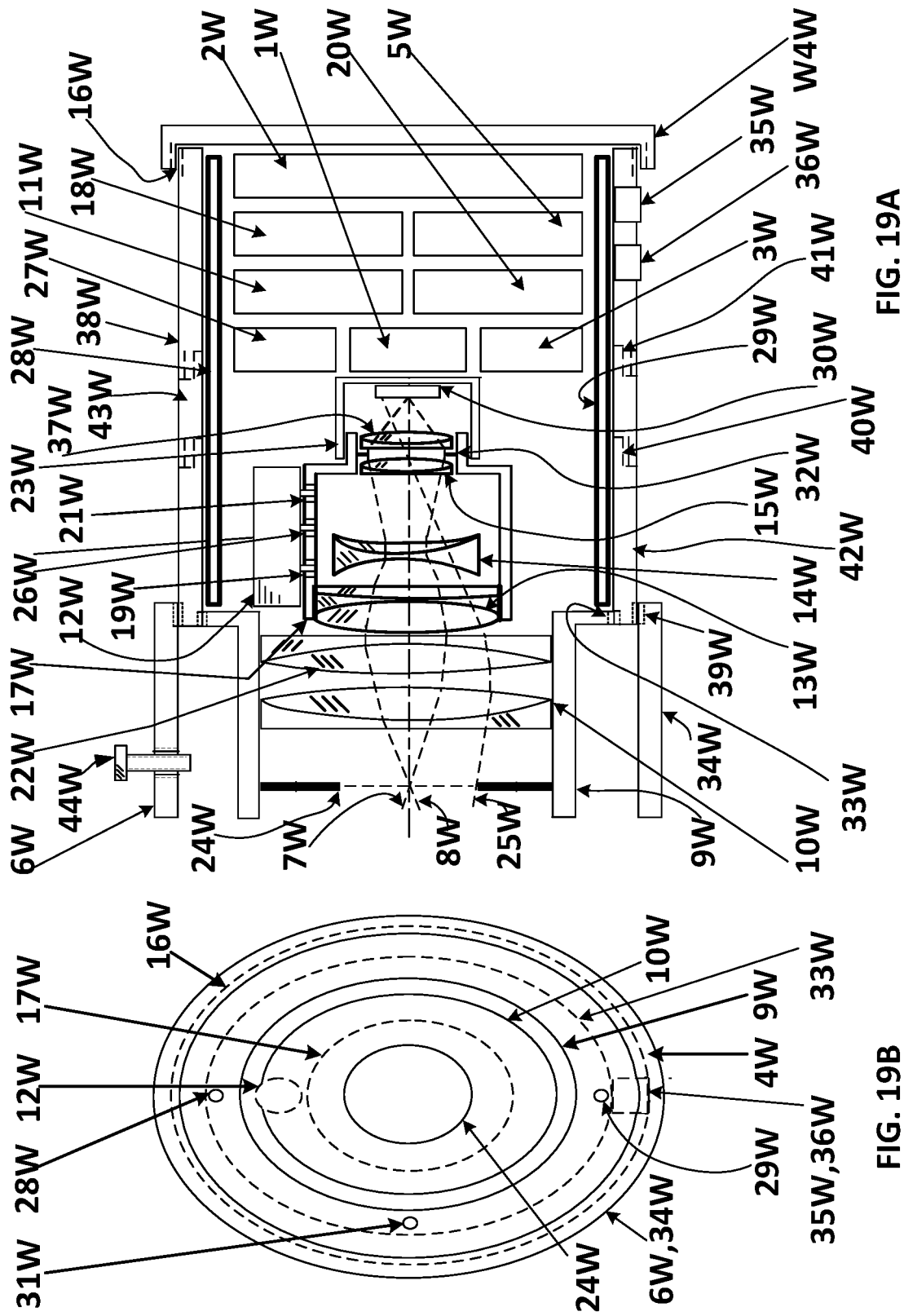

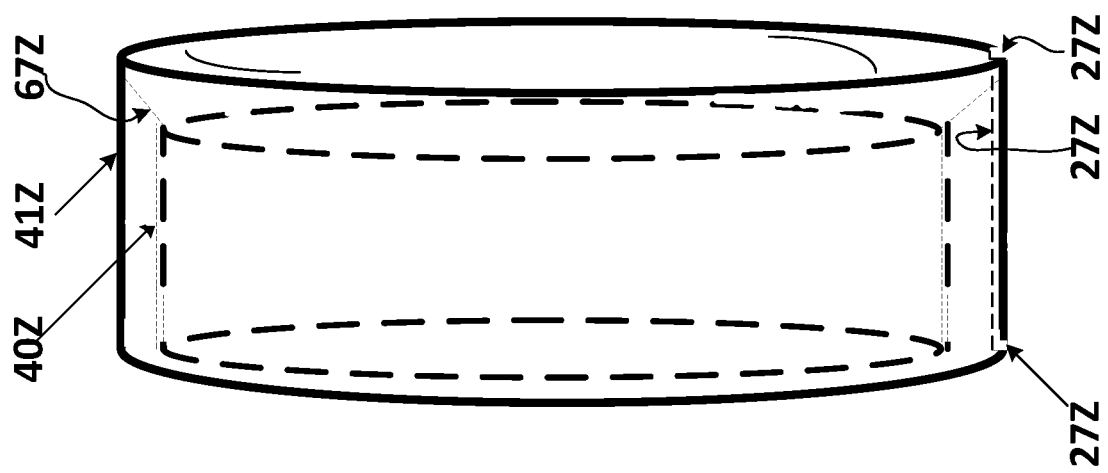
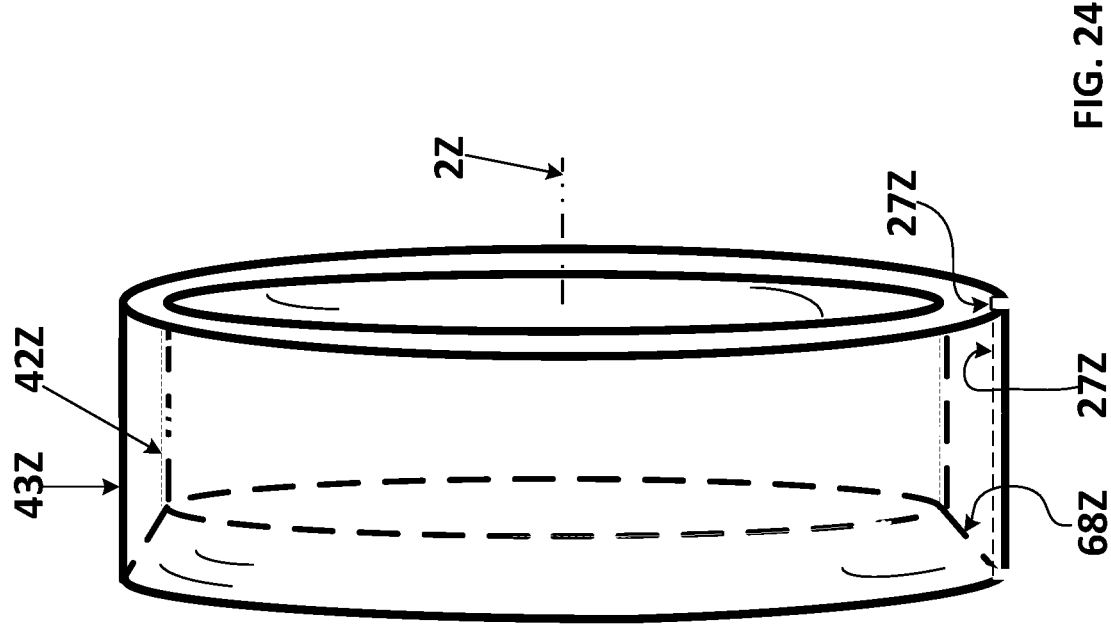
FIG. 24

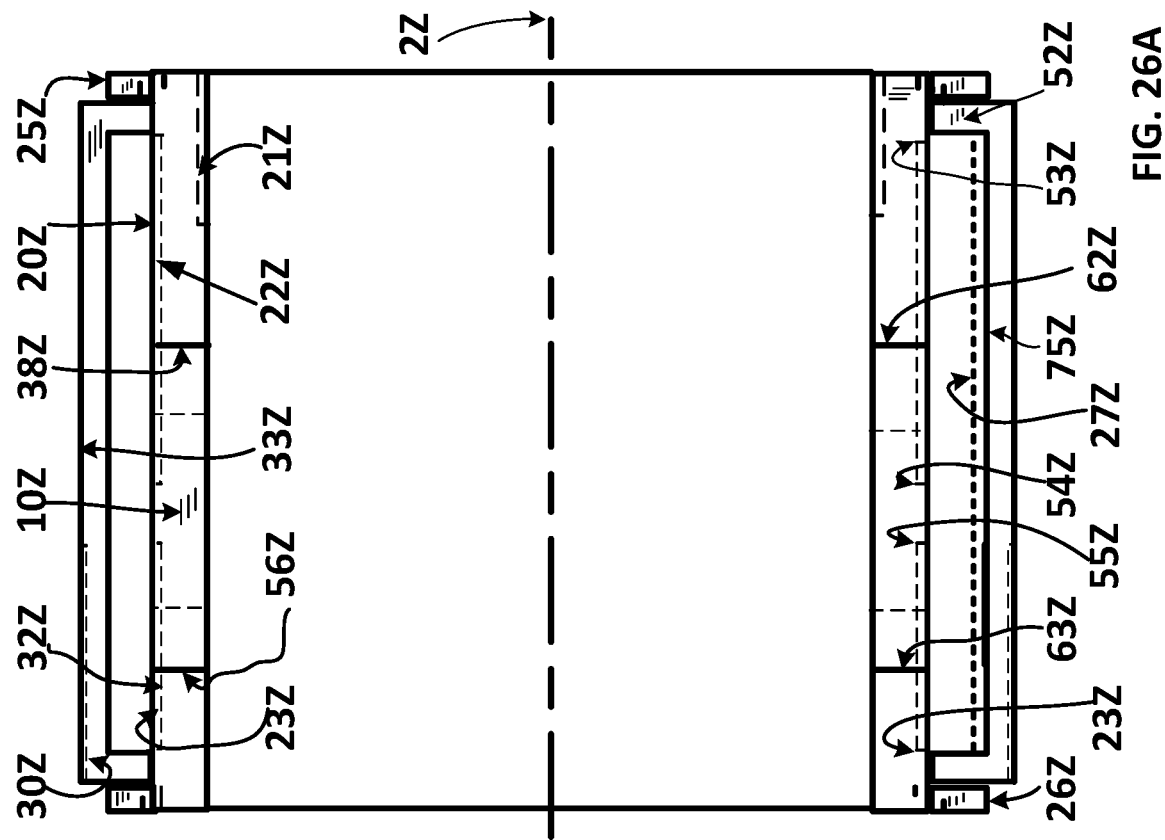
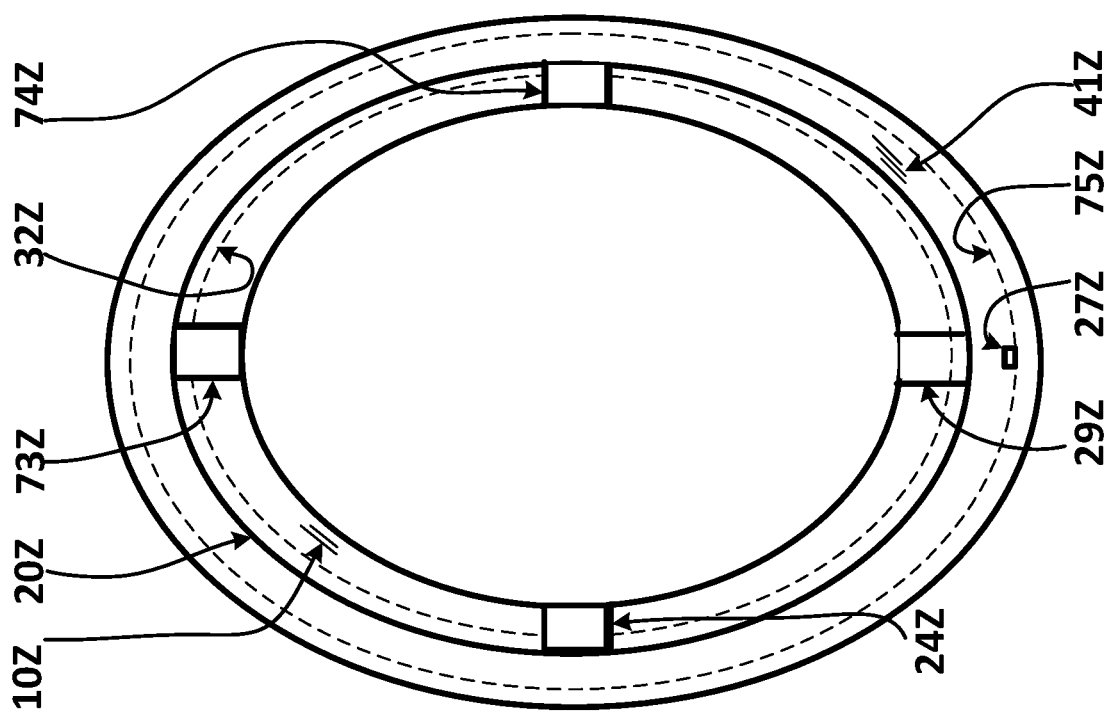
FIG. 26A
FIG. 26B

APPARATUS FOR OBSERVING, ACQUIRING AND SHARING OPTICAL IMAGERY PRODUCED BY OPTICAL IMAGE SOURCES

TECHNICAL FIELD

Electro-mechanical-optical apparatus for acquiring imagery of objects

BACKGROUND OF THE INVENTION

Optical image sources are manufactured for producing optical images of objects. Observers of objects use the optical image sources to observe and acquire optical imagery of these optical images. Typically, observers of these objects wish to share the images of these objects with their audiences.

The optical image sources are existing prior art instruments. They are used by observers as tools for observing objects.

There is an extensive list of different types of optical image sources, like for example microscopes, telescopes, IR scopes, spotting scopes, polarimeters, interferometer microscopes, interferometers, rifle scopes, surveillance scopes, drone optics, binoculars, theodolites, autocollimators, alignment telescopes, camera lenses, periscopes, slit lamp bio microscopes and dioptometers. These optical image sources span the fields of training, teaching, surveying, bird watching, hunting, target shooting, photography, law enforcement, remote surveillance, local surveillance, drone flight, national defense, medicine, metrology, interferometery, astronomy, geology, biology, bacteriology, ophthalmology, entertainment, et al. Persons interested in these fields typically constitute the observer's audience.

Observers often wish they that they had a single common apparatus to use in combination with the extensive list of different types of optical image sources for acquiring and sharing the optical imagery of objects that are produced by the large collective variety of different optical image sources, and that the apparatus be able to acquire and share the imagery of objects from each and every one on the long list of optical image sources, with the observer's audience. Such an apparatus must be adaptable over a very broad range in order to overcome the many differences between the optical image sources. The scope of usefulness of such an apparatus to the observers and their audiences has become very broad and needful across these many fields over a relatively short period of time.

Besides having to adapt to the many differences between the optical image sources, the apparatus must be adaptable to the many differences between different observers observing missions, the many differences between different audiences observing missions, the many differences between different objects which are the subject of the observing missions, and the many differences between the different observing conditions, environments and ergonomics. At first sight, the problems raised by so many different and diverse factors appear insurmountable.

Collectively there are many challenging factors that are major problems pertaining to the acquisition and dissemination of optical imagery to these audiences that challenge the observer's ability to perform his desired tasks. Firstly, there are many different kinds and forms of optical image sources. Observers working collectively with each of these optical image sources presents the observers with an assortment of difficult optical, mechanical and electronic challenges. Secondly, there are many different object types. These present the observer with an assortment of difficult optical and electronic challenges. Thirdly, there are many different audience types for the observer to share with. These present the observer with an assortment of difficult optical and electronic challenges. Fourthly, there are many different environmental operating conditions to contend with. RF noise floors that cause RF interference in proximity to the optical image sources, and the audiences, and the observers are examples. These present the observer with an assortment of difficult electronic challenges. And finally, there are many different observer motivations and limitations to contend with. These present the observer with an assortment of difficult optical, mechanical, electronic and ergonomic challenges.

Observers of objects use optical image sources to produce images of objects for a variety of reasons. There are many factors that introduce challenging variations pertaining to the object's imagery that make the objects uncooperative for the acquisition and dissemination of their imagery by observers at setup before, during an observer's observing session. The objects may be microscopic, initially close at hand or they may be distant to the optical image source. The objects may be toxic themselves and may also be located in toxic environments. The objects' distance to the optical image source may be getting longer or it may be getting shorter during an observer's observing session. The length of time for an observer's planned observing session may change and become long or it may become short. An observer's observing session may be momentary or it may last for long periods of time depending on environmental conditions and the observer's resources. The objects may be moving or they may be motionless relative to the optical image source during an observer's observing session. The optical image source may be fixed or may be moving. The object may be moving slowly or quickly in the field of view of the optical image source. The object may be moving toward or away from the optical image source during an observer's observing session causing the object's image focus to change. The object may move in and out of focus slowly or rapidly during an observing session. The objects may be self illuminated or externally illuminated. The objects may be dim or bright and may change during an observing session. The source of the object's illumination may change during an observing session. The objects may initially subtend a small or large angular field of view at the optical image source and then change during an observing session. The objects may be physically large or microscopic. The environment may cause the sharpness of an object's image to change during an observing session. The object may have fine detail thereby requiring high resolution in its acquisition and imagery transmission.

Microscopes, alignment telescopes, autocollimators, slit lamp bio microscopes, polarimeters, bench interferometers, dioptometers and macro lenses are examples of optical image sources that are used for objects that are close at hand. IR scopes, spotting scopes, surveillance scopes, binoculars, theodolites, drone optics, telephoto camera lenses, periscopes and riffle scopes are examples of optical image sources that are used for objects that are distant. Astronomical telescopes and celestial interferometers are used for objects that are very distant.

The optical image sources introduce variability into the mix. The optical image sources are manufactured typically in two varieties. The first variety is afocal. The second variety is focal. The afocal varieties are typically manufactured in two types. The first afocal type is typically manufactured with a removable original equipment eyepiece. The second afocal type is typically manufactured with a permanent irremovable original equipment eyepiece. The focal varieties of optical image sources are typically manufactured without an original equipment eyepiece. One example of a focal variety is the 35 mm camera lens. These variations introduce optical and mechanical variability into the mix.

The variation in the mechanical shapes and form factors among the optical image sources also introduce further mechanical and optical variability into the mix. Some optical image sources are airborne as in the case of drone optics, airborne surveillance telescopes, and telephoto lenses. This variation introduces mechanical, optical and electronic variability into the mix.

The observer's audiences introduce variability into the mix. The audiences are outfitted with a variety of different instrumentation for receiving and sharing the observer's imagery, audio and sounds during an observing session. These variations introduce electronic variability into the mix. Sharing includes the transmission of images to local and remote audiences. Local audiences include spectators within fifty feet of the observer. Remote audiences include audiences in distant locations from the observer and the optical image sources. In many cases some observers are moving and become remote to the optical image source and to their audiences during an observing session. In some cases, the audience's distance to the optical image source changes during an observing session as well. In addition, the audiences may wish to converse with the observer during an observing session to share ideas and opinions pertaining to the object at hand.

In all cases, the RF noise floor at the optical image source, at the observer, and at the audience may be non-trivial and uncooperative. This introduces electronic variability into the mix.

Optical image sources are used by observers to examine objects in a variety of different ways, environments, circumstances, and under different conditions. Uses of these optical image sources range from astronomical observations to bird watching. The common denominator between these optical image sources is the visual imagery that these optical image sources produce. The optical image sources come in four different varieties or categories.

Firstly, there are those optical image sources that are manufactured with permanent original equipment eyepieces; that is, with original equipment eyepieces that are not meant by their manufacturers to be removed. The manufacturers take special steps to make it exceedingly difficult for non-factory unauthorized personnel to remove these original equipment eyepieces. These original equipment eyepiece are intended by their manufacturers to be replaced only in the factory, usually with special tooling and under controlled environmental conditions. On occasion, these original equipment eyepieces get damaged in use by shock and vibration or in transportation. Manufacturers of these optical image sources strongly recommend to their users that these optical image sources need to be returned to the factory for their repair. Removal of these original equipment eyepieces by unauthorized personnel may void any warranties associated with the optical image sources, particularly for example where removal of an original equipment eyepiece may mean breaking a pressurized seal and subsequently contaminating the instrument. Militarized optical image sources, and many high end commercial and medical optical image sources fall into this category. Special care must be exercised by the user not to damage the original equipment eyepiece, lest the optical image source needs to be sent to the factory.

Secondly, there are those optical image sources that are manufactured with original equipment eyepieces that can be removed from their optical image sources and replaced with alternate eyepieces chosen by the observer. Removal and replacement of these original equipment eyepieces with alternate eyepieces usually does not require special tooling.

Non-special tooling for removal and replacement of these original equipment eyepieces is usually readily available. Sometimes the manufacturer of the optical image sources will help the user and include written instructions for such an operation. If the optical image source's factory supplied original equipment eyepiece is damaged during its use or in transportation, the user can remove the damaged original equipment eyepiece and make the replacement by himself or by herself. This sometimes saves the drudgery, cost and lost observation time in having to return the whole optical image source to the factory to be refurbished. With the manufacturer's approval, removal and replacement of an instrument's factory supplied original equipment eyepiece does not void a written or implied warranty.

Thirdly, there are those optical image sources where the manufacturer does not supply an original equipment eyepiece with the basic optical image source. One reason for the manufacturer not supplying an original equipment eyepiece with the optical image source is that the manufacturer expects that the optical image source will not be employed for visual use by the user, as is the case for example with 35 mm telephoto camera lenses, or a TV camera lenses. Still another reason for the manufacturer not supplying an original equipment eyepiece with the optical image source is that the manufacturer wants to reduce the cost of the optical image source that is manufactured without an original equipment eyepiece. These variations introduce serious compatibility issues into the mix. Typically, optical image sources are manufactured with barrel enclosures as original standard equipment. The barrel enclosures are the body of the optical image sources and are manufactured for housing and enclosing the contents of the optical image sources.

For those optical image sources that are manufactured with permanent original equipment eyepieces, the original equipment eyepieces cannot be removed and therefore the observer does not have access to the inside diameter of the optical image sources' barrel enclosure where the original equipment eyepiece is seated. This is a challenge.

Also, for permanently mounted original equipment eyepieces, the observer does not have access to the inside diameter of the original equipment eyepiece draw tube that the original equipment eyepiece may slip into. Therefore the inside diameter of the optical image sources' original equipment eyepiece draw tube is unavailable to use. Also therefore, the observer does not have physical access to the field stop of the optical image sources that have permanently mounted original equipment eyepieces.

Optical image source barrel enclosures come with a wide range of different outside diameters and potentially irregular profiles depending on their manufacturer. This makes the interface between the apparatus and all such optical image sources a mechanical and optical challenge. In order to be able to interface the apparatus to these optical image sources, the apparatus must be able to accommodate the wide range of different barrel outside diameters and profiles.

Some other optical image sources are manufactured with original equipment eyepieces having an optical and mechanical axis different from that of the main body of the optical image source. The angle between the optical and mechanical axis of the main body and the optical and mechanical axis of the original equipment eyepieces is arbitrary and can be whatever the manufacturer chooses. In many cases the angle is 90 degrees.

In some other cases, the mechanical axis of the optical image source is not coaxial with the optical axis of the optical image source due to offset errors in the manufacturing optical alignment process.

In summary, the apparatus used for sharing the optical imagery that the optical image sources produce needs to be able to operate across a broad collective range of problem variables. Thus, it is clear that there is a great need in the art for an improved method and system for solving the general problems while avoiding the shortcomings and drawbacks of the prior art apparatus and methodologies heretofore known.

BRIEF SUMMARY OF THE INVENTION

The present invention is an electro-mechanical-optical apparatus useful for enabling the observers of a wide range of different objects the facility of acquiring and sharing the optical imagery, audio and sounds produced during their observing sessions of those objects while using a variety of different types of optical image sources.

This electro-mechanical-optical apparatus is termed the "mobile apparatus" in the present invention. This term has been adopted by the inventors because a significant aspect of the apparatus is its mobility. The mobile apparatus is comprised of a series of unique interconnected functional modules for enabling the observer to quickly adapt the apparatus to an extensive variety of different types of optical image sources, objects, audiences and observing environments by rapidly assembling and reconfiguring the mobile apparatus. The apparatus features real-time zero latency wireless electronic capability enabling observers to acquire, capture, display, record, store, replay, control, reproduce, transmit and share imagery, audio and sounds bi-directionally with local and remote audiences during and after the observer's time critical observing sessions.

The apparatus features a unique clamping mechanism enabling the observer to adapt the apparatus to attach to and lock with a twist of the wrist to a wide variety of optical image sources having different functions and form factors. The clamping mechanism is scalable for optical image sources having different sizes and shapes, and is configured with features to quickly and precisely self center and self align the apparatus to the optical image sources like for example microscopes, astronomical telescopes, IR scopes, spotting scopes, binoculars, theodolites, autocollimators, alignment telescopes, camera lenses, periscopes, slit lamp bio microscopes and dioptometers.

The apparatus features an adaptable optical system enabling the observer to adapt the apparatus to a wide variety of both focal and afocal optical image sources such as those that are manufactured with and without original equipment eyepieces, and to provide imagery covering the full field of view of the optical image sources, and to provide high magnification for objects requiring highly detailed resolution. In addition, the apparatus features an adaptable mechanical system enabling the observer to adapt the apparatus to attach to a wide variety of different physical geometries in the general layout of the optical image sources.

The present invention enables the observer to control a multiplicity of apparatuses deployed simultaneously on a variety of different optical image sources during and after an observing session and simultaneously share the imagery, audio and sounds with a multiplicity of different audiences for the fields of training, teaching, surveying, bird watching, hunting, target shooting, photographing, law enforcing, remote surveillance, local surveillance, drone flight, national defense, medicine, bird watching, metrology, astronomy, geology, biology, bacteriology, ophthalmology, entertainment, et al.

In general, wherever there is imagery, there is a potential application for the mobile apparatus. Whether it be from a fixed platform or from a moving platform. The design for the mobile apparatus is scalable so it can be miniaturized for applications where size and weight are considerations as is the case for optical image sources for drone surveillance, optical image sources for airborne trackers, and optical image sources for the remote surveillance of space launches.

The Following is a Brief General Description of the Composition and Configuration of the Mobile Apparatus:

The purpose of the mobile apparatus is for servicing observers in carrying out a plethora of functions during their observing sessions while using optical image sources. A key feature of the mobile apparatus is its adaptability. One element of the mobile apparatuses' adaptability is that it is configured for enabling the observer to adapt and accommodate the mobile apparatus to a wide variety of different types of optical image sources in different operating environments.

The mobile apparatus is configured with a unique mechanical attachment means in the form of a clamping module for enabling an observer to mount and attach the mobile apparatus to a wide variety of optical image sources in order to acquire the optical imagery from the optical image sources. The mechanical attachment means is self centering and self aligning. The mechanical attachment means is a module that can be quickly connected to or disconnected from the mobile apparatus enabling the observer to adapt the mobile apparatus to a variety of different optical image sources depending on the observer's observing plan of action.

The mobile apparatus is configured with an optical imaging means for enabling the mobile apparatus to capture the optical images produced from a wide variety of optical image sources, and to optically transform those optical images on to an electronic optical image sensor array camera means.

The optical imaging means is modular. In the preferred embodiments shown in the drawings, it is typically made up of either one or both of the following two optical modules, i.e. a eyepiece module, a zoom lens module. In a preferred embodiment, the optical imaging means is afocal. In another preferred embodiment, the optical imaging means is focal. The afocal optical imaging means enables the mobile apparatus to adapt to afocal varieties of optical image sources. The focal optical imaging means enables the mobile apparatus to adapt to focal varieties of optical image sources.

The mobile apparatus is configured with an electronic sensor array camera means for enabling the mobile apparatus to capture the optical images produced from a wide variety of optical image sources, which are presented to it by the optical imaging means, and to transform the optical images from the optical imaging means into electronic signals, and to do so in real-time with no latency. The electronic sensor array camera means is in the form of a electronic sensor array camera module which follows the optical imaging means along its optical axis. The mobile apparatus is configured to send the electronic signals from the electronic sensor array camera module to the electronics circuits module.

The mobile apparatus is configured with a network of electronic circuits in the form of a electronics circuits module for enabling the mobile apparatus to transmit the electronically transformed optical images from the electronic optical image sensor array camera means to the observer who can be located at either a local or remote location to the mobile apparatus and the optical image source, for the observer to acquire, display, analyze and react, and to do so in real-time with no latency. Zero latency is critical in those applications where the object being observed finds itself in a time critical environment, as for example in the case of drones moving through obstacles, or law enforcement surveillance trackers. The mobile apparatus electronics circuits module is adaptable enabling the observer to control the transmission of the electronically transformed optical images from the electronic optical image sensor array camera means of the mobile apparatus located on the optical image source to the observer, and to the observer's audience, by any one or more of the following means: by rf wirelessly, by hard wire cable, by fiber optics cable.

The mobile apparatus is configured with a network of electronic circuits in the form of a electronics circuits module for enabling the observer to control the operation of the mobile apparatus from either a local or remote location, and to do so in real-time with no latency.

The mobile apparatus is configured with a network of electronic circuits in the form of a electronics circuits module for enabling the observer to record the electronically transformed optical images and sounds acquired from the observer's observing session, and to do so in real-time with no latency from either a local or remote location.

The mobile apparatus is configured with a network of electronic circuits in the form of a electronics circuits module for enabling the mobile apparatus to transmit the electronically transformed optical images and sounds to audiences at either a local or remote location, for sharing the observer's observing session experiences, and to do so in real-time with no latency.

The mobile apparatus is configured with a network of electronic circuits in the form of a electronics circuits module for enabling the observer to play back the electronically transformed optical images and sounds from the observer's observing session, at a later time to the observer located at either a local or remote location.

The mobile apparatus is configured with a network of electronic circuits in the form of a electronics circuits module for enabling the observer located at either a local or remote location, to play back the electronically transformed optical images and sounds from the observer's observing session, at the present or at a later time to the observer's local or remote audiences.

The mobile apparatus is configured with an electronic microphone means for enabling the mobile apparatus to capture sounds from an observer's observing session, and to transform the sounds to electronic signals, and to do so in real-time with no latency. The electronic microphone is located in an end cap module of the mobile apparatus thereby making it conveniently accessible for the observer to speak into.

The mobile apparatus is configured with an electronic speaker means for enabling the mobile apparatus to capture sounds from an observer's local or remote audience, during and after an observing session, and to make those sounds audible to the observer. The electronic speaker is located in an end cap module of the mobile apparatus thereby making it conveniently accessible for the observer to hear from.

The Following is a Brief General Description of the Composition of the Optical System of the Mobile Apparatus:

In one preferred embodiment, the optical system of the mobile apparatus is comprised of an eyepiece module and a zoom lens module, and a optical image sensor array module. The eyepiece is used in tandem with the zoom lens and the image sensor array. The eyepiece and the zoom lens and the optical image sensor array share a common optical and mechanical axis.

In another preferred embodiment, the optical system of the mobile apparatus is comprised of just a zoom lens module and a optical image sensor array module.

In yet, another preferred embodiment, the optical system of the mobile apparatus is comprised of a eyepiece module and a zoom lens module, and a optical image sensor array module. The eyepiece is used in tandem with the zoom lens, and a optical image sensor array. The eyepiece module and the zoom lens module, and a optical image sensor array module share a common optical and mechanical axis when the eyepiece module is present with the zoom lens module.

In still, another preferred embodiment, the optical system of the mobile apparatus is comprised of a field lens, a macro zoom lens and a optical image sensor array. The field lens is deployed near to the image plane of the object of the optical image source. The optical image source has no original equipment eyepiece. The image of the object is focal. The field lens images the entrance pupil of the optical image source to the entrance pupil of the macro zoom lens to prevent vignetting of the image of the object by the macro zoom lens. The macro zoom lens focuses the image of the object, which is located near to the field lens, onto the optically active surface of the optical image sensor array of the electronic optical image sensor array camera module. The optical image sensor array camera module has no lens of its own.

The eyepiece examples shown in the figures of all of the preferred embodiments are of the Plossl type. The Plossl type eyepiece is chosen in our examples because of its simplicity and the ease of explanation of an eyepiece's functions. The Plossl has two identical lenses that are mounted back to back to one another in its housing. The Plossl has good overall optical performance and enjoys ease of manufacture. It should be noted that the present invention is not restricted to using just Plossl eyepieces. There are other eyepiece types that will serve just as well.

The eyepieces shown in the preferred embodiments in FIG. 17A-17F inclusive are configured with field stops. These field stops are screwed into the eyepiece housing. In cases where they are not needed, they are unscrewed and removed from the housing. Such cases arise when the optical image sources have their own field stops. As an example, see FIG. 1A.

One of the needed desirable characteristics of the Plossl in the present invention, is its moderately long eye relief. The long eye relief yields a long back focal length of the eyepiece and allows its exit pupil to be projected and refracted into the zoom lens coincident with the location of the zoom lens' entrance pupil which is the location of the eyepiece's exit pupil. This allows for the unvignetted passage of the eyepiece's light from the image formed by the optical image source's objective to the eyepiece's field stop and through the zoom lens without vignetting.

For example, for a typical Plossl with a 25 mm effective focal length, the eye relief is generally about 18 mm. The eyepiece has a field stop which is imaged by the eyepiece to infinity, thereby collimating its image light to the eyepiece's exit pupil. The eyepiece refracts its exit pupil along the eyepiece's optical axis, and onto the entrance pupil of the zoom lens. The zoom lens sees an image, which is located at the field stop of the eyepiece, as though it was infinitely distant. There are standard eyepiece housing diameters in common use today. They are for example 0.965", 0.905", 1.18", 1.25", 2" and 2.7" diameters.

The zoom lens examples shown in the many preferred embodiments are of the afocal type. The afocal type zoom lens shown in the drawings is chosen for its simplicity and ease of explanation of the general usage and operation of zoom lenses. Afocal zoom lenses having different groups of lens components will work just as well. The macro zoom lens examples shown in the drawings are naturally of the focal type. Macro zoom lenses having different groups of lens components will work just as well.

There are specific reasons why the afocal zoom lens is chosen for the mobile apparatus. Firstly, it is compatible with the afocal imagery produced by the optical image source eyepieces. Secondly, the zoom lens is equipped with a focus mechanism. The focus mechanism enables the observer to focus the mobile apparatus locally or remotely. The focus mechanism can be controlled either manually or electronically by the observer. If for example, the object distance to the optical image source varies during an observing session, the observer can actuate and refocus the zoom lens for bringing the object into sharp focus again on the optical image sensor array of the mobile apparatus. Thirdly, the zoom lens eliminates the need for a separate optical image sensor array camera lens. This reduces the component count, cost and complexity of having to use another component. Fourthly, the zoom lens eliminates the need and complexity of another component whose effective focal length must be varied in order to control focus.

The typical simple afocal type has four lens groups in its assemblage. All four lens groups of the assembly are mounted inside the zoom lens' housing and aligned along a common optical and mechanical axis. Collimated light enters the first lens group of the lens assembly, from the eyepiece. The first lens group has a net positive power. The first lens group de-collimates the light and refracts and focuses an image from its field stop through the second lens.

The second lens group is physically movable along the optical axis of the zoom lens assembly. The second lens group has a net negative power. Movement of the second lens group along the optical axis changes the magnification of the zoom lens assembly. The second lens group projects an image in through the third lens group.

The third lens group has a net positive power. During an observing session, the observer can adjust the location of the second lens group either manually or automatically using a zoom lens actuator. The zoom lens actuator, under the control of the observer, physically moves the second lens group to adjust the zoom lens' magnification.

The zoom lens is designed so that the light exiting the third lens group is afocal and collimated back to infinity, no matter what the location is of the second lens group along the optical axis. Therefore, the diameter of the exit pupil formed by the third lens group varies with the location of the second lens group along the optical axis. The first, second and third lens groups thereby comprise an afocal optical system. The power of the afocal optical system is the ratio of the diameter of the entrance pupil of the first lens group to the diameter of the exit pupil formed from the third lens group. The fourth lens group has a net positive power. Light received into the entrance pupil of the fourth lens group, afocally from the third lens group, is imaged by the fourth lens group onto the focal plane of the fourth lens group. Its focal plane i.e. image plane, lies on and coincident with, the active photo sensitive surface of an image sensor array. The image sensor array is an electronic component of a CCD or CMOS camera for example. The image sensor array is aligned on the optical axis of the zoom lens assembly such that its electronic imaging center line lies on the optical axis of the zoom lens assembly. The image sensor array converts, i.e. transforms, the optical image it receives from the zoom lens assembly to electronic signals which represent the optical image.

Zoom lenses typically have three manual controls; a manually actuated control arm for magnification, a manually actuated control arm for the iris diaphragm, and a manually actuated control arm for focus for example.

The electronic camera shown in all the embodiments of the present invention has no camera lens. The electronic camera is enclosed and mounted inside a camera case. The inside diameter of the front end of the camera case is threaded. The rear end of the zoom lens is threaded.

The camera case serves as an enclosure for the electronic camera. The optical image sensor array is centered on the mechanical thread axis of the camera case. The optical image sensor array is aligned perpendicular to the mechanical thread axis of the camera case. In addition, the camera case serves to protect the electronic camera from damage, and keeps the face of the electronic camera's optical imaging sensor array clean.

In a preferred embodiment, the camera case screws on to and mounts onto the rear threaded end of the zoom lens. This simplifies mounting, centering and aligning the image sensor array. For example, this procedure guarantees the centering of the optical and electronic image and the perpendicularity of the image sensor array to the optical axis of the zoom lens. An example of a threaded zoom lens and a threaded camera case are the M12 zoom lenses and the M12 camera cases which are currently available in the marketplace.

The major physical elements of the preferred embodiments of the "mobile apparatus" shown in the following figures of the present invention are modular building blocks referred to herein as modules: The modules are mechanically, optically and electrically connected together to form the "mobile apparatus". Each of the modules is a functional building block which comprise the "mobile apparatus". Each of the modules is comprised of an outer housing referred to as a enclosure. The enclosures carry, house and protect, and mechanically connect their functional contents to the enclosures of adjacent modules that comprise the "mobile apparatus".

The modules are a eyepiece module, a zoom lens module, a electronic image sensor array camera module, a electronics circuits module, a battery and power control module, a first end cap module, a second end cap module, a clamping mechanism module, a macro lens module, a field lens module, a extension module, and a camera lens mount module.

The clamping mechanism module comprises a enclosure, and a clamping mechanism. The eyepiece module comprises a enclosure, and a eyepiece, and a optical filter. The zoom lens module comprises a enclosure, and a zoom lens. The electronic image sensor array camera module comprises a enclosure, and a electronic image sensor array and camera electronics, and a cover. The inside diameter of the cover is threaded for connecting it and the electronic image sensor array to the threaded outside diameter of the zoom lens housing or the macro zoom housing. The cover is for mounting the image sensor array, and for protecting the image sensor array, and for mounting the image sensor array to the end of the threaded outside diameter of the housing of the zoom lens or macro zoom lens for coaxially aligning and centering the optical and mechanical axis of the zoom lens or macro zoom lens and the image sensor array together. The electronics circuits module comprises a enclosure, and a electronics circuits, and one or two antennas. The battery and power control module, comprises a enclosure, and a battery, and a power control electronics. The first end cap module comprises a enclosure, and a microphone, and a speaker, and a label, and a heat sink, and communication ports. The second end cap module comprises a enclosure, and a protected space for the inclusion of future functional devices. The macro zoom lens module comprises a enclosure, and a macro zoom lens, used in conjunction with a field lens module having a field stop. The camera lens mount module comprises a enclosure, and a mating camera lens mounting. The extension module comprises a enclosure.

The enclosures are configured to assist in maintaining the flexibility in functionality of the modules. The enclosures are configured to connect and quickly disconnect to each other. The enclosures of each of the modules are configured with a profile having a predetermined length and exterior diameter and interior diameter. An example of a enclosure profile given in preferred embodiments is a right cylinder. The enclosures are mechanically connected to one another using a common mechanical connection means like screw thread which is shown in the preferred embodiments. For example, the enclosures are threaded at each end with a common thread to enable them to connect contiguously to each other. In another preferred embodiment, the enclosures are snap-fitted together. The enclosures are mechanically connected to one another in a predetermined coaxial contiguous arrangement to facilitate their functionality. The clamping mechanism enclosure houses and encloses a clamping mechanism. See FIGS. 22-26 inclusive. The eyepiece enclosure houses and encloses a eyepiece. See FIGS. 17A-17F inclusive. The zoom lens enclosure houses and encloses a zoom lens. The zoom lens is afocal on its image input side and focal on its image output side. The electronic image sensor array camera enclosure houses and encloses a electronic image sensor array camera.

The electronics circuits enclosure houses and encloses a electronics circuits. See FIG. 7-11 inclusive. The battery and power control enclosure houses and encloses a battery and power control electronics. The first end cap module is a first end cap. See FIG. 18A-18D inclusive. The second end cap module is a second end cap. See FIG. 18E-18G inclusive. The macro zoom lens enclosure houses and encloses a macro zoom lens. The field lens module enclosure houses and encloses a field lens and a field stop. There are some instances where the observer may prefer to use the macro zoom lens module and field lens module configuration rather than the zoom lens module configuration. The extension module is comprised of a enclosure. The enclosure is a screw threaded or snap fitted device for slipping on to the barrel enclosure or the original equipment eyepiece of the optical image source. The extension module extends the length of the mobile apparatus. The camera lens mount module is comprised of a enclosure which houses a camera lens mount. The camera lens mounting is for attaching the mobile apparatus to optical image sources that for example are camera lenses that are configured with a lens mounting device to couple with. The camera lens mounting devices provide its own locking mechanism for the mobile apparatus and the camera lens coupling.

The Following is a Partial List of Some Advantages for Using the Modules:

They can be connected quickly easily with one another to assemble and form the mobile apparatus.

They can be disconnected quickly and easily from one another to disassemble the mobile apparatus. This is essential for repair and maintenance activity. They are quickly reconfigurable to enable the observer to adapt and plan the mobile apparatus to meet the many optical, mechanical, electronic and ergonomic challenges encountered during an observer's observing session. They are configured with electrical connectors to carry and route electrical power between adjacent modular enclosures to supply the electronic contents of the enclosures with electricity to operate. They are configured with electrical connectors to carry and route electronic signals between adjacent modular enclosures. They are easy to grasp, handle and manipulate.

Each of the modules can be interchanged with a functionally similar counterpart module, like for example other modules configured with contents having the same function but with alternative specifications; specifications that may be more suitable to meet and match the needs of the latest observer's object's observing session.

For example, an eyepiece module being swapped out with another eyepiece module having an eyepiece of different focal length. The mobile apparatus is configured with a clamping mechanism module that can be swapped out with a module having a different clamping mechanism, and a eyepiece module that can be swapped out with a module having a different eyepiece, and a zoom lens module that can be swapped out with a module having a different zoom lens, and a zoom lens module that can be swapped out with a module having a different electro-mechanical actuator, and a image sensor array camera module that can be swapped out with a module having a different image sensor array, and a electronics circuits module that can be swapped out with a module having different electronics circuits, and a battery and power control module that can be swapped out with a module having different capacity and ampacity batteries, and a first end cap module that can be swapped out with a module having a different microphone, and a first end cap module that can be swapped out with a module having a different speaker, and a macro zoom lens module that can be swapped out with a module having a different macro zoom lens, and a camera lens mount module that can be swapped out with another camera lens mount module having a different mating camera lens mounting in order to accommodate a wide range of camera lenses having different lens mounts, etc.

The modules can be configured flexibly to meet and adapt to the needs of different objects, different environmental operating conditions, different audiences, different observing missions, different RF noise floor environments, different optical image sources, and different observing objectives for example. The flexibility of the modules makes them adaptable to enabling the observer to simultaneously deploy a multiplicity of mobile apparatuses to a variety of different optical image sources, and plan and orchestrate observing sessions with a multiplicity of different optical image sources simultaneously. The mobile apparatus can be easily dissembled into its respective modules by unscrewing or unsnapping the modules from the mobile apparatus from one another.

Maintenance and repair of the eyepiece, zoom lens, image sensor array, electronics circuits, batteries and power control electronics can be accomplished by disassembly of the mobile apparatus into its respective modular enclosures.

Any dysfunctional physical elements, like for example a defective eyepiece, zoom lens, image sensor array, electronic circuit or battery are then removed from their respective modular enclosures, and worked on and repaired or replaced as needed. Replacement of dysfunctional eyepieces, zoom lenses, or image sensor arrays can be accomplished by removal of the dysfunctional physical element form its modular enclosure, and substituted for with a functional replacement.

In addition, the observer can easily re-configure the mobile apparatus from a past configuration of the mobile apparatus used in previous mission observing sessions, to match new requirements put on the observer by new objects, new observing environments, changed observing locations of the observer, and new and different audiences. Reconfiguration means unscrewing or unsnapping un-needed modules, and screwing or snapping on new needed modules to the mobile apparatus which meet the observer's new observing requirements. The valuable benefits of the mobile apparatus' modular architectural theme are repeated in the present disclosure in FIG. 3-56 inclusive. Easy disassembly and re-configuration of the mobile apparatus, by the observer to meet the observer's new upcoming needs, is a valuable benefit of the mobile apparatus' flexible modular architecture.

The mobile apparatus is for enabling observers of optical imagery produced by optical image sources to transform the optical imagery into electronic imagery signals, and for sharing the imagery with audiences. The present invention is an electro-mechanical-optical apparatus which is universally compatible with and attachable to an extensive list of different optical image sources. The present invention has both wireless and hard-wire communication and control capability and is compatible with a wide variety of electronic protocols.

For example:
analog television broadcast standards NTSC, PAL, SECAM
digital video elementary stream protocols H.264, HEVC, VP8, VP9
digital audio elementary stream protocols MP3, VORBIS, AAC, OPUS
digital audio and video combined stream protocols for delivery to the observer
and audience MP4, FLV, WEBM, ASF, ISMA
digital control protocol for web app viewing: MMS (Microsoft Media Server
protocol), RTSP (Real Time streaming protocol)
HTTP (Hyper Text live streaming Protocol)

The present invention has RF wireless capability, thereby enabling the observer to acquire and capture video imagery from the mobile apparatus during an observing session without the use of wires or cables; and furthermore enabling the observer to communicate with and control the mobile apparatus during an observing session without the use of wires or cables; and even furthermore enabling the observer to share his observations during and after his observing session with an audience of people and their machines without the use of wires or cables.

The present invention also has hard-wire capability, thereby enabling the observer to capture video and audio from the mobile apparatus during his observing session with the use of wires or cables; and furthermore enabling the observer to communicate with and control the mobile apparatus during his observing session with the use of wires or cables; and even furthermore enabling the observer to share his observations during and after his observing session with an audience of people and their machines with the use of wires or cables.

The mobile apparatus is configured with electronic safeguards enabling the mobile apparatus to operate in high RF noise interference environments. These safeguards are built into the electronics of the present invention. These safeguards are necessary in some extreme cases, where the RF noise interference in the environment where the mobile apparatus is deployed, would otherwise affect the electronic image signal quality and electronic image signal latency if the safeguards were not configured in place. These RF noise safeguards insure and protect the reliable wireless transmission of the electronic imagery signals.

The mobile apparatus, which is the subject of the present invention, has six modes of communication with the observer; and four modes of communication with his audience. These modes of communication can be carried out wirelessly with rf alone, with hard wire cables alone, with fiber optics cables alone, or with combinations of wireless and hard wire cables and fiber optics cables. The mobile apparatus is configured to adapt and leave the choices of mode up to the observer. These choices depend in part on the requirements for mobility of the optical image source, mobility of the mobile apparatus, mobility of the observer, mobility of the observer's audience, and the environmental conditions like rf noise floor interference and ionospheric transmission variations affecting the transmission of communications at each of the subject locations, and the bandwidth requirements needed for the integrity of the object's imagery transmission. In the case of rf noise floor interference and ionospheric transmission variations, the electronics circuits module is equipped to bring on more horsepower to mitigate these variables.

There are six types of observers. Each type of observer is defined by his mode of communication with the mobile apparatus. The first type of observer is one who is present at the optical image source and who is manually operating the mobile apparatus. The second type of observer is one who is present at the optical image source who is wirelessly operating the mobile apparatus. The third type of observer is one who is not present at the optical image source and who is wirelessly operating the mobile apparatus, but who is located local to the optical image source, i.e. within 35 feet for example. The fourth type of observer is one who is located somewhat remote to the optical image source and who is wirelessly operating the mobile apparatus, i.e. within 2 miles for example. The fifth type of observer is one who is located geographically remote to the observer and who is wirelessly operating the mobile apparatus. i.e. over 2 miles on the Earth for example. The sixth type of observer is one who is located geographically very remote to the optical image source and who is wirelessly operating the mobile apparatus, i.e. beyond the surface of the Earth in space for example.

The audience or spectators or limited segments of the public are of four types. The first type of audience are those people and machines that are local and located physically close to the observer i.e. within 35 feet for example. The second type of audience are those people and machines located somewhat remote to the observer i.e. within 2 miles for example. The third type of audience are those people and machines located geographically remote to the observer i.e. over 2 miles on the Earth for example. The fourth type of audience are those people and machines located geographically very remote to the observer i.e. beyond the surface of the Earth in space for example.

The Following is a Brief Description of Some of the Problem Solving Design Considerations of the Mobile Apparatus:

There are many different kinds and forms of optical image sources for the mobile apparatus to adapt to. There are many different object types for the mobile apparatus to adapt to. There are many different audience types for the mobile apparatus to adapt to. There are many different environmental operating conditions for the mobile apparatus to adapt to. And finally, there are many different observer motivations and limitations for the mobile apparatus to adapt to.

In summary the mobile apparatus, used by observers for sharing with their audiences the optical imagery that that is produced by the many optical image sources, is designed to be easily configurable and adaptable to operate across the broad range of collective problem variables encountered at set up before, during and after a typical observing session.

The mechanical, optical, electronic and ergonomic architecture of the mobile apparatus is flexible in order to enable the observer to fashion the mobile apparatus to adapt and meet these challenges. These flexibility and adaptability goals are the primary motivation for the inventors to build the mobile apparatus around an architecture of easily and quickly interconnected functional modules. For example, the mobile apparatus readily adapts to both the focal and afocal optical image source configurations of the optical image sources by the inclusion or exclusion of the eyepiece module.

The variation in the mechanical shapes and form factors of the optical image sources also introduce variability into the mix. Attaching the mobile apparatus to optical image sources having different shapes and form factors is a challenge. The mobile apparatus enables the observer to adapt the mobile apparatus to these mechanical shapes and form factors to meet this challenge through the use of the mobile apparatus' unique clamping mechanism which is both quickly self centering and self aligning.

Some optical image sources are airborne as in the case of drone optics and airborne surveillance telescopes. This variation introduces variability into the mix. This application necessitates miniaturization of the mobile apparatus. The mobile apparatus' architecture is scalable enabling the observer to miniaturize the mobile apparatus to adapt and meet this demand.

The observer's audiences introduce variability into the mix. The audiences are outfitted with a variety of different instrumentation for receiving and sharing the observer's imagery, audio and sounds during an observing session. Recently, wireless mobile devices such as smartphones and tablets have grown in popularity among people who have become the constituents of the observer's audience. Electronically interfacing to these many different popular devices is satisfied by the electronic circuits' module shown in the many preferred embodiments of the present invention.

Remote audiences include audiences in distant locations from the observer and from the optical image sources. For example, classrooms using the Internet and the social media. Electronically interfacing to the Internet and to social media is also satisfied by the electronic circuits' module shown in the many preferred embodiments of the present invention.

In all cases, the RF noise floor at the optical image source, at the observer, and at the audience may be non-trivial and uncooperative and must be mitigated to insure reliable bi-directional communication. The electronic circuits' module shown in the many preferred embodiments of the present invention satisfies this need.

In many instances the observer may plan to use many magnifications during an observing session. The zoom lens module shown in the many preferred embodiments of the present invention satisfies this need. There are many other zoom lens module functions that are discussed fully in the detailed description of the invention.

Typically, optical image sources are manufactured with barrel enclosures as original equipment. The barrel enclosures are part of the structural body of the optical image sources. Some optical image sources are manufactured with permanent original equipment eyepieces. See FIG. 2. Therefore the inside diameter of the optical image sources' barrel enclosure is unavailable to use to slip the mobile apparatus into to attach the mobile apparatus to the optical image source. Therefore the inside diameter of the optical image sources' original equipment eyepiece draw tube is unavailable to use to attach the mobile apparatus to.

In order to be able to mount the mobile apparatus to these optical image sources, the mobile apparatus must be able to accommodate the wide range of different barrel outside diameters and profiles. That is, the mobile apparatus must be "universal". It is an important objective of the present invention for the mobile apparatus to be universal. In a preferred embodiment, the mobile apparatus is configured with a unique clamping mechanism module which when attached to the front end of the body of the mobile apparatus, solves these attachment problems and enables universality.

The present invention solves these attachment problems in the following ways. The mobile apparatus is configured with the clamping mechanism module to: attach the mobile apparatus to the outside diameters of the optical image sources' barrel enclosures for optical image sources that have permanent original equipment eyepieces; or attach the mobile apparatus to the outside diameters of the optical image sources' original equipment eyepieces;

Some optical image sources are manufactured with a removable original equipment eyepiece. When the removable original equipment eyepiece is removed by the observer, see FIG. 1, then the inside diameter of the optical image sources' barrel enclosure becomes available for the observer to use to slip the mobile apparatus into to attach the mobile apparatus to the optical image source.

For some optical image sources manufactured with eyepiece draw tubes, where the inside diameter of the optical image sources' original equipment eyepiece draw tube is now available to use to attach the mobile apparatus to. The observer then slips the mobile apparatus into the now unoccupied original equipment eyepiece draw tube space for mounting the mobile apparatus.

For some optical image sources manufactured with camera lens mounts, the observer attaches the camera lens mount extension module to the front end of the mobile apparatus and then connects the mobile apparatus to the mating camera lens mount on the optical image source.

Some optical image source barrel enclosures come with a wide range of different outside diameters and potentially irregular profiles depending on their manufacturer. Some optical image source's permanent original equipment eyepieces enclosures also come with a wide range of different outside diameters and potentially irregular profiles depending on their manufacturer. This makes the mounting interface between the apparatus and all such optical image sources a mechanical and optical challenge. In order to be able to mount the apparatus to these optical image sources, the apparatus must be able to accommodate the wide range of different barrels and original equipment eyepiece outside diameters and profiles.

The present invention solves these attachment problems in the following ways.

The mobile apparatus is configured with the clamping mechanism module and with the "O" rings shown in FIG. 54 and FIG. 55.

The following is a summary list of advantages of the present invention. Other advantages will become apparent as the entire disclosure is read:

1. Observers often wish to have a single apparatus, which is configured with functional modules for acquiring, capturing, recording, reproducing, transmitting and receiving and sharing imagery from a variety of different optical image sources like for example microscopes, astronomical telescopes, IR scopes, spotting scopes, binoculars, theodolites, autocollimators, alignment telescopes, camera lenses, periscopes, slit lamp bio microscopes and dioptometers. Therefore it would be useful and an object of the present invention for observers to have a single apparatus for enabling observers to acquire, capture, record, reproduce, transmit and receive and display and share imagery from a variety of different optical image sources like for example microscopes, astronomical telescopes, IR scopes, spotting scopes, binoculars, rifle scopes, theodolites, autocollimators, alignment telescopes, camera lenses, periscopes, slit lamp bio microscopes and dioptometers.

FIG. 27-56 inclusive are preferred embodiments of an single apparatus termed the "mobile apparatus" by the present inventors, which is modularly configurable and comprised of physical elements for enabling observers to capture, record, reproduce, control, transmit and receive and display and share imagery from a wide variety of different optical image sources like for example astronomical telescopes, IR scopes, spotting scopes, binoculars, theodolites, autocollimators, alignment telescopes, rifle scopes, camera lenses, dioptometers and microscopes.

2. Observers often wish they had a common system of instrumentation in the form of a single apparatus that was mobile that they could easily transfer from place to place, and attach to, and use on all their optical image sources like microscopes, astronomical telescopes, IR scopes, spotting scopes, rifle scopes, binoculars, theodolites, autocollimators, alignment telescopes, camera lenses, periscopes, slit lamp bio microscopes and dioptometers. to capture, record, control, reproduce and share the imagery they observe using these optical image sources during an observing session. Therefore it would be useful and an object of the present invention for observers to have a single mobile apparatus for enabling observers to easily transfer it from place to place, and attach to, and use on all their optical image sources like microscopes, astronomical telescopes, IR scopes, spotting scopes, binoculars, theodolites, autocollimators, alignment telescopes, camera lenses, periscopes, slit lamp bio microscopes and dioptometers. to capture, display, record, control, reproduce and share the imagery they observe using these optical image sources during an observing session. FIG. 27-56 inclusive are preferred embodiments of an apparatus comprised of physical elements for enabling observers to easily transfer it from place to place, and attach to, and use on all their optical image sources to capture, display, record, control, reproduce and share the imagery they observe using these optical image sources during an observing session.

This "mobile apparatus" has the versatility of being able to be easily moved, and set up on, and attached to and serve on all the noted varieties of different optical image sources. This "mobile apparatus" is physically compatible with all the observer's different optical image sources enabling the mobile apparatus to wirelessly transmit the imagery content acquired from the different optical image sources to remote and local audiences, the Internet and social media during and after an observing session.

The "mobile apparatus" is an especially valuable instrument in training and teaching in academic environments where there is a need for the observer to share his observations with real time imagery, audio and sound with an assembly of people, like students and trainees. The mobile apparatus is also an especially valuable instrument in military environments where there is a need for the observer to share mission observations in real time with an assembly of people.

See FIG. 1 and FIG. 2 for examples of the rudimentary optical systems of the optical image sources. The optical imagery shown in FIG. 1 and FIG. 2 is of two types. FIG. 1 shows a focal optical image source. FIG. 2 shows an afocal optical image source. The "mobile apparatus" is comprised of physical elements for transforming the optical imagery acquired from both types of optical image sources into electronic video signals. The "mobile apparatus" is comprised of physical elements for adapting to both focal and afocal optical image sources.

3. Observers often make verbal notes during their observing sessions.

Observers often wish to do narration at the optical image sources; and sometimes even play a musical instrument or play recorded background music during their observing sessions. Therefore it would be useful and an object of the present invention for observers to have a mobile apparatus for enabling observers to make verbal notes and do narration at the optical image sources; and sometimes even play a musical instrument or play recorded background music during their observing sessions.

FIG. 27-56 inclusive are preferred embodiments of a "mobile apparatus" comprised of elements for enabling observers to make verbal notes and do narration at the optical image sources; and sometimes even play a musical instrument or play recorded background music during their observing sessions. These preferred embodiments are configured with end cap modules having microphones. The end cap modules are disclosed in FIG. 18A-18G inclusive.

4. Observers often wish that they could communicate their observations to audiences that are remote to their observing site and do it bi-directionally. Therefore it would be useful and an object of the present invention for observers to have a mobile apparatus for enabling observers to communicate their observations to audiences that are remote to their observing site and do it bi-directionally.

FIG. 27-56 inclusive are preferred embodiments of a "mobile apparatus" comprised of elements for enabling observers to communicate their observations to audiences that are remote to their observing site and do it bi-directionally.

5. Observers often wish to share their verbal notes, experiences and associated audio in general, with others and with the social media. Therefore it would be useful and an object of the present invention for observers to have a mobile apparatus for enabling observers to capture and transmit and share audio to remote and local audiences and to the Internet in order to disseminate the information and to the social media during and after their observing sessions.

FIG. 27-56 inclusive are preferred embodiments of a "mobile apparatus" comprised of elements for enabling observers to capture and transmit and share audio and video to remote and local audiences and to the Internet and with the social media during and after their observing sessions. The end cap module used on these embodiments is configured with a speaker and microphone for this purpose. The end cap module is shown in FIG. 18A-18G.

6. Observers often wish to receive verbal comments and data pertaining to their observations from remote and local audiences and from social media on the Internet during and after their observing sessions. Therefore it would be useful and an object of the present invention for observers to have a mobile apparatus for enabling observers to receive audio verbal comments and data from remote and local audiences and from social media on the Internet during and after an observing session.

FIG. 27-56 inclusive are preferred embodiments of a "mobile apparatus" comprised of elements for enabling observers to receive audio and data from remote and local audiences and from social media on the Internet during and after an observing session. The end cap module used on these embodiments is configured with a speaker for this purpose. The end cap module is shown in FIGS. 18A-18G.

7. Observers often wish to make a historical archive of their video and audio experiences during their observing sessions; for example, observers wish to record and store the imagery content they observe from their optical image sources during their observing sessions. Observers also wish to record and store their verbal notes made during an observing session. Therefore it would be useful and an object of the present invention for observers to have a mobile apparatus for recording and playing back the video and audio content of their observing sessions with and without the verbal comments and data received from their remote and local audiences.

FIG. 27-56 inclusive are preferred embodiments of a "mobile apparatus" comprised of elements for recording and playing back the video and audio content of the observer's observing sessions with and without the verbal comments and data received from their remote and local audiences.

8. Under certain imperative circumstances, observers often wish to acquire and receive imagery in real-time without any latency either locally or remotely from their optical image sources during an observing session. Therefore it would be useful and an object of the present invention for observers to have a real-time apparatus for enabling the observer to acquire and receive real-time imagery either locally or remotely without any latency from their optical image sources during an observing session.

FIG. 27-56 inclusive are preferred embodiments of a "mobile apparatus" comprised of elements for enabling the observer to acquire and receive real-time imagery without any latency from his optical image sources during an observing session. In order to achieve real-time imagery without any latency from the optical image sources during an observing session, the observer can select the configuration of the electronics module of the mobile apparatus with either of the analog circuits shown in FIG. 7 or FIG. 8.

9. Observers often wish to share the imagery content from their observations with remote and local audiences in real-time without any latency during their observing sessions. Under certain circumstances it is sometimes imperative that the observer's audience receives real-time imagery without any latency from the observer's optical image sources during an observing session. These circumstances frequently occur in many critical military, space related, medical and safety related applications. Therefore it would be useful and an object of the present invention for observers to have a real-time apparatus for enabling the observer to acquire and communicate real-time imagery without any latency from his optical image sources to his remote and local audiences during an observing session.

FIG. 27-56 inclusive are preferred embodiments of a "mobile apparatus" comprised of elements for enabling the observer to acquire and communicate real-time imagery without any latency from his optical image sources to his remote and local audiences during an observing session. In order to achieve real-time imagery without any latency from his optical image sources during an observing session, the observer configures the electronics module of the mobile apparatus with the analog circuits shown in either FIG. 7 or FIG. 8.

10. Observers often wish that they didn't have to prepare their observing site with cumbersome wires and cables, and that the apparatus used could be compact and easy to set up and use. Observers like to eliminate hard wired cables from the observing site because the cables frequently get in the way, are cumbersome, and take time and effort to bundle and route to and from the optical image sources. This includes electrical power cable as well. Observers also often wish that the apparatus that they use could be run on batteries contained within the housing or instrumentation enclosure, and that the operating on-time of the system of instrumentation would be long enough to complete the observer's observing session. Therefore it would be useful and an object of the present invention for observers to have an apparatus for enabling the observer to wirelessly transmit and receive and display imagery from their optical image sources during an observing session and also eliminate the need for electrical power cabling by enabling the apparatus for running on batteries contained within the housing or instrumentation enclosure, and that the operating on-time of the battery supplied power be long enough to complete the observer's observing session.

FIG. 3-6 inclusive, and FIG. 27-56 inclusive are preferred embodiments of a "mobile apparatus" for comprised of elements enabling the observer to wirelessly transmit and receive and display imagery on their private devices from their optical image sources during an observing session and also eliminate the need for electrical power cabling by using self contained battery power.

11. Observers often wish to simultaneously capture, record, reproduce and wirelessly transmit and receive and display imagery content acquired from a multiplicity of different optical image sources. Therefore it would be useful and an object of the present invention for observers to have an apparatus for enabling the observer to simultaneously capture, record, reproduce and wirelessly transmit and receive and display imagery content acquired from a multiplicity of different optical image sources.

FIG. 27-56 inclusive are preferred embodiments of a "mobile apparatus" comprised of elements for enabling the observer to simultaneously capture, record, reproduce and wirelessly transmit and receive and display imagery content acquired from a multiplicity of different optical image sources.

12. Observers often wish to share content acquired simultaneously from a multiplicity of optical image sources with their local and remote audiences and to the Internet. Therefore it would be useful and an object of the present invention for observers to have an apparatus for enabling the observer to communicate and share content acquired simultaneously from a multiplicity of optical image sources with their local and remote audiences and to the Internet.

FIG. 27-56 inclusive are preferred embodiments of a "mobile apparatus" comprised of elements for enabling the observer to share content acquired simultaneously from a multiplicity of optical image sources with their local and remote audiences and to the Internet.

13. Observers often wish to share content acquired from optical image sources with their local and remote audiences and to the Internet at a later time after the observing session, via RF radio and WIFI. Therefore it would be useful and an object of the present invention for observers to have an apparatus for enabling the observer to share content acquired from optical image sources with their local and remote audiences and to the Internet at a later time after the observing session, via RF radio and WIFI.

FIG. 27-56 inclusive are preferred embodiments of a "mobile apparatus" comprised of elements for enabling the observer to share content acquired from optical image sources with their local and remote audiences and to the Internet at a later time after the observing session, via RF radio and WIFI.

14. Observers often wish to convey the imagery and audio content from their observations to a WIFI system in order to disseminate the information. Therefore it would be useful and an object of the present invention for observers to have an apparatus for enabling the observer to convey the imagery and audio content from their observations to a WIFI system in order to disseminate the information.

FIG. 27-56 inclusive are preferred embodiments of a "mobile apparatus" comprised of elements for enabling the observer to convey the imagery and audio content from their observations to a WIFI system in order to disseminate the information.

15. Observers often wish to change and reduce the size of the object's image on the image sensor array of the mobile apparatus' camera compared to the to the image produced at the optical image source, in order to obtain a smaller f-number at the mobile apparatus' camera image sensor array for increasing the brightness of the image on the image sensor array, particularly for example for telescopic images of low brightness objects, like for example nebulae, galaxies and other objects seen at nighttime under low or poor lighting conditions. Therefore it would be useful and an object of the present invention for observers to have an apparatus for enabling the observer to change and reduce the magnification of the object's image on the image sensor array to obtain a smaller f-number compared to the image produced at the optical image source.

FIG. 3-6 inclusive and FIG. 27-56 inclusive are preferred embodiments of a "mobile apparatus" comprised of elements for enabling the observer to change and reduce the magnification of the object's image on the image sensor array to obtain a smaller f-number compared to the image produced at the optical image source.

16. Observers often wish to adjust the size of the object's image on the image sensor array in order to fit the size of the object's image at the optical image source to the size of the image sensor array without vignetting or clipping the image of the full field of view produced by the optical image source. Therefore it would be useful and an object of the present invention for observers to have an apparatus for enabling the observer to change the object's image size on the image sensor array for fitting and just matching and filling the size of the active area on the image sensor array.

FIG. 3-6 inclusive and FIG. 27-56 inclusive are preferred embodiments of a "mobile apparatus" comprised of elements for enabling the observer to change the size of the object's image on the mobile apparatus' camera image sensor array for fitting and just matching and filling the size of the active area of the image sensor array without clipping the full field of view of the optical image source.

17. Observers also often wish to adjust and increase the size of the object's image on the image sensor array in order to enlarge the size of fine detail in the image. Therefore it would be useful and an object of the present invention for observers to have an apparatus for enabling the observer to adjust and increase the size of the object's image on the image sensor array in order to enlarge the size of fine detail in the image.

FIG. 3-6 inclusive and FIG. 27-56 inclusive are preferred embodiments of a "mobile apparatus" comprised of elements for enabling the observer to adjust and increase the size of the object's image on the image sensor array in order to enlarge the size of fine detail in the image.

18. Observers often wish to manually make the changes referred to in items above. Therefore it would be useful and an object of the present invention for observers to have an apparatus for enabling the observer to manually make the changes.

FIG. 3-6 inclusive and FIG. 27-56 inclusive are preferred embodiments of a "mobile apparatus" comprised of elements for enabling the observer to manually make the changes referred to above. For those embodiments which are configured with electronic zoom lens actuators, the observer can manually override the electronic actuators by actuating the zoom lens functions by hand manually.

19. Observers sometimes wish to make these changes referred to above automatically from a remote location. Astronomical telescopes for example are typically not used in heated environments. They are typically allowed to reach the equilibrium temperature of their surroundings in order to stabilize their optical systems. In cold climates, observers sometimes prefer to operate the telescopes remotely from an indoor site that is warm. In hot climates, observers sometimes prefer to operate the telescopes remotely from an indoor site that is air conditioned.

Therefore it would be useful and an object of the present invention for observers to have an apparatus for enabling the observer to automatically make the changes above from a remote location.

FIG. 3, 4C, 12, 13, 15, 16, 19, 20, 21, 36, 37, 40, 41, 42, 45, 46, 47, 49, 50, 51, 54, and 55 are preferred embodiments of a "mobile apparatus" comprised of elements for enabling the observer to automatically make the changes referred to. These embodiments are configured with electronic zoom lens actuators which the observer can operate locally and from remote locations.

20. Observers often wish if they could easily change the camera that they used previously to one that is more suitable for gathering imagery data from a new object of interest; especially if such a change could be done quickly. For example, this wish occurs frequently when the new object has a low surface brightness compared to the previously observed object, and where a new more light sensitive camera image sensor array would be more beneficial for capturing the new low surface brightness image. Observers often frequently wish to change the camera to one with an image sensor array with smaller sized pixel elements, for example when the new object has more finer detail to capture compared to the previous object. Maintenance and repair is another reason for observers to change and substitute cameras. Therefore it would be useful and an object of the present invention for observers to have an apparatus for enabling the observer to easily and conveniently change cameras.

FIGS. 3-6 inclusive and FIGS. 27-56 inclusive are preferred embodiments of a "mobile apparatus" comprised of elements for enabling the observer to easily and conveniently change cameras. All of the embodiments identified above are configured to enable the observer to easily and conveniently change cameras simply by unscrewing the camera image sensor array module and replacing it with another camera image sensor array module configured with the desired alternate camera; or by removing the present camera from the present module and replacing its camera with the desired alternate camera. In both cases, the module containing the alternate camera is screwed back into position.

21. Observers often wish that they could easily adjust the polarization alignment direction of the antenna used by the apparatus for better wirelessly communicating their imagery and audio to remote audiences by minimizing RF noise and RF interference. Therefore it would be useful and an object of the present invention for observers to have an apparatus for enabling the observer to easily adjust the polarization alignment direction of the antenna used by the apparatus for better wirelessly communicating their imagery and audio to remote audiences by minimizing RF noise and RF interference.

FIGS. 27, 28, 29, 30, 31, 32, 33, 34, 35, 36, 37, 38, 39, 40, 41, 42, 43, 44, 45, 46, 47, 48, 49, 50, 54, and 55 are preferred embodiments of a "mobile apparatus" comprised of elements for enabling the observer to easily adjust the polarization alignment direction of the antenna used by the apparatus for better wirelessly communicating their imagery and audio to remote audiences by minimizing the effects of RF noise and RF interference. All of the preferred embodiments identified above are configured with antennas on swivels. The swivels are for adjusting the polarization alignment direction of the antennas.

22. Observers often wish that they could easily introduce, add or subtract different optical filters i.e. colored, neutral density, and interference filters, into the optical train during their observing sessions at the eyepiece of a telescope, a spotting scope, binoculars or a microscope. For example, various filter types can be used to enhance detail in the object's image. As another example, other filters can be used to reduce glare in the object's image during daytime use. Therefore it would be useful and an object of the present invention for observers to have an apparatus for enabling the observer to easily introduce, add or subtract different optical filters.

FIGS. 3, 5, 2, 14, 15, 16, 19, 20, 44, 45, 47, 49, 50, 51, 52, and 53 are preferred embodiments of a "mobile apparatus" comprised of elements for enabling the observer to easily introduce, add or subtract different optical filters. The preferred embodiments identified above are configured with a space between the eyepiece and the zoom lens for insertion of the optical filters. The preferred embodiments for the eyepieces shown in FIG. 17A-F show that the inside diameters of the rear ends of the eyepiece housings are threaded. These threads are used by the observer to mount the optical filters if the observer desires that a filter is needed. FIGS. 3, 5, 2, 14, 15, 16, 19, 20, 44, 45, 47, 49, 50, 51, 52, and 53.

23. Observers often wish that they could quickly easily mount, attach and remove the apparatus from the optical image sources. Therefore it would be useful and an object of the present invention for observers to have an apparatus for enabling the observer to quickly easily mount, attach and remove the apparatus from optical image sources.

FIG. 3-6 inclusive and FIG. 27-56 inclusive are preferred embodiments of a "mobile apparatus" comprised of elements for enabling the observer to quickly easily mount, attach and remove the apparatus from optical image sources.

24. Observers often wish that they could easily locally or remotely turn on or off the apparatus at the beginning, end, and at any time during an observing session. Therefore it would be useful and an object of the present invention for observers to have an apparatus for enabling the observer to easily, locally or remotely, turn on or off the apparatus at the beginning, end, and at any time during an observing session.

FIG. 3-6 inclusive and FIG. 27-56 inclusive are preferred embodiments of a "mobile apparatus" comprised of elements for enabling the observer to easily, locally or remotely, turn on or off the apparatus at the beginning, end, and at any time during an observing session. The apparatus is configured to enable the observer to easily, locally or remotely, turn on or off the apparatus at the beginning, end, and at any time during an observing session. The observer can turn the apparatus turn on or off by physically actuating the on/off switch located on the end cap module of the apparatus. The observer can also turn the apparatus turn on or off by sending an on/off signal to the apparatus.

25. Observers often wish that they could easily interface their apparatus to optical image sources that do not have original equipment eyepieces, i.e. FIG. 1; and optical image sources that have original equipment eyepieces that are removable; and also to optical image sources that have original equipment eyepiece that are not removable i.e. FIG. 2. For example, some spotting scopes have original equipment eyepiece that are not removable; telephoto lenses do not have eyepieces at all; many telescopes have original equipment eyepiece that are removable. Therefore it would be useful and an object of the present invention for observers to have an apparatus for enabling the observer to easily interface their apparatus to optical image sources that do not have original equipment eyepieces; and also to optical image sources that have original equipment eyepieces that are removable; and also to optical image sources that have original equipment eyepieces that are not removable.

FIG. 3-6 inclusive and FIG. 27-57 inclusive are preferred embodiments of a "mobile apparatus" comprised of elements for enabling the observer to easily interface their apparatus to optical image sources that do not have original equipment eyepieces; and also to optical image sources that have original equipment eyepieces that are removable; and also to optical image sources that have original equipment eyepieces that are not removable.

26. Observers often wish that they could easily view the imagery derived from a variety of different types of optical image sources using the same mobile apparatus; i.e. that the mobile apparatus would be versatile and compatible with a wide variety of optical image sources. Therefore it would be useful and an object of the present invention for observers to have an apparatus for enabling the observer to easily view the imagery derived from a variety of different types of optical image sources using the same mobile apparatus.

FIG. 3-6 inclusive and FIG. 27-57 inclusive are preferred embodiments of a "mobile apparatus" comprised of elements for enabling the observer to easily view the imagery derived from a variety of different types of optical image sources using the same mobile apparatus.

27. Observers often wish that the apparatus be adjustable and self aligning and self centering to the optical image sources that the apparatus is mounted and attached to. Therefore it would be useful and an object of the present invention for observers to have an apparatus for enabling the apparatus to be adjustable and self aligning and self centering to the optical image sources that the apparatus is mounted and attached to.

FIG. 21, 22, 34, 35, 36, 37, 38, 39, 40, 41, 42, 44, 45, 46, 47, 54, and 55 are preferred embodiments of a "mobile apparatus" comprised of elements for enabling the apparatus to be adjustable and self aligning and self centering to the optical image sources that the apparatus is mounted and attached to.

28. Observers often wish that the apparatus would be mechanically stable when mounted onto the optical image sources that they attach to. Therefore it would be useful and an object of the present invention for observers to have an apparatus for enabling the apparatus to be mechanically stable when mounted onto the optical image sources that they attach to.

FIG. 3-6 inclusive and FIG. 27-56 inclusive are preferred embodiments of a "mobile apparatus" comprised of elements for enabling the apparatus to be mechanically stable when mounted onto the optical image sources that they attach to. Refer to the center of gravity location.

29. Observers often wish that the apparatus be able to optically and mechanically adapt and accommodate to the barrels of optical image sources that have other than right cylindrical forms, for example conical and other circularly symmetric forms. Therefore it would be useful and an object of the present invention for observers to have an apparatus for enabling the observer to optically and mechanically adapt and accommodate to the barrel forms of optical image sources that have other than right cylindrical forms, for example conical and other circularly symmetric forms.

FIG. 21, 22, 34, 35, 36, 37, 38, 39, 40, 41, 42, 44, 45, 46, 47, 54, and 55 are preferred embodiments of a "mobile apparatus" comprised of elements for enabling the apparatus to optically and mechanically adapt and accommodate to the barrels of optical image sources that have other than right cylindrical forms, for example conical and other circularly symmetric forms.

30. Observers often wish that they could choose the frequency of the RF transmission of the audio and video content from and to the observing site. Therefore it would be useful and an object of the present invention for observers to have an apparatus for enabling the observer to choose the frequency of RF transmission of the audio and video content from and to the observing site.

FIGS. 27-56 inclusive are preferred embodiments of a "mobile apparatus" comprised of elements for enabling the observer to choose the frequency of RF transmission of the audio and video content from and to the observing site.

31. Observers often wish to make observations from a remote site at a variety of different magnifications during an observing session. Therefore it would be useful and an object of the present invention for observers to have an apparatus for enabling the observer to make observations from a remote site apart from the optical image source at a variety of different magnifications during an observing session.

FIG. 3, 4C, 12, 13, 15, 16, 19, 20, 21, 36, 37, 40, 41, 42, 45, 46, 47, 49, 50, 51, 54, and 55 are preferred embodiments of a "mobile apparatus" comprised of elements for enabling the observer to make observations from a remote site apart from the optical image source at a variety of different magnifications during an observing session.

32. Observers often wish that they could point the apparatus' antenna in order to avoid RF noise interference and maximize the signal levels transmitted and received. Therefore it would be useful and an object of the present invention for observers to have an apparatus for enabling the observer to point the apparatus' antenna in order to avoid RF noise interference and maximize the signal levels transmitted and received.

FIG. 27, 28, 29, 30, 31, 32, 33, 34, 35, 36, 37, 38, 39, 40, 41, 42, 43, 44, 45, 46, 47, 48, 49, 50, 54, and 55 are preferred embodiments of a "mobile apparatus" comprised of elements for enabling the observer to point the apparatus' antenna in order to avoid RF noise interference and maximize the signal levels transmitted and received. All of the preferred embodiments identified above are configured with antennas on swivels. The swivels are for adjusting the direction of the antennas to avoid RF noise interference and maximize the signal levels transmitted and received.

33. Observers also often wish to simultaneously make, capture, record, reproduce and transmit audio content produced by observers during an observing session to remote and local audiences and to the Internet during their observing sessions via RF radio and WIFI. Therefore it would be useful and an object of the present invention for observers to have an apparatus for enabling the observer to simultaneously make, capture, record, reproduce and transmit audio content produced by observers during an observing session to remote and local audiences and to the Internet during their observing sessions via RF radio and WIFI.

FIGS. 27-56 inclusive are preferred embodiments of a "mobile apparatus" comprised of elements for enabling the observer to simultaneously make, capture, record, reproduce and transmit audio content produced by observers during an observing session to remote and local audiences and to the Internet during their observing sessions via RF radio and WIFI. These preferred embodiments are configured with end cap modules having microphones and speakers for this purpose.

34. Observers also often wish to easily align the optical axis of the mobile apparatus to compensate for misalignment errors between the optical and mechanical axis of the eyepiece elements that comprise the mobile apparatus. Alignment is desirable when the eyepieces used to comprise the mobile apparatus have been manufactured with alignment errors between their optical and mechanical axes. This is found to be especially true with inexpensive eyepieces. Therefore it would be useful and an object of the present invention for observers to have a apparatus for enabling the observer to easily align the optical axis of the mobile apparatus to compensate for misalignment errors between the optical and mechanical axis of the eyepiece elements comprising the mobile apparatus.

FIG. 27, 28, 29, 30, 31, 32, 33, 44, 45, 47, 48, 49, and 50 are preferred embodiments of a "mobile apparatus" comprised of elements for enabling the observer to easily align the optical axis of the mobile apparatus to compensate for misalignment errors between the optical and mechanical axis of the eyepiece elements comprising the mobile apparatus. These embodiments show the use of shims for enabling the observer to easily align the optical axis of the mobile apparatus to compensate for misalignment errors between the optical and mechanical axis of the eyepiece elements.

35. Observers also often wish to easily align the optical axis of the mobile apparatus to compensate for misalignment errors between the optical and mechanical axis of the eyepiece elements that comprise the optical image source. Alignment is desirable when the original equipment eyepiece used by the manufacturers of the optical image source have been manufactured with alignment errors between their optical and mechanical axes. This is found to be especially true with inexpensive original equipment eyepieces. Therefore it would be useful and an object of the present invention for observers to have an apparatus for enabling the observer to easily align the optical axis of the mobile apparatus to compensate for misalignment errors between the optical and mechanical axis of the original equipment eyepiece elements comprising the optical image source.

FIG. 27, 28, 29, 30, 31, 32, 33, 44, 45, 47, 48, 49, and 50 are preferred embodiments of a "mobile apparatus" comprised of elements for enabling the observer to easily align the optical axis of the mobile apparatus to compensate for misalignment errors between the optical and mechanical axis of the original equipment eyepiece elements comprising the optical image source.

36. Observers also often wish to keep their hands free while verbally communicating with their audiences during observing sessions. Therefore it would be useful and an object of the present invention for observers to have an apparatus for enabling the observer to keep their hands free while verbally communicating with their audiences during observing sessions.

FIG. 27-56 inclusive are preferred embodiments of a "mobile apparatus" comprised of elements for enabling the observer to keep their hands free while verbally communicating with their audiences during observing sessions. These preferred embodiments are configured with end cap modules having microphones and speakers for this purpose.

37. Observers often wish to have a simple means to set and align the top of the electronic image sensor array to the top of the optical image that is produced by the optical image source and transformed onto the electronic image sensor array by the mobile apparatus' optics. The alignment and designation of the top of the image content is especially necessary when sharing and referring to the content with an audience and for building referenced archives. Therefore it would be useful and an object of the present invention for observers to have an apparatus for enabling the observer to align the top of the electronic image sensor array to the top of the optical image produced by the optical image source.

FIG. 21, 22, 34, 35, 36, 37, 38, 39, 40, 41, 42, 44, 45, 46, 47, 54, and 55 are preferred embodiments of a "mobile apparatus" comprised of elements for enabling the observer to align the top of the electronic image sensor array to the top of the optical image produced by the optical image source. This is accomplished by the observer by the method of attaching the mobile apparatus to the optical image source, and then before locking the mobile apparatus in place, rotating the mobile apparatus around the mechanical axis of the optical image source to align the top of the image of the object to the top of the array—as seen by the observer on the observer's display; and then locking the mobile apparatus in place with its clamping mechanism or the knurled set screw provided. This also can be accomplished by rotating the image sensor array module on its threaded ends about its mechanical axis to align the top of the image of the object to the top of the array—as seen by the observer on the observer's display; and then locking the mobile apparatus in place with its clamping mechanism or the knurled set screw provided.

38. Observers often wish they could control the center of gravity location of the mobile apparatus and arrange the center of gravity to be disposed as low as possible for minimizing the effects of air turbulence which can cause mechanical vibrations that cause image smear. Therefore it would be useful and an object of the present invention for observers to have an apparatus for enabling the observer to control the center of gravity location of the mobile apparatus and arrange the center of gravity to be disposed as low as possible for minimizing the effects of air turbulence which can cause mechanical vibrations that cause image smear.

FIG. 27-50 inclusive, and 54, and 55 are preferred embodiments of a "mobile apparatus" comprised of elements for enabling the observer to control the center of gravity location of the mobile apparatus and arrange the center of gravity to be disposed as low as possible for minimizing the effects of air turbulence which can cause mechanical vibrations that cause image smear. This is accomplished by the observer by the method of attaching the mobile apparatus to the optical image source, and then before locking the mobile apparatus in place, rotate the mobile apparatus "T formation" around its mechanical axis to where the battery module is closest to the ground; and then locking the mobile apparatus in place with its clamping mechanism or the knurled set screw provided.

39. Observers also often wish to have a "mobile apparatus" that is configured with easily replaceable and interchangeable functional modules; for example, with modules that can easily be removed from the mobile apparatus for routine maintenance; with modules that can easily be removed from the mobile apparatus for replacement of failed and damaged modules; with modules that can easily be removed from the mobile apparatus and substituted for with modules having different functional characteristics to match the new objects being observed; and with modules that can easily be removed from the mobile apparatus and substituted for with modules which meet the current and expected observing environmental conditions at the optical image source. Therefore it would be useful and an object of the present invention for observers to have an apparatus for enabling the apparatus to be modularly configured with easily replaceable and interchangeable functional modules.

FIG. 3-6 inclusive and FIG. 27-56 inclusive are preferred embodiments of a "mobile apparatus" comprised of elements for enabling the apparatus to be modularly configured with easily replaceable and interchangeable functional modules.

40. Observers also often wish to have an archival apparatus to use to record the imagery captured during an observing session and to play the imagery later-on to the observer and to remote and local audiences. Therefore it would be useful and an object of the present invention for observers to have an apparatus for enabling the observer to record the imagery captured during an observing session and to play the imagery later-on to the observer and to remote and local audiences.

FIG. 27-56 inclusive are preferred embodiments of a "mobile apparatus" comprised of elements for enabling the observer to record the imagery captured during an observing session and to play the imagery later-on to the observer and to remote and local audiences.

41. Observers also often wish to have an apparatus to use employing voice recognition to make text from their verbal audio notes of their observations during their observing sessions. Therefore it would be useful and an object of the present invention for observers to have an apparatus for enabling the observer to make text from their verbal audio notes of their observations during their observing sessions using voice recognition.

FIG. 27-56 inclusive are preferred embodiments of a "mobile apparatus" comprised of elements for enabling the observer to make text from their verbal audio notes of their observations during their observing sessions using voice recognition.

42. Observers also often wish to have a real-time apparatus to use to play the audio captured during an observing session to the observer and to remote and local audiences in real-time. Therefore it would be useful and an object of the present invention for observers to have an apparatus for enabling the observer to play the audio captured during an observing session to the observer and to remote and local audiences in real-time.

FIG. 27-56 inclusive are preferred embodiments of a "mobile apparatus" comprised of elements for enabling the observer to play the audio captured during an observing session to the observer and to remote and local audiences in real-time. This is accomplished by the means of the observer using the mobile apparatus' electronics module configured with either the real-time analog circuit in FIG. 7 or in FIG. 8, and using the microphone configured in the end cap modules shown in FIG. 18.

43. Observers also often wish to have an archival apparatus to use to record the audio captured during an observing session and to play the audio later-on to the observer and to remote and local audiences. Therefore it would be useful and an object of the present invention for observers to have an apparatus for enabling the observer to record the audio captured during an observing session and to play the audio later-on to the observer and to remote and local audiences.

FIG. 27-56 inclusive are preferred embodiments of a "mobile apparatus" comprised of elements for enabling the observer to record the audio captured during an observing session and to play the audio later-on to the observer and to remote and local audiences. The mobile apparatus is configured with a solid state digital recorder for recording and archiving the audio captured during an observing session. The recorder enables the audio captured during an observing session to be played later-on back to the observer and to the remote and local audiences after the observer's observing session is over.

44. Observers also often wish to have an apparatus to use that could be run on rechargeable batteries contained within the apparatus' enclosure, and that the operating on time of the mobile apparatus be long enough to complete the observer's observing session. Therefore it would be useful and an object of the present invention for observers to have an apparatus for enabling the apparatus to run on rechargeable batteries contained within the apparatus' enclosure, and that the operating on time of the apparatus be long enough to complete the observer's observing session.

FIGS. 3-6 inclusive and FIGS. 27-56 inclusive are preferred embodiments of a "mobile apparatus" comprised of elements for enabling the apparatus to run on rechargeable batteries configured within the apparatus' battery enclosure, and that the operating on time of the apparatus be long enough to complete the observer's observing session.

The batteries that supply electrical power to the mobile apparatus are rechargeable, and can be recharged while they are within the apparatus' enclosure. The mobile apparatus' battery module enclosure has an electrical receptacle on its skin that a wall wart carrying D.C. electrical power can plug into to charge the battery mounted inside the battery module enclosure. The mobile apparatus' electronic components are low power, thereby permitting long observing sessions to take place using the fully charged batteries mounted inside the apparatus' enclosure. It is noted that the electronic circuits described herein in FIG. 7-11 inclusive are primarily made of CMOS chip components for keeping the power consumption low and for lengthening the operating time on the batteries for long observing sessions.

45. Observers also often wish to have an apparatus to use that would be safe to use and not mar or damage the barrels of the optical image sources that it attaches to. Therefore it would be useful and an object of the present invention for observers to have an apparatus for enabling the apparatus to be safe to use and not mar or damage the barrels of the optical image sources that it attached to.

FIG. 21, 22, 34, 35, 36, 37, 38, 39, 40, 41, 42, 44, 45, 46, 47, 54, and 55 are preferred embodiments of a "mobile apparatus" comprised of elements for enabling the apparatus to be safe to use and not mar or damage the barrels of the optical image sources that it attaches to.

46. Observers also often wish to have an apparatus to use that would accommodate the barrels of optical image sources having a range of outside diameters, and where some barrels have conical profiles as well as cylindrical profiles. Therefore it would be useful and an object of the present invention for observers to have an apparatus for enabling the apparatus to accommodate the barrels of optical image sources having a range of outside diameters, and where some barrels have conical profiles as well as cylindrical profiles.

FIG. 21, 22, 34, 35, 36, 37, 38, 39, 40, 41, 42, 44, 45, 46, 47, 54, and 55 are preferred embodiments of a "mobile apparatus" comprised of elements for enabling the apparatus to accommodate the barrels of optical image sources having a range of outside diameters, and where some barrels have conical profiles as well as cylindrical profiles. The mobile apparatus' clamping mechanism for mounting and attaching to optical image sources is self aligning and self centering.

47. Observers also often wish to have an apparatus to use that would be adjustable and self-aligning and self centering onto the telescopes, spotting scopes, binoculars and microscopes and other forms of optical image sources that they mount and attach to. Therefore it would be useful and an object of the present invention for observers to have an apparatus for enabling the apparatus to be adjustable and self aligning and self centering onto the telescopes, spotting FIG. 21, 22, 34, 35, 36, 37, 38, 39, 40, 41, 42, 44, 45, 46, 47, 54, and 55 are preferred embodiments of a "mobile apparatus" comprised of elements for enabling the apparatus to be adjustable and self aligning and self centering onto the telescopes, spotting scopes, binoculars and microscopes and other forms of optical image sources that they mount and attach to.

48. Observers also often wish to have an apparatus to use that is adjustable and self aligning and self centering for telescopes, spotting scopes, binoculars and microscopes that they mount and attach to, and be able to adapt and accommodate to barrels that have other than right cylindrical forms, for example conical and other circularly symmetric forms. Therefore it would be useful and an object of the present invention for observers to have an apparatus for enabling the apparatus to be adjustable and self aligning and self centering for telescopes, spotting scopes, binoculars and microscopes that they mount and attach to, and be able to adapt and accommodate to barrels that have other than right cylindrical forms, for example conical and other circularly symmetric forms.

FIG. 21, 22, 34, 35, 36, 37, 38, 39, 40, 41, 42, 44, 45, 46, 47, 54, and 55 are preferred embodiments of a "mobile apparatus" comprised of elements for enabling the apparatus to be adjustable and self aligning and self centering for telescopes, spotting scopes, periscopes, binoculars and microscopes that they mount and attach to, and be able to adapt and accommodate to barrels that have other than right cylindrical forms, for example conical and other circularly symmetric forms.

49. Observers also often wish to have an apparatus that conveys and stores the imagery and audio content from their observations to the cloud of the Internet simultaneously as the content is accrued during the observation session. Therefore it would be useful and an object of the present invention for observers to have an apparatus for enabling the apparatus to convey and store the imagery and audio content from their observations to the cloud of the Internet simultaneously as the content is accrued during an observing session.

FIGS. 27-56 inclusive, and FIG. 9-11 inclusive are preferred embodiments of a "mobile apparatus" comprised of elements for enabling the apparatus to convey and store the digital imagery and audio content from their observations to the cloud of the Internet simultaneously as the content is accrued during the observing session.

50. Observers also often wish to have an apparatus to use that could accept voice recognition commands. Therefore it would be useful and an object of the present invention for observers to have an apparatus for enabling the apparatus to accept voice recognition commands.

FIGS. 27-56 inclusive, and FIG. 7-11 inclusive are preferred embodiments of a "mobile apparatus" comprised of elements for enabling the apparatus to accept voice recognition commands.

51. Observers often wish to have an apparatus to use that enables the shared imagery and audio content of their observations to be communicated to audiences confidentially. This includes keeping the administrative control of the communications confidential as well. Therefore it would be useful and an object of the present invention for observers to have an apparatus for enabling the observer to share the imagery and audio content of their observations with audiences confidentially; including keeping the administrative control of their communications confidential.

FIG. 27-56 inclusive are preferred embodiments of a "mobile apparatus" comprised of elements for enabling the observer to share the imagery and audio content of the observer's observing sessions with audiences confidentially; including keeping the administrative control of the communications confidential.

52. Observers often wish to overcome the interference effects posed on the simultaneous transmission and reception of video and audio signals from a multiplicity of different optical image sources that are located physically close to one another, like at star parties for example. Therefore it would be useful and an object of the present invention for observers to have an apparatus for enabling the observer to overcome the interference effects posed on the simultaneous transmission and reception of video and audio signals from a multiplicity of different optical image sources that are located physically close to one another.

FIG. 27-56 inclusive are preferred embodiments of a "mobile apparatus" comprised of elements for enabling the observer overcome the interference effects posed on the simultaneous transmission and reception of video and audio signals from a multiplicity of different optical image sources that are located physically close to one another.

54. Observers often wish to have an apparatus to overcome the focus problems introduced by objects whose distance from the optical image source varies during an observing session. When the object distance changes, this causes a change in focus at the optical image source. Therefore it would be useful and an object of the present invention for observers to have an apparatus for enabling the observer to overcome the focus problems introduced by objects whose distance from the optical image source varies during an observing session.

FIG. 3-6 inclusive and FIG. 27-56 inclusive are preferred embodiments of a "mobile apparatus" comprised of elements for enabling the observer overcome the focus problems introduced by objects whose distance from the optical image source varies during an observing session. (all figs with zoom lenses)

55. Observers often wish to have an apparatus to capture and share the imagery from optical image sources, like 35 mm camera lenses and other lenses having a lens mounting, that's used normally for attaching the lens to a camera body, for example like a 35 mm camera body and a variety of other camera body types. Therefore it would be useful and an object of the present invention for observers to have an apparatus for enabling the observer to capture and share the imagery from optical image sources like 35 mm camera lenses and other lenses having a lens mounting, that's used normally for attaching the lens to a camera body FIG. 27-56 inclusive are preferred embodiments of a "mobile apparatus" comprised of elements for enabling the observer to capture and share the imagery from optical image sources, like 35 mm camera lenses and other lenses having a lens mounting, that's used normally for attaching the lens to a camera body.

56. Observers often wish to have an apparatus configured with a cooling device for cooling the image sensor array for reducing electronic noise and keeping the temperature of the image sensor array within the manufacturers recommended specified operating temperature range. Therefore it would be useful and an object of the present invention for observers to have an apparatus configured with a cooling device for cooling the image sensor array to reduce electronic noise and keep the temperature of the image sensor array within the manufacturer's recommended specified operating temperature range.

FIG. 3-6 inclusive and FIG. 27-56 inclusive are preferred embodiments of a "mobile apparatus" configured with a cooling device for cooling the image sensor array to reduce electronic noise and keep the temperature of the image sensor array within the manufacturer's recommended specified operating temperature range.

57. Observers often wish to have an apparatus configured with a locking device for locking the apparatus to the optical image source after the apparatus is attached to the optical image source. Therefore it would be useful and an object of the present invention for observers to have an apparatus configured with a locking device for locking the apparatus to the optical image source after the apparatus is attached to the optical image source.

FIG. 19, 20, 21, 22, 34, 35, 36, 37, 38, 39, 40, 41, 42, 44, 45, 46, 47, 54, and 55 are preferred embodiments of a "mobile apparatus" configured with a locking device for locking the apparatus to the optical image source after the apparatus is attached to the optical image source. It should be noted that the clamping mechanism shown if the figures is itself a locking device.

BRIEF DESCRIPTION OF THE SEVERAL VIEWS OF THE DRAWINGS

In order to more fully understand the objects of the invention, the following detailed description of the illustrative embodiments should be read in conjunction with the appended figure drawings, wherein:

FIG. 5 shows a side view section of the optical system schematic of a preferred embodiment of a mobile apparatus attached to the optical system of a typical optical image source, where the mobile apparatus has its own eyepiece, but where the optical image source does not have its own original equipment eyepiece, wherein the mobile apparatus is configured for use for optical image sources referred to in FIG. 1.

13B shows a front view of the layout of the mobile apparatus shown in 13A.

Figure 14:
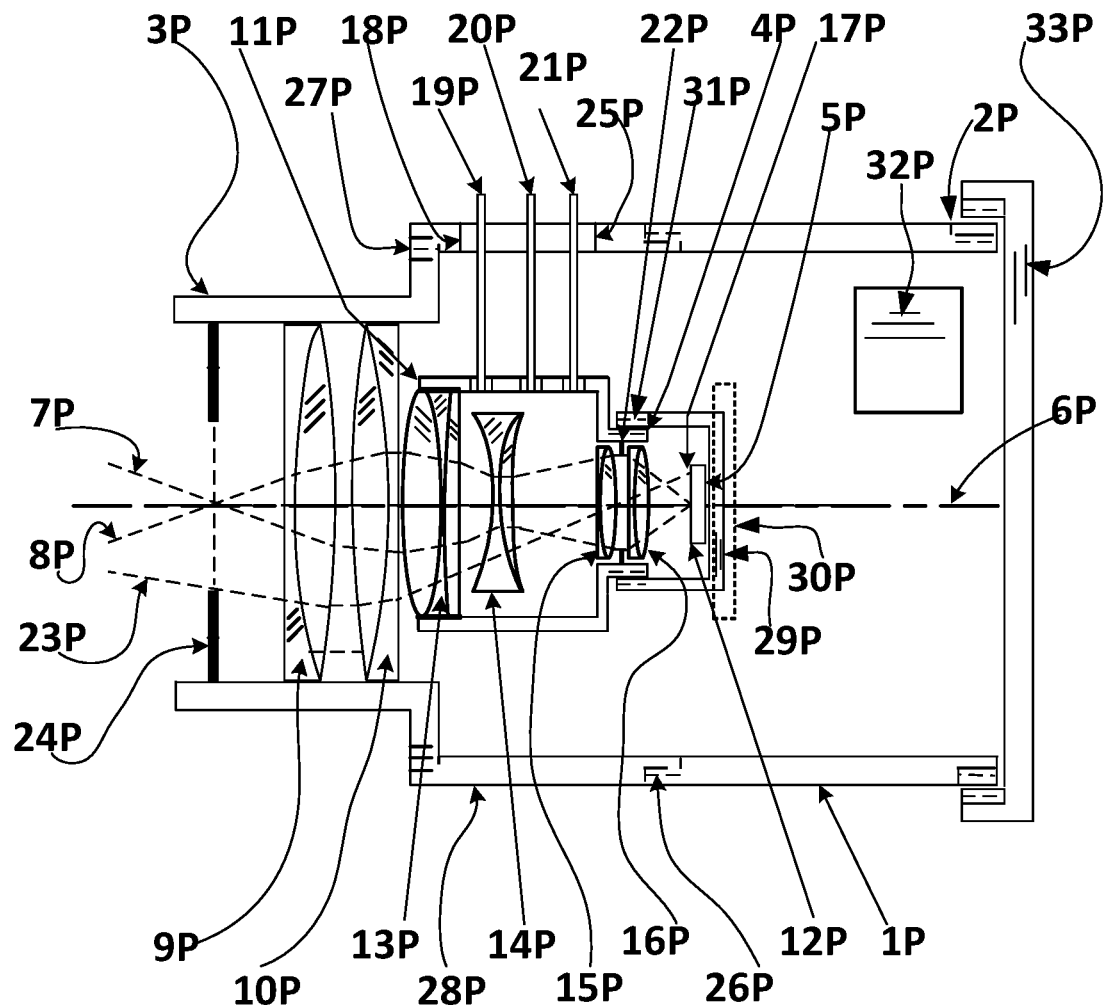

FIG. 14 shows a side view section of a layout of a preferred embodiment of a mobile apparatus, where the mobile apparatus has its own eyepiece, and the zoom lens functions are operated manually by the observer, and the zoom lens does not have a zoom lens actuator, and the zoom lens has an iris diaphragm, wherein the mobile apparatus is configured for use for optical image sources referred to in FIG. 1.

Figures 15A, 15B:
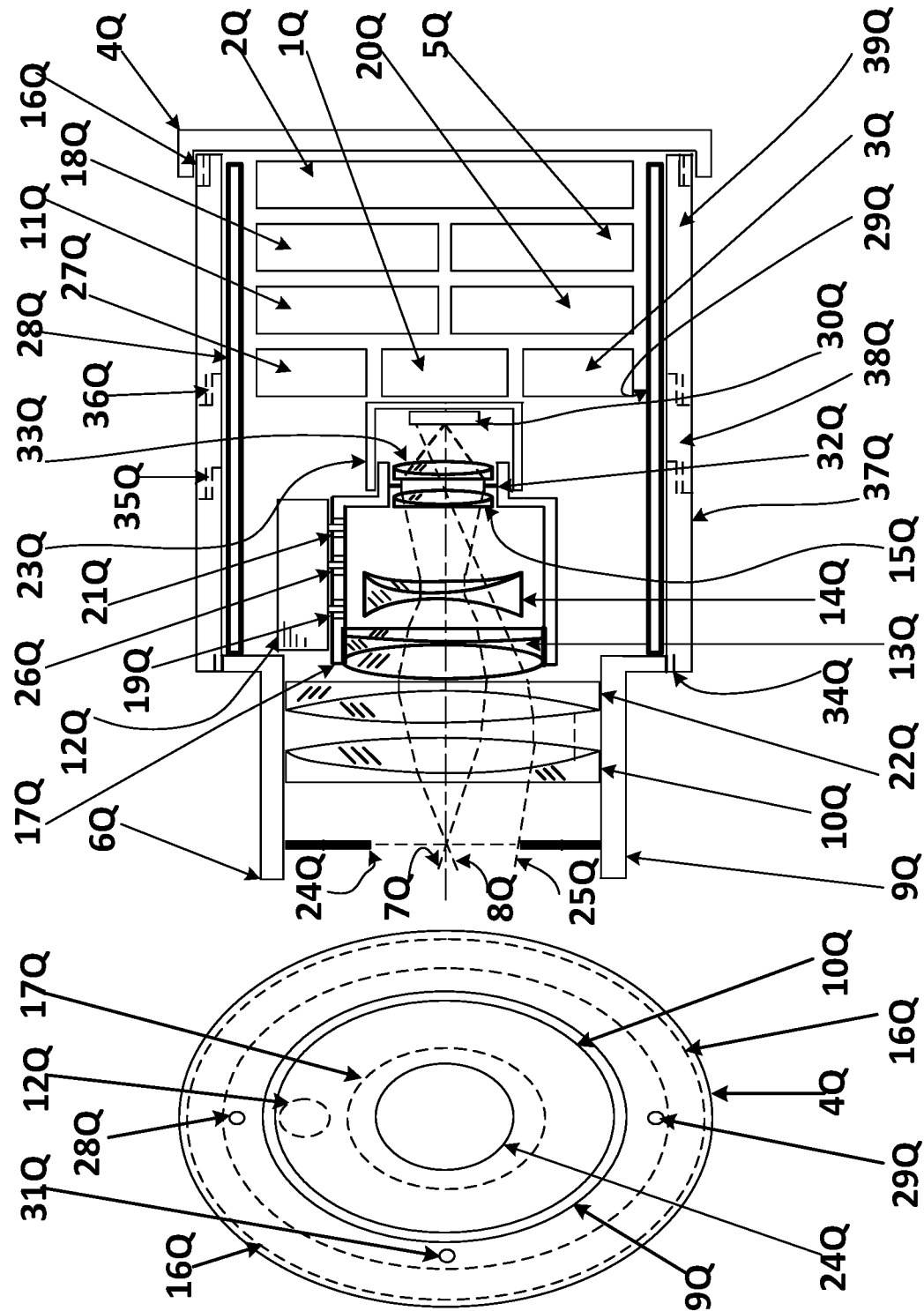

FIG. 15A shows a side view section of a layout of a preferred embodiment of a mobile apparatus, showing the electronic system circuits, and where the mobile apparatus has a zoom lens actuator to operate the zoom lens functions, and the mobile apparatus' enclosure has a threaded screw-on end cap module, and the zoom lens has an iris diaphragm, and the mobile apparatus does have its own eyepiece, wherein the mobile apparatus is configured for use for optical image sources referred to in FIG. 1.

15B shows a front view of the layout of the mobile apparatus shown in 15A.

Figures 16A, 16B:
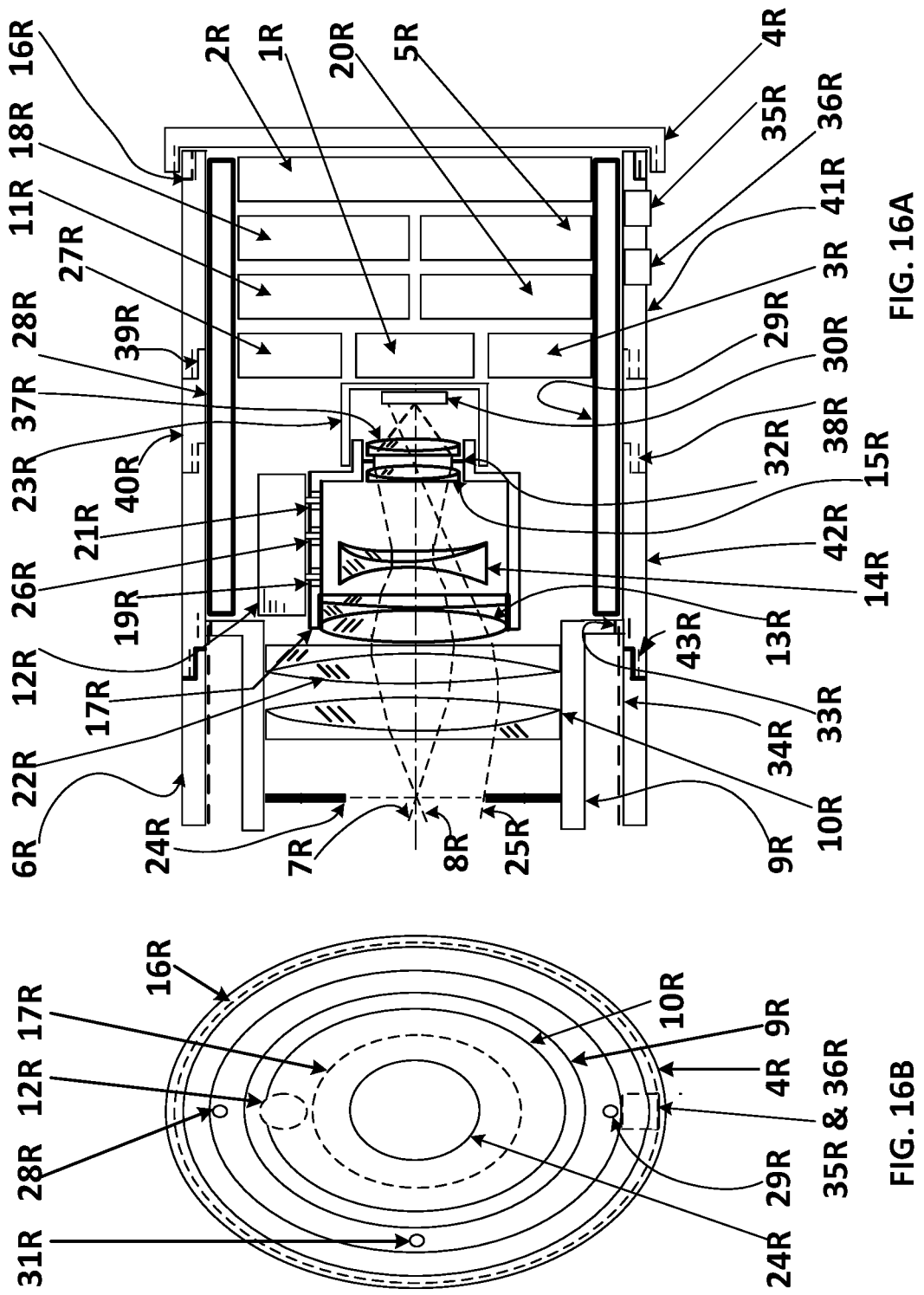

FIG. 16A shows a side view section of a layout of a preferred embodiment of a mobile apparatus, showing the electronic system circuits, and where the mobile apparatus has a zoom lens actuator to operate the zoom lens functions, and the zoom lens has an iris diaphragm, and the mobile apparatus has a eyepiece module whose housing is threaded, and the inside diameter of the mobile apparatus' enclosure is threaded to mount the eyepiece module, wherein the mobile apparatus is configured for use for optical image sources referred to both in FIG. 1. and FIG. 2.

16B shows a front view of the layout of the mobile apparatus shown in 16A.

Figure 17A:
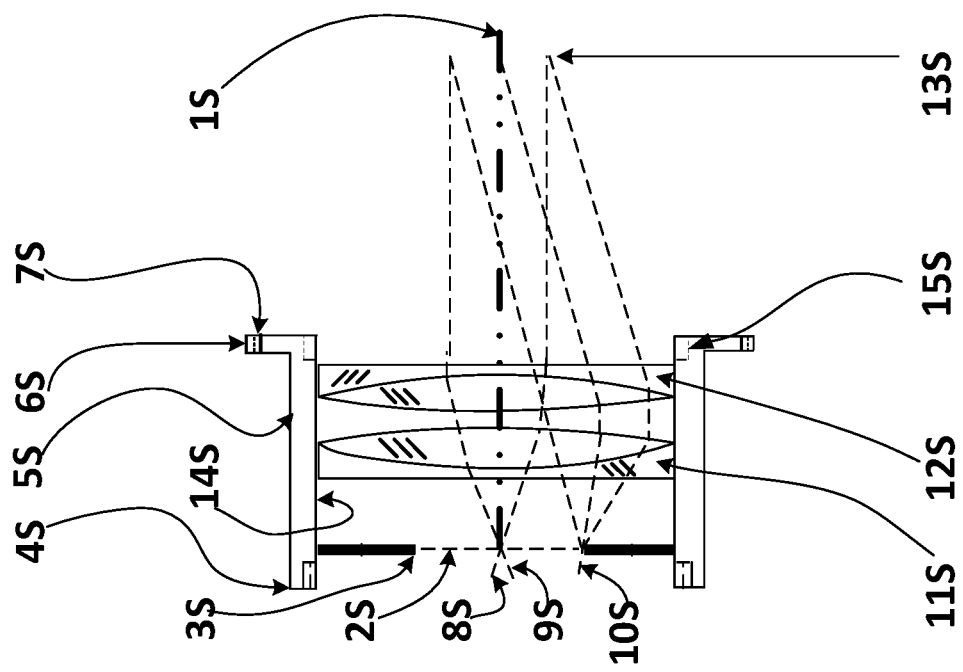

FIG. 17A shows a side view section of a layout of the eyepiece module of a mobile apparatus.

17B shows a front view of the layout of the eyepiece module shown in FIG. 17A.

FIG. 17C shows a side view center section of a layout of a eyepiece module of the mobile apparatus.

FIG. 17D shows a front view of the layout of the eyepiece module shown in FIG. 17C.

FIG. 18A shows a side view section of a layout of a preferred embodiment of a threaded screw-on end cap module of a mobile apparatus showing a microphone module, and a label.

18B shows a front view of the layout of the threaded screw-on end cap module shown in FIG. 18A.

18C shows a rear view of the layout of the threaded screw-on end cap module shown in FIG. 18A.

FIG. 18D shows a rear view of the layout of the threaded screw-on end cap module.

FIG. 18E shows a front view of the layout of the threaded screw-on end cap module of a preferred embodiment of a mobile apparatus showing a microphone, and a label, and a battery charging port, and an USB port.

FIG. 18F shows a side view center section of a layout of a threaded screw-on end cap module shown in FIG. 18E.

FIG. 18G shows a rear view of the layout of the threaded screw-on end cap module shown in FIG. 18E FIG. 19A shows a side view section of a layout of a preferred embodiment of a mobile apparatus, showing the electronic system circuits, and where the mobile apparatus is configured for use for optical image sources referred to in both FIG. 1. and FIG. 2. The figure shows a knurled setscrew locking mechanism for locking the mobile apparatus to the optical image sources.

19B shows a front view of the layout of the mobile apparatus shown in 19A.

Figures 20A, 20B:
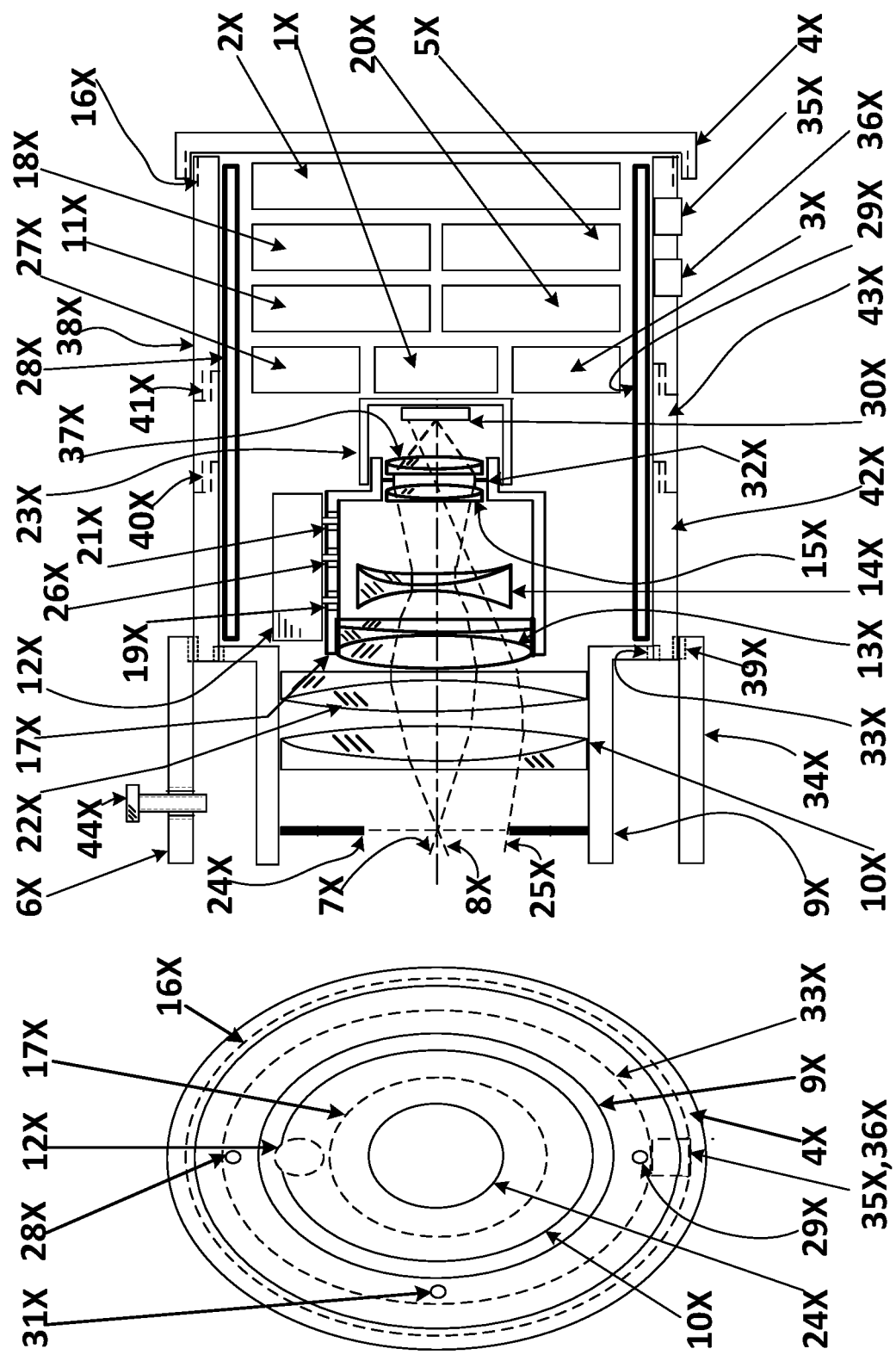

FIG. 20A shows a side view section of a layout of a preferred embodiment of a mobile apparatus, showing the electronic system circuits, and where there is a screw-on extension module of the mobile apparatus to enable the mobile apparatus to be attached to the optical image sources, and wherein the mobile apparatus is configured for use for optical image sources referred to in both FIG. 1. and FIG. 2.

20B shows a front view of the layout of the mobile apparatus shown in 20A.

Figures 21A, 21B:
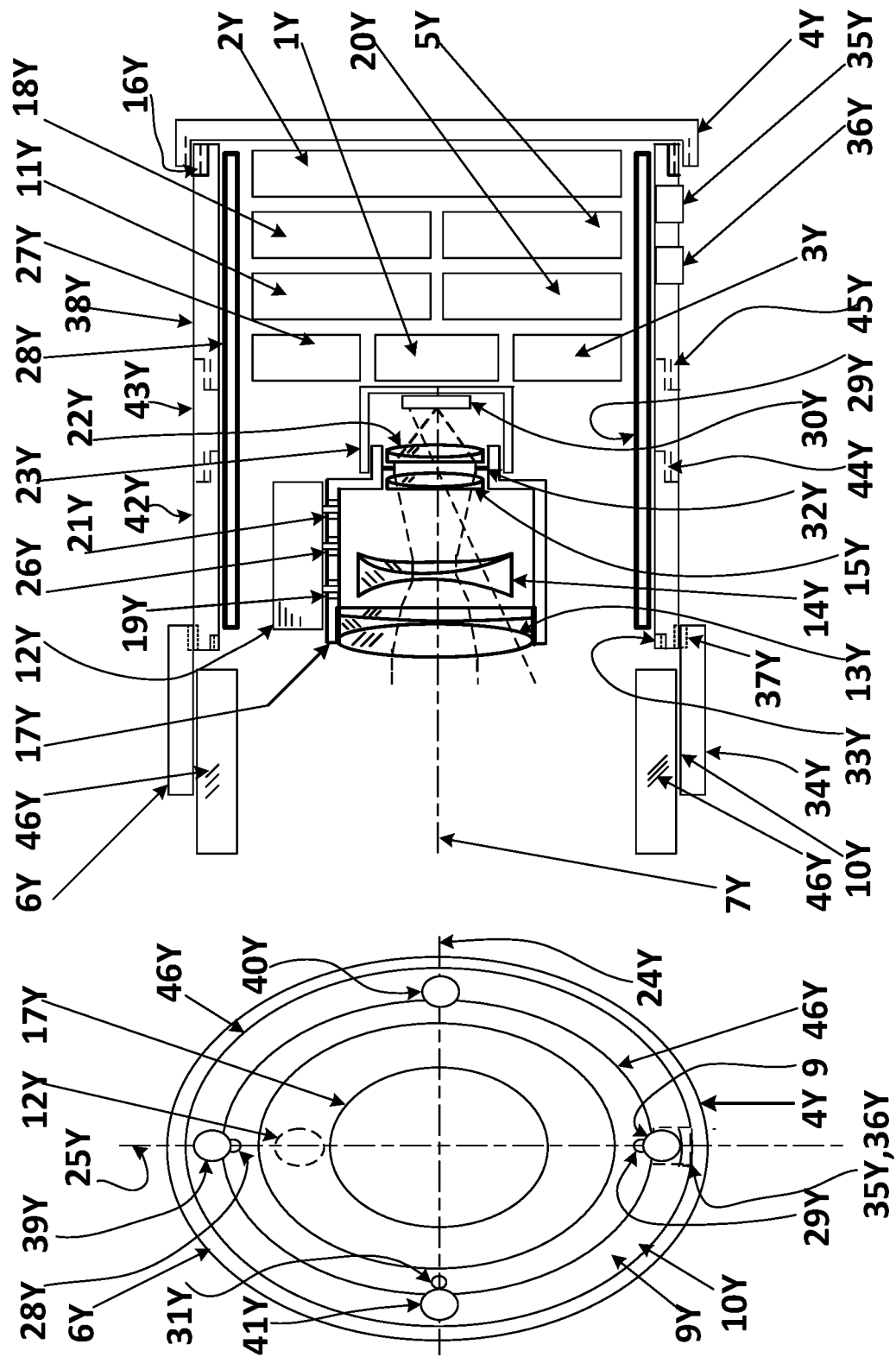

FIG. 21A shows a side view section of a layout of a preferred embodiment of a mobile apparatus, showing the electronic system circuits, and where the mobile apparatus has a clamping mechanism module for enabling the mobile apparatus to be precisely attached to the barrels and to the original equipment eyepieces of the optical image sources, wherein the mobile apparatus is configured for use for optical image sources referred to in both FIG. 1. and FIG. 2.

FIG. 21B shows a front view of the layout of the mobile apparatus shown in FIG. 20A.

Figure 22A:
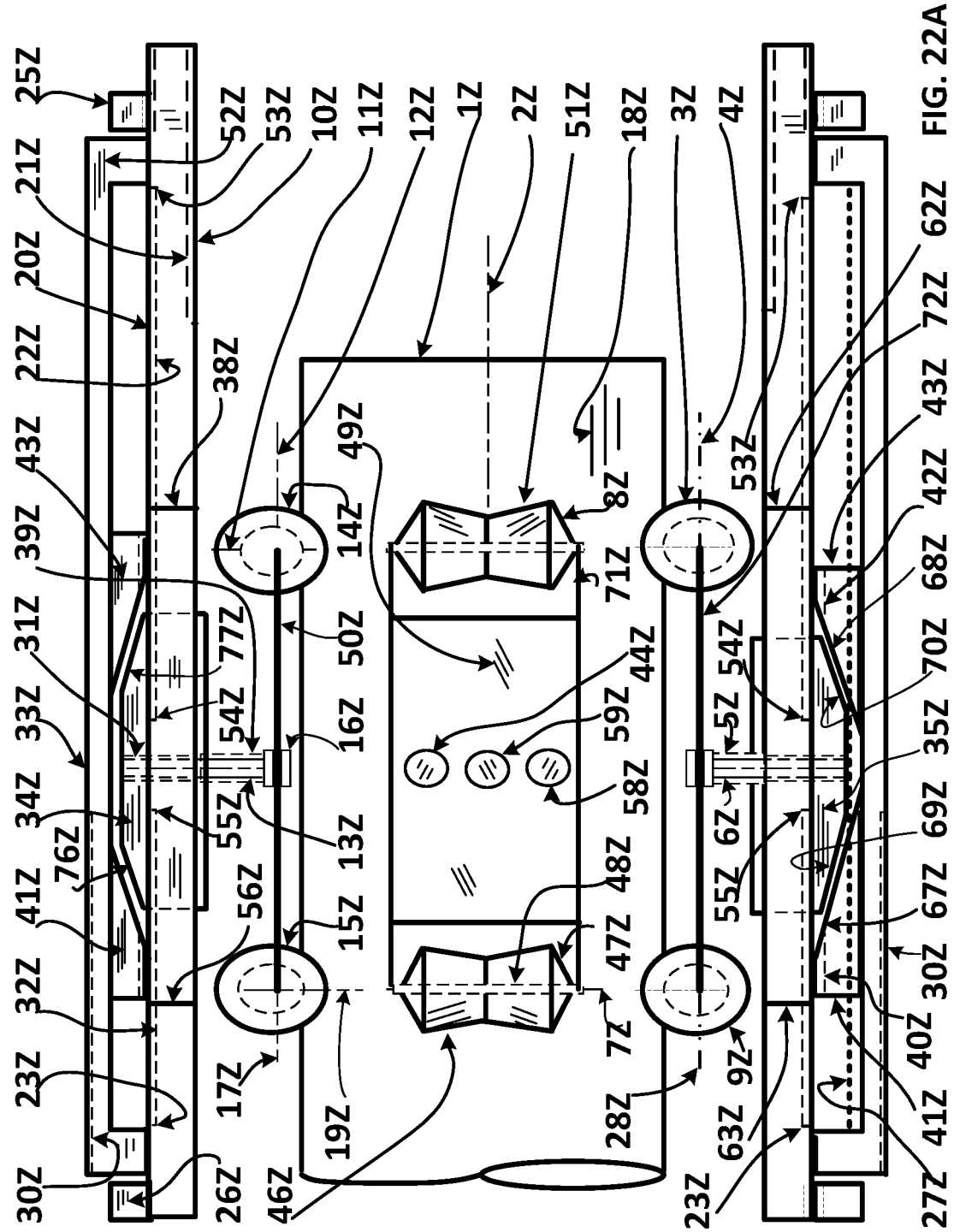

FIG. 22A shows a side view section of a layout of a preferred embodiment of the mobile apparatus' clamping mechanism module.

Figure 22B:
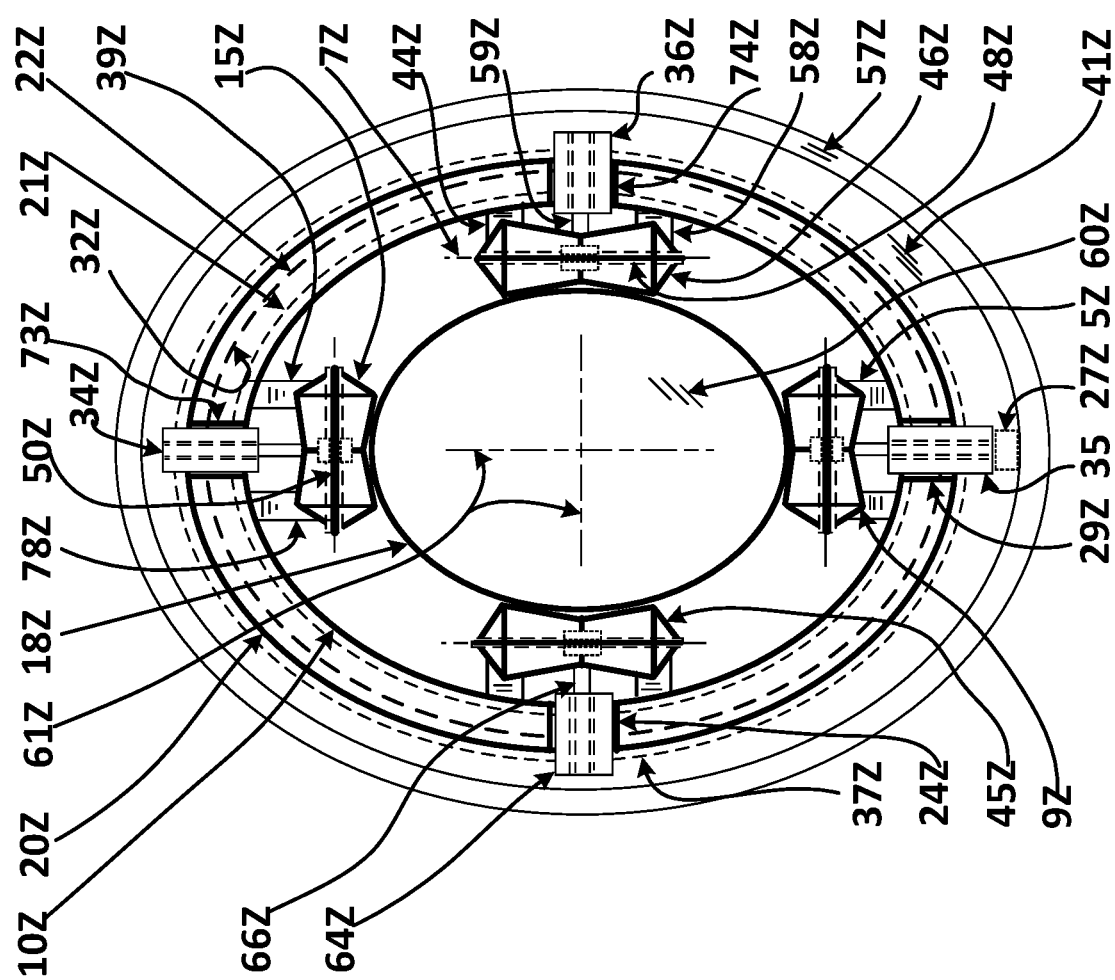

FIG. 22B shows a front end center section view of the layout of a preferred embodiment of the mobile apparatus' clamping mechanism module shown in FIG. 22A showing the four driven traveling blocks in their four radial slotted raceways.

Figure 23A:
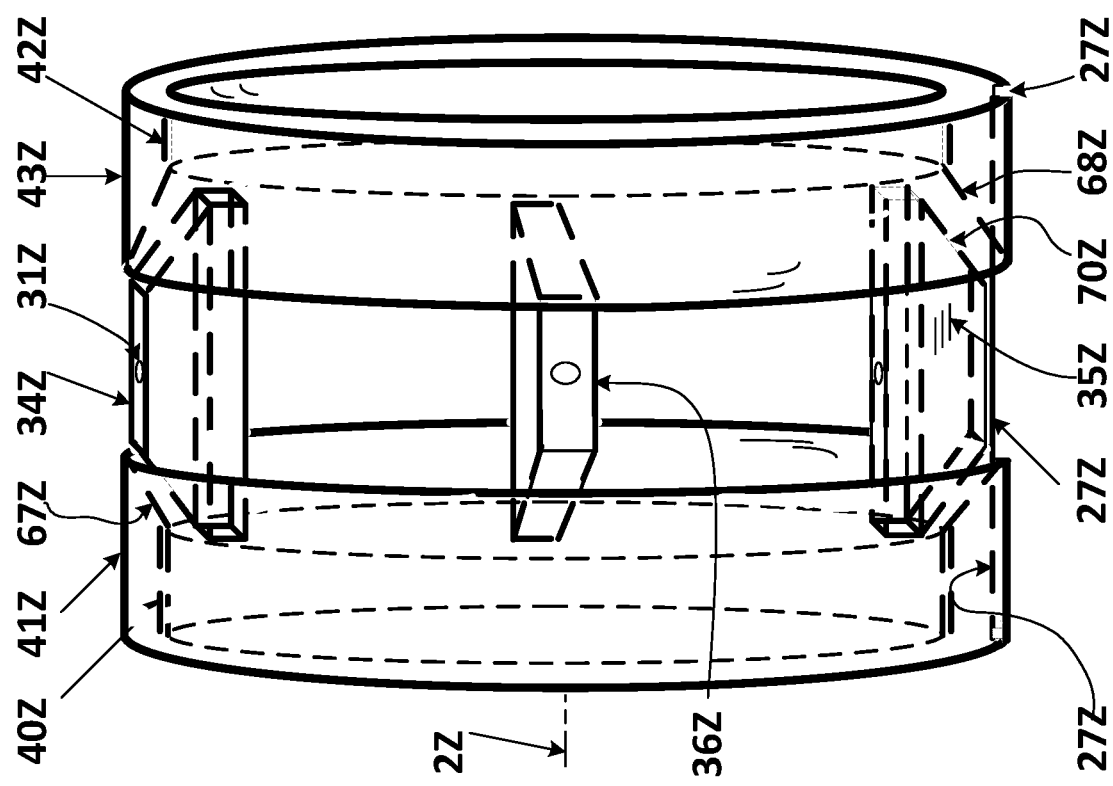

FIG. 23A shows an isometric side view of a layout of a preferred embodiment of the mobile apparatus' clamping mechanism module shown in FIG. 22A and FIG. 22B showing the keyway and the two right cylindrical traveling pressure circuits and the four driven traveling blocks.

Figure 23B:
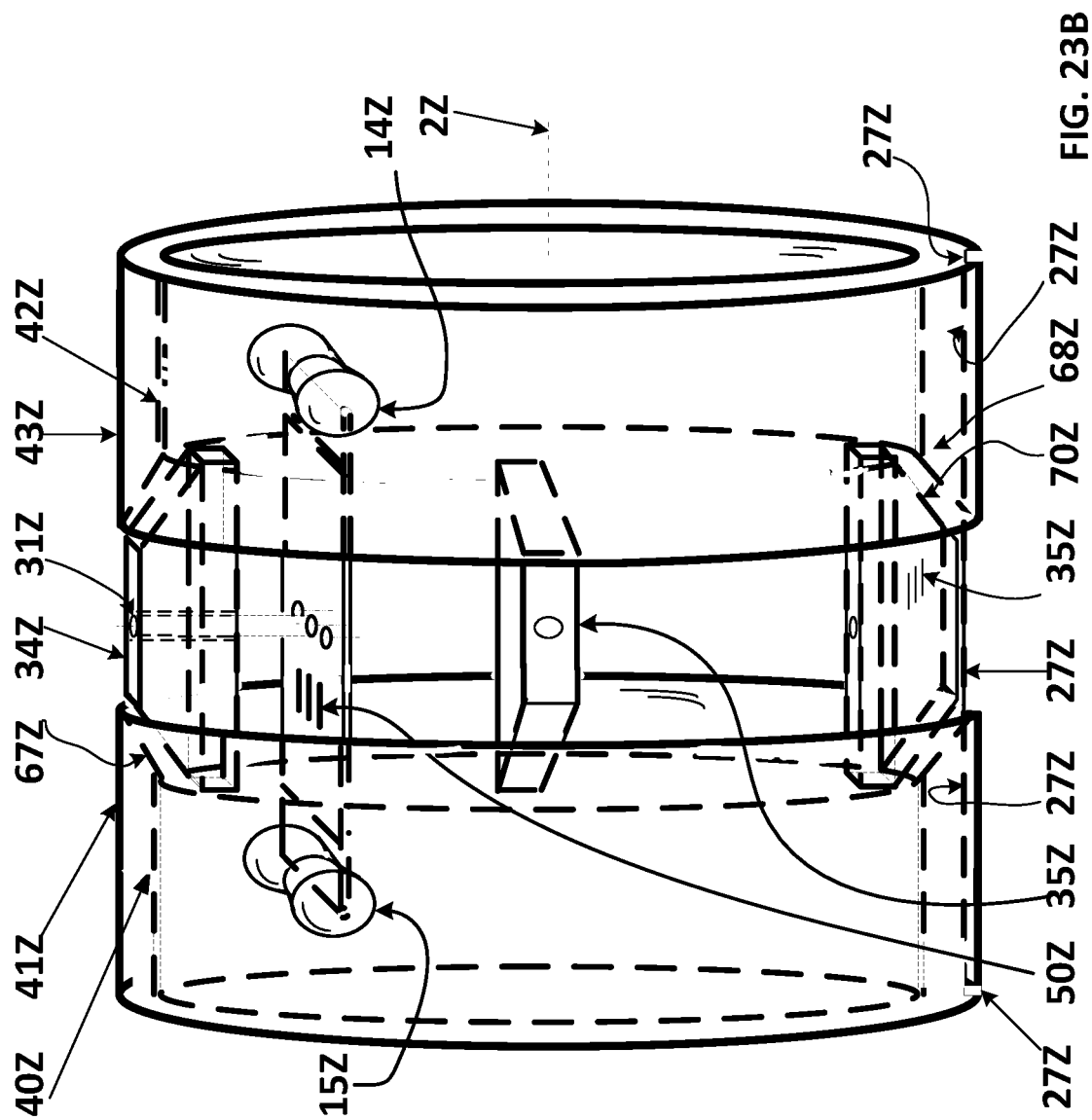

FIG. 23B shows an isometric side view of a layout of a preferred embodiment of the mobile apparatus' clamping mechanism module shown in FIG. 23A showing the keyway and the two right cylindrical traveling pressure blocks and the driven traveling blocks and the threaded shank fastener and their trolley.

FIG. 24 shows an isometric side view layout of a preferred embodiment of the mobile apparatus' clamping mechanism module showing the keyway and the two right cylindrical traveling pressure blocks.

Figure 25:
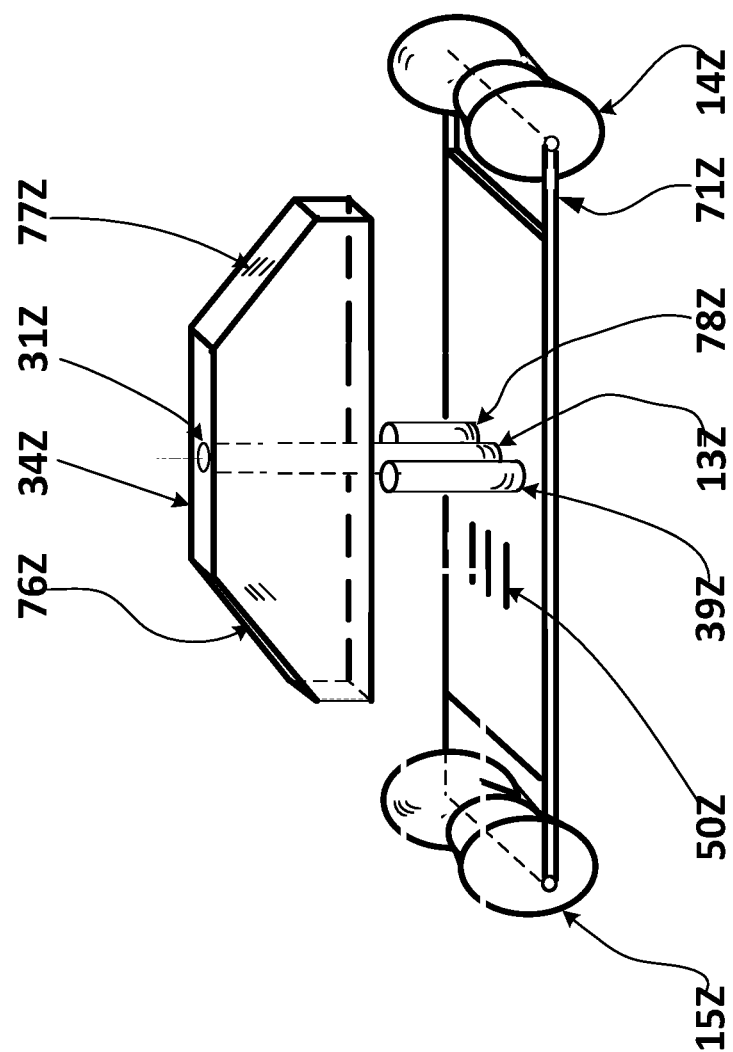

FIG. 25 shows an isometric side view layout of a preferred embodiment of the mobile apparatus' clamping mechanism module showing one of four driven traveling blocks, and a threaded shank, and two tension springs, and their trolley.

FIG. 26A shows a side view section of a layout of a preferred embodiment of the mobile apparatus' clamping mechanism module showing the exterior mobile apparatus' extension enclosure.

FIG. 26B shows a front center section view of the layout of a preferred embodiment of the mobile apparatus' clamping mechanism module in FIG. 26A showing the interior right cylinder.

Figure 27:
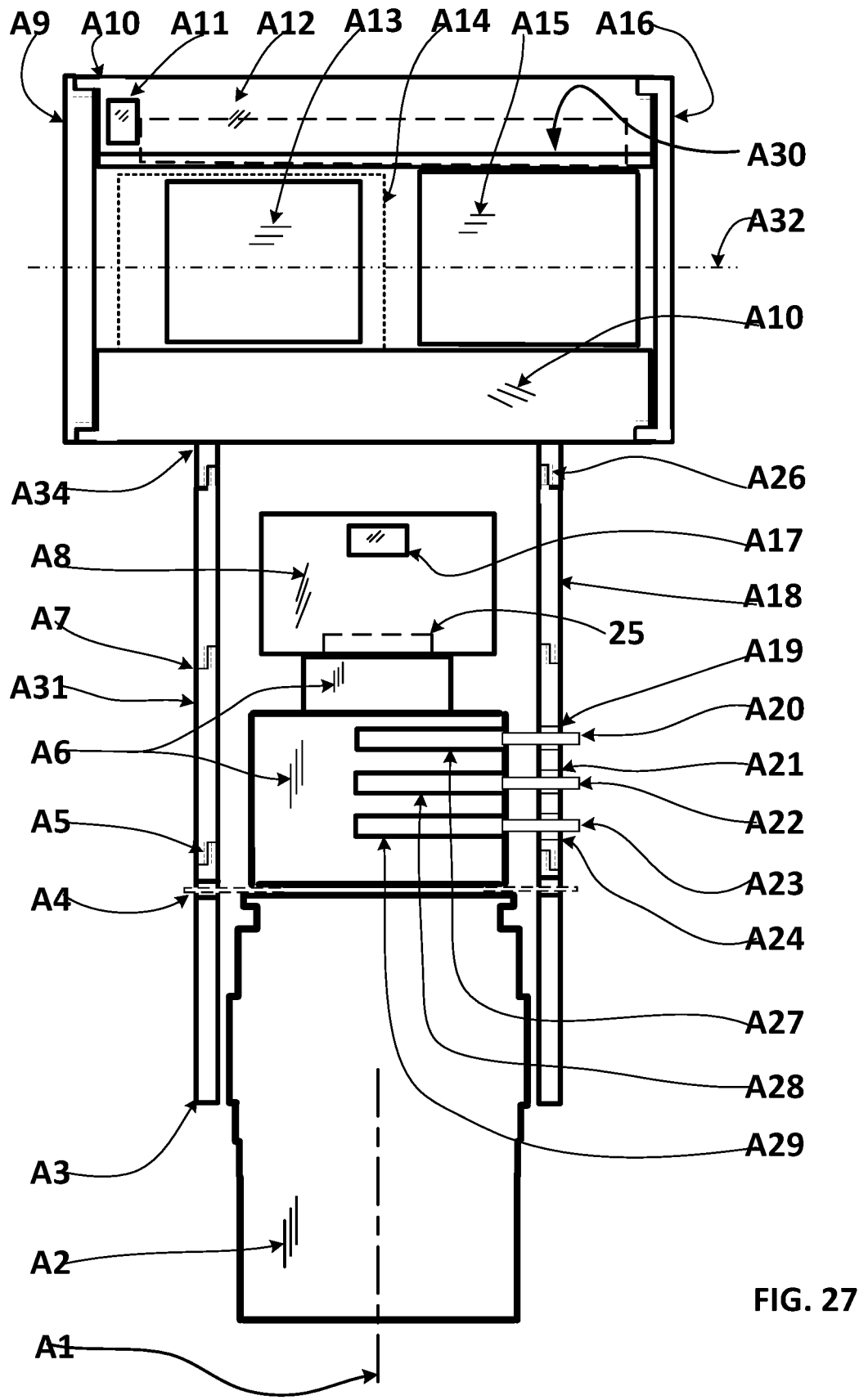

FIG. 27 shows a side view center section of a layout of a preferred embodiment of a mobile apparatus, wherein the mobile apparatus is configured for use for optical image sources referred to in FIG. 1.

Figure 28:
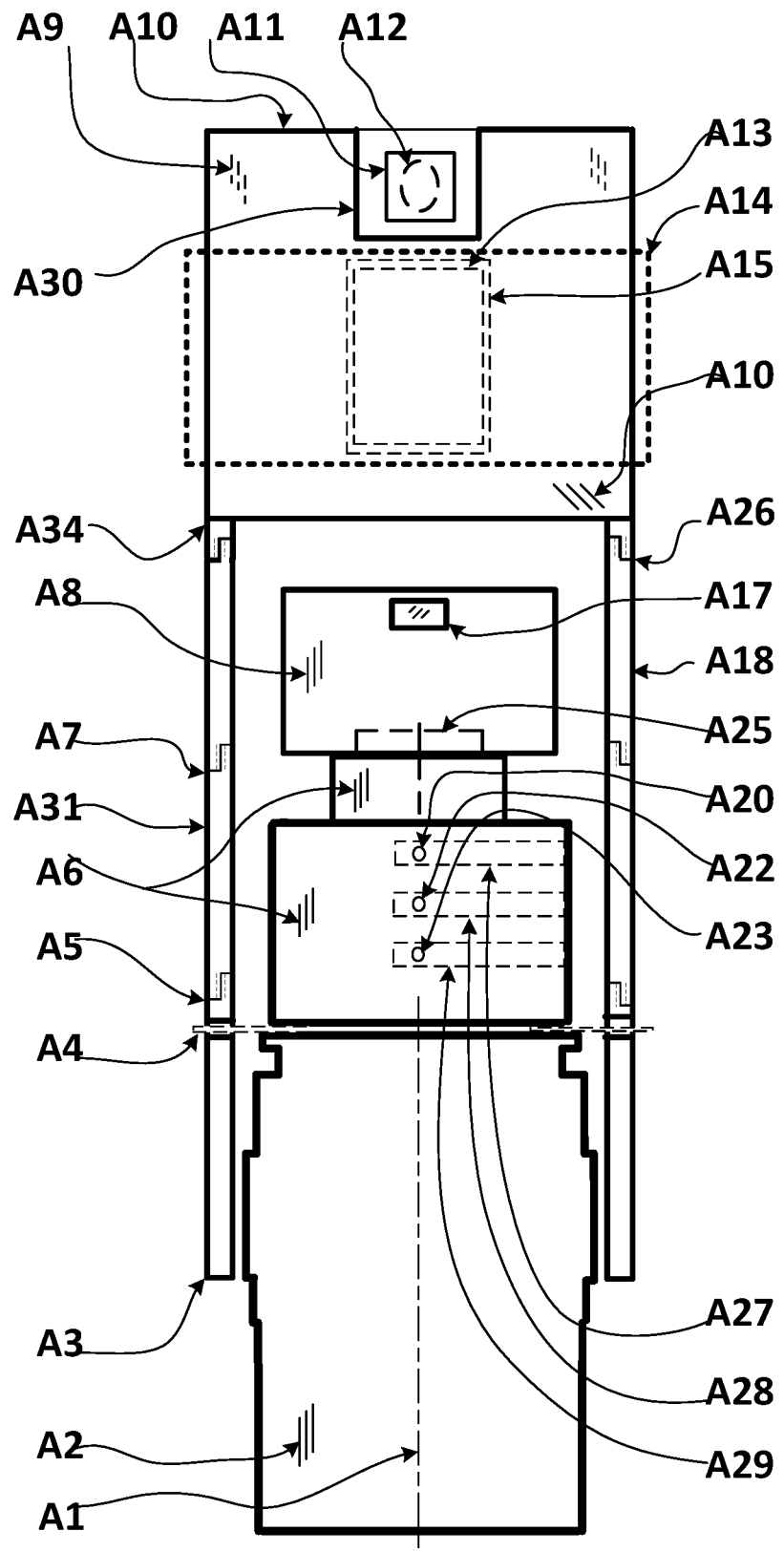

FIG. 28 shows a front view center section of the preferred embodiment FIG. 27 of the mobile apparatus showing one antenna mounted on a swivel, and deployed externally in a groove in the enclosure of the mobile apparatus, wherein the mobile apparatus is configured for use for optical image sources referred to in FIG. 1.

Figure 29:
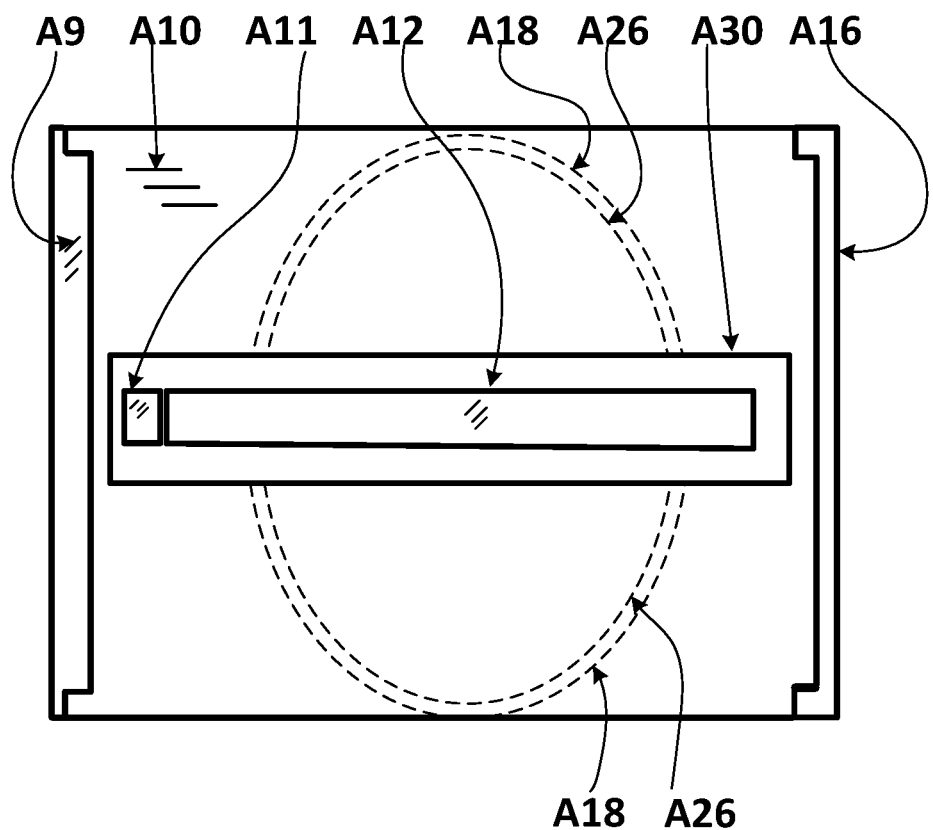

FIG. 29 shows a top view of the preferred embodiment FIG. 27 of the mobile apparatus showing one antenna mounted on a swivel, and deployed externally in a groove in the enclosure of the mobile apparatus, wherein the mobile apparatus is configured for use for optical image sources referred to in FIG. 1.

Figure 30:
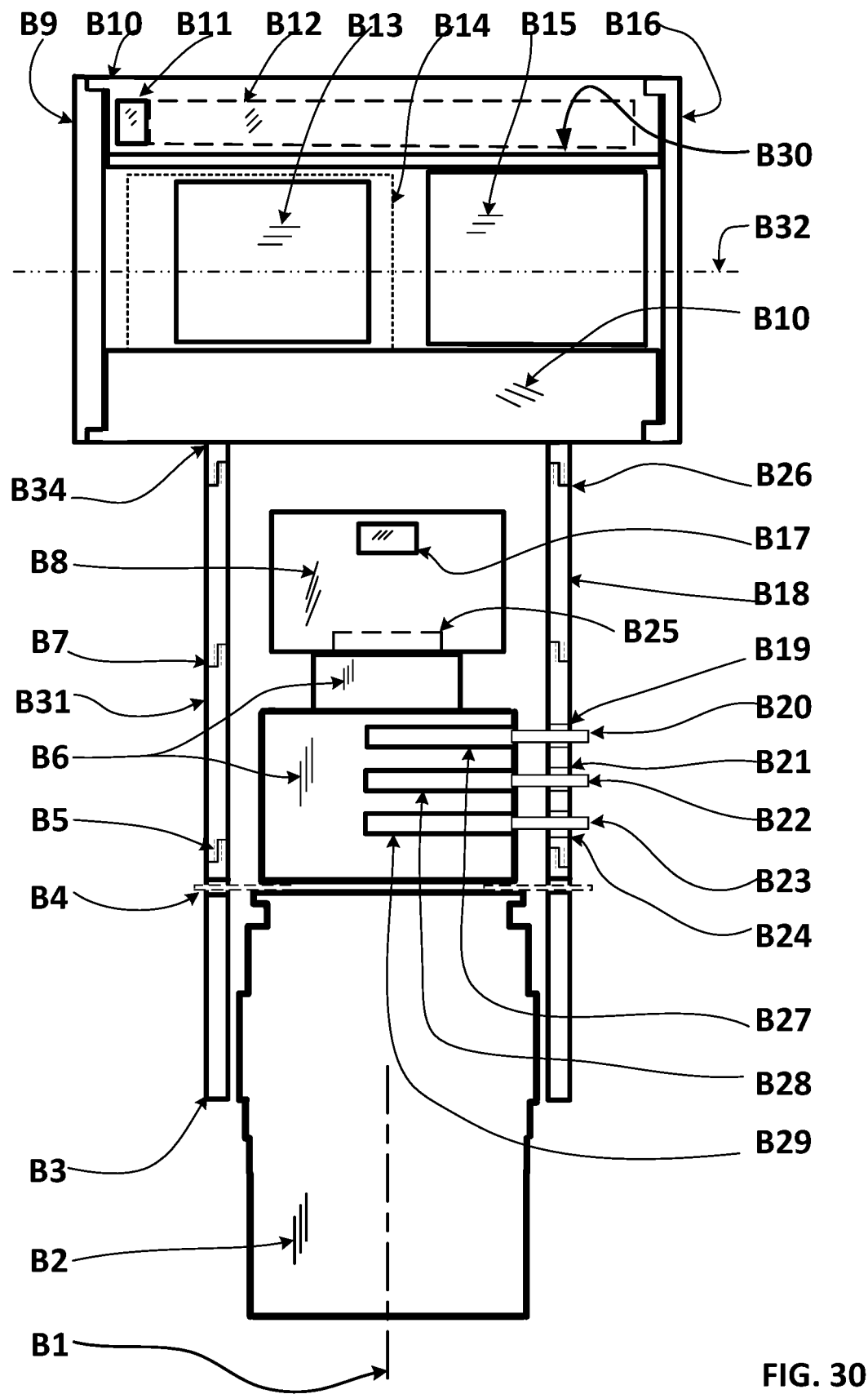

FIG. 30 shows a side view center section of a layout of a preferred embodiment of a mobile apparatus, wherein the mobile apparatus is configured for use for optical image sources referred to in FIG. 1.

Figure 31:
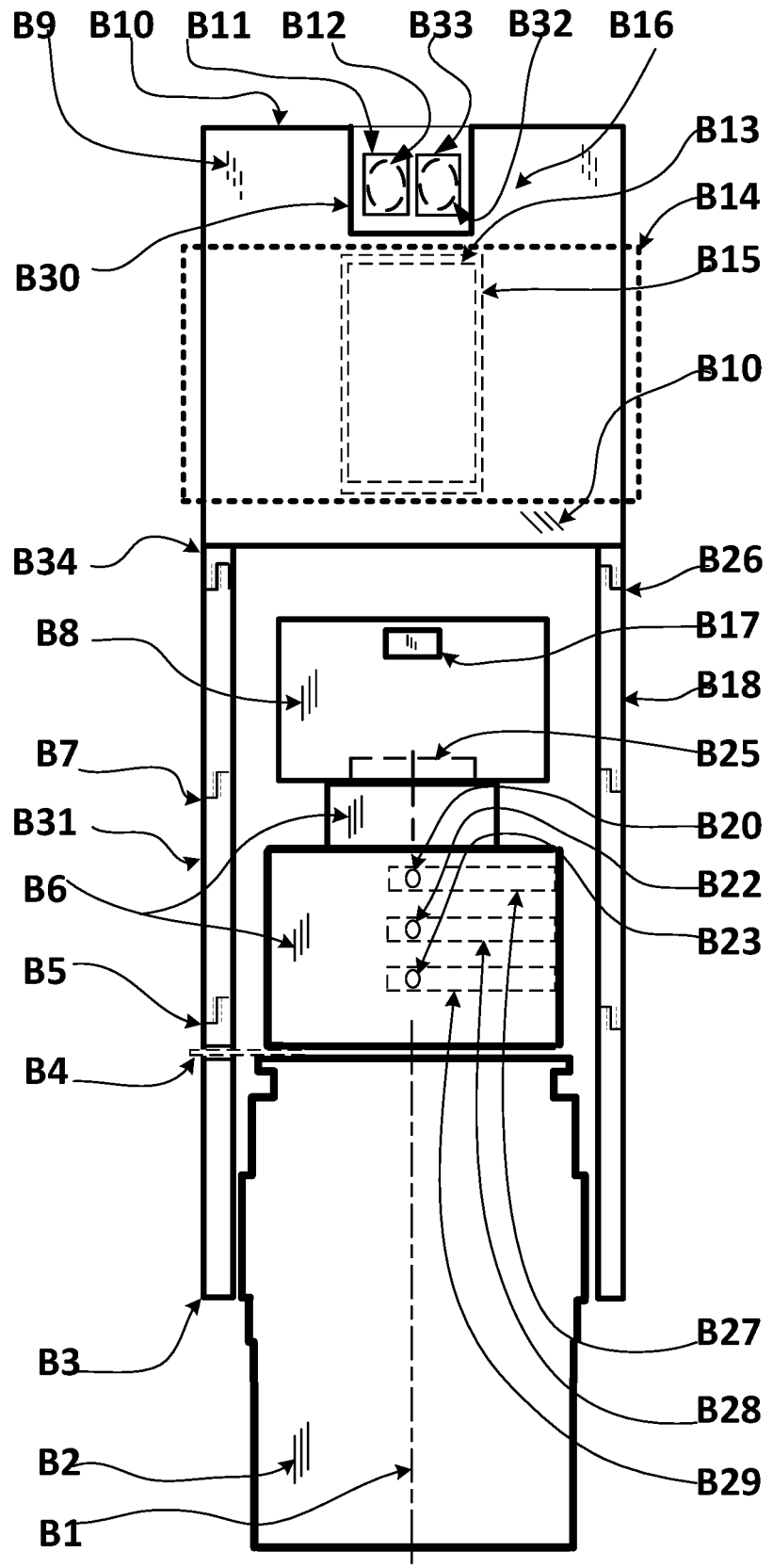

FIG. 31 shows a front view center section of the preferred embodiment FIG. 30 of the mobile apparatus showing two antennas, each one mounted on its respective swivel, both deployed externally in a common groove in the enclosure of the mobile apparatus, wherein the mobile apparatus is configured for use for optical image sources referred to in FIG. 1.

Figure 32:
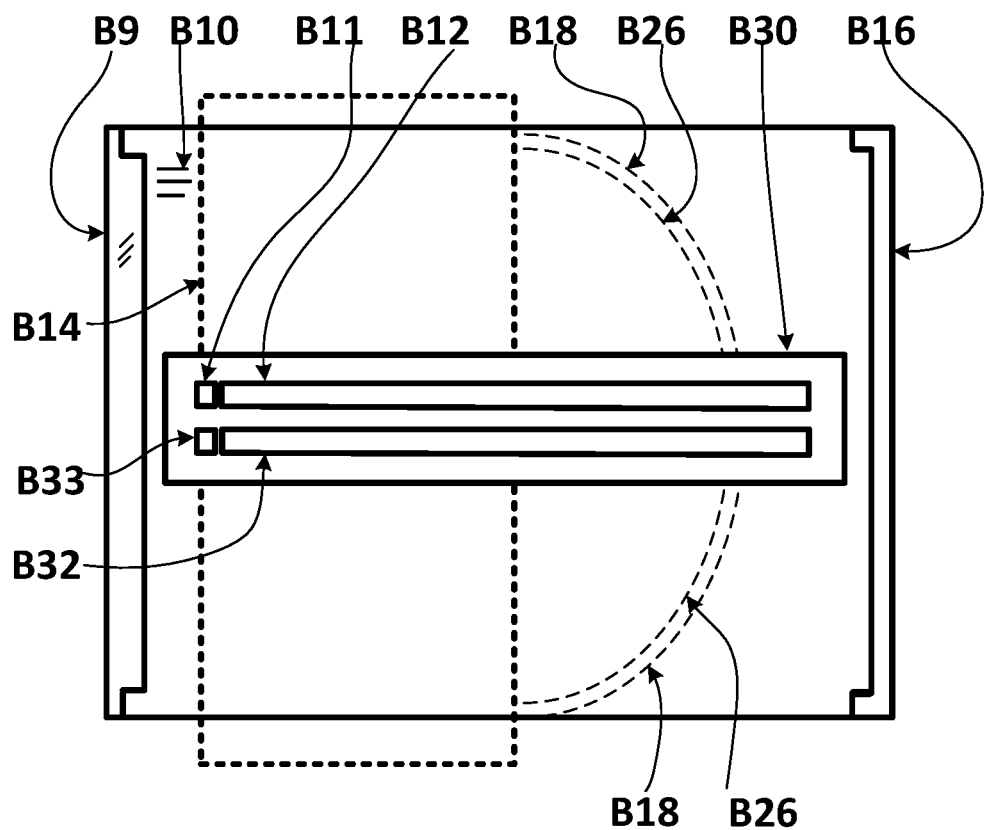

FIG. 32 shows a top view of the preferred embodiment FIG. 30 of the mobile apparatus showing two antennas, each one mounted on its respective swivel, wherein both antennas are deployed externally in a common groove, wherein the swivels are located at the same end of the groove, wherein the mobile apparatus is configured for use for optical image sources referred to in FIG. 1.

Figure 33:
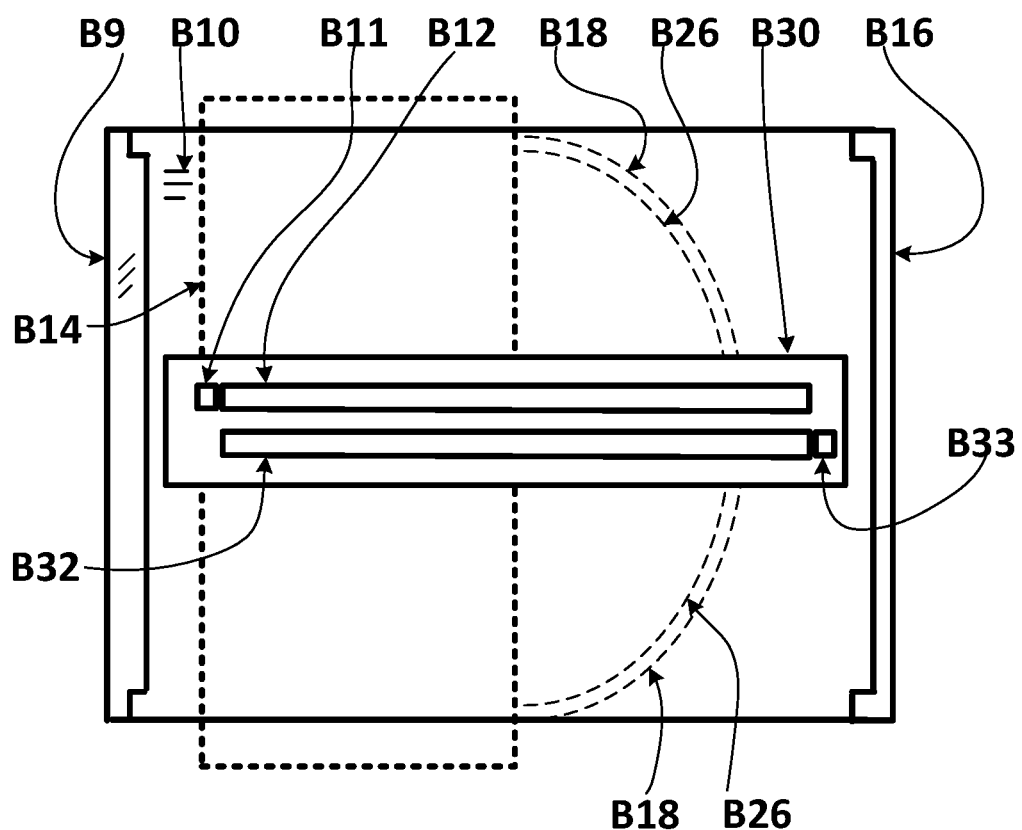

FIG. 33 shows a top view of the preferred embodiment FIG. 30 of the mobile apparatus showing two antennas, each one mounted on its respective swivel, wherein both antennas are deployed externally in a common groove, wherein the swivels are at opposite ends of the groove, wherein the mobile apparatus is configured for use for optical image sources referred to in FIG. 1.

Figure 34:
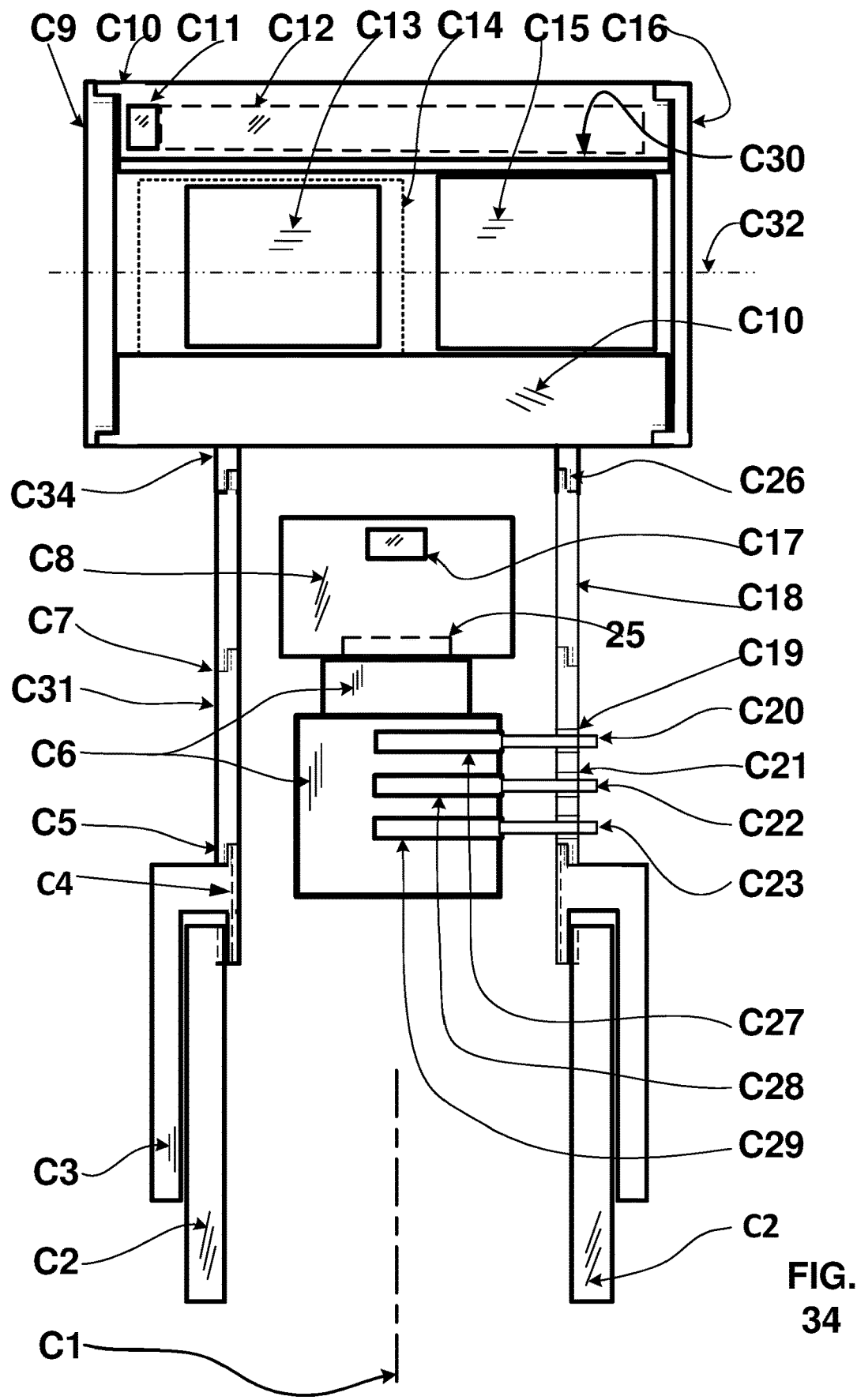

FIG. 34 shows a side view center section of a layout of a preferred embodiment of a mobile apparatus, wherein the mobile apparatus is configured for use for optical image sources referred to in FIG. 2.

Figure 35:
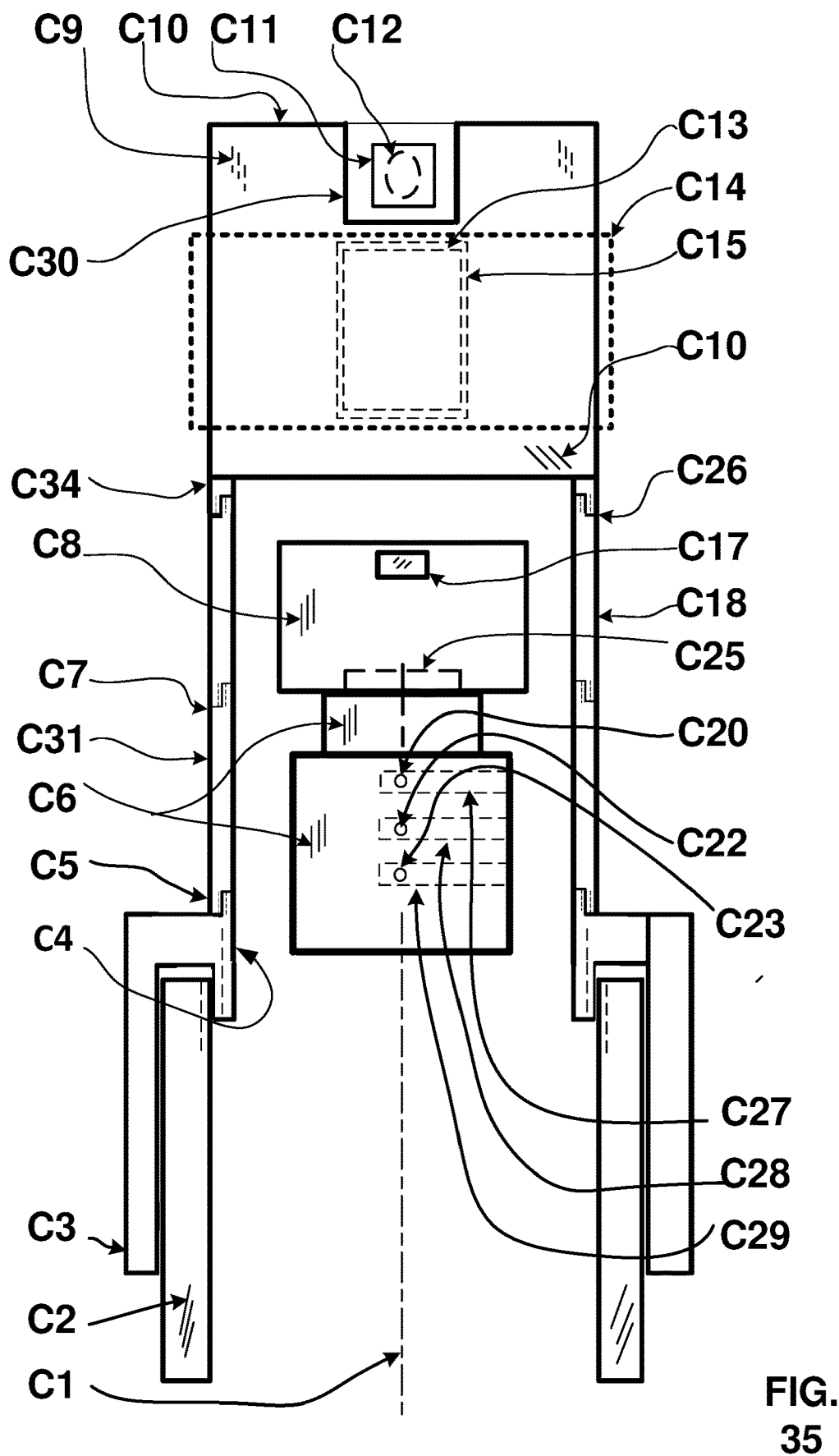

FIG. 35 shows a front view center section of the preferred embodiment FIG. 27 of the mobile apparatus showing one antenna mounted on a swivel, and deployed externally in a groove in the enclosure of the mobile apparatus, wherein the mobile apparatus is configured for use for optical image sources referred to in FIG. 2.

Figure 36:
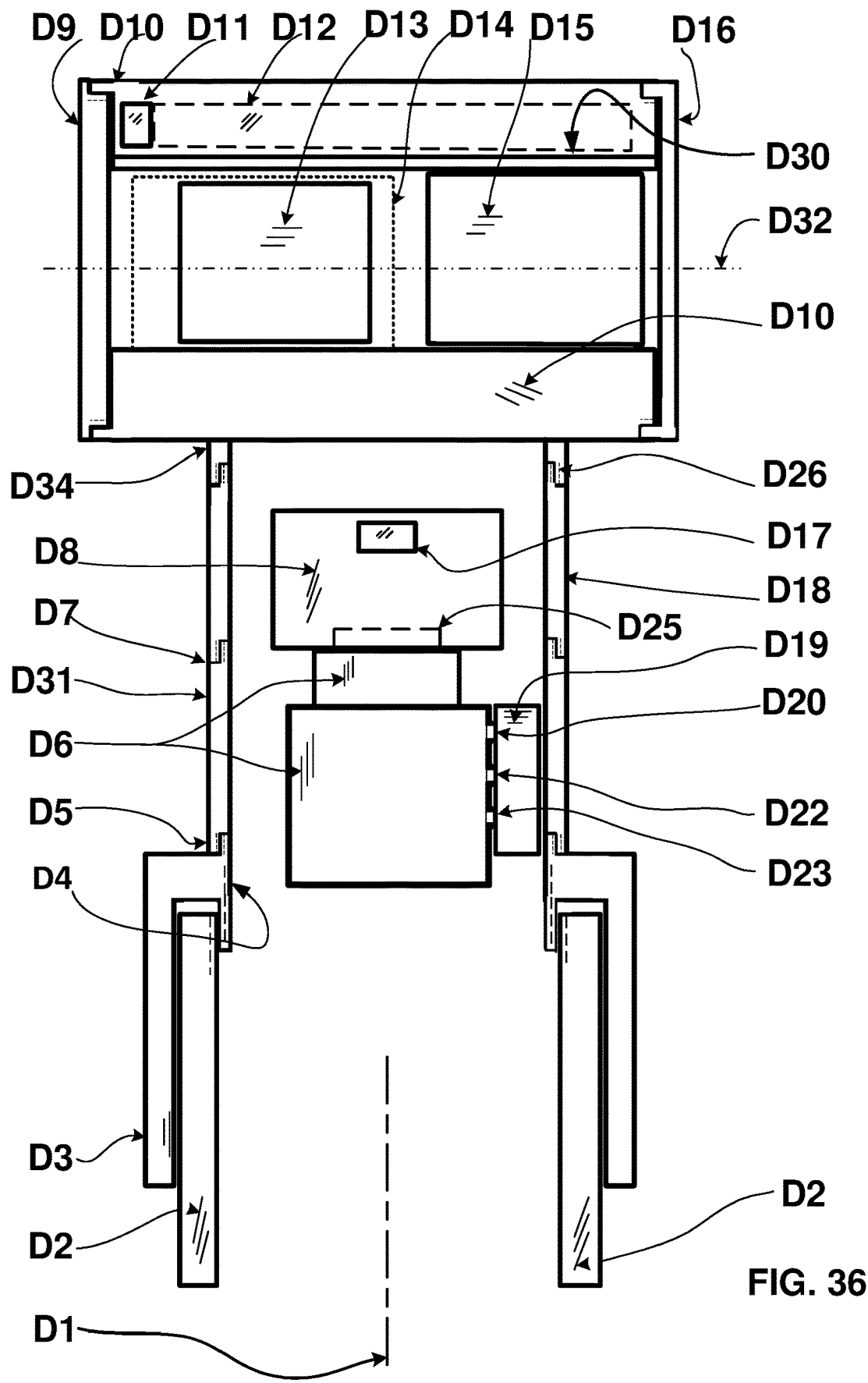

FIG. 36 shows a side view of the preferred embodiment FIG. 27 of the mobile apparatus showing one antenna mounted on a swivel, and deployed externally in a groove in the enclosure of the mobile apparatus, wherein the mobile apparatus is configured for use for optical image sources referred to in FIG. 2.

Figure 37:
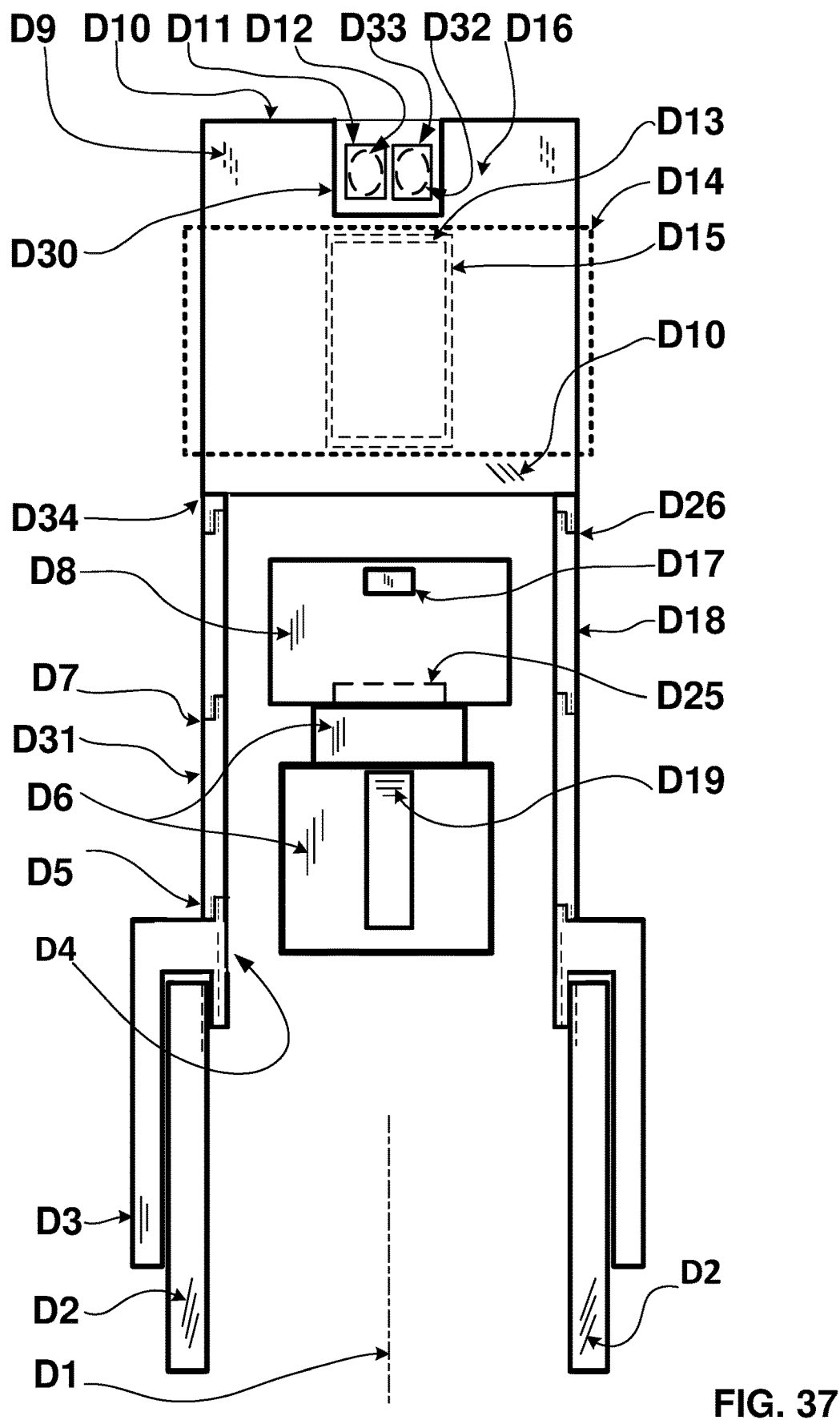

FIG. 37 shows a front view center section of a layout of a preferred embodiment of a mobile apparatus, wherein the mobile apparatus is configured for use for optical image sources referred to in FIG. 2.

Figure 38:
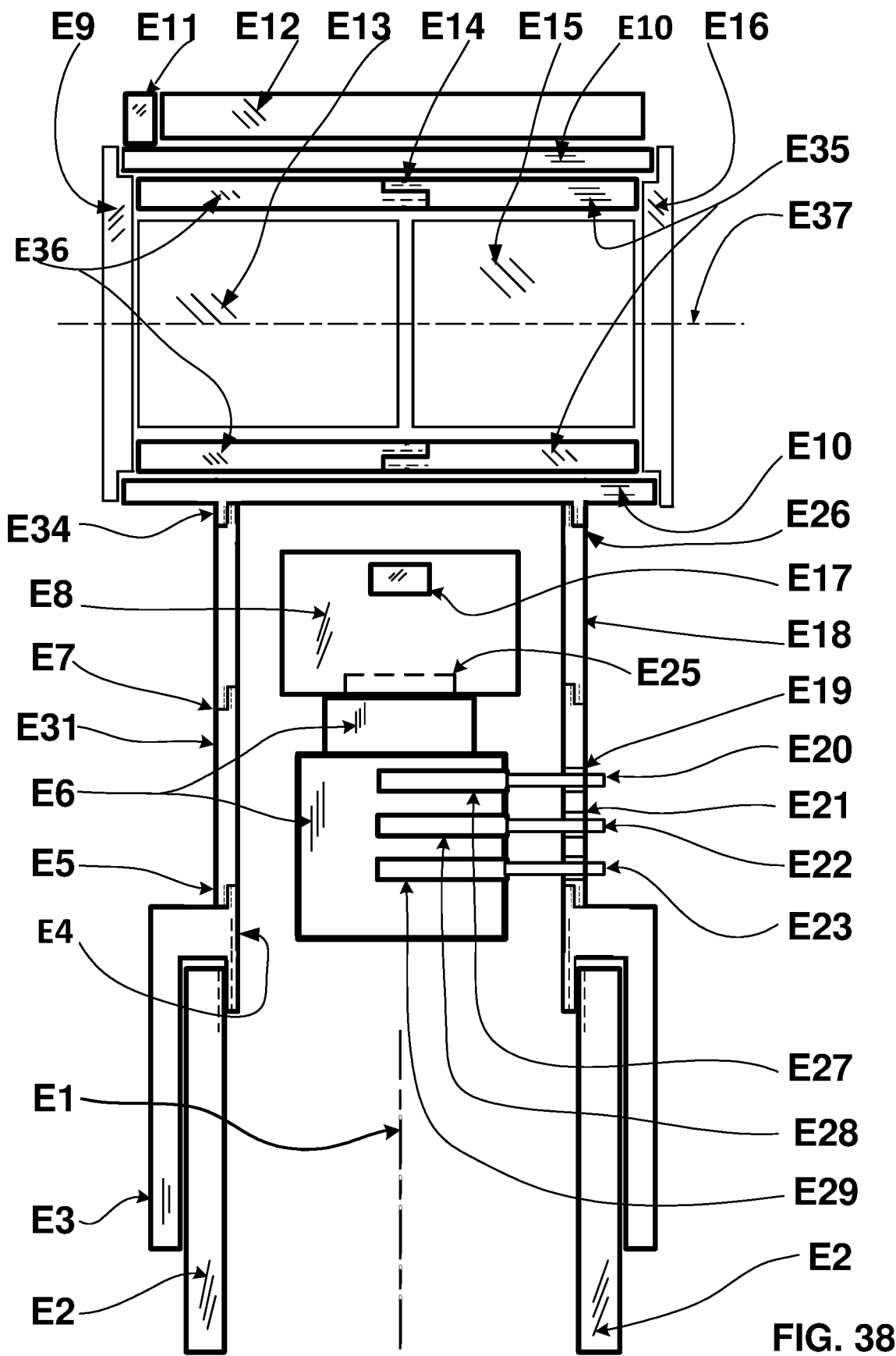

FIG. 38 shows a side view center section of the preferred embodiment FIG. 30 of the mobile apparatus showing two antennas, each one mounted on its respective swivel, both deployed externally in a common groove in the enclosure of the mobile apparatus, wherein the mobile apparatus is configured for use for optical image sources referred to in FIG. 2.

Figure 39:
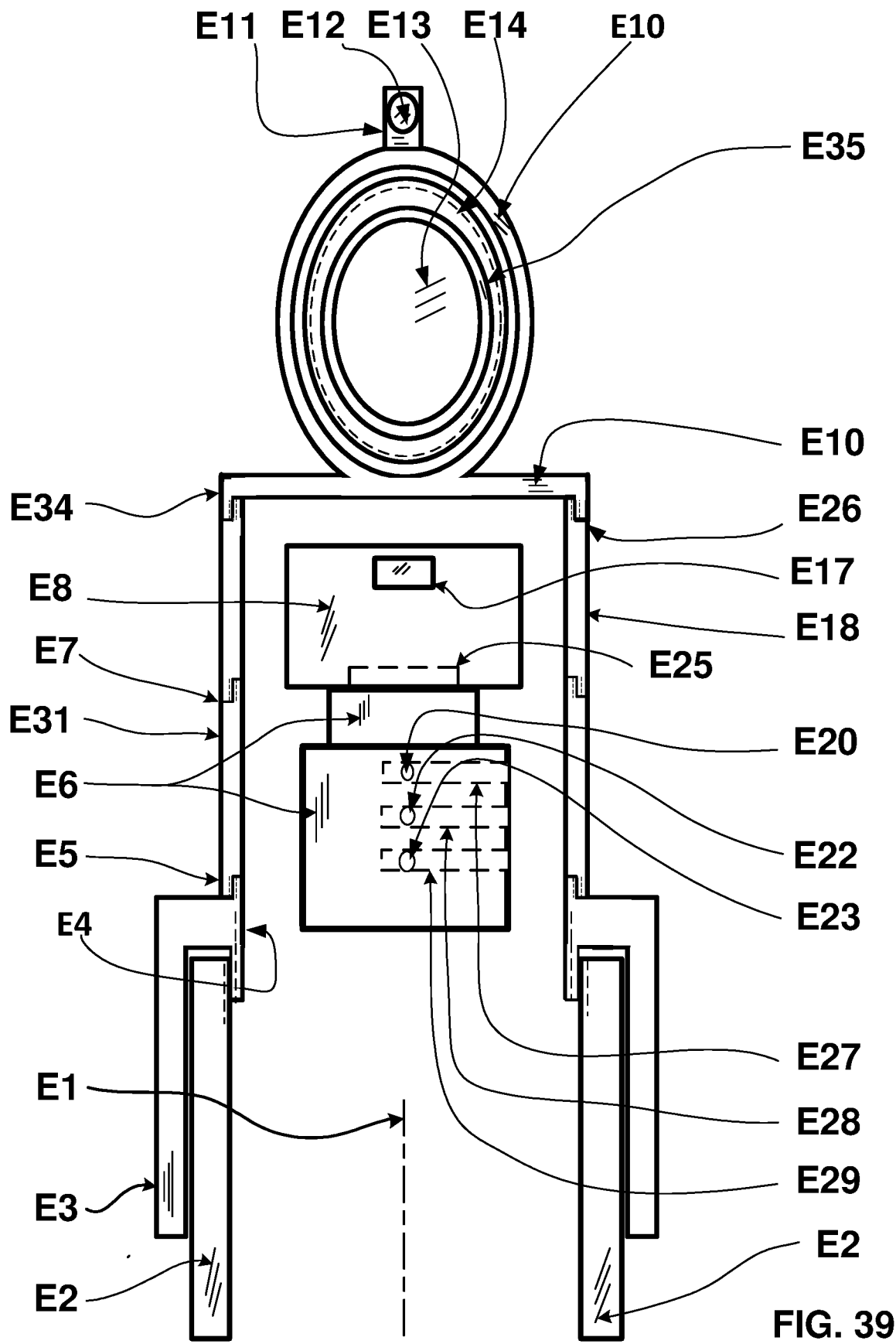

FIG. 39 shows a front view of the preferred embodiment FIG. 30 of the mobile apparatus showing two antennas, each one mounted on its respective swivel, wherein both antennas are deployed externally in a common groove, wherein the swivels are located at the same end of the groove, wherein the mobile apparatus is configured for use for optical image sources referred to in FIG. 2.

Figure 40:
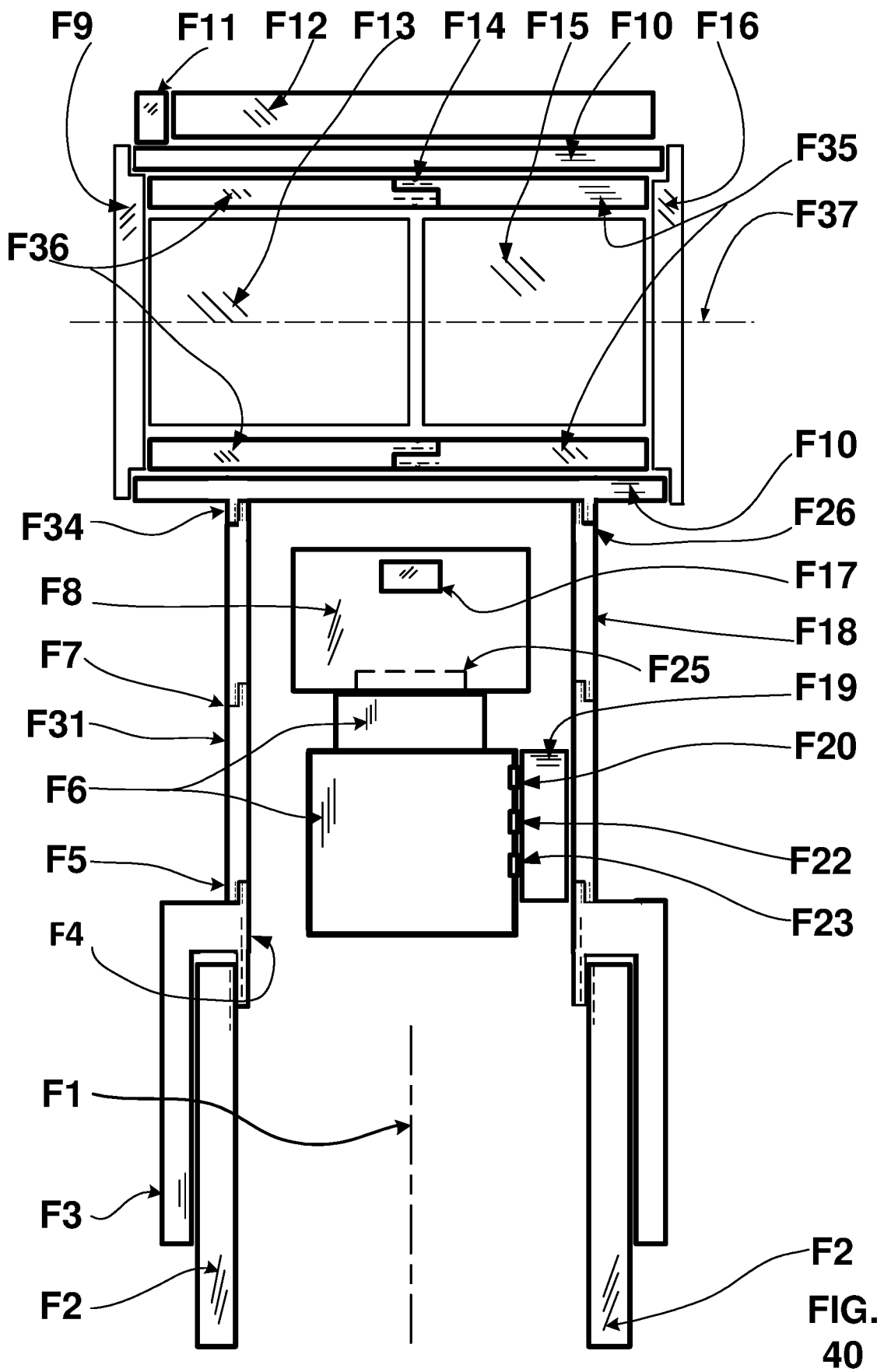

FIG. 40 shows a side view center section of a layout of a preferred embodiment of a mobile apparatus, showing one antenna, mounted on its respective swivel, deployed externally on the outside of the enclosure of the mobile apparatus, and showing the clamping mechanism module of the mobile apparatus, and showing an electro-mechanical actuator operated zoom lens.

Figure 41:
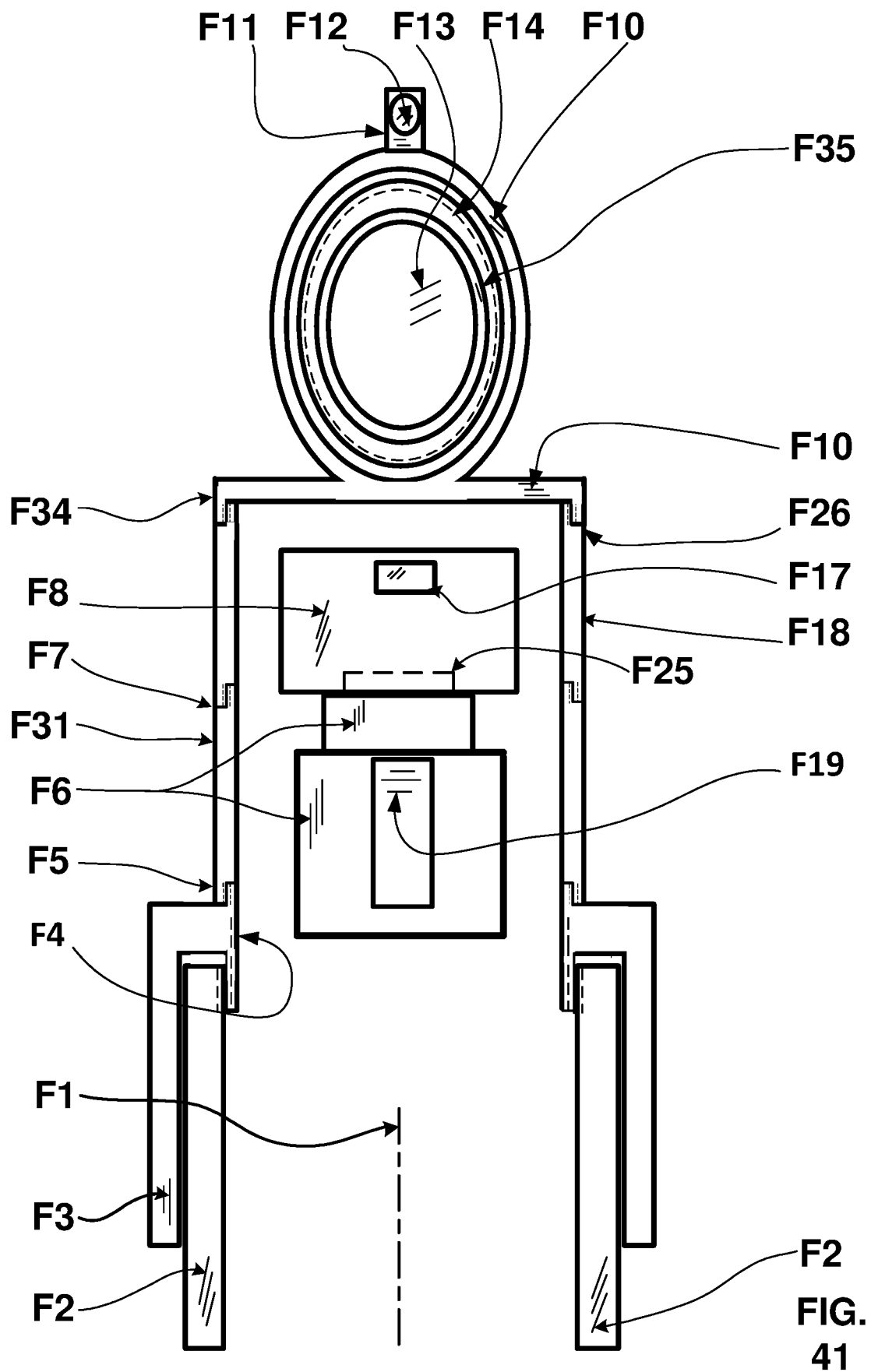

FIG. 41 shows an front view center section of the preferred embodiment FIG. 40 of the mobile apparatus showing one antenna, mounted on its respective swivel, deployed externally on the outside of the enclosure of the mobile apparatus, and showing the clamping mechanism module of the mobile apparatus, and showing an electro-mechanical actuator operated zoom lens.

Figure 42:
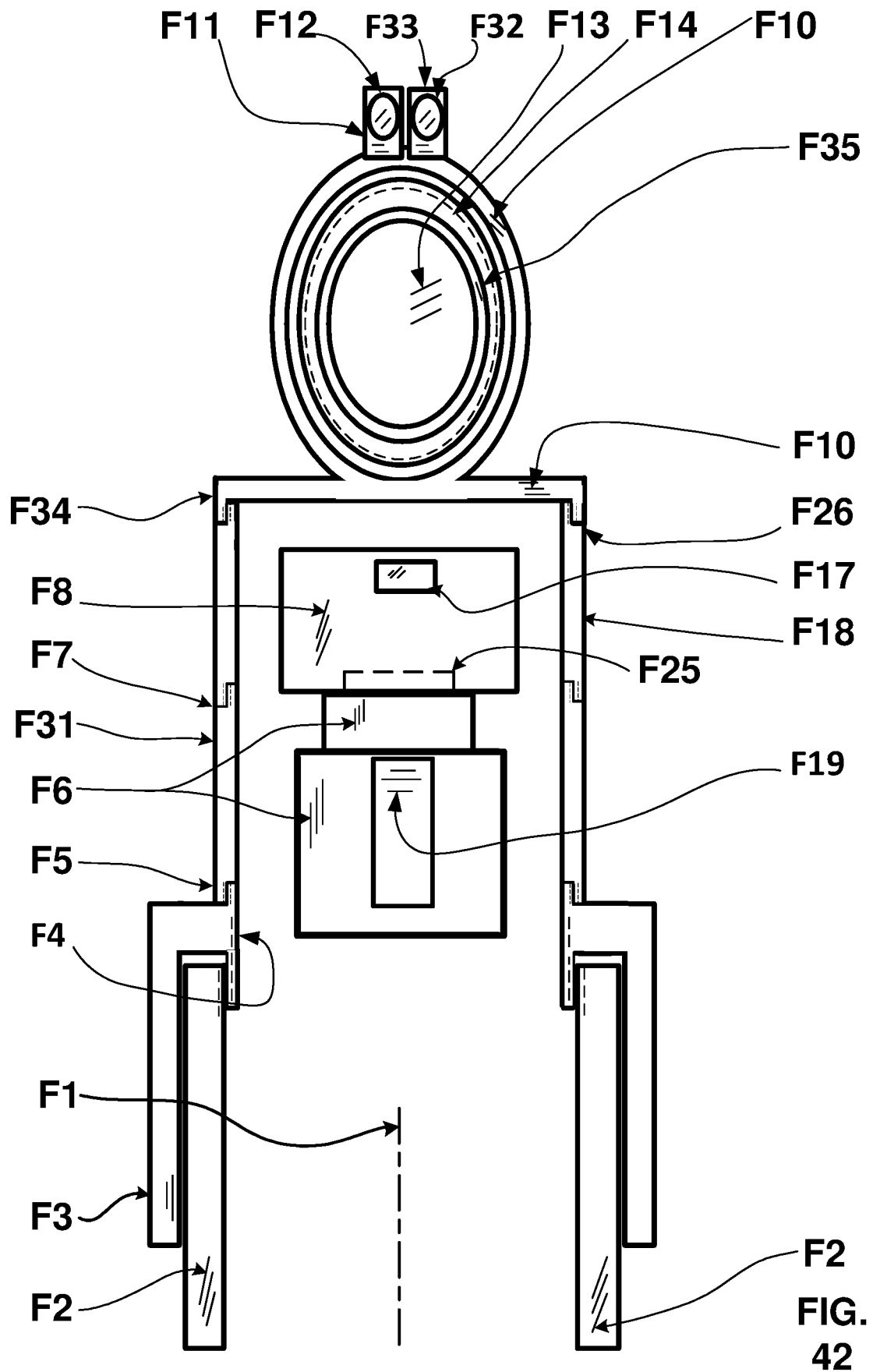

FIG. 42 shows an front view center section of the preferred embodiment FIG. 40 of the mobile apparatus showing two antennas, mounted on their respective swivels, deployed externally on the outside of the enclosure of the mobile apparatus, and showing the clamping mechanism module of the mobile apparatus, and showing an electro-mechanical actuator operated zoom lens.

Figure 43B:
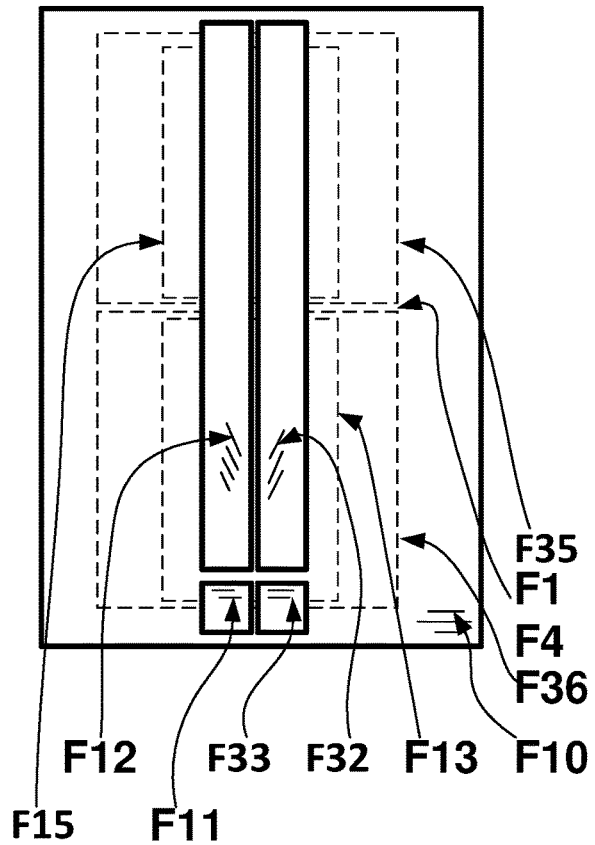
Figure 43A:
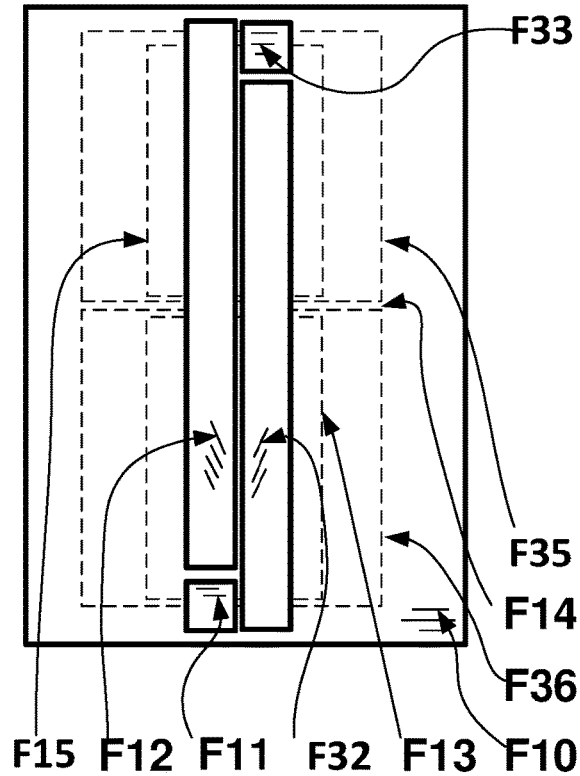

FIG. 43A shows a top view of the preferred embodiment FIG. 40 of the mobile apparatus showing two antennas, mounted on their respective swivels, deployed externally on the outside of the enclosure of the mobile apparatus, where their swivels are side by side.

FIG. 43B shows a top view of the preferred embodiment FIG. 40 of the mobile apparatus showing two antennas, mounted on their respective swivels, deployed externally on the outside of the enclosure of the mobile apparatus, where their swivels are opposite one another.

Figure 44:
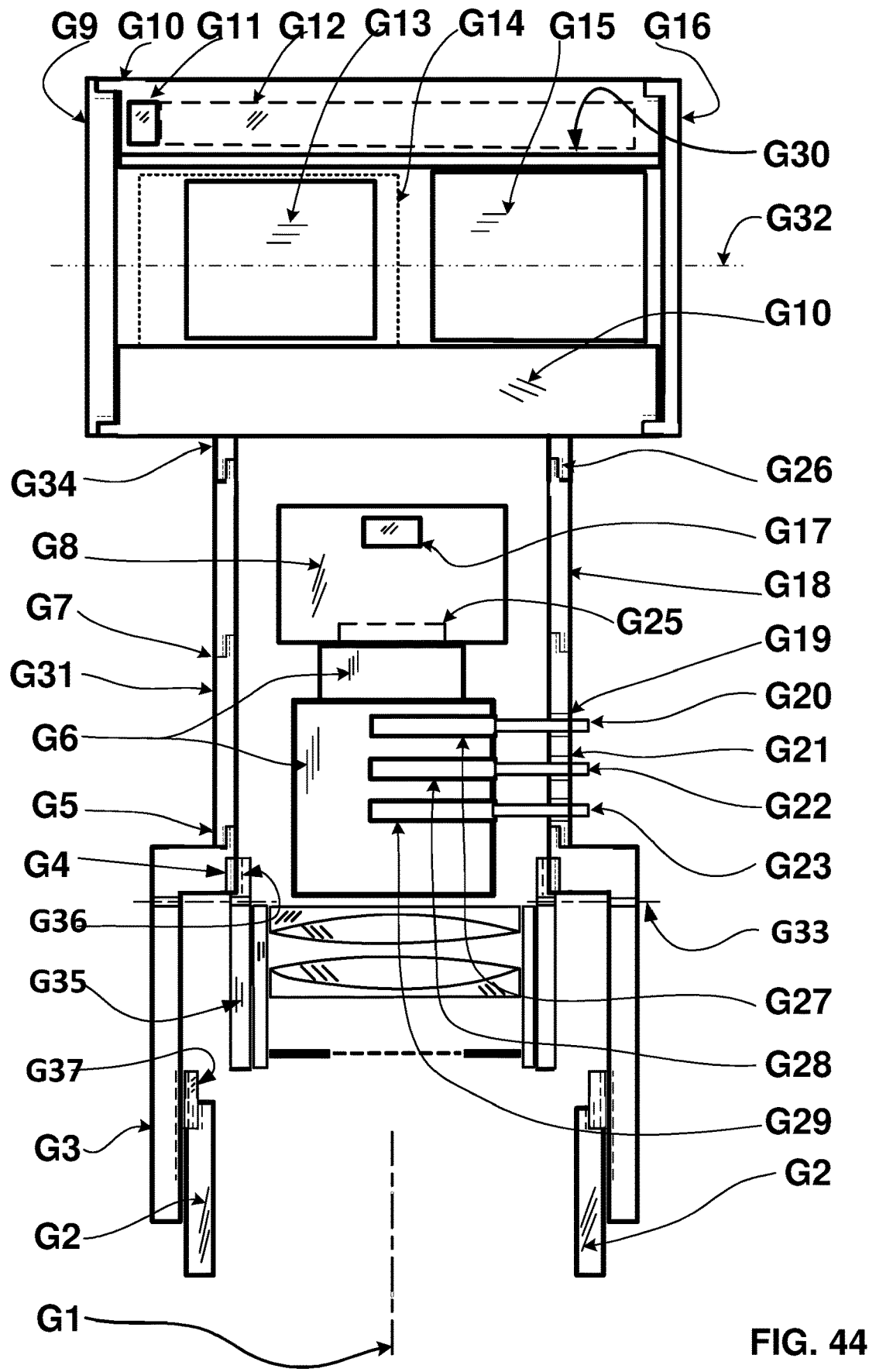

FIG. 44 shows a side view center section of a layout of a preferred embodiment of a mobile apparatus, and showing the clamping mechanism module of the mobile apparatus holding a precision clamping mechanism, wherein the mobile apparatus is configured for use for optical image sources referred to in FIG. 1 and FIG. 2.

Figure 45:
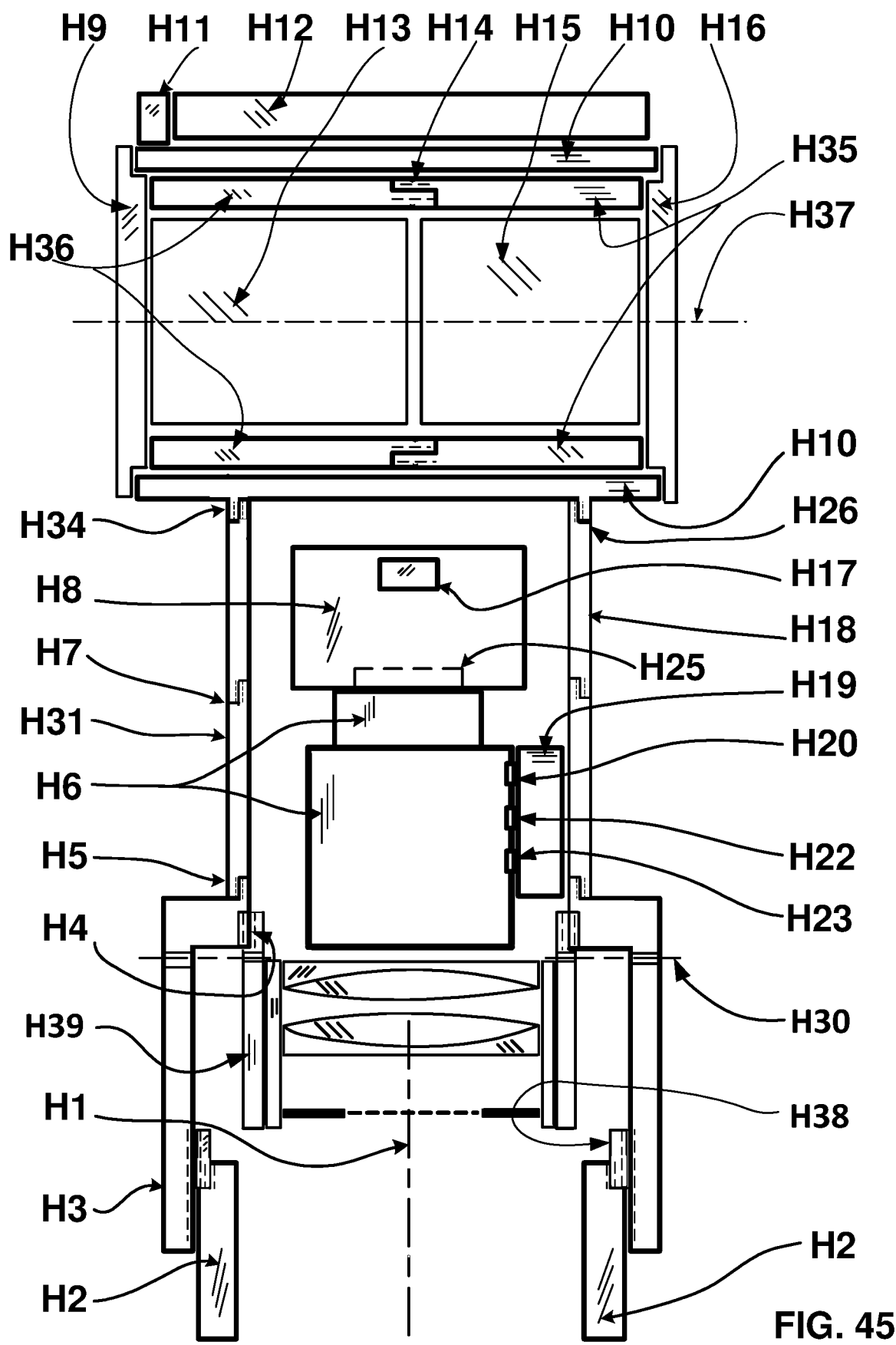

FIG. 45 shows a side view center section of a layout of a preferred embodiment of a mobile apparatus, and showing the clamping mechanism module of the mobile apparatus holding a precision clamping mechanism, wherein the mobile apparatus is configured for use for optical image sources referred to in FIG. 1 and FIG. 2.

Figure 46:
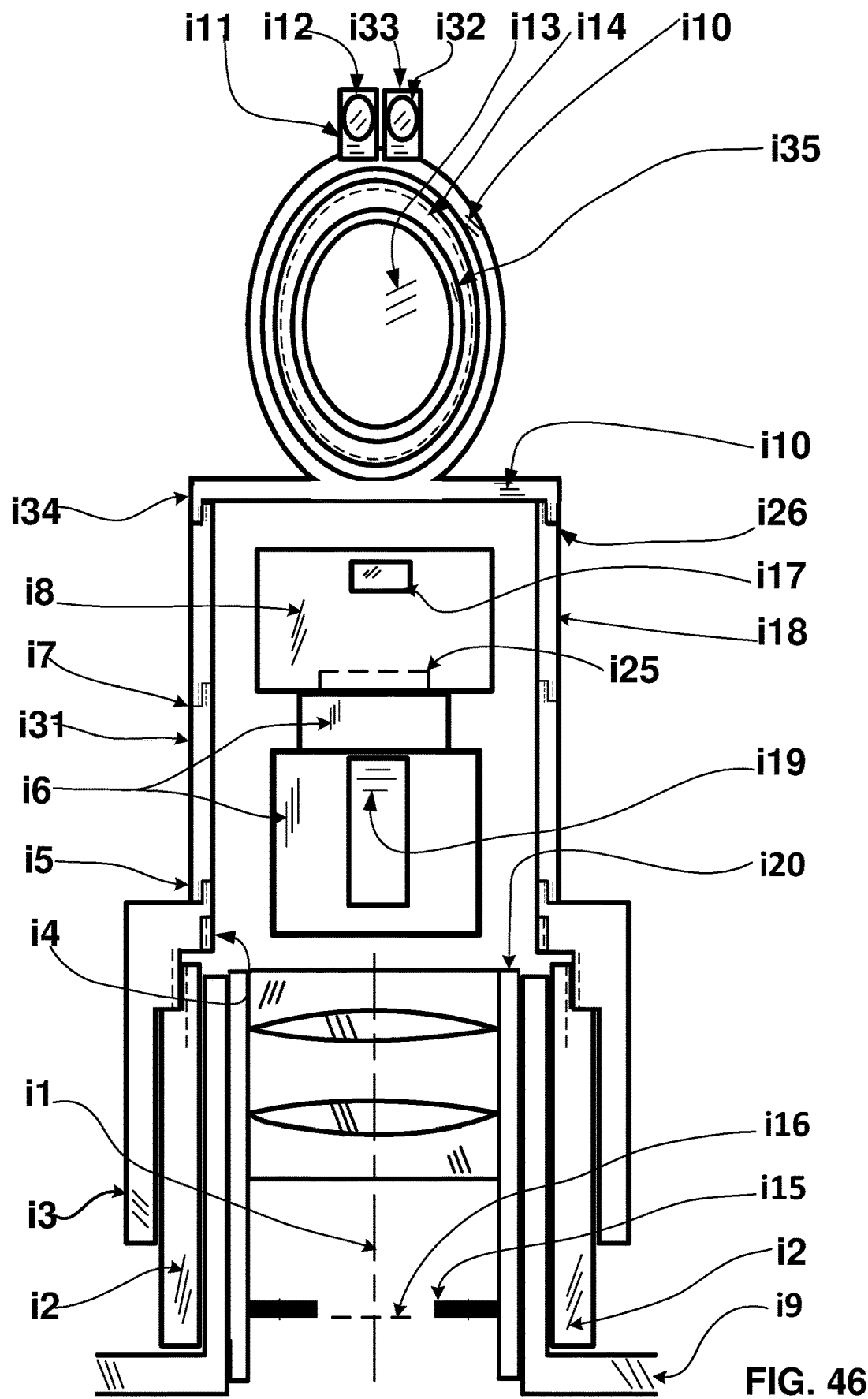

FIG. 46 shows an front view center section of the mobile apparatus configured with two antennas mounted on their respective swivels, deployed externally on the outside of the enclosure of the mobile apparatus, and showing the clamping mechanism module of the mobile apparatus, and showing an electro-mechanical actuator operated zoom lens.

Figure 1A:
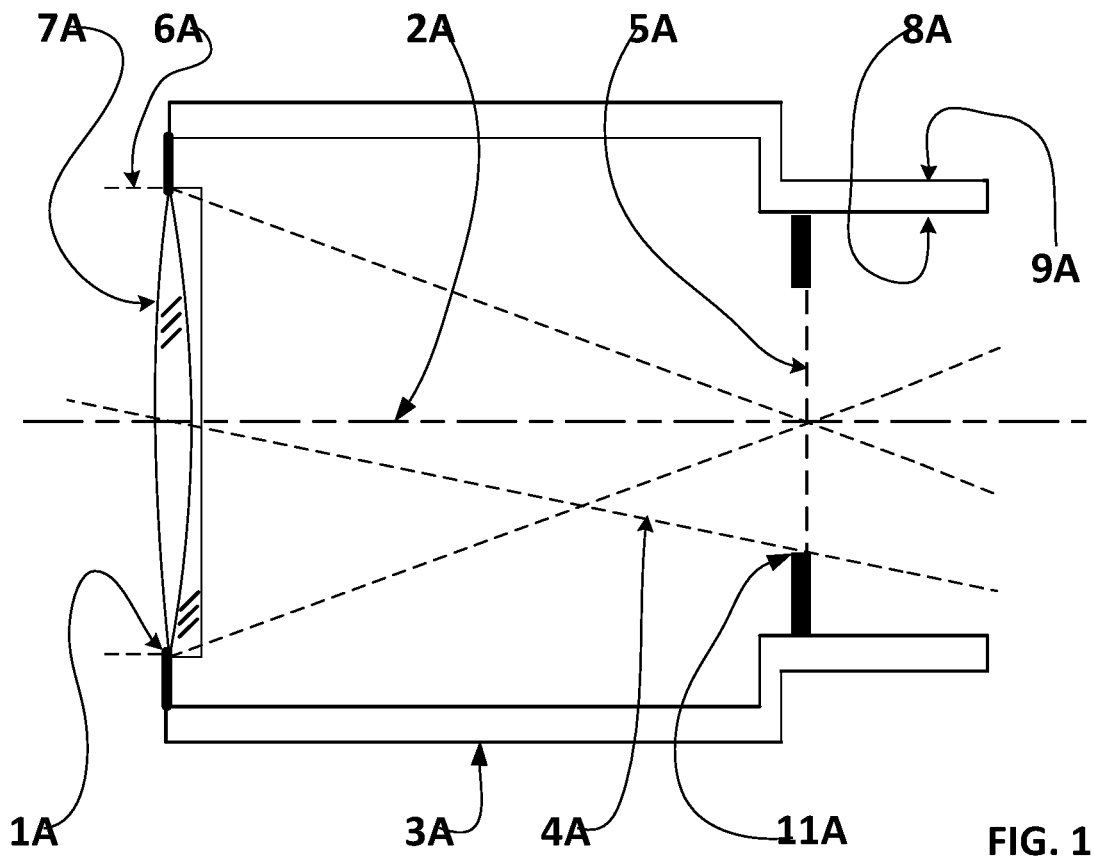
FIGS. 1A & 1B shows a side view section of the optical system schematic of a typical optical image source, where the optical image source does not have a original equipment eyepiece.
Figure 47:
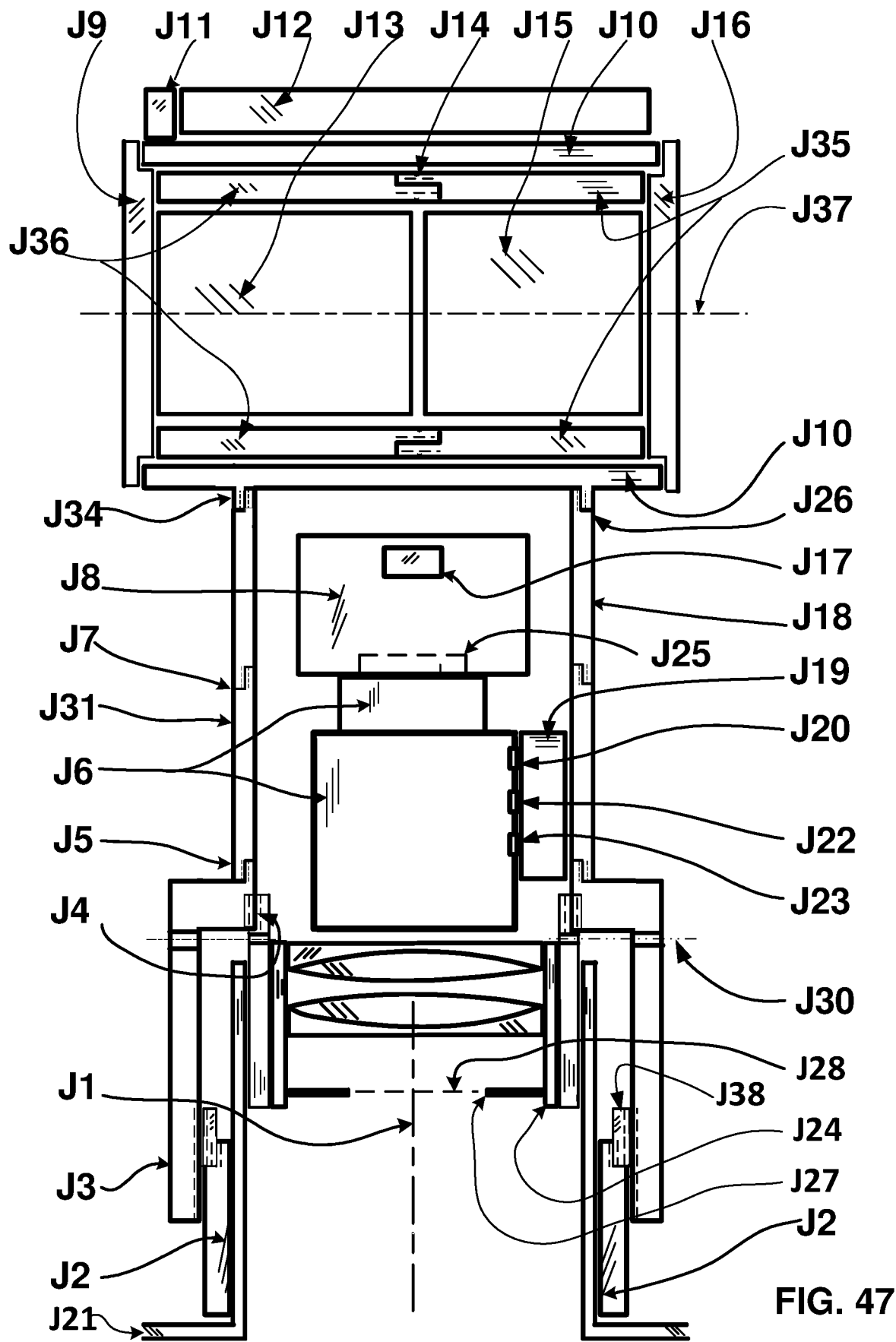

FIG. 47 shows a side view center section of the preferred embodiment of the mobile apparatus shown in FIG. 45 that is attached to the barrel of the optical image source referred to in FIG. 1A.

Figure 48:
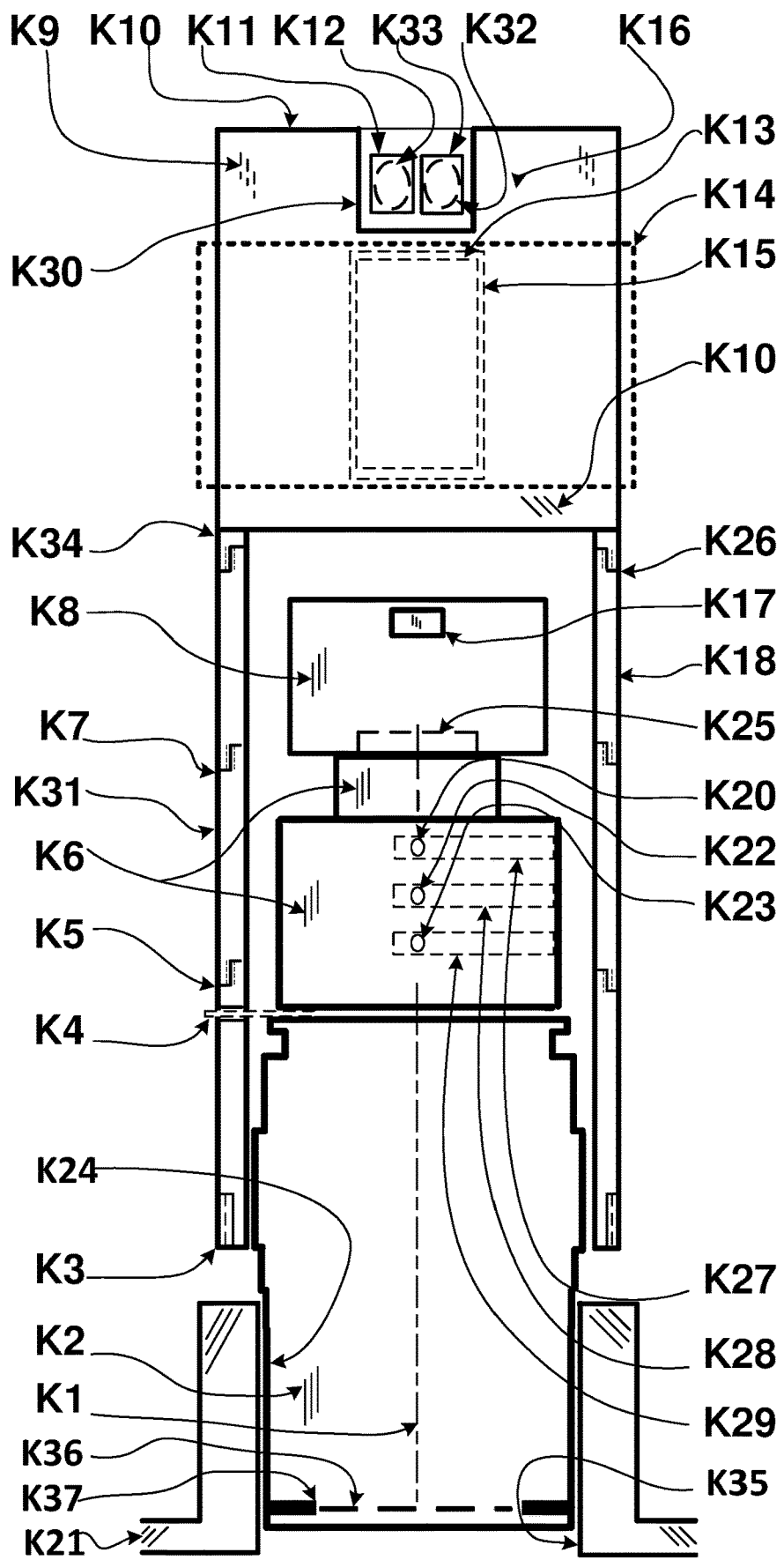

FIG. 48 shows a front view center section of the preferred embodiment of the mobile apparatus shown in FIG. 31 configured with a manually operated zoom lens, two antennas where each one is mounted on its respective swivel, both antennas deployed externally in a common groove in the enclosure of the mobile apparatus.

Figure 17B:
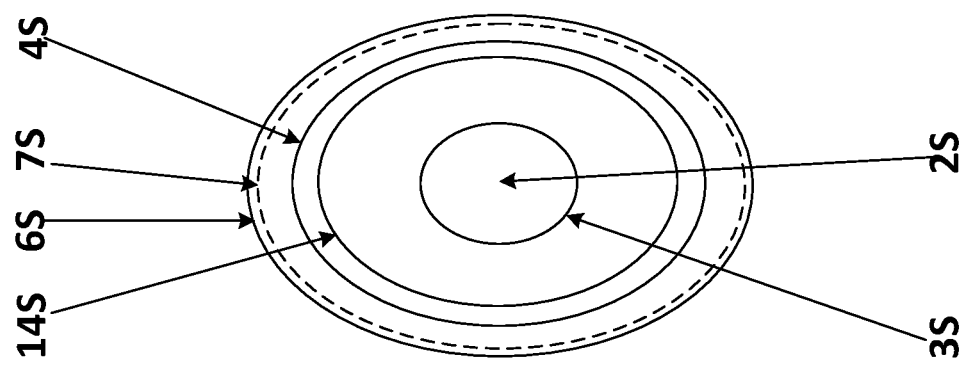
Figures 17E, 17F:
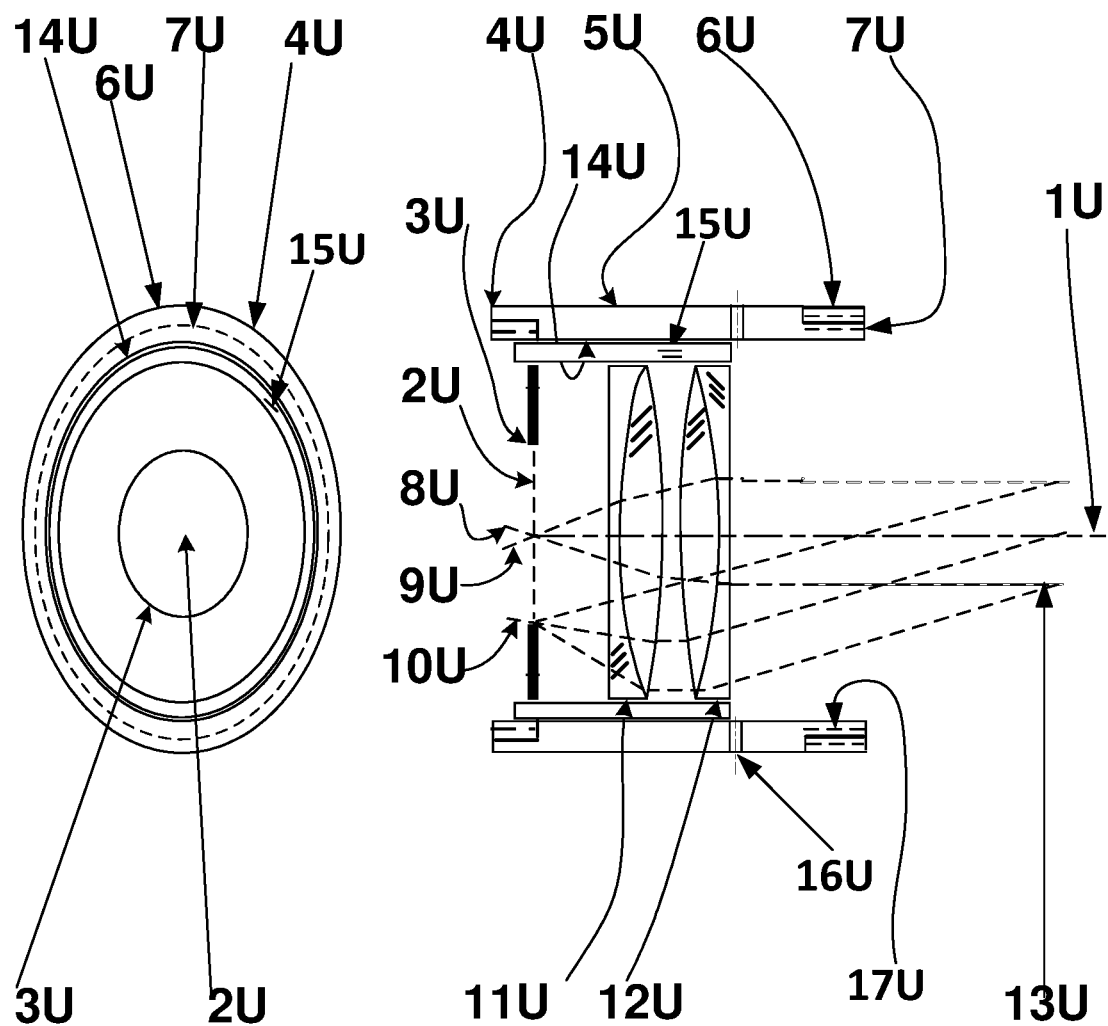
Figure 49:
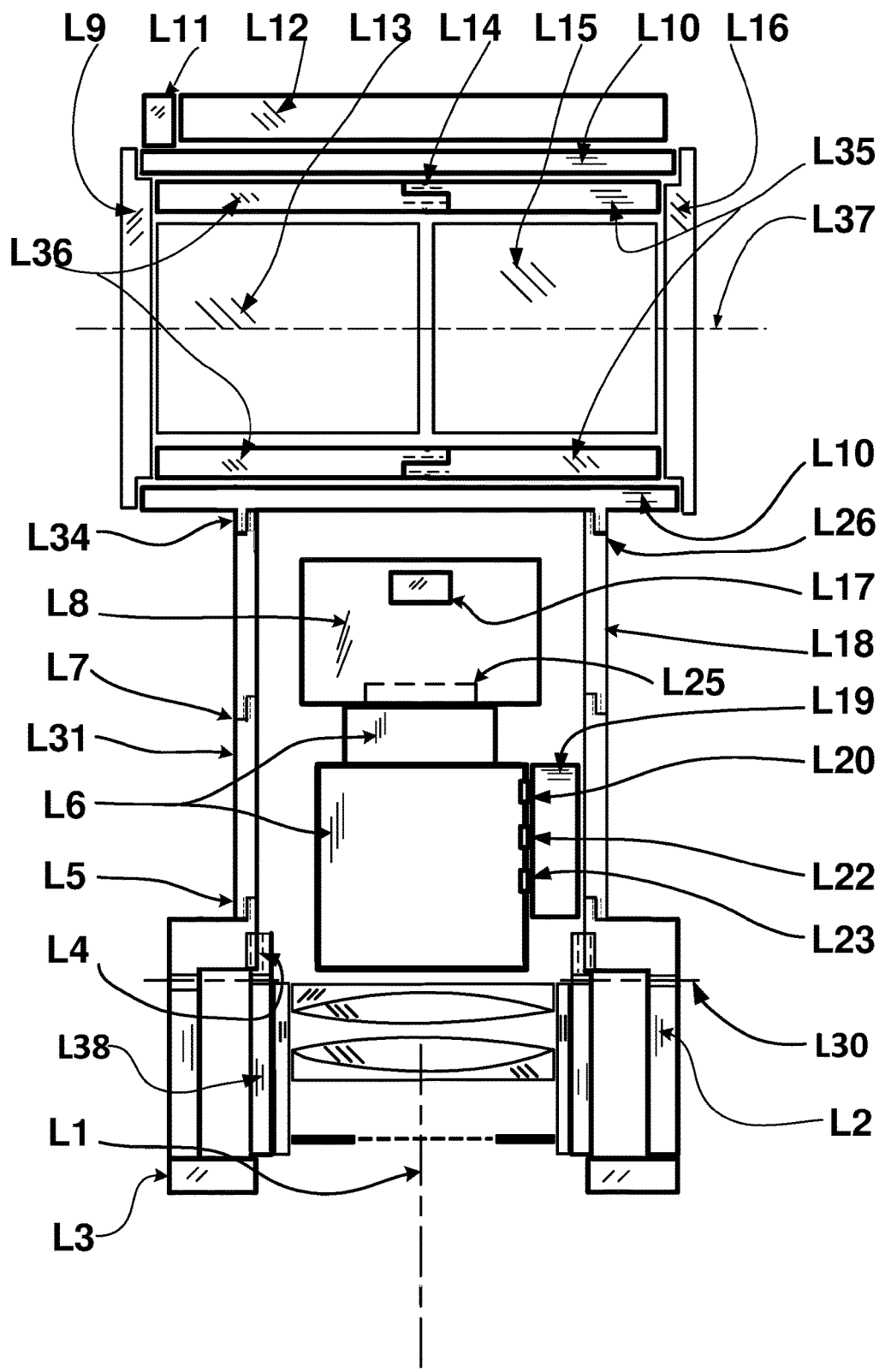

FIG. 49 shows a side view center section of a layout of a preferred embodiment of a mobile apparatus, showing the special eyepiece shown in FIGS. 17E & 17F, two antennas mounted on their respective swivels deployed externally on the outside of the enclosure of the mobile apparatus, and the of the mobile apparatus housing a mating camera lens mount.

Figure 50:
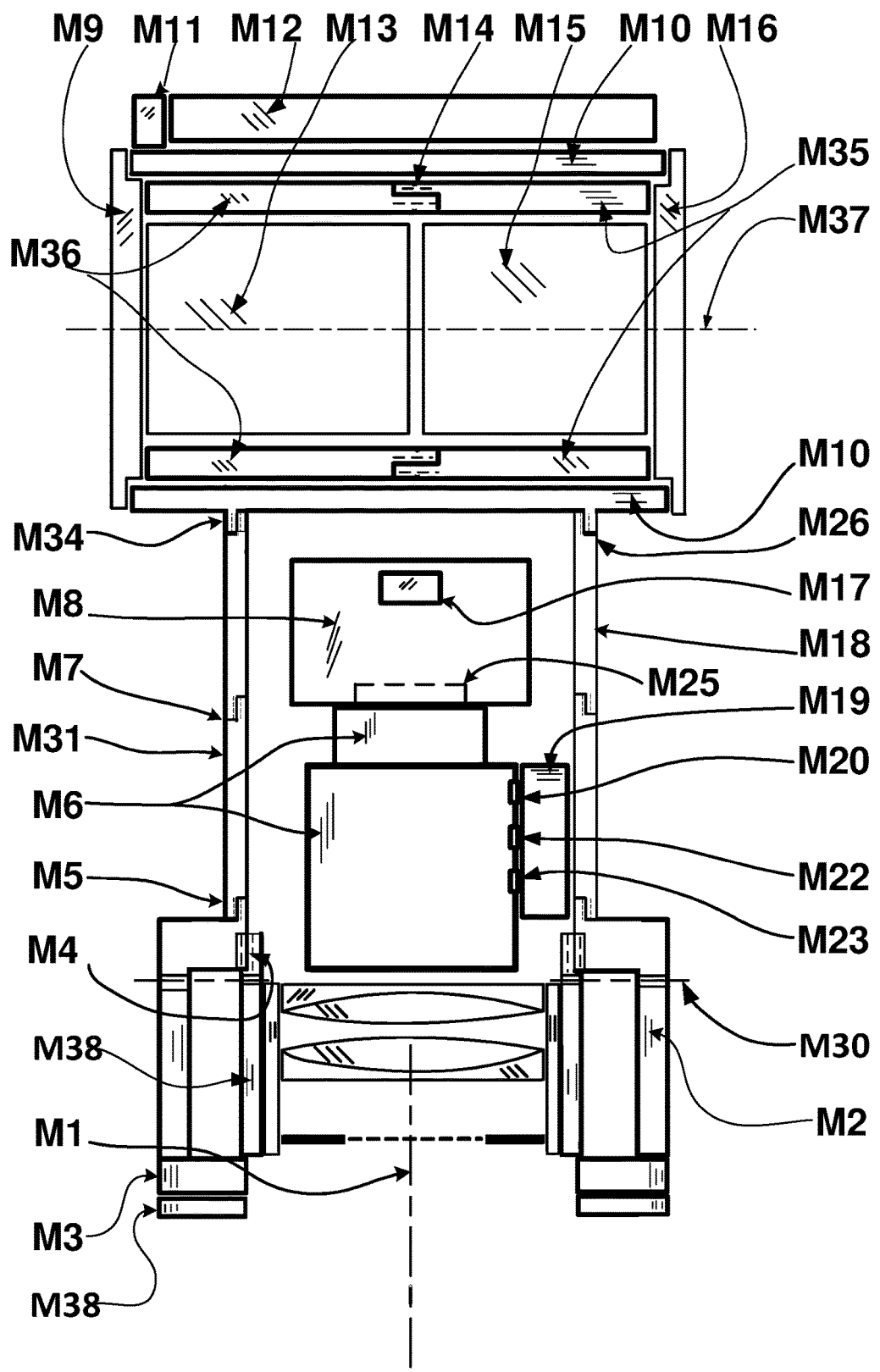

FIG. 50 shows a side view center section of a layout of a preferred embodiment of a mobile apparatus, showing two antennas, mounted on their respective swivels, deployed externally on the outside of the enclosure of the mobile apparatus, and showing the mobile apparatus housing a mating camera lens mount.

Figure 51A:
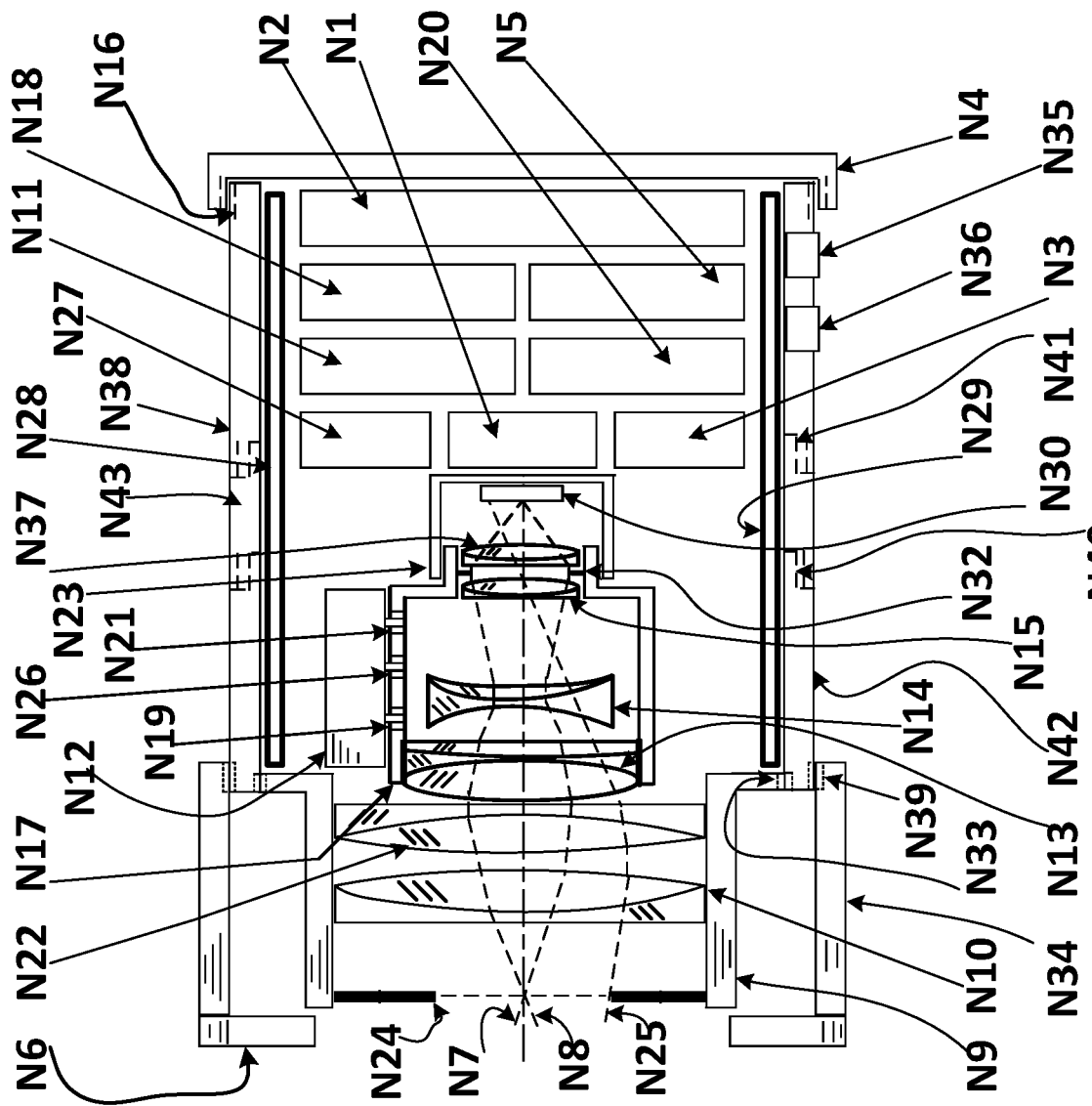

FIG. 51A shows a side view center section of a layout of a preferred embodiment of a mobile apparatus, showing the electronic system circuits and the electronics circuits module, and where the mobile apparatus has a zoom lens actuator to operate the zoom lens functions, and where the mobile apparatus' enclosure has a threaded screw-on end cap module, and where the zoom lens has a magnification control, an iris diaphragm control and a focus control, and where the mobile apparatus has its own eyepiece, and showing the mobile apparatus housing a mating camera lens mount.

Figure 51B:
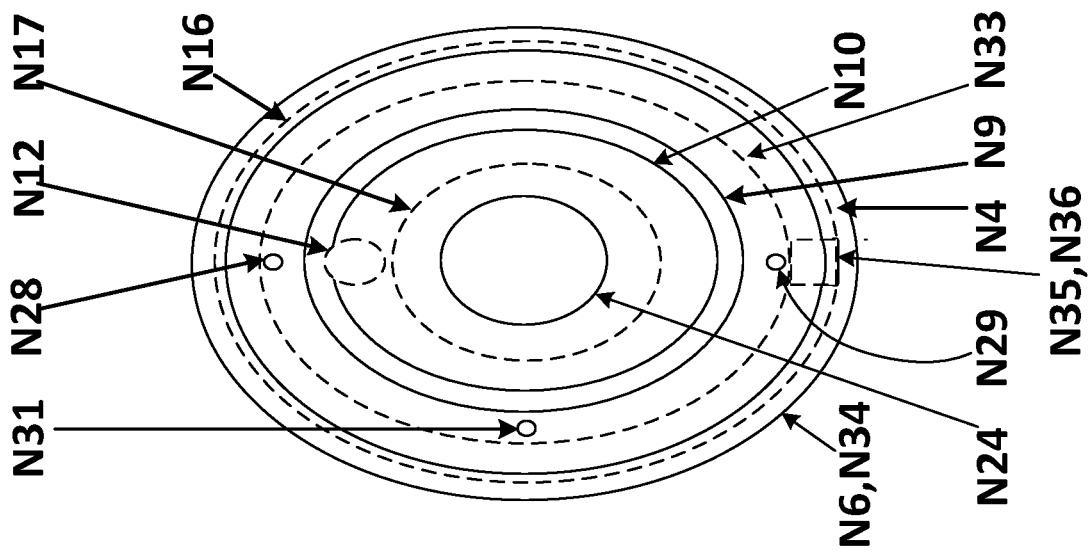

FIG. 51B shows a front view of the layout of the mobile apparatus shown in FIG. 51A.

Figure 52:
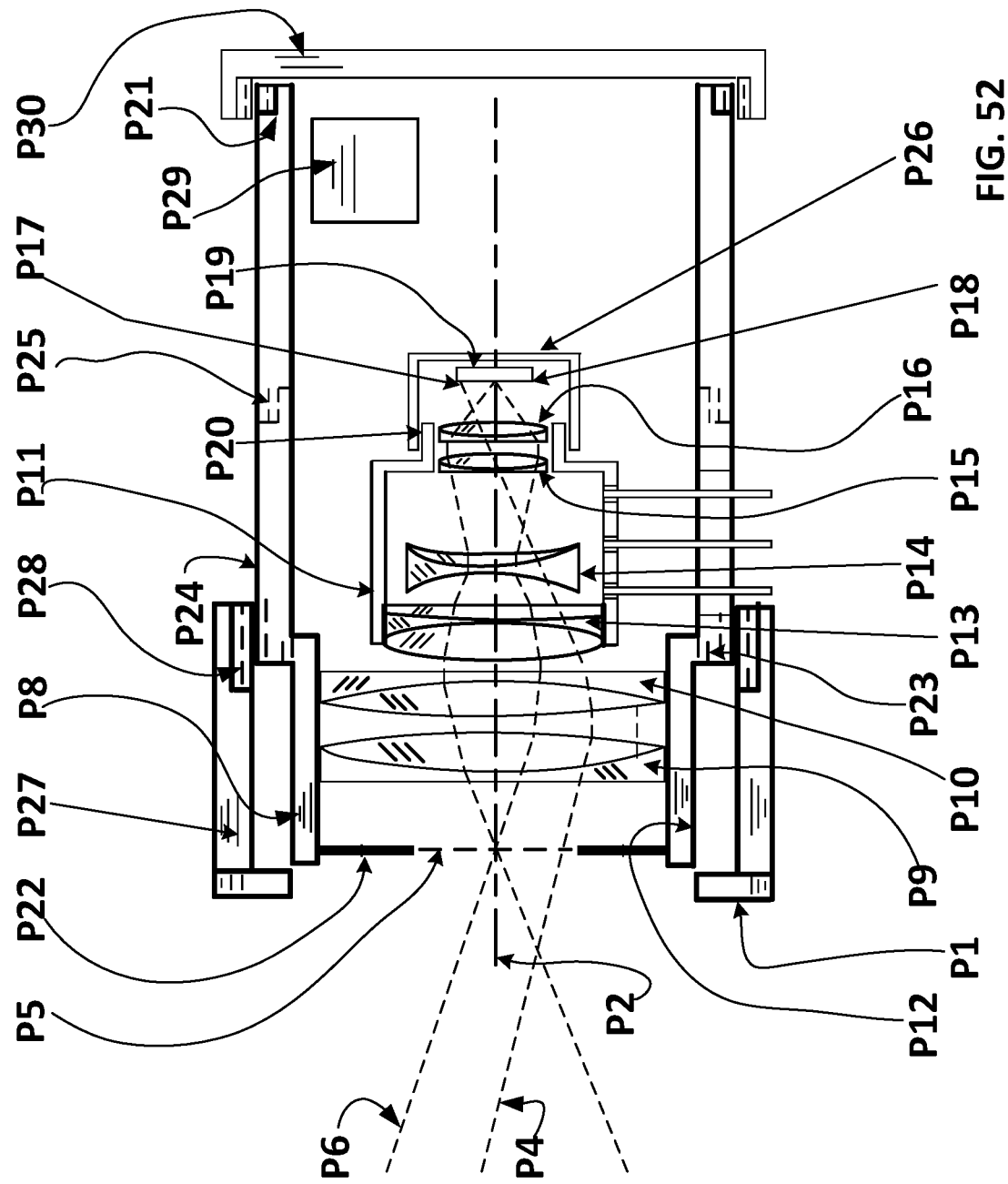

FIG. 52 shows a side view section of the optical system schematic of a preferred embodiment of a mobile apparatus, where the mobile apparatus has its own eyepiece, and where the optical image source is a camera lens with a lens mounting.

Figure 53:
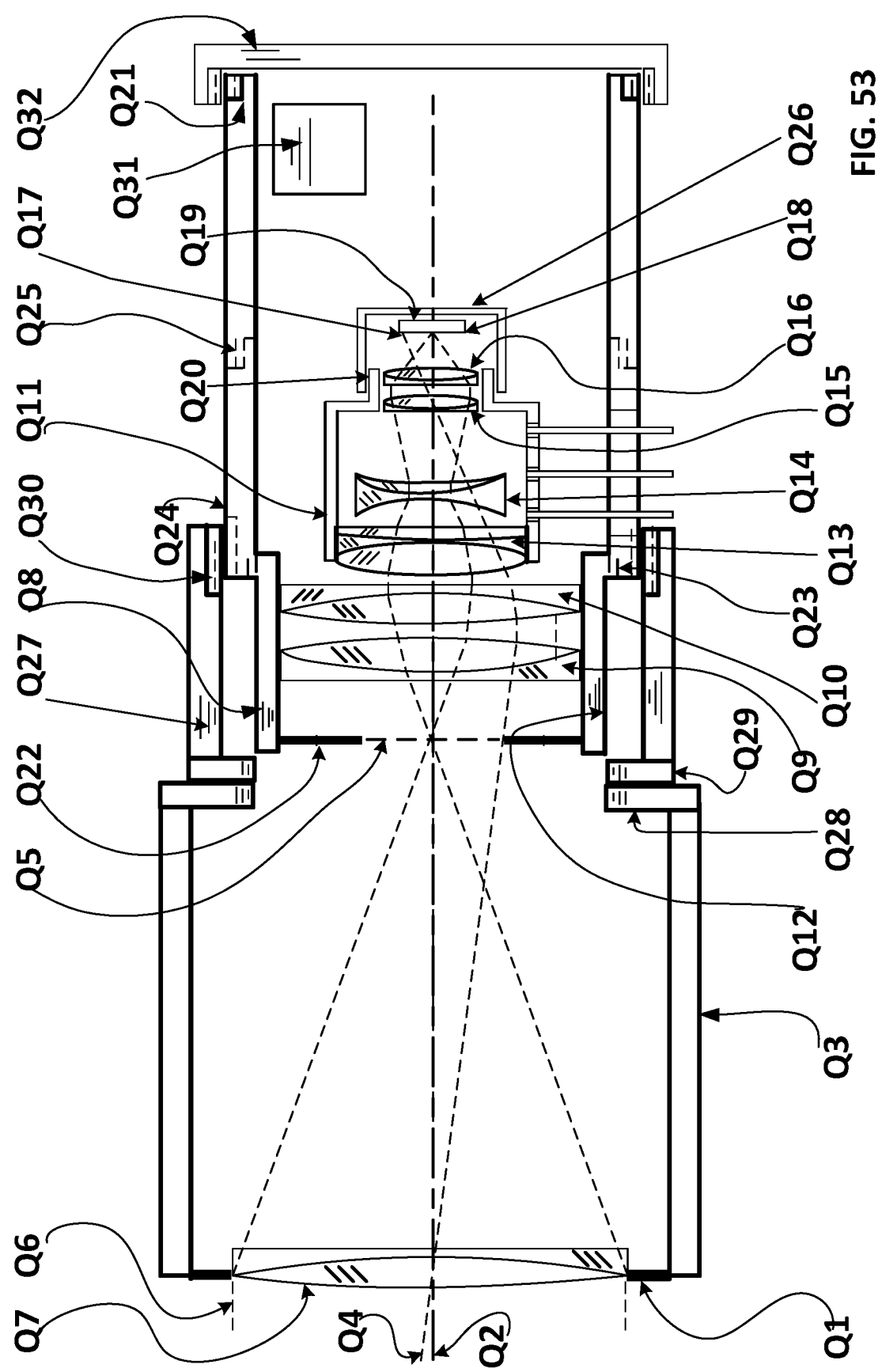

FIG. 53 shows a side view section of the optical system schematic of a preferred embodiment of a mobile apparatus, where the mobile apparatus has its own eyepiece, and where the optical image source is a typical camera lens with a lens mounting, for example a 35 mm camera lens.

Figure 54:
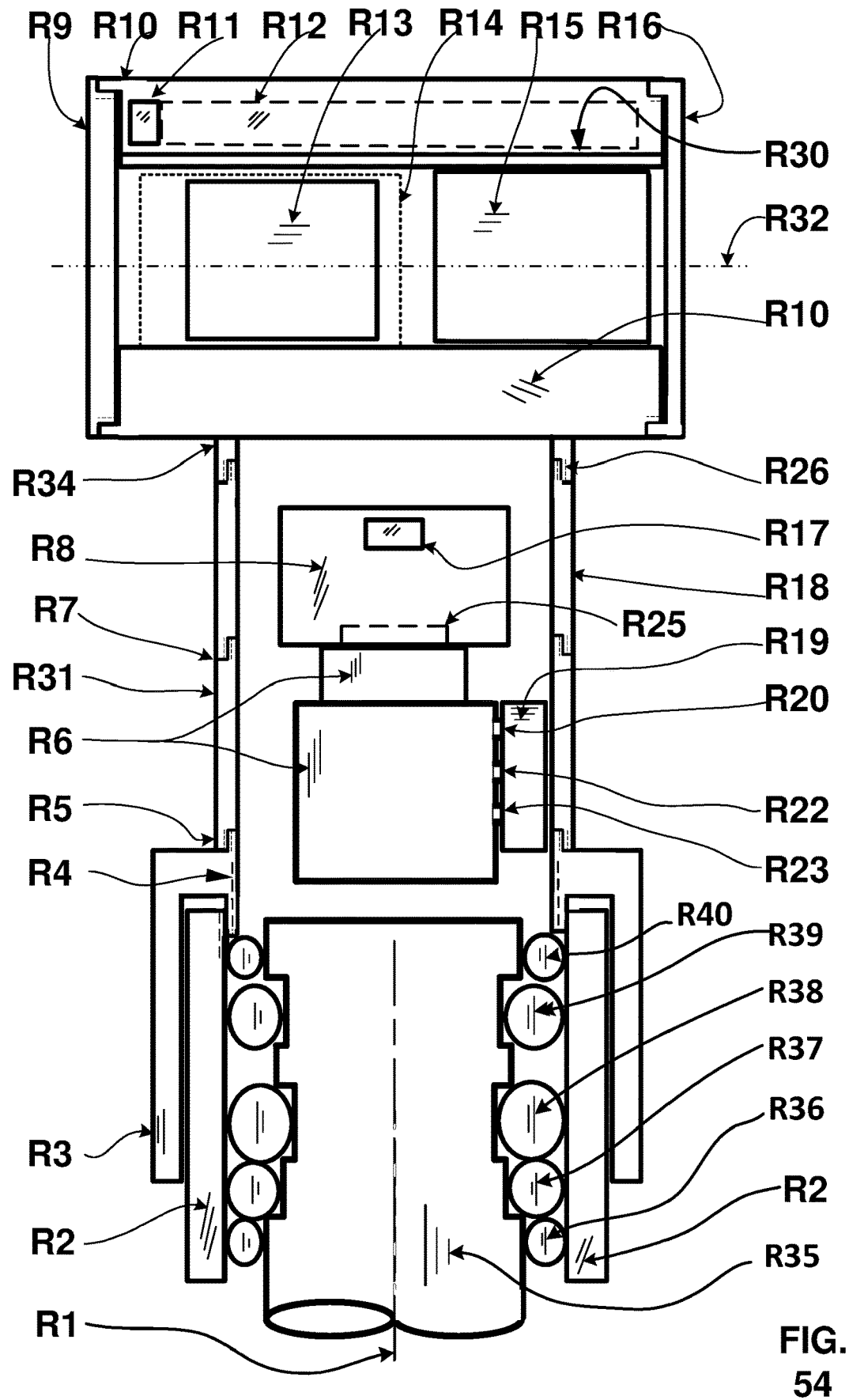

FIG. 54 shows a side view section of a layout of a preferred embodiment of a mobile apparatus, and showing the clamping mechanism module of the mobile apparatus holding a precision clamping mechanism. The preferred embodiment shown in FIG. 54 is for accommodating optical image sources that are manufactured with their own eyepieces.

Figure 55:
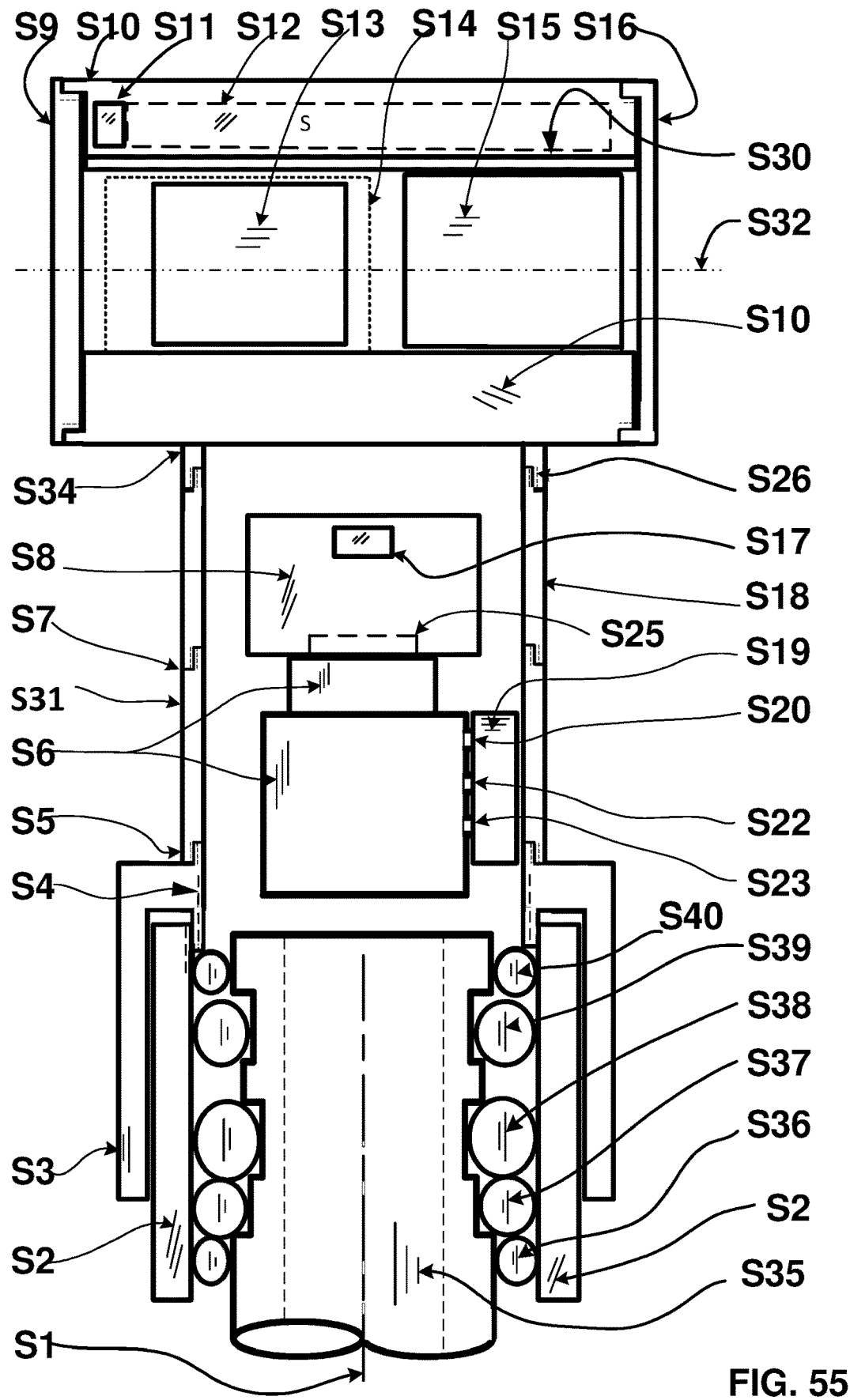

FIG. 55 shows a side view section of a layout of a preferred embodiment of a mobile apparatus, and showing the clamping mechanism module of the mobile apparatus holding a precision clamping mechanism. The preferred embodiment shown in FIG. 55 is for accommodating optical image sources that are manufactured with their own original equipment eyepieces.

Figure 56:
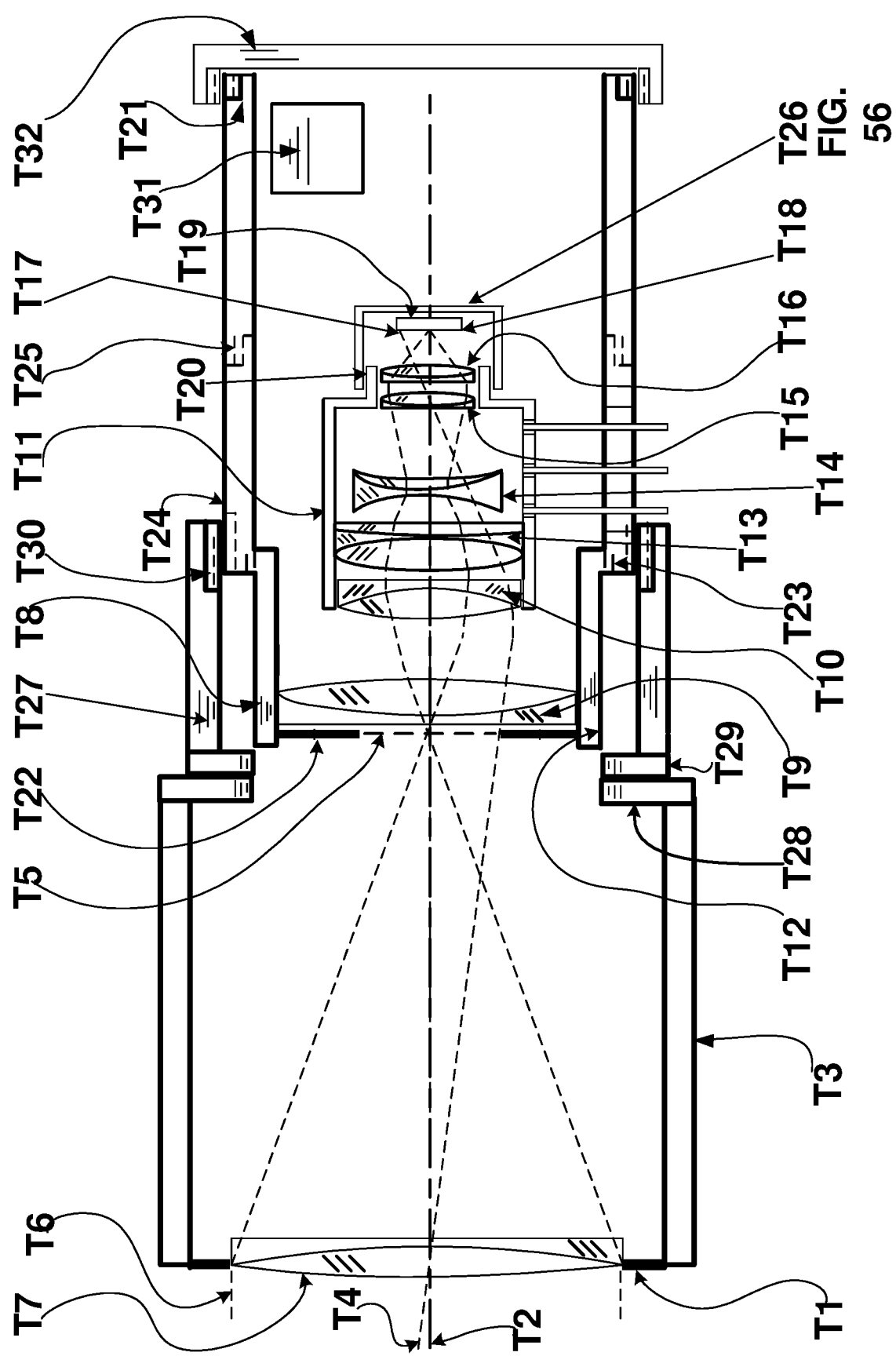

FIG. 56 shows a side view section of the optical system schematic of a preferred embodiment of a mobile apparatus, where the mobile apparatus has its own eyepiece, and where the optical image source is a camera lens with a lens mounting.

Figure 57:
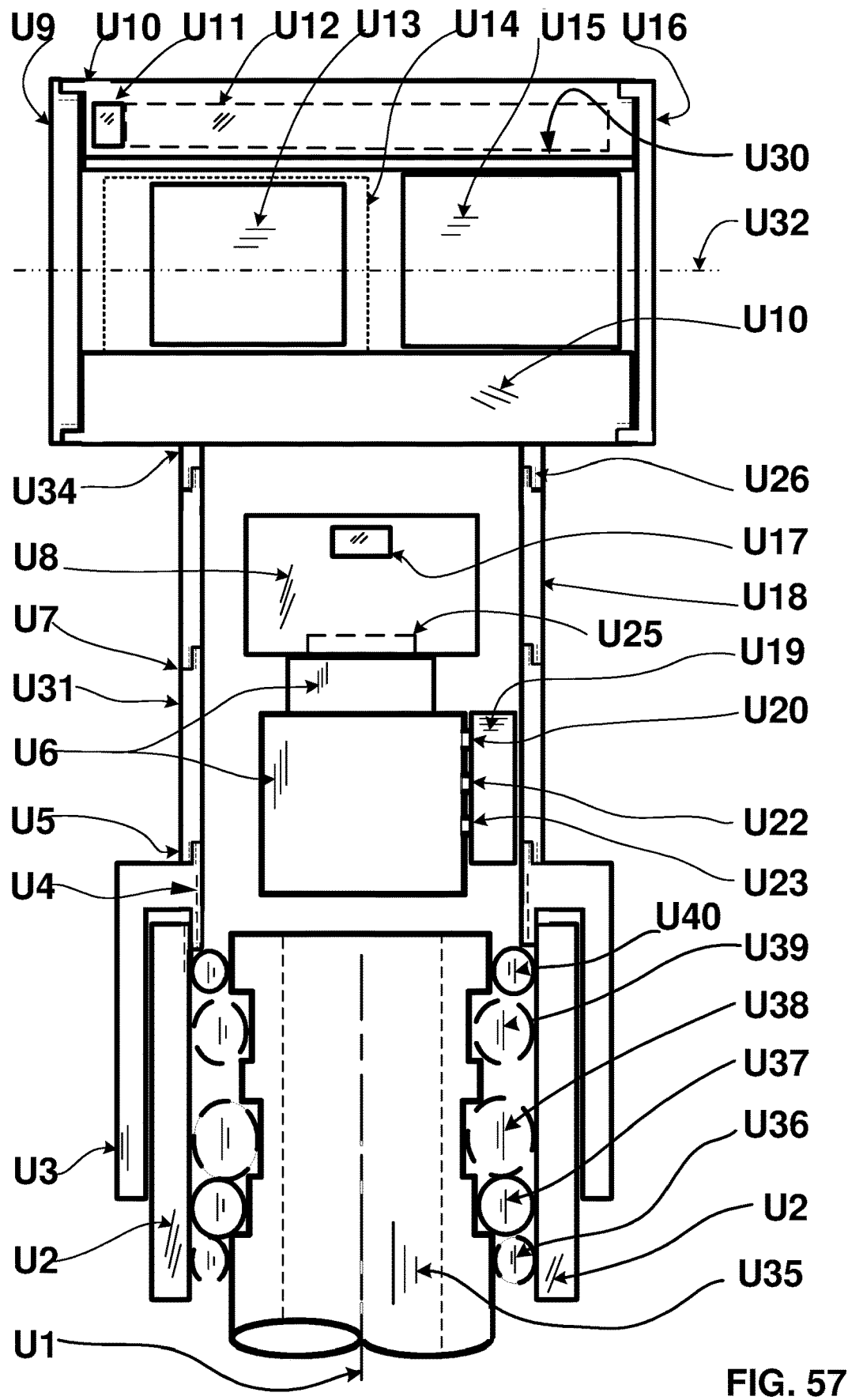

FIG. 57 shows a side view section of a layout of a preferred embodiment of a mobile apparatus, and showing the clamping mechanism module of the mobile apparatus. The preferred embodiment shown in FIG. 57 is for accommodating optical image sources that are manufactured with their own original equipment eyepieces.

DISCLAIMERS

The present invention will now be described in terms of specific example embodiments. It is to be understood that the invention is not limited to the example embodiments disclosed. It should also be understood that not every feature of the methods and systems handling the described device is necessary to implement the invention as claimed in any particular one of the appended claims. Various elements and features of devices are described to fully enable the invention. It should also be understood that throughout this disclosure, where a method is shown or described, the steps of the method may be performed in any order or simultaneously, unless it is clear from the context that one step depends on another being performed first.

Before explaining several embodiments of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. The systems, methods, and examples provided herein are illustrative only and not intended to be limiting.

In the description and claims of the present application, each of the verbs "comprise", "include" and "have", and conjugates thereof, are used to indicate that the object or objects of the verb are not necessarily a complete listing of members, components, elements or parts of the subject or subjects of the verb.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

DETAILED DESCRIPTION OF THE INVENTION

Figure 1B:
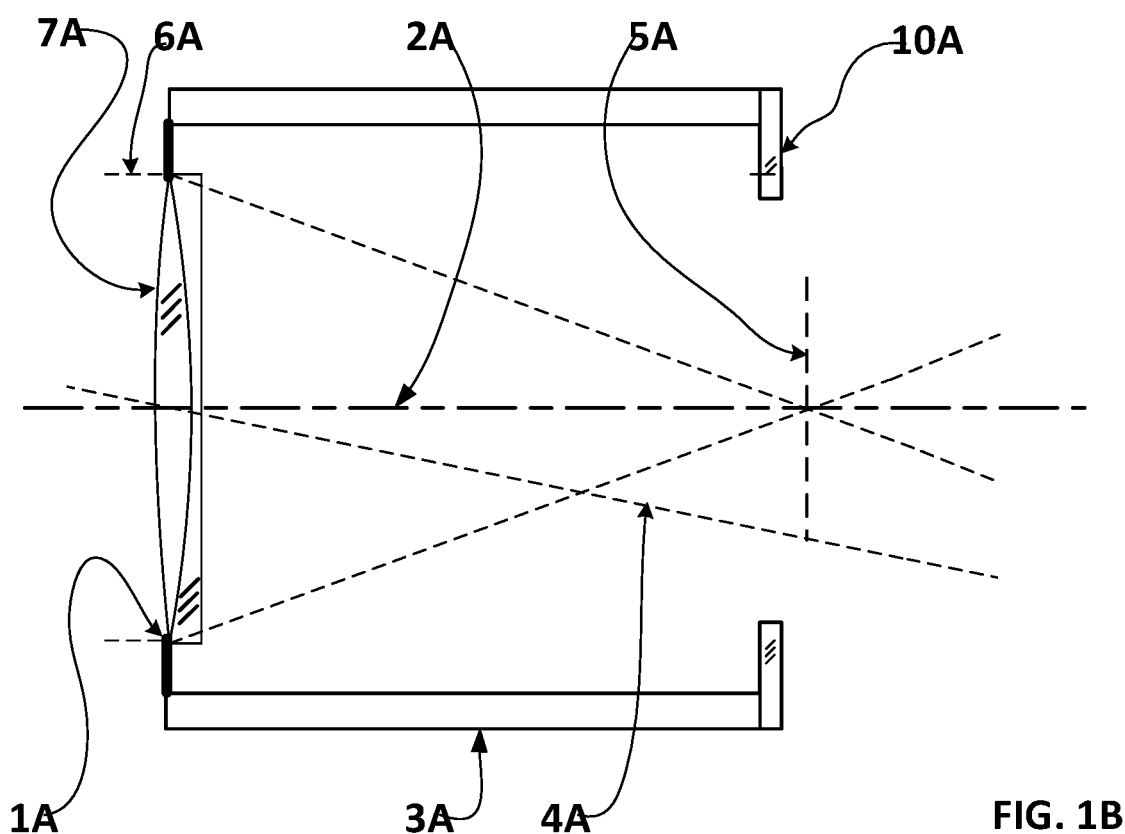

FIG. 1A and FIG. 1B

FIG. 1A shows a side view center section of the optical system schematic of a typical optical image source, where the optical image source does not have its own original equipment eyepiece.

FIG. 1B shows a side view center section of the optical system schematic of a typical optical image source, where the optical image source does not have its own original equipment eyepiece.

Some examples of optical image sources that do not have their own original equipment eyepiece are 35 mm camera lenses. These optical image sources have lens mounts. Examples of the lens mounts are screw types, bayonet types, breech lock types, double bayonet types, and tab lock types.

Many optical image sources are manufactured without an original equipment eyepiece.

FIG. 1 shows a typical optical image source, where the optical image source does not have its own original equipment eyepiece. The mobile apparatus is compatible with this optical image source also.

FIG. 1B shows a typical optical image source, for example like a 35 mm lens, that has a lens mount for attaching the lens to a 35 mm camera body. The mobile apparatus is configured with a mating lens mount enabling the observer to join and attach the mobile apparatus to the 35 mm lens. The observer is thereby enabled to substitute the mobile apparatus for the 35 mm camera body. The mobile apparatus is configured in the present invention with a variety of different lens mounts, thereby enabling the observer to attach the mobile apparatus to a whole variety of different lens types with mating lens mounts.

Some other optical image sources are manufactured with removable original equipment eyepieces that may be removed by the observer or by others. FIG. 2 shows the optical system schematic of a typical optical image source whose original equipment eyepiece has been removed from the optical image source, thereby leaving the optical image source without an original equipment eyepiece. The mobile apparatus is compatible with this optical image source also.

Examples of these kinds of optical image sources are telescopes and microscopes.

The detailed physical elements disclosed in the drawing shown in FIG. 1 are identified as follows:

1A is the entrance pupil of the optical image source.
2A is the optical and mechanical axis of the optical image source.
3A is the housing of the optical image source.
4A is the principal ray of the optical image source.
5A is the optical imagery and image plane of the optical image source.
  The optical imagery at 5A is focal. It is especially important to note that the focal optical imagery at 5A is considered to be the optical imagery of the optical image source for all preferred embodiments in the present disclosure that refer to FIG. 1 as the optical image source.
6A is an axial rim ray of the optical image source.
7A is the optical system of the optical image source.
  For many optical image sources, the full and complete optical system of the optical image source is far more complex than just the single doublet lens shown in FIG. 1, and is comprised of multiple lenses, mirrors and prisms. The single doublet lens shown is only meant to simplify the drawing and only symbolically represents the full and complete optical system of the optical image source.
8A is the inside diameter of the barrel of the housing 3A of the optical image source. The image plane 5A of the optical image source resides within the barrel 8A. The image plane 5A of the optical image source is centered on 2A. 2A is the mechanical axis of 8A. In some typical optical image sources that are manufactured, 8A is the inside diameter of a holder and/or focusing mechanism that will accommodate an eyepiece that can be provided by the observer. Such eyepieces typically have standard outside diameters to slip fit into 8A. i.e. 0.956 inch, 1.25 inch, 2.0 inch.
9A is the outside diameter of the barrel of the housing 3 of the optical image source. Typically, optical image sources are manufactured with barrel enclosures as original standard equipment. The barrel enclosures are the structural body of the optical image sources and are manufactured for housing and enclosing the contents of the optical image sources. 10A is the field stop of the optical image source. The camera lens' optical image sources typically do not have field stops. See FIG. 1B. In the case example of the 35 mm camera lens, the edges of the 35 mm film plane acts as the field stop. Optical imagery 5A is produced by optical image sources. The mobile apparatus is for observers of 5A. The mobile apparatus is for enabling observers of 5A to transform 5A into electronic imagery signals. These electronic imagery signals can be used by the observer to locally and remotely reproduce an electronic facsimile of the optical imagery. The optical image sources are comprised of as many as four different optical image source types. The four different optical image source types are a first optical image source, a second optical image source, a third optical image source, and a fourth optical image source. The first optical image source comprises an objective and a permanent original equipment eyepiece. The second optical image source comprises an objective and a removable original equipment eyepiece. The third optical image source comprises an objective and has the first removable original equipment eyepiece removed. The fourth optical image source has no original equipment eyepiece at all. An example of the fourth optical image source is the 35 mm camera lens having a lens mount.

The first optical image sources is configured for producing afocal optical imagery.

The second optical image sources is configured for producing afocal optical imagery.

The third optical image sources is configured for producing focal optical imagery at 5A.

The fourth optical image sources is configured for producing focal optical imagery at 5A.

FIG. 1 represents the third and fourth optical image sources that have no original equipment eyepiece in their optical schematic and produce focal optical imagery. FIG. 1 is shown as a reference drawing.

Figure 2A:
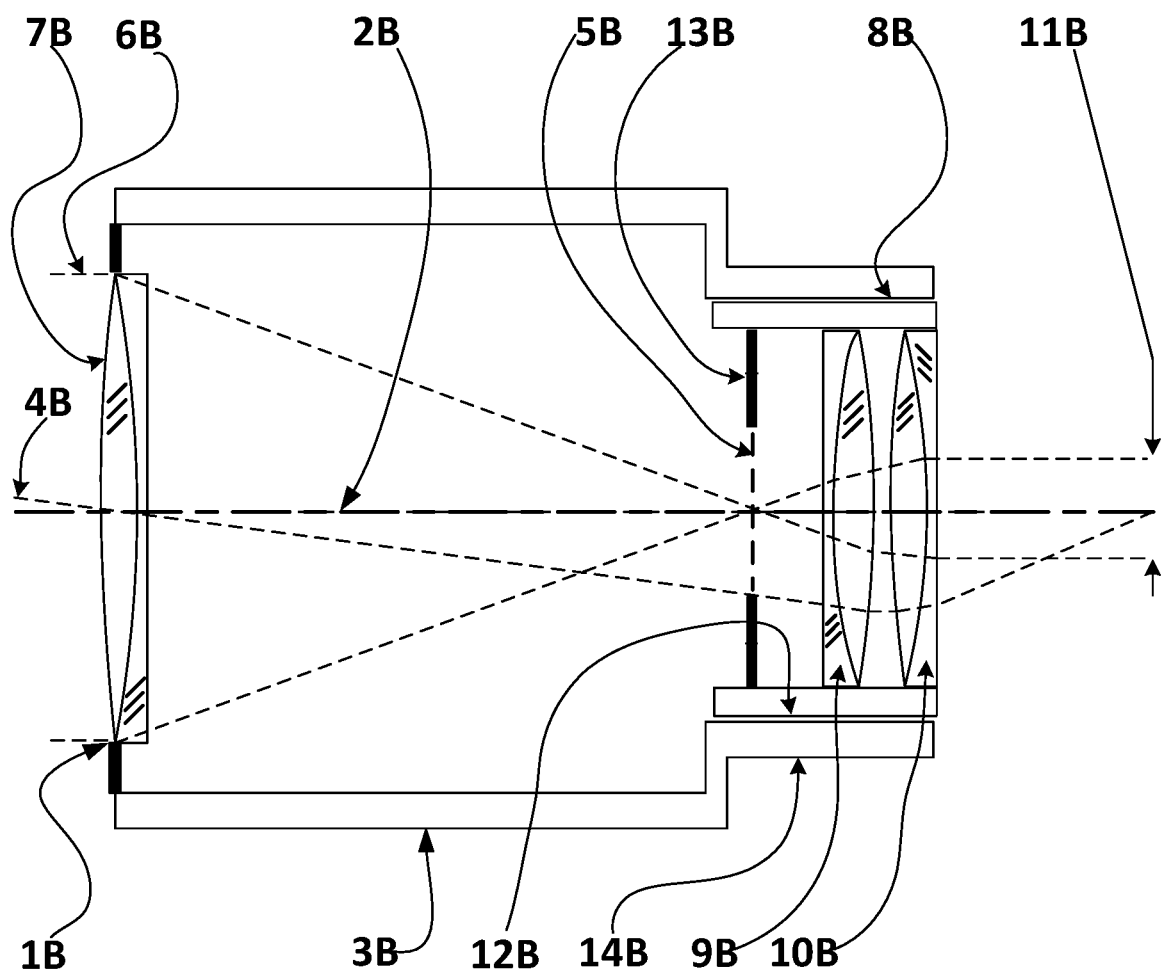
FIG. 2A shows a side view section of the optical system schematic of a typical optical image source, where the optical image source has a own original equipment eyepiece.
Figure 2C:
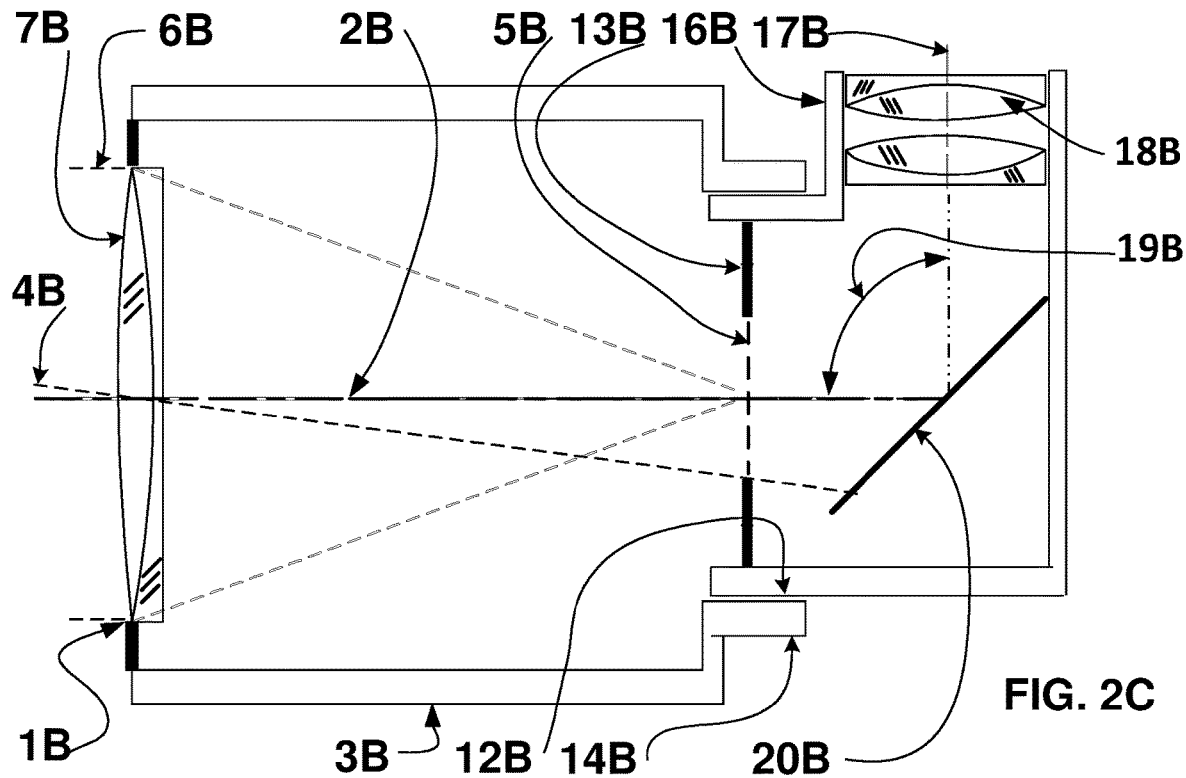
FIG. 2C shows a side view section of the optical system schematic of a typical optical image source, where the optical image source has its own original equipment eyepiece, and showing the optical image source original equipment eyepiece exterior housing form showing the optical axis of the original equipment eyepiece different from that of the main body of the optical image source.
Figure 2B:
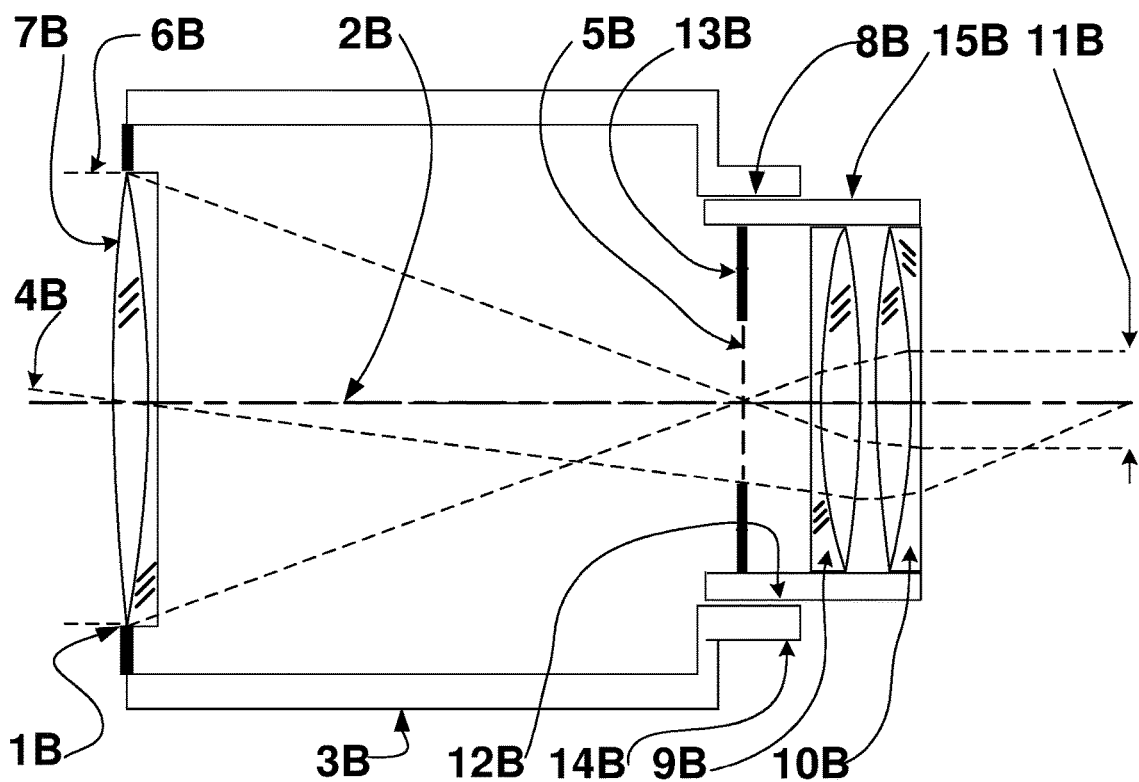
FIG. 2B shows a side view section of the optical system schematic of a typical optical image source, where the optical image source has its own original equipment eyepiece, and showing the optical image source original equipment eyepiece exterior housing form.

FIG. 2A and FIG. 2B and FIG. 2C

FIG. 2A shows a side view section of the optical system schematic of a typical optical image source, showing the optical image source barrel, and where the optical image source has its own original equipment eyepiece.

FIG. 2B shows a side view section of the optical system schematic of a typical optical image source, where the optical image source has its own original equipment eyepiece, and showing the optical image source original equipment eyepiece exterior housing form.

FIG. 2C shows a side view section of the optical system schematic of a typical optical image source, where the optical image source has its own original equipment eyepiece, and showing the optical image source original equipment eyepiece exterior housing form showing the optical axis of the original equipment eyepiece different from that of the main body of the optical image source.

Some optical image sources are manufactured with permanently attached original equipment eyepieces that are not meant to be removed except with special tools and under special circumstances. FIGS. 2A and 2B shows the optical system schematic of a typical optical image source whose original equipment eyepiece is permanently attached to the optical image source. The mobile apparatus is compatible with this optical image source. The mobile apparatus can clamp on and attach itself to either the barrel enclosure 8 or the original equipment eyepiece exterior housing form 15.

Some examples of these kinds of optical image sources are spotting scopes, binoculars, theodolites, alignment telescopes, dioptometers and autocollimators.

Some other optical image sources are manufactured with removable original equipment eyepieces that may be removed. FIG. 2 shows the optical system schematic of a typical optical image source whose original equipment eyepiece, although removable, has not been removed and is still attached to the optical image source. The mobile apparatus is compatible with this optical image source also. Examples of these kinds of optical image sources are astronomical telescopes and microscopes.

Some other optical image sources are manufactured with original equipment eyepieces having an optical and mechanical axis different from that of the main body of the optical image source. The angle 19 shown in FIG. 2C is arbitrary and can be whatever the manufacturer chooses. In many cases the angle 19 is 90 degrees. The mobile apparatus can clamp on and attach itself to the original equipment eyepiece exterior housing form 16.

The detailed physical elements disclosed in the drawing shown in FIG. 2 are identified as follows:

1B is the entrance pupil of the optical image source.

2B is the optical and mechanical axis of the optical image source.

3B is the housing of the optical image source.

4B is the principal ray of the optical image source.

5B is the prime focal plane of 7B.

6B is an axial rim ray of the optical image source.

7B represents the objective of the optical image source.
> For many optical image sources, the full and complete optical system of the optical image source is far more complex than just the single doublet lens shown in FIG. 2, and is comprised of multiple lenses, mirrors and prisms. The single doublet lens shown is only meant to simplify the drawing and only symbolically represents the full and complete optical system of the optical image source excluding its original equipment eyepiece.

8B is the is the inside diameter of the barrel of the housing 3B of the optical image source.

9B is the field lens of the original equipment eyepiece of the optical image source.

10B is the eye lens of the original equipment eyepiece of the optical image source.

11B is the exit pupil location of the optical image source. The optical imagery at 11B is afocal.
> It is especially important to note that the afocal optical imagery at 11B is considered to be the optical imagery of the optical image source for all preferred embodiments in the present disclosure that refer to FIG. 2 as the optical image source.

12B is the original equipment eyepiece housing. The original equipment eyepiece of the optical image source is comprised of 9B, 10B and 12B. 11B is the exit pupil of the original equipment eyepiece.

13B is the field stop of the optical image source.

14B is the is the outside diameter of the barrel of the housing 3B of the optical image source. Typically, optical image sources are manufactured with barrel enclosures as original standard equipment. The barrel enclosures are the structural body of the optical image sources and are manufactured for housing and enclosing the contents of the optical image sources.

15B is the original equipment eyepiece exterior housing form. The exterior form of the original equipment eyepieces of manufactured optical image sources varies extensively in diameter, cross section profile and shape. Despite this degree of variability, the mobile apparatus' clamping mechanism is nevertheless adaptable to these forms.

16B is the original equipment eyepiece exterior housing form. The exterior form of the original equipment eyepieces of manufactured optical image sources varies extensively in diameter, cross section profile and shape.

Despite this degree of variability, the mobile apparatus' clamping mechanism is nevertheless adaptable to these forms.

17B is the optical axis of the original equipment eyepiece. In a well manufactured optical image source, the mechanical axis of the original equipment eyepiece housing 16B is coaxial with the optical axis 17B. The mobile apparatus is adaptable to optical image sources where the mechanical axis of the original equipment eyepiece housing 16 is not coaxial with the optical axis 17B.

18B is the eye lens of the original equipment eyepiece.

19B is an arbitrary angle between the optical axis of the main body of the optical image source and the original equipment eyepiece. In the example shown in FIG. 2C, 19B is 90 degrees. In many cases 19B is designed for the comfort and ergonomics of the observer. In many other cases it is a function of the type of the optical image source. 20B is the reflecting surface of a mirror or a prism.

Many subsequent figures described herein the present patent's specification, refer to FIG. 2.

All the subsequent figures described in the present patent's specification that refer to FIG. 2 assume that the optical image of an object produced by the optical image source shown in FIG. 2, has been previously adjusted and set to be afocal as viewed at the exit pupil of the original equipment eyepiece. Settings of this nature are typically made with a dioptometer or similar precision optical instrument. The observer can prepare the focus of the object of the optical image source by viewing the image of the object at the original equipment eyepiece of the optical image source with a dioptometer, and focusing the original equipment eyepiece, or other optical image source focus mechanism, to provide an afocal image i.e. an image set to infinity.

Optical imagery is produced by optical image sources. The mobile apparatus is for observers of objects using optical image sources. The mobile apparatus is for enabling observers of objects to transform the optical imagery of objects into electronic imagery signals. These electronic imagery signals can be used by the observer to locally and remotely reproduce an electronic reasonable facsimile of the object's optical imagery.

The optical image sources are comprised of as many as four different optical image source types. The four different optical image source types are a first optical image source, a second optical image source, a third optical image source, and a fourth optical image source.

The first optical image source comprises an optical system and a permanent original equipment eyepiece.

The second optical image source comprises an optical system and a removable original equipment eyepiece.

The third optical image source comprises an optical system and has the first removable original equipment eyepiece removed. The fourth optical image source has no original equipment eyepiece at all.

An ordinary camera lens is an example of the fourth optical image source. Camera lens' optical systems are typically comprised of a series of optical components. Camera lenses are typically equipped by their manufacturers with a mechanical mounting device means for attaching the lens to the body of a camera. 35 mm camera lenses are examples. The mechanical mounting device means, otherwise known as a lens mount, enables the 35 mm photographer to interchange a variety of 35 mm lenses with a camera body.

In various preferred embodiments of the present invention, the mobile apparatus is equipped with a variety of functional modular building blocks i.e. modules. One of the modular building blocks of the mobile apparatus is comprised of a mechanical mounting device means for attaching the mobile apparatus to the camera lenses. The mechanical mounting device means is comprised of a mating lens mounting adapter and a modular enclosure. The mating lens mounting adapter connects and attaches to the camera lens mount thereby enabling the mobile apparatus to attach to the camera lens. The camera lens mounts typically have their own locking device means. The modular enclosure is threaded at its rear end for screwing and joining with the zoom lens module of the mobile apparatus. Refer to FIGS. 49, 50, 51, 52 and 53 for example. The mating lens mounting adapter is fastened on to the front end of the modular enclosure, thereby enabling the modular enclosure of the mobile apparatus to mate and connect to the camera lens.

FIG. 2 represents optical image sources that have an original equipment eyepiece in their optical schematic and produce afocal optical imagery. FIG. 1 represents optical image sources that produce focal optical imagery. FIG. 1 and FIG. 2 are shown as reference drawings.

Figure 3A:
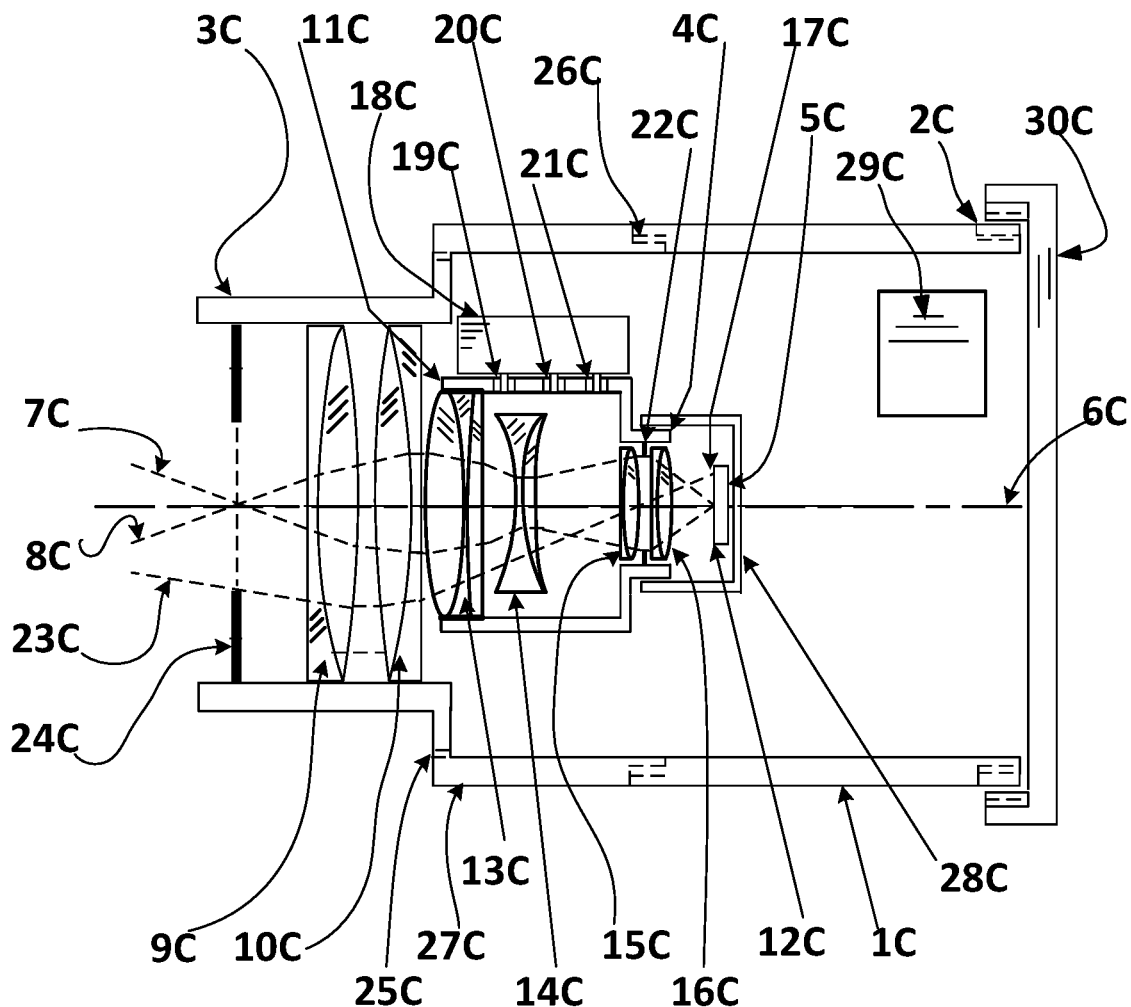
FIG. 3A shows a side view center section of the optical system schematic of a preferred embodiment of a mobile apparatus wherein the mobile apparatus is configured for use for optical image sources referred to in FIG. 1.
Figure 3B:
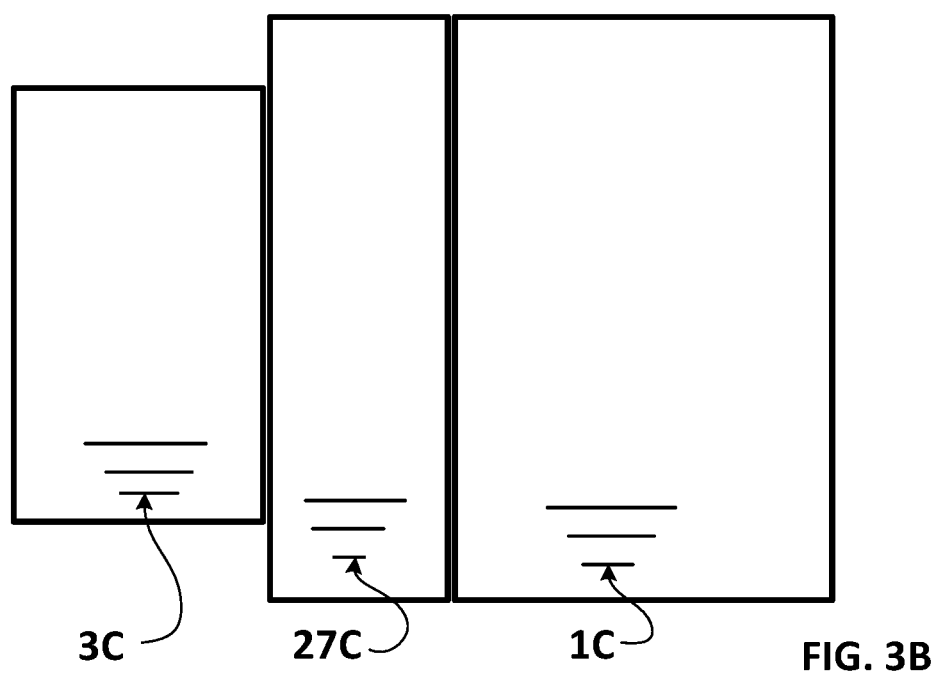
FIG. 3B shows a side view of the preferred embodiment of a mobile apparatus shown in FIG. 3A, showing the optically and mechanically connected eyepiece module, zoom lens module, and electronic image sensor array camera module which comprise the mobile apparatus.

FIG. 3A and FIG. 3B

FIG. 3A shows a side view center section of the optical system schematic of a preferred embodiment of a mobile apparatus, where the mobile apparatus has its own eyepiece, and where the mobile apparatus has a zoom lens, and the zoom lens has a magnification control, a iris diaphragm control, and a focus control, and where the modular enclosures which comprise the mobile apparatus are shown for an eyepiece, for a zoom lens, and for an image sensor array camera.

FIG. 3B shows a side view of the preferred embodiment of a mobile apparatus shown in FIG. 3A, showing the optically and mechanically connected eyepiece, zoom lens, and electronic image sensor array camera modular enclosures which comprise the mobile apparatus.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures. The mobile apparatus shown in FIGS. 3A and 3B is configured with a eyepiece module 3C, a zoom lens module 27C and a electronic image sensor array camera module 1C.

The mobile apparatus disclosed in FIG. 3 is configured for being attached to and compatible with the optical image source shown in FIG. 1. The imagery at 24C from the optical image source is focal.

The eyepiece module is for optically acquiring and transforming and transferring the focal optical imagery from the optical image source into afocal optical imagery to the zoom lens module. The zoom lens module is for optically transforming the afocal optical imagery into focal optical imagery and for optically transferring the focal imagery to the electronic image sensor array camera module for electronically transforming the focal optical imagery into electronic imagery signals.

Screw thread is shown in the figure as an example of a mechanical connecting means for mechanically connecting adjacent modular enclosures. Screw thread is an example of a mechanical connecting means.

Screw threaded joints are a simple, inexpensive and space saving method especially for connecting enclosures having a cylindrical profile. The front ends of the module's 27C and 1C cylindrical enclosures are under cut and threaded with female threads. The rear ends of the module's cylindrical enclosures are over cut and threaded with male threads. The rear ends of the module's cylindrical enclosures mate with the front end of the module's cylindrical enclosures in order to connect the two modules together.

Screw thread is given in the present invention as an example of a mechanical connecting means. Other mechanical connecting means are also appropriate.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

In the preferred embodiment of the apparatus shown, the observer can choose from both analog and digital video cameras in order to match the object being observed and the type of optical image source being used by the observer during the observing session, as well as the desired objectives of the observing session.

The detailed physical elements disclosed in the drawing shown in FIG. 3A and FIG. 3B are identified as follows:

1C is the modular enclosure for the image sensor array 12C of the electronic image sensor array camera 28C module of the mobile apparatus. 1C has male thread on its rear end for mating with the female thread on the front end of 30C. 1C has female thread on its front end for mating with the male thread on the rear end of 27C.

2C is the rear end of the modular enclosure 1C for the electronic image sensor array camera module of the mobile apparatus. 2C shows the threaded joint. The outputs of the electronic image sensor array camera module meet the following video protocols:

The Following is a List of Analog and Digital Protocols Met by the Electronic Image Sensor Array Camera Modules—

Analog Camera—NTSC Composite Video Output

Standard definition Digital Camera—SDI Serial digital interface output

High definition Digital Camera—HDSDI High definition serial digital interface output The Serial digital interface (SDI) is a family of digital video interfaces first standardized by SMPTE (The Society of Motion Picture and Television Engineers) in 1989.

For example, ITU-R BT.656 and SMPTE 259M define digital video interfaces used for commercial broadcast video.

A related standard, known as high-definition serial digital interface (HD-SDI), is standardized in SMPTE 292M; this provides a nominal data rate of 1.485 Gbit/s.

Additional SDI standards have been introduced to support increasing video resolutions (HD, UHD and beyond), frame rates, stereoscopic (3D) video, and color depth.

Dual link HD-SDI consists of a pair of SMPTE 292M links, standardized by SMPTE 372M in 1998 this provides service to a nominal 2.970 Gbit/s interface used in applications (such as digital cinema or HDTV 1080P) that require greater fidelity and resolution than standard HDTV can provide.

3G-SDI (standardized in SMPTE 424M) consists of a single 2.970 Gbit/s serial link that allows replacing dual link HD-SDI. 6G-SDI and 12G-SDI standards were published on Mar. 19, 2015.

These standards are used for transmission of uncompressed, unencrypted digital video signals (optionally including embedded audio and time code) within television facilities; they can also be used for packetized data.

Coaxial variants of the specification range in length but are typically less than 300 meters (980 ft). Fiber optic variants of the specification such as 297M allow for long-distance transmission limited only by maximum fiber length or repeaters.

SDI and HD-SDI are usually only available by licensing agreements which restrict their use to licensed manufacturers. The SDI and HDSDI interfaces are unencrypted and uncompressed.

Audio—Both the HD and SD serial interfaces provide for 16 channels of embedded audio. The two interfaces use different audio encapsulation methods—SD uses the SMPTE 272M standard, whereas HD uses the SMPTE 299M standard. In either case, an SDI signal may contain up to sixteen audio channels (8 pairs) embedded 48 kHz, 24-bit audio channels along with the video. Typically, 48 kHz, 24-bit (20-bit in SD, but extendable to 24 bit) PCM audio is stored, in a manner directly compatible with the AES3 digital audio interface.

The various versions of the serial digital interface support numerous video formats.

The 270 Mbit/s interface supports 525-line, interlaced video at a 59.94 Hz field rate (29.97 Hz frame rate), and 625-line, 50 Hz interlaced video. These formats are highly compatible with NTSC and PAL-B/G/D/K/I systems respectively; and the terms NTSC and PAL are often (incorrectly) used to refer to these formats. (PAL is a composite color encoding scheme, and the term does not define the line-standard, though it is most usually encountered with 625i) while the serial digital interface—other than the obsolete 143 Mbit/s and 177 Mbit/s forms—is a component standard. The 360 Mbit/s interface supports 525i and 625i widescreen. It can also be used to support 525p, if 4:2:0 sampling is used.

The various 540 Mbit/s interfaces support 525p and 625p formats.

The nominal 1.5 Gbit/s interfaces support most high-definition video formats.

Supported formats include 1080/60i, 1080/59.94i, 1080/50i, 1080/30p, 1080/29.97p, 1080/25p, 1080/24p, 1080/23.98p, 720/60p, 720/59.94p, and 720/50p. In addition, there are several 1035i formats (an obsolete Japanese television standard), half-bandwidth 720p standards such as 720/24p (used in some film conversion applications, and unusual because it has an odd number of samples per line [citation needed]), and various 1080psf (progressive, segmented frame) formats. Progressive Segmented frames formats appear as interlace video but contain video which is progressively scanned. This is done to support analog monitors and televisions, many of which are incapable of locking to low field rates such as 30 Hz and 24 Hz.

The dual link HD interface supports 1080/60p, 1080/59.94p, and 1080/50p, as well as 4:4:4 encoding, greater color depth, RGB encoding, alpha channels, and nonstandard resolutions (often encountered in computer graphics or digital cinema).

A quad link interface of HD-SDI supports UHDTV-1 resolution 2160/60p 3C is the front end of the modular enclosure for the eyepiece module of the mobile apparatus.

3C has male thread on its rear end for mating with the female thread on the front end of 27C.

4C is the rear end of the zoom lens housing of the zoom lens of the mobile apparatus.

5C is the optically inactive rear end of the image sensor array of the mobile apparatus.

6C is the optical and mechanical axis of the mobile apparatus.

7C is a marginal rim ray from a focal optical image source (not shown) focused on the image plane of the eyepiece of the mobile apparatus.

8C is a marginal rim ray from a focal optical image source (not shown) focused on the image plane of the eyepiece of the mobile apparatus.

9C is the field lens of the eyepiece of the mobile apparatus.

10C is the eye lens of the eyepiece of the mobile apparatus.

11C is the front end of the zoom lens housing.

12C is the active photo sensitive surface of the optical image sensor array of the electronic image sensor array camera 28C of the mobile apparatus.

13C is the first lens of the zoom lens of the mobile apparatus.

14C is the second lens of the zoom lens of the mobile apparatus.

15C is the third lens of the zoom lens of the mobile apparatus.

16C is the fourth lens of the zoom lens of the mobile apparatus.

17C is the image plane of the mobile apparatus on the electronic image sensor array 12C.

18C is the zoom lens electronic actuator.
  18C is used by the observer to remotely control the functions of the zoom lens.
  The zoom lens functions are magnification control, iris diaphragm control, and focus control.
  When actuated by the observer, 18C mechanically rotates 19C to control the magnification of the zoom lens.
  When actuated by the observer, 18C mechanically rotates 20C to control the iris diaphragm of the zoom lens.
  When actuated by the observer, 18C mechanically rotates 21C to control the focus of the zoom lens.
  The observer can still maintain manual control of the zoom lens by rotating the adjustment rings by hand.
  The observer is enabled to adjust the focus for objects whose distances to the optical image source may be changing during an observing session. The observer can implement the change in focus either manually or electronically, locally or remotely, wirelessly or by hard wire.

19C is the magnification adjustment ring of the zoom lens.

20C is the iris diaphragm adjustment ring of the zoom lens.

21C is the focus adjustment ring of the zoom lens.

22C is the iris diaphragm of the zoom lens.

23C is the principal ray from a focal optical image source (not shown) to the mobile apparatus' eyepiece.

24C is the field stop of the eyepiece of the mobile apparatus. If the optical image source already is configured with a field stop, then 24C is unnecessary and will be unscrewed and removed from 3C, and the optical image source's field stop will be used instead.

25C shows where 3C is threaded into and joined with 1C.

26C is a threaded joint between modular enclosure 27C and modular enclosure 1C.

27C is a modular enclosure for the zoom lens housed in 11C.
  27C has male thread on its rear end for mating with the female thread on the front end of 1C.

24C is the threaded joint for connecting 1C and 3C.

25C is the threaded joint for connecting 27C and 3C.

26C is the threaded joint for connecting 1C and 27C.

27C is the zoom lens module enclosure.

28C is the electronic image sensor array camera showing its cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover. The electronic image sensor array camera as shown in the figure is comprised of a cover and an electronic image sensor array and its associated camera electronics. The sensor array, for example is a CCD, CMOS or other sensor array type.

28C is the electronic image sensor array camera showing the cover. The electronic image sensor array camera as shown in the figure is comprised of a cover and an electronic image sensor array. The electronic image sensor array camera is configured for providing electronic imagery signals to the observer and to the audience from a electrical connector port on its cover. The electronic image sensor array camera is configured for receiving electronic control commands from the observer, and furnishing electronic status signals to the observer from a electrical connector port on its cover. The sensor array, for example is a CCD, CMOS or other sensor array type.

29C is the battery. The battery is for supplying electricity to the electrical elements of the mobile apparatus.

30C is the end cap module. See FIG. 18 for reference.

Refer to FIG. 1 as a reference for the optical image source.

In the preferred embodiment shown in FIG. 3, the optical system of the mobile apparatus is comprised of an eyepiece and a zoom lens, and a image sensor array. The eyepiece is used in tandem with the zoom lens and the image sensor array. The eyepiece and the zoom lens and the image sensor array share a common optical and mechanical axis 6.

The eyepiece examples shown in the figures of all three preferred embodiments are of the Plossl type. The Plossl type eyepiece is chosen in our examples because of its simplicity and the ease of explanation of an eyepiece's functions. The Plossl has two identical lenses that are mounted back to back to one another in its housing. The Plossl has good overall optical performance and enjoys ease of manufacture. One of the needed desirable characteristics of the Plossl in the present invention, is its long eye relief. The long eye relief yields a long back focal length of the eyepiece and allows its exit pupil to be projected and refracted into the zoom lens coincident with the location of the zoom lens' entrance pupil which is the location of the eyepiece's exit pupil. This allows for the unvignetted passage of the eyepiece's light from the image formed by the optical image source's objective to the eyepiece's field stop and through the zoom lens without vignetting. For example, for a typical Plossl with a 25 mm effective focal length, the eye relief is generally about 16 mm. The eyepiece has a field stop which is imaged by the eyepiece to infinity, thereby collimating its image light to its exit pupil. The eyepiece refracts its exit pupil along the eyepiece's optical axis, and onto the entrance pupil of the zoom lens. The zoom lens sees an image, which is located at the field stop of the eyepiece, as though it was infinitely distant.

There are standard original equipment eyepiece housing diameters in common use today. They are for example 0.965", 0.905", 1.18", 1.25", 2" and 2.7" diameters.

The zoom lens example shown is of the afocal type. The afocal type zoom lens is chosen for its simplicity and ease of explanation for the general usage and operation of zoom lenses.

The afocal type has four lens groups in its assemblage. All four lens groups of the assembly are mounted inside the zoom lens' housing and aligned along a common optical and mechanical axis. Collimated light enters the first lens group of the lens assembly, from the eyepiece. The first lens group has a net positive power. The first lens group de-collimates the light and refracts and focuses an image from its field stop through the second lens.

The second lens group is physically movable along the optical axis of the zoom lens assembly. The second lens group has a net negative power. Movement of the second lens group along the optical axis changes the magnification of the zoom lens assembly. The second lens group projects an image in through the third lens group.

The third lens group has a net positive power. During an observing session, the observer can adjust the location of the second lens group either manually or automatically using a zoom lens actuator. The zoom lens actuator, under the control of the observer, physically moves the second lens group to adjust the zoom lens' magnification.

The zoom lens is designed so that the light exiting the third lens group is afocal and collimated back to infinity, no matter what the location is of the second lens group along the optical axis. Therefore, the diameter of the exit pupil formed by the third lens group varies with the location of the second lens group along the optical axis. The first, second and third lens groups thereby comprise an afocal optical system. The power of the afocal optical system is the ratio of the diameter of the entrance pupil of the first lens group to the diameter of the exit pupil formed from the third lens group.

The fourth lens group has a net positive power. Light received into the entrance pupil of the fourth lens group, afocally from the third lens group, is imaged by the fourth lens group onto the focal plane of the fourth lens group. Its focal plane i.e. image plane, lies on and coincident with, the active photo sensitive surface of an image sensor array. The image sensor array is an electronic component of a CCD or CMOS camera for example. The image sensor array is aligned on the optical axis of the zoom lens assembly such that its electronic imaging center line lies on the optical axis of the zoom lens assembly. The image sensor array and its associated camera electronics converts, i.e. transforms, the optical image it receives from the zoom lens assembly to electronic signals which represent the optical image.

Zoom lenses typically have three manual controls; a manually actuated control arm for magnification, a manually actuated control arm for the iris diaphragm, and a manually actuated control arm for focus for example.

The mobile apparatus shown in FIG. 3 is configured with a series of modular enclosures 1C, 3C, and 27C that are threaded together back to back in tandem with one another with a common mechanical and optical axis 6C. The enclosures 1C, 3C, and 27C are called modular because each one contains a single functional physical element, i.e. the eyepiece and the zoom lens and the image sensor array, where each modular enclosure and its elemental contents can be connected or disconnected from the other modular enclosures.

The eyepiece of the mobile apparatus is mounted and aligned inside modular enclosure 3C.

The zoom lens of the mobile apparatus is mounted and aligned inside modular enclosure 27C.

The image sensor array of the mobile apparatus is mounted and aligned inside modular enclosure 1C.

Modular enclosure 3C is threaded at its rear end.

Modular enclosure 27C is threaded at its front end and at its rear end.

Modular enclosure 1C is threaded at its front end and at its rear end. 3C and 27C and 1C have common threads.

Modular enclosure 3C screws into and connects with modular enclosure 27C at 25C.

Modular enclosure 27C screws into and connects with modular enclosure 1C at 26C.

The mobile apparatus can be easily dissembled into its respective modules by unscrewing and disconnecting them from one another. Maintenance and repair of the eyepiece, zoom lens, or image sensor array can be accomplished by disassembly of the mobile apparatus into its respective modular enclosures. Any dysfunctional physical elements, like for example a defective eyepiece, zoom lens, or image sensor array are then removed from their respective modular enclosures, and then worked on and repaired or replaced as needed. Replacement of dysfunctional eyepieces, zoom lenses, or image sensor arrays can be accomplished by removal of the dysfunctional physical element form its modular enclosure, and substituted for with a functional replacement physical element.

In addition, the observer can easily re-configure the mobile apparatus from a past configuration of the mobile apparatus used in previous mission observing sessions, to match new requirements put on the observer by new objects, new observing environments, changed observing locations of the observer, and new and different audiences. Reconfiguration means unscrewing un-needed modules, and screwing on new needed modules to the mobile apparatus which meet the observer's new observing requirements. The valuable benefits of the mobile apparatus' modular architectural theme are repeated in the present disclosure in FIG. 3-57 inclusive. Easy disassembly and re-configuration of the mobile apparatus, by the observer to meet the observer's new upcoming needs, is a valuable benefit of the mobile apparatus' flexible modular architecture. For example, substitution of eyepieces, zoom lenses, or image sensor arrays with other eyepieces, zoom lenses, or image sensor arrays to better match the job, match the environment, match the object, and match the audience, etc. can also be accomplished by disassembly of the mobile apparatus into its respective modules and substituting more appropriate modules in their place.

The optical image source's focal image of the object at 24C is optically acquired by the eyepiece module 3 and optically transformed into a afocal image and optically transferred to 27C. 27C optically transforms the afocal image into a focal image at 17C. The electronic image sensor array camera module 1C electronically transforms the focal image at 17C into electronic imagery signals, and transmits the electronic imagery signals from the output terminals of 1C via 30C to the observer and the observer's audience. The electronic imagery signals meet analog and/or digital protocols depending on the type of analog or digital electronics used by the observer in the electronic sensor array camera module 1C.

Figure 4A:
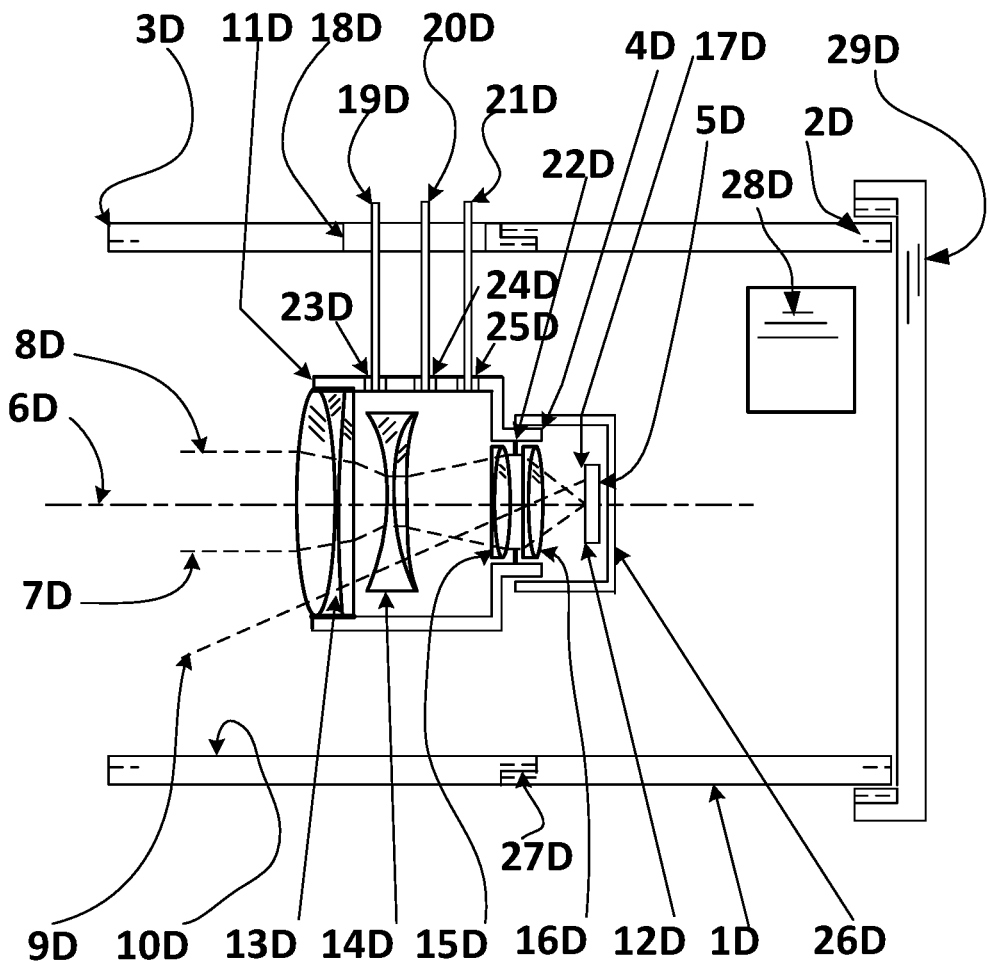
FIG. 4A shows a side view center section of the optical system schematic of a preferred embodiment of a mobile apparatus, where the mobile apparatus has a manually operated zoom lens, and the zoom lens has a magnification, iris diaphragm and focus controls, and where the modules which comprise the mobile apparatus are shown for a zoom lens, and for an electronic image sensor array camera.
Figure 4B:
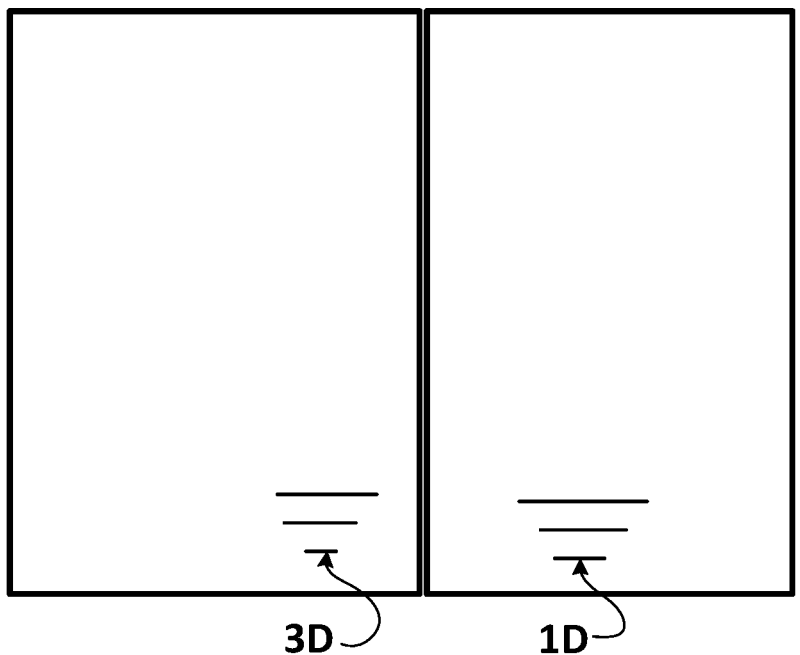
FIG. 4B shows a side view of the preferred embodiment of a mobile apparatus shown in FIG. 4A, showing the optically and mechanically connected zoom lens, and electronic image sensor array camera modules which comprise the mobile apparatus.

FIG. 4A and FIG. 4B

FIG. 4A shows a side view center section of the optical system schematic of a preferred embodiment of a mobile apparatus, where the mobile apparatus has a manually operated zoom lens, and the zoom lens has a magnification, iris diaphragm and focus controls, and where the modular enclosures which comprise the mobile apparatus are shown for a zoom lens, and for an electronic image sensor array camera.

FIG. 4B shows a side view of the preferred embodiment of a mobile apparatus shown in FIG. 4A, showing the optically and mechanically connected zoom lens module, and electronic image sensor array camera module which comprise the mobile apparatus.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures. The mobile apparatus shown in FIG. 4 is configured with a zoom lens module 3D and a electronic image sensor array camera module 1D.

The mobile apparatus disclosed in FIG. 4A and FIG. 4B is configured for being attached to and compatible with the optical image source shown in FIG. 2. The imagery from the optical image source to the zoom lens is afocal.

In the preferred embodiment of the apparatus shown, the observer can choose from both analog and digital video cameras in order to match the object being observed and the type of optical image source being used by the observer during the observing session, as well as the desired objectives of the observing session.

The zoom lens module is for optically transforming the afocal optical imagery into focal optical imagery and for optically transferring the focal imagery to the electronic image sensor array camera module for electronically transforming the focal optical imagery into electronic imagery signals.

Screw thread is shown in the figure as an example of a mechanical connecting means for mechanically connecting adjacent modular enclosures. Screw thread is an example of a mechanical connecting means. Screw threaded joints are a simple, inexpensive and space saving method especially for connecting enclosures having a cylindrical profile. The front ends of the module's 1D and 10D cylindrical enclosures are under cut and threaded with female threads. The rear ends of the module's cylindrical enclosures are over cut and threaded with male threads. The rear ends of the module's cylindrical enclosures mate with the front end of the module's cylindrical enclosures in order to connect the two modules together.

Screw thread is given in the present invention as an example of a mechanical connecting means. Other mechanical connecting means are also appropriate.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawing shown in FIG. 4A and FIG. 4B are identified as follows:

1D is the modular enclosure of the electronic image sensor array camera module of the mobile apparatus.

The Following is a List of Analog and Digital Protocols Met by the Electronic Image Sensor Array Camera Modules:

Analog Camera—NTSC Composite Video Output

Standard definition Digital Camera—SDI Serial digital interface output

High Definition Digital Camera—HDSDI High Definition Serial Digital Interface Output The Serial digital interface (SDI) is a family of digital video interfaces first standardized by SMPTE (The Society of Motion Picture and Television Engineers) in 1989.

For example, ITU-R BT.656 and SMPTE 259M define digital video interfaces used for commercial broadcast video.

A related standard, known as high-definition serial digital interface (HD-SDI), is standardized in SMPTE 292M; this provides a nominal data rate of 1.485 Gbit/s.

Additional SDI standards have been introduced to support increasing video resolutions (HD, UHD and beyond), frame rates, stereoscopic (3D) video, and color depth.

Dual link HD-SDI consists of a pair of SMPTE 292M links, standardized by SMPTE 372M in 1998 this provides service to a nominal 2.970 Gbit/s interface used in applications (such as digital cinema or HDTV 1080P) that require greater fidelity and resolution than standard HDTV can provide.

3G-SDI (standardized in SMPTE 424M) consists of a single 2.970 Gbit/s serial link that allows replacing dual link HD-SDI. 6G-SDI and 12G-SDI standards were published on Mar. 19, 2015.

These standards are used for transmission of uncompressed, unencrypted digital video signals (optionally including embedded audio and time code) within television facilities; they can also be used for packetized data.

Coaxial variants of the specification range in length but are typically less than 300 meters (980 ft). Fiber optic variants of the specification such as 297M allow for long-distance transmission limited only by maximum fiber length or repeaters.

SDI and HD-SDI are usually only available by licensing agreements which restrict their use to licensed manufacturers.

The SDI and HDSDI interfaces are unencrypted and uncompressed.

Audio—Both the HD and SD serial interfaces provide for 16 channels of embedded audio. The two interfaces use different audio encapsulation methods—SD uses the SMPTE 272M standard, whereas HD uses the SMPTE 299M standard. In either case, an SDI signal may contain up to sixteen audio channels (8 pairs) embedded 48 kHz, 24-bit audio channels along with the video. Typically, 48 kHz, 24-bit (20-bit in SD, but extendable to 24 bit) PCM audio is stored, in a manner directly compatible with the AES3 digital audio interface.

The various versions of the serial digital interface support numerous video formats.

The 270 Mbit/s interface supports 525-line, interlaced video at a 59.94 Hz field rate (29.97 Hz frame rate), and 625-line, 50 Hz interlaced video. These formats are highly compatible with NTSC and PAL-B/G/D/K/I systems respectively; and the terms NTSC and PAL are often (incorrectly) used to refer to these formats. (PAL is a composite color encoding scheme, and the term does not define the line-standard, though it is most usually encountered with 625i) while the serial digital interface—other than the obsolete 143 Mbit/s and 177 Mbit/s forms—is a component standard. The 360 Mbit/s interface supports 525i and 625i widescreen. It can also be used to support 525p, if 4:2:0 sampling is used.

The various 540 Mbit/s interfaces support 525p and 625p formats.

The nominal 1.5 Gbit/s interfaces support most high-definition video formats.

Supported formats include 1080/60i, 1080/59.94i, 1080/50i, 1080/30p, 1080/29.97p, 1080/25p, 1080/24p, 1080/23.98p, 720/60p, 720/59.94p, and 720/50p. In addition, there are several 1035i formats (an obsolete Japanese television standard), half-bandwidth 720p standards such as 720/24p (used in some film conversion applications, and unusual because it has an odd number of samples per line [citation needed]), and various 1080psf (progressive, segmented frame) formats. Progressive Segmented frames formats appear as interlace video but contain video which is progressively scanned. This is done to support analog monitors and televisions, many of which are incapable of locking to low field rates such as 30 Hz and 24 Hz.

The dual link HD interface supports 1080/60p, 1080/59.94p, and 1080/50p, as well as 4:4:4 encoding, greater color depth, RGB encoding, alpha channels, and nonstandard resolutions (often encountered in computer graphics or digital cinema). A quad link interface of HD-SDI supports UHDTV-1 resolution 2160/60p 2D is the tail end of 1D. The external diameter of 1D is threaded at 2D.

3D is the front end of the modular enclosure of the zoom lens module of the mobile apparatus. The internal diameter of 3D is threaded at its front end. 3D has male thread on its rear end for mating with the female thread on the front end of 1D.

4D is the tail end of the zoom lens housing of the mobile apparatus.

5D is the inactive rear of the image sensor array of the mobile apparatus.

6D is the optical axis of the mobile apparatus.

7D is a marginal rim ray of the mobile apparatus. 7D originates from an afocal image produced by a optical image source (not shown).

8D is a marginal rim ray of the mobile apparatus. 8D originates from an afocal image produced by a optical image source (not shown).

9D is a principal ray of the mobile apparatus. 9D originates from an afocal image produced by a optical image source (not shown).

10D is the contact surface inside diameter of the outer enclosure of the mobile apparatus for attaching the mobile apparatus to the optical image source.

11D is the front end of the housing of the zoom lens of the mobile apparatus.

The zoom lens functions are magnification control, iris diaphragm control, and focus control.

When actuated manually by the observer, 19D controls the magnification of the zoom lens, 20D controls the iris diaphragm of the zoom lens, 21D controls the focus of the zoom lens.

The observer can maintain manual control of the zoom lens by rotating the adjustment rings by hand.

The observer is enabled to adjust the focus for objects whose distances to the optical image source may be changing during an observing session.

12D is the front optically active surface of the image sensor array of the electronic image sensor array camera of the mobile apparatus.

13D is the first lens of the zoom lens assembly of the mobile apparatus.

14D is the second lens of the zoom lens assembly of the mobile apparatus.

15D is the third lens of the zoom lens assembly of the mobile apparatus.

16D is the fourth lens of the zoom lens assembly of the mobile apparatus.

17D is the image plane of the mobile apparatus.

18D is the front end of a slot in the outer enclosure of the mobile apparatus.

19D is a lever arm for manually adjusting the magnification of the zoom lens. 19D is for rotating 23D.

20D is a lever arm for manually adjusting the iris diaphragm of the zoom lens. 20D is for rotating 24D.

21D is a lever arm for manually adjusting the focus of the zoom lens. 21D is for rotating 25D.

22D is the iris diaphragm of the zoom lens.

23D is the control ring for adjusting the magnification of the zoom lens.

24D is the control ring for adjusting the iris diaphragm of the zoom lens.

25D is the control ring for adjusting the focus of the zoom lens.

26D is the electronic image sensor array camera showing its cover. The electronic image sensor array camera is configured for providing electronic imagery signals to the observer from a electrical connector port on its cover. The electronic image sensor array camera is configured for receiving electronic control commands from the observer, and furnishing electronic status signals to the observer and to the audience from a electrical connector port on its cover.

The electronic image sensor array camera as shown in the figure is comprised of a cover and an electronic image sensor array and its associated camera electronics. The sensor array, for example is a CCD, CMOS or other sensor array type.

27D is the threaded joint for connecting 1D and 3D.

28D is the battery. The battery is for supplying electricity to the electrical elements of the mobile apparatus.

29D is the end cap module. See FIG. 18 for reference.

Refer to FIG. 2 as a reference for the optical image source.

In the preferred embodiment shown in FIG. 4A and FIG. 4B, the optical system of the mobile apparatus is comprised of a zoom lens, and a image sensor array. The zoom lens is used in tandem with the image sensor array. The zoom lens and the image sensor array share a common optical and mechanical axis.

The exit pupil of the afocal optical image source is projected and refracted into the zoom lens' entrance pupil. This allows for the unvignetted passage of the light from the afocal image formed by the optical image source and through the zoom lens and focused on the image sensor array without vignetting.

The zoom lens example shown is of the afocal type. The afocal type zoom lens is chosen for its simplicity and ease of explanation for the general usage and operation of zoom lenses.

The afocal type has four lens groups in its assemblage. All four lens groups of the assembly are mounted inside the zoom lens' housing and aligned along a common optical and mechanical axis. Collimated light enters the first lens group of the lens assembly, from the eyepiece. The first lens group has a net positive power. The first lens group de-collimates the light and refracts and focuses an image from its field stop through the second lens.

The second lens group is physically movable along the optical axis of the zoom lens assembly. The second lens group has a net negative power. Movement of the second lens group along the optical axis changes the magnification of the zoom lens assembly. The second lens group projects an image in through the third lens group.

The third lens group has a net positive power. During an observing session, the observer can adjust the location of the second lens group either manually or automatically using a zoom lens actuator. The zoom lens actuator, under the control of the observer, physically moves the second lens group to adjust the zoom lens' magnification.

The zoom lens is designed so that the light exiting the third lens group is afocal and collimated back to infinity, no matter what the location is of the second lens group along the optical axis. Therefore, the diameter of the exit pupil formed by the third lens group varies with the location of the second lens group along the optical axis. The first, second and third lens groups thereby comprise an afocal optical system. The power of the afocal optical system is the ratio of the diameter of the entrance pupil of the first lens group to the diameter of the exit pupil formed from the third lens group.

The fourth lens group has a net positive power. Light received into the entrance pupil of the fourth lens group, afocally from the third lens group, is imaged by the fourth lens group onto the focal plane of the fourth lens group. Its focal plane i.e. image plane, lies on and coincident with, the active photo sensitive surface of an image sensor array. The image sensor array is an electronic component of a CCD or CMOS camera for example. The image sensor array is aligned on the optical axis of the zoom lens assembly such that its electronic imaging center line lies on the optical axis of the zoom lens assembly. The image sensor array converts, i.e. transforms, the optical image it receives from the zoom lens assembly to electronic signals which represent the optical image.

Zoom lenses typically have three manual controls; a manually actuated control arm for magnification, a manually actuated control arm for the iris diaphragm, and a manually actuated control arm for focus for example.

The mobile apparatus shown in FIG. 4A and FIG. 4B is configured with a series of modular enclosures 1D and 3D that are threaded together back to back in tandem with one another with a common mechanical and optical axis 6D. The enclosures 1D and 3D are called modular because each one contains a single functional physical element, i.e. the zoom lens 11D and the image sensor array camera 26D, where each modular enclosure and its elemental contents can be connected or disconnected from the other modular enclosures.

The eyepiece of the mobile apparatus is mounted and aligned inside modular enclosure 3D. The zoom lens of the mobile apparatus is mounted and aligned inside modular enclosure 27D. The image sensor array of the mobile apparatus is mounted and aligned inside modular enclosure 1D. Modular enclosure 3D is threaded at its rear end. Modular enclosure 27D is threaded at its front end and at its rear end. Modular enclosure 1D is threaded at its front end and at its rear end. 3D and 27D and 1D have common threads. Modular enclosure 3D screws into and connects with modular enclosure 27D at 25D. Modular enclosure 27D screws into and connects with modular enclosure 1D at 26D.

The mobile apparatus can be dissembled into its respective modules by unscrewing and disconnecting them, i.e. their modular enclosures, from one another. Maintenance and repair of the eyepiece, zoom lens, or image sensor array camera can be accomplished by disassembly of the mobile apparatus into its respective modules, i.e. modular enclosures. The dysfunctional physical elements like for example a defective eyepiece, zoom lens, or image sensor array are then removed from their respective modular enclosures, and then worked on as needed. Replacement of dysfunctional eyepieces, zoom lenses, or image sensor arrays can be accomplished by removal of the dysfunctional physical element from its modular enclosure, and substituted for with a functional replacement physical element. Substitution of zoom lenses, or image sensor arrays with other zoom lenses, or image sensor arrays to better match the job, match the environment, match the object, and match the audience, etc. can also be accomplished by disassembly of the mobile apparatus into its respective modules and substituting more appropriate modules in their place.

The optical image source's afocal image of the object is optically acquired by the zoom lens module 3D and optically transformed into a focal image at 17D of 1D. 1D electronically transforms the focal image at 17D into electronic imagery signals which are transmitted to the observer and the observer's audience via the signal output terminals on 29D.

FIG. 4C

Figure 4C:
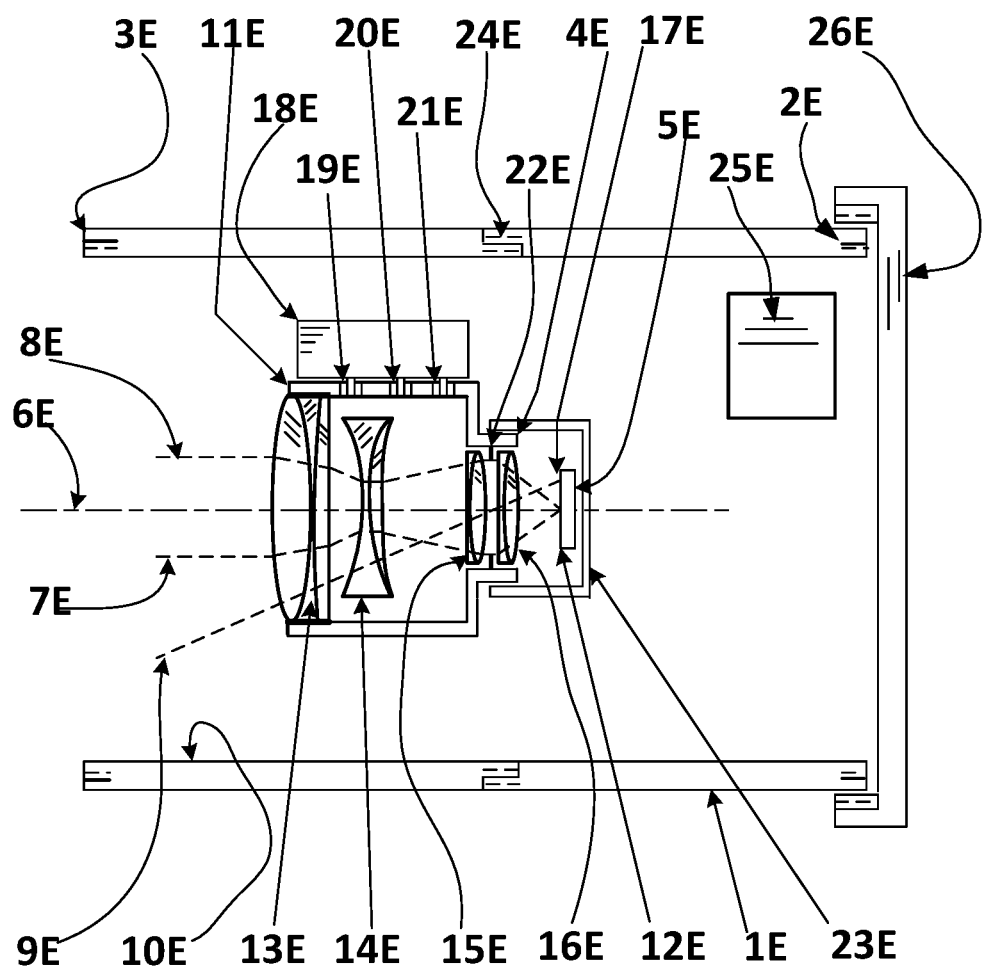
FIG. 4C shows a side view section of the optical system schematic of a preferred embodiment of a mobile apparatus where the zoom lens functions are operated with a zoom lens electro-mechanical actuator, and where the modules which comprise the mobile apparatus are shown for the zoom lens, and for the electronic image sensor array camera.

FIG. 4C shows a side view center section of the optical system schematic of a preferred embodiment of a mobile apparatus where the zoom lens functions are operated with a zoom lens electro-mechanical actuator, and where the modular enclosures which comprise the mobile apparatus are shown for the zoom lens, and for the electronic image sensor array camera.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The mobile apparatus shown in FIG. 4 is configured with a zoom lens module 3 and a electronic image sensor array camera module 1E.

The mobile apparatus disclosed in FIG. 4C is configured for being attached to and compatible with the optical image source shown in FIG. 2. The imagery from the optical image source to the zoom lens is afocal.

The zoom lens module is for optically transforming the afocal optical imagery into focal optical imagery and for optically transferring the focal imagery to the electronic image sensor array camera module for electronically transforming the focal optical imagery into electronic imagery signals.

Screw thread is shown in the figure as an example of a mechanical connecting means for mechanically connecting adjacent modular enclosures. Screw thread is an example of a mechanical connecting means. Screw threaded joints are a simple, inexpensive and space saving method especially for connecting enclosures having a cylindrical profile. The front ends of the module's 10E and 1E cylindrical enclosures are under cut and threaded with female threads. The rear ends of the module's cylindrical enclosures are over cut and threaded with male threads. The rear ends of the module's cylindrical enclosures i.e. 10E mate with the front end of the module's cylindrical enclosures 1E in order to connect the two modules together.

Screw thread is given in the present invention as an example of a mechanical connecting means. Other mechanical connecting means are also appropriate, for example snap-fit connections.

The detailed physical elements disclosed in the drawing shown in FIG. 4C are identified as follows:

1E is the modular enclosure of the electronic image sensor array camera module of the electronic image sensor array camera 26E. Hard wire cable (the cable is not shown) carries the video signal from an output port on the electronic image sensor array camera to the observer for the observer to hook up to and disseminate to his audience under the control of the observer. Alternately, if the observer prefers, the observer can run a cable from the output port on the electronic image sensor array camera directly to the observer's audience. The internal diameter at 21E is threaded.

The Following is a List of Analog and Digital Protocols Met by the Electronic Image Sensor Array Camera Modules
  Analog Camera—NTSC composite Video output
  Standard definition Digital Camera—SDI Serial digital interface output
  High definition Digital Camera—HDSDI High definition serial digital interface output
  The Serial digital interface (SDI) is a family of digital video interfaces first standardized by SMPTE (The Society of Motion Picture and Television Engineers) in 1989.
  For example, ITU-R BT.656 and SMPTE 259M define digital video interfaces used for commercial broadcast video. A related standard, known as high-definition serial digital interface (HD-SDI), is standardized in SMPTE 292M; this provides a nominal data rate of 1.485 Gbit/s.
  Additional SDI standards have been introduced to support increasing video resolutions (HD, UHD and beyond), frame rates, stereoscopic (3D) video, and color depth.
  Dual link HD-SDI consists of a pair of SMPTE 292M links, standardized by SMPTE 372M in 1998 this provides service to a nominal 2.970 Gbit/s interface used in applications (such as digital cinema or HDTV 1080P) that require greater fidelity and resolution than standard HDTV can provide. 3G-SDI (standardized in SMPTE 424M) consists of a single 2.970 Gbit/s serial link that allows replacing dual link HD-SDI. 6G-SDI and 12G-SDI standards were published on Mar. 19, 2015.
  These standards are used for transmission of uncompressed, unencrypted digital video signals (optionally including embedded audio and time code) within television facilities; they can also be used for packetized data. Coaxial variants of the specification range in length but are typically less than 300 meters (980 ft). Fiber optic variants of the specification such as 297M allow for long-distance transmission limited only by maximum fiber length or repeaters.
  SDI and HD-SDI are usually only available by licensing agreements which restrict their use to licensed manufacturers. The SDI and HDSDI interfaces are unencrypted and uncompressed.
  Audio—Both the HD and SD serial interfaces provide for 16 channels of embedded audio. The two interfaces use different audio encapsulation methods—SD uses the SMPTE 272M standard, whereas HD uses the SMPTE 299M standard. In either case, an SDI signal may contain up to sixteen audio channels (8 pairs) embedded 48 kHz, 24-bit audio channels along with the video. Typically, 48 kHz, 24-bit (20-bit in SD, but extendable to 24 bit) PCM audio is stored, in a manner directly compatible with the AES3 digital audio interface.
  The various versions of the serial digital interface support numerous video formats.
  The 270 Mbit/s interface supports 525-line, interlaced video at a 59.94 Hz field rate (29.97 Hz frame rate), and 625-line, 50 Hz interlaced video. These formats are highly compatible with NTSC and PAL-B/G/D/K/I systems respectively; and the terms NTSC and PAL are often (incorrectly) used to refer to these formats. (PAL is a composite color encoding scheme, and the term does not define the line-standard, though it is most usually encountered with 625i) while the serial digital interface—other than the obsolete 143 Mbit/s and 177 Mbit/s forms—is a component standard.
  The 360 Mbit/s interface supports 525i and 625i widescreen. It can also be used to support 525p, if 4:2:0 sampling is used.
  The various 540 Mbit/s interfaces support 525p and 625p formats.
  The nominal 1.5 Gbit/s interfaces support most high-definition video formats.
  Supported formats include 1080/60i, 1080/59.94i, 1080/50i, 1080/30p, 1080/29.97p, 1080/25p, 1080/24p, 1080/23.98p, 720/60p, 720/59.94p, and 720/50p. In addition, there are several 1035i formats (an obsolete Japanese television standard), half-bandwidth 720p standards such as 720/24p (used in some film conversion applications, and unusual because it has an odd number of samples per line[citation needed]), and various 1080psf (progressive, segmented frame) formats. Progressive Segmented frames formats appear as interlace video but contain video which is progressively scanned. This is done to support analog monitors and televisions, many of which are incapable of locking to low field rates such as 30 Hz and 24 Hz.
  The dual link HD interface supports 1080/60p, 1080/59.94p, and 1080/50p, as well as 4:4:4 encoding, greater color depth, RGB encoding, alpha channels, and nonstandard resolutions (often encountered in computer graphics or digital cinema). A quad link interface of HD-SDI supports UHDTV-1 resolution 2160/60p.

2E is the tail end of 1E. The external diameter of 1E is threaded at 2E. 2E is for connecting to other modules chosen by the observer.

3E is the front end of the modular enclosure of the zoom lens module of the mobile apparatus. The internal diameter of 3E is threaded at its front end. The threaded end is for connecting to other modules as chosen by the observer.

4E is the tail end of the zoom lens housing of the mobile apparatus.

5E is the inactive rear of the image sensor array of the mobile apparatus.

6E is the optical axis of the mobile apparatus.

7E is a marginal rim ray of the mobile apparatus. 7E originates from an afocal image produced by a optical image source (not shown).

8E is a marginal rim ray of the mobile apparatus. 8E originates from an afocal image produced by a optical image source (not shown).

9E is a principal ray of the mobile apparatus. 9E originates from an afocal image produced by a optical image source (not shown).

10E is the contact surface inside diameter of the outer enclosure of the mobile apparatus for attaching the mobile apparatus to the optical image source.

11E is the front end of the housing of the zoom lens of the mobile apparatus.

12E is the front optically active surface of the image sensor array of the electronic image sensor array camera of the of the mobile apparatus.

13E is the first lens of the zoom lens assembly of the mobile apparatus.

14E is the second lens of the zoom lens assembly of the mobile apparatus.

15E is the third lens of the zoom lens assembly of the mobile apparatus.

16E is the fourth lens of the zoom lens assembly of the mobile apparatus.

17E is the image plane of the mobile apparatus.

18E is the zoom lens actuator.
- 18E is used by the observer to remotely control the functions of the zoom lens.
- The zoom lens functions are magnification control, iris diaphragm control, and focus control.
- When actuated by the observer, 18E mechanically rotates 19E to control the magnification of the zoom lens.
- When actuated by the observer, 18E mechanically rotates 20E to control the iris diaphragm of the zoom lens.
- When actuated by the observer, 18E mechanically rotates 21E to control the focus of the zoom lens.
- The observer can still maintain control of the zoom lens by manually rotating the adjustment rings.
- The observer is enabled to adjust the focus at the electronic image sensor array for objects whose distances to the optical image source may be changing during an observing session. The observer can implement the change in focus at the zoom lens either manually or electronically, locally or remotely, wirelessly or by hard wire.

19E is an adjustment ring used for the actuator to adjust the magnification of the zoom lens.

20E is an adjustment ring used for the actuator to adjust the iris diaphragm of the zoom lens.

21E is an adjustment ring used for the actuator to adjust the focus of the zoom lens.

22E is the iris diaphragm of the zoom lens.

23E is the electronic image sensor array camera showing its cover. The electronic image sensor array camera is configured for providing electronic imagery signals to the observer from a electrical connector port on its cover. The electronic image sensor array camera is configured for receiving electronic control commands from the observer, and furnishing electronic status signals to the observer and to the audience from a electrical connector port on its cover. The electronic image sensor array camera as shown in the figure is comprised of a cover and an electronic image sensor array and its associated camera electronics. The sensor array, for example is a CCD, CMOS or other sensor array type.

24E is the threaded joint for connecting 1E and 3E.

25E is the battery. The battery is for supplying electricity to the electrical elements of the mobile apparatus.

26E is the end cap module. See FIG. 18 for reference.

Refer to FIG. 2 as a reference for the optical image source.

The mobile apparatus shown in FIG. 4C is configured with a series of modular enclosures 1E and 3E that are threaded together back to back in tandem with one another with a common mechanical and optical axis 6E. The enclosures 1E and 3E are called modular because each one contains a single functional physical element, i.e. the zoom lens 11E and the image sensor array camera 26E, where each modular enclosure and its elemental contents can be connected or disconnected from the other modular enclosures.

Substitution of zoom lenses, or image sensor arrays with other zoom lenses, or image sensor arrays to better match the job, match the environment, match the object, and match the audience, etc. can also be accomplished by disassembly of the mobile apparatus into its respective modules and substituting more appropriate modules in their place.

The optical image source's afocal image of the object is optically acquired by the zoom lens module 3E and optically transformed into a focal image at 17E of 1E. 1E transforms the focal image at 17E into electronic imagery signals. The electronic imagery signals are transmitted to the observer via the output terminals on 26E.

FIG. 5

FIG. 5 shows a side view section of the optical system schematic of a preferred embodiment of a mobile apparatus attached to the optical system of a typical optical image source, where the mobile apparatus has its own eyepiece, but where the optical image source does not have its own original equipment eyepiece.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

In the preferred embodiment of the apparatus shown, the observer can choose from both analog and digital video cameras in order to match the object being observed and the type of optical image source being used by the observer during the observing session, as well as the desired objectives of the observing session.

The mobile apparatus shown in FIG. 5 is configured with a eyepiece module, a zoom lens module 24F and a electronic image sensor array camera module.

The mobile apparatus disclosed in FIG. 5 is configured for being attached to and compatible with the optical image source shown in FIG. 1. The imagery from the optical image source to 5F is focal.

The eyepiece module is for optically acquiring and transforming and transferring the focal optical imagery from the optical image source into afocal optical imagery to the zoom lens module. The zoom lens module is for optically transforming the afocal optical imagery into focal optical imagery and for optically transferring the focal imagery to the electronic image sensor array camera module for electronically transforming the focal optical imagery into electronic imagery signals.

Screw thread is shown in the figure as an example of a mechanical connecting means for mechanically connecting adjacent modular enclosures. Screw thread is an example of a mechanical connecting means. Screw threaded joints are a simple, inexpensive and space saving method especially for connecting enclosures having a cylindrical profile. Screw threaded joints are a simple, inexpensive and space saving method especially for connecting enclosures having a cylindrical profile. The front ends of the module's 24F and 21F cylindrical enclosures are under cut and threaded with female threads. The rear ends of the module's cylindrical enclosures are over cut and threaded with male threads. The rear ends of the module's cylindrical enclosures i.e. 24F mate with the front end of the module's cylindrical enclosures 21F in order to connect the two modules together.

Screw thread is given in the present invention as an example of a mechanical connecting means. Other mechanical connecting means are also appropriate for example snap-fit connections.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawing shown in FIG. 5 are identified as follows:

1F is the aperture stop and entrance pupil of the optical image source.
2F is the optical axis of the optical image source.
3F is the housing of the optical image source.
4F is the principal ray of the optical image source.
5F is the image plane of the optical image source.
6F is a typical marginal rim ray of the optical image source.
7F is the optical system of the optical image source.
   For many optical image sources, the full and complete optical system of the optical image source is far more complex than just the single doublet lens shown in FIG. 1, and is comprised of multiple lenses, mirrors and prisms. The single doublet lens shown is only meant to simplify the drawing and only symbolically represents the full and complete optical system of the optical image source.
8F is the is the inside diameter of the barrel of the housing 3F of the optical image source. Typically, optical image sources are manufactured with barrel enclosures as original standard equipment. The barrel enclosures are the structural body of the optical image sources and are manufactured for housing and enclosing the contents of the optical image sources.
9F is the field lens of a typical eyepiece of the mobile apparatus.
10F is the eye lens of the typical eyepiece of the mobile apparatus.
11F is the housing of the typical zoom lens of the zoom lens module of the mobile apparatus.
   The zoom lens functions are magnification control, iris diaphragm control, and focus control.
   The observer can manually control the magnification of the zoom lens, manually control the iris diaphragm of the zoom lens, manually control the focus of the zoom lens.
   The observer can exercise manual control of the zoom lens by rotating the adjustment rings by hand.
   The observer is enabled to manually adjust the focus for objects whose distances to the optical image source may be changing during an observing session.
12F is the enclosure of the eyepiece module of the optical image source showing its outside diameter.
13F is the first lens of the mobile apparatus' zoom lens.
14F is the second lens of the mobile apparatus' zoom lens.
15F is the third lens of the mobile apparatus' zoom lens.
16F is the fourth lens of the mobile apparatus' zoom lens.
17F is the image plane of the mobile apparatus.
18F is the optically active surface of the image sensor array of the electronic image sensor array camera 26F of the mobile apparatus.
19F is the optically inactive rear of the image sensor array of the mobile apparatus.
20F is the tail end of the mobile apparatus' zoom lens' housing.
21F is the tail end of the mobile apparatus' modular enclosure of the electronic image sensor array camera module of the electronic image sensor array camera 26F. Hard wire cable (the cable is not shown) carries the video signal from an output port on the electronic image sensor array camera to the observer for the observer to hook up to and disseminate to his audience under the control of the observer. Alternately, if the observer prefers, the observer can run a cable from the output port on the electronic image sensor array camera directly to the observer's audience. The internal diameter at 21F is threaded.

The Following is a List of Analog and Digital Protocols Met by the Electronic Image Sensor Array Camera Modules
   Analog Camera—NTSC composite Video output
   Standard definition Digital Camera—SDI Serial digital interface output
   High definition Digital Camera—HDSDI High definition serial digital interface output
   The Serial digital interface (SDI) is a family of digital video interfaces first standardized by SMPTE (The Society of Motion Picture and Television Engineers) in 1989.
   For example, ITU-R BT.656 and SMPTE 259M define digital video interfaces used for commercial broadcast video.
   A related standard, known as high-definition serial digital interface (HD-SDI), is standardized in SMPTE 292M; this provides a nominal data rate of 1.485 Gbit/s.
   Additional SDI standards have been introduced to support increasing video resolutions (HD, UHD and beyond), frame rates, stereoscopic (3D) video, and color depth.
   Dual link HD-SDI consists of a pair of SMPTE 292M links, standardized by SMPTE 372M in 1998 this provides service to a nominal 2.970 Gbit/s interface used in applications (such as digital cinema or HDTV 1080P) that require greater fidelity and resolution than standard HDTV can provide.
   3G-SDI (standardized in SMPTE 424M) consists of a single 2.970 Gbit/s serial link that allows replacing dual link HD-SDI. 6G-SDI and 12G-SDI standards were published on Mar. 19, 2015.
   These standards are used for transmission of uncompressed, unencrypted digital video signals (optionally including embedded audio and time code) within television facilities; they can also be used for packetized data.
   Coaxial variants of the specification range in length but are typically less than 300 meters (980 ft). Fiber optic variants of the specification such as 297M allow for long-distance transmission limited only by maximum fiber length or repeaters.
   SDI and HD-SDI are usually only available by licensing agreements which restrict their use to licensed manufacturers. The SDI and HDSDI interfaces are unencrypted and uncompressed.
   Audio—Both the HD and SD serial interfaces provide for 16 channels of embedded audio. The two interfaces use different audio encapsulation methods—SD uses the SMPTE 272M standard, whereas HD uses the SMPTE 299M standard. In either case, an SDI signal may contain up to sixteen audio channels (8 pairs) embedded 48 kHz, 24-bit audio channels along with the video. Typically, 48 kHz, 24-bit (20-bit in SD, but extendable to 24 bit) PCM audio is stored, in a manner directly compatible with the AES3 digital audio interface.

The various versions of the serial digital interface support numerous video formats.

The 270 Mbit/s interface supports 525-line, interlaced video at a 59.94 Hz field rate (29.97 Hz frame rate), and 625-line, 50 Hz interlaced video. These formats are highly compatible with NTSC and PAL-B/G/D/K/I systems respectively; and the terms NTSC and PAL are often (incorrectly) used to refer to these formats. (PAL is a composite color encoding scheme, and the term does not define the line-standard, though it is most usually encountered with 625i) while the serial digital interface—other than the obsolete 143 Mbit/s and 177 Mbit/s forms—is a component standard.

The 360 Mbit/s interface supports 525i and 625i widescreen. It can also be used to support 525p, if 4:2:0 sampling is used.

The various 540 Mbit/s interfaces support 525p and 625p formats.

The nominal 1.5 Gbit/s interfaces support most high-definition video formats.

Supported formats include 1080/60i, 1080/59.94i, 1080/50i, 1080/30p, 1080/29.97p, 1080/25p, 1080/24p, 1080/23.98p, 720/60p, 720/59.94p, and 720/50p. In addition, there are several 1035i formats (an obsolete Japanese television standard), half-bandwidth 720p standards such as 720/24p (used in some film conversion applications, and unusual because it has an odd number of samples per line[citation needed]), and various 1080psf (progressive, segmented frame) formats. Progressive Segmented frames formats appear as interlace video but contain video which is progressively scanned. This is done to support analog monitors and televisions, many of which are incapable of locking to low field rates such as 30 Hz and 24 Hz.

The dual link HD interface supports 1080/60p, 1080/59.94p, and 1080/50p, as well as 4:4:4 encoding, greater color depth, RGB encoding, alpha channels, and nonstandard resolutions (often encountered in computer graphics or digital cinema). A quad link interface of HD-SDI supports UHDTV-1 resolution 2160/60p.

22F is the field stop of the mobile apparatus' eyepiece.

If the optical image source already is configured with a field stop, then 22F is unnecessary and will be unscrewed and removed from 8F, and the optical image source's field stop will be used instead.

23F shows where 12F is joined and threaded into 24F.

24F is the modular enclosure for the zoom lens 11F module.

25F is the threaded joint between 24F and 21F.

26F is the electronic image sensor array camera showing its cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.

The electronic image sensor array camera as shown in the figure is comprised of a cover and an electronic image sensor array and its associated camera electronics. The sensor array, for example is a CCD, CMOS or other sensor array type.

27F is the is the outside diameter of the barrel of the housing 3F of the optical image source.

28F is the battery. The battery is for supplying electricity to the electrical elements of the mobile apparatus.

29F is the end cap module. See FIG. 18 for reference.

Refer to FIG. 1 as a reference for the optical image source.

In the preferred embodiment shown in FIG. 5, the optical system of the mobile apparatus is comprised of an eyepiece and a zoom lens, and a image sensor array. The eyepiece is used in tandem with the zoom lens and the image sensor array. The eyepiece and the zoom lens and the image sensor array share a common optical and mechanical axis 6F.

The eyepiece examples shown in the figures of all three preferred embodiments are of the Plossl type. The Plossl type eyepiece is chosen in our examples because of its simplicity and the ease of explanation of an eyepiece's functions. The Plossl has two identical lenses that are mounted back to back to one another in its housing. The Plossl has good overall optical performance and enjoys ease of manufacture.

One of the needed desirable characteristics of the Plossl in the present invention, is its long eye relief. The long eye relief yields a long back focal length of the eyepiece and allows its exit pupil to be projected and refracted into the zoom lens coincident with the location of the zoom lens' entrance pupil which is the location of the eyepiece's exit pupil. This allows for the unvignetted passage of the eyepiece's light from the image formed by the optical image source's objective to the eyepiece's field stop and through the zoom lens without vignetting.

For example, for a typical Plossl with a 25 mm effective focal length, the eye relief is generally about 16 mm. The eyepiece has a field stop which is imaged by the eyepiece to infinity, thereby collimating its image light to its exit pupil. The eyepiece refracts its exit pupil along the eyepiece's optical axis, and onto the entrance pupil of the zoom lens. The zoom lens sees an image, which is located at the field stop of the eyepiece, as though it was infinitely distant.

There are standard eyepiece housing diameters in common use today. They are for example 0.965", 0.905", 1.18", 1.25", 2" and 2.7" diameters.

The zoom lens example shown is of the afocal type. The afocal type zoom lens is chosen for its simplicity and ease of explanation for the general usage and operation of zoom lenses.

The afocal type has four lens groups in its assemblage. All four lens groups of the assembly are mounted inside the zoom lens' housing and aligned along a common optical and mechanical axis. Collimated light enters the first lens group of the lens assembly, from the eyepiece. The first lens group has a net positive power. The first lens group de-collimates the light and refracts and focuses an image from its field stop through the second lens.

The second lens group is physically movable along the optical axis of the zoom lens assembly. The second lens group has a net negative power. Movement of the second lens group along the optical axis changes the magnification of the zoom lens assembly. The second lens group projects an image in through the third lens group.

The third lens group has a net positive power. During an observing session, the observer can adjust the location of the second lens group either manually or automatically using a zoom lens actuator. The zoom lens actuator, under the control of the observer, physically moves the second lens group to adjust the zoom lens' magnification.

The zoom lens is designed so that the light exiting the third lens group is afocal and collimated back to infinity, no matter what the location is of the second lens group along the optical axis. Therefore, the diameter of the exit pupil formed by the third lens group varies with the location of the second lens group along the optical axis. The first, second and third lens groups thereby comprise an afocal optical system. The power of the afocal optical system is the ratio of the diameter of the entrance pupil of the first lens group to the diameter of the exit pupil formed from the third lens group.

The fourth lens group has a net positive power. Light received into the entrance pupil of the fourth lens group, afocally from the third lens group, is imaged by the fourth lens group onto the focal plane of the fourth lens group. Its focal plane i.e. image plane, lies on and coincident with, the active photo sensitive surface of an image sensor array. The image sensor array is an electronic component of a CCD or CMOS camera for example. The image sensor array is aligned on the optical axis of the zoom lens assembly such that its electronic imaging center line lies on the optical axis of the zoom lens assembly. The image sensor array converts, i.e. transforms, the optical image it receives from the zoom lens assembly to electronic signals which represent the optical image.

Zoom lenses typically have three manual controls; a manually actuated control arm for magnification, a manually actuated control arm for the iris diaphragm, and a manually actuated control arm for focus for example.

The mobile apparatus shown in FIG. 5 is configured with a series of modular enclosures 21F, 12F, and 24F that are threaded together back to back in tandem with one another with a common mechanical and optical axis 6F. The enclosures are called modular because each one contains a single functional physical element, i.e. the eyepiece and the zoom lens and the image sensor array camera, where each modular enclosure and its elemental contents can be connected or disconnected from the other modular enclosures. The combination of the modular enclosure and its contents is referred to as a module.

The eyepiece of the mobile apparatus is mounted and aligned inside modular enclosure 3F.

The zoom lens of the mobile apparatus is mounted and aligned inside modular enclosure 27F.

The image sensor array of the mobile apparatus is mounted and aligned inside modular enclosure 1F.

Modular enclosure 3F is threaded at its rear end.

Modular enclosure 27F is threaded at its front end and at its rear end.

Modular enclosure 1F is threaded at its front end and at its rear end. 3F and 27F and 1F have common threads.

Modular enclosure 3F screws into and connects with modular enclosure 27F at 25F.

Modular enclosure 27F screws into and connects with modular enclosure 1F at 26F.

The mobile apparatus can be dissembled into its respective modular enclosures by unscrewing and disconnecting them from one another.

Maintenance and repair of the eyepiece, zoom lens, or image sensor array can be accomplished by disassembly of the mobile apparatus into its respective modular enclosures.

Any dysfunctional physical elements like for example a defective eyepiece, zoom lens, or image sensor array are then removed from their respective modular enclosures, and then worked on as needed.

Replacement of dysfunctional eyepieces, zoom lenses, or image sensor arrays can be accomplished by removal of the dysfunctional physical element form its modular enclosure, and substituted for with a functional replacement physical element.

Substitution of eyepieces, zoom lenses, or image sensor arrays with other eyepieces, zoom lenses, or image sensor arrays to better match the job, match the environment, match the object, and match the audience, etc. can also be accomplished by disassembly of the mobile apparatus into its respective modules and substituting more appropriate modules in their place.

The optical image source's focal image of the object at 5F is acquired by the eyepiece module 8F and transformed into a afocal image and transferred to 24F. 24F transforms the afocal image into a focal image at 17F. The electronic image sensor array camera module 21F electronically transforms the focal image at 17F into electronic imagery signals, and the electronic circuits module electronically transforms and transmits the electronic imagery signals from the output terminals of 1F to the observer. The electronic imagery signals meet analog and/or digital protocols depending on the type of analog or digital electronics used by the observer in the electronic sensor array camera module 1F. The electronic imagery signals are transmitted to the observer and the observer's audience via the output terminals on 29F.

FIG. 6

Figure 6:
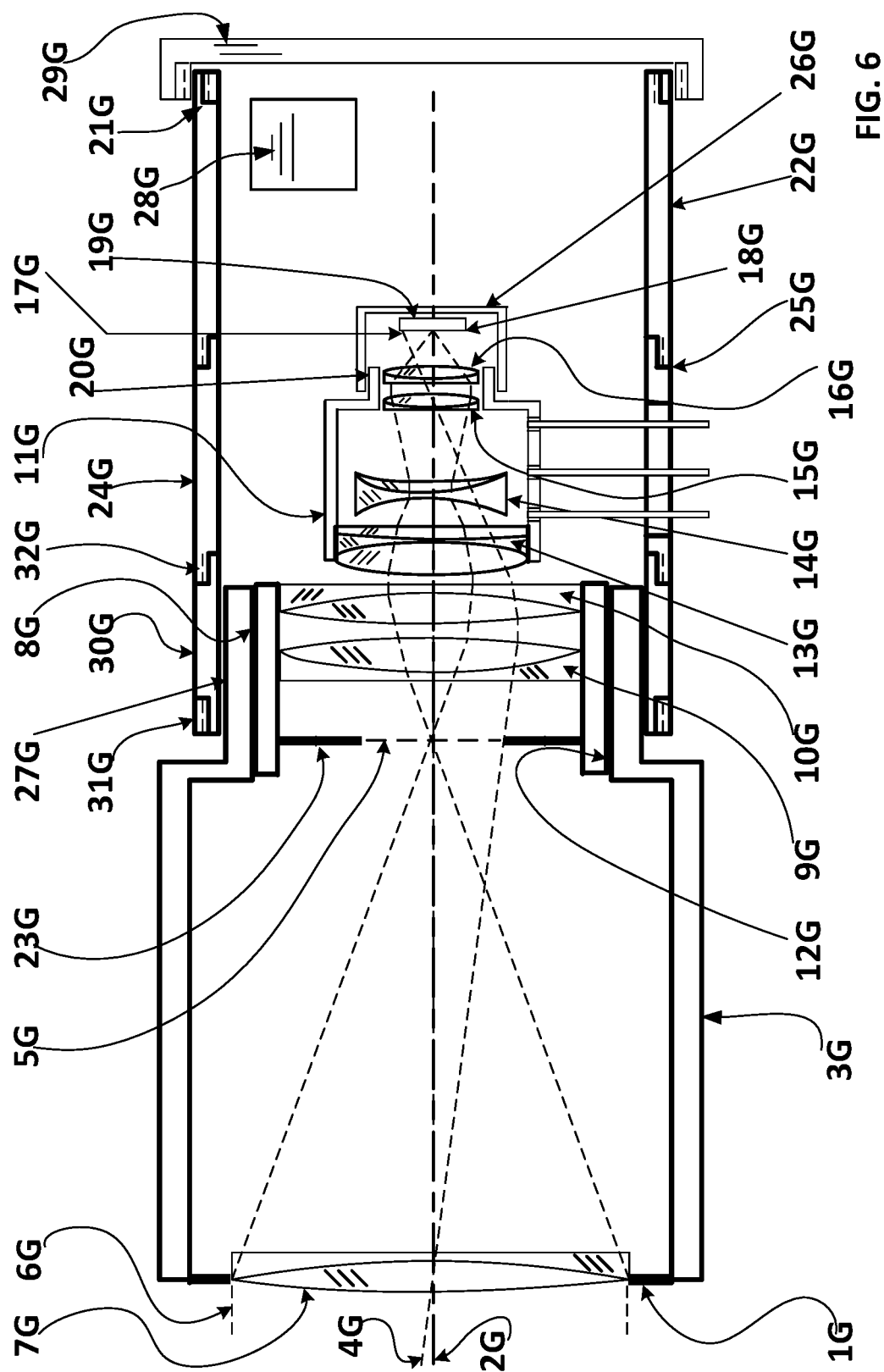
FIG. 6 shows a side view section of the optical system schematic of a preferred embodiment of a mobile apparatus attached to the optical system of a typical optical image source, where the optical image source has its own original equipment eyepiece, but where the mobile apparatus does not have its own eyepiece, wherein the mobile apparatus is configured for use for optical image sources referred to in FIG. 2.

FIG. 6 shows a side view section of the optical system schematic of a preferred embodiment of a mobile apparatus attached to the optical system of a typical optical image source, where the optical image source has its own eyepiece, but where the mobile apparatus does not have its own eyepiece.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The mobile apparatus shown in FIG. 6 is configured with a zoom lens module and a electronic image sensor array camera module.

In the preferred embodiment of the apparatus shown, the observer can choose from both analog and digital video cameras in order to match the object being observed and the type of optical image source being used by the observer during the observing session, as well as the desired objectives of the observing session.

The mobile apparatus disclosed in FIG. 6 is configured for being attached to and compatible with the optical image source shown in FIG. 2. The imagery from the optical image source to 5G is focal.

The eyepiece module is for optically acquiring and transforming and transferring the focal optical imagery from the optical image source into afocal optical imagery to the zoom lens module. The zoom lens module is for optically transforming the afocal optical imagery into focal optical imagery and for optically transferring the focal imagery to the electronic image sensor array camera module for electronically transforming the focal optical imagery into electronic imagery signals.

Screw thread is shown in the figure as an example of a mechanical connecting means for mechanically connecting adjacent modular enclosures. Screw thread is an example of a mechanical connecting means. Screw threaded joints are a simple, inexpensive and space saving method especially for connecting enclosures having a cylindrical profile. The front ends of the module's 24G and 22G cylindrical enclosures are under cut and threaded with female threads. The rear ends of the module's cylindrical enclosures 30G and 24G and 22G are over cut and threaded with male threads. The rear ends of the module's cylindrical enclosures i.e. 24G mate with the front end of the module's cylindrical enclosures 22G in order to connect the two modules together.

Screw thread is given in the present invention as an example of a mechanical connecting means. Other mechanical connecting means are also appropriate. In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawing shown in FIG. 6 are identified as follows:

1G is the aperture stop and entrance pupil of the optical image source.
2G is the optical axis of the optical image source.
3G is the housing of the optical image source.
4G is the principal ray of the optical image source.
5G is the image plane of the optical image source.
6G is a typical marginal rim ray of the optical image source.
7G is the optical system of the optical image source.
   For many optical image sources, the full and complete optical system of the optical image source is far more complex than just the single doublet lens shown in FIG. 1, and is comprised of multiple lenses, mirrors and prisms. The single doublet lens shown is only meant to simplify the drawing and only symbolically represents the full and complete optical system of the optical image source.
8G is the is the inside diameter of the barrel of the housing 3G of the optical image source. Typically, optical image sources are manufactured with barrel enclosures as original standard equipment. The barrel enclosures are the structural body of the optical image sources and are manufactured for housing and enclosing the contents of the optical image sources.
9G is the field lens of the original equipment eyepiece of the optical image source.
10G is the eye lens of the original equipment eyepiece of the optical image source.
11G is the housing of the mobile apparatus' zoom lens.
   The zoom lens functions are magnification control, iris diaphragm control, and focus control.
   The observer can manually control the magnification of the zoom lens, manually control the iris diaphragm of the zoom lens, manually control the focus of the zoom lens.
   The observer can exercise manual control of the zoom lens by rotating the adjustment rings by hand.
   The observer is enabled to manually adjust the focus for objects whose distances to the optical image source may be changing during an observing session.
12G is the outside diameter of the enclosure of the original equipment eyepiece of the optical image source.
13G is the first lens of the mobile apparatus' zoom lens.
14G is the second lens of the mobile apparatus' zoom lens.
15G is the third lens of the mobile apparatus' zoom lens.
16G is the fourth lens of the mobile apparatus' zoom lens.
17G is the image plane of the mobile apparatus.
18G is the optically active surface of the image sensor array of the electronic image sensor array camera of the mobile apparatus.
19G is the optically inactive rear of the image sensor array of the electronic image sensor array camera of the mobile apparatus.
20G is the tail end of the mobile apparatus' zoom lens' housing.
21G is the tail end of the mobile apparatus' modular enclosure of the electronic image sensor array camera module of the electronic image sensor array camera 26G. Hard wire cable (the cable is not shown) carries the video signal from an output port on the electronic image sensor array camera to the observer for the observer to hook up to and disseminate to his audience under the control of the observer. Alternately, if the observer prefers, the observer can run a cable from the output port on the electronic image sensor array camera directly to the observer's audience. The internal diameter at 21G is threaded.

The Following is a List of Analog and Digital Protocols Met by the Electronic Image Sensor Array Camera Modules
   Analog Camera—NTSC composite Video output
   Standard definition Digital Camera—SDI Serial digital interface output
   High definition Digital Camera—HDSDI High definition serial digital interface output
   The Serial digital interface (SDI) is a family of digital video interfaces first standardized by SMPTE (The Society of Motion Picture and Television Engineers) in 1989.
   For example, ITU-R BT.656 and SMPTE 259M define digital video interfaces used for commercial broadcast video.
   A related standard, known as high-definition serial digital interface (HD-SDI), is standardized in SMPTE 292M; this provides a nominal data rate of 1.485 Gbit/s.
   Additional SDI standards have been introduced to support increasing video resolutions (HD, UHD and beyond), frame rates, stereoscopic (3D) video, and color depth.
   Dual link HD-SDI consists of a pair of SMPTE 292M links, standardized by SMPTE 372M in 1998 this provides service to a nominal 2.970 Gbit/s interface used in applications (such as digital cinema or HDTV 1080P) that require greater fidelity and resolution than standard HDTV can provide.
   3G-SDI (standardized in SMPTE 424M) consists of a single 2.970 Gbit/s serial link that allows replacing dual link HD-SDI. 6G-SDI and 12G-SDI standards were published on Mar. 19, 2015.
   These standards are used for transmission of uncompressed, unencrypted digital video signals (optionally including embedded audio and time code) within television facilities; they can also be used for packetized data.
   Coaxial variants of the specification range in length but are typically less than 300 meters (980 ft). Fiber optic variants of the specification such as 297M allow for long-distance transmission limited only by maximum fiber length or repeaters.
   SDI and HD-SDI are usually only available by licensing agreements which restrict their use to licensed manufacturers. The SDI and HDSDI interfaces are unencrypted and uncompressed.
   Audio—Both the HD and SD serial interfaces provide for 16 channels of embedded audio. The two interfaces use different audio encapsulation methods—SD uses the SMPTE 272M standard, whereas HD uses the SMPTE 299M standard. In either case, an SDI signal may contain up to sixteen audio channels (8 pairs) embedded 48 kHz, 24-bit audio channels along with the video. Typically, 48 kHz, 24-bit (20-bit in SD, but extendable to 24 bit) PCM audio is stored, in a manner directly compatible with the AES3 digital audio interface.

The various versions of the serial digital interface support numerous video formats.

The 270 Mbit/s interface supports 525-line, interlaced video at a 59.94 Hz field rate (29.97 Hz frame rate), and 625-line, 50 Hz interlaced video. These formats are highly compatible with NTSC and PAL-B/G/D/K/I systems respectively; and the terms NTSC and PAL are often (incorrectly) used to refer to these formats. (PAL is a composite color encoding scheme, and the term does not define the line-standard, though it is most usually encountered with 625i) while the serial digital interface—other than the obsolete 143 Mbit/s and 177 Mbit/s forms—is a component standard.

The 360 Mbit/s interface supports 525i and 625i widescreen. It can also be used to support 525p, if 4:2:0 sampling is used.

The various 540 Mbit/s interfaces support 525p and 625p formats.

The nominal 1.5 Gbit/s interfaces support most high-definition video formats.

Supported formats include 1080/60i, 1080/59.94i, 1080/50i, 1080/30p, 1080/29.97p, 1080/25p, 1080/24p, 1080/23.98p, 720/60p, 720/59.94p, and 720/50p. In addition, there are several 1035i formats (an obsolete Japanese television standard), half-bandwidth 720p standards such as 720/24p (used in some film conversion applications, and unusual because it has an odd number of samples per line[citation needed]), and various 1080psf (progressive, segmented frame) formats. Progressive Segmented frames formats appear as interlace video but contain video which is progressively scanned. This is done to support analog monitors and televisions, many of which are incapable of locking to low field rates such as 30 Hz and 24 Hz.

The dual link HD interface supports 1080/60p, 1080/59.94p, and 1080/50p, as well as 4:4:4 encoding, greater color depth, RGB encoding, alpha channels, and nonstandard resolutions (often encountered in computer graphics or digital cinema). A quad link interface of HD-SDI supports UHDTV-1 resolution 2160/60p 22G is the mobile apparatus' modular enclosure for the image sensor array camera module.

23G is the field stop of the optical image source's original equipment eyepiece.

If the optical image source already is configured with a field stop, then 23G is unnecessary and will be unscrewed and removed from 8G, and the optical image source's field stop will be used instead.

24G is the modular enclosure for the zoom lens 11G module.

25G is the threaded joint between 24G and 22G. 25G joins the modular zoom lens enclosure 24G to the modular image sensor array enclosure 22G.

26G is the electronic image sensor array camera showing its cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover. The electronic image sensor array camera as shown in the figure is comprised of a cover and an electronic image sensor array and its associated camera electronics. The sensor array, for example is a CCD, CMOS or other sensor array type.

27G is the is the outside diameter of the barrel of the housing 3G of the optical image source.

28G is the battery. The battery is for supplying electricity to the electrical elements of the mobile apparatus.

29G is the end cap module. See FIG. 18 for reference.

30G is the extension module at the front end of the mobile apparatus.

31G is the threaded front end of the extension module.

32G is the threaded rear end of the extension module showing 30G joined with 24G.

Refer to FIG. 2 as a reference for the optical image source.

Substitution of zoom lenses, or image sensor arrays with other zoom lenses, or image sensor arrays to better match the job, match the environment, match the object, and match the audience, etc. can also be accomplished by disassembly of the mobile apparatus into its respective modules and substituting more appropriate modules in their place.

The optical image source's focal image of the object at 5G is acquired by the optical image source's original equipment eyepiece and optically transformed into a afocal image and optically transferred to 24G. 24G optically transforms the afocal image into a focal image at 17G. The electronic image sensor array camera module 22G electronically transforms the focal image at 17G into electronic imagery signals. The electronic imagery signals meet analog and/or digital protocols depending on the type of analog or digital electronics used by the observer in the electronic sensor array camera module 1G. The electronic imagery signals are transmitted to the observer and the observer's audience via the output terminals on 29G.

FIG. 7

Figure 7:
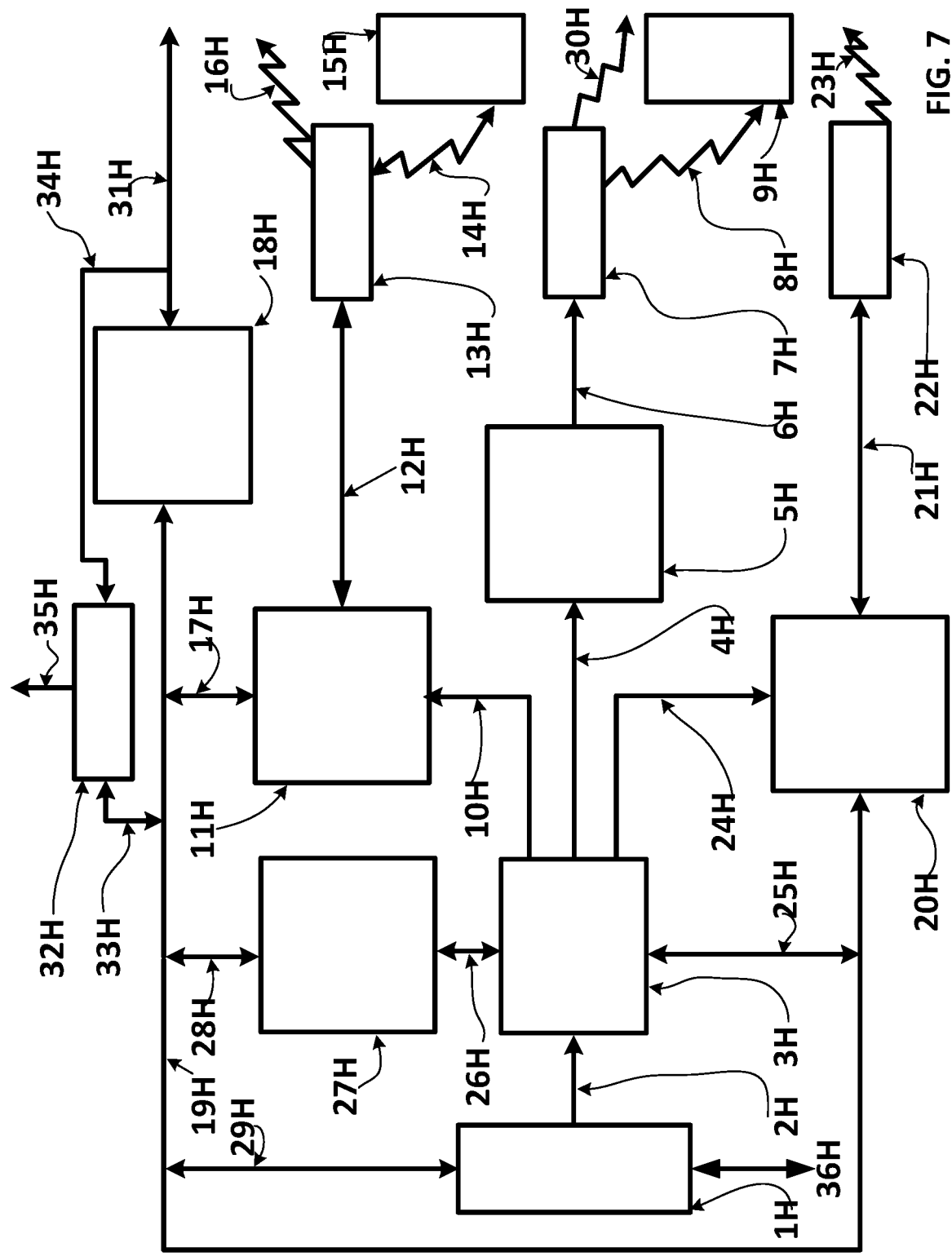
FIG. 7 shows a block diagram of a analog electronic system of a preferred embodiment of a mobile apparatus.

FIG. 7 shows a block diagram of a analog electronic circuit for a preferred embodiment of the mobile apparatus.

The electronic circuit in FIG. 7 is referred to as the 1st electric circuit.

Figure 8:
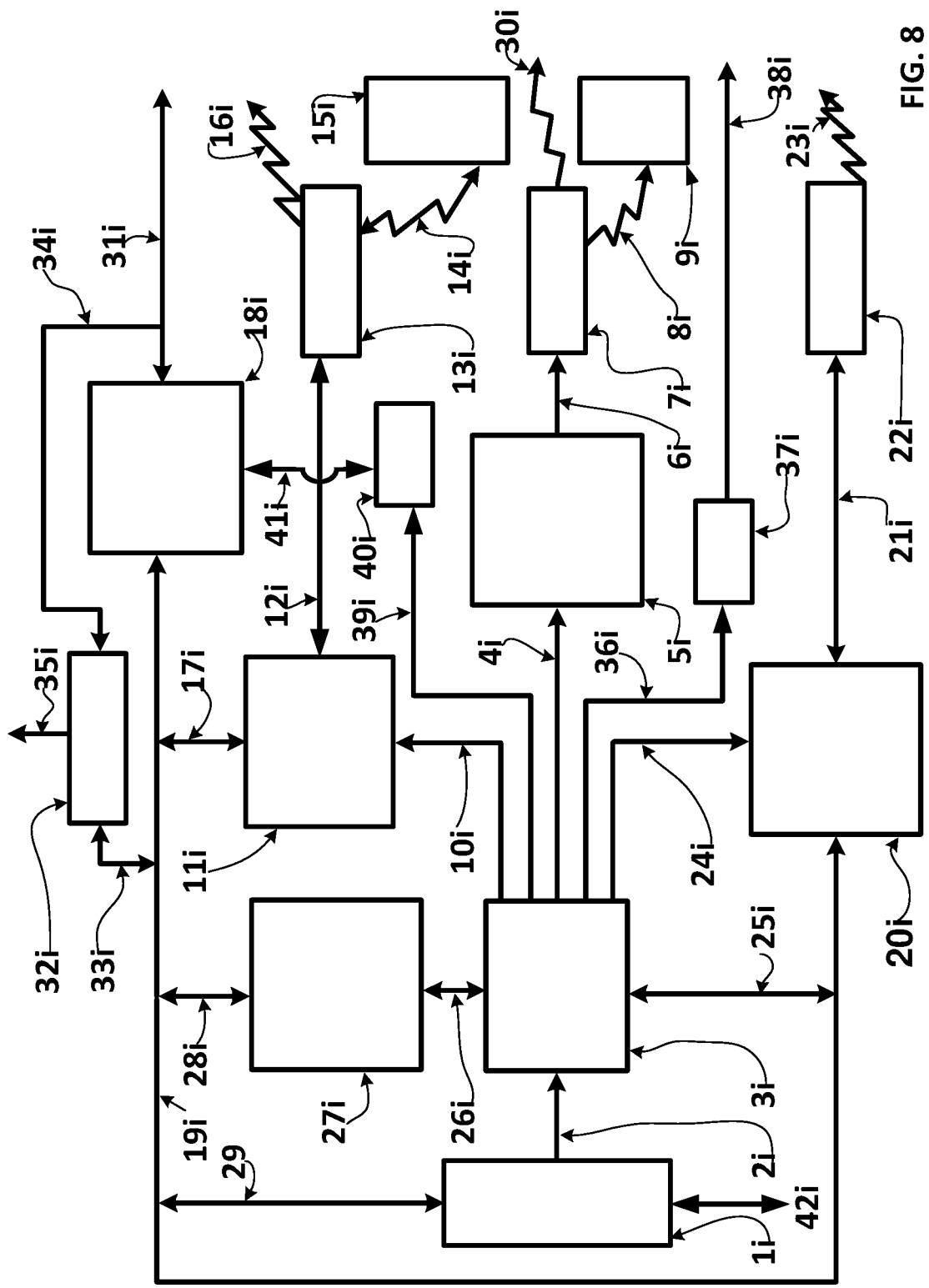
FIG. 8 shows a block diagram of a analog electronic system of a preferred embodiment of a mobile apparatus.

The electronic circuit in FIG. 8 is referred to as the 2nd electric circuit.

Figure 9:
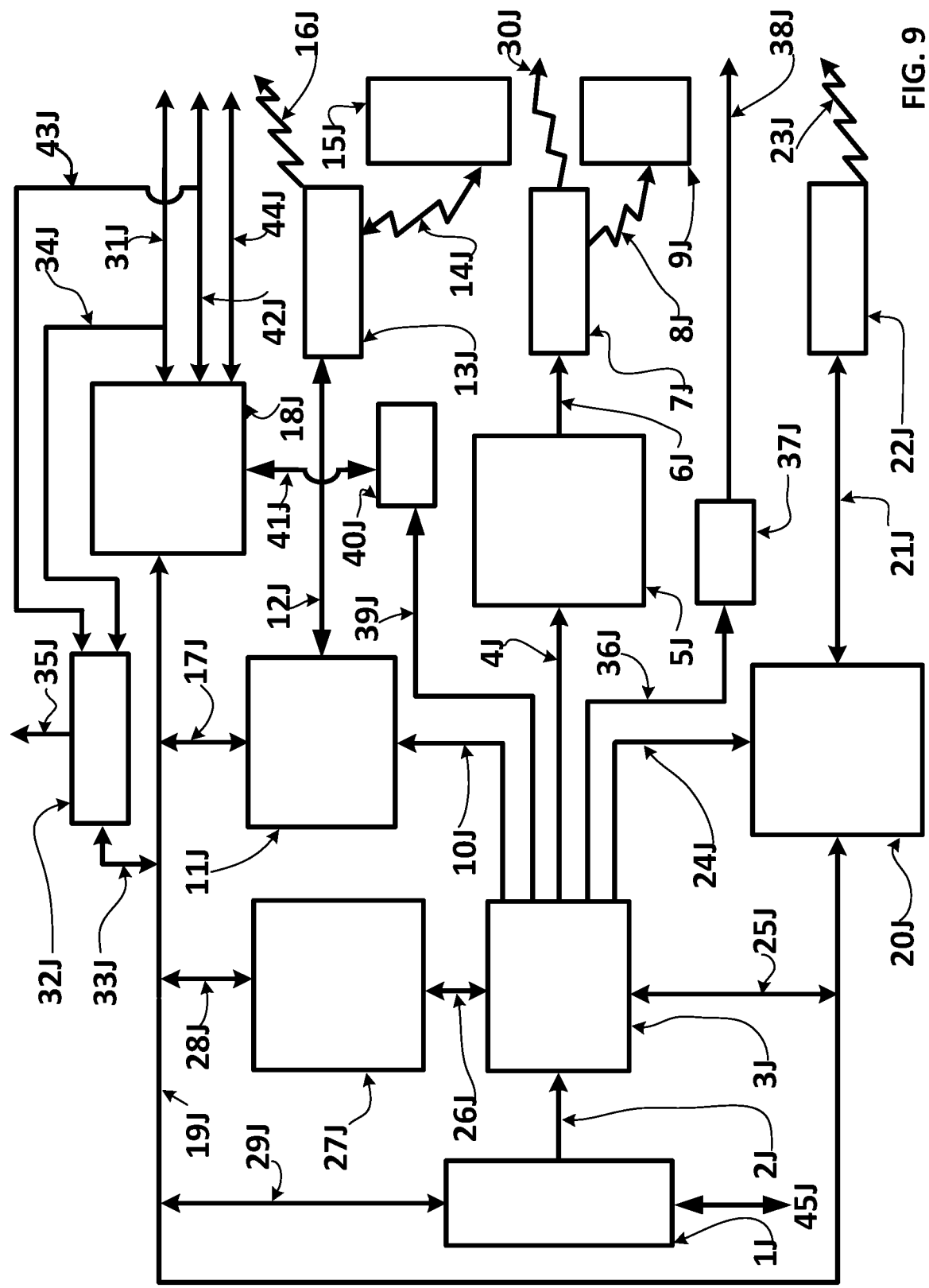
FIG. 9 shows a block diagram of a digital electronic system of a preferred embodiment of a mobile apparatus.

The electronic circuit in FIG. 9 is referred to as the 3rd electric circuit.

Figure 10:
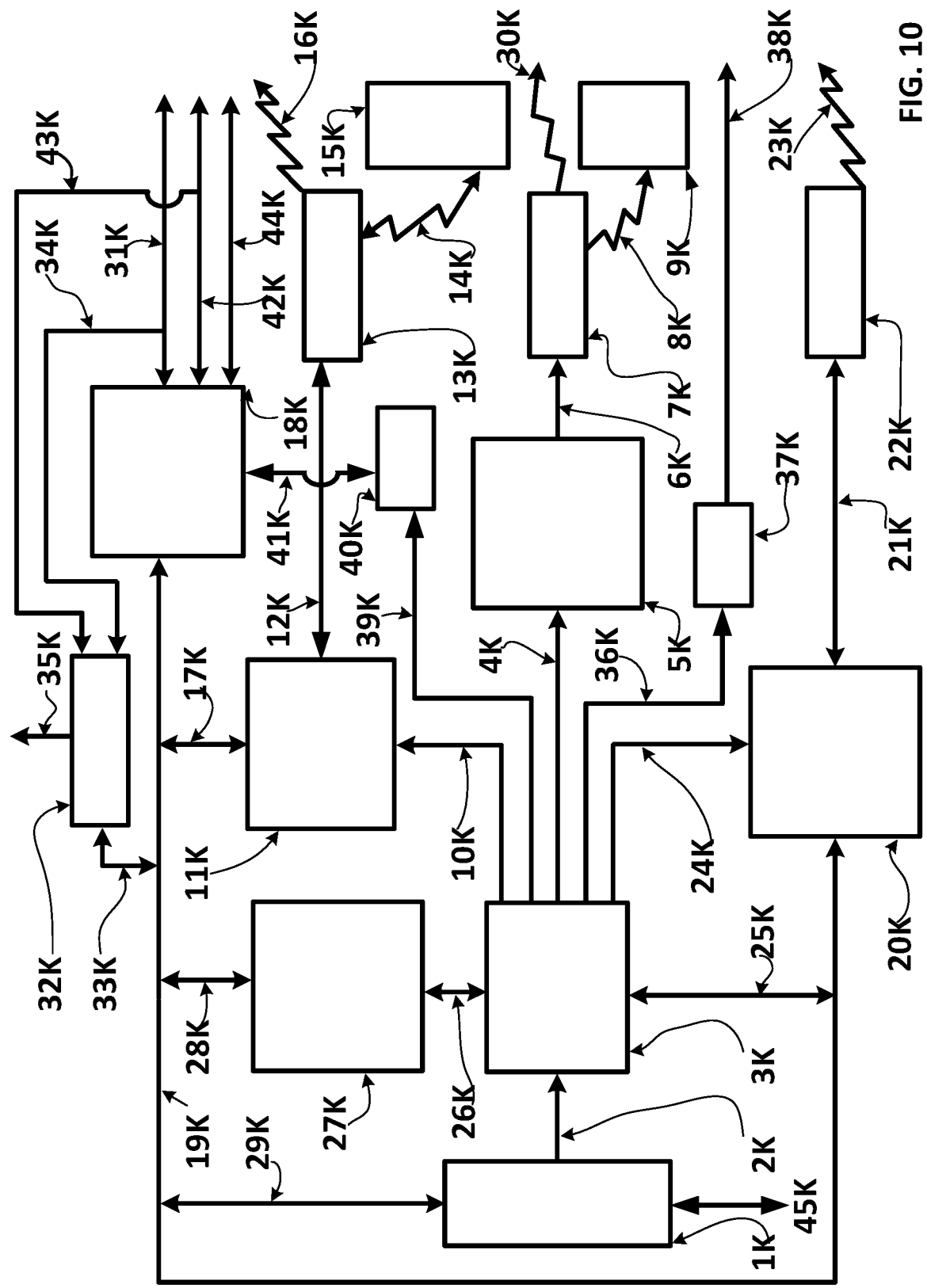
FIG. 10 shows a block diagram of a digital electronic system for a preferred embodiment of the mobile apparatus.

The electronic circuit in FIG. 10 is referred to as the 4th electric circuit.

Figure 11:
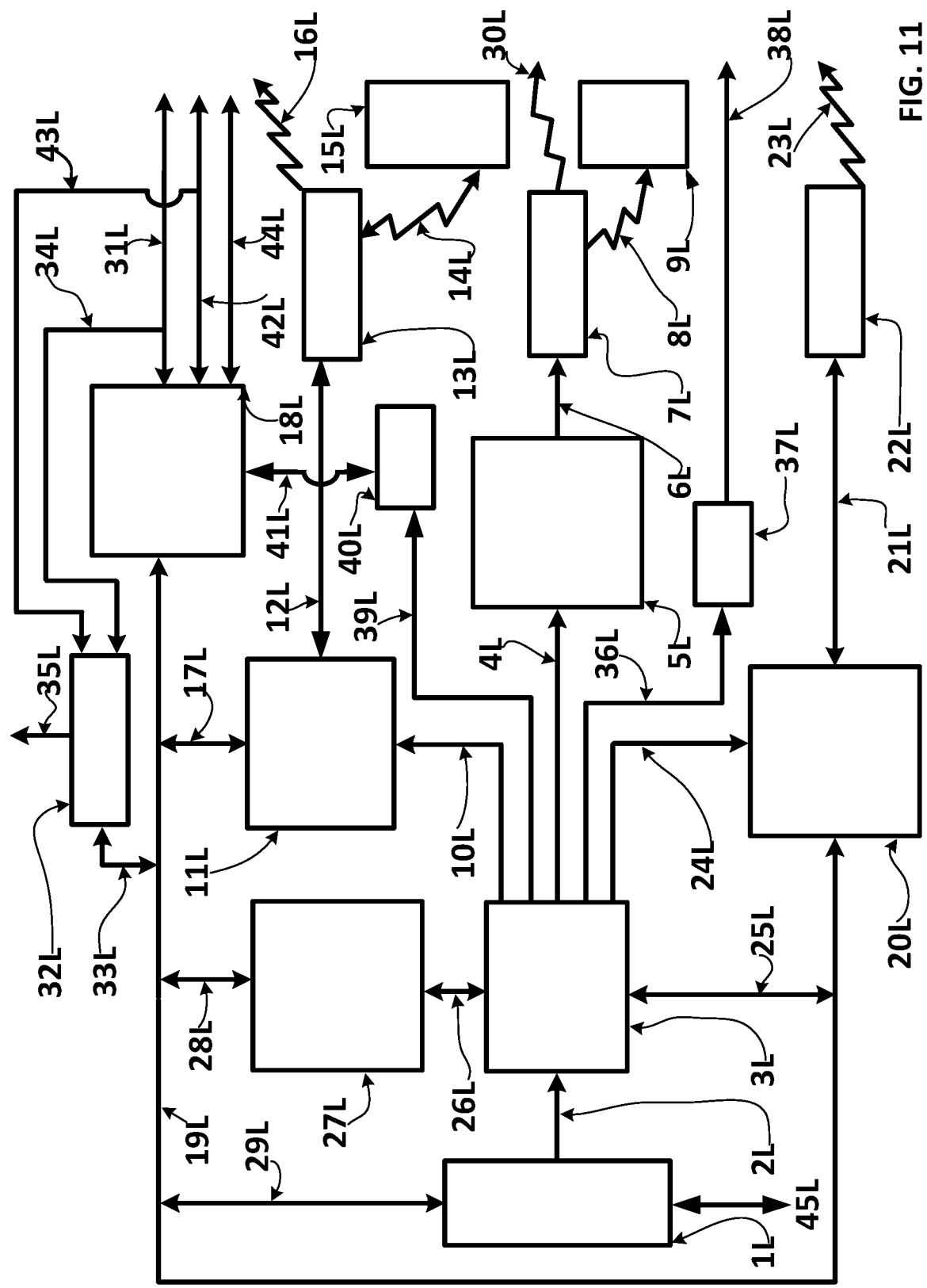
FIG. 11 shows a block diagram of a digital electronic system of a preferred embodiment of the mobile apparatus.

The electronic circuit in FIG. 11 is referred to as the 5th electric circuit.

The analog electronic circuit shown in FIG. 7 meets analog television broadcast standards NTSC, PAL, SECAM The detailed physical elements disclosed in the drawing shown in FIG. 7 are identified as follows:

1H is an analog electronics that is comprised of a audio amplifier, and a zoom lens actuator servo electronics package, a microphone interface, and a speaker interface.

The microphone is for capturing the sounds presented to it, and transforming the sounds to an electronic signal. The audio amplifier is for adjusting and buffering the audio signal output level of the microphone. The microphone is physically located and mounted in the threaded screw-on end cap module of the mobile apparatus shown in FIGS. 18A & 18B & 18C & 18E and 18F & 18G where it is easily accessible to the observer at the end of the mobile apparatus for the observer's verbal narration and communication with the audience.

The speaker is for transforming audio electronic signals into sounds, thereby enabling the observer to communicate with the audience audibly. The audio amplifier is for adjusting and buffering the audio signal input level to the speaker. The speaker is physically located and mounted in the threaded screw-on end cap module of the mobile apparatus shown in FIGS. 18A & 18B & 18C & 18E and 18F & 18G where it is easily accessible to the observer at the end of the mobile apparatus for the observer to communicate with and hear the audience.

The servo electronics package in 1H is for receiving electronic control signals from the observer and driving the zoom lens electro-mechanical actuator enabling the observer to control the zoom lens magnification, iris diaphragm and focus.

The zoom lens electro-mechanical actuator is for receiving electronic control signals from the servo electronics package to mechanically actuate the magnification ring, the iris diaphragm ring, and the focus ring of the zoom lens. Additionally, the servo electronics package is also for receiving the status of the state of the zoom lens' magnification, iris diaphragm, and focus from the zoom lens electro-mechanical actuator, and forwarding the status to the observer.

The path of control of the zoom lens magnification, iris diaphragm and focus is from the observer to 15H to 14H to 13H to 12H to 11H to 17H to 19H to 18H to 19H to 29H to the servo electronics package in 1H, and then to the electro-mechanical actuator, and to the zoom lens.

The path of the zoom lens magnification status, iris diaphragm status, and focus status is from the electro-mechanical actuator to 1H to 29H to 19H to 18H to 19H to 17H to 11H to 12H to 13H to 14H to 15H and then to the observer for viewing the status.

The path for the observer to speak and convey audio to the audience is as follows: the observer speaks into the microphone configured in the end of the mobile apparatus in the end cap module of the mobile apparatus shown in FIG. 18, the end cap to 1H, 1H to 29H to 19H to 18H to 19H to 17H to 11H to 12H to 13H to 16H to the audience.

The path for the audience to speak to the observer is as follows: the audience to 16H to 13H to 12H to 11H to 17H to 19H to 18H to 19H to 29H to 1H to the speaker configured in the end cap module shown in FIG. 18, and then audio to the observer.

2H is a unidirectional signal line carrying the analog video and audio signals from 1H to 3H.

3H is the DVR electronics circuits. 3H is comprised of an video analog to digital converter, an audio analog to digital converter, a digital signal compressor, a set of digital streaming encoders, a distribution logic circuit, a record/playback logic circuit, a analog audio/video pass thru circuit, a administrative controller electronics circuit and a and a circuit for buffering the analog audio video signal output level.

4H is the analog video and analog audio output signal line from the DVR 3H to the analog transmitter 5H.

5H is the analog transmitter. 5H is configured for 5.8 GHZ FM for example, and for other frequencies to match the FCC rules and regulations pertaining to the particular operating environment of the mobile apparatus i.e. the noise floor at the observing site for example. 5H is for driving 7H to radiate a composite video and audio signal carrying the electronically transformed optical image and audio sounds to the observer. The transmitter is chosen in a preferred embodiment, to be an analog transmitter especially for producing real-time electronic signals without latency. There are many observing situations that require zero or little latency i.e. in toxic medical environments where a microscope is used for example. These are safety related situations for example where it is time critical that the observer must see the action in real time as it is happening without any electronic delays in order to be able to respond and react quickly to an event.

6H is the analog transmitter 5H unidirectional output signal line for driving the RF antenna 7H. The antenna is both inside and outside the enclosure on a swivel.

7H is the RF antenna. The antenna is cut to operate at 5.8 GHZ for example, and cut for other frequencies demanded by 5H. 7H is physically usually configured internally within the enclosure of the mobile apparatus. In a preferred embodiment, the antenna 7H is contained within the mobile apparatus' enclosure. This keeps the antenna out of harms way and reduces the need for antenna maintenance.

There are situations however where it is beneficial for the antenna 7H to be physically configured so its radiation pattern can be pointed; for example, situations at the observing site where there is a heavy interfering RF noise floor that threatens the communication of signals at levels needed for acceptable reception and for transmitting by the antenna. Use of an swivel to point the antenna at set up time enables the observer to initially adjustably point the antenna's radiation pattern to maximize the signal communicated to and from the antenna.

In a preferred embodiment, the antenna 7H is configured to be adjustably pointed. Pointing adjustability is accomplished by configuring the antenna 7H on a mechanical swivel. The swivel is fixed externally to the tail end of the mobile apparatus' enclosure. The swivel can be a ball joint of two rotating axial joints, for example. The antenna can be initially positioned parallel to the enclosure in a notch out of the way; or can be extended to the outside from the inside at the end of the enclosure.

8H is the radiated signal from the RF antenna 7H to the observers' display unit 9H located within 30 feet of the mobile apparatus.

9H is the observer's display unit. 9H is for displaying a real time analog signal with no latency to the observer. For safety, for example in a toxic environment, a real time system with no latency is essential for the observer.

10H is the unidirectional signal line carrying the digital video and audio encoded stream of signals from 3H to the WiFi digital transceiver electronics 11H.

11H is the WiFi digital transceiver electronics. 11H is for transmitting the encoded audio and video streaming signal from 3H by way of 10H to the local WIFI LAN audience. Additionally 11H also conveys administrative data by way of 17H and 19H to system controller 18H.

12H is the unidirectional signal line carrying the WIFI streaming video and audio signals from the WiFi digital transceiver electronics 11H to the WiFi antenna 13H. Additionally 12H also carries administrative data from 15H to 18H by way of 11H and 12H and 17H and 19H to system controller 18H.

13H is the WiFi antenna. 13H is cut to 2.4 GHZ and/or 5.8 GHZ depending on the audience's wireless equipment.

14H is the digital streaming video and audio signals radiated from the WiFi antenna 13H to the observer's PC 15H, and the RF control command signals received by the WiFi antenna 13H from the observer's PC 15H.

15H is the observers' PC configured with an App for the initial programming setup of the system controller 18H. 15H is comprised of the App for enabling the observer to control the camera; and for making logic decisions regarding whether to play or record the captured analog audio and analog video streams; and for controlling the zoom lens actuator.

16H is the radiated digital streaming video and audio signals from the WiFi antenna 13H to the local WIFI LAN audience.

17H is the bidirectional control signal line carrying the administrative control commands to and from and between the WIFI transceiver 11H and the system controller 18H.

18H is the system controller electronics. 18H is configured with a microprocessor for controlling all of the functions of the mobile apparatus, i.e. it holds the configuration files that determines items such as the operating frequencies of the WiFi and analog transmission settings of the various transmitters and transceivers 5H and 11H and 20H. The microprocessor is configured with applications software and firmware. In a preferred embodiment, the microprocessor manages the connectivity to the USB, Ethernet and fiber optics ports. In addition, the microprocessor manages the electrical power distribution to the electric consuming modules of the mobile apparatus.

Furthermore in order to minimize the radio frequency interference created by a multiplicity of the mobile apparatuses operating simultaneously in proximity to one another that may be attached to a variety of different optical image sources participating in an observing session, each microprocessor of each of the multiplicity of the mobile apparatuses is configured with a applications software enabling each of the multiplicity of the mobile apparatuses to be commanded by the observer to communicate to the operator the best choice of radio frequencies for the observer to use for each one of the multiplicity of the mobile apparatuses operating in proximity to one another in order to minimize the radio frequency interference effects created between the multiplicity of the other mobile apparatuses operating in proximity to one another. The observer then can remotely or locally reset the radio frequencies used by each of the apparatuses, and can re-poll the apparatuses over and over again to assure that the best frequency configuration among the mobile apparatuses is used; and the observer can re-poll the apparatuses in the future should conditions from other potential outside sources of radio interference change the topography of the interference patterns in the vicinity of the apparatuses.

19H is the bidirectional signal line carrying the administrative control commands to and from the system controller 18H, to the zoom lens actuator contained in 1H, to the image sensor array support electronics contained in 1H, to the microphone contained in 1H, to the DVR 3H, and to the Internet WIFI transceiver electronics 20H; and additionally to the digital video and digital audio storage memory 27H.

20H is the Internet WIFI transceiver electronics. 20H is for transmitting digital video and audio encoded streams from 3H by way of 24H to the internet audience 23H by way of 21H and 22H.

21H is the is the bidirectional signal line carrying the WIFI streaming video and audio signals from 20H to the Internet WIFI transceiver antenna 22H to reach the Internet audience 23H.

22H is the Internet WIFI transceiver antenna. 22H is for radiating WiFi signals to the WiFi access point (not shown); and for receiving administrative data from the Internet based observer via 20H and 19H to 18H.

23H is the radiated digital streaming video and audio signals from the Internet WIFI transceiver antenna 22H to the Internet and the extended WIFI audience via the wireless access point not shown.

24H is the unidirectional signal line carrying the digital video and audio signals from the DVR 3H to the Internet WiFi transceiver electronics 20H.

25H is the bidirectional control signal line carrying the administrative control commands to and from and between the DVR 3H and the system controller 18H.

26H is the bidirectional line carrying the digital video and audio signals from the DVR 3H to the DVR storage memory device 27H.

27H is the DVR storage memory device.

28H is the bidirectional line carrying the administrative control commands to and from and between the system controller 18H and the DVR storage memory device 27H via 19H which is the central bus.

29H is the bidirectional line carrying the administrative control commands to and from and between 1H and the system controller 18H via 19H.

30H is the radiated analog signal from the RF antenna 7H to the local audience within a short range of the mobile apparatus, i.e. 35 feet for example.

31H is the bidirectional line carrying the I/O to and from the USB port of the observer's PC 15H to and from the system controller 18H during the initial programming setup. 31H is also an alternative path for the observer to control the zoom lens actuator which controls the zoom lens magnification, iris diaphragm and the focus. The path for control of the zoom lens actuator is the observer to 31H to 18H to 19H to 29H to 1H and to the zoom lens servo electronics package, and to the zoom lens actuator, and to the zoom lens. 31H is also an alternative path for the observer to view status of the zoom lens magnification, iris diaphragm and the focus. The alternative path for viewing the status is from the zoom lens actuator to 1H to the zoom lens servo electronics package, to 29H to 19H to 18H to 31H and to the observer.

32H is a battery. 32H is for supplying electricity to 1H, 3H, 5H, 11H, 18H, 20H, 27H, and 32H via 35H. 32H is comprised of a battery, power handling electronics, power distribution electronics, and charging electronics.

33H is an administrative bi-directional data link between 18H and 32H via 19H for controlling the power-up cycle, and for reading the state of 32H, i.e. battery life remaining, time to fully charge, and cumulative time on the battery for example communicates 34H is a d.c. power bus supplied by USB port 31H for supplying power to charge 32H.

35H is an internal power bus supplying power to 1H, 3H, 5H, 11H, 18H, 20H, 27H, and 32H.

36H is the analog electronic image sensor array camera. As shown in FIG. 7, the link between 1H and 36H is bi-directional.

Analog electronic imagery signals from 36H are inputted to 1H. Camera control commands from the observer are routed through 1H and inputted to the analog electronic image sensor array camera 36H. A typical camera control command for low light astronomical objects, for example, is for setting the extended exposure time of the electronic image sensor array camera.

The analog image sensor array camera is for capturing the optical image presented to it on its photo active image sensor array surface, and transforming the optical image to an analog electronic image signal protocol. For example: analog television broadcast standards like NTSC, PAL, and SECAM.

The analog image sensor array camera is for taking the signal from its analog image sensor array and transforming the signal to meet the NTSC video camera output protocol i.e. National System Television Committee.

The analog image sensor array camera is chosen in the preferred embodiment because of its ability to capture the optical image presented to it on its photo active sensor array surface, and transforming the optical image to be a real-time electronic image signal without latency.

It is noted that the circuits described herein are primarily made of CMOS chip components for keeping the power consumption low and for lengthening the operating time on the batteries for long observing sessions.

The present invention has both wireless and hard-wire communication and control capability and is compatible with a wide variety of electronic protocols.

For example:
analog television broadcast standards NTSC, PAL, SECAM
digital video elementary stream protocols H.264, HEVC, VP8, VP9
digital audio elementary stream protocols MP3, VORBIS, AAC, OPUS
digital audio and video combined stream protocols for delivery to the observer
and audience MP4, FLV, WEBM, ASF, ISMA
digital control protocol for web app viewing: MMS (Microsoft Media Server protocol), RTSP (Real Time streaming protocol)
HTTP (Hyper Text live streaming Protocol)

The present invention has RF wireless capability, thereby enabling the observer to capture video imagery from the mobile apparatus during his observing session without the use of wires or cables; and furthermore enabling the observer to communicate with and control the mobile apparatus during his observing session without the use of wires or cables; and even furthermore enabling the observer to share his observations during and after his observing session with an audience of people and their machines without the use of wires or cables.

The present invention also has hard-wire capability, thereby enabling the observer to capture video and audio from the mobile apparatus during his observing session with the use of wires or cables; and furthermore enabling the observer to communicate with and control the mobile apparatus during his observing session with the use of wires or cables; and even furthermore enabling the observer to share his observations during and after his observing session with an audience of people and their machines with the use of wires or cables.

The mobile apparatus is configured with electronic safeguards enabling the mobile apparatus to operate in high RF noise interference environments. These safeguards are built into the electronics of the present invention. These safeguards are necessary in some extreme cases, where the RF noise interference in the environment where the mobile apparatus is deployed, would otherwise affect the electronic image signal quality and electronic image signal latency if the safeguards were not configured in place. These RF noise safeguards insure and protect the reliable wireless transmission of the electronic imagery signals.

The mobile apparatus, which is the subject of the present invention, has six modes of communication with the observer; and four modes of communication with his audience.

These modes of communication can be carried out wirelessly lone, with wires and cables alone, or with a combination of wireless and hard-wires. The mobile apparatus is configured to leave the choice of mode up to the observer.

There are six types of observers. Each type of observer is defined by his mode of communication with the mobile apparatus.

The first type of observer is one who is present at the optical image source and who is manually operating the mobile apparatus.

The second type of observer is one who is present at the optical image source who is wirelessly operating the mobile apparatus.

The third type of observer is one who is not present at the optical image source and who is wirelessly operating the mobile apparatus, but who is located local to the optical image source, i.e. within 35 feet for example.

The fourth type of observer is one who is located somewhat remote to the optical image source and who is wirelessly operating the mobile apparatus, i.e. within 2 miles for example.

The fifth type of observer is one who is located geographically remote to the observer and who is wirelessly operating the mobile apparatus. i.e. over 2 miles on the Earth for example.

The sixth type of observer is one who is located geographically very remote to the optical image source and who is wirelessly operating the mobile apparatus, i.e. beyond the surface of the Earth in space for example.

The audience or spectators or limited segments of the public are of four types.

The first type of audience are those people and machines that are local and located physically close to the observer i.e. within 35 feet for example.

The second type of audience are those people and machines located somewhat remote to the observer i.e. within 2 miles for example.

The third type of audience are those people and machines located geographically remote to the observer i.e. over 2 miles on the Earth for example.

The fourth type of audience are those people and machines located geographically very remote to the observer i.e. beyond the surface of the Earth in space for example.

The Following is a List of PROTOCOLS AND INDUSTRY STANDARDS Met by the Present Invention FIG. 7

For 31H, USB Port—At the time of this writing the USB 3.0 specification is commonly used.
Drivers specific to the OS will have additional protocols for communication between devices, Firmware and Software Apps subject to future development.

For 14H, 15H, 16H, and 23H.
WIFI Packet—At the time of this writing the following table applies to commercial devices using the unlicensed WIFI Frequency Allocations in USA Markets.
Those highlighted in Yellow represent the most likely to be used for our product offerings.
The others listed would be for backward legacy and forward future compatibility.

IEEE 802.11 Wi-Fi Protocol Summary

| Protocol | Frequency | Channel Width | MIMO | Maximum data rate (theoretical) |
|---|---|---|---|---|
| 802.11ac wave2 | 5 GHz | 80, 80 + 80, 160 MHz | Multi User (MU-MIMO) | 1.73 Gbps[1] |
| 802.11ac wave1 | 5 GHz | 80 MHz | Single User (SU-MIMO) | 866.7 Mbps[1] |
| 802.11n | 2.4 or 5 GHz | 20, 40 MHz | Single User (SU-MIMO) | 450 Mbps[2] |
| 802.11g | 2.4 GHz | 20 MHz | N/A | 54 Mbps |
| 802.11a | 5 GHz | 20 MHz | N/A | 54 Mbps |
| 802.11b | 2.4 GHz | 20 MHz | N/A | 11 Mbps |
| Legacy 802.11 | 2.4 GHz | 20 MHz | N/A | 2 Mbps |

Notes: For 1H, 2H spatial streams with 256-QAM modulation. 2H, 3H spatial streams with 64-QAM modulation. The Administrative data link to the observers PC 15H will use Drivers specific to the OS that will have additional protocols for communication subject to future development between devices, Firmware and Software Apps.

The Audio, Video and Media information streams are combined into a Transport Stream or container prior to streaming to the audience, observer, etc.

MPEG transport stream (transport stream, MPEG-TS, MTS or TS) is a standard digital container format for transmission and storage of audio, video, and Program and System Information Protocol (PSIP) data. It is used in broadcast systems such as DVB, ATSC and IPTV.

Our product offering will likely use an MPEG TS stream carrying a multiplicity of Audio, Video and program Data such as closed captioning for the sight and hearing impaired audiences As required.

The elementary Audio streams are typically AC-3 encoded multi-channel streams but could also be MPEG for compatibility.

The elementary Video Streams are typically compressed using the h.264 or h.265 Codec depending on the license selection during manufacture. H.265 is newer and offers better video but requires faster CPU and memory, thus introducing some latency.

For 9H, and 30H.

FM Frequency Modulation radiated by Radio emission 30H is used to convey the individual Audio and Video Signals to the local viewing audience in an NTSC or PAL video format to be compatible with the viewer's receiving device 9H. In the USA it is a common practice in broadcasting to transmit NTSC analog video with Negative going sync+Positive Video in relation to the waveform.

The Audio is frequency multiplexed onto the main carrier along with the composite video by a plurality of High Fidelity narrow band FM Subcarriers, depending on the number of channels desired. DBX Dolby Noise reduction systems can be added subject to licensing agreement at the time of product development.

The Following is a List of Analog and Digital Protocols Met by the Electronic Image Sensor Array Camera Modules shown in FIG. 7 and FIG. 8.

Analog Camera—NTSC composite Video output

Standard definition Digital Camera—SDI Serial digital interface output

High definition Digital Camera—HDSDI High definition serial digital interface output The Serial digital interface (SDI) is a family of digital video interfaces first standardized by SMPTE (The Society of Motion Picture and Television Engineers) in 1989.

For example, ITU-R BT.656 and SMPTE 259M define digital video interfaces used for commercial broadcast video.

A related standard, known as high-definition serial digital interface (HD-SDI), is standardized in SMPTE 292M; this provides a nominal data rate of 1.485 Gbit/s.

Additional SDI standards have been introduced to support increasing video resolutions (HD, UHD and beyond), frame rates, stereoscopic (3D) video, and color depth.

Dual link HD-SDI consists of a pair of SMPTE 292M links, standardized by SMPTE 372M in 1998 this provides service to a nominal 2.970 Gbit/s interface used in applications (such as digital cinema or HDTV 1080P) that require greater fidelity and resolution than standard HDTV can provide.

3G-SDI (standardized in SMPTE 424M) consists of a single 2.970 Gbit/s serial link that allows replacing dual link HD-SDI. 6G-SDI and 12G-SDI standards were published on Mar. 19, 2015.

These standards are used for transmission of uncompressed, unencrypted digital video signals (optionally including embedded audio and time code) within television facilities; they can also be used for packetized data.

Coaxial variants of the specification range in length but are typically less than 300 meters (980 ft). Fiber optic variants of the specification such as 297M allow for long-distance transmission limited only by maximum fiber length or repeaters.

SDI and HD-SDI are usually only available by licensing agreements which restrict their use to licensed manufacturers. The SDI and HDSDI interfaces are unencrypted and uncompressed.

Audio—Both the HD and SD serial interfaces provide for 16 channels of embedded audio. The two interfaces use different audio encapsulation methods—SD uses the SMPTE 272M standard, whereas HD uses the SMPTE 299M standard. In either case, an SDI signal may contain up to sixteen audio channels (8 pairs) embedded 48 kHz, 24-bit audio channels along with the video. Typically, 48 kHz, 24-bit (20-bit in SD, but extendable to 24 bit) PCM audio is stored, in a manner directly compatible with the AES3 digital audio interface.

The various versions of the serial digital interface support numerous video formats.

The 270 Mbit/s interface supports 525-line, interlaced video at a 59.94 Hz field rate (29.97 Hz frame rate), and 625-line, 50 Hz interlaced video. These formats are highly compatible with NTSC and PAL-B/G/D/K/I systems respectively; and the terms NTSC and PAL are often (incorrectly) used to refer to these formats. (PAL is a composite color encoding scheme, and the term does not define the line-standard, though it is most usually encountered with 625i) while the serial digital interface—other than the obsolete 143 Mbit/s and 177 Mbit/s forms—is a component standard.

The 360 Mbit/s interface supports 525i and 625i widescreen. It can also be used to support 525p, if 4:2:0 sampling is used.

The various 540 Mbit/s interfaces support 525p and 625p formats.

The nominal 1.5 Gbit/s interfaces support most high-definition video formats.

Supported formats include 1080/60i, 1080/59.94i, 1080/50i, 1080/30p, 1080/29.97p, 1080/25p, 1080/24p, 1080/23.98p, 720/60p, 720/59.94p, and 720/50p. In addition, there are several 1035i formats (an obsolete Japanese television standard), half-bandwidth 720p standards such as 720/24p (used in some film conversion applications, and unusual because it has an odd number of samples per line[citation needed]), and various 1080psf (progressive, segmented frame) formats. Progressive Segmented frames formats appear as interlace video but contain video which is progressively scanned. This is done to support analog monitors and televisions, many of which are incapable of locking to low field rates such as 30 Hz and 24 Hz.

The dual link HD interface supports 1080/60p, 1080/59.94p, and 1080/50p, as well as 4:4:4 encoding, greater color depth, RGB encoding, alpha channels, and nonstandard resolutions (often encountered in computer graphics or digital cinema).

A quad link interface of HD-SDI supports UHDTV-1 resolution 2160/60p

In the preferred embodiment of the apparatus shown, the observer can choose from both analog and digital video cameras in order to match the object being observed and the type of optical image source being used by the observer during the observing session, as well as the desired objectives of the observing session.

FIG. 8

FIG. 8 shows a block diagram of a analog electronic circuit for a preferred embodiment of a mobile apparatus.

The analog electronic circuit shown in FIG. 8 meets analog television broadcast standards NTSC, PAL, SECAM protocols.

The detailed physical elements disclosed in the drawing shown in FIG. 8 are identified as follows:

1*i* is an analog electronics that is comprised of a audio amplifier, and a zoom lens actuator servo electronics package, a microphone interface, and a speaker interface.

The microphone is for capturing the sounds presented to it, and transforming the sounds to an electronic signal. The audio amplifier is for adjusting and buffering the audio signal output level of the microphone. The microphone is physically located and mounted in the threaded screw-on end cap module of the mobile apparatus shown in FIGS. 18A & 18B & 18C & 18E and 18F & 18G where it is easily accessible to the observer at the end of the mobile apparatus for the observer's verbal narration and communication with the audience.

The speaker is for transforming audio electronic signals into sounds, thereby enabling the observer to communicate with the audience audibly. The audio amplifier is for adjusting and buffering the audio signal input level to the speaker. The speaker is physically located and mounted in the threaded screw-on end cap module of the mobile apparatus shown in FIGS. 18A & 18B & 18C & 18E and 18F & 18G where it is easily accessible to the observer at the end of the mobile apparatus for the observer to communicate with and hear the audience.

The servo electronics package in 1*i* is for receiving electronic control signals from the observer and driving the zoom lens electro-mechanical actuator enabling the observer to control the zoom lens magnification, iris diaphragm and focus.

The zoom lens electro-mechanical actuator is for receiving electronic control signals from the servo electronics package to mechanically actuate the magnification ring, the iris diaphragm ring, and the focus ring of the zoom lens. Additionally, the servo electronics package is also for receiving the status of the state of the zoom lens' magnification, iris diaphragm, and focus from the zoom lens electro-mechanical actuator, and forwarding the status to the observer. The path of control of the zoom lens magnification, iris diaphragm and focus is from the observer to 15*i* to 14*i* to 13*i* to 12*i* to 11*i* to 17*i* to 19*i* to 18*i* to 19*i* to 29*i* to the servo electronics package in 1*i*, and then to the electro-mechanical actuator, and to the zoom lens.

The path of the zoom lens magnification status, iris diaphragm status, and focus status is from the electro-mechanical actuator to 1*i* to 29*i* to 19*i* to 18*i* to 19*i* to 17*i* to 11*i* to 12*i* to 13*i* to 14*i* to 15*i* and then to the observer for viewing the status.

The path for the observer to speak and convey audio to the audience is as follows: the observer speaks into the microphone configured in the end of the mobile apparatus in the end cap module of the mobile apparatus shown in FIG. 18, the end cap module to 1*i*, 1*i* to 29*i* to 19*i* to 18*i* to 19*i* to 17*i* to 11*i* to 12*i* to 13*i* to 16*i* to the audience.

The path for the audience to speak to the observer is as follows: the audience to 16*i* to 13*i* to 12*i* to 11*i* to 17*i* to 19*i* to 18*i* to 19*i* to 29*i* to 1*i* to the speaker configured in the end cap module shown in FIG. 18, and then audio to the observer.

2*i* is a unidirectional signal line carrying the analog video and audio signals from 1*i* to 3*i*.

3*i* is the DVR electronics. 3*i* is comprised of an video analog to digital converter, an audio analog to digital converter, a digital signal compressor. a set of digital streaming encoders, a distribution logic circuit, a record/playback logic circuit, a analog audio/video pass thru circuit, a administrative controller electronics circuit and a and a circuit for buffering the analog audio video signal output level.

4*i* is the analog video and analog audio output signal line from the DVR 3*i* to the analog transmitter 5*i*.

5*i* is the analog transmitter. 5*i* is configured for 5.8 GHZ FM for example, and for other frequencies to match the FCC rules and regulations pertaining to the particular operating environment of the mobile apparatus i.e. the noise floor at the observing site for example. 5*i* is for driving 7*i* to radiate a composite video and audio signal carrying the electronically transformed optical image and audio sounds to the observer. The transmitter is chosen in a preferred embodiment, to be an analog transmitter especially for producing real-time electronic signals without latency. There are many observing situations that require zero or little latency i.e. in toxic medical environments where a microscope is used for example. These are safety related situations for example where it is time critical that the observer must see the action in real time as it is happening without any electronic delays in order to be able to respond and react quickly to an event.

6*i* is the analog transmitter 5*i* unidirectional output signal line for driving the RF antenna 7*i*. The antenna is both inside and outside the enclosure on a swivel.

7*i* is the RF antenna. The antenna is cut to operate at 5.8 GHZ for example, and cut for other frequencies demanded by 5*i*. 7*i* is physically usually configured internally within the enclosure of the mobile apparatus. In a preferred embodiment, the antenna 7*i* is contained within the mobile apparatus' enclosure. This keeps the antenna out of harms way and reduces the need for antenna maintenance.

There are situations however where it is beneficial for the antenna 7*i* to be physically configured so its radiation pattern can be pointed; for example, situations at the observing site where there is a heavy interfering RF noise floor that threatens the communication of signals at levels needed for acceptable reception and for transmitting by the antenna. Use of an swivel to point the antenna at set up time enables the observer to initially adjustably point the antenna's radiation pattern to maximize the signal communicated to and from the antenna.

In a preferred embodiment, the antenna 7*i* is configured to be adjustably pointed. Pointing adjustability is accomplished by configuring the antenna 7*i* on a mechanical swivel. The swivel is fixed externally to the tail end of the mobile apparatus' enclosure. i.e. depending on the noise floor environment at the observing site of operation. For example, the swivel can be a ball joint of two rotating axial joints.

The antenna can be initially positioned parallel to the enclosure in a groove out of the way; or can be extended to the outside from the inside at the end of the enclosure.

8*i* is the radiated signal from the RF antenna 7*i* to the observers' display unit 9*i* located within 30 feet of the mobile apparatus.

9*i* is the observer's display unit. 9*i* is for displaying a real time analog signal with no latency to the observer. For safety for example in a toxic environment, a real time system with zero latency is essential.

10*i* is the unidirectional signal line carrying the digital video and audio encoded stream of signals from 3*i* to the WiFi digital transceiver electronics 11*i*.

11*i* is the WiFi digital transceiver electronics. 11*i* is for transmitting the encoded audio and video streaming signal from 3*i* by way of 10*i* to the local WIFI LAN audience. Additionally 11*i* also conveys administrative data by way of 17*i* and 19*i* to system controller 18*i*.

12*i* is the unidirectional signal line carrying the WIFI streaming video and audio signals from the WiFi digital transceiver electronics 11*i* to the WiFi antenna 13*i*. Additionally 12*i* also carries administrative data from 15*i* to 18*i* by way of 11*i* and 12*i* and 17*i* and 19*i* to system controller 18*i*.

13*i* is the WiFi antenna. 13*i* is cut to 2.4 GHZ and/or 5.8 GHZ depending on the audience's wireless equipment.

14*i* is the digital streaming video and audio signals radiated from the WiFi antenna 13*i* to the observer's PC 15*i*, and the RF control command signals received by the WiFi antenna 13*i* from the observer's PC 15*i*.

15*i* is the observers' PC configured with an App for the initial programming setup of the system controller 18*i*. 15*i* is comprised of the App for enabling the observer to control the camera; and for making logic decisions regarding whether to play or record the captured analog audio and analog video streams; and for controlling the zoom lens actuator.

16*i* is the radiated digital streaming video and audio signals from the WiFi antenna 13*i* to the local WIFI LAN audience.

17*i* is the bidirectional control signal line carrying the administrative control commands to and from and between the WIFI transceiver 11*i* and the system controller 18*i*.

18*i* is the system controller electronics. The mobile apparatus is configured for hard wired, fiber optics and wireless bi-directional communication capability. 18*i* is configured with a microprocessor for controlling all of the functions of the mobile apparatus, i.e. it holds the configuration files that determines items such as the operating frequencies of the WiFi and analog transmission settings of the various transmitters and transceivers 5*i* and 11*i* and 20*i*. The microprocessor is configured with applications software and firmware.

In a preferred embodiment, the microprocessor manages the connectivity to the USB, Ethernet and fiber optics ports.

In addition, the microprocessor manages the electrical power distribution to the electric consuming modules of the mobile apparatus; and selects which delivery mechanism i.e. one or any combination of outputs to the outside world is active; and additionally manages the USB and wired Ethernet communication port 31*i* and 42*i* respectively; 18*i* also controls and manages the flow of data from the observer's human interface device i.e. PC hard wired connected to USB port 31*i* for example.

In another example, 18*i* also controls wireless control by the observer's human interface device 15*i* of the zoom lens actuator configured in 1*i* is via 14*i*, 13*i*, 12*i*, 11*i*, 17*i*, 18*i*, 19*i*, and 29*i*.

In another example where the observer is remote to 23*i*, i.e. over the Internet, the path of wireless control of the zoom lens actuator in 1*i* is via 23*i*, 22*i*, 21*i*, 20*i*, 18*i*, 19*i* and 29*i*.

In yet another example, the observer can exercise hard wired control of the zoom lens actuator in 1*i* via 42*i*, 18*i*, 7*i* and 29*i*, where 18*i* controls and manages the hard wired Ethernet bidirectional port 42*i*.

Electric power is supplied over Ethernet port 42*i* to power 32*i* via 43*i*, where 43*i* is a D.C. power bus fed by Ethernet 42*i* for delivering electric power to 32*i*.

In yet another example, the microprocessor manages the wireless transmission of electronic audio signals to the observer.

In yet another example, the microprocessor manages the wireless transmission of electronic audio signals to the observer's audience under the control of the observer.

In yet another example, the microprocessor manages the wireless receiving of electronic audio signals from the observer's audience, under the control of the observer.

In yet another example, the microprocessor manages the electronic storing of electronic audio signals from the observer's audience under the control of the observer.

In yet another example, the microprocessor manages the electronic retrieval of the observer's audiences' electronic audio signals from the electronic memory on demand by said observer's audience, under the control of said observer.

In still another example, in order to minimize the potential radio frequency interference that may be created by a multiplicity of the mobile apparatuses operating in proximity to one another that may be attached to a variety of different optical image sources participating in an observing session, each microprocessor of each of the multiplicity of the mobile apparatuses is configured with a applications software enabling each of the multiplicity of the mobile apparatuses to be commanded by the observer to communicate to the operator the best choice of radio frequencies for the observer to use for each one of the multiplicity of the mobile apparatuses operating in proximity to one another in order to minimize the radio frequency interference effects created between the multiplicity of the other mobile apparatuses operating in proximity to one another. The observer then can remotely or locally reset the radio frequencies used by each of the apparatuses, and can re-poll the apparatuses over and over again to assure that the best frequency configuration among the mobile apparatuses is used; and the observer can re-poll the apparatuses in the future should conditions from other potential outside sources of radio interference change the topography of the interference patterns in the vicinity of the apparatuses.

19$i$ is the bidirectional signal line carrying the administrative control commands to and from the system controller 18$i$, to the zoom lens actuator contained in 1$i$, to the image sensor array contained in 1$i$, to the microphone contained in 1$i$, to the DVR 3$i$, and to the Internet WIFI transceiver electronics 20$i$; and additionally to the digital video and digital audio storage memory 27$i$.

20$i$ is the Internet WIFI transceiver electronics. 20$i$ is for transmitting digital video and audio encoded streams from 3$i$ by way of 24$i$ to the internet audience 23$i$ by way of 21$i$ and 22$i$.

21$i$ is the is the bidirectional signal line carrying the WIFI streaming video and audio signals from 20$i$ to the Internet WIFI transceiver antenna 22$i$ to reach the Internet audience 23$i$.

22$i$ is the Internet WIFI transceiver antenna. 22$i$ is for radiating WiFi signals to the WiFi access point (not shown); and for receiving administrative data from the Internet based observer via 20$i$ and 19$i$ to 18$i$.

23$i$ is the radiated digital streaming video and audio signals from the Internet WIFI transceiver antenna 22$i$ to the Internet and the extended WIFI audience via the wireless access point not shown.

24$i$ is the unidirectional signal line carrying the digital video and audio signals from the DVR 3$i$ to the Internet WiFi transceiver electronics 20$i$.

25$i$ is the bidirectional control signal line carrying the administrative control commands to and from and between the DVR 3$i$ and the system controller 18$i$.

26$i$ is the bidirectional line carrying the digital video and audio signals from the DVR 3$i$ to the DVR storage memory device 27$i$.

27$i$ is the DVR storage memory device.

28$i$ is the bidirectional line carrying the administrative control commands to and from and between the system controller 18$i$ and the DVR storage memory device 27$i$ via 19$i$ which is the central bus.

29$i$ is the bidirectional line carrying the administrative control commands to and from and between 1$i$ and the system controller 18$i$ via 19$i$.

30$i$ is the radiated analog signal from the RF antenna 7$i$ to the local audience within a short range of the mobile apparatus, i.e. 35 feet for example.

31$i$ is the bidirectional line carrying the I/O to and from the USB port of the observer's PC 15$i$ to and from the system controller 18$i$ during the initial programming setup. In addition, 31$i$ is for transmitting content and for transmitting and receiving administrative data via USB protocol.

31$i$ is also an alternative path for the observer to control the zoom lens actuator which controls the zoom lens magnification, iris diaphragm and the focus. The path for control of the zoom lens actuator is the observer to 31$i$ to 18$i$ to 19$i$ to 29$i$ to 1$i$ and to the zoom lens servo electronics package, and to the zoom lens actuator, and to the zoom lens. 31$i$ is also an alternative path for the observer to view status of the zoom lens magnification, iris diaphragm and the focus. The alternative path for viewing the status is from the zoom lens actuator to 1$i$ to the zoom lens servo electronics package, to 29$i$ to 19$i$ to 18$i$ to 31$i$ and to the observer.

32$i$ is a battery. 32$i$ is for supplying electricity to 1$i$, 3$i$, 5$i$, 11$i$, 18$i$, 20$i$, 27$i$, and 32$i$ via 35$i$. 32$i$ is comprised of a battery, power handling electronics, power distribution electronics, and charging electronics.

33$i$ is an administrative bi-directional data link between 18$i$ and 32$i$ via 19$i$ for controlling the power-up cycle, and for reading the state of 32$i$, i.e. battery life remaining, time to fully charge, and cumulative time on the battery for example communicates 34$i$ is a d.c. power bus supplied by USB port 31$i$ for supplying power to charge 32$i$.

35$i$ is an internal power bus supplying power to 1$i$, 3$i$, 5$i$, 11$i$, 18$i$, 20$i$, 27$i$, and 32$i$.

36$i$ is the encoded audio and video stream from 3$i$ for input to 37$i$.

37$i$ is the HDMI encoder for driving the HDMI output port 38$i$.

38$i$ is the HDMI output port for delivering HDMI audio and video streaming content to external equipment i.e. monitors, broadcast infrastructure, recording devices, goggles headgear for example.

39$i$ is the encoded streaming audio and video data for feeding USB encoder 40$i$.

40$i$ is an encoder with streaming outputs for transmission via USB and Ethernet and fiber optics protocols for delivering audio and video content via 41$i$ and 18$i$ to USB port 31$i$, and Ethernet port 42$i$, and fiber optic port 44$i$, for delivering content to external world devices for broadcasting, display, recording, storage and playback.

41$i$ is a bidirectional data bus from 40$i$ to 18$i$ for delivering encoded audio and video content from 40$i$ to 31$i$ and 42$i$ and 44$i$ via 18$i$.

42$i$ is the analog electronic image sensor array camera. As shown in FIG. 8, the link between 1$i$ and 42$i$ is bi-directional. Analog electronic imagery signals from 42$i$ are inputted to 1$i$. Camera control commands from the observer are routed through 1$i$ and inputted to the analog electronic image sensor array camera 42$i$. A typical camera control command for low light astronomical objects, for example, is for setting the extended exposure time of the electronic image sensor array camera.

The analog image sensor array camera is for capturing the optical image presented to it on its photo active image sensor array surface, and transforming the optical image to an analog electronic image signal protocol.

The analog image sensor array camera is for taking the signal from its analog image sensor array and transforming the signal to meet the NTSC video camera output protocol i.e. National System Television Committee.

The analog image sensor array camera is chosen in the preferred embodiment because of its ability to capture the optical image presented to it on its photo active sensor array surface, and transforming the optical image to be a real-time electronic image signal without latency.

It is noted that the circuits described herein are primarily made of CMOS chip components for keeping the power consumption low and for lengthening the operating time on the batteries for long observing sessions.

The present invention has both wireless and hard-wire communication and control capability and is compatible with a wide variety of electronic protocols.

For example:
analog television broadcast standards NTSC, PAL, SECAM
digital video elementary stream protocols H.264, HEVC, VP8, VP9
digital audio elementary stream protocols MP3, VORBIS, AAC, OPUS
digital audio and video combined stream protocols for delivery to the observer and audience MP4, FLV, WEBM, ASF, ISMA
digital control protocol for web app viewing: MMS (Microsoft Media Server protocol), RTSP (Real Time streaming protocol)
HTTP (Hyper Text live streaming Protocol)

The present invention has RF wireless capability, thereby enabling the observer to capture video imagery from the mobile apparatus during his observing session without the use of wires or cables; and furthermore enabling the observer to communicate with and control the mobile apparatus during his observing session without the use of wires or cables; and even furthermore enabling the observer to share his observations during and after his observing session with an audience of people and their machines without the use of wires or cables.

The present invention also has hard-wire capability, thereby enabling the observer to capture video and audio from the mobile apparatus during his observing session with the use of wires or cables; and furthermore enabling the observer to communicate with and control the mobile apparatus during his observing session with the use of wires or cables; and even furthermore enabling the observer to share his observations during and after his observing session with an audience of people and their machines with the use of wires or cables.

The mobile apparatus is configured with electronic safeguards enabling the mobile apparatus to operate in high RF noise interference environments. These safeguards are built into the electronics of the present invention. These safeguards are necessary in some extreme cases, where the RF noise interference in the environment where the mobile apparatus is deployed, would otherwise affect the electronic image signal quality and electronic image signal latency if the safeguards were not configured in place. These RF noise safeguards insure and protect the reliable wireless transmission of the electronic imagery signals.

The mobile apparatus, which is the subject of the present invention, has six modes of communication with the observer; and four modes of communication with his audience.

These modes of communication can be carried out wirelessly lone, with wires and cables alone, or with a combination of wireless and hard-wires. The mobile apparatus is configured to leave the choice of mode up to the observer.

There are six types of observers. Each type of observer is defined by his mode of communication with the mobile apparatus.

The first type of observer is one who is present at the optical image source and who is manually operating the mobile apparatus.

The second type of observer is one who is present at the optical image source who is wirelessly operating the mobile apparatus.

The third type of observer is one who is not present at the optical image source and who is wirelessly operating the mobile apparatus, but who is located local to the optical image source, i.e. within 35 feet for example.

The fourth type of observer is one who is located somewhat remote to the optical image source and who is wirelessly operating the mobile apparatus, i.e. within 2 miles for example.

The fifth type of observer is one who is located geographically remote to the observer and who is wirelessly operating the mobile apparatus. i.e. over 2 miles on the Earth for example.

The sixth type of observer is one who is located geographically very remote to the optical image source and who is wirelessly operating the mobile apparatus, i.e. beyond the surface of the Earth in space for example.

The audience or spectators or limited segments of the public are of four types.

The first type of audience are those people and machines that are local and located physically close to the observer i.e. within 35 feet for example.

The second type of audience are those people and machines located somewhat remote to the observer i.e. within 2 miles for example.

The third type of audience are those people and machines located geographically remote to the observer i.e. over 2 miles on the Earth for example.

The fourth type of audience are those people and machines located geographically very remote to the observer i.e. beyond the surface of the Earth in space for example.

The Following is a List of PROTOCOLS AND INDUSTRY STANDARDS Met by the Present Invention FIG. 8
For 31*i*, USB Port—At the time of this writing the USB 3.0 specification is commonly used.
Drivers specific to the OS will have additional protocols for communication between devices, Firmware and Software Apps subject to future development.
The Administrative data link to the observers PC 15*i* will use Drivers specific to the OS that will have additional protocols for communication subject to future development between devices, Firmware and Software Apps.

The Audio, Video and Media information streams are combined into a Transport Stream or container prior to streaming to the audience, observer, etc.

MPEG transport stream (transport stream, MPEG-TS, MTS or TS) is a standard digital container format for transmission and storage of audio, video, and Program and System Information Protocol (PSIP) data. It is used in broadcast systems such as DVB, ATSC and IPTV.

Our product offering will likely use an MPEG TS stream carrying a multiplicity of Audio, Video and program Data such as closed captioning for the sight and hearing impaired audiences As required.

The elementary Audio streams are typically AC-3 encoded multi-channel streams but could also be MPEG for compatibility.

The elementary Video Streams are typically compressed using the h.264 or h.265 Codec depending on the license selection during manufacture. H.265 is newer and offers better video but requires faster CPU and memory, thus introducing some latency.

For 14$i$, 15$i$, 16$i$, and 23$i$.
WIFI Packet—At the time of this writing the following table applies to commercial devices using the unlicensed WIFI Frequency Allocations in USA Markets.
Those highlighted in Yellow represent the most likely to be used for our product offerings.
The others listed would be for backward legacy and forward future compatibility.
IEEE 802.11 Wi-Fi Protocol Summary

| Protocol | Frequency | Channel Width | MIMO | Maximum data rate (theoretical) |
|---|---|---|---|---|
| 802.11ac wave2 | 5 GHz | 80, 80 + 80, 160 MHz | Multi User (MU-MIMO) | 1.73 Gbps[1] |
| 802.11ac wave1 | 5 GHz | 80 MHz | Single User (SU-MIMO) | 866.7 Mbps[1] |
| 802.11n | 2.4 or 5 GHz | 20, 40 MHz | Single User (SU-MIMO) | 450 Mbps[2] |
| 802.11g | 2.4 GHz | 20 MHz | N/A | 54 Mbps |
| 802.11a | 5 GHz | 20 MHz | N/A | 54 Mbps |
| 802.11b | 2.4 GHz | 20 MHz | N/A | 11 Mbps |
| Legacy 802.11 | 2.4 GHz | 20 MHz | N/A | 2 Mbps |

Notes: For 1$i$, 2$i$ spatial streams with 256-QAM modulation. 2$i$, 3$i$ spatial streams with 64-QAM modulation. The Administrative data link to the observers PC 15$i$ will use Drivers specific to the OS that will have additional protocols for communication subject to future development between devices, Firmware and Software Apps.

The Audio, Video and Media information streams are combined into a Transport Stream or container prior to streaming to the audience, observer, etc.

MPEG transport stream (transport stream, MPEG-TS, MTS or TS) is a standard digital container format for transmission and storage of audio, video, and Program and System Information Protocol (PSIP) data. It is used in broadcast systems such as DVB, ATSC and IPTV.

Our product offering will likely use an MPEG TS stream carrying a multiplicity of Audio, Video and program Data such as closed captioning for the sight and hearing impaired audiences As required.

The elementary Audio streams are typically AC-3 encoded multi-channel streams but could also be MPEG for compatibility.

The elementary Video Streams are typically compressed using the h.264 or h.265 Codec depending on the license selection during manufacture. H.265 is newer and offers better video but requires faster CPU and memory, thus introducing some latency.

For 9$i$, and 30$i$.
FM Frequency Modulation radiated by Radio emission 30$i$ is used to convey the individual Audio and Video Signals to the local viewing audience in an NTSC or PAL video format to be compatible with the viewer's receiving device 9$i$. In the USA it is a common practice in broadcasting to transmit NTSC analog video with Negative going sync+ Positive Video in relation to the waveform.

The Audio is frequency multiplexed onto the main carrier along with the composite video by a plurality of High Fidelity narrow band FM Subcarriers, depending on the number of channels desired. DBX Dolby Noise reduction systems can be added subject to licensing agreement at the time of product development.

For 38$i$. The HDMI High Definition Multimedia Interface at the time of this writing the standard used commercially is HDMI 2.1 and was officially announced by the HDMI Forum on Jan. 4, 2017.

It was officially released on Nov. 28, 2017.

It adds support for higher resolutions and higher refresh rates, including 4K 120 Hz and 8K 120 Hz. HDMI 2.1 also introduces a new HDMI cable category called 48G, which certifies cables at the new higher speeds that these formats require.

48G HDMI cables are backwards compatible with older HDMI devices, and older cables are compatible with new HDMI 2.1 devices, though the full 48 Gbit/s bandwidth is not possible without the new cables.

Our product offering in its analog line will not benefit significantly since the current HDMI standards far exceed the bandwidth required but never the less will have an optimized method of connectivity to other devices in the industry.

FIG. 9

FIG. 9 shows a block diagram of a digital electronic circuit for a preferred embodiment of a mobile apparatus.

The digital electronic circuit shown in FIG. 9 meets
digital video elementary stream protocols H.264, HEVC, VP8, VP9 and
digital audio elementary stream protocols MP3, VORBIS, AAC, OPUS and
digital audio and video combined stream protocols for delivery to the observer and
audience MP4, FLV, WEBM, ASF, ISMA and
digital control protocol for web app viewing:
  MMS (Microsoft Media Server protocol), and
  RTSP (Real Time streaming protocol), and
  HTTP (Hyper Text live streaming protocol).

The detailed physical elements disclosed in the drawing shown in FIG. 9 are identified as follows:

1J is an electronics that is comprised of a audio amplifier, and a zoom lens actuator servo electronics package, a microphone interface, and a speaker interface.
  The microphone is for capturing the sounds presented to it, and transforming the sounds to an electronic signal.
  The audio amplifier is for adjusting and buffering the audio signal output level of the microphone. The microphone is physically located and mounted in the end cap module of the mobile apparatus shown in FIGS. 18A & 18B & 18C & 18E and 18F & 18G where it is easily accessible to the observer at the end of the mobile apparatus for the observer's verbal narration and communication with the audience.

The speaker is for transforming audio electronic signals into sounds, thereby enabling the observer to communicate with the audience audibly. The audio amplifier is for adjusting and buffering the audio signal input level to the speaker. The speaker is physically located and mounted in the threaded screw-on end cap module of the mobile apparatus shown in FIGS. 18A & 18B & 18C & 18E and 18F & 18G where it is easily accessible to the observer at the end of the mobile apparatus for the observer to communicate with and hear the audience.

The servo electronics package in 1J is for receiving electronic control signals from the observer and driving the zoom lens electro-mechanical actuator enabling the observer to control the zoom lens magnification, iris diaphragm and focus.

The zoom lens electro-mechanical actuator is for receiving electronic control signals from the servo electronics package to mechanically actuate the magnification ring, the iris diaphragm ring, and the focus ring of the zoom lens. Additionally, the servo electronics package is also for receiving the status of the state of the zoom lens' magnification, iris diaphragm, and focus from the zoom lens electro-mechanical actuator, and forwarding the status to the observer.

The path of control of the zoom lens magnification, iris diaphragm and focus is from the observer to 15J to 14J to 13J to 12J to 11J to 17J to 19J to 18J to 19J to 29J to the servo electronics package in 1J, and then to the electro-mechanical actuator, and to the zoom lens.

The path of the zoom lens magnification status, iris diaphragm status, and focus status is from the electro-mechanical actuator to 1J to 29J to 19J to 18J to 19J to 17J to 11J to 12J to 13J to 14J to 15J and then to the observer for viewing the status.

The path for the observer to speak and convey audio to the audience is as follows: the observer speaks into the microphone configured in the end of the mobile apparatus in the end cap module of the mobile apparatus shown in FIG. 18, the end cap module to 1J, 1J to 29J to 19J to 18J to 19J to 17J to 11J to 12J to 13J to 16J to the audience.

The path for the audience to speak to the observer is as follows: the audience to 16J to 13J to 12J to 11J to 17J to 19J to 18J to 19J to 29J to 1J to the speaker configured in the end cap module shown in FIG. 18, and then audio to the observer.

2J is a unidirectional signal line carrying the digital video and audio signals from 1J to 3J.

3J is the DVR electronics. 3J is comprised of ten digital signal compressors i.e. "CODEC" wherein there are five CODECs for video and five CODECs for audio, a set of digital streaming encoders, a distribution logic circuit, a record/playback logic circuit, a administrative controller electronics circuit, and a and a circuit for buffering the digital audio video signal output level.

4J is the digital video and digital audio output signal line from the DVR 3J for delivery to the digital transmitter 5J i.e. "OFDM" orthogonal frequency division modulation.

5J is the digital transmitter. 5J is configured for 5.8 GHZ OFDM for example, and for other frequencies to match the FCC rules and regulations pertaining to the particular operating environment of the mobile apparatus i.e. the noise floor at the observing site for example. 5J is for driving 7J, via 6J, for 7J to radiate a composite video and audio signal 8 carrying the electronically transformed optical image and audio sounds to the observer using 9J.

The transmitter 5J is chosen in a preferred embodiment, to be an digital transmitter especially for producing HD electronic signals with some latency i.e. "OFDM". However, there are many observing situations that require zero latency as we have accomplished for example in FIG. 7, i.e. for toxic medical environments where a microscope is used for example. These are safety related situations for example where it is time critical that the observer must see the action in real time as it is happening without any electronic delays in order to be able to respond and react quickly to an event.

6J is the unidirectional output signal line of the digital transmitter 5J, for driving the RF antenna 7J. RF antenna 7J is comprised of a plurality of antenna elements to accomplish the "OFDM" transmission protocol, wherein the elements are deployed on mechanical swivels to enable them to be pointed in order to maximize the radiation pattern.

7J is the RF antenna. The antenna is cut to operate at 5.8 GHZ for example, and cut for other frequencies demanded by 5J. At close range for local applications for example, in a preferred embodiment, 7J is physically configured internally within the enclosure of the mobile apparatus. digital transmitter 5J. This is made possible by the use of the "OFDM" transmission protocol scheme. This keeps the antenna out of harms' way and reduces the need for antenna maintenance. There are situations however where it is beneficial for the antenna 7J to be physically configured so its radiation pattern can be pointed; for example, situations at the observing site where there is a heavy interfering RF noise floor that threatens the communication of signals at levels needed for acceptable reception and for transmitting by the antenna. Use of swivels to point the antenna during set-up and initialization time enables the observer to initially adjustably point the antenna's elements' radiation pattern to maximize the signal communicated to and from the antenna to the observer.

In a preferred embodiment, the antenna 7J is configured to be adjustably pointed. Pointing adjustability is accomplished by configuring the elements of antenna 7J on mechanical swivels. The swivels are fixed externally to the tail end of the mobile apparatus' enclosure. i.e. depending on the noise floor environment at the observing site of operation. For example, the swivel can be of two types, i.e. ball joint or two rotating axial joints. In a preferred embodiment, the antenna elements are on swivels in a notch of the mobile apparatus out of the way; and can be extended and rotated to the outside of the notch of the enclosure.

8J is the radiated signal from the RF antenna 7J for dissemination to the observers' display unit 9J located locally within 35 to 1000 feet of the mobile apparatus. We note that "OFDM" has made an improvement in the local range over the analog approach because of its more efficient use of the available bandwidth.

9J is the observer's display unit. 9J is for displaying the audio and video from the site of the optical image source to the observer.

10J is the unidirectional signal line carrying the digital video and audio encoded stream of signals from 3J to the WiFi digital transceiver electronics 11J.

11J is the WiFi digital transceiver electronics. 11J is for transmitting the encoded audio and video streaming signal received from 3J via 10J to the local WIFI LAN audience. Additionally 11J also conveys administrative data via 17J and 19J to system controller 18J.

12J is the unidirectional signal line carrying the WIFI streaming video and audio signals from the WiFi digital transceiver electronics 11J to the WiFi antenna 13J.
  Additionally 12J also carries administrative data from 15J to 18J by way of 11J and 12J and 17J and 19J to system controller 18J.
13J is the WiFi antenna. 13J is cut to 2.4 GHZ and/or 5.8 GHZ depending on the audience's wireless equipment.
14J is the digital streaming video and audio signals radiated from the WiFi antenna 13J to the observer's PC 15J, and the RF control command signals received by the WiFi antenna 13J from the observer's PC 15J.
15J is the observers' PC configured with an App for the initial programming setup of the system controller 18J. 15J is comprised of the App for enabling the observer to control the camera; and for making logic decisions regarding whether to play or record the captured digital transmitter 5J audio and digital transmitter 5J video streams; and for controlling the zoom lens actuator.
16J is the radiated digital streaming video and audio signals from the WiFi antenna 13J to the local WIFI LAN audience. For example, observers' and audience's smart phones, tablets and PC's receive imagery from 16J.
17J is the bidirectional control signal line carrying the administrative control commands to and from and between the WIFI transceiver 11J and the system controller 18J.
18J is the system controller electronics.
  The mobile apparatus is configured for hard wired, fiber optics and wireless bi-directional communication capability. 18J is configured with a microprocessor for controlling all of the functions of the mobile apparatus, i.e. it holds the configuration files that determines items such as the operating frequencies of the WiFi and analog transmission settings of the various transmitters and transceivers 5J and 11J and 20J.
  The microprocessor is configured with applications software and firmware.
  In a preferred embodiment, the microprocessor is configured with applications firmware for enabling the observer to perform voice recognition and generate text archives for said $1^{st}$ audio signals from said observer, and said audio signals from said audience.
  In a preferred embodiment, the microprocessor manages the connectivity to the USB, Ethernet and fiber optics ports.
  In addition, the microprocessor manages the electrical power distribution to the electric consuming modules of the mobile apparatus; and selects which delivery mechanism i.e. one or any combination of outputs to the outside world is active; and additionally manages the USB and wired Ethernet communication port 31J and 42J respectively;
  18J also controls and manages the flow of data from the observer's human interface device i.e. PC hard wired connected to USB port 31J for example.
  In another example, 18J also controls wireless control by the observer's human interface device 15J of the zoom lens actuator configured in 1J is via 14J, 13J, 12J, 11J, 17J, 18J, 19J, and 29J.
  In another example where the observer is remote to 23J, i.e. over the Internet, the path of wireless control of the zoom lens actuator in 1J is via 23J, 22J, 21J, 20J, 18J, 19J and 29J.
  In yet another example, the observer can exercise hard wired control of the zoom lens actuator in 1J via 42J, 18J, 7J and 29J, where 18J controls and manages the hard wired Ethernet bidirectional port 42J.
Electric power is supplied over Ethernet port 42J to power 32J via 43J, where 43J is a D.C. power bus fed by Ethernet 42J for delivering electric power to 32J.
In still another example, in order to minimize the potential radio frequency interference that may be created by a multiplicity of the mobile apparatuses operating in proximity to one another that may be attached to a variety of different optical image sources participating in an observing session, each microprocessor of each of the multiplicity of the mobile apparatuses is configured with a applications software enabling each of the multiplicity of the mobile apparatuses to communicate to the operator the best choice of radio frequencies for the observer to use for each one of the multiplicity of the mobile apparatuses operating in proximity to one another in order to minimize the radio frequency interference created between the multiplicity of the mobile apparatuses operating in proximity to one another. With this information, the observer can remotely or locally reset the radio frequencies used by each of the mobile apparatuses to minimize the potential interference problem. The app enables the observer to re-poll each of the mobile apparatuses over and over again at the observer's command to determine the effectiveness of the observer's new chosen frequency settings. After several iterations, the operator can be reassured that the best choice of radio frequency settings for each mobile apparatus has been arrived at. As time changes, there may be other potential sources of interference that come into play. The observer may then again poll the field of mobile apparatuses to determine the best choice of new frequencies to set to minimize the effects of the new interference threats.
VPN means Virtual Private Network.
  An APP, VPN software is included in the firmware of the mobile apparatus to enable VPN support. VPN encrypts and decrypts the data packets transmitted and received to and from the audience via WiFi or wired Ethernet. VPN enables the encryption of the digital pathway; but not the encryption of the analog pathway. The VPN APP firmware is resident in 18J.
RSSI means Received Signal Strength Indication.
  An APP, RSSI software is included in the firmware of the mobile apparatus to enable RSSI support.
  The RSSI APP is used by the observer at set-up time to determine if the external antennas on the mobile apparatus need to be deployed for improving transmission and receiving. The RSSI APP analyzes the RF spectrum in the vicinity of the optical image source to determine the ambient noise floor. This is especially true with VPN.
SSID means Service Set Identifier.
  The observer uses the SSID APP at set-up time to scan the vicinity of optical image source for existing WiFi activity for selecting a unique SSID for the mobile apparatus in order to enable WiFi communication between the mobile apparatus, the observer, and members of the audience that are using WiFi. The SSID must be unique to other existing WiFi activity that is not participating in the broadcast to and from the apparatus. The SSID APP aides in the selection and setting of 18J's operating parameters such as the mobile apparatus' SSID. The SSID is a Service Set Identifier which is the name assigned to the particular WiFi network in question that all devices participating in the network must use. The SSID APP firmware is resident in 18J.

18J is configured for multiple mobile apparatuses to be used simultaneously.

When multiple mobile apparatuses are used simultaneously in close proximity to one another with respect to their WiFi coverage, communication between apparatuses takes place to coordinate simultaneous transmission and reception of the data packet for independent selection by the observer and the audience.

Each mobile apparatus is configured for enabling the observer to control multiple mobile apparatuses simultaneously to transmit and receive signals in the form of digital data packets.

Each mobile apparatus is configured with a system controller electronics 18J. 18J is for controlling all of the functions of the mobile apparatus, i.e. it holds the configuration files that determines items such as the operating frequencies of the WiFi and analog transmission settings of the various, transmitters and transceivers 5J and 11J and 20J.

- In yet another example, the microprocessor manages the wireless transmission of electronic audio signals to the observer.
- In yet another example, the microprocessor manages the wireless transmission of electronic audio signals to the observer's audience under the control of the observer.
- In yet another example, the microprocessor manages the wireless receiving of electronic audio signals from the observer's audience, under the control of the observer.
- In yet another example, the microprocessor manages the electronic storing of electronic audio signals from the observer's audience, under the control of the observer.
- In yet another example, the microprocessor manages the electronic retrieval of the observer's audiences' electronic audio signals from the electronic memory on demand by said observer's audience, under the control of said observer 19J is the bidirectional signal line carrying the administrative control commands to and from the system controller 18J, to the zoom lens actuator contained in 1J, to the image sensor array contained in 1J, to the microphone contained in 1J, to the DVR 3J, and to the Internet WIFI transceiver electronics 20J; and additionally to the digital video and digital audio storage memory 27J.

20J is the Internet WIFI transceiver electronics. 20J is for transmitting digital video and digital audio encoded streams from 3J by way of 24J to the Internet audience 23J by way of 21J and 22J.

21J is the is the bidirectional signal line carrying the WIFI streaming video and audio signals from 20J to the Internet WIFI transceiver antenna 22J to reach the Internet audience 23J.

22J is the Internet WIFI transceiver antenna. 22J is for radiating WiFi signals to the WiFi access point (not shown); and for receiving administrative data from the Internet based observer via 20J and 19J to 18J.

23J is the radiated digital streaming video and audio signals from the Internet WIFI transceiver antenna 22J to the Internet and the extended WIFI audience via the wireless access point (not shown). For example, observers' and audience's smart phones, tablets and PC's receive imagery from 23J.

24J is the unidirectional signal line carrying the digital video and audio signals from the DVR 3J to the Internet WiFi transceiver electronics 20J.

25J is the bidirectional control signal line carrying the administrative control commands to and from and between the DVR 3J and the system controller 18J.

26J is the bidirectional line carrying the digital video and audio signals from the DVR 3J to the DVR storage memory device 27J.

27J is the DVR storage memory device.

28J is the bidirectional line carrying the administrative control commands to and from and between the system controller 18J and the DVR storage memory device 27J via 19J which is the central bus.

29J is the bidirectional line carrying the administrative control commands to and from and between 1J and the system controller 18J via 19J.

30J is the radiated digital signal from the RF antenna 7J to the local audience within a short range of the mobile apparatus, i.e. 35-1000 feet for example.

31J is the bidirectional line carrying the I/O to and from the USB port of the observer's PC 15J to and from the system controller 18J during the initial programming setup.

- 31J is also an alternative path for the observer to control the zoom lens actuator which controls the zoom lens magnification, iris diaphragm and the focus. The path for control of the zoom lens actuator is the observer to 31J to 18J to 19J to 29J to 1J and to the zoom lens servo electronics package, and to the zoom lens actuator, and to the zoom lens.
- 31J is also an alternative path for the observer to view status of the zoom lens magnification, iris diaphragm and the focus. The alternative path for viewing the status is from the zoom lens actuator to 1J to the zoom lens servo electronics package, to 29J to 19J to 18J to 31J and to the observer.

32J is a battery. 32J is for supplying electricity to 1J, 3J, 5J, 11J, 18J, 20J, 27J, and 32J via 35J. 32J is comprised of a battery, power handling electronics, power distribution electronics, and charging electronics.

33J is an administrative bi-directional data link between 18J and 32J via 19J for controlling the power-up cycle, and for reading the state of 32J, i.e. battery life remaining, time to fully charge, and cumulative time on the battery as examples.

34J is a D.C. power bus supplied by USB port 31J for supplying electric power to charge 32J.

35J is an internal power bus supplying power to 1J, 3J, 5J, 11J, 18J, 20J, 27J, and 32J.

36J is the encoded audio and video stream from 3J for input to 37J.

37J is the HDMI encoder for driving the HDMI output port 38J.

38J is the HDMI output port for delivering HDMI audio and video streaming content to external equipment i.e. monitors, broadcast infrastructure, recording devices, goggles headgear for example.

39J is the encoded streaming audio and video stream for feeding encoder 40J.

40J is an encoder with streaming outputs for transmission via USB and Ethernet and fiber optics protocols for delivering audio and video content via 41J and 18J to USB port 31J, and Ethernet port 42J, and fiber optic port 44J, for delivering content to external world devices for broadcasting, display, recording, storage and playback.

41J is a bidirectional data bus from 40J to 18J for delivering encoded audio and video content from 40J to 31J and 42J and 44J via 18J.

42J is an Ethernet port configured on 18J to any external wired network for transmitting content and for transmitting and receiving administrative data via wired Ethernet protocol.

42J is also an alternative path for the observer to control the zoom lens actuator which controls the zoom lens magnification, iris diaphragm and the focus. The path for control of the zoom lens actuator is the observer to 42J to 18J to 19J to 29J to 1J and to the zoom lens servo electronics package, and to the zoom lens actuator, and to the zoom lens.

42J is also an alternative path for the observer to view status of the zoom lens magnification, iris diaphragm and the focus. The alternative path for viewing the status is from the zoom lens actuator to 1J to the zoom lens servo electronics package, to 29J to 19J to 18J to 42J and to the observer.

43J is a D.C. power bus fed by Ethernet 42J for delivering electric power to 32J.

44J is a bidirectional fiber optic port configured on 18J for transmitting content, and for transmitting and receiving administrative data via fiber optic protocol to any external fiber optic network.

44J is also an alternative path for the observer to control the zoom lens actuator which controls the zoom lens magnification, iris diaphragm and the focus. The path for control of the zoom lens actuator is the observer to 44J to 18J to 19J to 29J to 1J and to the zoom lens servo electronics package, and to the zoom lens actuator, and to the zoom lens.

44J is also an alternative path for the observer to view status of the zoom lens magnification, iris diaphragm and the focus. The alternative path for viewing the status is from the zoom lens actuator to 1J to the zoom lens servo electronics package, to 29J to 19J to 18J to 44J and to the observer.

45J is the digital electronic image sensor array camera. As shown in FIG. 9, the link between 1J and 45J is bi-directional.

Digital electronic imagery signals from 45J are inputted to 1J. Camera control commands from the observer are routed through 1J and inputted to the digital electronic image sensor array camera 45J. A typical camera control command for low light astronomical objects, for example, is for setting the extended exposure time of the electronic image sensor array camera.

The digital image sensor array camera is for capturing the optical image presented to it on its photo active image sensor array surface, and transforming the optical image to a digital electronic image signal meeting HD and lesser protocols.

It is noted that the circuits described herein are primarily made of CMOS chip components for keeping the power consumption low and for lengthening the operating time on the batteries for long observing sessions.

The present invention has RF wireless capability, thereby enabling the observer to capture video imagery from the mobile apparatus during his observing session without the use of wires or cables; and furthermore enabling the observer to communicate with and control the mobile apparatus during his observing session without the use of wires or cables; and even furthermore enabling the observer to share his observations during and after his observing session with an audience of people and their machines without the use of wires or cables.

The present invention also has hard-wire capability, thereby enabling the observer to capture video and audio from the mobile apparatus during his observing session with the use of wires or cables; and furthermore enabling the observer to communicate with and control the mobile apparatus during his observing session with the use of wires or cables; and even furthermore enabling the observer to share his observations during and after his observing session with an audience of people and their machines with the use of wires or cables.

The mobile apparatus is configured with electronic safeguards enabling the mobile apparatus to operate in high RF noise interference environments. These safeguards are built into the electronics of the present invention. These safeguards are necessary in some extreme cases, where the RF noise interference in the environment where the mobile apparatus is deployed, would otherwise affect the electronic image signal quality and electronic image signal latency if the safeguards were not configured in place. These RF noise safeguards insure and protect the reliable wireless transmission of the electronic imagery signals.

The mobile apparatus, which is the subject of the present invention, has six modes of communication with the observer; and four modes of communication with his audience.

These modes of communication can be carried out wirelessly lone, with wires and cables alone, or with a combination of wireless and hard-wires. The mobile apparatus is configured to leave the choice of mode up to the observer.

There are six types of observers. Each type of observer is defined by his mode of communication with the mobile apparatus.

The first type of observer is one who is present at the optical image source and who is manually operating the mobile apparatus.

The second type of observer is one who is present at the optical image source who is wirelessly operating the mobile apparatus.

The third type of observer is one who is not present at the optical image source and who is wirelessly operating the mobile apparatus, but who is located local to the optical image source, i.e. within 35 feet for example.

The fourth type of observer is one who is located somewhat remote to the optical image source and who is wirelessly operating the mobile apparatus, i.e. within 2 miles for example.

The fifth type of observer is one who is located geographically remote to the observer and who is wirelessly operating the mobile apparatus. i.e. over 2 miles on the Earth for example.

The sixth type of observer is one who is located geographically very remote to the optical image source and who is wirelessly operating the mobile apparatus, i.e. beyond the surface of the Earth in space for example.

The audience or spectators or limited segments of the public are of four types.

The first type of audience are those people and machines that are local and located physically close to the observer i.e. within 35 feet for example.

The second type of audience are those people and machines located somewhat remote to the observer i.e. within 2 miles for example.

The third type of audience are those people and machines located geographically remote to the observer i.e. over 2 miles on the Earth for example.

The fourth type of audience are those people and machines located geographically very remote to the observer i.e. beyond the surface of the Earth in space for example.

The following is a list of PROTOCOLS AND INDUSTRY STANDARDS met by the present invention for FIG. 9 and FIG. 10 and FIG. 11.

For 31J. USB Port—At the time of this writing the USB 3.0 specification is commonly used.

Drivers specific to the OS will have additional protocols for communication between devices, Firmware and Software Apps subject to future development.

The Administrative data link to the observers PC 15J will use Drivers specific to the OS that will have additional protocols for communication subject to future development between devices, Firmware and Software Apps.

The Audio, Video and Media information streams are combined into a Transport Stream or container prior to streaming to the audience, observer, etc.

MPEG transport stream (transport stream, MPEG-TS, MTS or TS) is a standard digital container format for transmission and storage of audio, video, and Program and System Information Protocol (PSIP) data. It is used in broadcast systems such as DVB, ATSC and IPTV.

Our product offering will likely use an MPEG TS stream carrying a multiplicity of Audio, Video and program Data such as closed captioning for the sight and hearing impaired audiences As required.

The elementary Audio streams are typically AC-3 encoded multi-channel streams but could also be MPEG for compatibility.

The elementary Video Streams are typically compressed using the h.264 or h.265 Codec depending on the license selection during manufacture. H.265 is newer and offers better video but requires faster CPU and memory, thus introducing some latency.

For 14, 15, 16, and 23.

WIFI Packet—At the time of this writing the following table applies to commercial devices using the unlicensed WIFI Frequency Allocations in USA Markets.

Those highlighted in Yellow represent the most likely to be used for our product offerings.

The others listed would be for backward legacy and forward future compatibility.

IEEE 802.11 Wi-Fi Protocol Summary

The elementary Audio streams are typically AC-3 encoded multi-channel streams but could also be MPEG for compatibility.

The elementary Video Streams are typically compressed using the h.264 or h.265 Codec depending on the license selection during manufacture. H.265 is newer and offers better video but requires faster CPU and memory, thus introducing some latency.

For 9J and 30J.

Radio Frequency Emissions from 30J using the OFDM Orthogonal Frequency Division Multiplex modulation protocol convey excellent quality Extended and High Definition Video and Sound to the local viewing audience equipped with specialized receivers. The Elementary Audio and Video Streams may be sent uncompressed or compressed depending on the RF environment, noise, etc.

The Audio, Video and Media information streams are combined into a Transport Stream or container prior to streaming to the audience, observer, etc.

MPEG transport stream (transport stream, MPEG-TS, MTS or TS) is a standard digital container format for transmission and storage of audio, video, and Program and System Information Protocol (PSIP) data. It is used in broadcast systems such as DVB, ATSC and IPTV.

Our product offering will likely use an MPEG TS stream carrying a multiplicity of Audio, Video and program Data such as closed captioning for the sight and hearing impaired audiences as required. The elementary Audio streams are typically AC-3 encoded multi-channel streams but could also be MPEG for compatibility.

The elementary Video Streams are typically compressed using the h.264 or h.265 Codec depending on the license selection during manufacture. H.265 is newer and offers better video but requires faster CPU and memory, thus introducing some latency.

| Protocol | Frequency | Channel Width | MIMO | Maximum data rate (theoretical) |
|---|---|---|---|---|
| 802.11ac wave2 | 5 GHz | 80, 80 + 80, 160 MHz | Multi User (MU-MIMO) | 1.73 Gbps[1] |
| 802.11ac wave1 | 5 GHz | 80 MHz | Single User (SU-MIMO) | 866.7 Mbps[1] |
| 802.11n | 2.4 or 5 GHz | 20, 40 MHz | Single User (SU-MIMO) | 450 Mbps[2] |
| 802.11g | 2.4 GHz | 20 MHz | N/A | 54 Mbps |
| 802.11a | 5 GHz | 20 MHz | N/A | 54 Mbps |
| 802.11b | 2.4 GHz | 20 MHz | N/A | 11 Mbps |
| Legacy 802.11 | 2.4 GHz | 20 MHz | N/A | 2 Mbps |

Notes: For 1J, 2J Spatial streams with 256-QAM modulation. For 2J, 3J Spatial streams with 64-QAM modulation. The Administrative data link to the observers PC 15J will use Drivers specific to the OS that will have additional protocols for communication subject to future development between devices, Firmware and Software Apps.

The Audio, Video and Media information streams are combined into a Transport Stream or container prior to streaming to the audience, observer, etc.

MPEG transport stream (transport stream, MPEG-TS, MTS or TS) is a standard digital container format for transmission and storage of audio, video, and Program and System Information Protocol (PSIP) data. It is used in broadcast systems such as DVB, ATSC and IPTV.

Our product offering will likely use an MPEG TS stream carrying a multiplicity of Audio, Video and program Data such as closed captioning for the sight and hearing impaired audiences As required.

For 38J. The HDMI High Definition Multimedia Interface at the time of this writing the standard used commercially is HDMI 2.1 and was officially announced by the HDMI Forum on Jan. 4, 2017.

It was officially released on Nov. 28, 2017.

It adds support for higher resolutions and higher refresh rates, including 4K 120 Hz and 8K 120 Hz. HDMI 2.1 also introduces a new HDMI cable category called 48G, which certifies cables at the new higher speeds that these formats require.

48G HDMI cables are backwards compatible with older HDMI devices, and older cables are compatible with new HDMI 2.1 devices, though the full 48 Gbit/s bandwidth is not possible without the new cables.

Our product offering in its analog line will not benefit significantly since the current HDMI standards far exceed the bandwidth required but never the less will have an optimized method of connectivity to other devices in the industry.

For 42J. The wired Ethernet utilizes 100 Base-T and 1000 BASE-T for transmission of administrative data, media information data and streaming audio and video.

Based on the network environment at the time of this writing administrative data is commonly sent using TCP/IP protocol.

Power over Ethernet POE is supplied where available over the same cable carrying the administrative data, Media stream data and Audio/Video Streams.

Additionally, TLS-authentication, RSA-Encryption and VPN Virtual Private Network are commonly deployed wherever needed to ensure network privacy.

The Audio, Video and Media information streams are combined into a Transport Stream or container prior to streaming to the audience, observer, etc.

MPEG transport stream (transport stream, MPEG-TS, MTS or TS) is a standard digital container format for transmission and storage of audio, video, and Program and System Information Protocol (PSIP) data. It is used in broadcast systems such as DVB, ATSC and IPTV.

Our product offering will likely use an MPEG TS stream carrying a multiplicity of Audio, Video and program Data such as closed captioning for the sight and hearing impaired audiences as required. The elementary Audio streams are typically AC-3 encoded multi-channel streams but could also be MPEG for compatibility.

The elementary Video Streams are typically compressed using the h.264 or h.265 Codec depending on the license selection during manufacture. H.265 is newer and offers better video but requires faster CPU and memory, thus introducing some latency.

For 44J. At the time of this writing the Fiber Optic Cable connection uses bi-directional Coarse Wavelength Division Multiplexing (CWDM) technology to convey high definition audio/video and administrative and media stream data over single mode fiber to studio, mobile broadcasting and video production facilities extended distances.

Transceivers and passives multiplex up to 18J signals onto 1J fiber to improve utilization of the infrastructure.

Military test ranges, Space program lunch monitoring, Medical, Underwater surveillance and communication programs will benefit by MiniCUBE transceivers for High Definition video signals up to 3 Gbps that save space and power.

MC2 series converters with alphanumeric displays of optical power in dBm provide useful diagnostics.

A plurality of Fiber optic converter solutions are available that integrate well with various signal types and are available for fixed and portable applications.

These Video Converter Options are Available for ST, SC and LC Optical Connectors In the preferred embodiment of the apparatus shown, the observer can choose from both analog and digital video cameras in order to match the object being observed and the type of optical image source being used by the observer during the observing session, as well as the desired objectives of the observing session.

The Following is a List of Analog and Digital Protocols Met by the Electronic Image Sensor Array Camera Modules Analog Camera—NTSC composite Video output
Standard definition Digital Camera—SDI Serial digital interface output
High definition Digital Camera—HDSDI High definition serial digital interface output The Serial digital interface (SDI) is a family of digital video interfaces first standardized by SMPTE (The Society of Motion Picture and Television Engineers) in 1989.

For example, ITU-R BT.656 and SMPTE 259M define digital video interfaces used for commercial broadcast video.

A related standard, known as high-definition serial digital interface (HD-SDI), is standardized in SMPTE 292M; this provides a nominal data rate of 1.485 Gbit/s.

Additional SDI standards have been introduced to support increasing video resolutions (HD, UHD and beyond), frame rates, stereoscopic (3D) video, and color depth.

Dual link HD-SDI consists of a pair of SMPTE 292M links, standardized by SMPTE 372M in 1998 this provides service to a nominal 2.970 Gbit/s interface used in applications (such as digital cinema or HDTV 1080P) that require greater fidelity and resolution than standard HDTV can provide.

3G-SDI (standardized in SMPTE 424M) consists of a single 2.970 Gbit/s serial link that allows replacing dual link HD-SDI. 6G-SDI and 12G-SDI standards were published on Mar. 19, 2015.

These standards are used for transmission of uncompressed, unencrypted digital video signals (optionally including embedded audio and time code) within television facilities; they can also be used for packetized data.

Coaxial variants of the specification range in length but are typically less than 300 meters (980 ft). Fiber optic variants of the specification such as 297M allow for long-distance transmission limited only by maximum fiber length or repeaters.

SDI and HD-SDI are usually only available by licensing agreements which restrict their use to licensed manufacturers. The SDI and HDSDI interfaces are unencrypted and uncompressed.

Audio—Both the HD and SD serial interfaces provide for 16 channels of embedded audio. The two interfaces use different audio encapsulation methods—SD uses the SMPTE 272M standard, whereas HD uses the SMPTE 299M standard. In either case, an SDI signal may contain up to sixteen audio channels (8 pairs) embedded 48 kHz, 24-bit audio channels along with the video. Typically, 48 kHz, 24-bit (20-bit in SD, but extendable to 24 bit) PCM audio is stored, in a manner directly compatible with the AES3 digital audio interface.

The various versions of the serial digital interface support numerous video formats.

The 270 Mbit/s interface supports 525-line, interlaced video at a 59.94 Hz field rate (29.97 Hz frame rate), and 625-line, 50 Hz interlaced video. These formats are highly compatible with NTSC and PAL-B/G/D/K/I systems respectively; and the terms NTSC and PAL are often (incorrectly) used to refer to these formats. (PAL is a composite color encoding scheme, and the term does not define the line-standard, though it is most usually encountered with 625i) while the serial digital interface—other than the obsolete 143 Mbit/s and 177 Mbit/s forms—is a component standard.

The 360 Mbit/s interface supports 525i and 625i widescreen. It can also be used to support 525p, if 4:2:0 sampling is used.

The various 540 Mbit/s interfaces support 525p and 625p formats.

The nominal 1.5 Gbit/s interfaces support most high-definition video formats.

Supported formats include 1080/60i, 1080/59.94i, 1080/50i, 1080/30p, 1080/29.97p, 1080/25p, 1080/24p, 1080/23.98p, 720/60p, 720/59.94p, and 720/50p. In addition, there are several 1035i formats (an obsolete Japanese television standard), half-bandwidth 720p standards such as 720/24p (used in some film conversion applications, and unusual because it has an odd number of samples per line[citation needed]), and various 1080psf (progressive, segmented frame) formats. Progressive Segmented frames formats appear as interlace video but contain video which is progressively scanned. This is done to support analog monitors and televisions, many of which are incapable of locking to low field rates such as 30 Hz and 24 Hz.

The dual link HD interface supports 1080/60p, 1080/59.94p, and 1080/50p, as well as 4:4:4 encoding, greater color depth, RGB encoding, alpha channels, and nonstandard resolutions (often encountered in computer graphics or digital cinema).

A quad link interface of HD-SDI supports UHDTV-1 resolution 2160/60p

In the preferred embodiment of the apparatus shown, the observer can choose from both analog and digital video cameras in order to match the object being observed and the type of optical image source being used by the observer during the observing session, as well as the desired objectives of the observing session.

FIG. 10

FIG. 10 shows a block diagram of a digital electronic circuit for a preferred embodiment of a mobile apparatus.

The digital electronic circuit shown in FIG. 10 meets digital video elementary stream protocols H.264, HEVC, VP8, VP9 and digital audio elementary stream protocols MP3, VORBIS, AAC, OPUS and digital audio and video combined stream protocols for delivery to the observer and audience MP4, FLV, WEBM, ASF, ISMA and digital control protocol for web app viewing:

MMS (Microsoft Media Server protocol), and
RTSP (Real Time streaming protocol), and
HTTP (Hyper Text live streaming protocol).

The detailed physical elements disclosed in the drawing shown in FIG. 10 are identified as follows:

1K is an electronics that is comprised of a audio amplifier, and a zoom lens actuator servo electronics package, a microphone interface, and a speaker interface.

The microphone is for capturing the sounds presented to it, and transforming the sounds to an electronic signal. The audio amplifier is for adjusting and buffering the audio signal output level of the microphone. The microphone is physically located and mounted in the threaded screw-on end cap module of the mobile apparatus shown in FIGS. 18A & 18B & 18C & 18E and 18F & 18G where it is easily accessible to the observer at the end of the mobile apparatus for the observer's verbal narration and communication with the audience.

The speaker is for transforming audio electronic signals into sounds, thereby enabling the observer to communicate with the audience audibly. The audio amplifier is for adjusting and buffering the audio signal input level to the speaker. The speaker is physically located and mounted in the threaded screw-on end cap module of the mobile apparatus shown in FIGS. 18A & 18B & 18C & 18E and 18F & 18G where it is easily accessible to the observer at the end of the mobile apparatus for the observer to communicate with and hear the audience.

The servo electronics package in 1K is for receiving electronic control signals from the observer and driving the zoom lens electro-mechanical actuator enabling the observer to control the zoom lens magnification, iris diaphragm and focus.

The zoom lens electro-mechanical actuator is for receiving electronic control signals from the servo electronics package to mechanically actuate the magnification ring, the iris diaphragm ring, and the focus ring of the zoom lens. Additionally, the servo electronics package is also for receiving the status of the state of the zoom lens' magnification, iris diaphragm, and focus from the zoom lens electro-mechanical actuator, and forwarding the status to the observer.

The path of control of the zoom lens magnification, iris diaphragm and focus is from the observer to 15K to 14K to 13K to 12K to 11K to 17K to 19K to 18K to 19K to 29K to the servo electronics package in 1, and then to the electro-mechanical actuator, and to the zoom lens. The path of the zoom lens magnification status, iris diaphragm status, and focus status is from the electro-mechanical actuator to 1K to 29K to 19K to 18K to 19K to 17K to 11K to 12K to 13K to 14K to 15K and then to the observer for viewing the status.

The path for the observer to speak and convey audio to the audience is as follows: the observer speaks into the microphone configured in the end of the mobile apparatus in the end cap module of the mobile apparatus shown in FIG. 18, the end cap module to 1K, 1K to 29K to 19K to 18K to 19K to 17K to 11K to 12K to 13K to 16K to the audience.

The path for the audience to speak to the observer is as follows: the audience to 16K to 13K to 12K to 11K to 17K to 19K to 18K to 19K to 29K to 1K to the speaker configured in the end cap module shown in FIG. 18, and then audio to the observer.

2K is a unidirectional signal line carrying the digital video and audio signals from 1K to 3K.

3K is the DVR. 3K is comprised of ten digital signal compressors i.e. "CODEC" wherein there are five CODECs for video and five CODECs for audio, a set of digital streaming encoders, a distribution logic circuit, a record/playback logic circuit, a administrative controller electronics circuit, and a and a circuit for buffering the digital audio video signal output level.

4K is the digital video and digital audio output signal line from the DVR 3K for delivery to the digital transmitter 5K i.e. "OFDM" orthogonal frequency division modulation.

5K is the digital transmitter. 5K is configured for 5.8 GHZ OFDM for example, and for other frequencies to match the FCC rules and regulations pertaining to the particular operating environment of the mobile apparatus i.e. the noise floor at the observing site for example. 5K is for driving 7K, via 6K, for 7K to radiate a composite video and audio signal 8K carrying the electronically transformed optical image and audio sounds to the observer using 9K. The transmitter 5K is chosen in a preferred embodiment, to be an digital transmitter especially for producing HD electronic signals with some latency i.e. "OFDM". However, there are many observing situations that require zero latency as we have accomplished in FIG. 7F, i.e. in toxic medical environments where a microscope is used for example. These are safety related situations for example where it is time critical that the observer must see the action in real time as it is happening without any electronic delays in order to be able to respond and react quickly to an event.

6K is the unidirectional output signal line of the digital transmitter 5K, for driving the RF antenna 7K. RF antenna 7K is comprised of a plurality of antenna elements to accomplish the "OFDM" transmission protocol, wherein the elements are deployed on mechanical swivels to enable them to be pointed in order to maximize the radiation pattern.

7K is the RF antenna. The antenna is cut to operate at 5.8 GHZ for example, and cut for other frequencies demanded by 5K. At close range for local applications for example, in a preferred embodiment, 7K is physically configured internally within the enclosure of the mobile apparatus. digital transmitter 5K. This is made possible by the use of the "OFDM" transmission protocol scheme. This keeps the antenna out of harms' way and reduces the need for antenna maintenance.

There are situations however where it is beneficial for the antenna 7K to be physically configured so its radiation pattern can be pointed; for example, situations at the observing site where there is a heavy interfering RF noise floor that threatens the communication of signals at levels needed for acceptable reception and for transmitting by the antenna. Use of swivels to point the antenna during set-up and initialization time enables the observer to initially adjustably point the antenna's elements' radiation pattern to maximize the signal communicated to and from the antenna to the observer.

In a preferred embodiment, the antenna 7K is configured to be adjustably pointed. Pointing adjustability is accomplished by configuring the elements of antenna 7K on mechanical swivels. The swivels are fixed externally to the tail end of the mobile apparatus' enclosure. i.e. depending on the noise floor environment at the observing site of operation. For example, the swivel can be of two types, i.e. ball joint or two rotating axial joints. In a preferred embodiment, the antenna elements are on swivels in a notch of the mobile apparatus out of the way; and can be extended and rotated to the outside of the notch of the enclosure.

8K is the radiated signal from the RF antenna 7K for dissemination to the observers' display unit 9K located locally within 35 to 1000 feet of the mobile apparatus. We note that "OFDM" has made an improvement in the local range over the analog approach because of its more efficient use of the available bandwidth.

9K is the observer's display unit. 9K is for displaying the audio and video from the site of the optical image source to the observer.

10K is the unidirectional signal line carrying the digital video and audio encoded stream of signals from 3K to the WiFi digital transceiver electronics 11K.

11K is the WiFi digital transceiver electronics. 11K is for transmitting the encoded audio and video streaming signal received from 3K via 10K to the local WIFI LAN audience. Additionally 11K also conveys administrative data via 17K and 19K to system controller 18K.

12K is the unidirectional signal line carrying the WIFI streaming video and audio signals from the WiFi digital transceiver electronics 11K to the WiFi antenna 13K. Additionally 12K also carries administrative data from 15K to 18K by way of 11K and 12K and 17K and 19K to system controller 18K.

13K is the WiFi antenna. 13K is cut to 2.4 GHZ and/or 5.8 GHZ depending on the audience's wireless equipment.

14K is the digital streaming video and audio signals radiated from the WiFi antenna 13K to the observer's PC 15K, and the RF control command signals received by the WiFi antenna 13K from the observer's PC 15K.

15K is the observers' PC configured with an App for the initial programming setup of the system controller 18K. 15K is comprised of the App for enabling the observer to control the camera; and for making logic decisions regarding whether to play or record the captured digital transmitter 5 audio and digital transmitter 5K video streams; and for controlling the zoom lens actuator.

16K is the radiated digital streaming video and audio signals from the WiFi antenna 13K to the local WIFI LAN audience. For example, observers' and audience's smart phones, tablets and PC's receive imagery from 16K.

17K is the bidirectional control signal line carrying the administrative control commands to and from and between the WIFI transceiver 11K and the system controller 18K.

18K is the system controller electronics.

The mobile apparatus is configured for hard wired, fiber optics and wireless bi-directional communication capability.

18K is configured with a microprocessor for controlling all of the functions of the mobile apparatus, i.e. it holds the configuration files that determines items such as the operating frequencies of the WiFi and analog transmission settings of the various transmitters and transceivers 5K and 11K and 20K.

The microprocessor is configured with applications software and firmware.

In a preferred embodiment, the microprocessor manages the connectivity to the USB, Ethernet and fiber optics ports.

In addition, the microprocessor manages the electrical power distribution to the electric consuming modules of the mobile apparatus; and selects which delivery mechanism i.e. one or any combination of outputs to the outside world is active; and additionally manages the USB and wired Ethernet communication port 31K and 42K respectively;

18K also controls and manages the flow of data from the observer's human interface device i.e. PC hard wired connected to USB port 31K for example.

In another example, 18K also controls wireless control by the observer's human interface device 15K of the zoom lens actuator configured in 1K is via 14K, 13K, 12K, 11K, 17K, 18K, 19K, and 29K.

In another example where the observer is remote to 23K, i.e. over the Internet, the path of wireless control of the zoom lens actuator in 1K is via 23K, 22K, 21K, 20K, 18K, 19K and 29K.

In yet another example, the observer can exercise hard wired control of the zoom lens actuator in 1K via 42K, 18K, 7K and 29K, where 18K controls and manages the hard wired Ethernet bidirectional port 42K. Electric power is supplied over Ethernet port 42K to power 32K via 43K, where 43K is a D.C. power bus fed by Ethernet 42K for delivering electric power to 32K.

In a preferred embodiment, the microprocessor is configured with voice recognition applications firmware for enabling the observer to perform voice recognition and generate text archives for said 1st audio signals from said observer, and said $2^{nd}$ audio signals from said audience.

In still another preferred embodiment, in order to minimize the potential radio frequency interference that may be created by a multiplicity of the mobile apparatuses operating in proximity to one another that may be attached to a variety of different optical image sources participating in an observing session, each microprocessor of each of the multiplicity of the mobile apparatuses is configured with a applications software enabling each of the multiplicity of the mobile apparatuses to communicate to the operator the best choice of radio frequencies for the observer to use for each one of the multiplicity of the mobile apparatuses operating in proximity to one another in order to minimize the radio frequency interference created between the multiplicity of the mobile apparatuses operating in proximity to one another.

With this information, the observer can remotely or locally reset the radio frequencies used by each of the mobile apparatuses to minimize the potential interference problem. The app enables the observer to re-poll each of the mobile apparatuses over and over again at the observer's command to determine the effectiveness of the observer's new chosen frequency settings. After several iterations, the operator can be reassured that the best choice of radio frequency settings for each mobile apparatus has been arrived at. As time changes, there may be other potential sources of interference that come into play. The observer may then again poll the field of mobile apparatuses to determine the best choice of new frequencies to set to minimize the new interference threats.

VPN means Virtual Private Network.

An APP, VPN software is included in the firmware of the mobile apparatus to enable VPN support.

VPN encrypts and decrypts the data packets transmitted and received to and from the audience via WiFi or wired Ethernet. VPN enables the encryption of the digital pathway; but not the encryption of the analog pathway. The VPN APP firmware is resident in 18K.

RSSI means Received Signal Strength Indication.

An APP, RSSI software is included in the firmware of the mobile apparatus to enable RSSI support.

The RSSI APP is used by the observer at set-up time to determine if the external antennas on the mobile apparatus need to be deployed for improving transmission and receiving. The RSSI APP analyzes the RF spectrum in the vicinity of the optical image source to determine the ambient noise floor. This is especially true with VPN.

SSID means Service Set Identifier.

The observer uses the SSID APP at set-up time to scan the vicinity of optical image source for existing WiFi activity for selecting a unique SSID for the mobile apparatus in order to enable WiFi communication between the mobile apparatus, the observer, and members of the audience that are using WiFi. The SSID must be unique to other existing WiFi activity that is not participating in the broadcast to and from the apparatus. The SSID APP aides in the selection and setting of 18K's operating parameters such as the mobile apparatus' SSID. The SSID is a Service Set Identifier which is the name assigned to the particular WiFi network in question that all devices participating in the network must use. The SSID APP firmware is resident in 18K.

18K is configured for multiple mobile apparatuses to be used simultaneously.

When multiple mobile apparatuses are used simultaneously in close proximity to one another with respect to their WiFi coverage, communication between apparatuses takes place to coordinate simultaneous transmission and reception of the data packet for independent selection by the observer and the audience.

Each mobile apparatus is configured for enabling the observer to control multiple mobile apparatuses simultaneously to transmit and receive signals in the form of digital data packets.

Each mobile apparatus is configured with a system controller electronics 18K. 18K is for controlling all of the functions of the mobile apparatus, i.e. it holds the configuration files that determines items such as the operating frequencies of the WiFi and analog transmission settings of the various, transmitters and transceivers 5K and 11K and 20K.

In yet another example, the microprocessor manages the wireless transmission of electronic audio signals to the observer.

In yet another example, the microprocessor manages the wireless transmission of electronic audio signals to the observer's audience under the control of the observer.

In yet another example, the microprocessor manages the wireless receiving of electronic audio signals from the observer's audience, under the control of the observer.

In yet another example, the microprocessor manages the electronic storing of electronic audio signals from the observer's audience, under the control of the observer.

In yet another example, the microprocessor manages the electronic retrieval of the observer's audiences' electronic audio signals from the electronic memory on demand by said observer's audience, under the control of said observer

19K is the bidirectional signal line carrying the administrative control commands to and from the system controller 18K, to the zoom lens actuator contained in 1K, to the image sensor array contained in 1K, to the microphone contained in 1K, to the DVR 3K and to the Internet WIFI transceiver electronics 20K; and additionally to the digital video and digital audio storage memory 27K.

20K is the Internet WIFI transceiver electronics. 20K is for transmitting digital video and digital audio encoded streams from 3K by way of 24K to the Internet audience 23K by way of 21K and 22K.

21K is the is the bidirectional signal line carrying the WIFI streaming video and audio signals from 20K to the Internet WIFI transceiver antenna 22K to reach the Internet audience 23K.

22K is the Internet WIFI transceiver antenna. 22K is for radiating WiFi signals to the WiFi access point (not shown); and for receiving administrative data from the Internet based observer via 20K and 19K to 18K.

23K is the radiated digital streaming video and audio signals from the Internet WIFI transceiver antenna 22K to the Internet and the extended WIFI audience via the wireless access point (not shown).

For example, observers' and audience's smart phones, tablets and PC's receive imagery from 23K.

24K is the unidirectional signal line carrying the digital video and audio signals from the DVR 3K to the Internet WiFi transceiver electronics 20K.

25K is the bidirectional control signal line carrying the administrative control commands to and from and between the DVR 3K and the system controller 18K.

26K is the bidirectional line carrying the digital video and audio signals from the DVR 3K to the DVR storage memory device 27K.

27K is the DVR storage memory device.

28K is the bidirectional line carrying the administrative control commands to and from and between the system controller 18K and the DVR storage memory device 27K via 19K which is the central bus.

29K is the bidirectional line carrying the administrative control commands to and from and between 1K and the system controller 18K via 19K.

30K is the radiated digital signal from the RF antenna 7K to the local audience within a short range of the mobile apparatus, i.e. 35-1000 feet for example.

31K is the bidirectional line carrying the I/O to and from the USB port of the observer's PC 15K to and from the system controller 18K during the initial programming setup.

31K is also an alternative path for the observer to control the zoom lens actuator which controls the zoom lens magnification, iris diaphragm and the focus. The path for control of the zoom lens actuator is the observer to 31K to 18K to 19K to 29K to 1K and to the zoom lens servo electronics package, and to the zoom lens actuator, and to the zoom lens.

31K is also an alternative path for the observer to view status of the zoom lens magnification, iris diaphragm and the focus. The alternative path for viewing the status is from the zoom lens actuator to 1K to the zoom lens servo electronics package, to 29K to 19K to 18K to 31K and to the observer.

32K is a battery. 32K is for supplying electricity to 1K, 3K, 5K, 11K, 18K, 20K, 27K, and 32K via 35K. 32K is comprised of a battery, power handling electronics, power distribution electronics, and charging electronics.

33K is an administrative bi-directional data link between 18K and 32K via 19K for controlling the power-up cycle, and for reading the state of 32K, i.e. battery life remaining, time to fully charge, and cumulative time on the battery as examples.

34K is a D.C. power bus supplied by USB port 31K for supplying electric power to charge 32K.

35K is an internal power bus supplying power to 1K, 3K, 5K, 11K, 18K, 20K, 27K, and 32K.

36K is the encoded audio and video stream from 3K for input to 37K.

37K is the HDMI encoder for driving the HDMI output port 38K.

38K is the HDMI output port for delivering HDMI audio and video streaming content to external equipment i.e. monitors, broadcast infrastructure, recording devices, goggles headgear for example.

39K is the encoded streaming audio and video stream for feeding encoder 40K.

40K is an encoder with streaming outputs for transmission via USB and Ethernet and fiber optics protocols for delivering audio and video content via 41K and 18K to USB port 31K, and Ethernet port 42K, and fiber optic port 44K, for delivering content to external world devices for broadcasting, display, recording, storage and playback.

41K is a bidirectional data bus from 40K to 18K for delivering encoded audio and video content from 40K to 31K and 42K and 44K via 18K.

42K is an Ethernet port configured on 18K to any external wired network for transmitting content and for transmitting and receiving administrative data via wired Ethernet protocol.

42K is also an alternative path for the observer to control the zoom lens actuator which controls the zoom lens magnification, iris diaphragm and the focus. The path for control of the zoom lens actuator is the observer to 42K to 18K to 19K to 29K to 1K and to the zoom lens servo electronics package, and to the zoom lens actuator, and to the zoom lens.

42K is also an alternative path for the observer to view status of the zoom lens magnification, iris diaphragm and the focus. The alternative path for viewing the status is from the zoom lens actuator to 1K to the zoom lens servo electronics package, to 29K to 19K to 18K to 42K and to the observer.

43K is a D.C. power bus fed by Ethernet 42K for delivering electric power to 32K.

44K is a bidirectional fiber optic port configured on 18K for transmitting content, and for transmitting and receiving administrative data via fiber optic protocol to any external fiber optic network.

44K is also an alternative path for the observer to control the zoom lens actuator which controls the zoom lens magnification, iris diaphragm and the focus. The path for control of the zoom lens actuator is the observer to 44K to 18K to 19K to 29K to 1K and to the zoom lens servo electronics package, and to the zoom lens actuator, and to the zoom lens.

44K is also an alternative path for the observer to view status of the zoom lens magnification, iris diaphragm and the focus. The alternative path for viewing the status is from the zoom lens actuator to 1K to the zoom lens servo electronics package, to 29K to 19K to 18K to 44K and to the observer.

45K is the digital electronic image sensor array camera. As shown in FIG. 10, the link between 1K and 45K is bi-directional.

Digital electronic imagery signals from 45K are inputted to 1K. Camera control commands from the observer are routed through 1K and inputted to the digital electronic image sensor array camera 45K. A typical camera control command for low light astronomical objects, for example, is for setting the extended exposure time of the electronic image sensor array camera.

The digital image sensor array camera is for capturing the optical image presented to it on its photo active image sensor array surface, and transforming the optical image to a digital electronic image signal meeting HD and lesser protocols.

It is noted that the circuits described herein are primarily made of CMOS chip components for keeping the power consumption low and for lengthening the operating time on the batteries for long observing sessions.

The present invention has both wireless and hard-wire communication and control capability and is compatible with a wide variety of electronic protocols.

The present invention has RF wireless capability, thereby enabling the observer to capture video imagery from the mobile apparatus during his observing session without the use of wires or cables; and furthermore enabling the observer to communicate with and control the mobile apparatus during his observing session without the use of wires or cables; and even furthermore enabling the observer to share his observations during and after his observing session with an audience of people and their machines without the use of wires or cables.

The present invention also has hard-wire capability, thereby enabling the observer to capture video and audio from the mobile apparatus during his observing session with the use of wires or cables; and furthermore enabling the observer to communicate with and control the mobile apparatus during his observing session with the use of wires or cables; and even furthermore enabling the observer to share his observations during and after his observing session with an audience of people and their machines with the use of wires or cables.

The mobile apparatus is configured with electronic safeguards enabling the mobile apparatus to operate in high RF noise interference environments. These safeguards are built into the electronics of the present invention. These safeguards are necessary in some extreme cases, where the RF noise interference in the environment where the mobile apparatus is deployed, would otherwise affect the electronic image signal quality and electronic image signal latency if the safeguards were not configured in place. These RF noise safeguards insure and protect the reliable wireless transmission of the electronic imagery signals.

The mobile apparatus, which is the subject of the present invention, has six modes of communication with the observer; and four modes of communication with his audience.

These modes of communication can be carried out wirelessly lone, with wires and cables alone, or with a combination of wireless and hard-wires. The mobile apparatus is configured to leave the choice of mode up to the observer.

There are six types of observers. Each type of observer is defined by his mode of communication with the mobile apparatus.

The first type of observer is one who is present at the optical image source and who is manually operating the mobile apparatus.

The second type of observer is one who is present at the optical image source who is wirelessly operating the mobile apparatus.

The third type of observer is one who is not present at the optical image source and who is wirelessly operating the mobile apparatus, but who is located local to the optical image source, i.e. within 35 feet for example.

The fourth type of observer is one who is located somewhat remote to the optical image source and who is wirelessly operating the mobile apparatus, i.e. within 2 miles for example.

The fifth type of observer is one who is located geographically remote to the observer and who is wirelessly operating the mobile apparatus. i.e. over 2 miles on the Earth for example.

The sixth type of observer is one who is located geographically very remote to the optical image source and who is wirelessly operating the mobile apparatus, i.e. beyond the surface of the Earth in space for example. The audience or spectators or limited segments of the public are of four types.

The first type of audience are those people and machines that are local and located physically close to the observer i.e. within 35 feet for example.

The second type of audience are those people and machines located somewhat remote to the observer i.e. within 2 miles for example.

The third type of audience are those people and machines located geographically remote to the observer i.e. over 2 miles on the Earth for example.

The fourth type of audience are those people and machines located geographically very remote to the observer i.e. beyond the surface of the Earth in space for example.

FIG. 11

FIG. 11 shows a block diagram of a digital electronic circuit for a preferred embodiment of a mobile apparatus.

The digital electronic circuit shown in FIG. 11 meets digital video elementary stream protocols H.264, HEVC, VP8, VP9 and digital audio elementary stream protocols MP3, VORBIS, AAC, OPUS and digital audio and video combined stream protocols for delivery to the observer and audience MP4, FLV, WEBM, ASF, ISMA and digital control protocol for web app viewing:
 MMS (Microsoft Media Server protocol), and
 RTSP (Real Time streaming protocol), and
 HTTP (Hyper Text live streaming protocol).

The detailed physical elements disclosed in the drawing shown in FIG. 11 are identified as follows:

1L is an electronics that is comprised of a audio amplifier, and a zoom lens actuator servo electronics package, a microphone interface, and a speaker interface.

The path for the observer to speak and convey audio to the audience is as follows: the observer speaks into the microphone configured in the end of the mobile apparatus in the end cap module of the mobile apparatus shown in FIG. 18, the end cap module to 1L, 1L to 29L to 19L to 18L to 19L to 17L to 11L to 12L to 13L to 16L to the audience.

The path for the audience to speak to the observer is as follows: the audience to 16L to 13L to 12L to 11L to 17L to 19L to 18L to 19L to 29L to 1L to the speaker configured in the end cap module shown in FIG. 18, and then audio to the observer.

The microphone is for capturing the sounds presented to it, and transforming the sounds to an electronic signal. The audio amplifier is for adjusting and buffering the audio signal output level of the microphone. The microphone is physically located and mounted in the threaded screw-on end cap module of the mobile apparatus shown in FIGS. 18A & 18B & 18C & 18E and 18F & 18G where it is easily accessible to the observer at the end of the mobile apparatus for the observer's verbal narration and communication with the audience.

The speaker is for transforming audio electronic signals into sounds, thereby enabling the observer to communicate with the audience audibly. The audio amplifier is for adjusting and buffering the audio signal input level to the speaker. The speaker is physically located and mounted in the threaded screw-on end cap module of the mobile apparatus shown in FIGS. 18A & 18B & 18C & 18E and 18F & 18G where it is easily accessible to the observer at the end of the mobile apparatus for the observer to communicate with and hear the audience.

The servo electronics package in 1L is for receiving electronic control signals from the observer and driving the zoom lens electro-mechanical actuator enabling the observer to control the zoom lens magnification, iris diaphragm and focus.

The zoom lens electro-mechanical actuator is for receiving electronic control signals from the servo electronics package to mechanically actuate the magnification ring, the iris diaphragm ring, and the focus ring of the zoom lens. Additionally, the servo electronics package is also for receiving the status of the state of the zoom lens' magnification, iris diaphragm, and focus from the zoom lens electro-mechanical actuator, and forwarding the status to the observer.

The path of control of the zoom lens magnification, iris diaphragm and focus is from the observer to 15L to 14L to 13L to 12L to 11L to 17L to 19L to 18L to 19L to 29L to the servo electronics package in 1L, and then to the electro-mechanical actuator, and to the zoom lens.

The path of the zoom lens magnification status, iris diaphragm status, and focus status is from the electromechanical actuator to 1L to 29L to 19L to 18L to 19L to 17L to 11L to 12L to 13L to 14L to 15L and then to the observer for viewing the status.

2L is a unidirectional signal line carrying the digital video and audio signals from 1L to 3L.

3L is the DVR. 3L is comprised of ten digital signal compressors i.e. "CODEC" wherein there are five CODECs for video and five CODECs for audio, a set of digital streaming encoders, a distribution logic circuit, a record/playback logic circuit, a administrative controller electronics circuit, and a and a circuit for buffering the digital audio video signal output level.

4L is the digital video and digital audio output signal line from the DVR 3L for delivery to the digital transmitter 5L i.e. "OFDM" orthogonal frequency division modulation.

5L is the digital transmitter. 5L is configured for 5.8 GHZ OFDM for example, and for other frequencies to match the FCC rules and regulations pertaining to the particular operating environment of the mobile apparatus i.e. the noise floor at the observing site for example. 5L is for driving 7L, via 6L, for 7L to radiate a composite video and audio signal 8L carrying the electronically transformed optical image and audio sounds to the observer using 9L. The transmitter 5L is chosen in a preferred embodiment, to be an digital transmitter especially for producing HD electronic signals with some latency i.e. "OFDM". However, there are many observing situations that require zero latency as we have accomplished in FIG. 7F, i.e. in toxic medical environments where a microscope is used for example. These are safety related situations for example where it is time critical that the observer must see the action in real time as it is happening without any electronic delays in order to be able to respond and react quickly to an event.

6L is the unidirectional output signal line of the digital transmitter 5L, for driving the RF antenna 7L. RF antenna 7L is comprised of a plurality of antenna elements to accomplish the "OFDM" transmission protocol, wherein the elements are deployed on mechanical swivels to enable them to be pointed in order to maximize the radiation pattern.

7L is the RF antenna. The antenna is cut to operate at 5.8 GHZ for example, and cut for other frequencies demanded by 5L. At close range for local applications for example, in a preferred embodiment, 7L is physically configured internally within the enclosure of the mobile apparatus. digital transmitter 5L. This is made possible by the use of the "OFDM" transmission protocol scheme. This keeps the antenna out of harms' way and reduces the need for antenna maintenance.

There are situations however where it is beneficial for the antenna 7L to be physically configured so its radiation pattern can be pointed; for example, situations at the observing site where there is a heavy interfering RF noise floor that threatens the communication of signals at levels needed for acceptable reception and for transmitting by the antenna. Use of swivels to point the antenna during set-up and initialization time enables the observer to initially adjustably point the antenna's elements' radiation pattern to maximize the signal communicated to and from the antenna to the observer.

In a preferred embodiment, the antenna 7L is configured to be adjustably pointed. Pointing adjustability is accomplished by configuring the elements of antenna 7L on mechanical swivels. The swivels are fixed externally to the tail end of the mobile apparatus' enclosure. i.e. depending on the noise floor environment at the observing site of operation. For example, the swivel can be of two types, i.e. ball joint or two rotating axial joints. In a preferred embodiment, the antenna elements are on swivels in a notch of the mobile apparatus out of the way; and can be extended and rotated to the outside of the notch of the enclosure.

8L is the radiated signal from the RF antenna 7L for dissemination to the observers' display unit 9L located locally within 35 to 1000 feet of the mobile apparatus. We note that "OFDM" has made an improvement in the local range over the analog approach because of its more efficient use of the available bandwidth.

9L is the observer's display unit. 9L is for displaying the audio and video from the site of the optical image source to the observer.

10L is the unidirectional signal line carrying the digital video and audio encoded stream of signals from 3L to the WiFi digital transceiver electronics 11L.

11L is the WiFi digital transceiver electronics. 11L is for transmitting the encoded audio and video streaming signal received from 3L and 10L to the local WIFI LAN audience. Additionally 11L also conveys administrative data via 17L and 19L to system controller 18L.

12L is the unidirectional signal line carrying the WIFI streaming video and audio signals from the WiFi digital transceiver electronics 11L to the WiFi antenna 13L.

Additionally 12L also carries administrative data from 15L to 18L by way of 11L and 12L and 17L and 19L to system controller 18L.

13L is the WiFi antenna. 13L is cut to 2.4 GHZ and/or 5.8 GHZ depending on the audience's wireless equipment.

14L is the digital streaming video and audio signals radiated from the WiFi antenna 13L to the observer's PC 15L, and the RF control command signals received by the WiFi antenna 13L from the observer's PC 15L.

15L is the observers' PC configured with an App for the initial programming setup of the system controller 18L. 15L is comprised of the App for enabling the observer to control the camera; and for making logic decisions regarding whether to play or record the captured digital transmitter 5L audio and digital transmitter 5L video streams; and for controlling the zoom lens actuator.

16L is the radiated digital streaming video and audio signals from the WiFi antenna 13L to the local WIFI LAN audience. For example, observers' and audience's smart phones, tablets and PC's receive imagery from 16L.

17L is the bidirectional control signal line carrying the administrative control commands to and from and between the WIFI transceiver 11L and the system controller 18L.

18L is the system controller electronics.

The mobile apparatus is configured for hard wired, fiber optics and wireless bi-directional communication capability.

18L is configured with a microprocessor for controlling all of the functions of the mobile apparatus, i.e. it holds the configuration files that determines items such as the operating frequencies of the WiFi and analog transmission settings of the various transmitters and transceivers 5L and 11L and 20L.

The microprocessor is configured with applications software and firmware.

In a preferred embodiment, the microprocessor manages the connectivity to the USB, Ethernet and fiber optics ports.

In addition, the microprocessor manages the electrical power distribution to the electric consuming modules of the mobile apparatus; and selects which delivery mechanism i.e. one or any combination of outputs to the outside world is active; and additionally manages the USB and wired Ethernet communication port 31L and 42L respectively;

18L also controls and manages the flow of data from the observer's human interface device i.e. PC hard wired connected to USB port 31L for example.

In another example, 18L also controls wireless control by the observer's human interface device 15L of the zoom lens actuator configured in 1L is via 14L, 13L, 12L, 11L, 17L, 18L, 19L, and 29L.

In another example where the observer is remote to 23L, i.e. over the Internet, the path of wireless control of the zoom lens actuator in 1L is via 23L, 22L, 21L, 20L, 18L, 19L and 29L.

In yet another example, the observer can exercise hard wired control of the zoom lens actuator in 1L via 42L, 18L, 7L and 29L, where 18L controls and manages the hard wired Ethernet bidirectional port 42L.

Electric power is supplied over Ethernet port 42L to power 32L via 43L, where 43L is a D.C. power bus fed by Ethernet 42L for delivering electric power to 32L.

In a preferred embodiment, the microprocessor is configured with voice recognition applications firmware for enabling the observer to perform voice recognition and generate text archives for said 1st audio signals from said observer, and said 2' audio signals from said audience.

In still another preferred embodiment, in order to minimize the potential radio frequency interference that may be created by a multiplicity of the mobile apparatuses operating in proximity to one another that may be attached to a variety of different optical image sources participating in an observing session, each microprocessor of each of the multiplicity of the mobile apparatuses is configured with a applications software enabling each of the multiplicity of the mobile apparatuses to communicate to the operator the best choice of radio frequencies for the observer to use for each one of the multiplicity of the mobile apparatuses operating in proximity to one another in order to minimize the radio frequency interference created between the multiplicity of the mobile apparatuses operating in proximity to one another.

With this information, the observer can remotely or locally reset the radio frequencies used by each of the mobile apparatuses to minimize the potential interference problem. The app enables the observer to re-poll each of the mobile apparatuses over and over again at the observer's command to determine the effectiveness of the observer's new chosen frequency settings. After several iterations, the operator can be reassured that the best choice of radio frequency settings for each mobile apparatus has been arrived at. As time changes, there may be other potential sources of interference that come into play. The observer may then again poll the field of mobile apparatuses to determine the best choice of new frequencies to set to minimize the new interference threats.

VPN means Virtual Private Network.

An APP, VPN software is included in the firmware of the mobile apparatus to enable VPN support.

VPN encrypts and decrypts the data packets transmitted and received to and from the audience via WiFi or wired Ethernet. VPN enables the encryption of the digital pathway; but not the encryption of the analog pathway. The VPN APP firmware is resident in 18.

RSSI means Received Signal Strength Indication.

An APP, RSSI software is included in the firmware of the mobile apparatus to enable RSSI support.

The RSSI APP is used by the observer at set-up time to determine if the external antennas on the mobile apparatus need to be deployed for improving transmission and receiving. The RSSI APP analyzes the RF spectrum in the vicinity of the optical image source to determine the ambient noise floor. This is especially true with VPN.

SSID means Service Set Identifier.

The observer uses the SSID APP at set-up time to scan the vicinity of optical image source for existing WiFi activity for selecting a unique SSID for the mobile apparatus in order to enable WiFi communication between the mobile apparatus, the observer, and members of the audience that are using WiFi. The SSID must be unique to other existing WiFi activity that is not participating in the broadcast to and from the apparatus. The SSID APP aides in the selection and setting of 18L's operating parameters such as the mobile apparatus' SSID. The SSID is a Service Set Identifier which is the name assigned to the particular WiFi network in question that all devices participating in the network must use. The SSID APP firmware is resident in 18L.

18L is configured for multiple mobile apparatuses to be used simultaneously.

When multiple mobile apparatuses are used simultaneously in close proximity to one another with respect to their WiFi coverage, communication between apparatuses takes place to coordinate simultaneous transmission and reception of the data packet for independent selection by the observer and the audience.

Each mobile apparatus is configured for enabling the observer to control multiple mobile apparatuses simultaneously to transmit and receive signals in the form of digital data packets.

Each mobile apparatus is configured with a system controller electronics 18L. 18L is for controlling all of the functions of the mobile apparatus, i.e. it holds the configuration files that determines items such as the operating frequencies of the WiFi and analog transmission settings of the various, transmitters and transceivers 5L and 11L and 20L.

In yet another example, the microprocessor manages the wireless transmission of electronic audio signals to the observer.

In yet another example, the microprocessor manages the wireless transmission of electronic audio signals to the observer's audience under the control of the observer.

In yet another example, the microprocessor manages the wireless receiving of electronic audio signals from the observer's audience, under the control of the observer.

In yet another example, the microprocessor manages the electronic storing of electronic audio signals from the observer's audience, under the control of the observer.

In yet another example, the microprocessor manages the electronic retrieval of the observer's audiences' electronic audio signals from the electronic memory on demand by said observer's audience, under the control of said observer 19L is the bidirectional signal line carrying the administrative control commands to and from the system controller 18L, to the zoom lens actuator contained in 1L, to the image sensor array contained in 1L, to the microphone contained in 1L, to the DVR 3L, and to the Internet WIFI transceiver electronics 20L; and additionally to the digital video and digital audio storage memory 27L.

20L is the Internet WIFI transceiver electronics. 20L is for transmitting digital video and digital audio encoded streams from 3L by way of 24L to the Internet audience 23L by way of 21L and 22L.

21L is the is the bidirectional signal line carrying the WIFI streaming video and audio signals from 20L to the Internet WIFI transceiver antenna 22L to reach the Internet audience 23L.

22L is the Internet WIFI transceiver antenna. 22L is for radiating WiFi signals to the WiFi access point (not shown); and for receiving administrative data from the Internet based observer via 20L and 19L to 18L.

23L is the radiated digital streaming video and audio signals from the Internet WIFI transceiver antenna 22L to the Internet and the extended WIFI audience via the wireless access point (not shown). For example, observers' and audience's smart phones, tablets and PC's receive imagery from 23L.

24L is the unidirectional signal line carrying the digital video and audio signals from the DVR 3L to the Internet WiFi transceiver electronics 20L.

25L is the bidirectional control signal line carrying the administrative control commands to and from and between the DVR 3L and the system controller 18L.

26L is the bidirectional line carrying the digital video and audio signals from the DVR 3L to the DVR storage memory device 27L.

27L is the DVR storage memory device.

28L is the bidirectional line carrying the administrative control commands to and from and between the system controller 18L and the DVR storage memory device 27L via 19L which is the central bus.

29L is the bidirectional line carrying the administrative control commands to and from and between 1L and the system controller 18L via 19L.

30L is the radiated digital signal from the RF antenna 7L to the local audience within a short range of the mobile apparatus, i.e. 35-1000 feet for example.

31L is the bidirectional line carrying the I/O to and from the USB port of the observer's PC 15L to and from the system controller 18L during the initial programming setup.

> 31L is also an alternative path for the observer to control the zoom lens actuator which controls the zoom lens magnification, iris diaphragm and the focus. The path for control of the zoom lens actuator is the observer to 31L to 18L to 19L to 29L to 1L and to the zoom lens servo electronics package, and to the zoom lens actuator, and to the zoom lens.
>
> 31L is also an alternative path for the observer to view status of the zoom lens magnification, iris diaphragm and the focus. The alternative path for viewing the status is from the zoom lens actuator to 1L to the zoom lens servo electronics package, to 29L to 19L to 18L to 31L and to the observer.

32L is a battery power. 32L is for supplying electricity to 1L, 3L, 5L, 11L, 18L, 20L, 27L, and 32L via 35L. 32L is comprised of a battery, power handling electronics, power distribution electronics, and charging electronics.

33L is an administrative bi-directional data link between 18L and 32L via 19L for controlling the power-up cycle, and for reading the state of 32L, i.e. battery life remaining, time to fully charge, and cumulative time on the battery as examples.

34L is a D.C. power bus supplied by USB port 31L for supplying electric power to charge 32L.

35L is an internal power bus supplying power to 1L, 3L, 5L, 11L, 18L, 20L, 27L, and 32L.

36L is the encoded audio and video stream from 3L for input to 37L.

37L is the HDMI encoder for driving the HDMI output port 38L.

38L is the HDMI output port for delivering HDMI audio and video streaming content to external equipment i.e. monitors, broadcast infrastructure, recording devices, goggles headgear for example.

39L is the encoded streaming audio and video stream for feeding encoder 40L.

40L is an encoder with streaming outputs for transmission via USB and Ethernet and fiber optics protocols for delivering audio and video content via 41L and 18L to USB port 31L, and Ethernet port 42L, and fiber optic port 44L, for delivering content to external world devices for broadcasting, display, recording, storage and playback.

41L is a bidirectional data bus from 40L to 18L for delivering encoded audio and video content from 40L to 31L and 42L and 44L via 18L.

42L is an Ethernet port configured on 18L to any external wired network for transmitting content and for transmitting and receiving administrative data via wired Ethernet protocol.

> 42L is also an alternative path for the observer to control the zoom lens actuator which controls the zoom lens magnification, iris diaphragm and the focus. The path for control of the zoom lens actuator is the observer to 42L to 18L to 19L to 29L to 1L and to the zoom lens servo electronics package, and to the zoom lens actuator, and to the zoom lens.
>
> 42L is also an alternative path for the observer to view status of the zoom lens magnification, iris diaphragm and the focus. The alternative path for viewing the status is from the zoom lens actuator to 1L to the zoom lens servo electronics package, to 29L to 19L to 18L to 42L and to the observer.

43L is a D.C. power bus fed by Ethernet 42L for delivering electric power to 32L.

44L is a bidirectional fiber optic port configured on 18L for transmitting content, and for transmitting and receiving administrative data via fiber optic protocol to any external fiber optic network.

> 44L is also an alternative path for the observer to control the zoom lens actuator which controls the zoom lens magnification, iris diaphragm and the focus. The path for control of the zoom lens actuator is the observer to 44L to 18L to 19L to 29L to 1L and to the zoom lens servo electronics package, and to the zoom lens actuator, and to the zoom lens.
>
> 44L is also an alternative path for the observer to view status of the zoom lens magnification, iris diaphragm and the focus. The alternative path for viewing the status is from the zoom lens actuator to 1L to the zoom lens servo electronics package, to 29L to 19L to 18L to 44L and to the observer.

45L is the digital electronic image sensor array camera. As shown in FIG. 11, the link between 1L and 45L is bi-directional.

> Digital electronic imagery signals from 45L are inputted to 1L. Camera control commands from the observer are routed through 1 and inputted to the digital electronic image sensor array camera 45L. A typical camera control command for low light astronomical objects, for example, is for setting the extended exposure time of the electronic image sensor array camera.

The digital image sensor array camera is for capturing the optical image presented to it on its photo active image sensor array surface, and transforming the optical image to a digital electronic image signal meeting HD and lesser protocols.

It is noted that the circuits described herein are primarily made of CMOS chip components for keeping the power consumption low and for lengthening the operating time on the batteries for long observing sessions.

The present invention has both wireless and hard-wire communication and control capability and is compatible with a wide variety of electronic protocols.

For example:

The present invention has RF wireless capability, thereby enabling the observer to capture video imagery from the mobile apparatus during his observing session without the use of wires or cables; and furthermore enabling the observer to communicate with and control the mobile apparatus during his observing session without the use of wires or cables; and even furthermore enabling the observer to share his observations during and after his observing session with an audience of people and their machines without the use of wires or cables.

The present invention also has hard-wire capability, thereby enabling the observer to capture video and audio from the mobile apparatus during his observing session with the use of wires or cables; and furthermore enabling the observer to communicate with and control the mobile apparatus during his observing session with the use of wires or cables; and even furthermore enabling the observer to share his observations during and after his observing session with an audience of people and their machines with the use of wires or cables.

The mobile apparatus is configured with electronic safeguards enabling the mobile apparatus to operate in high RF noise interference environments. These safeguards are built into the electronics of the present invention. These safeguards are necessary in some extreme cases, where the RF noise interference in the environment where the mobile apparatus is deployed, would otherwise affect the electronic image signal quality and electronic image signal latency if the safeguards were not configured in place. These RF noise safeguards insure and protect the reliable wireless transmission of the electronic imagery signals.

The mobile apparatus, which is the subject of the present invention, has six modes of communication with the observer; and four modes of communication with his audience.

These modes of communication can be carried out wirelessly lone, with wires and cables alone, or with a combination of wireless and hard-wires. The mobile apparatus is configured to leave the choice of mode up to the observer.

There are six types of observers. Each type of observer is defined by his mode of communication with the mobile apparatus.

The first type of observer is one who is present at the optical image source and who is manually operating the mobile apparatus.

The second type of observer is one who is present at the optical image source who is wirelessly operating the mobile apparatus.

The third type of observer is one who is not present at the optical image source and who is wirelessly operating the mobile apparatus, but who is located local to the optical image source, i.e. within 35 feet for example.

The fourth type of observer is one who is located somewhat remote to the optical image source and who is wirelessly operating the mobile apparatus, i.e. within 2 miles for example.

The fifth type of observer is one who is located geographically remote to the observer and who is wirelessly operating the mobile apparatus. i.e. over 2 miles on the Earth for example.

The sixth type of observer is one who is located geographically very remote to the optical image source and who is wirelessly operating the mobile apparatus, i.e. beyond the surface of the Earth in space for example.

The audience or spectators or limited segments of the public are of four types.

The first type of audience are those people and machines that are local and located physically close to the observer i.e. within 35 feet for example.

The second type of audience are those people and machines located somewhat remote to the observer i.e. within 2 miles for example.

The third type of audience are those people and machines located geographically remote to the observer i.e. over 2 miles on the Earth for example.

The fourth type of audience are those people and machines located geographically very remote to the observer i.e. beyond the surface of the Earth in space for example.

FIG. 12

Figure 12:
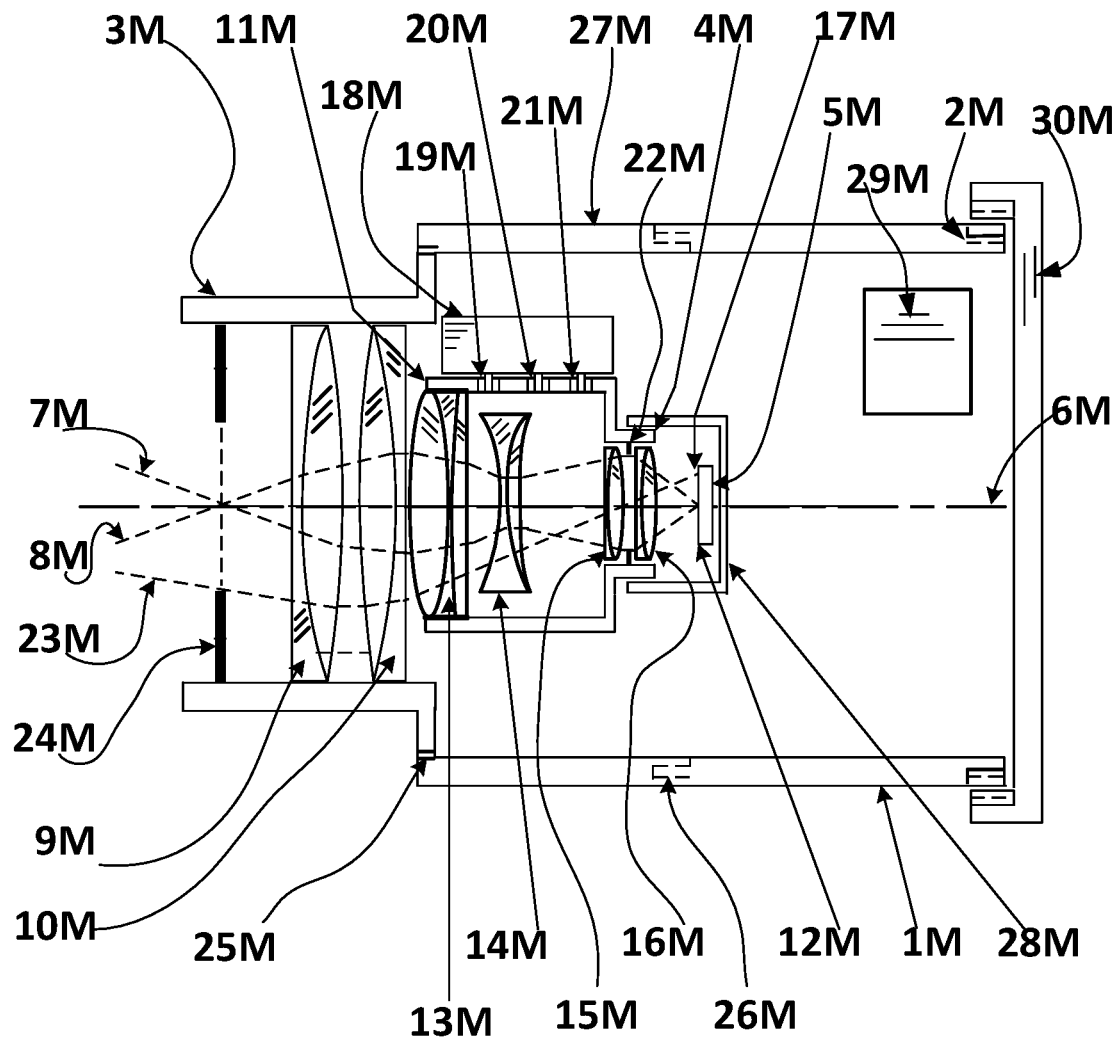
FIG. 12 shows a side view section of a preferred embodiment of a mobile apparatus, where the mobile apparatus has its own eyepiece, and has a zoom lens actuator to operate the zoom lens functions, and has an iris diaphragm, wherein the mobile apparatus is configured for use for optical image sources referred to in FIG. 1.

FIG. 12 shows a side view center section of the optical system schematic of a preferred embodiment of a mobile apparatus, where the mobile apparatus has its own eyepiece, and where the mobile apparatus has a zoom lens actuator, and the zoom lens has an iris diaphragm, and where the modular enclosures which comprise the mobile apparatus are shown for an eyepiece, for a zoom lens, and for an electronic image sensor array camera.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The mobile apparatus shown in FIG. 12 is configured with a eyepiece module 3M, a zoom lens module 27M and a electronic image sensor array camera module 1M.

The mobile apparatus disclosed in FIG. 12 is configured for being attached to and compatible with the optical image source shown in FIG. 1. The imagery from the optical image source to 24M is focal.

In the preferred embodiment of the apparatus shown, the observer can choose from both analog and digital video cameras in order to match the object being observed and the type of optical image source being used by the observer during the observing session, as well as the desired objectives of the observing session.

The eyepiece module is for optically acquiring and transforming and transferring the focal optical imagery from the optical image source into afocal optical imagery to the zoom lens module.

The zoom lens module is for optically transforming the afocal optical imagery into focal optical imagery and for optically transferring the focal imagery to the electronic image sensor array camera module for electronically transforming the focal optical imagery into electronic imagery signals.

Screw thread is shown in the figure as an example of a mechanical connecting means for mechanically connecting adjacent modular enclosures.

Screw thread is an example of a mechanical connecting means.

Screw threaded joints are a simple, inexpensive and space saving method especially for connecting enclosures having a cylindrical profile.

The front ends of the module's 27M and 1M cylindrical enclosures are under cut and threaded with female threads. The rear ends of the module's cylindrical enclosures are over cut and threaded with male threads. The rear ends of the module's cylindrical enclosures i.e. 27M mate with the front end of the module's cylindrical enclosures 1M in order to connect the two modules together.

Screw thread is given in the present invention as an example of a mechanical connecting means. Other mechanical connecting means are also appropriate i.e. snap-fit connections.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawing shown in FIG. 12 are identified as follows:

1M is the modular enclosure of the electronic image sensor array camera module of the mobile apparatus.

The Following is a List of Analog and Digital Protocols Met by the Electronic Image Sensor Array Camera Modules Analog Camera—NTSC composite Video output Standard definition Digital Camera—SDI Serial digital interface output High definition Digital Camera—HDSDI High definition serial digital interface output The Serial digital interface (SDI) is a family of digital video interfaces first standardized by SMPTE (The Society of Motion Picture and Television Engineers) in 1989.

For example, ITU-R BT.656 and SMPTE 259M define digital video interfaces used for commercial broadcast video.

A related standard, known as high-definition serial digital interface (HD-SDI), is standardized in SMPTE 292M; this provides a nominal data rate of 1.485 Gbit/s.

Additional SDI standards have been introduced to support increasing video resolutions (HD, UHD and beyond), frame rates, stereoscopic (3D) video, and color depth.

Dual link HD-SDI consists of a pair of SMPTE 292M links, standardized by SMPTE 372M in 1998 this provides service to a nominal 2.970 Gbit/s interface used in applications (such as digital cinema or HDTV 1080P) that require greater fidelity and resolution than standard HDTV can provide.

3G-SDI (standardized in SMPTE 424M) consists of a single 2.970 Gbit/s serial link that allows replacing dual link HD-SDI. 6G-SDI and 12G-SDI standards were published on Mar. 19, 2015.

These standards are used for transmission of uncompressed, unencrypted digital video signals (optionally including embedded audio and time code) within television facilities; they can also be used for packetized data. Coaxial variants of the specification range in length but are typically less than 300 meters (980 ft). Fiber optic variants of the specification such as 297M allow for long-distance transmission limited only by maximum fiber length or repeaters.

SDI and HD-SDI are usually only available by licensing agreements which restrict their use to licensed manufacturers. The SDI and HDSDI interfaces are unencrypted and uncompressed.

Audio—Both the HD and SD serial interfaces provide for 16 channels of embedded audio. The two interfaces use different audio encapsulation methods—SD uses the SMPTE 272M standard, whereas HD uses the SMPTE 299M standard. In either case, an SDI signal may contain up to sixteen audio channels (8 pairs) embedded 48 kHz, 24-bit audio channels along with the video. Typically, 48 kHz, 24-bit (20-bit in SD, but extendable to 24 bit) PCM audio is stored, in a manner directly compatible with the AES3 digital audio interface.

The various versions of the serial digital interface support numerous video formats.

The 270 Mbit/s interface supports 525-line, interlaced video at a 59.94 Hz field rate (29.97 Hz frame rate), and 625-line, 50 Hz interlaced video. These formats are highly compatible with NTSC and PAL-B/G/D/K/I systems respectively; and the terms NTSC and PAL are often (incorrectly) used to refer to these formats. (PAL is a composite color encoding scheme, and the term does not define the line-standard, though it is most usually encountered with 625i) while the serial digital interface—other than the obsolete 143 Mbit/s and 177 Mbit/s forms—is a component standard.

The 360 Mbit/s interface supports 525i and 625i widescreen. It can also be used to support 525p, if 4:2:0 sampling is used.

The various 540 Mbit/s interfaces support 525p and 625p formats.

The nominal 1.5 Gbit/s interfaces support most high-definition video formats.

Supported formats include 1080/60i, 1080/59.94i, 1080/50i, 1080/30p, 1080/29.97p, 1080/25p, 1080/24p, 1080/23.98p, 720/60p, 720/59.94p, and 720/50p. In addition, there are several 1035i formats (an obsolete Japanese television standard), half-bandwidth 720p standards such as 720/24p (used in some film conversion applications, and unusual because it has an odd number of samples per line[citation needed]), and various 1080psf (progressive, segmented frame) formats. Progressive Segmented frames formats appear as interlace video but contain video which is progressively scanned. This is done to support analog monitors and televisions, many of which are incapable of locking to low field rates such as 30 Hz and 24 Hz.

The dual link HD interface supports 1080/60p, 1080/59.94p, and 1080/50p, as well as 4:4:4 encoding, greater color depth, RGB encoding, alpha channels, and nonstandard resolutions (often encountered in computer graphics or digital cinema). A quad link interface of HD-SDI supports UHDTV-1 resolution 2160/60p

2M is the tail end of 1M. The external diameter of 1M is threaded at 2M.

3M is the front end of the modular enclosure of the eyepiece module of the mobile apparatus. The internal diameter of 3M is threaded at its front end for mounting optical filters as needed.

4M is the tail end of the zoom lens housing.

5M is a image sensor array of the electronic image sensor array camera of the mobile apparatus.

6M is the optical and mechanical axis of the mobile apparatus' optical system.

7M is a typical marginal rim ray focused in the image plane 17M of the mobile apparatus from a typical optical image source.

8M is a typical marginal rim ray focused in the image plane 17M of the mobile apparatus from a typical optical image source.

9M is the field lens of a typical eyepiece of the mobile apparatus.

10M is the eye lens of the typical eyepiece of the mobile apparatus.

11M is the front end of the zoom lens housing of the zoom lens.

18M is used by the observer to remotely control the functions of the zoom lens.

The zoom lens functions are magnification control, iris diaphragm control, and focus control.

When actuated by the observer, 18M mechanically rotates 19M to control the magnification of the zoom lens.

When actuated by the observer, 18M mechanically rotates 20M to control the iris diaphragm of the zoom lens.

When actuated by the observer, 18M mechanically rotates 21M to control the focus of the zoom lens.

The observer can still maintain manual control of the zoom lens by rotating the adjustment rings by hand.

The observer is enabled to adjust the focus for objects whose distances to the optical image source may be changing during an observing session. The observer can implement the change in focus either manually or electronically, locally or remotely, wirelessly or by hard wire.

12M is the optically active surface of the image sensor array 5M of the electronic image sensor array camera of the mobile apparatus. 12M is in conjunction with 17M to achieve focus.

13M is the front and first lens of the zoom lens optical assembly.

14M is the second lens of the zoom lens optical assembly.

15M is the third lens of the zoom lens optical assembly.

16M is the fourth and last lens of the zoom lens optical assembly.

17M is the image plane of the mobile apparatus.

18M is the zoom lens actuator.

18M is used by the observer to remotely control the functions of the zoom lens.

The zoom lens functions are magnification control, iris diaphragm control, and focus control.

When actuated by the observer, 18M mechanically rotates 19M to control the magnification of the zoom lens.

When actuated by the observer, 18M mechanically rotates 20M to control the iris diaphragm of the zoom lens.

When actuated by the observer, 18M mechanically rotates 21M to control the focus of the zoom lens.

The observer can still maintain control of the zoom lens by manually rotating the adjustment rings.

19M is the magnification adjustment ring of the zoom lens.

20M is the iris diaphragm adjustment ring of the zoom lens.

21M is the focus adjustment ring of the zoom lens.

22M is the iris diaphragm of the zoom lens optical assembly.

23M is a typical principal ray from a typical optical image source to the mobile apparatus.

24M is the field stop of the eyepiece of the mobile apparatus. If the optical image source already is configured with a field stop, then 24M is unnecessary and will be unscrewed and removed from 3M, and the optical image source's field stop will be used instead.

25M is the threaded joint between the eyepiece modular enclosure 3M and the zoom lens modular enclosure 27M.

26M is the threaded joint between the zoom lens 11M modular enclosure 27M and the modular image sensor array enclosure 1M.

27M is the modular enclosure for the zoom lens 11M module.

28M is the electronic image sensor array camera showing the cover. The electronic image sensor array camera is configured for providing electronic imagery signals to the observer and to the observer's audience from a electrical connector port on its cover. The electronic image sensor array camera is configured for receiving electronic control commands from the observer, and furnishing electronic status signals to the observer from a electrical connector port on its cover. The electronic image sensor array camera as shown in the figure is comprised of a cover and an electronic image sensor array and its associated camera electronics. The sensor array, for example is a CCD, CMOS or other sensor array type. Hard wire cable (the cable is not shown) carries the video signal from an output port on the electronic image sensor array camera to the observer for the observer to hook up to and disseminate to his audience under the control of the observer. Alternately, if the observer prefers, the observer can run a cable from the output port on the electronic image sensor array camera directly to the observer's audience.

29M is the battery. The battery is for supplying electricity to the electrical elements of the mobile apparatus.

30M is the end cap module. See FIG. 18 for reference.

Refer to FIG. 1 as a reference for the optical image source.

Substitution of eyepieces, zoom lenses, or image sensor arrays with other eyepieces, zoom lenses, or image sensor arrays to better match the job, match the environment, match the object, and match the audience, etc. can be accomplished by disassembly of the mobile apparatus into its respective modules and substituting more appropriate modules in their place.

The eyepiece module 3M optically acquires the optical image source's focal image of the object at 24M and optically transforms the focal image into a afocal image and optically transfers the afocal image to the zoom lens module 27M which optically transforms the afocal image into a focal image at 17M of 1M. The electronic image sensor array camera module 1M electronically transforms the focal image at 17M into electronic imagery signals, and transmits the electronic imagery signals from the output terminals of 26M to the observer and the observer's audience. The electronic imagery signals meet analog and/or digital protocols depending on the type of analog or digital electronics used by the observer in the electronic sensor array camera module 1M.

FIGS. 13A & 13B

Figure 13:
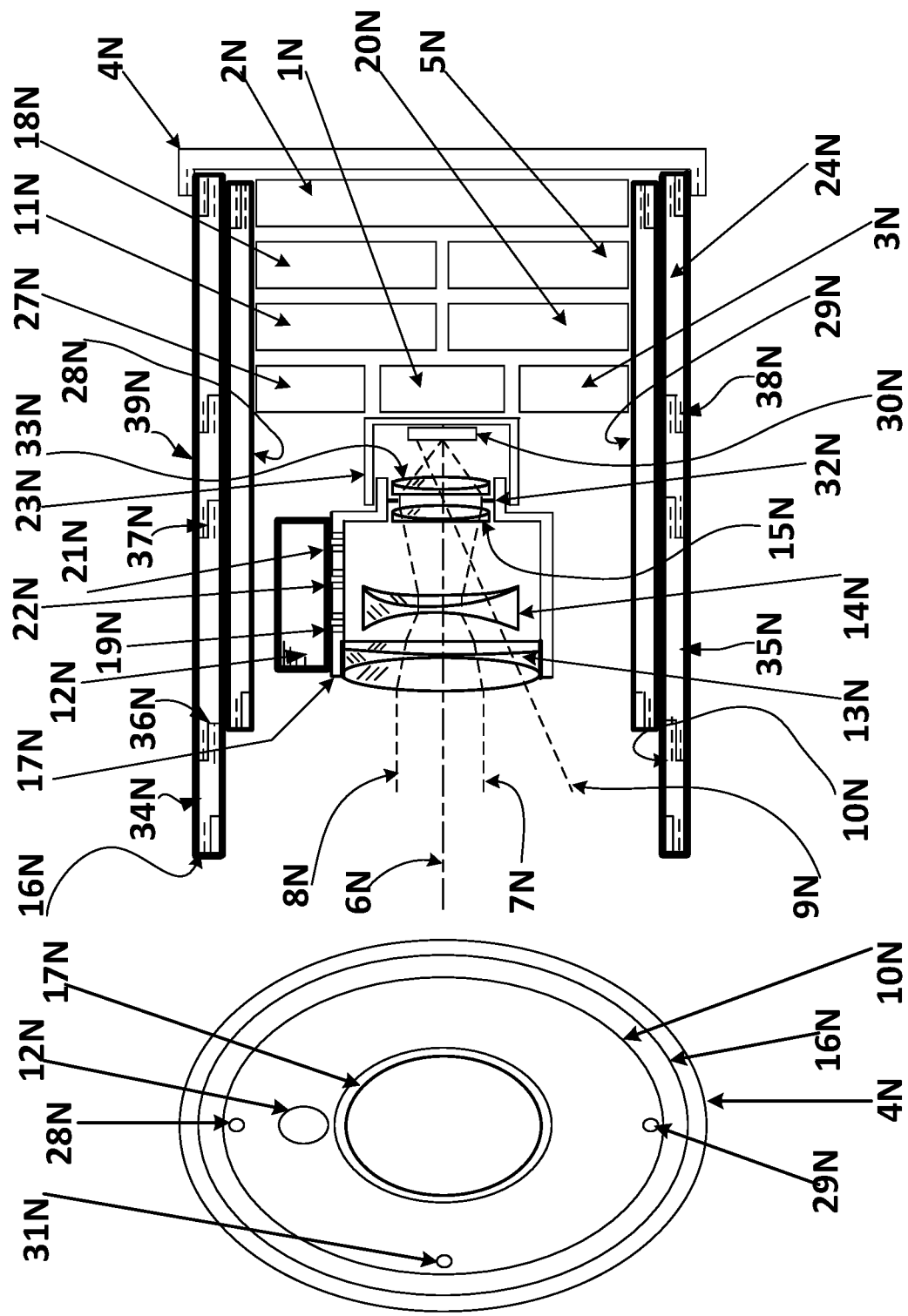
FIG. 13A shows a side view section of a layout of a preferred embodiment of a mobile apparatus, showing the electronic circuits inside the mobile apparatus' modular enclosure, and where the mobile apparatus has a zoom lens actuator to operate the zoom lens functions, and where the zoom lens has an iris diaphragm, but the mobile apparatus does not have its own eyepiece, wherein the mobile apparatus is configured for use for optical image sources referred to in FIG. 2.

FIGS. 13A & 13B shows a side view center section of a layout of a preferred embodiment of a mobile apparatus, showing the electronics in the mobile apparatus' enclosure, and where the mobile apparatus has a zoom lens actuator to operate the zoom lens functions, and where the zoom lens has an iris diaphragm, but where the mobile apparatus does not have its own eyepiece.

FIG. 13B shows a front view of the layout the mobile apparatus shown in FIG. 13A.

The mobile apparatus disclosed in FIGS. 13A & 13B is configured for being attached to and compatible with the optical image source shown in FIG. 2. The imagery from the optical image source to the zoom lens is afocal.

The zoom lens module is for optically transforming the afocal optical imagery into focal optical imagery and for optically transferring the focal imagery to the electronic image sensor array camera module for electronically transforming the focal optical imagery into electronic imagery signals.

Screw threaded joints are a simple, inexpensive and space saving method especially for connecting enclosures having a cylindrical profile.

The front ends of the module's 35N and 39N and 24N cylindrical enclosures are under cut and threaded with female threads. The rear ends of the module's cylindrical enclosures are over cut and threaded with male threads. The rear ends of the module's cylindrical enclosures i.e. 35N mate with the front end of the module's cylindrical enclosures 37N in order to connect the two modules together.

The detailed physical elements disclosed in the drawings shown in FIGS. 13A & 13B are identified as follows:

1N is an electronics that is comprised of a audio amplifier, and a zoom lens actuator servo electronics package. 1N is a physical element of 24N.

2N is the battery, and a power control electronics. 2N is a physical element of 24N.

3N is the DVR electronics. 3N is a physical element of 24N.

4N is the mobile apparatus' enclosure end cap module. Details of the end cap are shown in FIGS. 18E & 18F & 18G.

5N is the analog transmitter. 5N is a physical element of 24N.

6N is the optical and mechanical axis of the mobile apparatus.

7N is a typical marginal rim ray from the exit pupil of the eyepiece of a typical optical image source.

8N is a typical marginal rim ray from the exit pupil of the original equipment eyepiece of a typical optical image source.

9N is a typical principal ray from the exit pupil of the original equipment eyepiece of a typical optical image source.

10N is the inside diameter of the zoom lens module's enclosure of the mobile apparatus.

11N is the WiFi digital transceiver electronics. 11N is a physical element of 24N.

12N is the zoom lens actuator. 12N is a physical element of 35N.

12N is used by the observer to remotely control the functions of the zoom lens.

The zoom lens functions are magnification control, iris diaphragm control, and focus control.

When actuated by the observer, 12N mechanically rotates 19N to control the magnification of the zoom lens.

When actuated by the observer, 18N mechanically rotates 22N to control the iris diaphragm of the zoom lens.

When actuated by the observer, 18N mechanically rotates 21N to control the focus of the zoom lens.

The observer can still maintain control of the zoom lens by manually rotating the adjustment rings.

13N is the front and first lens of the zoom lens optical assembly.

14N is the second lens of the zoom lens optical assembly.

15N is the third lens of the zoom lens optical assembly.

16N is the front end of the zoom lens module's enclosure of the mobile apparatus.

17N is the front end of the zoom lens housing.

12N is used by the observer to remotely control the functions of the zoom lens.

The zoom lens functions are magnification control, iris diaphragm control, and focus control.

When actuated by the observer, 12N mechanically rotates 19N to control the magnification of the zoom lens.

When actuated by the observer, 12N mechanically rotates 22N to control the iris diaphragm of the zoom lens.

When actuated by the observer, 12N mechanically rotates 21N to control the focus of the zoom lens.

The observer can still maintain manual control of the zoom lens by rotating the adjustment rings by hand.

The observer is enabled to adjust the focus for objects whose distances to the optical image source may be changing during an observing session. The observer can implement the change in focus either manually or electronically, locally or remotely, wirelessly or by hard wire.

18N is the system controller electronics. 18N is a physical element of 24N.

19N is the magnification adjustment ring of the zoom lens.

20N is the Internet WIFI transceiver electronics. 20N is a physical element of 24N.

21N is the focus adjustment ring of the zoom lens.

22N is the iris diaphragm adjustment ring of the zoom lens.

23N is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.

The electronic image sensor array camera as shown in the figure is comprised of a cover and an electronic image sensor array and its associated camera electronics. The sensor array, for example is a CCD, CMOS or other sensor array type.

24N is the electronics circuits module's enclosure of the mobile apparatus. 24N is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities to match the challenges encountered during an observing session by the observer. Each one of the electronic circuits modules enables the observer to exercise different capabilities during an observing session.

The observer may choose to use an electronic circuits module which uses any one of the circuits described above in the figures in the mobile apparatus by simply loading the module containing the circuit into the mobile apparatus.

25N is not shown.

26N is not shown.

27N is the DVR storage memory device. 27N is a physical element of 24N.

28N is the analog transmitter's RF antenna. 28N is a physical element of 24N.

29N is the WiFi digital transceiver's WiFi antenna. 29N is a physical element of 24N.

30N is the image sensor array.

31N is the Internet WIFI transceiver's antenna. 31N is a physical element of 24N.

32N is the zoom lens' iris diaphragm.

33N is the fourth and last lens of the zoom lens optical assembly.

34N is the extension module's enclosure.

35N is the zoom lens module's enclosure.

36N is the threaded joint between 34N and 35N.

37N is the threaded joint between 35N and 39N.

38N is the threaded joint between 39N and 24N.

39N is the electronic image sensor array camera module's enclosure of the mobile apparatus.

Refer to FIG. 2 as a reference for the optical image source.

Substitution of eyepieces, zoom lenses, image sensor arrays or electronics circuits with other eyepieces, zoom lenses, image sensor arrays, or electronics circuits to better match the job, match the environment, match the object, and match the audience, etc. can be accomplished by disassembly of the mobile apparatus into its respective modules and substituting more appropriate modules in their place.

The zoom lens module 35N optically transforms the afocal image of the object from the optical image source into a focal image and optically transfers the focal image to 30N of 39N.

The electronic image sensor array camera module 39N electronically transforms the focal image at 30N into electronic imagery signals, and the electronic circuits module 24N electronically transforms and transmits the electronic imagery signals from the output terminals of 24N and 4N to the observer and the observer's audience. The electronic imagery signals meet analog and/or digital protocols depending on the type of analog or digital electronics used by the observer in the electronic circuits module 24N.

FIG. 14

FIG. 14 shows a side view center section of a layout of a preferred embodiment of a mobile apparatus, where the mobile apparatus has its own eyepiece, and where the zoom lens functions are operated manually by the observer, and where the zoom lens does not have a zoom lens actuator, and where the zoom lens has an iris diaphragm.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The mobile apparatus shown in FIG. 14 is configured with a eyepiece module 3P, a zoom lens module 28P and a electronic image sensor array camera module 1P.

The mobile apparatus disclosed in FIG. 14 is configured for being attached to and compatible with the optical image source shown in FIG. 1. The imagery from the optical image source to 24P is focal.

The eyepiece module is for optically acquiring and transforming and transferring the focal optical imagery from the optical image source into afocal optical imagery to the zoom lens module.

The zoom lens module is for optically transforming the afocal optical imagery into focal optical imagery and for optically transferring the focal imagery to the electronic image sensor array camera module for electronically transforming the focal optical imagery into electronic imagery signals.

Screw thread is shown in the figure as an example of a mechanical connecting means for mechanically connecting adjacent modular enclosures.

Screw thread is an example of a mechanical connecting means.

Screw threaded joints are a simple, inexpensive and space saving method especially for connecting enclosures having a cylindrical profile.

The front ends of the module's 28P and 1P cylindrical enclosures are under cut and threaded with female threads. The rear ends of the module's cylindrical enclosures are over cut and threaded with male threads. The rear ends of the module's cylindrical enclosures i.e. 28P mate with the front end of the module's cylindrical enclosures 1P in order to connect the two modules together.

Screw thread is given in the present invention as an example of a mechanical connecting means. Other mechanical connecting means are also appropriate i.e. snap-fit connections.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIG. 14 are identified as follows:

1P is the right cylindrical tubular enclosure of the mobile apparatus. 1P is the modular enclosure for the image sensor array module for the image sensor array 11P.

2P is the tail end of the mobile apparatus' enclosure. The internal diameter at 2P is threaded.

3P is the front end of the right cylindrical tubular enclosure of the mobile apparatus. 3P is the modular enclosure for the eyepiece module. 3P is joined at 27P to 28P.

4P is the tail end of the zoom lens housing.

5P is the rear end of the image sensor array.

6P is the optical and mechanical axis of the mobile apparatus.

7P is a typical marginal rim ray focused in the image plane of the eyepiece of the mobile apparatus by a typical optical image source (not shown).

8P is a typical marginal rim ray focused in the image plane of the eyepiece of the mobile apparatus by a typical optical image source (not shown).

9P is the field lens of the eyepiece of the mobile apparatus.

10P is the eye lens of the eyepiece of the mobile apparatus.

11P is the front end of the zoom lens housing.

The zoom lens functions are magnification control, iris diaphragm control, and focus control.

When actuated manually by the observer, 19P controls the magnification of the zoom lens, 20P controls the iris diaphragm of the zoom lens, 21P controls the focus of the zoom lens.

The observer can maintain manual control of the zoom lens by rotating the adjustment rings by hand.

The observer is enabled to adjust the focus for objects whose distances to the optical image source may be changing during an observing session.

12P is the image sensor array. 12P is in conjunction with 17P to achieve focus.

13P is the front and first lens of the zoom lens optical assembly.

14P is the second lens of the zoom lens optical assembly.

15P is the third lens of the zoom lens optical assembly.

16P is the fourth and final lens of the zoom lens optical assembly.

17P is the image plane of the mobile apparatus.

18P is the front end of a longitudinal 90 degree slot opening in the tubular enclosure of the mobile apparatus.

19P is a magnification adjustment lever arm rod of the zoom lens optical assembly.

20P is a iris diaphragm adjustment lever arm rod of the zoom lens optical assembly.

21P is a focus adjustment lever arm rod of the zoom lens optical assembly.

22P is the iris diaphragm of the zoom lens optical assembly.

23P is a typical principal ray in the image plane of the eyepiece of the mobile apparatus.

24P is the field stop of the eyepiece of the mobile apparatus.
If the optical image source already is configured with a field stop, then 24P is unnecessary and will be unscrewed and removed from 3P, and the optical image source's field stop will be used instead.

25P is the rear end of the longitudinal 90 degree slot opening in the tubular enclosure of the mobile apparatus.

26P is the threaded joint between 28P and 1P.

27P is the threaded joint between 3P and 28P.

28P is the modular enclosure for the zoom lens module.

29P is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.
The electronic image sensor array camera as shown in the figure is comprised of a cover and an electronic image sensor array and its associated camera electronics. The sensor array, for example is a CCD, CMOS or other sensor array type. Hard wire cable (the cable is not shown) carries the video signal from an output port on the electronic image sensor array camera to the observer for the observer to hook up and disseminate to his audience under the control of the observer. Alternately, if the observer prefers, the observer can run a cable from the output port on the electronic image sensor array camera directly to the observer's audience.

30P is the electric cooling device and heat sink for 29P.

31P is the threaded joint connecting the electronic image sensor array camera 29P cover and the zoom lens housing 11P.

32P is the battery. The battery is for supplying electricity to the electrical elements of the mobile apparatus.

33P is the end cap module. See FIG. 18 for reference.

Refer to FIG. 1 as a reference for the optical image source.

Substitution of eyepieces, zoom lenses, or image sensor arrays with other eyepieces, zoom lenses, or image sensor arrays to better match the job, match the environment, match the object, and match the audience, etc. can be accomplished by disassembly of the mobile apparatus into its respective modules and substituting more appropriate modules in their place.

The eyepiece module 3P optically acquires the optical image source's focal image of the object at 24P and optically transforms the focal image into a afocal image and optically transfers the afocal image to the zoom lens module 28P which optically transforms the afocal image into a focal image at 17P of 1P.

The electronic image sensor array camera module 1P electronically transforms the focal image at 17P into electronic imagery signals from the output terminals of 1P and 33P to the observer. The electronic imagery signals meet analog and/or digital protocols depending on the type of analog or digital electronics used by the observer in the electronic sensor array camera module 1P. Hard wire cable (the cable is not shown) carries the video signal from an output port on the electronic image sensor array camera to the observer for the observer to hook up to and disseminate to his audience under the control of the observer. Alternately, if the observer prefers, the observer can run a cable from the output port on the electronic image sensor array camera directly to the observer's audience.

FIGS. 15A & 15B

FIGS. 15A & 15B shows a side view center section of a layout of a preferred embodiment of a mobile apparatus, showing the electronic systems, and where the mobile apparatus has a zoom lens actuator to operate the zoom lens functions, and where the mobile apparatus' enclosure has a threaded screw-on end cap module, and where the zoom lens has an iris diaphragm, but where the mobile apparatus does not have its own eyepiece.

FIG. 15B shows a front view of the layout of the mobile apparatus shown in FIG. 15A.

The mobile apparatus disclosed in FIGS. 15A & 15B is configured for being attached to and compatible with the optical image source shown in FIG. 1. The imagery from the optical image source to 24Q is focal.

The eyepiece module is for optically acquiring and transforming and transferring the focal optical imagery from the optical image source into afocal optical imagery to the zoom lens module.

The zoom lens module is for optically transforming the afocal optical imagery into focal optical imagery and for optically transferring the focal imagery to the electronic image sensor array camera module for electronically transforming the focal optical imagery into electronic imagery signals.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The mobile apparatus shown in FIG. 15 is configured with a eyepiece module 9Q, a zoom lens module 37Q and a electronic image sensor array camera module 38Q, and electronics circuits module 39Q.

Screw thread is shown in the figure as an example of a mechanical connecting means for mechanically connecting adjacent modular enclosures.

Screw thread is an example of a mechanical connecting means.

Screw threaded joints are a simple, inexpensive and space saving method especially for connecting enclosures having a cylindrical profile.

The front ends of the module's 37Q and 38Q and 39Q cylindrical enclosures are under cut and threaded with female threads. The rear ends of the module's cylindrical enclosures are over cut and threaded with male threads. The rear ends of the module's cylindrical enclosures i.e. 37Q mate with the front end of the module's cylindrical enclosures 38Q in order to connect the two modules together.

Screw thread is given in the present invention as an example of a mechanical connecting means. Other mechanical connecting means are also appropriate.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIGS. 15A & 15B are identified as follows:

1Q is an electronics that is comprised of a audio amplifier, and a zoom lens actuator servo electronics package.

2Q is the battery, and a power control electronics.

3Q is the DVR electronics.

4Q is the threaded screw-on end cap module on the mobile apparatus' enclosure. Details of the end cap are shown in FIGS. 18E & 18F & 18G.

5Q is the analog transmitter.

6Q is the front end of the eyepiece enclosure of the mobile apparatus.

7Q is a typical marginal rim ray focused in the image plane of a typical eyepiece of a typical mobile apparatus by a typical optical image source (not shown).

8Q is a typical marginal rim ray focused in the image plane of a typical eyepiece of a typical mobile apparatus by a typical optical image source.

9Q is the modular enclosure for the eyepiece module.

10Q is the field lens of the eyepiece of the mobile apparatus.

11Q is the WiFi digital transceiver electronics.

12Q is the zoom lens electro-mechanical actuator.

12Q is used by the observer to remotely control the functions of the zoom lens.

The zoom lens functions are magnification control, iris diaphragm control, and focus control.

When actuated by the observer, 12Q mechanically rotates 19Q to control the magnification of the zoom lens.

When actuated by the observer, 18Q mechanically rotates 26Q to control the iris diaphragm of the zoom lens.

When actuated by the observer, 18Q mechanically rotates 21Q to control the focus of the zoom lens.

The observer can still maintain control of the zoom lens by manually rotating the adjustment rings.

13Q is the front and first lens of a typical zoom lens optical assembly.

14Q is the second lens of the zoom lens optical assembly.

15Q is the third lens of the zoom lens optical assembly.

16Q is the threaded end of the right cylindrical tubular enclosure 39Q of the mobile apparatus.

17Q is the front end of the zoom lens housing.

12Q is used by the observer to remotely control the functions of the zoom lens.

The zoom lens functions are magnification control, iris diaphragm control, and focus control.

When actuated by the observer, 12Q mechanically rotates 19Q to control the magnification of the zoom lens.

When actuated by the observer, 12Q mechanically rotates 26Q to control the iris diaphragm of the zoom lens.

When actuated by the observer, 12Q mechanically rotates 21Q to control the focus of the zoom lens.

The observer can still maintain manual control of the zoom lens by rotating the adjustment rings by hand.

The observer is enabled to adjust the focus for objects whose distances to the optical image source may be changing during an observing session. The observer can implement the change in focus either manually or electronically, locally or remotely, wirelessly or by hard wire.

18Q is the system controller electronics.

19Q is the magnification adjustment ring of the zoom lens.

20Q is the Internet WIFI transceiver electronics.

21Q is the focus adjustment ring of a typical zoom lens.

22Q is the eye lens of a typical eyepiece of the mobile apparatus.

23Q is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover. The electronic image sensor array camera as shown in the figure is comprised of a cover and an electronic image sensor array and its associated camera electronics. The sensor array, for example is a CCD, CMOS or other sensor array type

24Q is the field stop of the typical eyepiece of the mobile apparatus.

If the optical image source already is configured with a field stop, then 24Q is unnecessary and will be unscrewed and removed from 9, and the optical image source's field stop will be used instead.

25Q is a typical principal ray in the image plane of the eyepiece of a typical mobile apparatus.

26Q is the iris diaphragm adjustment ring of a the zoom lens.

27Q is the DVR storage memory device.

28Q is the analog transmitter's RF antenna.

29Q is the WiFi digital transceiver's WiFi antenna.

30Q is the image sensor array of the electronic image sensor array camera 23Q.

31Q is the Internet WIFI transceiver's antenna.

32Q is a typical zoom lens iris diaphragm.

33Q is the fourth and last lens of a the typical zoom lens optical assembly.

34Q is the threaded joint between 9Q and 37Q.

35Q is the threaded joint between 37Q and 38Q.

36Q is the threaded joint between 38Q and 39Q.

37Q is the modular enclosure for the zoom lens module for zoom lens 17Q and actuator 12Q.

38Q is the modular enclosure for the image sensor array camera module 23Q.

39Q is the modular enclosure for the electronics circuits module which is comprised of 1Q, 2Q, 3Q, 5Q, 11Q, 18Q, 20Q and 27Q. 39Q is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities to match the challenges encountered during an observing session by the observer.

Each one of the electronic circuits modules enables the observer to exercise different capabilities during an observing session.

The observer may choose to use an electronic circuits module which uses any one of the circuits described above in the figures in the mobile apparatus by simply loading the module containing the circuit into the mobile apparatus.

Refer to FIG. 1 as a reference for the optical image source.

Substitution of eyepieces, zoom lenses, image sensor arrays or electronics circuits with other eyepieces, zoom lenses, image sensor arrays, or electronics circuits to better match the job, match the environment, match the object, and match the audience, etc. can be accomplished by disassembly of the mobile apparatus into its respective modules and substituting more appropriate modules in their place.

The eyepiece module 9Q optically acquires the optical image source's focal image of the object at 24Q and optically transforms the focal image into a afocal image and optically transfers the afocal image to the zoom lens module 37Q which optically transforms the afocal image into a focal image at 30Q of 38Q.

The electronic image sensor array camera module 38Q electronically transforms the focal image at 30Q into electronic imagery signals, and the electronic circuits module 39Q electronically transforms and transmits the electronic imagery signals from the output terminals of 39Q and 4Q to the observer. The electronic imagery signals meet analog and/or digital protocols depending on the type of analog or digital electronics used by the observer in the electronic sensor array camera module 38Q and the electronic circuits module 39Q.

FIG. 16A and FIG. 16B

FIG. 16A shows a side view center section of a layout of a preferred embodiment of a mobile apparatus, showing the electronic systems, and where the mobile apparatus has a zoom lens actuator to operate the zoom lens functions, and where the zoom lens has an iris diaphragm, and where the mobile apparatus has a eyepiece module whose housing is threaded, and where the inside diameter of the mobile apparatus' enclosure is threaded to mount the eyepiece module. FIG. 16B shows a front view of the layout of the mobile apparatus shown in FIG. 16A.

The mobile apparatus disclosed in FIGS. 16A & 16B is configured for being attached to and compatible with the optical image source shown in FIG. 1 and FIG. 2. The mobile apparatus is adaptable to both focal and afocal imagery from the optical image source.

The eyepiece module is for optically acquiring and transforming and transferring the focal optical imagery from the optical image source, see FIG. 1, into afocal optical imagery to the zoom lens module.

The zoom lens module is for optically transforming the afocal optical imagery, whether it be from the eyepiece module or from the optical image source, as FIG. 2, into focal optical imagery and for optically transferring the focal imagery to the electronic image sensor array camera module for electronically transforming the focal optical imagery into electronic imagery signals.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The mobile apparatus shown in FIG. 16 is configured with a eyepiece module 9R, a zoom lens module 42R and a electronic image sensor array camera module 40R, and an electronics circuit module 41R.

Screw thread is shown in the figure as an example of a mechanical connecting means for mechanically connecting adjacent modular enclosures. Screw thread is an example of a mechanical connecting means. Screw threaded joints are a simple, inexpensive and space saving method especially for connecting enclosures having a cylindrical profile.

The front ends of the module's 42R and 40R and 41R cylindrical enclosures are under cut and threaded with female threads. The rear ends of the module's cylindrical enclosures are over cut and threaded with male threads. The rear ends of the module's cylindrical enclosures i.e. 42R mate with the front end of the module's cylindrical enclosures 40R in order to connect the two modules together.

Screw thread is given in the present invention as an example of a mechanical connecting means. Other mechanical connecting means are also appropriate.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIG. 16A and FIG. 16B are identified as follows:

1R is an electronics that is comprised of a audio amplifier, and a zoom lens actuator servo electronics package.

2R is the battery, and a power control electronics.

3R is the DVR electronics.

4R is the threaded screw-on end cap module of the mobile apparatus' enclosure. Details of the end cap module are shown in FIGS. 18E & 18F & 18G.

5R is the analog transmitter.

6R is the extension module of the mobile apparatus showing its enclosure.

7R is a typical marginal rim ray focused in the image plane of a typical eyepiece of a mobile apparatus by a typical optical image source (not shown).

8R is a typical marginal rim ray focused in the image plane of a typical eyepiece of a mobile apparatus by a typical optical image source (not shown).

9R is the threaded housing of the eyepiece module of the mobile apparatus.

The eyepiece module enables the observer to use the mobile apparatus on a variety of optical image sources. For example, optical image sources: that have a original equipment eyepiece that can be removed from the optical image sources: that have no original equipment eyepiece at all The eyepiece module can be retained in the mobile apparatus, or removed from the mobile apparatus as needed to march the optical image source to be used during the observer's observing session.

10R is the field lens of the removable eyepiece of the mobile apparatus.

11R is the WiFi digital transceiver electronics.

12R is the zoom lens actuator.

12R is used by the observer to remotely control the functions of the zoom lens.

The zoom lens functions are magnification control, iris diaphragm control, and focus control.
  When actuated by the observer, 12R mechanically rotates 19R to control the magnification of the zoom lens.
  When actuated by the observer, 12R mechanically rotates 26R to control the iris diaphragm of the zoom lens.
  When actuated by the observer, 12R mechanically rotates 21R to control the focus of the zoom lens.
  The observer can still maintain control of the zoom lens by manually rotating the adjustment rings.
13R is the front and first lens of a typical zoom lens optical assembly.
14R is the second lens of the zoom lens optical assembly.
15R is the third lens of the zoom lens optical assembly.
16R is the threaded end of the right cylindrical tubular enclosure of the mobile apparatus.
17R is the front end of the zoom lens housing.
  12R is used by the observer to remotely control the functions of the zoom lens.
  The zoom lens functions are magnification control, iris diaphragm control, and focus control.
  When actuated by the observer, 12R mechanically rotates 19R to control the magnification of the zoom lens.
  When actuated by the observer, 12R mechanically rotates 26R to control the iris diaphragm of the zoom lens.
  When actuated by the observer, 12R mechanically rotates 21R to control the focus of the zoom lens.
  The observer can still maintain manual control of the zoom lens by rotating the adjustment rings by hand.
  The observer is enabled to adjust the focus for objects whose distances to the optical image source may be changing during an observing session. The observer can implement the change in focus either manually or electronically, locally or remotely, wirelessly or by hard wire.
18R is the system controller electronics.
19R is the magnification adjustment ring of the zoom lens.
20R is the Internet WIFI transceiver electronics.
21R is the focus adjustment ring of a typical zoom lens.
22R is the eye lens of a typical eyepiece of the mobile apparatus.
23R is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.
  The electronic image sensor array camera as shown in the figure is comprised of a cover and an electronic image sensor array and its associated camera electronics. The sensor array, for example is a CCD, CMOS or other sensor array type
24R is the field stop of the eyepiece of the mobile apparatus.
  If the optical image source already is configured with a field stop, then 24R is unnecessary and will be unscrewed and removed from 9R, and the optical image source's field stop will be used instead.
25R is a typical principal ray in the image plane of the eyepiece of the mobile apparatus.
26R is the iris diaphragm adjustment ring of a typical zoom lens.
27R is the DVR storage memory device.
28R is the analog transmitter's RF antenna.
29R is the WiFi digital transceiver's WiFi antenna.
30R is the image sensor array.
31R is the Internet WIFI transceiver's antenna.
32R is a typical zoom lens iris diaphragm.
33R is the threaded portion of the threaded housing of the eyepiece module of the mobile apparatus.
34R is the threaded inside diameter of the modular enclosure of the mobile apparatus' zoom lens.
35R is the USB port.
36R is the power on/off switch.
37R is the fourth and last lens of a typical zoom lens optical assembly.
38R is the threaded joint between 6R and 40R.
39R is the threaded joint between 40R and 41R.
40R is the modular image sensor array camera module's enclosure.
41R is the modular enclosure for the electronics circuits module which is comprised of 1R, 2R, 3R, 5R, 11R, 18R, 20R, 35R, 36R and 27R.
41R is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities to match the challenges encountered during an observing session by the observer.
  Each one of the electronic circuits modules enables the observer to exercise different capabilities during an observing session. The observer may choose to use an electronic circuits module which uses any one of the circuits described above in the figures in the mobile apparatus by simply loading the module containing the circuit into the mobile apparatus.
42R is the zoom lens module's enclosure.
43R is the threaded rear end of the extension module 6 showing where the enclosure of 6R is joined with 42R.
  Refer to FIG. 1 as a reference for the optical image source.
  Substitution of eyepieces, zoom lenses, image sensor arrays or electronics circuits with other eyepieces, zoom lenses, image sensor arrays, or electronics circuits to better match the job, match the environment, match the object, and match the audience, etc. can be accomplished by disassembly of the mobile apparatus into its respective modules and substituting more appropriate modules in their place.
  The eyepiece module 9R optically acquires the optical image source's focal image of the object at 24R and optically transforms the focal image into a afocal image and optically transfers the afocal image to the zoom lens module 42R which optically transforms the afocal image into a focal image at 30R of 40R.
  The electronic image sensor array camera module 40R electronically transforms the focal image at 30R into electronic imagery signals, and the electronic circuits module 41R electronically transforms and transmits the electronic imagery signals from the output terminals of 41R and 4R to the observer and the observer's audience. The electronic imagery signals meet analog and/or digital protocols depending on the type of analog or digital electronics used by the observer in the electronic sensor array camera module 40R and the electronic circuits module 41R.
  FIG. 17A and FIG. 17B
  FIG. 17A shows a side view center section of a layout of a eyepiece module of the mobile apparatus.
  FIG. 17B shows a front view of the layout of the eyepiece module shown in FIG. 17A.

The eyepiece module is for optically acquiring and transforming and transferring the focal optical imagery from the optical image source into afocal optical imagery to the zoom lens module.

Screw thread is shown in the figure as an example of a mechanical connecting means for mechanically connecting adjacent modular enclosures of the modules.

Screw thread is an example of a mechanical connecting means.

Screw threaded joints are a simple, inexpensive and space saving method especially for connecting enclosures having a cylindrical profile.

Screw thread is given in the present invention as an example of a mechanical connecting means. Other mechanical connecting means are also appropriate.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIG. 17A and FIG. 17B are identified as follows:
1S is the optical and mechanical axis of the eyepiece module of the mobile apparatus.
2S is the image plane of the eyepiece module.
3S is the field stop of the eyepiece module of the mobile apparatus.
  If the optical image source already is configured with a field stop, then 3S is unnecessary and will be unscrewed and removed from 5S, and the optical image source's field stop will be used instead.
4S is the front end of the threaded housing of the eyepiece module.
5S is the threaded housing of the eyepiece module.
6S is the tail end of the threaded housing of the eyepiece module.
7S is the threaded portion of the threaded housing at the tail end of the eyepiece module.
8S is a typical marginal rim ray from the objective of a typical optical image source focused in the image plane of the eyepiece module of the mobile apparatus.
9S is a typical marginal rim ray from the objective of a typical optical image source focused in the image plane of the eyepiece module of the mobile apparatus.
10S is a typical principal ray in the image plane of the eyepiece module of the mobile apparatus.
11S is the field lens of the eyepiece module of the mobile apparatus.
12S is the eye lens of the eyepiece module of the mobile apparatus.
13S is the exit pupil of the eyepiece module.
14S is the inside diameter of the threaded housing of the eyepiece module.
15S is the threaded inside diameter of the eye lens end of the eyepiece housing for mounting optical filters as needed. This location for the filters is chosen because it is in collimated space thereby making dust that might collect on the filters less visible in the final image on the optical sensor array.

The eyepiece module enables the observer to use the mobile apparatus on a variety of different types of manufactured optical image sources: that have an original equipment eyepiece that are permanently mounted, or that have an original equipment eyepiece that can be removed from the optical image sources, or that have no original equipment eyepiece at all. When the optical image sources have their own original equipment eyepiece, then the eyepiece module is removed from the mobile apparatus. When the optical image sources do not have their own original equipment eyepieces, then the eyepiece module is added to the mobile apparatus.

When the optical image sources are manufactured with original equipment eyepieces that are permanently mounted to the optical image sources, then the eyepiece is not used by the observer, and the observer uses the optical image sources with its own original equipment eyepiece. In cases where the optical image sources has a permanently mounted original equipment eyepiece there is no need for the eyepiece 7S so the eyepiece module is unscrewed and removed from the mobile apparatus.

In this case the observer has a choice of the preferred embodiments shown in FIG. 34 thru FIG. 43.

When the optical image sources are manufactured with original equipment eyepieces that can be removed from the optical image sources, then the observer has the choice to use the optical image source with its own original equipment eyepiece, or remove the optical image source's original equipment eyepiece from the optical image source and use the mobile apparatus with the eyepiece module shown in FIGS. 17E & 17F. If the observer chooses to uses the optical image source with its own original equipment eyepiece, then the observer has a choice of the preferred embodiments for the mobile apparatus shown in FIG. 34 through FIG. 43. When the optical image sources are manufactured with no original equipment eyepiece at all, then the observer uses the mobile apparatus with the eyepiece shown in FIGS. 17A & 17B. In this case the observer has a choice of the preferred embodiments shown in FIG. 27 through FIG. 33.

The observer also has a choice of using the preferred embodiments for the mobile apparatus shown in FIG. 34 through FIG. 43 wherein the eyepiece module shown in FIGS. 17A & 17B is screwed into the internal thread of 3S at 4S.

The observer can configure the mobile apparatus with the observer's choice of eyepieces with different pre-determined effective focal lengths, apparent fields of view and eye reliefs. The eye relief is chosen to image the exit pupil of the eyepiece to coincide with the entrance pupil of the zoom lens. This is done to prevent vignetting.

FIG. 17C and FIG. 17D

FIG. 17C shows a side view center section of a layout of a eyepiece module of the mobile apparatus.

FIG. 17D shows a front view of the layout of the eyepiece module shown in FIG. 17C.

The eyepiece module is for optically acquiring and transforming and transferring the focal optical imagery from the optical image source into afocal optical imagery to the zoom lens module.

Screw thread is shown in the figure as a an example of mechanical connecting means for mechanically connecting adjacent modular enclosures of the modules.

Screw thread is an example of a mechanical connecting means.

Screw threaded joints are a simple, inexpensive and space saving method especially for connecting enclosures having a cylindrical profile.

Screw thread is given in the present invention as an example of a mechanical connecting means. Other mechanical connecting means are also appropriate.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIG. 17C and FIG. 17D are identified as follows:

1T is the optical and mechanical axis of the eyepiece module of the mobile apparatus.
2T is the image plane of the eyepiece.
3T is the field stop of the eyepiece of the mobile apparatus.
  If the optical image source already is configured with a field stop, then 3T is unnecessary and will be unscrewed and removed from 5T, and the optical image source's field stop will be used instead.
4T is the front end of the threaded housing of the eyepiece module.
5T is the threaded housing of the eyepiece module.
6T is the tail end of the threaded housing of the eyepiece module.
7T is the threaded portion of the threaded housing at the tail end of the eyepiece.
8T is a typical marginal rim ray from the objective of a typical optical image source focused in the image plane of the eyepiece of the mobile apparatus.
9T is a typical marginal rim ray from the objective of a typical optical image source focused in the image plane of the eyepiece of the mobile apparatus.
10T is a typical principal ray in the image plane of the eyepiece of the mobile apparatus.
11T is the field lens of the eyepiece of the mobile apparatus.
12T is the eye lens of the eyepiece of the mobile apparatus.
13T is the exit pupil of the eyepiece.
14T is the inside diameter of the threaded housing of the eyepiece.
15T is the threaded inside diameter of the eye lens end of the eyepiece housing for mounting optical filters as needed. This location for the filters is chosen because it is in collimated space thereby making dust that might collect on the filters less visible in the final image on the optical sensor array.

The eyepiece 7T enables the observer to use the mobile apparatus on a variety of different types of manufactured optical image sources: that have original equipment eyepieces that are permanently mounted, or that have original equipment eyepieces that can be removed from the optical image sources, or that have no original equipment eyepiece at all.

When the optical image sources are manufactured with original equipment eyepieces that are permanently mounted to the optical image sources, then the eyepiece is not used by the observer, and the observer uses the optical image sources with its own original equipment eyepiece. In cases where the optical image sources has a permanently mounted original equipment eyepiece there is no need for the eyepiece 7T so the eyepiece module is unscrewed and removed from the mobile apparatus.

In this case the observer has a choice of the preferred embodiments shown in FIG. 34 thru FIG. 43.

When the optical image sources are manufactured with original equipment eyepiece s that can be removed from the optical image sources, then the observer has the choice to use the optical image source with its own original equipment eyepiece, or remove the optical image source's original equipment eyepiece from the optical image source and use the mobile apparatus with the eyepiece shown in FIGS. 17E & 17F. If the observer chooses to uses the optical image source with its own original equipment eyepiece, then the observer has a choice of the preferred embodiments for the mobile apparatus shown in FIG. 34 through FIG. 43.

When the optical image sources are manufactured with no original equipment eyepiece at all, then the observer uses the mobile apparatus with the eyepiece shown in FIGS. 17A & 17B. In this case the observer has a choice of the preferred embodiments shown in FIG. 27 through FIG. 33.

The observer also has a choice of using the preferred embodiments for the mobile apparatus shown in FIG. 34 through FIG. 43 wherein the eyepiece shown in FIGS. 17A & 17B is screwed into the internal thread of 3T at 4T.

The observer can configure and reconfigure the mobile apparatus with the observer's choice of eyepieces with different pre-determined effective focal lengths, apparent fields of view and eye reliefs. The eye relief is chosen to image the exit pupil of the eyepiece to coincide with the entrance pupil of the zoom lens. This is done to prevent vignetting.

FIG. 17E and FIG. 17F

FIG. 17E shows a side view center section of a layout of a eyepiece module of the mobile apparatus.

FIG. 17F shows a front view of the layout of the eyepiece module shown in FIG. 17E.

The eyepiece module is for optically acquiring and transforming and transferring the focal optical imagery from the optical image source into afocal optical imagery to the zoom lens module.

Screw thread is shown in the figure as an example of a mechanical connecting means for mechanically connecting adjacent modular enclosures of the modules.

Screw thread is an example of a mechanical connecting means.

Screw threaded joints are a simple, inexpensive and space saving method especially for connecting enclosures having a cylindrical profile.

Screw thread is given in the present invention as an example of a mechanical connecting means. Other mechanical connecting means are also appropriate.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIG. 17E and FIG. 17F are identified as follows:

1U is the optical and mechanical axis of the eyepiece module of the mobile apparatus.
2U is the image plane of the eyepiece.
3U is the field stop of the eyepiece of the mobile apparatus.
  If the optical image source already is configured with a field stop, then 3U is unnecessary and will be unscrewed and removed from 5U, and the optical image source's field stop will be used instead.

4U is the front end of the threaded housing of the eyepiece.
5U is the threaded housing of the eyepiece.
6U is the tail end of the threaded housing of the eyepiece.
7U is the threaded portion of the threaded housing at the tail end of the eyepiece.
8U is a typical marginal rim ray from the objective of a typical optical image source focused in the image plane of the eyepiece of the mobile apparatus.
9U is a typical marginal rim ray from the objective of a typical optical image source focused in the image plane of the eyepiece of the mobile apparatus.
10U is a typical principal ray in the image plane of the eyepiece of the mobile apparatus.
11U is the field lens of the eyepiece of the mobile apparatus.
12U is the eye lens of the eyepiece of the mobile apparatus.
13U is the exit pupil of the eyepiece.
14U is the inside diameter of the threaded housing of the eyepiece.
15U is a cylindrical housing for the eyepiece's physical elements 3U, 11U and 12U.
16U is one of four typical slots disposed around the diameter 5U at ninety degree intervals for shims for tilting 15U relative to 5U, for correcting for any misalignment and centering errors found in the optical system of the optical image source to which the mobile apparatus is attached.
17U is the threaded inside diameter of the eye lens end of the eyepiece housing for mounting optical filters as needed. This location for the filters is chosen because it is in collimated space thereby making dust that might collect on the filters less visible in the final image on the optical sensor array.

The eyepiece 7U enables the observer to use the mobile apparatus on a variety of different types of manufactured optical image sources: that have original equipment eyepieces that are permanently mounted, or that have original equipment eyepieces that can be removed from the optical image sources, or that have no original equipment eyepiece at all. In cases where the optical image sources have a permanently mounted original equipment eyepiece there is no need for the eyepiece 7U so the eyepiece module is unscrewed and removed from the mobile apparatus.

When the optical image sources are manufactured with original equipment eyepieces that are permanently mounted to the optical image sources, then the eyepiece 7U is not used by the observer, and the observer uses the optical image sources with its own original equipment eyepiece. In this case the observer has a choice of the preferred embodiments shown in FIG. 34 thru FIG. 43.

When the optical image sources are manufactured with original equipment eyepieces that can be removed from the optical image sources, then the observer has the choice to use the optical image source with its own original equipment eyepiece, or remove the optical image source's original equipment eyepiece from the optical image source and use the mobile apparatus with the eyepiece shown in FIGS. 17E & 17F. If the observer chooses to uses the optical image source with its own original equipment eyepiece, then the observer has a choice of the preferred embodiments for the mobile apparatus shown in FIG. 34 through FIG. 43.

When the optical image sources are manufactured with no original equipment eyepiece at all, then the observer uses the mobile apparatus with the eyepiece shown in FIGS. 17A & 17B. In this case the observer has a choice of the preferred embodiments shown in FIG. 27 through FIG. 33.

The observer also has a choice of using the preferred embodiments for the mobile apparatus shown in FIG. 34 through FIG. 43 wherein the eyepiece shown in FIGS. 17A & 17B is screwed into the internal thread of 3U at 4U.

The observer can configure and reconfigure the mobile apparatus with the observer's choice of eyepieces with different pre-determined effective focal lengths, apparent fields of view and eye relief. The eye relief is chosen to image the exit pupil of the eyepiece to coincide with the entrance pupil of the zoom lens. This is done to prevent vignetting.

FIGS. 18A and 18B and 18C and 18D and 18E and 18F.

FIG. 18A shows a side view center section of a layout of the end cap module of a preferred embodiment of a mobile apparatus showing a microphone, and a label.

FIG. 18B shows a front view of the layout of the end cap module shown in FIG. 18A.

FIG. 18C shows a rear view of the layout of the end cap module shown in FIG. 18A.

FIG. 18D shows a rear view of the layout of the end cap module.

FIG. 18E shows a front view of the layout of the end cap module of a preferred embodiment of a mobile apparatus showing a microphone, and a label, and a battery charging port, and an USB port.

FIG. 18F shows a side view center section of a layout of the end cap module shown in FIG. 18E.

FIG. 18G shows a rear view of the layout of the end cap module shown in FIG. 18E Screw thread is shown in the figure as an example of a mechanical connecting means for mechanically connecting adjacent modular enclosures.

Screw thread is an example of a mechanical connecting means.

Screw threaded joints are a simple, inexpensive and space saving method especially for connecting enclosures having a cylindrical profile.

Screw thread is given in the present invention as an example of a mechanical connecting means. Other mechanical connecting means are also appropriate.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIG. 18A and FIG. 18B and FIG. 18C and FIG. 18D and FIG. 18E and FIG. 18F and FIG. 18G are identified as follows:

1V is the rear surface of the end cap module.
2V is the threaded screw-on portion of the end cap module.
3V is a microphone and speaker.
4V is a label. The label has "This side is up." markings on its face.
  "Power on/off" markings on its face.
  "battery" markings on its face.
  "speaker/microphone" markings on its face
5V is the thread on the threaded screw-on end cap module.
6V is a heat sink.
7V is a USB port.
8V is a port for charging the battery.
9V power on/off switch.

FIG. 19A and FIG. 19B

FIG. 19A shows a side view center section of a layout of a preferred embodiment of a mobile apparatus, showing the electronic system, and where the mobile apparatus has a zoom lens actuator to operate the zoom lens functions, and where the zoom lens has an iris diaphragm, and where the mobile apparatus has a eyepiece whose housing is threaded, and where the inside diameter of the mobile apparatus' enclosure is threaded to mount the eyepiece, and where there is a screw-on extension of the mobile apparatus' enclosure.

FIG. 19B shows a front view of the layout of the mobile apparatus shown in FIG. 19A.

The mobile apparatus disclosed in FIGS. 19A & 19B is configured for being attached to and compatible with the optical image source shown in FIG. 1 where the imagery from the optical image source is focal imagery. The mobile apparatus is also easily configurable to adapt to the afocal imagery from the optical image source in FIG. 2.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The mobile apparatus shown in FIG. 19 is configured with a eyepiece module 9W, a zoom lens module 42W and a electronic image sensor array camera module 43W, and an electronics circuit module 38W.

The eyepiece module is for optically acquiring and transforming and transferring the focal optical imagery from the optical image source into afocal optical imagery to the zoom lens module.

The zoom lens module is for optically transforming the afocal optical imagery from either the eyepiece module or from the optical image source original equipment eyepiece, into focal optical imagery and for optically transferring the focal imagery to the electronic image sensor array camera module for electronically transforming the focal optical imagery into electronic imagery signals.

Screw thread is shown in the figure as an example of a mechanical connecting means for mechanically connecting adjacent modular enclosures.

Screw thread is an example of a mechanical connecting means.

Screw threaded joints are a simple, inexpensive and space saving method especially for connecting enclosures having a cylindrical profile.

The front ends of the module's 42W and 43W and 38W cylindrical enclosures are under cut and threaded with female threads. The rear ends of the module's cylindrical enclosures are over cut and threaded with male threads. The rear ends of the module's cylindrical enclosures i.e. 42 mates with the front end of the module's cylindrical enclosure 43W in order to connect the two modules together. Screw thread is given in the present invention as an example of a mechanical connecting means. Other mechanical connecting means are also appropriate.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawing shown in FIG. 19A and FIG. 19B are identified as follows:

1W is an electronics that is comprised of a audio amplifier, and a zoom lens actuator servo electronics package.

2W is the battery, and a power control electronics.

3W is the DVR electronics.

4W is the threaded screw-on end cap module of the mobile apparatus. Details of the end cap module are shown in FIGS. 18E & 18F & 18G.

5W is the analog transmitter.

6W is the extension module of the mobile apparatus. The enclosure of 6W is shown joined to 42W at 39W.

7W is a typical marginal rim ray focused in the image plane of a typical eyepiece of a mobile apparatus by a typical optical image source (not shown).

8W is a typical marginal rim ray focused in the image plane of a typical eyepiece of a mobile apparatus by a typical optical image source (not shown).

9W is the threaded housing of the eyepiece module of the mobile apparatus.

The eyepiece module enables the observer to use the mobile apparatus on a variety of optical image sources. For example, optical image sources that have original equipment eyepiece that can be removed from the optical image sources; and optical image sources that have no original equipment eyepiece at all.

In cases where the optical image sources have a permanently mounted original equipment eyepiece there is no need for the eyepiece module so the eyepiece module is easily unscrewed and removed from the front end of the mobile apparatus.

10W is the field lens of the eyepiece of the mobile apparatus.

11W is the WiFi digital transceiver electronics.

12W is the zoom lens actuator.

12W is used by the observer to remotely control the functions of the zoom lens.

The zoom lens functions are magnification control, iris diaphragm control, and focus control.

When actuated by the observer, 12W mechanically rotates 19W to control the magnification of the zoom lens.

When actuated by the observer, 12W mechanically rotates 26W to control the iris diaphragm of the zoom lens.

When actuated by the observer, 12W mechanically rotates 21W to control the focus of the zoom lens.

The observer can still maintain control of the zoom lens by manually rotating the adjustment rings.

13W is the front and first lens of a typical zoom lens optical assembly.

14W is the second lens of the zoom lens optical assembly.

15W is the third lens of the zoom lens optical assembly.

16W is the threaded end of the right cylindrical tubular enclosure of the mobile apparatus.

17W is the front end of the zoom lens housing.

12W is used by the observer to remotely control the functions of the zoom lens.

The zoom lens functions are magnification control, iris diaphragm control, and focus control.

When actuated by the observer, 12W mechanically rotates 19W to control the magnification of the zoom lens.

When actuated by the observer, 12W mechanically rotates 26W to control the iris diaphragm of the zoom lens.

When actuated by the observer, 12W mechanically rotates 21W to control the focus of the zoom lens.

The observer can still maintain manual control of the zoom lens by rotating the adjustment rings by hand.

The observer is enabled to adjust the focus for objects whose distances to the optical image source may be changing during an observing session. The observer can implement the change in focus either manually or electronically, locally or remotely, wirelessly or by hard wire.

18W is the system controller electronics.

19W is the magnification adjustment ring of the zoom lens.

20W is the Internet WIFI transceiver electronics.

21W is the focus adjustment ring of a typical zoom lens.

22W is the eye lens of a typical eyepiece of the mobile apparatus.

23W is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.

The electronic image sensor array camera as shown in the figure is comprised of a cover and an electronic image sensor array and its associated camera electronics. The sensor array, for example is a CCD, CMOS or other sensor array type.

24W is the field stop of the eyepiece of the mobile apparatus.

If the optical image source already is configured with a field stop, then 24W is unnecessary and will be unscrewed and removed from 9W, and the optical image source's field stop will be used instead.

25W is a typical principal ray in the image plane of the eyepiece of the mobile apparatus.

26W is the iris diaphragm adjustment ring of a typical zoom lens.

27W is the DVR storage memory device.

28W is the analog transmitter's RF antenna.

29W is the WiFi digital transceiver's WiFi antenna.

30W is the image sensor array.

31W is the Internet WIFI transceiver's antenna.

32W is a typical zoom lens iris diaphragm.

33W is the threaded portion of the housing of the eyepiece of the mobile apparatus.

34W is the enclosure of the extension module of the mobile apparatus.

35W is the USB port.

36W is the power on/off switch.

37W is the fourth and last lens of a typical zoom lens optical assembly.

38W is the modular enclosure for the electronics circuit module which is comprised of 1W, 2W, 3W, 5W, 11W, 18W, 20W, 35W, 36W and 27W. 38W is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities to match the challenges encountered during an observing session by the observer. Each one of the electronic circuits modules enables the observer to exercise different capabilities during an observing session. The observer may choose to use an electronic circuits module which uses any one of the circuits described above in the figures in the mobile apparatus by simply loading the module containing the circuit into the mobile apparatus.

39W is the threaded end of the extension module 6W to the mobile apparatus.

40W is the threaded joint between 42W and 43W.

41W is the threaded joint between 43W and 38W.

42W is the modular enclosure for the zoom lens module.

43W is the modular enclosure for the image sensor array camera module.

44W is a set screw and knurled handgrip on 6W for locking the mobile apparatus to the optical image source. 6W is comprised of 44W.

Refer to FIG. 1 as a reference for the optical image source.

Substitution of eyepieces, zoom lenses, image sensor arrays or electronics circuits with other eyepieces, zoom lenses, image sensor arrays, or electronics circuits to better match the job, match the environment, match the object, and match the audience, etc. can be accomplished by disassembly of the mobile apparatus into its respective modules and substituting more appropriate modules in their place. The eyepiece module 9W optically acquires the optical image source's focal image of the object at 24W and optically transforms the focal image into a afocal image and optically transfers the afocal image to the zoom lens module 42W which optically transforms the afocal image into a focal image at 30W of 43W. The electronic image sensor array camera module 43W electronically transforms the focal image at 30W into electronic imagery signals, and the electronic circuits module 38W electronically transforms and transmits the electronic imagery signals from the output terminals of 38W and 4W to the observer and the observer's audience. The electronic imagery signals meet analog and/or digital protocols depending on the type of analog or digital electronics used by the observer in the electronic sensor array camera module 43W and the electronic circuits module 38W.

FIG. 20A and FIG. 20B

FIG. 20A shows a side view center section of a layout of a preferred embodiment of a mobile apparatus, showing the electronic system, and where the mobile apparatus has a zoom lens actuator to operate the zoom lens functions, and where the zoom lens has an iris diaphragm, and where the mobile apparatus has a eyepiece whose housing is threaded, and where the inside diameter of the mobile apparatus' enclosure is threaded to mount the eyepiece module, and where there is a screw-on front end of the mobile apparatus' enclosure, and where there is a set screw built into the front end of the mobile apparatus enclosure to enable the mobile apparatus to be attached to the barrels of the optical image sources.

FIG. 20B shows a front view of the layout of the mobile apparatus shown in FIG. 20A.

The mobile apparatus disclosed in FIGS. 20A & 20B is configured for being attached to and compatible with the optical image source shown in FIG. 1 where the imagery from the optical image source is focal imagery. The mobile apparatus is also easily configurable to adapt to the afocal imagery from the optical image source in FIG. 2.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The mobile apparatus shown in FIG. 20 is configured with a eyepiece module 9X, a zoom lens module 42X and a electronic image sensor array camera module 43X, and an electronics circuit module 38X.

The eyepiece module is for optically acquiring and transforming and transferring the focal optical imagery from the optical image source into afocal optical imagery to the zoom lens module.

The zoom lens module is for optically transforming the afocal optical imagery from either the eyepiece module or from the optical image source's original equipment eyepiece, into focal optical imagery and for optically transferring the focal imagery to the electronic image sensor array camera module for electronically transforming the focal optical imagery into electronic imagery signals.

Screw thread is shown in the figure as an example of a mechanical connecting means for mechanically connecting adjacent modular enclosures.

Screw thread is an example of a mechanical connecting means.

Screw threaded joints are a simple, inexpensive and space saving method especially for connecting enclosures having a cylindrical profile.

The front ends of the module's 42X and 43X and 38X cylindrical enclosures are under cut and threaded with female threads. The rear ends of the module's cylindrical enclosures are over cut and threaded with male threads. The rear ends of the module's cylindrical enclosures i.e. 42X mates with the front end of the module's cylindrical enclosure 43X in order to connect the two modules together.

Screw thread is given in the present invention as an example of a mechanical connecting means. Other mechanical connecting means are also appropriate i.e. snap-fit connections.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawing shown in FIG. 20A and FIG. 20B are identified as follows:
1X is an electronics that is comprised of a audio amplifier, and a zoom lens actuator servo electronics package.
2X is the battery, and a power control electronics.
3X is the DVR electronics.
4X is the threaded screw-on end cap module of the mobile apparatus' enclosure. Details of the end cap are shown in FIGS. 18E & 18F & 18G.
5X is the analog transmitter.
6X is the extension module of the mobile apparatus. 6X is shown joined to 42X at 39X.
7X is a typical marginal rim ray focused in the image plane of a typical eyepiece of a mobile apparatus by a typical optical image source (not shown).
8X is a typical marginal rim ray focused in the image plane of a typical eyepiece of a mobile apparatus by a typical optical image source (not shown).
9X is the threaded housing of the eyepiece module of the mobile apparatus.
  The eyepiece module enables the observer to use the mobile apparatus on a variety of optical image sources.
  For example, optical image sources that have original equipment eyepiece that can be removed from the optical image sources; optical image sources that have no original equipment eyepiece at all. In cases where the optical image sources has a permanently mounted original equipment eyepiece there is no need for the eyepiece module so the eyepiece module is easily unscrewed and removed from the front end of the mobile apparatus.
10X is the field lens of the eyepiece module of the mobile apparatus.
11X is the WiFi digital transceiver electronics.
12X is the zoom lens actuator.
  12X is used by the observer to remotely control the functions of the zoom lens.
  The zoom lens functions are magnification control, iris diaphragm control, and focus control.
  When actuated by the observer, 12X mechanically rotates 19X to control the magnification of the zoom lens.
  When actuated by the observer, 12X mechanically rotates 26X to control the iris diaphragm of the zoom lens.
  When actuated by the observer, 12X mechanically rotates 21X to control the focus of the zoom lens.
  The observer can still maintain control of the zoom lens by manually rotating the adjustment rings.
13X is the front and first lens of a typical zoom lens optical assembly.
14X is the second lens of the zoom lens optical assembly.
15X is the third lens of the zoom lens optical assembly.
16X is the threaded end of the right cylindrical tubular enclosure of the mobile apparatus.
17X is the front end of the zoom lens housing.
  12X is used by the observer to remotely control the functions of the zoom lens.
  The zoom lens functions are magnification control, iris diaphragm control, and focus control.
  When actuated by the observer, 12X mechanically rotates 19X to control the magnification of the zoom lens.
  When actuated by the observer, 12X mechanically rotates 26X to control the iris diaphragm of the zoom lens.
  When actuated by the observer, 12X mechanically rotates 21X to control the focus of the zoom lens.
  The observer can still maintain manual control of the zoom lens by rotating the adjustment rings by hand.
  The observer is enabled to adjust the focus for objects whose distances to the optical image source may be changing during an observing session. The observer can implement the change in focus either manually or electronically, locally or remotely, wirelessly or by hard wire.
18X is the system controller electronics.
19X is the magnification adjustment ring of the zoom lens.
20X is the Internet WIFI transceiver electronics.
21X is the focus adjustment ring of a typical zoom lens.
22X is the eye lens of a typical eyepiece of the mobile apparatus.
23X is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.
  The electronic image sensor array camera as shown in the figure is comprised of a cover and an electronic image sensor array and its associated camera electronics. The sensor array, for example is a CCD, CMOS or other sensor array type.

24X is the field stop of the eyepiece of the mobile apparatus. If the optical image source already is configured with a field stop, then 24X is unnecessary and will be unscrewed and removed from 9X, and the optical image source's field stop will be used instead.

25X is a typical principal ray in the image plane of the eyepiece of the mobile apparatus.

26X is the iris diaphragm adjustment ring of a typical zoom lens.

27X is the DVR storage memory device.

28X is the analog transmitter's RF antenna.

29X is the WiFi digital transceiver's WiFi antenna.

30X is the image sensor array.

31X is the Internet WIFI transceiver's antenna.

32X is a typical zoom lens iris diaphragm.

33X is the threaded portion of the housing of the eyepiece of the mobile apparatus.

34X is the threaded inside diameter of the enclosure of the mobile apparatus.

35X is the USB port.

36X is the power on/off switch.

37X is the fourth and last lens of a typical zoom lens optical assembly.

38X is the modular enclosure for the electronics circuit module which is comprised of 1X, 2X, 3X, 5X, 11X, 18X, 20X and 27X. 38X is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities to match the challenges encountered during an observing session by the observer. Each one of the electronic circuits modules enables the observer to exercise different capabilities during an observing session. The observer may choose to use an electronic circuits module which uses any one of the circuits described above in the figures in the mobile apparatus by simply loading the module containing the circuit into the mobile apparatus.

39X is the threaded joint between the enclosures of the extension module 6X and the zoom lens module 42X.

40X is the threaded joint between 43X and 38X.

41X is the threaded joint between 42X and 43X.

42X is the zoom lens module.

43X is the modular enclosure for the image sensor array camera module.

44X is a set screw and knurled handgrip for locking the mobile apparatus to the optical image source.

Refer to FIG. 1 as a reference for the optical image source.

Substitution of eyepieces, zoom lenses, image sensor arrays or electronics circuits with other eyepieces, zoom lenses, image sensor arrays, or electronics circuits to better match the job, match the environment, match the object, and match the audience, etc. can be accomplished by disassembly of the mobile apparatus into its respective modules and substituting more appropriate modules in their place. The eyepiece module 9X optically acquires the optical image source's focal image of the object at 24X and optically transforms the focal image into a afocal image and optically transfers the afocal image to the zoom lens module 42X which optically transforms the afocal image into a focal image at 30X of 43X. The electronic image sensor array camera module 43X electronically transforms the focal image at 30X into electronic imagery signals, and the electronic circuits module 38X electronically transforms and transmits the electronic imagery signals from the output terminals of 38X and 4X to the observer and the observer's audience. The electronic imagery signals meet analog and/or digital protocols depending on the type of analog or digital electronics used by the observer in the electronic sensor array camera module 43X and the electronics module 38X.

FIG. 21A and FIG. 21B

FIG. 21A shows a side view center section of a layout of a preferred embodiment of a mobile apparatus, showing the electronic systems, and where the mobile apparatus has a zoom lens actuator to operate the zoom lens functions, and where the zoom lens has an iris diaphragm, and where there is a screw-on front end clamping mechanism module of the mobile apparatus, and where there is a compression fitting clamping mechanism built into the front end of the clamping mechanism module of the mobile apparatus for enabling the mobile apparatus to be attached to the barrels of the optical image sources.

FIG. 21B shows a front view of the layout of the mobile apparatus shown in FIG. 20A.

The mobile apparatus disclosed in FIGS. 21A & 21B is configured for being attached to and compatible with the optical image source shown in FIG. 2.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The mobile apparatus shown in FIG. 21 is configured with a zoom lens module 42Y and a electronic image sensor array camera module 43Y, and an electronics circuit module 38Y.

The zoom lens module is for optically acquiring and transforming the afocal optical imagery from the optical image source, see FIG. 2, into focal optical imagery and for optically transferring the focal imagery to the electronic image sensor array camera module for electronically transforming the focal optical imagery into electronic imagery signals.

Screw thread is shown in the figure as an example of a mechanical connecting means for mechanically connecting adjacent modular enclosures. Screw thread is an example of a mechanical connecting means.

Screw threaded joints are a simple, inexpensive and space saving method especially for connecting enclosures having a cylindrical profile. The front ends of the module's 42Y and 43Y and 38Y cylindrical enclosures are under cut and threaded with female threads. The rear ends of the module's cylindrical enclosures are over cut and threaded with male threads. The rear ends of the module's cylindrical enclosures i.e. 42Y mates with the front end of the module's cylindrical enclosure 43Y in order to connect the two modules together.

Screw thread is given in the present invention as an example of a mechanical connecting means. Other mechanical connecting means are also appropriate.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawing shown in FIG. 21A and FIG. 21B are identified as follows:

1Y is an electronics that is comprised of a audio amplifier, and a zoom lens actuator servo electronics package.

2Y is the battery, and a power control electronics.

3Y is the DVR electronics.

4Y is the threaded screw-on end cap module of the mobile apparatus' enclosure. Details of the end cap module are shown in FIGS. 18E & 18F & 18G.

5Y is the analog transmitter.

6Y is the clamping mechanism module showing its enclosure joined at 37Y with 42Y.

7Y is optical and mechanical axis of the mobile apparatus.

8Y is not shown.

9Y is a jaw of the compression fitting clamping mechanism built into the front end of the clamping mechanism module of the mobile apparatus for enabling the mobile apparatus to be attached to the barrels of the optical image sources.

10Y is the inside diameter of the front end of the screw-on clamping mechanism module of the mobile apparatus.

11Y is the WiFi digital transceiver electronics.

12Y is the zoom lens actuator.

12Y is used by the observer to remotely control the functions of the zoom lens.

The zoom lens functions are magnification control, iris diaphragm control, and focus control. When actuated by the observer, 12Y mechanically rotates 19Y to control the magnification of the zoom lens. When actuated by the observer, 12Y mechanically rotates 26Y to control the iris diaphragm of the zoom lens. When actuated by the observer, 12Y mechanically rotates 21Y to control the focus of the zoom lens. The observer can still maintain control of the zoom lens by manually rotating the adjustment rings.

13Y is the front and first lens of a typical zoom lens optical assembly.

14Y is the second lens of the zoom lens optical assembly.

15Y is the third lens of the zoom lens optical assembly.

16Y is the threaded end of the right cylindrical tubular enclosure of the mobile apparatus.

17Y is the front end of the zoom lens housing. 12Y is used by the observer to remotely control the functions of the zoom lens. The zoom lens functions are magnification control, iris diaphragm control, and focus control.

When actuated by the observer, 12Y mechanically rotates 19Y to control the magnification of the zoom lens.

When actuated by the observer, 12Y mechanically rotates 26Y to control the iris diaphragm of the zoom lens.

When actuated by the observer, 12Y mechanically rotates 21Y to control the focus of the zoom lens.

The observer can still maintain manual control of the zoom lens by rotating the adjustment rings by hand.

The observer is enabled to adjust the focus for objects whose distances to the optical image source may be changing during an observing session. The observer can implement the change in focus either manually or electronically, locally or remotely, wirelessly or by hard wire.

18Y is the system controller electronics.

19Y is the magnification adjustment ring of the zoom lens.

20Y is the Internet WIFI transceiver electronics.

21Y is the focus adjustment ring of a typical zoom lens.

22Y is the fourth and last lens of a typical zoom lens optical assembly.

23Y is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.

The electronic image sensor array camera as shown in the figure is comprised of a cover and an electronic image sensor array and its associated camera electronics. The sensor array, for example is a CCD, CMOS or other sensor array type.

24Y is the x-axis of the clamping mechanism built into the front end of the clamping mechanism module of the mobile apparatus for enabling the mobile apparatus to be attached to the barrel enclosure housings of the optical image sources.

25Y is the y-axis of the clamping mechanism built into the front end of the clamping mechanism module of the mobile apparatus for enabling the mobile apparatus to be attached to the barrels of the optical image sources.

26Y is the iris diaphragm adjustment ring of the typical zoom lens.

27Y is the DVR storage memory device.

28Y is the analog transmitter's RF antenna.

29Y is the WiFi digital transceiver's WiFi antenna.

30Y is the image sensor array and its associated camera electronics.

31Y is the Internet WIFI transceiver's antenna.

32Y is a typical zoom lens iris diaphragm.

33Y is the threaded portion of the housing of the eyepiece of the mobile apparatus.

34Y is the threaded inside diameter of the enclosure of the mobile apparatus.

35Y is the USB port.

36Y is the power on/off switch.

37Y is the threaded joint between 6Y and 42Y.

38Y is the modular enclosure for the electronics circuit module which is comprised of 1Y, 2Y, 3Y, 5Y, 11Y, 18Y, 20Y and 27Y.

41Y is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities to match the challenges encountered during an observing session by the observer.

Each one of the electronic circuits modules enables the observer to exercise different capabilities during an observing session. The observer may choose to use an electronic circuits module which uses any one of the circuits described above in the figures in the mobile apparatus by simply loading the module containing the circuit into the mobile apparatus.

39Y is a jaw of the compression fitting clamping mechanism built into the front end of the clamping mechanism module of the mobile apparatus for enabling the mobile apparatus to be attached to the barrels of the optical image sources.

40Y is a jaw of the compression fitting clamping mechanism built into the front end of the clamping mechanism module of the mobile apparatus for enabling the mobile apparatus to be attached to the barrels of the optical image sources.

41Y is a jaw of the compression fitting clamping mechanism built into the front end of the clamping mechanism module of the mobile apparatus for enabling the mobile apparatus to be attached to the barrels of the optical image sources.

42Y is the modular enclosure for the zoom lens module.

43Y is the modular enclosure for the image sensor array camera module.

44Y is the threaded joint between 42Y and 43Y.

45Y is the threaded joint between 43Y and 38Y.

46Y is the compression fitting clamping mechanism built into the front end of the clamping mechanism module of the mobile apparatus for enabling the mobile apparatus to be attached to the barrels of the optical image sources.

Refer to FIG. 2 as a reference for the optical image source.

Substitution of zoom lenses, image sensor arrays or electronics circuits with other zoom lenses, image sensor arrays, or electronics circuits to better match the job, match the environment, match the object, and match the audience, etc. can be accomplished by disassembly of the mobile apparatus into its respective modules and substituting more appropriate modules in their place. The zoom lens module 42Y optically acquires and transforms the afocal image from the optical image source into a focal image at 30Y of 43Y.

The electronic image sensor array camera module 43Y electronically transforms the focal image at 30Y into electronic imagery signals, and the electronics circuits module 38Y electronically transforms and transmits the electronic imagery signals from the output terminals of 38Y and 4Y to the observer and the observer's audience. The electronic imagery signals meet analog and/or digital protocols depending on the type of analog or digital electronics used by the observer in the electronic sensor array camera module 43Y and the electronic circuits module 38Y.

FIG. 22A and FIG. 22B and FIG. 23A and FIG. 23B and FIG. 24 and FIG. 25 and FIG. 26A and FIG. 26B FIG. 22A shows a side view center section of a layout of a preferred embodiment of the mobile apparatus' clamping mechanism.

FIG. 22B shows a front end view center section of the layout of a preferred embodiment of the mobile apparatus' clamping mechanism shown in FIG. 22A showing the four driven traveling blocks in their four radial slotted raceways.

FIG. 23A shows an isometric side view of a layout of a preferred embodiment of the mobile apparatus' clamping mechanism shown in FIG. 22A and FIG. 22B showing the keyway and the two right cylindrical traveling pressure blocks and the four driven traveling blocks.

FIG. 23B shows an isometric side view of a layout of a preferred embodiment of the mobile apparatus' clamping mechanism shown in FIG. 23A showing the keyway and the two right cylindrical traveling pressure blocks and the driven traveling blocks and the threaded shank fastener and a trolley.

FIG. 24 shows an isometric side view layout of a preferred embodiment of the mobile apparatus' clamping mechanism showing the keyway and the two right cylindrical traveling pressure blocks.

FIG. 25 shows an isometric side view layout of a preferred embodiment of the mobile apparatus' clamping mechanism showing a typical trolley.

FIG. 26A shows a side view section of a layout of a preferred embodiment of the mobile apparatus' clamping mechanism showing the exterior mobile apparatus' extension enclosure.

FIG. 26B shows a front center section view of the layout of a preferred embodiment of the mobile apparatus' clamping mechanism in FIG. 26A showing the interior right cylinder.

Mobile apparatuses configured with the clamping mechanism disclosed in FIG. 22A and FIG. 22B and FIG. 23A and FIG. 23B and FIG. 24 and FIG. 25 and FIG. 26A and FIG. 26B enable the mobile apparatus to attach and lock itself to the optical image sources shown in FIG. 1 and FIG. 2 with precise centering and alignment, in a quick and reliable manner with just a twist of the wrist of the observer. The clamping mechanism is an important part of the mobile apparatus and its design has been invented specifically to solve the many problems typically encountered by observers during the setup, operation and breakdown of the equipment before, during and after an observer's observing session.

Screw thread is shown in the figure as an example of a mechanical connecting means for mechanically connecting adjacent modular enclosures. Screw thread is an example of a mechanical connecting means. Screw threaded joints are a simple, inexpensive and space saving method especially for connecting enclosures having a cylindrical profile. Screw thread is given in the present invention as an example of a mechanical connecting means.

Other mechanical connecting means are also appropriate.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIG. 22A and FIG. 22B and FIG. 23A and FIG. 23B and FIG. 24 and FIG. 25 and FIG. 26A and FIG. 26B are identified as follows:

A total of four trolleys comprise the clamping mechanism FIG. 22A only shows three of the trolleys in the view. The fourth trolley is hidden behind the third trolley. The clamping mechanism has a total of eight jaws. There are two jaws on each trolley. The jaws are vee shaped for capturing, constraining, centering, aligning, griping and locking the mobile apparatus onto the barrel enclosure or the original equipment eyepiece. The vee shaped conical roller bearing jaws capture the barrel enclosure or the original equipment eyepiece between its vee shaped surfaces. This offers stability in case the mobile apparatus is bumped accidentally during an observing session. The jaws of each of the four trolleys are synchronous. They open and close together at the same rate and with the same acceleration on the barrel enclosure or the original equipment eyepiece as the observer turns the knurled hand grip. The jaws operate precisely and accurately and open and close synchronously in a predetermined manner with one another as the observer turns the knurled handle.

Physical elements 3Z, 5Z, 6Z, 9Z, 35Z and 72Z that comprise a first trolley are shown together in the drawings.

Physical elements 13Z, 14Z, 15Z, 16Z, 31Z, 34Z, 39Z, 50Z, 76Z, and 77Z that comprise a second trolley are shown together in the drawings. Physical elements 7Z, 8Z, 46Z, 47Z, 48Z, 49Z, and 51Z, 58Z, 59Z, 71Z that comprise a third trolley are shown together in the drawings.

1Z is the rear end, i.e. image end, of a typical optical image source. The rear end may be the rear end of the barrel, or the rear end of a original equipment eyepiece.

2Z is the optical and mechanical axis of a typical barrel or original equipment eyepiece of a optical image source.

3Z is a typical conical roller pressure bearing jaw for aligning and centering the mobile apparatus.
   3Z is shaped in the form of a "V" to grip and hold the optical image source thereby moving the mobile apparatus on the optical image source to align and center itself.

4Z x-axis of conical roller pressure bearing jaw 3Z.

5Z is one of eight typical tension springs connected in pairs between 10Z and each of four conical roller pressure bearing jaw mounting support plates.

6Z is a typical threaded shank fastener. The shank is in the form of a narrow cylinder. The shank connects each one of the four mounting support plates to its respective driven traveling block. The shanks push and pull on the mounting support plates as the observer turns the knurled cylinder handle to open and close the jaws.

7Z is the rotation axis of the conical roller pressure bearing jaw 46Z.

8Z is the beveled end of typical conical roller pressure bearing jaw 51Z.

9Z is a typical conical roller pressure bearing jaw.

10Z is the inside diameter of an interior right cylinder of the clamping mechanism of the mobile apparatus. The interior right cylinder is stationary. The interior right cylinder is threaded with two kinds of thread i.e. a right handed thread left of center facing the front end of the clamping mechanism, and a left handed thread right of center facing the rear end of the clamping mechanism.

11Z is the y-axis of conical roller pressure bearing jaw 14Z.

12Z is the x-axis of conical roller pressure bearing jaw 14Z.

13Z is a typical threaded shank-like fastener.

14Z is a typical alignment and centering conical roller pressure bearing jaw. The conical rollers are made from a non-mar material such as plastic so as not to spoil or damage the surface of the barrel or the original equipment eyepiece of the optical image source that the mobile apparatus is clamped to.

15Z is the beveled end of typical alignment and centering conical roller pressure bearing jaw.

16Z is a typical threaded shank-like fastener.

17Z is the x-axis of conical roller pressure bearing jaw 15Z.

18Z is the outside diameter of the barrel of the optical image source shown in FIG. 1A and FIG. 2. 18Z can also be the outside diameter of the original equipment eyepiece of the optical image source shown in FIG. 2.

19Z is the y-axis of conical roller pressure bearing jaw 15Z.

20Z is the outside diameter of the interior cylinder of the clamping mechanism to the mobile apparatus.

21Z is the threaded rear end of the interior cylinder of the clamping mechanism to the mobile apparatus.

22Z is the threaded outside diameter of the interior cylinder of the clamping mechanism to the mobile apparatus.

23Z is the front end limit of the right hand threaded outside diameter of the interior cylinder of the clamping mechanism of the mobile apparatus for traveling pressure block 41Z.

24Z is one of four longitudinal radial slotted raceway's in 10Z where each one retains and guides one of four single driven traveling blocks.

25Z is the rear retainer of knurled exterior cylinder 33Z. 25Z and 26Z capture 33Z and prevent its motion along the x-axis.

26Z is the front retainer of knurled exterior cylinder 33Z.

27Z is the longitudinal keyway belonging to 30Z that is parallel to mechanical axis 2Z.

28Z is the x-axis of conical roller pressure bearing jaw 9Z.

29Z is one of four longitudinal radial slots in 10Z where each one retains and guides a single driven traveling block.
   The four longitudinal radial slotted raceways are lubricated for example with a lite grease to reduce friction and furnish a sliding fit for each of the four driven traveling blocks. The four longitudinal slots are configured in 10Z at ninety degree intervals around the mechanical axis 2Z.

30Z is the knurled hand grip of 33Z.

31Z is the threaded portion of the tapped hole within 34Z for fastener 13Z.

32Z is the outside threaded portion of the interior cylinder of the mobile apparatus' enclosure's front end extension.

33Z is the knurled cylindrical portion of the exterior mobile apparatus' extension clamping device enclosure 52Z.

34Z is one of four typical driven traveling blocks where each is guided within one of four radial longitudinal slotted raceway's within 10Z. Each of the four typical driven traveling blocks is captured and squeezed between 34Z and 43Z and forced to move in their respective slots in a direction perpendicular to the mechanical and optical axis of 1Z because of the angular cut of their contact surfaces. Each of the four radial longitudinal slotted raceway's is configured radially at ninety degree intervals around 2Z. The width of each of the longitudinal slotted raceway's enables there to be a sliding fit with each of the driven traveling blocks. The four driven traveling blocks move together synchronously, thereby causing the four jaws to open and close synchronously.

35Z is one of four typical driven traveling blocks where each is guided within one of four longitudinal slots within 10Z.

36Z is one of four typical driven traveling blocks where each is guided within one of four longitudinal slotted raceway's within 10Z.

37Z is the right hand thread 40Z on 41Z and the left hand thread 42Z on 43Z or visa versa.

38Z is a rear end limit stop for longitudinal radial slotted raceway's 73Z within 10Z.

39Z is one of eight typical tension springs connected in pairs between 10Z and each of the four conical roller pressure bearing jaw's mounting support plates of the four trolleys.

40Z is the threaded portion of the inside diameter of 41Z.

41Z is one of two right cylindrical traveling pressure blocks that rides on the longitudinal keyway 27Z of 30Z like a polished slick angled block which is lubricated to enable there to be a sliding fit between the two right cylindrical traveling pressure blocks and the four driven traveling blocks.

42Z is the threaded portion of the inside diameter of 24Z.

43Z is the right cylindrical traveling pressure block that rides on the longitudinal keyway 27Z of 30Z. Each of the two right cylindrical traveling pressure blocks has a conical 45 degree pressure surface facing and pressing upon the four captured driven traveling blocks. The 45 degree pressure surfaces on each end of the four driven traveling blocks is conical also to match the conical 45 degree pressure surfaces on the two right cylindrical traveling pressure blocks.

44Z is one of eight typical tension springs connected in pairs between 10Z and each the four conical roller pressure bearing jaw mounting support plates.

45Z is the beveled end of typical alignment and centering conical roller pressure bearing jaw.

46Z is a typical alignment and centering conical roller pressure bearing jaw.

47Z is the beveled end of typical alignment and centering conical roller pressure bearing jaw.

48Z is the rotation axel of conical roller pressure bearing jaw 46Z.

49Z is a typical conical roller pressure bearing jaw mounting support plate.

50Z is a typical conical roller pressure bearing jaw mounting support plate for the trolley comprised of 14Z, 15Z, and 50Z.

51Z is a typical alignment and centering conical roller bearing jaw.

52Z is the rear end of the exterior mobile apparatus' extension enclosure 33Z.

53Z is the rear end limit of the outside left hand threaded portion of the interior cylinder of the mobile apparatus enclosure extension 10Z.

54Z is the front end limit of the outside left hand threaded portion of the interior cylinder of the mobile apparatus enclosure extension for 24Z.

55Z is the rear end limit of the outside right hand threaded portion of the interior cylinder of the mobile apparatus enclosure extension for 41Z.

56Z is a front end limit stop for longitudinal slotted raceway 73Z within 10Z.

57Z is the outside diameter of 26Z and 25Z.

58Z is one of eight typical tension springs connected in pairs between 10Z and each of the four conical roller bearing jaw mounting support plates. The tension springs pre-load each jaw. The tension springs impart a radial force on each jaw away from the mechanical axis. The tension springs keep the jaws from being loose. The tension springs impart a force on the jaws equal and opposite to the inward force imparted to the jaws by the four driven traveling blocks via the four threaded shank fasteners. This is one of many important aspects of the operation of the mechanism.

59Z is a typical threaded shank fastener.

60Z is the barrel or the original equipment eyepiece housing of the typical optical imaging source.

61Z is the x-axis and y-axis of the typical optical imaging source barrel or the original equipment eyepiece housing.

62Z is a rear end limit stop for longitudinal slotted raceway 29Z within 10Z.

63Z is a front end limit stop for longitudinal slotted raceway 29Z within 10Z.

64Z is one of four typical driven traveling blocks where each driven traveling block is guided within one of four longitudinal slotted raceways within 10Z.

65Z is a gap between 31Z and 43Z.

66Z is a typical threaded shank-like fastener.

67Z is the 45 degree pressure angle on the end of right cylindrical traveling pressure block 41Z.

68Z is the 45 degree pressure angle on the end of right cylindrical traveling pressure block 43Z.

69Z is the 45 degree pressure angle on the front end of driven traveling block 35Z.

70Z is the 45 degree pressure angle on the rear end of driven traveling block 35Z.

71Z is one of four prongs on 49Z for mounting the two conical roller pressure bearing rotation axels.

72Z is a typical one of four conical roller pressure bearing jaw mounting support plates.

73Z is one of four radial longitudinal radial slots in 10Z.

74Z is one of four radial longitudinal radial slots in 10Z.

75Z is the inside diameter of 33Z.

76Z is the 45 degree pressure angle on the front end of driven traveling block 34Z.

77Z is the 45 degree pressure angle on the rear end of driven traveling block 34Z.

78Z is a tension spring.

Refer to either FIG. 1 or FIG. 2 as references for the optical image source, since both apply here.

The following is a short summary.

There are four slotted raceways. The raceways are configured at ninety degree intervals around the mechanical axis . . . .

The raceway slots have parallel walls. The centerlines of the raceways are radial with respect to the mechanical axis of the apparatus. The raceway walls are also configured parallel to the mechanical axis of the apparatus.

There are four driven traveling blocks. There is one driven traveling block in each raceway. Each driven traveling block slides within the parallel walls of its slotted raceway. The four slotted raceway's are for guiding the four driven traveling blocks. Each driven traveling block slides within the parallel walls of its respective slotted raceway with two degrees of freedom.

The first degree of freedom is in the radial direction with respect to the mechanical axis, thereby permitting each driven traveling block to slide toward or away from the mechanical axis. The clamping mechanism is configured so that each of the four driven traveling blocks is always the same redial distance from the mechanical axis. This insures that the optical image source barrel or original equipment eyepiece being clamped to is symmetrically precision gripped by the four jaws of the clamping mechanism. The second degree of freedom is in a direction parallel to the mechanical axis.

Each of the four driven traveling blocks is loaded in a radial direction away from the mechanical axis by the tension springs. The four pairs of conical cylindrical roller bearings are jaws which are each configured at 90 degree intervals surrounding the optical image source. The four pairs of conical cylindrical roller bearing jaws center and axially align, and position, and clutch the optical image source, to mount and attach the mobile apparatus thereto. The clamping mechanism module is self locking.

The clamping mechanism module is enclosed in a knurled exterior cylinder 33Z, and is configured with a clamping mechanism. The clamping mechanism enables the clamping mechanism module to clamp onto the outside diameter of many kinds and types of optical image source's barrels as well as original equipment eyepieces. The clamping mechanism makes the mobile apparatus universal. The clamping mechanism can be adjusted, by the observer, to clamp onto a whole range of different barrel and original equipment eyepiece profiles and outside diameters.

The clamping mechanism module is quickly and easily fastened to the front end of the body of the mobile apparatus, by screwing it on to the front end of the mobile apparatus' body using the mating threads supplied on each. The clamping mechanism module has a threaded inside diameter at its rear end, enabling it to engage and thread onto the front end of the outside diameter of the body of the mobile apparatus. The rear end of the clamping mechanism module's inside diameter is threaded. The front end of the body of the mobile apparatus' outside diameter is threaded. These mating threads enable the clamping mechanism module to be screwed to the front end of the mobile apparatus. When screwed together, the long mechanical axis of the clamping mechanism module coincides with the optical and mechanical axis of the body of the mobile apparatus.

The observer can easily and quickly connect the clamping mechanism module to the mobile apparatus. When an observer wishes to capture images from an optical image source, the observer can do so by first screwing the clamping mechanism module onto the front end of the mobile apparatus thereby allowing the mobile apparatus to accommodate and attach itself to the outside diameter of the barrel or to the outside diameter of the permanently mounted original equipment eyepiece of the optical image source if the optical image source has one. The front end of the knurled exterior cylinder of the clamping mechanism module is open, thereby enabling the clamping mechanism within the clamping mechanism module to slip over and onto the optical image source's barrel.

The clamping mechanism module employs a unique clamping mechanism that is self aligning and self centering, and will not damage the barrels that it is clamped to. Each of the eight conical roller pressure bearings jaws are fabricated with materials like hard rubber, synthetic plastics, etc. which will conform lightly under pressure to the form of the barrel's profile, but will not scratch or damage the barrel housing enclosure.

In a preferred embodiment, the clamping mechanism module has four jaw sets that press on, capture and grip the barrel or original equipment eyepiece between them. See FIGS. 22 through 26. Each of the four clamping jaw sets is comprised of a pair of conical roller pressure bearing jaws i.e. 46Z and 51Z for example, mounted on one of four mounting support plates i.e. 49Z for example. Each of the four mounting support plates and their conical roller pressure bearing jaw sets each comprise a trolley. There are four trolleys. Each of the four trolleys has two "V shaped" wheels or bearing jaws. The "V shaped" wheels act as jaws to press on and grip the optical image source thereby positioning and attaching the mobile apparatus to the optical image source.

Each conical roller pressure bearing jaw configuration i.e. 46Z for example, is formed by attaching or butting two equal cones together into a symmetrical form along their common axis of symmetry. The intersection of the cones is configured and aligned parallel along the mechanical and optical axis of the clamping mechanism module and the mobile apparatus. This configuration enables the mobile apparatus to center and align itself on the barrel or original equipment eyepiece's mechanical axis. The inventors note that we could have used three clamping jaws instead of four. The inventors chose to use four jaws in the preferred embodiment to more stably and more securely handle and control and position the mobile apparatus, especially in the case where the mobile apparatus is accidentally bumped into while it is attached to the optical image source. Misalignment of the mobile apparatus and damage to the optical image source is minimized using four jaw sets rather than three jaw sets because the force of each one of the four jaw sets is less than the force that would be imparted by three jaw sets by a factor of four to three.

The clamping mechanism which is located inside the clamping mechanism module can be easily actuated by the observer by simply manually gripping the knurled front end 30Z of 33Z of the clamping mechanism module and manually turning it about its long mechanical axis 2Z either clockwise or counter clockwise.

In a preferred embodiment, the clamping mechanism has four sets of clamping jaws. Each clamping jaw is comprised of a pair of conical roller pressure bearing jaws, i.e. 46Z and 51Z for example. Each pair of conical roller pressure bearing jaws is mounted on one of four mounting support plates, i.e. 49Z for example. Each of the four clamping jaw sets is deployed at ninety degree intervals around the clamping mechanism module mechanical axis 2Z. The clamping mechanism is self aligning and self centering on the barrel and the original equipment eyepiece of the optical image source. The mechanical axis 2Z is coincident with the optical and mechanical axis of the body of the mobile apparatus, and with the optical and mechanical axis of the optical image source.

The observer can vary and adjust the clamping mechanism's clamping jaws' diameter to accommodate and grip a wide range of barrel and original equipment eyepiece outside diameters and profiles. Turning the knurled front end 30Z of the clamping mechanism module clockwise enables the four conical cylindrical roller bearing jaw sets of the clamping mechanism to close proportionately to grip onto barrels and original equipment eyepieces having smaller outside diameters. Turning the knurled front end 30Z of the clamping mechanism module counter-clockwise enables the conical cylindrical roller bearing jaws of the clamping mechanism to open proportionately to grip onto barrels and original equipment eyepieces having larger outside diameters.

The clamping mechanism module enables the body of the mobile apparatus to axially align and center itself onto the barrel and original equipment eyepieces of the optical image sources, thereby aligning the optical and mechanical axis of the mobile apparatus to the optical and mechanical axis of the optical image source. As the clamping mechanism module's clamping jaws close and grip onto the barrel and original equipment eyepieces of the optical image sources, the mobile apparatus axially aligns and centers itself onto the barrel and original equipment eyepieces. When the clamping mechanism module's clamping jaws are closed tight and snug around the barrel and original equipment eyepieces, this action causes the optical and mechanical axis of the mobile apparatus to become coaxially aligned and centered to the optical and mechanical axis of the barrels and original equipment eyepieces of the optical image source. The clamping mechanism module is coaxially self aligning and self centering on the optical and mechanical axis of the barrels and original equipment eyepieces of the optical image source.

Besides being able to accommodate different barrels and original equipment eyepieces that have right cylindrical forms, the clamping mechanism can also accommodate barrels and original equipment eyepieces that are generally circularly symmetric; that is for example, barrels having a conical form. Barrels having right circular cylindrical forms have a constant diameter along their length, whereas ones with conical forms have their outside diameters change at a constant rate at a constant angle along the mechanical axis of their barrel's length, and thereby depart from being right cylinders.

10Z is a right circular cylinder having mechanical axis 2Z. 10Z is a static component of the clamping mechanism module.

10Z is externally threaded on both on its front and rear ends. 25Z is threaded onto the front end of 10Z. 26Z is treaded onto the rear end of 10Z. 25Z and 26Z are both static components of the clamping mechanism module.

33Z is a long cylinder for enclosing the two conical traveling pressure blocks 41Z and 43Z, and for enclosing, capturing and guiding the four drive traveling blocks 34Z and 36Z and 35Z and 64Z. 33Z is mounted on 10Z. The mechanical axis of 33Z is also 2Z. 33Z turns and rotates on 10Z about mechanical axis 2Z. There is a machined sliding fit between 33Z and 10Z at their contact points. The contact points between 33Z and 10Z are at either end of 33Z and are lubricated to reduce wear and friction. 10Z is a slotted cylinder. There are four machined slots in 10Z. The slots are machined radially.

Each of the four machined slots 24Z and 29Z and 73Z and 74Z are machined with two walls that are parallel one another.

The walls are also parallel to the mechanical axis 2Z of the cylinder. The four slots are configured at 90 degree intervals around the mechanical axis 2Z of the cylinder. The four slots are symmetrically disposed around the mechanical axis 2Z.

There is one of the four driving traveling blocks 34Z and 36Z and 35Z and 64Z configured and riding in each slot.

Each of the four driving traveling blocks has two degrees of freedom within the slots. The four driving traveling blocks slide radially, toward or away from 2Z, within their respective slots under pressure of 41Z and 43Z. The four driving traveling blocks slide parallel to 2Z, within their respective slots under pressure of 41Z and 43Z. 41Z and 43Z rotate on threads on the outside diameter of 10Z about the mechanical axis 2Z, and move parallel to 2Z as they turn.

The slots act as guides for each one of four driving traveling blocks and restrain their motion to two degrees of freedom. The slots act as guides for each one of four driving traveling blocks to travel parallel to the mechanical axis 2Z. The slots also act as guides and restrain the movement of each one of four driving traveling blocks to travel both radially or perpendicularly to the mechanical axis 2Z. The four slots are each identical to one another. The four slots are each of equal length. The four slots are each of equal width. The four slots are each of equal height. The width of each slot provides for a sliding fit for each of the four driving traveling blocks. Each of the four slots is lubricated to reduce friction and to facilitate the sliding fit. The length of each slot guides the movement of each of the four driving traveling blocks parallel to 2Z. The length of slot 29Z for example is bounded by 62Z and 63Z.

25Z and 26Z are identical machined cylindrical rings. The inside diameters of 25Z and 26Z are threaded. There are mating threads on the front and rear end outside diameter of 10Z. 26Z is screwed onto the front end of 10Z. 25Z is screwed onto the rear end of 10Z. 25Z and 26Z act as stops to capture and restrain the motion of 52Z which slides onto the outside diameter of 10Z.

The inside diameter of 52Z and the outside diameter of 10Z are machined to be a sliding fit where they make contact.

The contact points at the ends of 10Z and 52Z are lubricated to reduce wear and friction between their respective contact surfaces.

In a preferred embodiment, there is a right handed thread on the outside diameter of 10Z running parallel to 2Z along the length of 10Z beginning at 23Z and ending at 55Z. There is a left handed thread on the outside diameter of 10Z running parallel to 2Z along the length of 10Z beginning at 54Z and ending at 53Z.

In a preferred embodiment, the clamping mechanism is comprised of and two right cylindrical traveling pressure blocks 41Z and 43Z and four driven traveling blocks 34Z and 35Z and 36Z and 64Z.

The two right cylindrical traveling pressure blocks 41Z and 43Z are actuated to move synchronously in opposite directions to one another, parallel to the mechanical axis 2Z of the clamping mechanism module, by equal distances and equal rates as the observer manually turns the knurled front end 30Z of the clamping mechanism module. The two right cylindrical traveling pressure blocks 41Z and 43Z move simultaneously on separate threads 22Z and 32Z; i.e. 41Z moves on right handed thread 32Z, and 43Z moves on left handed thread 22Z. Each of the two right cylindrical traveling pressure blocks 41Z and 43Z also rides on a single key-way 27Z which is attached to 33Z. 67Z and 68Z are conical surfaces with a common mechanical axis 2Z. The two 45 degree conical mating surfaces on each of the four driven traveling blocks make contact with the two conical 45 degree surfaces on the two right cylindrical traveling pressure blocks 41Z and 43Z.

The knurled front end 30Z of the clamping mechanism module is connected to the single key-way 27Z via 33Z along the length of the clamping mechanism module where 27Z is parallel to the mechanical and optical axis 2Z. As 30Z is manually turned clockwise by the observer about the mechanical axis 2Z, the key-way 27Z simultaneously engages both of the two right cylindrical traveling pressure blocks 41Z and 43Z in their key-way slots 72Z and 73Z respectively. The clockwise force exerted by 27Z on 41Z and 43Z causes 41Z and 43Z to both rotate clockwise at the same rate.

The thread 40Z on right cylindrical traveling pressure block 41Z is meshed with the right-handed thread 32Z on 10Z, thereby causing 41Z to move parallel to 2Z in the positive x-direction as 41Z rotates clockwise, and as 33Z is turned clockwise on thread 32Z. The thread 42Z on right cylindrical traveling pressure block 43Z is meshed with the left-handed thread 22Z on 10Z, thereby causing 43Z to move parallel to 2Z in the negative x-direction as 43Z rotates clockwise on thread 22Z. 40Z and 42Z are internal threads. 22Z and 32Z are external threads.

Therefore, turning 30Z clockwise causes 33Z to turn clockwise, causing keyway 27Z to rotate clockwise, thereby forcing 41Z and 43Z to rotate clockwise simultaneously and travel in opposite x-directions to one another along the key-way 27Z and on their respective threads 22Z and 32Z that are part of 10Z. 10Z is stationary. The height of the keyway 27Z is kept shallow so as to provide clearance for the four driven traveling blocks and so as not to mechanically interfere with the radial degree of freedom and motion of the four driven traveling blocks.

In a preferred embodiment, the two right cylindrical traveling pressure blocks 41Z and 43Z are drawn together when the knurled clamping mechanism module 30Z is turned clock-wise; and drawn apart when the knurled clamping mechanism module 30Z is turned counter-clock-wise.

The four driven traveling blocks are sandwiched in a gap between the two right cylindrical traveling pressure blocks 41Z and 43Z. The gap opens or closes depending on the direction that the observer manually turns the knurled front end of the clamping mechanism module. The four driven traveling blocks 34Z and 35Z and 36Z and 64Z are spaced radially at 90 degree intervals around the mechanical axis 2Z of the clamping mechanism module.

Each of the four driven traveling blocks is connected by a fastener, i.e. a threaded shank, i.e. 6Z and 13Z and 59Z for example, to one of four mounting support plates i.e. 49Z for example. Each of the four mounting support plates holds a pair of conical roller pressure bearings i.e. 46Z and 51Z for example, that press upon, capture, center, align to and grip the barrel between them. Each of the conical roller pressure bearings rotates on an axel that is mounted on a pair of prongs i.e. 71Z configured on each of the four mounting support plates i.e. 49Z.

The four driven traveling blocks 34Z and 35Z and 36Z and 64Z are forced radially inward toward the mechanical axis 2Z of the clamping mechanism module by the pressure exerted on them by the two right cylindrical traveling pressure blocks 41Z and 43Z, as the knurled clamping mechanism module 30Z is turned clock-wise, thereby pushing the four mounting support plates radially inward toward the mechanical axis 2Z of the clamping mechanism module, and thereby closing the four jaws that grip the barrel. The two right cylindrical traveling pressure blocks 41Z and 43Z are identical except for their threads 40Z and 42Z.

In a preferred embodiment, 40Z is a right handed thread, and 42Z is a left handed thread, where both 40Z and 42Z have the same pitch. Use of opposite threads enables one of the two right cylindrical traveling pressure blocks to travel one direction, while the other of the two right cylindrical traveling pressure blocks travels in the other direction. Ergonomically, most observers relate clockwise motion with tightening. By configuring 40Z and 42Z with opposite thread, 41Z and 43Z travel toward one another when the observer turns 30Z clockwise, thereby pushing on the four driven traveling blocks and forcing the clamping jaws to close on the barrel of the optical image source; thereby feeding back torque resistance to the observer's hand letting him know that the barrel has been captured snugly and that the mobile apparatus has become centered and aligned on the barrel. This torque resistance is an ergonomic feedback signal to the observer letting him know to stop turning 30Z, thereby serving to prevent possible clamping damage to the barrel.

The four driven traveling blocks 34Z and 35Z and 36Z and 64Z are forced radially outward away from the mechanical axis 2Z of the clamping mechanism module by the eight tension springs i.e. 5Z and 39Z and 44Z and 58Z for example, that pull outwardly on the four mounting support plates, that in turn push outwardly on each of the four shank-like threaded fasteners, and that in turn push outwardly on each of the four driven traveling blocks 34Z and 35Z and 36Z and 64Z.

The eight tension springs are arranged into four pairs, with one pair of springs for each of the four mounting support plates. Each of the four pairs of tension springs is radially stretched between the inside surface of 10Z and each of their respective mounting support plates i.e. 49Z and 50Z and 72Z for example. One end of each spring in a pair is connected to the inside surface of 10Z, and the other end to its respective mounting support plate. The outward radial force on each of the four driven traveling blocks, pushes them against the two cylindrical traveling pressure blocks thereby bringing their 45 degree pressure angle surfaces into contact; this action takes up any slack between the two cylindrical traveling pressure blocks and the four driven traveling blocks and thereby removes any looseness and play while the observer is turning the knurled hand grip 30Z. Each of the tension springs in a pair are positioned equidistant off to either side of the center of their respective mounting support plates in order to make room for the passage of the threaded shank-like fasteners that connect each of the four mounting support plates to each of their respective four driven traveling blocks. The tension springs in a pair are also positioned equidistant off to one side of the center of their respective mounting support plates in order to permit the spring steel material that the mounting support plates are fabricated from to flex. Flexure of the mounting support plates allows their conical roller pressure bearings to conform to the variety of profiles of the different barrels. The two tension springs in each pair are matched in order to provide equal force on either side of the center of their respective mounting support plates to equalize their torque on their respective mounting support plates to avoid producing bending forces on the threaded shank like fastener which could increase the sliding friction between the driven traveling blocks and their respective radial guide slots. Each pair of tension springs is connected to 10Z and to its respective mounting support plate, for example 49Z, 50Z, and 72Z.

The eight tension springs are configured into four pairs. Each pair is for pulling up one of the four mounting support plates toward 10Z thereby opposing and bringing into equilibrium the radial inward forces on the four mounting support plates by the four driven traveling blocks 34Z, 35Z, 36Z and 64Z respectively. The eight tension springs are initially assembled and stretched in tension between the four mounting support plates and 10Z. Each of the eight tension springs is matched so as to provide equal force.

As the knurled clamping mechanism module 30Z is turned clock-wise, the opening the gap between the two right cylindrical traveling pressure blocks 41Z and 43Z widens, thereby allowing clearance for the four driven traveling blocks 34Z and 35Z and 36Z and 64Z to move outwardly in their respective radially guiding slots i.e. 29Z for example, away from the mechanical axis 2Z of the clamping mechanism module, and into the widened gap between 41Z and 43Z. As the gap between the two right cylindrical traveling pressure blocks 41Z and 43Z widens, thereby enabling the four driven traveling blocks to move radially outward guided in their four respective radially guiding slots, the four jaws that grip the barrel open proportionately.

In a preferred embodiment, each of the four driven traveling blocks has two angled pressure surfaces i.e. 69Z and 70Z for example. The 45 degree angled pressure surfaces are conical to match the conical 45 degree angled pressure surfaces on the two right cylindrical traveling pressure blocks 41Z and 43Z. One angled pressure surface, i.e. 69Z is at the front end of the driven traveling block and the other angled surface i.e. 70Z is at the rear end of the driven traveling block. The pressure angle on each surface is made 45 degrees to the mechanical axis of the clamping mechanism module. The 45 degree pressure angle enables proportionate closure and opening of the clamping jaws, thereby giving the observer a proportionate ergonomic feel of motion fed back to the observer's hand when turning the knurled grip 30Z to operate and tighten the jaws. The rate of closure and opening of the jaws that grip the barrel and self center and align the mobile apparatus to the mechanical and optical axis of the optical image source, is proportional to the number of degrees that 30Z is manually turned about its mechanical axis 2Z. The rate of closure and opening of the jaws is dependent on the pitch of the thread 40Z and 42Z. The 45 degree pressure angle also evenly distributes the horizontal and vertical loading on the right cylindrical traveling pressure blocks 41Z and 43Z as the clamping jaws are extended toward or retracted away from the mechanical axis 2Z. The ergonomic feel of proportionate motion fed back to the observer's hand enables the observer to judge just how quickly the jaws are closing on the barrel of the optical image source, and how quickly the jaws are disengaging from the barrel of the optical image source. This ergonomic feel of proportionate motion gives the observer a notion of how long it takes for the mobile apparatus to center and align itself as 30Z is turned.

Double-start thread can be used to quicken the process of closing and opening the jaws, and thereby can be used to intensify the ergonomic feel to the observer's hand providing that the settling time for the mobile apparatus to self center and self align itself on the barrel of the optical image source is kept small. The settling time for the mobile apparatus to reach equilibrium can be kept very small by lubricating the contact surfaces of the conical pressure bearing rollers that grip the barrel of the optical image source, thereby reducing the friction between the rollers and the barrel and enabling the mobile apparatus to slide into self alignment and be self centered faster while still maintaining a stable griping action on the barrel. Keeping the mass of the mobile apparatus minimized also reduces settling time. Mass control of the mobile apparatus can be accomplished by selecting low mass components that comprise the mobile apparatus, while being careful not to sacrifice function.

Each of the two right cylindrical traveling pressure blocks 41Z and 43Z has one pressure angled surface. The pressure angle on each surface is 45 degrees to the mechanical axis of the clamping mechanism module. The pressure angled surfaces on the two right cylindrical traveling pressure blocks makes physical contact with the corresponding pressure angled surfaces on the four driven traveling blocks. The 45 degree pressure angled contact surfaces on the two right cylindrical traveling pressure blocks are conical surfaces. The mating 45 degree pressure angled contact surfaces on the four driven traveling blocks are conical as well, and match the cones on the two right cylindrical traveling pressure blocks. The 45 degree pressure angled contact surfaces on the two right cylindrical traveling pressure blocks and the four driven traveling blocks are lubricated to reduce sliding friction and wear.

When the observer turns the knurled clamping mechanism module 30Z in a clock-wise manner, the two right cylindrical traveling pressure blocks are drawn together thereby causing their 45 degree angled surfaces to engage and come together and force the four driven traveling blocks inward toward the mechanical axis of the clamping mechanism module. The two 45 degree pressure angled surfaces on each end of the four driven traveling blocks is engaged and normally forced upon by each of the two 45 degree pressure angled surfaces 67Z and 68Z on the two right cylindrical traveling pressure blocks causing the four driven traveling blocks to slide toward the mechanical axis of the clamping mechanism module. Each of the four driven traveling blocks slides and is guided within one of four radial slots in 10Z, i.e. 24Z and 29Z for example, toward the mechanical axis 2Z.

Surface 67Z is a 45 degree conically formed pressure angle on the rear end the right cylindrical traveling pressure block 41Z. Surface 68Z is a 45 degree conically formed pressure angle on the front end of right cylindrical traveling pressure block 43Z. Surface 69Z is a 45 degree conically formed pressure angle on the front end of driven traveling block 35Z. Surface 70Z is a 45 degree conically formed pressure angle on the rear end of driven traveling block 35Z. The 45 degree conically formed pressure angle surface 67Z contacts against the 45 degree conical surface 69Z. The 45 degree conically formed pressure angle surface 68Z contacts against the 45 degree conical surface 70Z.

The four driven traveling blocks are each arranged at 90 degree intervals around the mechanical axis 2Z of the clamping mechanism module, and around the mechanical axis of the barrel of the optical image source. Each of the four driven traveling blocks has one end of a threaded shank-like fastener screwed into it, i.e. 6Z, 13Z, 59Z, and 66Z for example. At its other end, each of the four shank-like threaded fasteners is connected to one of four mounting support plates, i.e. 49Z for example. Two conical roller pressure bearings i.e. 46Z and 51Z for example, are mounted on each of the four mounting support plates; therefore there are a total of eight conical roller pressure bearings housed within the clamping mechanism module. Two conical roller pressure bearings, one mounting support plate, one threaded shank fastener, one driven traveling block, and two tension springs comprise a trolley. Each of the four trolleys has two "V shaped" wheels or conical roller pressure bearings. The "V shaped" wheels act as jaws to press on and grip the optical image source.

In a preferred embodiment, each of the four mounting support plates is identical to one another and comprised of spring steel material. The resiliency of the spring steel material enables the four mounting support plates to flex under pressure, thereby enabling the angle of the conical cylindrical roller bearing jaws that press upon and grasp the barrel from four sides, to conform to the form of the barrel profile, while still maintaining axial alignment and centering. The four conical cylindrical roller bearing jaws thereby center and axially align themselves and the clamping mechanism module's mechanical axis 2Z to the optical and mechanical axis of the optical image source.

Some observers elect to use optical image sources that are manufactured with original equipment eyepieces that can be removed and replaced with an alternate eyepiece supplied by the observer that is a module of the mobile apparatus. Many manufacturers of such optical image sources mount such original equipment eyepieces inside a cylindrical barrel; where for example the cylindrical barrel may be a part of the optical image source's focusing mechanism. The inside diameter of such cylindrical barrels typically has a standard dimension that matches the outside diameter of the removable original equipment eyepiece. In some cases the cylindrical barrel is even threaded to match a corresponding thread on the removable original equipment eyepiece. Standard diameter dimensions like 0.956", 1.25", and 2" are commonplace in the industry.

In cases where the observer chooses to use an optical image source that has a removable original equipment eyepiece, the mobile apparatus is configured with its own eyepiece by the observer. In such an instance, in another preferred embodiment, there is no necessity to use the clamping mechanism module on the front end of the mobile apparatus, because the mobile apparatus has its own eyepiece that can be used instead. The mobile apparatus' eyepiece is mounted inside and attached to the mobile apparatus's enclosure. In this embodiment, the mobile apparatus' eyepiece will be chosen by the observer to have the same standard outside diameter as the optical image source's original equipment eyepiece that it replaces. The mobile apparatus is mounted to the optical image source by plugging in the mobile apparatus' eyepiece module directly into the same inside diameter of the optical image source's original equipment eyepiece holder as the optical image source's original equipment eyepiece that it replaces, and sometimes with the same standard thread.

Some observers elect to use optical image sources that are manufactured without original equipment eyepieces. As before, the manufacturers of such optical image sources provide a cylindrical barrel which for example may be a part of the optical image source's focusing mechanism. In such cases, the observer provides a selection of his own eyepieces for visual use and slips his own eyepiece into the cylindrical barrel supplied by the manufacturer. For electronic imaging, the observer removes and replaces his own eyepiece with the mobile apparatus, and uses the alternate eyepiece which is a component of the mobile apparatus instead.

The mobile apparatus is optically and mechanically flexible and compatible to adapt to a variety of optical image sources, so for example observers can load one of their own eyepiece modules into the body of the mobile apparatus if they wish. The manufacturer of the optical image source typically provides the inside diameter of cylindrical eyepiece draw tubes with a standard dimension. In some cases the cylindrical draw tubes are threaded with thread having standard dimensions. Standard diameter dimensions like 0.956", 1.25", and 2" for example are commonplace in the industry. The mobile apparatus is configured with an eyepiece module that has adapters for both diameter and thread sizes to match the cylindrical draw tubes standard diameter and thread size to permit easy attachment of the mobile apparatus to the optical image source.

FIG. 27 and FIG. 28 and FIG. 29

FIG. 27 shows a side view center section of a layout of a preferred embodiment of a mobile apparatus.

FIG. 28 shows a side view center section of the preferred embodiment FIG. 27 of the mobile apparatus showing one antenna mounted on a swivel, and deployed externally in a groove in the enclosure of the mobile apparatus.

FIG. 29 shows a top view of the preferred embodiment FIG. 27 of the mobile apparatus showing one antenna mounted on a swivel, and deployed externally in a groove in the enclosure of the mobile apparatus.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The eyepiece module A2 is for optically acquiring and transforming and transferring the focal optical imagery from the optical image source into afocal optical imagery to the zoom lens module A31.

The zoom lens module is for optically transforming the afocal optical imagery into focal optical imagery and for optically transferring the focal imagery to the electronic image sensor array camera module A18 for electronically transforming the focal optical imagery into electronic imagery signals.

The preferred embodiments of the mobile apparatus shown in FIGS. 27, 28 and 29 shows the modules configured in the form of a capital letter "T". The stem of the "T" is comprised of the eyepiece module A2, and the zoom lens module A31, and the electronic image sensor array camera module A18. The cross member of the "T" is comprised of the electronics circuit module A13 and the battery and electronics power control module A15.

The purpose of the "T" formation of the modules is to provide an ergonomic handle for the observer while handling the mobile apparatus during its deployment onto or off of the optical image sources. It also shortens the length of the mobile apparatus. It allows for the position of its center of gravity to be controlled. It also allows for the position of the microphone and speaker in the end cap modules A9 and A16 to be controlled.

The mobile apparatus shown in FIGS. 27, 28, and 29 is configured with a eyepiece module A2, a zoom lens module A31 and a electronic image sensor array camera module A18, a electronics circuit module A13, and battery and electronics power control module A15.

The mobile apparatus disclosed in FIG. 27 and FIG. 28 and FIG. 29 is configured for being attached to and compatible with the optical image source shown in FIG. 1.

The method for attaching the mobile apparatus to the optical image source shown in FIG. 1 is as follows: Initially slide the front end, i.e. the eyepiece housing A2 of the mobile apparatus, into the inside diameter of the barrel of the optical image source.

Fine focus is achieved by operating the zoom lens focus control manually.

Screw thread is shown in the figure as a mechanical connecting means for mechanically connecting adjacent modular enclosures. Screw thread is an example of a mechanical connecting means. Screw threaded joints are a simple, inexpensive and space saving method especially for connecting enclosures having a cylindrical profile. The front ends of the module's A3 and A31 and A18 cylindrical enclosures are under cut and threaded with female threads. The rear ends of the module's cylindrical enclosures are over cut and threaded with male threads. The rear ends of the module's cylindrical enclosures i.e. A3 mates with the front end of the module's cylindrical enclosure A31 in order to connect the two modules together.

Screw thread is given in the present invention as an example of a mechanical connecting means. Other mechanical connecting means are also appropriate i.e. snap-fit connections.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIG. 27 and FIG. 28 and FIG. 29 are identified as follows:

A1 is the optical and mechanical axis of the mobile apparatus.

A2 is a eyepiece of the eyepiece module of the mobile apparatus, wherein the outside diameter of the eyepiece is configured to slip fit into the inside diameter of the optical image source referred to in FIG. 1.

A3 is the eyepiece module showing the enclosure of A3 joined to A31 at A5.

A4 is a shim and the shim slot in the eyepiece threaded modular enclosure A3.

A5 is the threaded joint between A3 and A31. When A3 is unscrewed and disconnected from A31, A5 enables the clamping mechanism module shown in FIG. 22 thru A26 to be screwed on to A31 for the mobile apparatus to accommodate optical image sources that are manufactured with their own original equipment eyepieces.

A6 is a zoom lens.

The zoom lens optically receives afocal imagery from A2 and optically transforms the afocal imagery into focal imagery at the electronic image sensor array. The zoom lens focuses the focal imagery on to A17. The effective focal length of the zoom lens is adjustable. The effective focal length of the zoom lens is controlled by the observer. The observer controls the magnification of the zoom lens by varying the effective focal length of the zoom lens. The observer can manually change the magnification of the zoom lens or change the magnification by operating the zoom lens electronic actuator.

The observer controls the size of the imagery field on the image sensor array by controlling the magnification. The observer can adjust the size of the field of view of the imagery on the image sensor array by varying the magnification. The observer can capture the full field of view of the imagery on the aperture stop of the eyepiece by just filling the size of the image of the aperture stop onto the image sensor array. The observer can also vary the brightness of the image on the image sensor array by varying the effective focal length of the zoom lens and the magnification, thereby changing the f-number of the imagery on the image sensor array. The observer can increase the brightness of the imagery by reducing the zoom lens magnification. The observer can also vary the brightness of the imagery by actuating the iris diaphragm, either manually, or electronically by controlling the zoom lens electronic actuator. The observer can sharply focus the imagery on the image sensor array by operating the focus control on the zoom lens, either manually, or electronically by controlling the zoom lens electronic actuator.

The zoom lens functions are magnification control, iris diaphragm control, and focus control. When actuated manually by the observer, A23 controls the magnification of the zoom lens, A22 controls the iris diaphragm of the zoom lens, A20 controls the focus of the zoom lens. The observer can maintain manual control of the zoom lens by rotating the adjustment rings by hand. The observer is enabled to adjust the focus for objects whose distances to the optical image source may be changing during an observing session.

A7 is the threaded joint between A31 and A18.

A8 is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.

The electronic image sensor array camera as shown in the figure is comprised of a cover and an electronic image sensor array. The sensor array, for example is a CCD, CMOS or other sensor array type.

A9 is a threaded end cap module for access to, and maintenance of A13. A9 screws into A10. A9 is for protecting A13 from the environment. Details of the end cap module are shown in FIGS. 18A & 18B & 18C.

A10 is a "T" shaped housing. A10 has a cylindrically shaped aperture for housing A13 and A15. A10 has a mechanical means located substantially at the midpoint of its cylindrical length for connecting to A18 via A34 at the threaded joint A26. The mechanical axis of A18 is perpendicular to the mechanical axis of A10 i.e. the mechanical axis of A13 and A15.

A11 is a antenna swivel.

A12 is a antenna. A12 is deployed in A30.

A13 is a electronics module. Descriptions of the different electronic circuits that the electronic modules can use that the observer can choose from, are given in the following figures: FIG. 7, FIG. 8, FIG. 9, FIG. 10, and FIG. 11. Each figure describes the physical elements that comprise each electronic circuit. Each of the different electronic modules, that contains a different electronic circuit described in each of the different figures above, has different capabilities.

The electronic circuit in FIG. 7 is referred to as the 1st electric circuit.

The electronic circuit in FIG. 8 is referred to as the 2nd electric circuit.

The electronic circuit in FIG. 9 is referred to as the 3rd electric circuit.

The electronic circuit in FIG. 10 is referred to as the 4th electric circuit.

The electronic circuit in FIG. 11 is referred to as the 5th electric circuit.

Each one of the electronic modules enables the observer to exercise different capabilities during an observing session.

The observer may choose to use an electronic circuits module which uses any one of the electric circuits described above in the figures in the mobile apparatus by simply loading the modular enclosure containing the electric circuit into A10 of the mobile apparatus.

A13 threads into and joins with A15. A13 and A15 have cylindrical enclosures and have equal outside diameters.

A13 is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities to match the challenges encountered during an observing session by the observer.

Each one of the electronic circuits modules enables the observer to exercise different capabilities during an observing session. The observer may choose to use an electronic circuits module which uses any one of the circuits described above in the figures in the mobile apparatus by simply loading the module containing the circuit into the mobile apparatus.

A14 is a heat sink for A13.

A15 is a battery and electronics' power control module. A15 supplies electricity to all the mobile apparatus' electronics.

A16 is a threaded end cap module for access to, and maintenance of A15. A16 screws into A0. A16 is for protecting A15 from the environment. Details of the end cap module are shown in FIG. 18D.

A17 is a optical image sensor array and its associated camera electronics.

A18 is the camera threaded modular enclosure of the mobile apparatus, wherein A18 screws into A10.

A19 is a slot machined in A31 for A20.

A20 is the zoom lens manual magnification control arm.

A21 is a slot machined in A31 for A22.

A22 is the zoom lens manual iris diaphragm control arm.

A23 is the zoom lens manual focus control arm.

A24 is a slot machined in A31 for A23.

A25 is the mating of the threaded male rear end of the zoom lens, and the threaded female front end of the camera case.

A26 is the threaded joint between A18 and A10.

A27 is the zoom lens slot for the manual focus control arm.

A28 is the zoom lens slot for the manual iris diaphragm control arm.

A29 is the zoom lens slot for the manual magnification control arm.

A30 is the antenna groove in A10 for storing and protecting antenna A12 prior to the observer unfolding and deploying antenna A12 using its swivel A11.

A31 is the zoom lens threaded modular enclosure of the mobile apparatus, wherein A31 screws into A18. A31 encloses and houses A6.

A32 is the mechanical axis of A10.

Refer to FIG. 1 as a reference for the optical image source.

A2 is inserted into the inside diameter of the optical image source's draw tube referred to in FIG. 1. Rough focus of the image is achieved by physically slipping and moving the mobile apparatus in the optical image source's draw tube.

Fine focus is achieved by manually operating the zoom lens focus control arm A23.

A3, and A31 and A18 are cylindrically shaped units. A3, and A31 and A18 have the same outside diameters. A3, and A31 and A18 have the same thread sizes in order to enable them to be screwed together to form a long cylinder.

The body of the mobile apparatus is configured into a "T" formation. The stem of the "T" is comprised of modules A3, A31 and A18. The cross member of the "T" is comprised of elements A13 and A15, i.e. via enclosure A10. The stem of the "T" is fastened to the cross member of the "T" via A26. The modules A3, A31 and A18 of the stem are fastened together using A5, A7. The stem is configured with modules A3, A31 and A18 for easy replacement of A3, A31, A13, A15 and A18 for achieving versatility of the mobile apparatus to gain compatibility with the variety of different optical image sources it operates with over time.

The "T" formation has a plurality of benefits.

The mobile apparatus can be dissembled by unscrewing its modular enclosures from one another. The mobile apparatus can be reassembled by screwing its modular enclosures back together.

The "T" formation of the mobile apparatus has a plurality of benefits to the observer.

The first benefit is an ergonomic advantage.

The first benefit is the improved handling quality of the apparatus.

The "T" formation enables the observer to securely grip and manipulate the mobile apparatus.

This is especially useful in attaching the mobile apparatus to the optical image sources.

Substitution of eyepieces, zoom lenses, image sensor arrays or electronics circuits with other eyepieces, zoom lenses, image sensor arrays, or electronics circuits to better match the job, match the environment, match the object, and match the audience, etc. can be accomplished by disassembly of the mobile apparatus into its respective modules and substituting more appropriate modules in their place.

The eyepiece module A2 optically acquires the optical image source's focal image of the object and optically transforms the focal image into a afocal image and optically transfers the afocal image to the zoom lens module A31 which optically transforms the afocal image into a focal image at A17 of A18.

The electronic image sensor array camera module A18 electronically transforms the focal image at A17 into electronic imagery signals, and the electronic circuits module A13 electronically transforms and transmits the electronic imagery signals from the output terminals of A13 and A9 and A16 to the observer and the observer's audience. The electronic imagery signals meet analog and/or digital protocols depending on the type of analog or digital electronics used by the observer in the electronic sensor array camera module A18 and the electronic circuits module A13.

FIG. 30 and FIG. 31 and FIG. 32 and FIG. 33

FIG. 30 shows a side view center section of a layout of a preferred embodiment of a mobile apparatus.

FIG. 31 shows a side view center section of the preferred embodiment FIG. 30 of the mobile apparatus showing two antennas, each one mounted on its respective swivel, both deployed externally in a common groove in the enclosure of the mobile apparatus.

FIG. 32 shows a top view of the preferred embodiment FIG. 30 of the mobile apparatus showing two antennas, each one mounted on its respective swivel, wherein both antennas are deployed externally in a common groove, wherein the swivels are at the same end of the groove.

FIG. 33 shows a top view of the preferred embodiment FIG. 30 of the mobile apparatus showing two antennas, each one mounted on its respective swivel, wherein both antennas are deployed externally in a common groove, wherein the swivels are at opposite ends of the groove.

The mobile apparatus disclosed in FIG. 30 and FIG. 31 and FIG. 32 and FIG. 33 is configured for being attached to and compatible with the optical image source shown in FIG. 1.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The eyepiece module B2 is for optically acquiring and transforming and transferring the focal optical imagery from the optical image source into afocal optical imagery to the zoom lens module B31.

The zoom lens module is for optically transforming the afocal optical imagery into focal optical imagery and for optically transferring the focal imagery to the electronic image sensor array camera module B18 for electronically transforming the focal optical imagery into electronic imagery signals.

The preferred embodiments of the mobile apparatus shown in FIGS. 30, 31 and 32 and 33 shows the modules configured in the form of a capital letter "T". The stem of the "T" is comprised of the eyepiece module B3, and the zoom lens module B31, and the electronic image sensor array camera module B18. The cross member of the "T" is comprised of the electronics circuit module B13 and the battery and electronics power control module B15.

The purpose of the "T" formation of the modules is to provide an ergonomic handle for the observer while handling the mobile apparatus during its deployment onto or off of the optical image sources. It also shortens the length of the mobile apparatus. It allows for the position of its center of gravity to be controlled. It also allows for the position of the microphone and speaker in the end cap modules B9 and B16 to be controlled.

The mobile apparatus shown in FIGS. 30, 31, 32, and 33 is configured with a eyepiece module B3, a zoom lens module B31 and a electronic image sensor array camera module B18, a electronics circuit module B13, and battery and electronics power control module B15.

The method for attaching the mobile apparatus to the optical image source shown in FIG. 1 is as follows: Initially slide the front end, i.e. the eyepiece B2 of the mobile apparatus, into the inside diameter of the barrel of the optical image source.

Fine focus is achieved by operating the zoom lens focus control manually.

Rotate the mobile apparatus about 1 until the top of the image coincides with the top of the image sensor array.

Screw thread is shown in the figure as an example of a mechanical connecting means for mechanically connecting adjacent modular enclosures. Screw thread is an example of a mechanical connecting means. Screw threaded joints are a simple, inexpensive and space saving method especially for connecting enclosures having a cylindrical profile. The front ends of the module's B3 and B31 and B18 cylindrical enclosures are under cut and threaded with female threads. The rear ends of the module's cylindrical enclosures are over cut and threaded with male threads. The rear ends of the module's cylindrical enclosures i.e. B3 mates with the front end of the module's cylindrical enclosure B31 in order to connect the two modules together.

Screw thread is given in the present invention as an example of a mechanical connecting means. Other mechanical connecting means are also appropriate i.e. snap-fit connections.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIG. 30 and FIG. 31 and FIG. 32 and FIG. 33 are identified as follows:

B1 is the optical and mechanical axis of the mobile apparatus.

B2 is a eyepiece of the eyepiece module of the mobile apparatus, wherein the outside diameter of the eyepiece is configured to slip fit into the inside diameter of the optical image source referred to in FIG. 1.

B3 is the eyepiece module showing the enclosure of B3 joined to B31 at B5.

B4 is a shim and the shim slot in the eyepieces' threaded modular enclosure B3.

B5 is the threaded joint between B3 and B31. When B3 is unscrewed and disconnected from B31, B5 enables the clamping mechanism module and clamping mechanism shown in FIG. 22 thru B26 to be screwed on to B31 for the mobile apparatus to accommodate optical image sources that are manufactured with their own original equipment eyepieces.

B6 is a zoom lens.

The zoom lens receives afocal imagery and transforms the afocal imagery into focal imagery at the electronic image sensor array. The zoom lens focuses the focal imagery on to B17. The effective focal length of the zoom lens is adjustable. The effective focal length of the zoom lens is controlled by the observer. The observer controls the magnification of the zoom lens by varying the effective focal length of the zoom lens. The observer can manually change the magnification of the zoom lens or change the magnification by operating the zoom lens electronic actuator.

The observer controls the size of the imagery on the image sensor array by controlling the magnification. The observer can adjust the size of the field of view of the imagery on the image sensor array by varying the magnification. The observer can capture the full field of view of the imagery on the aperture stop of the eyepiece by just filling the size of the image of the aperture stop onto the image sensor array. The observer can also vary the brightness of the image on the image sensor array by varying the effective focal length of the zoom lens and the magnification, thereby changing the f-number of the imagery on the image sensor array. The observer can increase the brightness of the imagery by reducing the zoom lens magnification. The observer can also vary the brightness of the imagery by actuating the iris diaphragm, either manually, or electronically by controlling the zoom lens electronic actuator. The observer can sharply focus the imagery on the image sensor array by operating the focus control on the zoom lens, either manually, or electronically by controlling the zoom lens electronic actuator.

The zoom lens functions are magnification control, iris diaphragm control, and focus control.

When actuated manually by the observer, B23 controls the magnification of the zoom lens, B22 controls the iris diaphragm of the zoom lens, B20 controls the focus of the zoom lens.

The observer can maintain manual control of the zoom lens by rotating the adjustment rings by hand.

The observer is enabled to adjust the focus for objects whose distances to the optical image source may be changing during an observing session.

B7 is the threaded joint between B31 and B18.

B8 is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover. The electronic image sensor array camera as shown in the figure is comprised of a cover and an electronic image sensor array. The sensor array, for example is a CCD, CMOS or other sensor array type.

B9 is a threaded end cap module for access to, and maintenance of B13. B9 screws into B10. B9 is for protecting B13 from the environment. Details of the end cap module are shown in FIGS. 18A & 18B & 18C.

B10 is a "T" shaped housing. B10 has a cylindrically shaped aperture for housing B13 and B15. B10 has a mechanical means located substantially at the midpoint of its cylindrical length for connecting to B18 via B34 at the threaded joint B26.

The mechanical axis of B18 is perpendicular to the mechanical axis of B10 i.e. the mechanical axis of B13 and B15.

B11 is a antenna swivel.

B12 is a antenna. B12 is deployed in B30.

B13 is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities.

Each one of the electronic circuits modules enables the observer to exercise different capabilities during an observing session.

The observer may choose to use an electronic circuits module which uses any one of the circuits described above in the figures in the mobile apparatus by simply loading the modular enclosure containing the circuit into B10 of the mobile apparatus.

B13 threads into and joins with B15. B13 and B15 have cylindrical enclosures and have equal outside diameters.

B13 is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities to match the challenges encountered during an observing session by the observer.

Each one of the electronic circuits modules enables the observer to exercise different capabilities during an observing session. The observer may choose to use an electronic circuits module which uses any one of the circuits described above in the figures in the mobile apparatus by simply loading the module containing the circuit into the mobile apparatus.

B14 is a heat sink for B13.

B15 is a battery and a electronics' power control module. B15 supplies electricity to all the mobile apparatus' electronics B16 is a threaded end cap module for access to, and maintenance of B15. B16 screws into B10. B16 is for protecting B15 from the environment. Details of the end cap module are shown in FIG. 18D.

B17 is a optical image sensor array and its associated camera electronics.

B18 is the camera threaded modular enclosure of the mobile apparatus, wherein B18 screws into B10.

B19 is a slot machined in B31 for B20.

B20 is the zoom lens' manual magnification control arm.

B21 is a slot machined in B31 for B22.

B22 is the zoom lens' manual iris diaphragm control arm.

B23 is the zoom lens' manual focus control arm.

B24 is a slot machined in B31 for B23.

B25 is the mating of the threaded male rear end of the zoom lens, and the threaded female front end of the camera case.

B26 is the threaded joint between B18 and B10.

B27 is the zoom lens' slot for the manual focus control arm.

B28 is the zoom lens' slot for the manual iris diaphragm control arm.

B29 is the zoom lens' slot for the manual magnification control arm.

B30 is the antenna groove in B10 for storing and protecting antennas B12 and B32 prior to the observer unfolding and deploying antenna B12 and B32 using their swivels B11 and B33.

B31 is the zoom lens' threaded modular enclosure of the mobile apparatus, wherein B31 screws into B18.

B32 is a antenna.

B33 is a antenna swivel.

Refer to FIG. 1 as a reference for the optical image source.

B2 is inserted into the inside diameter of the optical image source's draw tube referred to in FIG. 1.

Rough focus of the image is achieved by physically slipping and moving the mobile apparatus in the optical image source's eyepiece draw tube.

Fine focus is achieved by manually operating the zoom lens focus control arm B23.

The body of the mobile apparatus is configured into a "T" formation. The stem of the "T" is comprised of modules B3, B31 and B18. The cross member of the "T" is comprised of elements B13 and B15, i.e. via enclosure B10. The stem of the "T" is fastened to the cross member of the "T" via B26. The modules B3, B31 and B18 of the stem are fastened together using B5, B7. The stem is configured with modules B3, B31 and B18 for easy replacement of B3, B31, B13, B15 and B18 for achieving versatility of the mobile apparatus to gain compatibility with the variety of different optical image sources it operates with over time.

The "T" formation has a plurality of benefits.

The mobile apparatus can be dissembled by unscrewing its modular enclosures from one another. The mobile apparatus can be reassembled by screwing its modular enclosures back together.

Substitution of eyepieces, zoom lenses, image sensor arrays or electronics circuits with other eyepieces, zoom lenses, image sensor arrays, or electronics circuits to better match the job, match the environment, match the object, and match the audience, etc. can be accomplished by disassembly of the mobile apparatus into its respective modules and substituting more appropriate modules in their place. The eyepiece module B2 optically acquires the optical image source's focal image of the object and optically transforms the focal image into a afocal image and optically transfers the afocal image to the zoom lens module B31 which optically transforms the afocal image into a focal image at B17 of B18.

The electronic image sensor array camera module B18 electronically transforms the focal image at B17 into electronic imagery signals, and the electronic circuits module B13 electronically transforms and transmits the electronic imagery signals from the output terminals of B13 and B9 and B16 to the observer and the observer's audience. The electronic imagery signals meet analog and/or digital protocols depending on the type of analog or digital electronics used by the observer in the electronic sensor array camera module B18 and the electronic circuits module B13.

FIG. 34

FIG. 34 shows a side view center section of a layout of a preferred embodiment of a mobile apparatus, showing the clamping mechanism module of the mobile apparatus holding a precision clamping mechanism. The preferred embodiment shown in FIG. 34 and FIG. 35 is for accommodating optical image sources that are manufactured with their own original equipment eyepieces.

If the optical image sources are manufactured with a removable original equipment eyepiece, and the observer chooses to remove the optical image source's original equipment eyepiece from the optical image source, then the observer may choose to add the special eyepiece shown in FIGS. 17E & 17F to the mobile apparatus as is shown in the preferred embodiment example in FIG. 44.

The preferred embodiment FIG. 34 of the mobile apparatus has a top view similar to FIG. 29 showing one antenna mounted on a swivel, and deployed externally in a groove in the enclosure of the mobile apparatus.

The preferred embodiment FIG. 34 is configured for being attached to and compatible with the optical image source shown in FIG. 2.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The zoom lens module is for optically acquiring and transforming the afocal optical imagery from the optical image source, see FIG. 2, into focal optical imagery and for optically transferring the focal imagery to the electronic image sensor array camera module C18 for electronically transforming the focal optical imagery into electronic imagery signals.

The preferred embodiments of the mobile apparatus shown in FIG. 34 shows the modules configured in the form of a capital letter "T". The stem of the "T" is comprised of the clamping mechanism module C3, and the zoom lens module C31, and the electronic image sensor array camera module C18. The cross member of the "T" is comprised of the electronics circuit module C13 and the battery and electronics power control module C15.

The purpose of the "T" formation of the modules is to provide an ergonomic handle for the observer while handling the mobile apparatus during its deployment onto or off of the optical image sources. It also shortens the length of the mobile apparatus. It allows for the position of its center of gravity to be controlled. It also allows for the position of the microphone and speaker in the end cap modules C9 and C16 to be controlled.

The mobile apparatus shown in FIG. 34 is configured with a clamping mechanism module C3, a zoom lens module C31 and a electronic image sensor array camera module C18, a electronics circuit module C13, and battery and electronics power control module C15.

The method for attaching the mobile apparatus to the optical image source shown in FIG. 2 is as follows: Initially slide the front end C3 of the mobile apparatus over the outside diameter of the barrel of the optical image source.

Rotate the mobile apparatus about C1 until the top of the image coincides with the top of the image sensor array.

The precision clamping mechanism C2 is then manually tightened around the barrel of the optical image source using the knurled handgrip on C2 with a twist of the wrist.

Fine focus is achieved by manually operating the zoom lens focus control C20.

Refer to FIG. 22A and FIG. 22B and FIG. 23A and FIG. 23B and FIG. 24 and FIG. 25 and FIG. 26A and FIG. 26B for the layout of a preferred embodiment of the mobile apparatus' clamping mechanism module C2.

Screw thread is shown in the figure as an example of a mechanical connecting means for mechanically connecting adjacent modular enclosures.

Screw thread is an example of a mechanical connecting means.

Screw threaded joints are a simple, inexpensive and space saving method especially for connecting enclosures having a cylindrical profile.

The front ends of the module's C3 and C31 and C18 cylindrical enclosures are under cut and threaded with female threads. The rear ends of the module's cylindrical enclosures are over cut and threaded with male threads. The rear ends of the module's cylindrical enclosures i.e. C3 mates with the front end of the module's cylindrical enclosure C31 in order to connect the two modules together.

Screw thread is given in the present invention as an example of a mechanical connecting means. Other mechanical connecting means are also appropriate for example snap-fit connections.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIG. 34 and FIG. 29 are identified as follows:

C1 is the optical and mechanical axis of the mobile apparatus.

C2 is the clamping mechanism of the mobile apparatus.

C3 is the clamping mechanism module's extension device of the mobile apparatus. C3 screws into C31 at C5. C3 mounts and holds C2. When C3 is unscrewed and disconnected from C31, C5 enables the eyepiece module's modular enclosure of the mobile apparatus shown in FIGS. 17C and 17D to be screwed on to C31 for the mobile apparatus to accommodate optical image sources that are manufactured without their own original equipment eyepiece.

In cases where the optical image sources have a permanently mounted original equipment eyepiece there is no need for the eyepiece so the eyepiece module has been easily unscrewed and removed from the front end of the mobile apparatus.

C4 is a threaded joint for attaching the eyepiece shown in FIGS. 17A & 17B to C3.

C5 is a threaded joint between C3 and C31.

C6 is a zoom lens.

The zoom lens receives afocal imagery and transforms the afocal imagery into focal imagery at the electronic image sensor array. The zoom lens focuses the focal imagery on to C17. The effective focal length of the zoom lens is adjustable. The effective focal length of the zoom lens is controlled by the observer. The observer controls the magnification of the zoom lens by varying the effective focal length of the zoom lens. The observer can manually change the magnification of the zoom lens or change the magnification by operating the zoom lens electronic actuator.

The observer controls the size of the imagery on the image sensor array by controlling the magnification. The observer can adjust the size of the field of view of the imagery on the image sensor array by varying the magnification. The observer can capture the full field of view of the imagery on the aperture stop of the eyepiece by just filling the size of the image of the aperture stop onto the image sensor array. The observer can also vary the brightness of the image on the image sensor array by varying the effective focal length of the zoom lens and the magnification, thereby changing the f-number of the imagery on the image sensor array. The observer can increase the brightness of the imagery by reducing the zoom lens magnification. The observer can also vary the brightness of the imagery by actuating the iris diaphragm, either manually, or electronically by controlling the zoom lens electronic actuator. The observer can sharply focus the imagery on the image sensor array by operating the focus control on the zoom lens, either manually, or electronically by controlling the zoom lens electronic actuator.

The zoom lens functions are magnification control, iris diaphragm control, and focus control.

When actuated manually by the observer, C23 controls the magnification of the zoom lens, C22 controls the iris diaphragm of the zoom lens, C20 controls the focus of the zoom lens.

The observer can maintain manual control of the zoom lens by rotating the adjustment rings by hand.

The observer is enabled to adjust the focus for objects whose distances to the optical image source may be changing during an observing session.

C7 is a threaded joint between C31 and C18.

C8 is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.

The electronic image sensor array camera as shown in the figure is comprised of a cover and an electronic image sensor array. The sensor array, for example is a CCD, CMOS or other sensor array type C9 is a threaded end cap module for access to, and maintenance of C13. C9 screws into C10. C9 is for protecting C13 from the environment. Details of the end cap module are shown in FIGS. 18A & 18B & 18C.

C10 is a "T" shaped housing. C10 has a cylindrically shaped aperture for housing C13 and C15. C10 has a mechanical means located substantially at the midpoint of its cylindrical length for connecting to C18 via C34 at the threaded joint C26.

The mechanical axis of C18 is perpendicular to the mechanical axis of C10 i.e. the mechanical axis of C13 and C15.

C11 is a antenna swivel.

C12 is a antenna. C12 is deployed in C30.

C13 is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities.

Each one of the electronic circuits modules enables the observer to exercise different capabilities during an observing session.

The observer may choose to use an electronic circuits module which uses any one of the circuits described above in the figures in the mobile apparatus by simply loading the modular enclosure containing the circuit into C10 of the mobile apparatus.

C13 threads into and joins with C15. C13 and C15 have cylindrical enclosures and have equal outside diameters.

C14 is a heat sink for C13.

C15 is a battery and a power control module. C15 supplies electricity to all the mobile apparatus' electronics.

C16 is a threaded end cap module for access to, and maintenance of C15. C16 screws into C10. C16 is for protecting C15 from the environment. Details of the end cap module are shown in FIG. 18D.

C17 is a optical image sensor array and its associated camera electronics.

C18 is the camera threaded modular enclosure of the mobile apparatus, wherein C18 screws into C10.

C19 is a slot machined in C31 for C20.

C20 is the zoom lens manual focus control arm.

C21 is a slot machined in C31 for C22.

C22 is the zoom lens manual iris diaphragm control arm.

C23 is the zoom lens manual magnification control arm.

C24 is a slot machined in C31 for C23.

C25 is the mating of the threaded male rear end of the zoom lens C6, and the threaded female front end of the camera case C8.

C26 is the threaded joint between C18 and C34.

C27 is the zoom lens slot for the manual focus control arm C20.

C28 is the zoom lens slot for the manual iris diaphragm control arm C22.

C29 is the zoom lens slot for the manual magnification control arm C23.

C30 is the antenna groove in C10 for storing and protecting antenna C12 prior to the observer unfolding and deploying antenna C12 using its swivel C11.

C31 is the zoom lens modular enclosure of the mobile apparatus, wherein C31 screws into C18 and C3.

C32 is the mechanical axis of C10.

C33 is not shown.

C34 is a threaded cylinder linking C10 with C18.

Refer to FIG. 1 as a reference for the optical image source.

Refer to FIG. 22A and FIG. 22B and FIG. 23A and FIG. 23B and FIG. 24 and FIG. 25 and FIG. 26A and FIG. 26B for the layout of a preferred embodiment of the mobile apparatus' clamping mechanism module C2.

Initially C3 is slid over the outside diameter of the barrel of the optical images source.

The precision clamping mechanism C2 is then manually tightened around the barrel of the optical images source using the knurled handgrip on C2.

Fine focus is achieved by manually operating the zoom lens focus control arm C20.

C3, and C31 and C18 and C34 are cylindrically shaped units. C3, and C31 and C18 and C34 have the same outside diameters. C3, and C31 and C18 and C34 have the same thread sizes in order to enable them to be screwed together.

The body of the mobile apparatus is configured into a "T" formation. The stem of the "T" is comprised of modules C3, C31 and C18. The cross member of the "T" is comprised of elements C13 and C15, i.e. via enclosure C10. The stem of the "T" is fastened to the cross member of the "T" via C26. The modules C3, C31 and C18 of the stem are fastened together using C5, C7. The stem is configured with modules C3, C31 and C18 for easy replacement of C3, C31, C13, C15 and C18 for achieving versatility of the mobile apparatus to gain compatibility with the variety of different optical image sources it operates with over time.

The "T" formation has a plurality of benefits.

The mobile apparatus can be dissembled by unscrewing its modular enclosures from one another. The mobile apparatus can be reassembled by screwing its modular enclosures back together.

The "T" formation of the mobile apparatus has a plurality of benefits to the observer.

The first benefit is an ergonomic advantage.

The first benefit is the improved handling quality of the apparatus.

The "T" formation enables the observer to securely grip and manipulate the mobile apparatus.

This is especially useful in attaching the mobile apparatus to the optical image sources.

The electronics circuit module C13 is a unit that slip fits into C10.

In cases where the optical image sources have a permanently mounted original equipment eyepiece there is no need for the eyepiece so the eyepiece module has been easily unscrewed and removed from the front end of the mobile apparatus.

Substitution of eyepieces, zoom lenses, image sensor arrays or electronics circuits with other eyepieces, zoom lenses, image sensor arrays, or electronics circuits to better match the job, match the environment, match the object, and match the audience, etc. can be accomplished by disassembly of the mobile apparatus into its respective modules and substituting more appropriate modules in their place.

The zoom lens module C31 optically acquires and transforms the afocal image of the object from the optical image source into a focal image at C17 of C18.

The electronic image sensor array camera module C18 electronically transforms the focal image at C17 into electronic imagery signals, and the electronic circuits module C13 electronically transforms and transmits the electronic imagery signals from the output terminals of C13 and C9 and C16 to the observer and the observer's audience. The electronic imagery signals meet analog and/or digital protocols depending on the type of analog or digital electronics used by the observer in the electronic sensor array camera module C18 and the electronic circuits module C13.

FIG. 35

FIG. 35 shows a side view center section of the preferred embodiment FIG. 34 of the mobile apparatus showing one antenna mounted on a swivel, and deployed externally in a groove in the enclosure of the mobile apparatus, and showing the clamping mechanism module of the mobile apparatus holding a precision clamping mechanism. The preferred embodiment shown in FIG. 35 is for accommodating optical image sources that are manufactured with their own original equipment eyepieces.

If the optical image sources are manufactured with a removable original equipment eyepiece, and the observer chooses to remove the optical image source's original equipment eyepiece from the optical image source, then the observer may choose to add the special eyepiece shown in FIGS. 17E & 17F to the mobile apparatus as is shown in the preferred embodiment example in FIG. 44.

The mobile apparatus disclosed in FIG. 35 is configured for being attached to and compatible with the optical image source shown in FIG. 2.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The preferred embodiments of the mobile apparatus shown in FIG. 35 shows the modules configured in the form of a capital letter "T". The stem of the "T" is comprised of the clamping mechanism module 3, and the zoom lens module C31, and the electronic image sensor array camera module C18. The cross member of the "T" is comprised of the electronics circuit module C13 and the battery and electronics power control module C15.

The purpose of the "T" formation of the modules is to provide an ergonomic handle for the observer while handling the mobile apparatus during its deployment onto or off of the optical image sources. It also shortens the length of the mobile apparatus. It allows for the position of its center of gravity to be controlled. It also allows for the position of the microphone and speaker in the end cap modules C9 and C16 to be controlled.

The mobile apparatus shown in FIG. 35 is configured with a clamping mechanism module C3, a zoom lens module C31 and a electronic image sensor array camera module C18, a electronics circuit module C13, and battery and electronics power control module C15.

The method for attaching the mobile apparatus to the optical image source shown in FIG. 2 is as follows: Initially slide the front end C3 of the mobile apparatus over the outside diameter of the barrel of the optical image source.

Rotate the mobile apparatus about C1 until the top of the image coincides with the top of the image sensor array.

The precision clamping mechanism C2 is then manually tightened around the barrel of the optical image source using the knurled handgrip on C2 with a twist of the wrist.

Fine focus is achieved by manually operating the zoom lens focus control C20.

Screw thread is shown in the figure as an example of a mechanical connecting means for mechanically connecting adjacent modular enclosures.

Screw thread is an example of a mechanical connecting means.

Screw threaded joints are a simple, inexpensive and space saving method especially for connecting enclosures having a cylindrical profile.

The front ends of the module's C3 and C31 and C18 cylindrical enclosures are under cut and threaded with female threads. The rear ends of the module's cylindrical enclosures are over cut and threaded with male threads. The rear ends of the module's cylindrical enclosures i.e. C3 mates with the front end of the module's cylindrical enclosure C31 in order to connect the two modules together.

Screw thread is given in the present invention as an example of a mechanical connecting means. Other mechanical connecting means are also appropriate i.e. snap-fit connections.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIG. 35 are identified as follows:

C1 is the optical and mechanical axis of the mobile apparatus.

C2 is the clamping mechanism of the mobile apparatus.

C3 is the clamping mechanism module's extension device of the mobile apparatus. C3 screws into C31 at C5. C3 mounts and holds C2. When C3 is unscrewed and disconnected from C31, C5 enables the eyepiece module enclosure of the mobile apparatus shown in FIGS. 17C and 17D to be screwed on to C31 for the mobile apparatus to accommodate optical image sources that are manufactured without their own original equipment eyepieces.

In cases where the optical image sources have a permanently mounted original equipment eyepiece there is no need for the eyepiece so the eyepiece module has been easily unscrewed and removed from the front end of the mobile apparatus.

C4 is a threaded joint for attaching the eyepiece shown in FIGS. 17A & 17B to C3.

C5 is a threaded joint between C3 and C31.

C6 is a zoom lens.

The zoom lens receives afocal imagery and transforms the afocal imagery into focal imagery. The zoom lens focuses the focal imagery onto C17. The effective focal length of the zoom lens is adjustable. The effective focal length of the zoom lens is controlled by the observer. The observer controls the magnification of the zoom lens by varying the effective focal length of the zoom lens. The observer can manually change the magnification of the zoom lens or change the magnification by operating the zoom lens electronic actuator.

The observer controls the size of the imagery on the image sensor array by controlling the magnification. The observer can adjust the size of the field of view of the imagery on the image sensor array by varying the magnification. The observer can capture the full field of view of the imagery on the aperture stop of the eyepiece by just filling the size of the image of the aperture stop onto the image sensor array. The observer can also vary the brightness of the image on the image sensor array by varying the effective focal length of the zoom lens and the magnification, thereby changing the f-number of the imagery on the image sensor array. The observer can increase the brightness of the imagery by reducing the zoom lens magnification. The observer can also vary the brightness of the imagery by actuating the iris diaphragm, either manually, or electronically by controlling the zoom lens electronic actuator. The observer can sharply focus the imagery on the image sensor array by operating the focus control on the zoom lens, either manually, or electronically by controlling the zoom lens electronic actuator.

C7 is a threaded joint between C31 and C18.

C8 is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.

The electronic image sensor array camera as shown in the figure is comprised of a cover and an electronic image sensor array. The sensor array, for example is a CCD, CMOS or other sensor array type C9 is a threaded end cap module for access to, and maintenance of C13. C9 screws into C10. C9 is for protecting C13 from the environment. Details of the end cap module are shown in FIGS. 18A & 18B & 18C.

C10 is a "T" shaped housing. C10 has a cylindrically shaped aperture for housing C13 and C15. C10 has a mechanical means located substantially at the midpoint of its cylindrical length for connecting to C18 via C34 at the threaded joint C26.

The mechanical axis of C18 is perpendicular to the mechanical axis of C10 i.e. the mechanical axis of C13 and C15.

C11 is a antenna swivel for antenna C12.

C12 is a antenna. C12 is deployed in C30.

C13 is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities. Each one of the electronic circuits modules enables the observer to exercise different capabilities during an observing session. The observer may choose to use an electronic circuits module which uses any one of the circuits described above in the figures in the mobile apparatus by simply loading the modular enclosure containing the circuit into C10 of the mobile apparatus. C13 threads into and joins with C15. C13 and C15 have cylindrical enclosures and have equal outside diameters.

C14 is a heat sink for C13.

C15 is a battery and a power control module. C15 supplies electricity to all the mobile apparatus' electronics.

C16 is a threaded end cap module for access to, and maintenance of C15. C16 screws into C10. C16 is for protecting C15 from the environment. Details of the end cap module are shown in FIG. 18D.

C17 is a optical image sensor array and its associated camera electronics.

C18 is the camera threaded modular enclosure of the mobile apparatus, wherein C18 screws into C10.

C19 is not shown.

C20 is the zoom lens manual focus control arm.

C21 is not shown.

C22 is the zoom lens manual iris diaphragm control arm.

C23 is the zoom lens manual magnification control arm.

C24 is not shown.

C25 is the mating of the threaded male rear end of the zoom lens C6, and the threaded female front end of the camera case C8.

C26 is the threaded joint between C18 and C34.

C27 is the zoom lens slot for the manual focus control arm C20.

C28 is the zoom lens slot for the manual iris diaphragm control arm C22.

C29 is the zoom lens slot for the manual magnification control arm C23.

C30 is the groove in C10 for the antenna C12.

C31 is the zoom lens modular enclosure of the mobile apparatus, wherein C31 screws into C18 and C3.

C32 is the mechanical axis of C10.

C33 is not shown.

C34 is a threaded cylinder linking C10 with C18.

Refer to FIG. 1 as a reference for the optical image source.

Initially C3 is slid over the outside diameter of the barrel of the optical images source.

The precision clamping mechanism C2 is then manually tightened around the barrel of the optical images source using the knurled handgrip on C2.

Fine focus is achieved by manually operating the zoom lens focus control arm C20.

Refer to FIG. 22A and FIG. 22B and FIG. 23A and FIG. 23B and FIG. 24 and FIG. 25 and FIG. 26A and FIG. 26B for the layout of a preferred embodiment of the mobile apparatus' clamping mechanism C2.

C3, and C31 and C18 and C34 are cylindrically shaped units. C3, and C31 and C18 and C34 have the same outside diameters. C3, and C31 and C18 and C34 have the same thread sizes in order to enable them to be screwed together.

The body of the mobile apparatus is configured into a "T" formation. The stem of the "T" is comprised of modules C3, C31 and C18. The cross member of the "T" is comprised of elements C13 and C15, i.e. via enclosure C10. The stem of the "T" is fastened to the cross member of the "T" via C26. The modules C3, C31 and C18 of the stem are fastened together using C5, C7. The stem is configured with modules C3, C31 and C18 for easy replacement of C3, C31, C13, C15 and C18 for achieving versatility of the mobile apparatus to gain compatibility with the variety of different optical image sources it operates with over time.

The "T" formation has a plurality of benefits.

The mobile apparatus can be dissembled by unscrewing its modular enclosures from one another. The mobile apparatus can be reassembled by screwing its modular enclosures back together.

The "T" formation of the mobile apparatus has a plurality of benefits to the observer.

The first benefit is an ergonomic advantage.

The first benefit is the improved handling quality of the apparatus.

The "T" formation enables the observer to securely grip and manipulate the mobile apparatus.

This is especially useful in attaching the mobile apparatus to the optical image sources.

In cases where the optical image sources have a permanently mounted original equipment eyepiece there is no need for the eyepiece so the eyepiece module has been easily unscrewed and removed from the front end of the mobile apparatus.

Substitution of eyepieces, zoom lenses, image sensor arrays or electronics circuits with other eyepieces, zoom lenses, image sensor arrays, or electronics circuits to better match the job, match the environment, match the object, and match the audience, etc. can be accomplished by disassembly of the mobile apparatus into its respective modules and substituting more appropriate modules in their place.

The zoom lens module C31 optically transforms the afocal image of the object from the optical image source into a focal image at C17 of C18.

The electronic image sensor array camera module C18 electronically transforms the focal image at C17 into electronic imagery signals, and the electronic circuits module C13 electronically transforms and transmits the electronic imagery signals from the output terminals of C13 and C9 and C16 to the observer and the observer's audience. The electronic imagery signals meet analog and/or digital protocols depending on the type of analog or digital electronics used by the observer in the electronic sensor array camera module C18 and the electronic circuits module C13.

FIG. 36

FIG. 36 shows a side view center section of a layout of a preferred embodiment of a mobile apparatus, and showing the clamping mechanism module of the mobile apparatus holding a precision clamping mechanism. The preferred embodiment shown in FIG. 36 is for accommodating optical image sources that are manufactured with their own original equipment eyepieces.

If the optical image sources are manufactured with a removable original equipment eyepiece, and the observer chooses to remove the optical image source's original equipment eyepiece from the optical image source, then the observer may choose to add the special eyepiece shown in FIGS. 17E & 17F to the mobile apparatus as is shown in the preferred embodiment example in FIG. 44.

The top view of the preferred embodiment FIG. 36 of the mobile apparatus is similar to the top view shown in FIG. 32 for FIG. 30 and FIG. 31 showing two antennas, each one mounted on its respective swivel, wherein both antennas are deployed externally in a common groove, wherein the swivels are at the same end of the groove.

The top view of the preferred embodiment FIG. 36 of the mobile apparatus is similar to the top view shown in FIG. 33 for FIG. 30 and FIG. 31 showing two antennas, each one mounted on its respective swivel, wherein both antennas are deployed externally in a common groove, wherein the swivels are at opposite ends of the groove.

The mobile apparatus disclosed in FIG. 36 is configured for being attached to and compatible with the optical image source shown in FIG. 2.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The zoom lens module is for optically acquiring and transforming the afocal optical imagery from the optical image source, see FIG. 2, into focal optical imagery and for optically transferring the focal imagery to the electronic image sensor array camera module D18 for electronically transforming the focal optical imagery into electronic imagery signals.

The preferred embodiments of the mobile apparatus shown in FIG. 36 shows the modules configured in the form of a capital letter "T". The stem of the "T" is comprised of the clamping mechanism module D3, and the zoom lens module D31, and the electronic image sensor array camera module D18. The cross member of the "T" is comprised of the electronics circuit module D13 and the battery and electronics power control module D15.

The purpose of the "T" formation of the modules is to provide an ergonomic handle for the observer while handling the mobile apparatus during its deployment onto or off of the optical image sources. It also shortens the length of the mobile apparatus. It allows for the position of its center of gravity to be controlled. It also allows for the position of the microphone and speaker in the end cap modules D9 and D16 to be controlled.

The mobile apparatus shown in FIG. 36 is configured with a clamping mechanism module D3, a zoom lens module D31 and a electronic image sensor array camera module D18, a electronics circuit module D13, and battery and electronics power control module D15.

The method for attaching the mobile apparatus to the optical image source shown in FIG. 2 is as follows: Initially slide the front end D3 of the mobile apparatus over the outside diameter of the barrel of the optical image source.

Rotate the mobile apparatus about D1 until the top of the image coincides with the top of the image sensor array.

The precision clamping mechanism D2 is then manually tightened around the barrel of the optical image source using the knurled handgrip on D2 with a twist of the wrist.

Fine focus is achieved by operating the zoom lens electro-mechanical actuator D19.

Screw thread is shown in the figure as an example of a mechanical connecting means for mechanically connecting adjacent modular enclosures.

Screw thread is an example of a mechanical connecting means.

Screw threaded joints are a simple, inexpensive and space saving method especially for connecting enclosures having a cylindrical profile.

The front ends of the module's D3 and D31 and D18 cylindrical enclosures are under cut and threaded with female threads. The rear ends of the module's cylindrical enclosures are over cut and threaded with male threads. The rear ends of the module's cylindrical enclosures i.e. D3 mates with the front end of the module's cylindrical enclosure D31 in order to connect the two modules together.

Screw thread is given in the present invention as an example of a mechanical connecting means. Other mechanical connecting means are also appropriate i.e. snap-fit connections.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIG. 36 and FIG. 32 and FIG. 33 are identified as follows:

D1 is the optical and mechanical axis of the mobile apparatus.

D2 is the clamping mechanism module of the mobile apparatus wherein D2 is mounted inside of D3. D3 mounts and holds D2.

D3 is the clamping mechanism module's extension device of the mobile apparatus. D3 screws into D31 at D5. D3 mounts and holds D2.

When D3 is unscrewed and disconnected from D31, D5 enables the eyepiece module shown in FIGS. 17C and 17D to be screwed on to D31 at D5 enabling the mobile apparatus to accommodate optical image sources that are manufactured without their own original equipment eyepieces.

Also, when D2 is removed from D3, D4 enables the eyepiece module shown in FIGS. 17A and 17B to be screwed on to D3 at D4 for enabling the mobile apparatus to accommodate optical image sources that are manufactured without their own original equipment eyepieces.

D4 is a threaded joint for attaching the eyepiece shown if FIGS. 17A & 17B to D3.

D5 is the threaded joint between D3 and D31.

D6 is a zoom lens.

The zoom lens receives afocal imagery and transforms the afocal imagery into focal imagery at the electronic image sensor array. The zoom lens focuses the focal imagery on to D17. The effective focal length of the zoom lens is adjustable. The effective focal length of the zoom lens is controlled by the observer. The observer controls the magnification of the zoom lens by varying the effective focal length of the zoom lens. The observer can manually change the magnification of the zoom lens or change the magnification by operating the zoom lens electronic actuator.

The observer controls the size of the imagery on the image sensor array by controlling the magnification. The observer can adjust the size of the field of view of the imagery on the image sensor array by varying the magnification. The observer can capture the full field of view of the imagery on the aperture stop of the eyepiece by just filling the size of the image of the aperture stop onto the image sensor array. The observer can also vary the brightness of the image on the image sensor array by varying the effective focal length of the zoom lens and the magnification, thereby changing the f-number of the imagery on the image sensor array. The observer can increase the brightness of the imagery by reducing the zoom lens magnification. The observer can also vary the brightness of the imagery by actuating the iris diaphragm, either manually, or electronically by controlling the zoom lens electronic actuator. The observer can sharply focus the imagery on the image sensor array by operating the focus control on the zoom lens, either manually, or electronically by controlling the zoom lens electronic actuator.

The zoom lens functions are magnification control, iris diaphragm control, and focus control. When actuated manually by the observer, D23 controls the magnification of the zoom lens, D22 controls the iris diaphragm of the zoom lens, D20 controls the focus of the zoom lens.

The observer can maintain manual control of the zoom lens by rotating the adjustment rings by hand.

The observer is enabled to adjust the focus for objects whose distances to the optical image source may be changing during an observing session.

D7 is the threaded joint between D31 and D18.

D8 is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.

The electronic image sensor array camera as shown in the figure is comprised of a cover and an electronic image sensor array. The sensor array, for example is a CCD, CMOS or other sensor array type D9 is a threaded end cap module for access to, and maintenance of D13. D9 screws into D10. D9 is for protecting D13 from the environment. Details of the end cap module are shown in FIGS. 18A & 18B & 18C.

D10 is a "T" shaped housing. D10 has a cylindrically shaped aperture for housing D13 and D15. D10 has a mechanical means located substantially at the midpoint of its cylindrical length for connecting to D18 via D34 at the threaded joint D26.

D11 is a antenna swivel for antenna D12.

D12 is a antenna. D12 is deployed in D30.

D13 is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities.

Each one of the electronic circuits modules enables the observer to exercise different capabilities during an observing session.

The observer may choose to use an electronic circuits module which uses any one of the circuits described above in the figures in the mobile apparatus by simply loading the modular enclosure containing the circuit into D10 of the mobile apparatus.

D13 threads into and joins with D15. D13 and D15 have cylindrical enclosures and have equal outside diameters.

D14 is a heat sink for D13.

D15 is a battery and a power control module. D15 supplies electricity to all the mobile apparatus' electronics.

D16 is a threaded end cap module for access to, and maintenance of D15. D16 screws into D10. D16 is for protecting D15 from the environment. Details of the end cap module are shown in FIG. 18D.

D17 is a electronic optical image sensor array and its associated camera electronics.

D18 is the camera modular enclosure of the mobile apparatus, wherein D18 screws into D34 and D31.

D19 is the zoom lens D6 electro-mechanical actuator.

D19 is used by the observer to remotely control the functions of the zoom lens.

The zoom lens functions are magnification control, iris diaphragm control, and focus control.

When actuated by the observer, D19 mechanically rotates D23 to control the magnification of the zoom lens.

When actuated by the observer, D19 mechanically rotates D22 to control the iris diaphragm of the zoom lens.

When actuated by the observer, D19 mechanically rotates D20 to control the focus of the zoom lens.

The observer can still maintain control of the zoom lens by manually rotating the adjustment rings.

D20 is the zoom lens' focus control ring for the electro-mechanical actuator D6.

D21 is not shown.

D22 is the zoom lens' iris diaphragm control ring for the electro-mechanical actuator D6.

D23 is the zoom lens' magnification control ring for the electro-mechanical actuator D6.

D24 is not shown.

D25 is the mating of the threaded male rear end of the zoom lens, and the threaded female front end of the camera case for D17.

D26 is the threaded joint between D18 and D34.

D27 is not shown.

D28 is not shown.

D29 is not shown.

D30 is the antenna groove in D10 for storing and protecting antennas D12 and D32 prior to the observer unfolding and deploying antenna D12 and D32 using their swivels D11 and D33.

D31 is the zoom lens' modular enclosure of the mobile apparatus, wherein D31 screws into D18 and D3.

D32 is the mechanical axis of D10.

D33 is a antenna swivel (not shown).

Refer to FIG. 1 as a reference for the optical image source.

Initially D3 is slid over the outside diameter of the barrel of the optical images source.

The precision clamping mechanism D2 is then manually tightened around the barrel of the optical image source using the knurled handgrip on D2.

Fine focus is achieved by operating the zoom lens focus control ring D20 using D19.

Refer to FIG. 22A and FIG. 22B and FIG. 23A and FIG. 23B and FIG. 24 and FIG. 25 and FIG. 26A and FIG. 26B for the layout of a preferred embodiment of the mobile apparatus' clamping mechanism D2.

The body of the mobile apparatus is configured into a "T" formation. The stem of the "T" is comprised of modules D3, D31 and D18. The cross member of the "T" is comprised of elements D13 and D15, i.e. via enclosure D10. The stem of the "T" is fastened to the cross member of the "T" via D26. The modules D3, D31 and D18 of the stem are fastened together using D5, D7. The stem is configured with modules D3, D31 and D18 for easy replacement of D3, D31, D13, D15 and D18 for achieving versatility of the mobile apparatus to gain compatibility with the variety of different optical image sources it operates with over time.

The "T" formation has a plurality of benefits.

The mobile apparatus can be dissembled by unscrewing its modular enclosures from one another. The mobile apparatus can be reassembled by screwing its modular enclosures back together. In cases where the optical image sources have a permanently mounted original equipment eyepiece there is no need for the eyepiece so the eyepiece module has been easily unscrewed and removed from the front end of the mobile apparatus.

Substitution of eyepieces, zoom lenses, image sensor arrays or electronics circuits with other eyepieces, zoom lenses, image sensor arrays, or electronics circuits to better match the job, match the environment, match the object, and match the audience, etc. can be accomplished by disassembly of the mobile apparatus into its respective modules and substituting more appropriate modules in their place.

The zoom lens module D31 optically transforms the afocal image of the object from the optical image source into a focal image at D17 of D18.

The electronic image sensor array camera module D18 electronically transforms the focal image at D17 into electronic imagery signals, and the electronic circuits module D13 electronically transforms and transmits the electronic imagery signals from the output terminals of D13 and D9 and D16 to the observer and the observer's audience. The electronic imagery signals meet analog and/or digital protocols depending on the type of analog or digital electronics used by the observer in the electronic sensor array camera module D18 and the electronic circuits module D13.

FIG. 37

FIG. 37 shows a side view center section of the preferred embodiment FIG. 36 of the mobile apparatus showing two antennas, each one mounted on its respective swivel, both deployed externally in a common groove in the enclosure of the mobile apparatus, and showing the clamping mechanism module of the mobile apparatus holding a precision clamping mechanism. The preferred embodiment shown in FIG. 37 is for accommodating optical image sources that are manufactured with their own original equipment eyepieces.

If the optical image sources are manufactured with a removable original equipment eyepiece, and the observer chooses to remove the optical image source's original equipment eyepiece from the optical image source, then the observer may choose to add the special eyepiece shown in FIGS. 17E & 17F to the mobile apparatus as is shown in the preferred embodiment example in FIG. 44.

The mobile apparatus disclosed in FIG. 37 is configured for being attached to and compatible with the optical image source shown in FIG. 1 and FIG. 2.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The zoom lens module D31 is for optically acquiring and transforming the afocal optical imagery from the optical image source, see FIG. 2, into focal optical imagery and for optically transferring the focal imagery to the electronic image sensor array camera module D18 for electronically transforming the focal optical imagery into electronic imagery signals.

The preferred embodiments of the mobile apparatus shown in FIG. 37 shows the modules configured in the form of a capital letter "T". The stem of the "T" is comprised of the clamping mechanism module D3, and the zoom lens module D31, and the electronic image sensor array camera module D18. The cross member of the "T" is comprised of the electronics circuit module D13 and the battery and electronics power control module D15.

The purpose of the "T" formation of the modules is to provide an ergonomic handle for the observer while handling the mobile apparatus during its deployment onto or off of the optical image sources. It also shortens the length of the mobile apparatus. It allows for the position of its center of gravity to be controlled. It also allows for the position of the microphone and speaker in the end cap modules D9 and D16 to be controlled.

The mobile apparatus shown in FIG. 37 is configured with a clamping mechanism module D3, a zoom lens module D31 and a electronic image sensor array camera module D18, a electronics circuit module D13, and battery and electronics power control module D15.

The method for attaching the mobile apparatus to the optical image source shown in FIGS. 1 and 2 is as follows: Initially slide the front end D3 of the mobile apparatus over the outside diameter of the barrel of the optical image source.

Rotate the mobile apparatus about D1 until the top of the image coincides with the top of the image sensor array.

The precision clamping mechanism D2 is then manually tightened around the barrel of the optical image source using the knurled handgrip on D2 with a twist of the wrist.

Fine focus is achieved by operating the zoom lens electromechanical actuator D19.

Screw thread is shown in the figure as an example of a mechanical connecting means for mechanically connecting adjacent modular enclosures.

Screw thread is an example of a mechanical connecting means.

Screw threaded joints are a simple, inexpensive and space saving method especially for connecting enclosures having a cylindrical profile.

The front ends of the module's D3 and D31 and D18 cylindrical enclosures are under cut and threaded with female threads. The rear ends of the module's cylindrical enclosures are over cut and threaded with male threads. The rear ends of the module's cylindrical enclosures i.e. D3 mates with the front end of the module's cylindrical enclosure D31 in order to connect the two modules together.

Screw thread is given in the present invention as an example of a mechanical connecting means. Other mechanical connecting means are also appropriate i.e. snap-fit connections.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIG. 37 are identified as follows:

D1 is the optical and mechanical axis of the mobile apparatus.

D2 is the clamping mechanism of the mobile apparatus wherein D2 is mounted inside of D3. D3 mounts and holds D2.

D3 is the clamping mechanism module's extension device of the mobile apparatus. D3 screws into D31 at D5. D3 mounts and holds D2. When D3 is unscrewed and disconnected from D31, D5 enables the eyepiece module shown in FIGS. 17C and 17D to be screwed on to D31 at D5 enabling the mobile apparatus to accommodate optical image sources that are manufactured without their own original equipment eyepieces. Also, when D2 is removed from D3, D4 enables the eyepiece module shown in FIGS. 17A and 17B to be screwed on to D3 at D4 for enabling the mobile apparatus to accommodate optical image sources that are manufactured without their own original equipment eyepieces.

In cases where the optical image sources have a permanently mounted original equipment eyepiece there is no need for the eyepiece so the eyepiece module has been easily unscrewed and removed from the front end of the mobile apparatus.

D4 is a threaded joint for attaching the eyepiece shown if FIGS. 17A & 17B to D3.

D5 is the threaded joint between D3 and D31.

D6 is a zoom lens.

The zoom lens receives afocal imagery and transforms the afocal imagery into focal imagery. The zoom lens focuses the focal imagery onto D17. The effective focal length of the zoom lens is adjustable. The effective focal length of the zoom lens is controlled by the observer. The observer controls the magnification of the zoom lens by varying the effective focal length of the zoom lens. The observer can manually change the magnification of the zoom lens or change the magnification by operating the zoom lens electronic actuator.

The observer controls the size of the imagery on the image sensor array by controlling the magnification. The observer can adjust the size of the field of view of the imagery on the image sensor array by varying the magnification. The observer can capture the full field of view of the imagery on the aperture stop of the eyepiece by just filling the size of the image of the aperture stop onto the image sensor array. The observer can also vary the brightness of the image on the image sensor array by varying the effective focal length of the zoom lens and the magnification, thereby changing the f-number of the imagery on the image sensor array. The observer can increase the brightness of the imagery by reducing the zoom lens magnification. The observer can also vary the brightness of the imagery by actuating the iris diaphragm, either manually, or electronically by controlling the zoom lens electronic actuator. The observer can sharply focus the imagery on the image sensor array by operating the focus control on the zoom lens, either manually, or electronically by controlling the zoom lens electronic actuator.

D7 is the threaded joint between D31 and D18.

D8 is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.

The electronic image sensor array camera as shown in the figure is comprised of a cover and an electronic image sensor array. The sensor array, for example is a CCD, CMOS or other sensor array type.

D9 is a threaded end cap module for access to, and maintenance of D13. D9 screws into D10. D9 is for protecting D13 from the environment. Details of the end cap module are shown in FIGS. 18A & 18B & 18C.

D10 is a "T" shaped housing. D10 has a cylindrically shaped aperture for housing D13 and D15. D10 has a mechanical means located substantially at the midpoint of its cylindrical length for connecting to D18 via D34 at the threaded joint D26.

The mechanical axis of D18 is perpendicular to the mechanical axis of D10 i.e. the mechanical axis of D13 and D15.

D11 is a antenna swivel for D12.

D12 is a antenna. D12 is deployed in D30.

D13 is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities. Each one of the electronic circuits modules enables the observer to exercise different capabilities during an observing session. The observer may choose to use an electronic circuits module which uses any one of the circuits described above in the figures in the mobile apparatus by simply loading the modular enclosure containing the circuit into D10 of the mobile apparatus. D13 threads into and joins with D15. D13 and D15 have cylindrical enclosures and have equal outside diameters.

D14 is a heat sink for D13.

D15 is a battery and a power control module. D15 supplies electricity to all the mobile apparatus' electronics.

D16 is a threaded end cap module for access to, and maintenance of D15. D16 screws into D10. D16 is for protecting D15 from the environment. Details of the end cap module are shown in FIG. 18D.

D17 is a electronic optical image sensor array and its associated camera electronics.

D18 is the camera modular enclosure of the mobile apparatus, wherein D18 screws into D10 and D31.

D19 is the electro-mechanical zoom lens D6 actuator. D19 is used by the observer to remotely control the functions of the zoom lens.

The zoom lens functions are magnification control, iris diaphragm control, and focus control.

When actuated by the observer, D19 mechanically rotates D23 to control the magnification of the zoom lens.

When actuated by the observer, D19 mechanically rotates D22 to control the iris diaphragm of the zoom lens.

When actuated by the observer, D19 mechanically rotates D20 to control the focus of the zoom lens.

The observer can still maintain control of the zoom lens by manually rotating the adjustment rings.

D20 is not shown.
D21 is not shown.
D22 is not shown.
D23 is not shown.
D24 is not shown.

D25 is the mating of the threaded male rear end of the zoom lens D6, and the threaded female front end of the camera case D8.

D26 is the threaded joint between D18 and D34.
D27 is not shown.
D28 is not shown.
D29 is not shown.

D30 is the antenna groove in D10 for storing and protecting antennas D12 and D32 prior to the observer unfolding and deploying antenna D12 and D32 using their swivels D1/ and D33.

D31 is the zoom lens' modular enclosure of the mobile apparatus, wherein D31 screws into D18 and D3.

D32 is a antenna.

D33 is a antenna swivel for D32.

Refer to FIG. 1 as a reference for the optical image source.

Initially D3 is slid over the outside diameter of the barrel of the optical images source.

The precision clamping mechanism D2 is then manually tightened around the barrel of the optical images source using the knurled handgrip on D2.

Fine focus is achieved by operating the zoom lens focus control ring D20 using D19.

Refer to FIG. 22A and FIG. 22B and FIG. 23A and FIG. 23B and FIG. 24 and FIG. 25 and FIG. 26A and FIG. 26B for the layout of a preferred embodiment of the mobile apparatus' clamping mechanism D2.

The body of the mobile apparatus is configured into a "T" formation. The stem of the "T" is comprised of modules D3, D31 and D18. The cross member of the "T" is comprised of elements D13 and D15, i.e. via enclosure D10. The stem of the "T" is fastened to the cross member of the "T" via D26. The modules D3, D31 and D18 of the stem are fastened together using D5, D7. The stem is configured with modules D3, D31 and D18 for easy replacement of D3, D31, D13, D15 and D18 for achieving versatility of the mobile apparatus to gain compatibility with the variety of different optical image sources it operates with over time.

The "T" formation has a plurality of benefits.

The mobile apparatus can be dissembled by unscrewing its modular enclosures from one another. The mobile apparatus can be reassembled by screwing its modular enclosures back together.

Substitution of eyepieces, zoom lenses, image sensor arrays or electronics circuits with other eyepieces, zoom lenses, image sensor arrays, or electronics circuits to better match the job, match the environment, match the object, and match the audience, etc. can be accomplished by disassembly of the mobile apparatus into its respective modules and substituting more appropriate modules in their place.

The zoom lens module D31 optically transforms the afocal image of the object from the optical image source into a focal image at D17 of D18.

The electronic image sensor array camera module D18 electronically transforms the focal image at D17 into electronic imagery signals, and the electronic circuits module D13 electronically transforms and transmits the electronic imagery signals from the output terminals of D13 and D9 and D16 to the observer and the observer's audience. The electronic imagery signals meet analog and/or digital protocols depending on the type of analog or digital electronics used by the observer in the electronic sensor array camera module D18 and the electronic circuits module D13.

FIG. 38 and FIG. 39

FIG. 38 shows a side view center section of a layout of a preferred embodiment of a mobile apparatus, showing the clamping mechanism module of the mobile apparatus holding a precision clamping mechanism, and showing a manually operated zoom lens, and showing one antenna mounted on its respective swivel, deployed externally on the outside of the enclosure of the mobile apparatus. The preferred embodiment shown in FIG. 38 and FIG. 39 is for accommodating optical image sources that are manufactured with their own original equipment eyepieces. If the optical image sources are manufactured with a removable original equipment eyepiece, and the observer chooses to remove the optical image source's original equipment eyepiece from the optical image source, then the observer may choose to add the special eyepiece shown in FIGS. 17E & 17F to the mobile apparatus as is shown in the preferred embodiment example in FIG. 44.

FIG. 39 shows a end view center section of the preferred embodiment FIG. 38 of the mobile apparatus.

The mobile apparatus disclosed in FIG. 38 and FIG. 39 is configured for being attached to and compatible with the optical image source shown in FIG. 1 and FIG. 2.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The zoom lens module E31 is for optically acquiring and transforming the afocal optical imagery from the optical image source, see FIG. 2, into focal optical imagery and for optically transferring the focal imagery to the electronic image sensor array camera module E18 for electronically transforming the focal optical imagery into electronic imagery signals.

The preferred embodiments of the mobile apparatus shown in FIGS. 38 and 39 shows the modules configured in the form of a capital letter "T". The stem of the "T" is comprised of the clamping mechanism module E3, and the zoom lens module E31, and the electronic image sensor array camera module E18. The cross member of the "T" is comprised of the electronics circuit module E13 and the battery and electronics power control module E15.

The purpose of the "T" formation of the modules is to provide an ergonomic handle for the observer while handling the mobile apparatus during its deployment onto or off of the optical image sources. It also shortens the length of the mobile apparatus. It allows for the position of its center of gravity to be controlled. It also allows for the position of the microphone and speaker in the end cap modules E9 and E16 to be controlled.

The mobile apparatus shown in FIGS. 38 and 39 is configured with a clamping mechanism module E3, a zoom lens module E31 and a electronic image sensor array camera module E18, a electronics circuit module E13, and battery and electronics power control module E15.

The method for attaching the mobile apparatus to the optical image source shown in FIGS. 1 and 2 is as follows: Initially slide the front end E3 of the mobile apparatus over the outside diameter of the barrel of the optical image source.

Rotate the mobile apparatus about E1 until the top of the image coincides with the top of the image sensor array.

The precision clamping mechanism E2 is then manually tightened around the barrel of the optical image source using the knurled handgrip on E2 with a twist of the wrist.

Fine focus is achieved by manually operating the zoom lens focus control E20.

Screw thread is shown in the figure as an example of a mechanical connecting means for mechanically connecting adjacent modular enclosures. Screw thread is an example of a mechanical connecting means. Screw threaded joints are a simple, inexpensive and space saving method especially for connecting enclosures having a cylindrical profile.

The front ends of the module's E3 and E31 and E18 cylindrical enclosures are under cut and threaded with female threads. The rear ends of the module's cylindrical enclosures are over cut and threaded with male threads. The rear ends of the module's cylindrical enclosures i.e. E3 mates with the front end of the module's cylindrical enclosure E31 in order to connect the two modules together.

Screw thread is given in the present invention as an example of a mechanical connecting means. Other mechanical connecting means are also appropriate i.e. snap-fit connections.

The detailed physical elements disclosed in the drawings shown in FIG. 38 and FIG. 39 are identified as follows:

E1 is the optical and mechanical axis of the mobile apparatus.

E2 is the clamping mechanism of the mobile apparatus wherein E2 is mounted inside of E3. E3 mounts and holds E2.

E3 is the clamping mechanism module's extension device of the mobile apparatus. E3 screws into E31 at E5. E3 mounts and holds E2. When E3 is unscrewed and disconnected from E31, E5 enables the eyepiece module shown in FIGS. 17C and 17D to be screwed on to E31 at E5 enabling the mobile apparatus to accommodate optical image sources that are manufactured without their own original equipment eyepieces.

Also, when E2 is removed from E3, E4 enables the eyepiece module shown in FIGS. 17A and 17B to be screwed on to E3 at E4 for enabling the mobile apparatus to accommodate optical image sources that are manufactured without their own original equipment eyepieces.

E4 is a threaded joint for attaching the eyepiece shown in FIGS. 17A & 17B to E3.

E5 is a threaded joint between E3 and E31.

E6 is a zoom lens, wherein the zoom lens is manually operated.

The zoom lens receives afocal imagery and transforms the afocal imagery into focal imagery at the electronic image sensor array. The zoom lens focuses the focal imagery on to E17. The effective focal length of the zoom lens is adjustable. The effective focal length of the zoom lens is controlled by the observer. The observer controls the magnification of the zoom lens by varying the effective focal length of the zoom lens. The observer can manually change the magnification of the zoom lens or change the magnification by operating the zoom lens electronic actuator.

The observer controls the size of the imagery on the image sensor array by controlling the magnification. The observer can adjust the size of the field of view of the imagery on the image sensor array by varying the magnification. The observer can capture the full field of view of the imagery on the aperture stop of the eyepiece by just filling the size of the image of the aperture stop onto the image sensor array. The observer can also vary the brightness of the image on the image sensor array by varying the effective focal length of the zoom lens and the magnification, thereby changing the f-number of the imagery on the image sensor array. The observer can increase the brightness of the imagery by reducing the zoom lens magnification. The observer can also vary the brightness of the imagery by actuating the iris diaphragm, either manually, or electronically by controlling the zoom lens electronic actuator. The observer can sharply focus the imagery on the image sensor array by operating the focus control on the zoom lens, either manually, or electronically by controlling the zoom lens electronic actuator.

The zoom lens functions are magnification control, iris diaphragm control, and focus control.

When actuated manually by the observer, E23 controls the magnification of the zoom lens, E22 controls the iris diaphragm of the zoom lens, E21 controls the focus of the zoom lens.

The observer can maintain manual control of the zoom lens by rotating the adjustment rings by hand.

The observer is enabled to adjust the focus for objects whose distances to the optical image source may be changing during an observing session.

E7 is a threaded joint between E31 and E18.

E8 is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.

The electronic image sensor array camera as shown in the figure is comprised of a cover and an electronic image sensor array. The sensor array, for example is a CCD, CMOS or other sensor array type E9 is a threaded end cap module for access to, and maintenance of E13. E9 screws into E10. E9 is for protecting E13 from the environment. Details of the end cap module are shown in FIGS. 18A & 18B & 18C.

E10 is a "T" shaped housing. E10 has a cylindrically shaped aperture for housing E13 and E15. E10 has a mechanical means located substantially at the midpoint of its cylindrical length for connecting to E18 via E34 at the threaded joint E26.

The mechanical axis of E18 is perpendicular to the mechanical axis of E10 i.e. the mechanical axis of E13 and E15.

E11 is a antenna swivel.

E12 is a antenna. E12 is deployed externally to E10.

E13 is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities.

Each one of the electronic circuits modules enables the observer to exercise different capabilities during an observing session. The observer may choose to use an electronic circuits module which uses any one of the circuits described above in the figures in the mobile apparatus by simply loading the modular enclosure containing the circuit into E10 of the mobile apparatus. E13 threads into and joins with E15. E13 and E15 have cylindrical enclosures and have equal outside diameters.

E14 is a threaded joint between E35 and E36.

E15 is a battery and a power control module. E15 supplies electricity to all the mobile apparatus' electronics.

E16 is a threaded end cap module for access to, and maintenance of E15. E16 screws into E10. E16 is for protecting E15 from the environment. Details of the end cap module are shown in FIG. 18D.

E17 is a electronic optical image sensor array and its associated camera electronics.

E18 is the camera module's enclosure of the mobile apparatus, wherein E18 screws into E10 at E34.

E19 is a slot machined in E31 for E20.

E20 is the zoom lens manual focus control arm.

E21 is a slot machined in E31 for E22.

E22 is the zoom lens manual iris diaphragm control arm.

E23 is the zoom lens manual magnification control arm.

E24 is a slot machined in E31 for E23.

E25 is the mating of the threaded male rear end of the zoom lens E6, and the threaded female front end of the camera case E8.

E26 is the threaded joint between E18 and E34.

E27 is the zoom lens slot for the manual focus control arm E20.

E28 is the zoom lens slot for the manual iris diaphragm control arm E22.

E29 is the zoom lens slot for the manual magnification control arm E23.

E30 (not shown).

E31 is the zoom lens modular enclosure of the mobile apparatus, wherein E31 screws into E18 and E3.

E32 is the mechanical axis of E10.

E33 is not shown.

E34 is a threaded cylinder which is part of E10 linking E10 with E18.

E35 is the modular enclosure for E15.

E36 is the modular enclosure for the electronics circuits E13. Refer to FIG. 7, FIG. 8, FIG. 9, MG 10, and FIG. 11 for examples of the physical elements of the electronics circuits.

Refer to FIG. 1 as a reference for the optical image source.

Refer to FIG. 22A and FIG. 22B and FIG. 23A and FIG. 23B and FIG. 24 and FIG. 25 and FIG. 26A and FIG. 26B for the layout of a preferred embodiment of the mobile apparatus' clamping mechanism E2.

Initially E3 is slid over the outside diameter of the barrel of the optical images source.

The precision clamping mechanism E2 is then manually tightened around the barrel of the optical images source using the knurled handgrip on E2.

Fine focus is achieved by manually operating the zoom lens focus control arm E20.

E3, and E31 and E18 and E34 are cylindrically shaped units. E3, and E31 and E18 and E34 have the same outside diameters. E3, and E31 and E18 and E34 have the same thread sizes in order to enable them to be screwed together.

The body of the mobile apparatus is configured into a "T" formation. The stem of the "T" is comprised of modules E3, E31 and E18. The cross member of the "T" is comprised of elements E13 and E15, i.e. via enclosure E10. The stem of the "T" is fastened to the cross member of the "T" via E26. The modules E3, E31 and E18 of the stem are fastened together using E5, E7. The stem is configured with modules E3, E31 and E18 for easy replacement of E3, E31, E13, E15 and E18 for achieving versatility of the mobile apparatus to gain compatibility with the variety of different optical image sources it operates with over time.

The "T" formation has a plurality of benefits.

The mobile apparatus can be dissembled by unscrewing its modular enclosures from one another. The mobile apparatus can be reassembled by screwing its modular enclosures back together.

The "T" formation of the mobile apparatus has a plurality of benefits to the observer.

The first benefit is an ergonomic advantage.

The first benefit is the improved handling quality of the apparatus.

The "T" formation enables the observer to securely grip and manipulate the mobile apparatus.

This is especially useful in attaching the mobile apparatus to the optical image sources.

The cylindrical modular enclosures E35 and E36, for E15 and E13 respectively, are threaded and joined together at E14 and slip fitted as a unit into E10. The end cap modules E9 and E16 are then screwed onto E10.

In cases where the optical image sources have a permanently mounted original equipment eyepiece there is no need for the eyepiece so the eyepiece module has been easily unscrewed and removed from the front end of the mobile apparatus.

Substitution of eyepieces, zoom lenses, image sensor arrays or electronics circuits with other eyepieces, zoom lenses, image sensor arrays, or electronics circuits to better match the job, match the environment, match the object, and match the audience, etc. can be accomplished by disassembly of the mobile apparatus into its respective modules and substituting more appropriate modules in their place.

The zoom lens module E31 optically transforms the afocal image of the object from the optical image source into a focal image at E17 of E18.

The electronic image sensor array camera module E18 electronically transforms the focal image at E17 into electronic imagery signals, and the electronic circuits module E13 electronically transforms and transmits the electronic imagery signals from the output terminals of E13 and E9 and E16 to the observer and the observer's audience. The electronic imagery signals meet analog and/or digital protocols depending on the type of analog or digital electronics used by the observer in the electronic sensor array camera module E18 and the electronic circuits module E13.

FIG. 40 and FIG. 41 and FIG. 42 and FIG. 43A and FIG. 43B

FIG. 40 shows a side view center section of a layout of a preferred embodiment of a mobile apparatus, showing one antenna, mounted on its respective swivel, deployed externally on the outside of the enclosure of the mobile apparatus, and showing the clamping mechanism module of the mobile apparatus holding a precision clamping mechanism, and showing an electro-mechanical actuator operated zoom lens.

The preferred embodiment shown in FIG. 40 and FIG. 41 and FIG. 42 and FIG. 43A and FIG. 43B is for accommodating optical image sources that are manufactured with their own original equipment eyepieces.

FIG. 41 shows an end view center section of the preferred embodiment FIG. 40 of the mobile apparatus showing one antenna, mounted on its respective swivel, deployed externally on the outside of the enclosure of the mobile apparatus, and showing the clamping mechanism module of the mobile apparatus holding a precision clamping mechanism, and showing an electro-mechanical actuator operated zoom lens.

FIG. 42 shows an end view center section of the preferred embodiment FIG. 40 of the mobile apparatus showing two antennas, mounted on their respective swivels, deployed externally on the outside of the enclosure of the mobile apparatus, and showing the clamping mechanism module of the mobile apparatus holding a precision clamping mechanism, and showing an electro-mechanical actuator operated zoom lens.

FIG. 43A shows a top view of the preferred embodiment FIG. 40 of the mobile apparatus showing two antennas, mounted on their respective swivels, deployed externally on the outside of the enclosure of the mobile apparatus, where their swivels are side by side.

FIG. 43B shows a top view of the preferred embodiment FIG. 40 of the mobile apparatus showing two antennas, mounted on their respective swivels, deployed externally on the outside of the enclosure of the mobile apparatus, where their swivels are opposite one another.

If the optical image sources are manufactured with a removable original equipment eyepiece, and the observer chooses to remove the optical image source's original equipment eyepiece from the optical image source, then the observer may choose to add the special eyepiece shown in FIGS. 17E & 17F to the mobile apparatus as is shown in the preferred embodiment example in FIG. 44.

The mobile apparatus disclosed in FIG. 40 and FIG. 41 and FIG. 42 and FIGS. 43A & B is configured for being attached to and compatible with the optical image source shown in FIG. 1 and FIG. 2.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The zoom lens module is for optically acquiring and transforming the afocal optical imagery from the optical image source, see FIG. 2, into focal optical imagery and for optically transferring the focal imagery to the electronic image sensor array camera module F18 for electronically transforming the focal optical imagery into electronic imagery signals.

The preferred embodiments of the mobile apparatus shown in FIGS. 40, 41, 42, and 43 shows the modules configured in the form of a capital letter "T". The stem of the "T" is comprised of the clamping mechanism module F3, and the zoom lens module F31, and the electronic image sensor array camera module F18. The cross member of the "T" is comprised of the electronics circuit module F13 and the battery and electronics power control module F15.

The purpose of the "T" formation of the modules is to provide an ergonomic handle for the observer while handling the mobile apparatus during its deployment onto or off of the optical image sources. It also shortens the length of the mobile apparatus. It allows for the position of its center of gravity to be controlled. It also allows for the position of the microphone and speaker in the end cap modules F9 and F16 to be controlled.

The mobile apparatus shown in FIGS. 40, 41, 42 and 43 is configured with a clamping mechanism module F3, a zoom lens module F31 and a electronic image sensor array camera module F18, a electronics circuit module F13, and battery and electronics power control module F15.

The method for attaching the mobile apparatus to the optical image source shown in FIGS. 1 and 2 is as follows: Initially slide the front end F3 of the mobile apparatus over the outside diameter of the barrel of the optical image source.

Rotate the mobile apparatus about F1 until the top of the image coincides with the top of the image sensor array.

The precision clamping mechanism F2 is then manually tightened around the barrel of the optical image source using the knurled handgrip on F2 with a twist of the wrist.

Fine focus is achieved by operating the zoom lens electro-mechanical actuator F19.

Screw thread is shown in the figure as an example of a mechanical connecting means for mechanically connecting adjacent modular enclosures. Screw thread is an example of a mechanical connecting means. Screw threaded joints are a simple, inexpensive and space saving method especially for connecting enclosures having a cylindrical profile.

The front ends of the module's F3 and F31 and F18 cylindrical enclosures are under cut and threaded with female threads. The rear ends of the module's cylindrical enclosures are over cut and threaded with male threads. The rear ends of the module's cylindrical enclosures i.e. F3 mates with the front end of the module's cylindrical enclosure F31 in order to connect the two modules together.

Screw thread is given in the present invention as an example of a mechanical connecting means. Other mechanical connecting means are also appropriate i.e. snap-fit connections.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIG. 40 and FIG. 41 and FIG. 42 are identified as follows:

F1 is the optical and mechanical axis of the mobile apparatus.

F2 is the clamping mechanism of the mobile apparatus wherein F2 is mounted inside of F3. F3 mounts and holds F2.

F3 is the clamping mechanism module's extension device of the mobile apparatus. F3 screws into F31 at F5. F3 mounts and holds F2. When F3 is unscrewed and disconnected from F31, F5 enables the eyepiece module shown in FIGS. 17C and 17D to be screwed on to F31 at F5 enabling the mobile apparatus to accommodate optical image sources that are manufactured without their own original equipment eyepieces. Also, F4 enables the eyepiece module shown in FIGS. 17A and 17B to be screwed on to F3 at F4 for enabling the mobile apparatus to accommodate optical image sources that are manufactured without their own original equipment eyepieces. In cases where the optical image sources have a permanently mounted original equipment eyepiece there is no need for the eyepiece so the eyepiece module has been easily unscrewed and removed from the front end of the mobile apparatus.

F4 is a threaded joint for attaching the eyepiece shown in FIGS. 17A & 17B to F3.

F5 is the threaded joint between F3 and F31.

F6 is a zoom lens, wherein the zoom lens is operated using the electro-mechanical actuator F19.

The zoom lens receives afocal imagery and transforms the afocal imagery into focal imagery at the electronic image sensor array. The zoom lens focuses the focal imagery on to F17. The effective focal length of the zoom lens is adjustable. The effective focal length of the zoom lens is controlled by the observer. The observer controls the magnification of the zoom lens by varying the effective focal length of the zoom lens. The observer can manually change the magnification of the zoom lens or change the magnification by operating the zoom lens electronic actuator.

The observer controls the size of the imagery on the image sensor array by controlling the magnification. The observer can adjust the size of the field of view of the imagery on the image sensor array by varying the magnification. The observer can capture the full field of view of the imagery on the aperture stop of the eyepiece by just filling the size of the image of the aperture stop onto the image sensor array. The observer can also vary the brightness of the image on the image sensor array by varying the effective focal length of the zoom lens and the magnification, thereby changing the f-number of the imagery on the image sensor array. The observer can increase the brightness of the imagery by reducing the zoom lens magnification. The observer can also vary the brightness of the imagery by actuating the iris diaphragm, either manually, or electronically by controlling the zoom lens electronic actuator. The observer can sharply focus the imagery on the image sensor array by operating the focus control on the zoom lens, either manually, or electronically by controlling the zoom lens electronic actuator.

The zoom lens functions are magnification control, iris diaphragm control, and focus control. When actuated manually by the observer, F23 controls the magnification of the zoom lens, F22 controls the iris diaphragm of the zoom lens, F20 controls the focus of the zoom lens.

The observer can maintain manual control of the zoom lens by rotating the adjustment rings by hand.

The observer is enabled to adjust the focus for objects whose distances to the optical image source may be changing during an observing session.

F7 is the threaded joint between F31 and F18.

F8 is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.

The electronic image sensor array camera as shown in the figure is comprised of a cover and an electronic image sensor array. The sensor array, for example is a CCD, CMOS or other sensor array type.

F9 is a threaded end cap module for access to, and maintenance of F13. F9 screws into F10. F9 is for protecting F13 from the environment. Details of the end cap module are shown in FIGS. 18A & 18B & 18C.

F10 is a "T" shaped housing. F10 has a cylindrically shaped aperture for housing F13 and F15. F10 has a mechanical means located substantially at the midpoint of its cylindrical length for connecting to F18 via F34 at the threaded joint F26.

The mechanical axis of F18 is perpendicular to the mechanical axis of F10 i.e. the mechanical axis of F13 and F15.

F11 is a antenna swivel for antenna F12.

F12 is a antenna. F12 is deployed on F10.

F13 is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities.

Each one of the electronic circuits modules enables the observer to exercise different capabilities during an observing session. The observer may choose to use an electronic circuits module which uses any one of the circuits described above in the figures in the mobile apparatus by simply loading the modular enclosure containing the circuit into 10 of the mobile apparatus. F13 threads into and joins with F15. F13 and F15 have cylindrical enclosures and have equal outside diameters.

F14 is a threaded joint between F13 and F15.

F15 is a battery and a power control module. F15 supplies electricity to all the mobile apparatus' electronics.

F16 is a threaded end cap module for access to, and maintenance of F15. F16 screws into F10. F16 is for protecting F15 from the environment. Details of the end cap module are shown in FIG. 18D.

F17 is a electronic optical image sensor array and its associated camera electronics.

F18 is the camera F8 and F17 modular enclosure of the mobile apparatus, wherein F18 screws into F34 and F31.

F19 is the zoom lens' F6 electro-mechanical actuator.

F20 is the zoom lens' focus control ring for the electro-mechanical actuator F6.

F21 is not shown.

F22 is the zoom lens' iris diaphragm control ring for the electro-mechanical actuator F6.

F23 is the zoom lens' magnification control ring for the electro-mechanical actuator F6.

F24 is not shown.

F25 is the mating of the threaded male rear end of the zoom lens F6, and the threaded female front end of the camera case F8 for F17.

F26 is the threaded joint between F18 and F34.

F27 is not shown.

F28 is not shown.

F29 is not shown.

F30 is not shown.

F31 is the zoom lens' F6 modular enclosure of the mobile apparatus, wherein F31 screws into F18 and F3.

F32 is a antenna.

F33 is a antenna swivel of F32.

F34 is the threaded "T" connection to F10 for F18.

F35 is the modular enclosure for F12.

F36 is the modular enclosure for F13.

F37 is the mechanical axis of F10.

Refer to FIG. 1 as a reference for the optical image source.

Initially F3 together with F2 are slid over the outside diameter of the barrel of the optical images source.

The precision clamping mechanism F2 is then manually tightened around the barrel of the optical image source by the observer using the knurled handgrip on F2. Fine focus is achieved by operating the zoom lens focus control ring F20 using F19.

Refer to FIG. 22A and FIG. 22B and FIG. 23A and FIG. 23B and FIG. 24 and FIG. 25 and FIG. 26A and FIG. 26B for the layout of a preferred embodiment of the mobile apparatus' clamping mechanism F2.

The body of the mobile apparatus is configured into a "T" formation. The stem of the "T" is comprised of modules F3, F31, F39 and F18. The cross member of the "T" is comprised of elements F13 and F15, i.e. via enclosure F10. The stem of the "T" is fastened to the cross member of the "T" via F26. The modules F3, F31, F39 and F18 of the stem are fastened together using F5, F7. The stem is configured with modules F3, F31, F39 and F18 for easy replacement of F3, F31, F39, F13, F15 and F18 for achieving versatility of the mobile apparatus to gain compatibility with the variety of different optical image sources it operates with over time. The "T" formation has a plurality of benefits.

The mobile apparatus can be dissembled by unscrewing its modular enclosures from one another. The mobile apparatus can be reassembled by screwing its modular enclosures back together. Substitution of eyepieces, zoom lenses, image sensor arrays or electronics circuits with other eyepieces, zoom lenses, image sensor arrays, or electronics circuits to better match the job, match the environment, match the object, and match the audience, etc. can be accomplished by disassembly of the mobile apparatus into its respective modules and substituting more appropriate modules in their place. The zoom lens module F31 optically transforms the afocal image of the object from the optical image source into a focal image at F17 of F18. The electronic image sensor array camera module F18 electronically transforms the focal image at F17 into electronic imagery signals, and the electronic circuits module F13 electronically transforms and transmits the electronic imagery signals from the output terminals of F13 and F9 and F16 to the observer and the observer's audience. The electronic imagery signals meet analog and/or digital protocols depending on the type of analog or digital electronics used by the observer in the electronic sensor array camera module F18 and the electronic circuits module F13.

FIG. 44

FIG. 44 shows a side view center section of a layout of a preferred embodiment of a mobile apparatus, showing the clamping mechanism module of the mobile apparatus holding a precision clamping mechanism. The preferred embodiment shown in FIG. 44 is for accommodating optical image sources that are manufactured without their own original equipment eyepieces.

Also, if the optical image sources are manufactured with their own original equipment eyepieces, and their original equipment eyepiece are removable, then the observer may choose to remove the original equipment eyepiece from the optical image source and use the mobile apparatus configured according to FIG. 44 with the special eyepiece module shown in FIG. 17E &17F.

If the optical image source already is configured with a field stop, then the special eyepiece's field stop is unnecessary and will be unscrewed and removed from the special eyepiece, and the optical image source's field stop will be used instead.

The mobile apparatus disclosed in FIG. 44 is configured for being attached to and compatible with the optical image source shown in FIG. 1 and FIG. 2.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The eyepiece module G35 is for optically acquiring and transforming and transferring the focal optical imagery from the optical image source into afocal optical imagery to the zoom lens module G31.

The zoom lens module is for optically transforming the afocal optical imagery into focal optical imagery and for optically transferring the focal imagery to the electronic image sensor array camera module G18 for electronically transforming the focal optical imagery into electronic imagery signals.

The preferred embodiments of the mobile apparatus shown in FIGS. 40, 41, 42, and 43 shows the modules configured in the form of a capital letter "T". The stem of the "T" is comprised of the clamping mechanism module G3, and the eyepiece module G35, and the zoom lens module G31, and the electronic image sensor array camera module G18. The cross member of the "T" is comprised of the electronics circuit module G13 and the battery and electronics power control module G15.

The purpose of the "T" formation of the modules is to provide an ergonomic handle for the observer while handling the mobile apparatus during its deployment onto or off of the optical image sources. It also shortens the length of the mobile apparatus. It allows for the position of its center of gravity to be controlled. It also allows for the position of the microphone and speaker in the end cap modules G9 and G16 to be controlled.

The mobile apparatus shown in FIGS. 40, 41, 42 and 43 is configured with a clamping mechanism module G3, a eyepiece module G35, a zoom lens module G31 and a electronic image sensor array camera module G18, a electronics circuit module G13, and battery and electronics power control module G15.

The method for attaching the mobile apparatus to the optical image source shown in FIGS. 1 and 2 is as follows: Initially slide the front end 3 of the mobile apparatus over the outside diameter of the barrel of the optical image source.

Rotate the mobile apparatus about 1 until the top of the image coincides with the top of the image sensor array.

The precision clamping mechanism G2 is then manually tightened around the barrel of the optical image source using the knurled handgrip on G2 with a twist of the wrist.

Fine focus is achieved by the observer operating the zoom lens focus control G20 manually.

Screw thread is shown in the figure as an example of a mechanical connecting means for mechanically connecting adjacent modular enclosures. Screw thread is an example of a mechanical connecting means. Screw threaded joints are a simple, inexpensive and space saving method especially for connecting enclosures having a cylindrical profile. The front ends of the module's G3 and G31 and G18 cylindrical enclosures are under cut and threaded with female threads. The rear ends of the module's cylindrical enclosures are over cut and threaded with male threads. The rear ends of the module's cylindrical enclosures i.e. G3 mates with the front end of the module's cylindrical enclosure G31 in order to connect the two modules together.

Screw thread is given in the present invention as an example of a mechanical connecting means. Other mechanical connecting means are also appropriate i.e. snap-fit connections.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The top view of the preferred embodiment FIG. 44 of the mobile apparatus is similar to FIG. 29 showing one antenna mounted on a swivel, and deployed externally in a groove in the enclosure of the mobile apparatus.

The detailed physical elements disclosed in the drawings shown in FIG. 44 and FIG. 29 are identified as follows:

G1 is the optical and mechanical axis of the mobile apparatus.

G2 is the clamping mechanism of the mobile apparatus wherein G2 is mounted inside of G3. G3 mounts and holds G2.

G3 is the clamping mechanism module's extension device of the mobile apparatus. G3 screws into G31 at G5. G3 mounts and holds G2.

When G3 is unscrewed and disconnected from G31, G5 enables the eyepiece module shown in FIGS. 17C and 17D to be screwed on to G31 at G5 enabling the mobile apparatus to accommodate optical image sources that are manufactured without their own original equipment eyepieces.

Also, G4 enables the eyepiece module shown in FIGS. 17A and 17B to be screwed on to G3 at G4 for enabling the mobile apparatus to accommodate optical image sources that are manufactured without their own original equipment eyepieces.

G4 is a threaded joint for attaching the eyepiece shown if FIGS. 17A & 17B to G3.

G5 is a threaded joint between G3 and G31.

G6 is a zoom lens.

The zoom lens receives afocal imagery and transforms the afocal imagery into focal imagery at the electronic image sensor array. The zoom lens focuses the focal imagery on to G17. The effective focal length of the zoom lens is adjustable. The effective focal length of the zoom lens is controlled by the observer. The observer controls the magnification of the zoom lens by varying the effective focal length of the zoom lens. The observer can manually change the magnification of the zoom lens or change the magnification by operating the zoom lens electronic actuator.

The observer controls the size of the imagery on the image sensor array by controlling the magnification. The observer can adjust the size of the field of view of the imagery on the image sensor array by varying the magnification. The observer can capture the full field of view of the imagery on the aperture stop of the eyepiece by just filling the size of the image of the aperture stop onto the image sensor array. The observer can also vary the brightness of the image on the image sensor array by varying the effective focal length of the zoom lens and the magnification, thereby changing the f-number of the imagery on the image sensor array. The observer can increase the brightness of the imagery by reducing the zoom lens magnification. The observer can also vary the brightness of the imagery by actuating the iris diaphragm, either manually, or electronically by controlling the zoom lens electronic actuator. The observer can sharply focus the imagery on the image sensor array by operating the focus control on the zoom lens, either manually, or electronically by controlling the zoom lens electronic actuator.

The zoom lens functions are magnification control, iris diaphragm control, and focus control.

When actuated manually by the observer, G23 controls the magnification of the zoom lens, G22 controls the iris diaphragm of the zoom lens, G21 controls the focus of the zoom lens.

The observer can maintain manual control of the zoom lens by rotating the adjustment rings by hand.

The observer is enabled to adjust the focus for objects whose distances to the optical image source may be changing during an observing session.

G7 is a threaded joint between G31 and G18.

G8 is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.

The electronic image sensor array camera as shown in the figure is comprised of a cover and an electronic image sensor array. The sensor array, for example is a CCD, CMOS or other sensor array type.

G9 is a threaded end cap module for access to, and maintenance of G13. G9 screws into G10. G9 is for protecting G13 from the environment. Details of the end cap module are shown in FIGS. 18A & 18B & 18C.

G10 is a "T" shaped housing. G10 has a cylindrically shaped aperture for housing G13 and G15. G10 has a mechanical means located substantially at the midpoint of its cylindrical length for connecting to G18 via G34 at the threaded joint G26.

The mechanical axis of G18 is perpendicular to the mechanical axis of G10 i.e. the mechanical axis of G13 and G15.

G11 is a antenna swivel.

G12 is a antenna. G12 is deployed in G30.

G13 is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities. Each one of the electronic circuits modules enables the observer to exercise different capabilities during an observing session. The observer may choose to use an electronic circuits module which uses any one of the circuits described above in the figures in the mobile apparatus by simply loading the modular enclosure containing the circuit into G10 of the mobile apparatus.

G13 threads into and joins with G15. G13 and G15 have cylindrical enclosures and have equal outside diameters.

G14 is a heat sink for G13.

G15 is a battery and a power control module. G15 supplies electricity to all the mobile apparatus' electronics.

G16 is a threaded end cap module for access to, and maintenance of G15. G16 screws into G10. G16 is for protecting G15 from the environment. Details of the end cap module are shown in FIG. 18D.

G17 is a optical image sensor array and its associated camera electronics.

G18 is the camera threaded modular enclosure of the mobile apparatus, wherein G18 screws into G10.

G19 is a slot machined in G31 for G20.

G20 is the zoom lens manual focus control arm.

G21 is a slot machined in G31 for G22.

G22 is the zoom lens manual iris diaphragm control arm.

G23 is the zoom lens manual magnification control arm.

G24 is a slot machined in G31 for G23.

G25 is the mating of the threaded male rear end of the zoom lens G6, and the threaded female front end of the camera case G8.

G26 is the threaded joint between G18 and G34.

G27 is the zoom lens slot for the manual focus control arm G20.

G28 is the zoom lens slot for the manual iris diaphragm control arm G22.

G29 is the zoom lens slot for the manual magnification control arm G23.

G30 is the antenna groove in G10 for storing and protecting antennas G12 prior to the observer unfolding and deploying antenna G12 and using its swivel G11.

G31 is the zoom lens modular enclosure of the mobile apparatus, wherein G31 screws into G18 and G3.

G32 is the mechanical axis of G10.

G33 is the centerline of one of four typical radial shim slots disposed around the peripheral diameter of G3 at ninety degree intervals for shims, as needed, for tilting the eyepiece housing relative to G3, for correcting for any misalignment and centering errors found in the optical system of the optical image source to which the mobile apparatus is attached. G33 is also the centerline of one of four shim slots in the eyepiece housing shown in FIGS. 17E & 17F.

Shims, as needed, are placed into the slots in G3 by the observer and pass through the slots in G3 and go through their eyepiece slot counterparts radially opposite them shown in FIGS. 17E & 17F.

G34 is a threaded cylinder of G10 linking G10 with G18 at joint G26.

G35 is the threaded housing of the special eyepiece of the mobile apparatus shown in FIGS. 17E & 17F.

G36 is the threaded end of G35 screwed into G3.

Refer to FIG. 1 as a reference for the optical image source.

Refer to FIG. 22A and FIG. 22B and FIG. 23A and FIG. 23B and FIG. 24 and FIG. 25 and FIG. 26A and FIG. 26B for the layout of a preferred embodiment of the mobile apparatus' clamping mechanism G2.

Initially G3 is slid over the outside diameter of the barrel of the optical images source.

The precision clamping mechanism G2 is then manually tightened around the barrel of the optical images source using the knurled handgrip on G2.

Fine focus is achieved by manually operating the zoom lens focus control arm G20.

G3, and G31 and G18 and G34 are cylindrically shaped units. G3, and G31 and G18 and G34 have the same outside diameters. G3, and G31 and G18 and G34 have the same thread sizes in order to enable them to be screwed together.

The body of the mobile apparatus is configured into a "T" formation. The stem of the "T" is comprised of modules G3, G31, G39 and G18. The cross member of the "T" is comprised of elements G13 and G15, i.e. via enclosure G10. The stem of the "T" is fastened to the cross member of the "T" via G26. The modules G3, G31, G39 and G18 of the stem are fastened together using G5, G7. The stem is configured with modules G3, G31, G39 and G18 for easy replacement of G3, G31, G39, G13, G15 and G18 for achieving versatility of the mobile apparatus to gain compatibility with the variety of different optical image sources it operates with over time. The "T" formation has a plurality of benefits. The mobile apparatus can be dissembled by unscrewing its modular enclosures from one another. The mobile apparatus can be reassembled by screwing its modular enclosures back together.

The "T" formation of the mobile apparatus has a plurality of benefits to the observer.

The first benefit is an ergonomic advantage.

The first benefit is the improved handling quality of the apparatus.

The "T" formation enables the observer to securely grip and manipulate the mobile apparatus. This is especially useful in attaching the mobile apparatus to the optical image sources.

The electronics circuits module G13 is a unit that slip fits into G10.

Substitution of eyepieces, zoom lenses, image sensor arrays or electronics circuits with other eyepieces, zoom lenses, image sensor arrays, or electronics circuits to better match the job, match the environment, match the object, and match the audience, etc. can be accomplished by disassembly of the mobile apparatus into its respective modules and substituting more appropriate modules in their place.

The eyepiece module G2 optically acquires the optical image source's focal image of the object and optically transforms the focal image into a afocal image and optically transfers the afocal image to the zoom lens module G31 which optically transforms the afocal image into a focal image at G17 of G18.

The electronic image sensor array camera module G18 electronically transforms the focal image at G17 into electronic imagery signals, and the electronic circuits module G13 electronically transforms and transmits the electronic imagery signals from the output terminals of G13 and G9 and G16 to the observer and the observer's audience. The electronic imagery signals meet analog and/or digital protocols depending on the type of analog or digital electronics used by the observer in the electronic sensor array camera module G18 and the electronic circuits module G13.

FIG. 45

FIG. 45 shows a side view center section of a layout of a preferred embodiment of a mobile apparatus, showing one antenna, mounted on its respective swivel, deployed externally on the outside of the enclosure of the mobile apparatus, and showing the clamping mechanism module of the mobile apparatus holding a precision clamping mechanism, and showing an electro-mechanical actuator operated zoom lens.

If the optical image sources are manufactured with a removable original equipment eyepiece, and the observer chooses to remove the optical image source's original equipment eyepiece from the optical image source, then the observer may choose to add the special eyepiece module shown in FIGS. 17E & 17F to the mobile apparatus as is shown in the preferred embodiment example in FIG. 45. Therefore the preferred embodiment shown in FIG. 45 enables observers to accommodate for optical image sources that are manufactured with removable original equipment eyepieces.

If the optical image source already is configured with a field stop, then the special eyepiece's field stop is unnecessary and will be unscrewed and removed from the special eyepiece, and the optical image source's field stop will be used instead.

FIG. 43B shows a top view of the preferred embodiment FIG. 45 of the mobile apparatus showing two antennas, mounted on their respective swivels, deployed externally on the outside of the enclosure of the mobile apparatus, where their swivels are opposite one another.

The mobile apparatus disclosed in FIG. 45 is configured for being attached to and compatible with the optical image source shown in FIG. 1 and FIG. 2.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The eyepiece module H39 is for optically acquiring and transforming and transferring the focal optical imagery from the optical image source into afocal optical imagery to the zoom lens module H31.

The zoom lens module is for optically transforming the afocal optical imagery into focal optical imagery and for optically transferring the focal imagery to the electronic image sensor array camera module H18 for electronically transforming the focal optical imagery into electronic imagery signals.

The preferred embodiments of the mobile apparatus shown in FIG. 45 shows the modules configured in the form of a capital letter "T". The stem of the "T" is comprised of the clamping mechanism module H3, and the eyepiece module H39, and the zoom lens module H31, and the electronic image sensor array camera module H18. The cross member of the "T" is comprised of the electronics circuit module H13 and the battery and electronics power control module H15.

The purpose of the "T" formation of the modules is to provide an ergonomic handle for the observer while handling the mobile apparatus during its deployment onto or off of the optical image sources. It also shortens the length of the mobile apparatus. It allows for the position of its center of gravity to be controlled. It also allows for the position of the microphone and speaker in the end cap modules H9 and H16 to be controlled.

The mobile apparatus shown in FIG. 45 is configured with a clamping mechanism module H3, a eyepiece module H39, a zoom lens module H31 and a electronic image sensor array camera module H18, a electronics circuit module H13, and battery and electronics power control module H15.

The method for attaching the mobile apparatus to the optical image source shown in FIGS. 1 and 2 is as follows: Initially slide the front end H3 of the mobile apparatus over the outside diameter of the barrel of the optical image source.

Rotate the mobile apparatus about H1 until the top of the image coincides with the top of the image sensor array.

The precision clamping mechanism H2 is then manually tightened around the barrel of the optical image source using the knurled handgrip on H2 with a twist of the wrist.

Fine focus is achieved by the operator operating the zoom lens electro-mechanical actuator H19.

Screw thread is shown in the figure as an example of a mechanical connecting means for mechanically connecting adjacent modular enclosures. Screw thread is an example of a mechanical connecting means.

Screw threaded joints are a simple, inexpensive and space saving method especially for connecting enclosures having a cylindrical profile. The front ends of the module's H3 and H31 and H18 cylindrical enclosures are under cut and threaded with female threads. The rear ends of the module's cylindrical enclosures are over cut and threaded with male threads. The rear ends of the module's cylindrical enclosures i.e. H3 mates with the front end of the module's cylindrical enclosure H31 in order to connect the two modules together.

Screw thread is given in the present invention as an example of a mechanical connecting means. Other mechanical connecting means are also appropriate i.e. snap-fit connections.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIG. 45 are identified as follows:

H1 is the optical and mechanical axis of the mobile apparatus.

H2 is the clamping mechanism of the mobile apparatus wherein H2 is mounted inside of H3. H3 mounts and holds H2.

H3 is the clamping mechanism module's extension device of the mobile apparatus. H3 screws into H31 at H5. H3 mounts and holds H2.

When H3 is unscrewed and disconnected from H31, H5 enables the eyepiece module shown in FIGS. 17C and 17D to be screwed on to H31 at H5 enabling the mobile apparatus to accommodate optical image sources that are manufactured without their own original equipment eyepieces.

Also, H4 enables the eyepiece module shown in FIGS. 17A and 17B to be screwed on to H3 at H4 for enabling the mobile apparatus to accommodate optical image sources that are manufactured without their own original equipment eyepieces.

H4 is a threaded joint for attaching the eyepiece shown if FIGS. 17A & 17B to H3.

H5 is the threaded joint between H3 and H31.

H6 is a zoom lens, wherein the zoom lens is operated using the electro-mechanical actuator H19.

The zoom lens receives afocal imagery and transforms the afocal imagery into focal imagery at the electronic image sensor array. The zoom lens focuses the focal imagery on to H17. The effective focal length of the zoom lens is adjustable. The effective focal length of the zoom lens is controlled by the observer. The observer controls the magnification of the zoom lens by varying the effective focal length of the zoom lens. The observer can manually change the magnification of the zoom lens or change the magnification by operating the zoom lens electronic actuator.

The observer controls the size of the imagery on the image sensor array by controlling the magnification. The observer can adjust the size of the field of view of the imagery on the image sensor array by varying the magnification. The observer can capture the full field of view of the imagery on the aperture stop of the eyepiece by just filling the size of the image of the aperture stop onto the image sensor array. The observer can also vary the brightness of the image on the image sensor array by varying the effective focal length of the zoom lens and the magnification, thereby changing the f-number of the imagery on the image sensor array. The observer can increase the brightness of the imagery by reducing the zoom lens magnification. The observer can also vary the brightness of the imagery by actuating the iris diaphragm, either manually, or electronically by controlling the zoom lens electronic actuator. The observer can sharply focus the imagery on the image sensor array by operating the focus control on the zoom lens, either manually, or electronically by controlling the zoom lens electronic actuator.

The zoom lens functions are magnification control, iris diaphragm control, and focus control.

When actuated manually by the observer, H23 controls the magnification of the zoom lens, H22 controls the iris diaphragm of the zoom lens, H20 controls the focus of the zoom lens.

The observer can maintain manual control of the zoom lens by rotating the adjustment rings by hand.

The observer is enabled to adjust the focus for objects whose distances to the optical image source may be changing during an observing session.

H7 is the threaded joint between H31 and H18.

H8 is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.

The electronic image sensor array camera as shown in the figure is comprised of a cover and an electronic image sensor array. The sensor array, for example is a CCD, CMOS or other sensor array type.

H9 is a threaded end cap module for access to, and maintenance of H13. H9 screws into H10. H9 is for protecting H13 from the environment. Details of the end cap module are shown in FIGS. 18A & 18B & 18C.

H10 is a "T" shaped housing. H10 has a cylindrically shaped aperture for housing H13 and H15. H10 has a mechanical means located substantially at the midpoint of its cylindrical length for connecting to H18 via H34 at the threaded joint H26.

The mechanical axis of H18 is perpendicular to the mechanical axis of H10 i.e. the mechanical axis of H13 and H15.

H11 is an antenna swivel for antenna H12.

H12 is a antenna. H12 is deployed on H10.

H13 is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities.

Each one of the electronic circuits modules enables the observer to exercise different capabilities during an observing session.

The observer may choose to use an electronic circuits module which uses any one of the circuits described above in the figures in the mobile apparatus by simply loading the modular enclosure containing the circuit into H10 of the mobile apparatus.

H13 threads into and joins with H15. H13 and H15 have cylindrical enclosures and have equal outside diameters.

H14 is a threaded joint between H13 and H15.

H15 is a battery and a power control module. H15 supplies electricity to all the mobile apparatus' electronics.

H16 is a threaded end cap module for access to, and maintenance of H15. H16 screws into H10. H16 is for protecting H15 from the environment. Details of the end cap module are shown in FIG. 18D.

H17 is a electronic optical image sensor array and its associated camera electronics.

H18 is the camera H8 and H17 modular enclosure of the mobile apparatus, wherein H18 screws into H34 and H31.

H19 is the zoom lens' H6 electro-mechanical actuator.

H19 is used by the observer to remotely control the functions of the zoom lens.

The zoom lens functions are magnification control, iris diaphragm control, and focus control.

When actuated by the observer, H19 mechanically rotates H23 to control the magnification of the zoom lens.

When actuated by the observer, H19 mechanically rotates H22 to control the iris diaphragm of the zoom lens.

When actuated by the observer, H19 mechanically rotates H20 to control the focus of the zoom lens.

The observer can still maintain control of the zoom lens by manually rotating the adjustment rings.

H20 is the zoom lens' focus control ring for the electro-mechanical actuator H6.

H21 is not shown.

H22 is the zoom lens' iris diaphragm control ring for the electro-mechanical actuator H6.

H23 is the zoom lens' magnification control ring for the electro-mechanical actuator H6.

H24 is not shown.

H25 is the mating of the threaded male rear end of the zoom lens H6, and the threaded female front end of the camera case H8 for H17.

H26 is the threaded joint between H18 and H34.

H27 is not shown.

H28 is not shown.

H29 is not shown.

H30 is the centerline of one of four typical radial shim slots disposed around the peripheral diameter of H3 at ninety degree intervals for shims, as needed, for tilting the eyepiece housing relative to H3, for correcting for any misalignment and centering errors found in the optical system of the optical image source to which the mobile apparatus is attached. H33 is also the centerline of one of four shim slots in the eyepiece housing shown in FIGS. 17E & 17F.

Shims, as needed, are placed into the slots in H3 by the observer and pass through the slots in H3 and go through their eyepiece slot counterparts radially opposite them shown in FIGS. 17E & 17F.

H31 is the zoom lens' H6 modular enclosure of the mobile apparatus, wherein H31 screws into H18 and H3.

H32 is a antenna.

H33 is a antenna swivel of H32.

H34 is the threaded "T" connection to H10 for H18.

H35 is the modular enclosure for H12.

H36 is the modular enclosure for H13.

H37 is the mechanical axis of H10.

Refer to FIG. 1 as a reference for the optical image source.

Initially H3 is slid over the outside diameter of the barrel of the optical images source.

The precision clamping mechanism H2 is then manually tightened around the barrel of the optical image source using the knurled handgrip on H2.

Fine focus is achieved by operating the zoom lens focus control ring H20 using H19.

Refer to FIG. 22A and FIG. 22B and FIG. 23A and FIG. 23B and FIG. 24 and FIG. 25 and FIG. 26A and FIG. 26B for the layout of a preferred embodiment of the mobile apparatus' clamping mechanism H2.

The body of the mobile apparatus is configured into a "T" formation. The stem of the "T" is comprised of modules H3, H31, H39 and H18. The cross member of the "T" is comprised of elements H13 and H15, i.e. via enclosure H10. The stem of the "T" is fastened to the cross member of the "T" via H26. The modules H3, H31, H39 and H18 of the stem are fastened together using H5, H7. The stem is configured with modules H3, H31, H39 and H18 for easy replacement of H3, H31, H39, H13, H15 and H18 for achieving versatility of the mobile apparatus to gain compatibility with the variety of different optical image sources it operates with over time. The "T" formation has a plurality of benefits.

Substitution of eyepieces, zoom lenses, image sensor arrays or electronics circuits with other eyepieces, zoom lenses, image sensor arrays, or electronics circuits to better match the job, match the environment, match the object, and match the audience, etc. can be accomplished by disassembly of the mobile apparatus into its respective modules and substituting more appropriate modules in their place.

The eyepiece module H2 optically acquires the optical image source's focal image of the object and optically transforms the focal image into a afocal image and optically transfers the afocal image to the zoom lens module H31 which optically transforms the afocal image into a focal image at H17 of H18.

The electronic image sensor array camera module H18 electronically transforms the focal image at H17 into electronic imagery signals, and the electronic circuits module H13 electronically transforms and transmits the electronic imagery signals from the output terminals of H13 and H9 and H16 to the observer and the observer's audience. The electronic imagery signals meet analog and/or digital protocols depending on the type of analog or digital electronics used by the observer in the electronic sensor array camera module H18 and the electronic circuits module H13.

FIG. 46

FIG. 46 shows a preferred embodiment of a mobile apparatus that is shown in FIG. 42, clamping and attached to the barrel of the optical image source referred to in FIG. 2.

FIG. 46 shows an end view center section of the mobile apparatus configured with two antennas mounted on their respective swivels, deployed externally on the outside of the enclosure of the mobile apparatus, and showing the clamping mechanism module of the mobile apparatus holding a precision clamping mechanism, and showing an electro-mechanical actuator operated zoom lens.

The method for attaching the mobile apparatus to the optical image source shown in FIG. 2 is as follows:

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The zoom lens module i31 is for optically acquiring and transforming the afocal optical imagery from the optical image source into focal optical imagery and for optically transferring the focal imagery to the electronic image sensor array camera module i18 for electronically transforming the focal optical imagery into electronic imagery signals.

The preferred embodiments of the mobile apparatus shown in FIG. 46 shows the modules configured in the form of a capital letter "T". The stem of the "T" is comprised of the clamping mechanism module i3, and the eyepiece module i39, and the zoom lens module i31, and the electronic image sensor array camera module i18. The cross member of the "T" is comprised of the electronics circuit module i13 and the battery and electronics power control module i15.

The purpose of the "T" formation of the modules is to provide an ergonomic handle for the observer while handling the mobile apparatus during its deployment onto or off of the optical image sources. It also shortens the length of the mobile apparatus. It allows for the position of its center of gravity to be controlled. It also allows for the position of the microphone and speaker in the end cap modules i9 and i16 to be controlled.

The mobile apparatus shown in FIG. 46 is configured with a clamping mechanism module i3, a zoom lens module i31 and a electronic image sensor array camera module i18, a electronics circuit module i13, and battery and electronics power control module i15.

The method for attaching the mobile apparatus to the optical image source shown in FIG. 2 is as follows: Initially slide the front end i3 of the mobile apparatus over the outside diameter of the barrel of the optical image source.

Rotate the mobile apparatus about i1 until the top of the image coincides with the top of the image sensor array.

The precision clamping mechanism i2 is then manually tightened around the barrel i9 of the optical image source using the knurled handgrip on i2 with a twist of the wrist.

Fine focus is achieved by the observer by operating the zoom lens electro-mechanical actuator i19.

Screw thread is shown in the figure as an example of a mechanical connecting means for mechanically connecting adjacent modular enclosures. Screw thread is an example of a mechanical connecting means. Screw threaded joints are a simple, inexpensive and space saving method especially for connecting enclosures having a cylindrical profile.

The front ends of the module's i3 and i31 and i18 cylindrical enclosures are under cut and threaded with female threads.

The rear ends of the module's cylindrical enclosures are over cut and threaded with male threads. The rear ends of the module's cylindrical enclosures i.e. i3 mates with the front end of the module's cylindrical enclosure i31 in order to connect the two modules together.

Screw thread is given in the present invention as an example of a mechanical connecting means. Other mechanical connecting means are also appropriate i.e. snap-fit connections. In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIG. 46 are identified as follows:

i1 is the optical and mechanical axis of the mobile apparatus.

i2 is the clamping mechanism of the mobile apparatus wherein i2 is mounted inside of i3. i3 mounts and holds i2. The clamping mechanism module i3 is for attaching the mobile apparatus to the optical image sources.

i3 is the clamping mechanism module extension device of the mobile apparatus. i3 screws into i31 at i5. i3 mounts and holds i2.

i4 is a threaded joint for attaching the eyepiece shown if FIGS. 17A & 17B to i3 in other preferred embodiments as needed.

i5 is the threaded joint between i3 and i31.

i6 is a zoom lens, wherein the zoom lens is operated using the electro-mechanical actuator i19.

The zoom lens receives afocal imagery and transforms the afocal imagery into focal imagery. The zoom lens focuses the focal imagery onto i17. The effective focal length of the zoom lens is adjustable. The effective focal length of the zoom lens is controlled by the observer. The observer controls the magnification of the zoom lens by varying the effective focal length of the zoom lens. The observer can manually change the magnification of the zoom lens or change the magnification by operating the zoom lens electronic actuator.

The observer controls the size of the imagery on the image sensor array by controlling the magnification. The observer can adjust the size of the field of view of the imagery on the image sensor array by varying the magnification. The observer can capture the full field of view of the imagery on the aperture stop of the eyepiece by just filling the size of the image of the aperture stop onto the image sensor array. The observer can also vary the brightness of the image on the image sensor array by varying the effective focal length of the zoom lens and the magnification, thereby changing the f-number of the imagery on the image sensor array. The observer can increase the brightness of the imagery by reducing the zoom lens magnification. The observer can also vary the brightness of the imagery by actuating the iris diaphragm, either manually, or electronically by controlling the zoom lens electronic actuator. The observer can sharply focus the imagery on the image sensor array by operating the focus control on the zoom lens, either manually, or electronically by controlling the zoom lens electronic actuator.

i7 is the threaded joint between i31 and i18.

i8 is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.

The electronic image sensor array camera as shown in the figure is comprised of a cover and an electronic image sensor array. The sensor array, for example is a CCD, CMOS or other sensor array type.

i9 is the barrel of the optical image source. Refer to FIG. 2.

i10 is a "T" shaped housing. i10 has a cylindrically shaped aperture for housing i13 and i15. i10 has a mechanical means located substantially at the midpoint of its cylindrical length for connecting to i18 via i34 at the threaded joint i26.

The mechanical axis of i18 is perpendicular to the mechanical axis of i10 i.e. the mechanical axis of i13 and i15.

i11 is a antenna swivel for antenna i12.

i12 is a antenna. i12 is deployed on i10.

i13 is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities.

Each one of the electronic circuits modules enables the observer to exercise different capabilities during an observing session.

The observer may choose to use an electronic circuits module which uses any one of the circuits described above in the figures in the mobile apparatus by simply loading the modular enclosure containing the circuit into i10 of the mobile apparatus.

i13 threads into and joins with i15. i13 and i15 have cylindrical enclosures and have equal outside diameters.

i14 is a threaded joint between i13 and i15.

i15 is not shown.

i16 is the image plane of the optical image source. Refer to FIG. 2.

i17 is a electronic optical image sensor array and its associated camera electronics.

i18 is the modular enclosure for i8 and i17 of the mobile apparatus, wherein i18 screws into i34 and i31.

i19 is the zoom lens' i6 electro-mechanical actuator.

i20 is the eyepiece housing of the original equipment eyepiece of the optical image source. Refer to FIG. 2.

i21 is not shown.

i22 is not shown.

i23 is not shown.

i24 is not shown.

i25 is the mating of the threaded male rear end of the zoom lens i6, and the threaded female front end of the camera case i8 for i17.

i26 is the threaded joint between i18 and i34.

i27 is not shown.

i28 is not shown.

i29 is not shown.

i30 is not shown.

i31 is the modular enclosure for zoom lens i6 of the mobile apparatus, wherein i31 screws into i18 and i3.

32 is a antenna.

33 is a antenna swivel of i32.

34 is the threaded "T" connection to i10 for i18.

35 is the modular enclosure for i12.

36 is the modular enclosure for i13.

Refer to FIG. 2 as a reference for the optical image source.

Initially i3 together with i2 are slid over the outside diameter of the barrel of the optical image source.

The precision clamping mechanism i2 is then manually tightened around the barrel of the optical image source using the knurled handgrip on i2.

Fine focus is achieved by operating the zoom lens focus control ring i20 using i19.

Refer to FIG. 22A and FIG. 22B and FIG. 23A and FIG. 23B and FIG. 24 and FIG. 25 and FIG. 26A and FIG. 26B for the layout of a preferred embodiment of the mobile apparatus' clamping mechanism i2.

The body of the mobile apparatus is configured into a "T" formation. The body is comprised of the contiguous modular elements that make up the mobile apparatus. The stem of the "T" is comprised of modules i3, i31, and i18. The cross member of the "T" is comprised of elements i13 and i15, i.e. via enclosure i10. The stem of the "T" is fastened to the cross member of the "T" via i26. The modules i3, i31, and i18 of the stem are fastened together using i5, i7. The stem is configured with modules for easy replacement of i3, i31, and i18 for achieving versatility of the mobile apparatus to gain compatibility with the variety of different optical image sources it operates with over time.

The "T" formation have a plurality of benefits.

In cases where the optical image sources have a permanently mounted original equipment eyepiece there is no need for the eyepiece so the eyepiece module has been easily unscrewed and removed from the front end of the mobile apparatus.

Substitution of eyepieces, zoom lenses, image sensor arrays or electronics circuits with other eyepieces, zoom lenses, image sensor arrays, or electronics circuits to better match the job, match the environment, match the object, and match the audience, etc. can be accomplished by disassembly of the mobile apparatus into its respective modules and substituting more appropriate modules in their place.

The eyepiece module i2 optically acquires the optical image source's focal image of the object and optically transforms the focal image into a afocal image and optically transfers the afocal image to the zoom lens module i31 which optically transforms the afocal image into a focal image at i17 of i18.

The electronic image sensor array camera module i18 electronically transforms the focal image at i17 into electronic imagery signals, and the electronic circuits module i13 electronically transforms and transmits the electronic imagery signals from the output terminals of i13 and i9 and i16 to the observer and the observer's audience. The electronic imagery signals meet analog and/or digital protocols depending on the type of analog or digital electronics used by the observer in the electronic sensor array camera module i18 and the electronic circuits module i13.

FIG. 47

FIG. 47 shows a side view center section of the preferred embodiment of the mobile apparatus similar to that shown in FIG. 45 that is clamping and attached to the barrel of the optical image source referred to in FIG. 1A.

FIG. 47 shows the mobile apparatus configured with one antenna mounted on its respective swivel, deployed externally on the outside of the enclosure of the mobile apparatus, and showing the clamping mechanism module of the mobile apparatus holding a precision clamping mechanism, and showing an electro-mechanical actuator operated zoom lens.

When the optical image sources are manufactured with a removable original equipment eyepiece, and the observer chooses to remove the optical image source's original equipment eyepiece from the optical image source, then the observer may choose to add the special eyepiece module shown in FIGS. 17E & 17F to the mobile apparatus as is shown in the preferred embodiment example in FIG. 47. Therefore the preferred embodiment shown in FIG. 47 enables observers to accommodate for optical image sources that are manufactured with removable original equipment eyepieces, where the removable original equipment eyepieces have been removed.

Therefore, the preferred embodiment of the mobile apparatus shown in FIG. 47 will accommodate optical image sources shown in both FIG. 1 and FIG. 2.

If the optical image source already is configured with a field stop, then the special eyepiece's field stop J27 is unnecessary and will be unscrewed and removed from the special eyepiece J24, and the optical image source's field stop will be used instead.

FIG. 43B shows a top view of the preferred embodiment FIG. 47 of the mobile apparatus showing two antennas, mounted on their respective swivels, deployed externally on the outside of the enclosure of the mobile apparatus, where their swivels are opposite one another.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The preferred embodiments of the mobile apparatus shown in FIG. 47 shows the modules configured in the form of a capital letter "T". The stem of the "T" is comprised of the clamping mechanism module J3, (and the eyepiece module J39 present for FIG. 1 optical image sources and removed for FIG. 2 optical image sources), and the zoom lens module J31, and the electronic image sensor array camera module J18. The cross member of the "T" is comprised of the electronics circuit module J13 and the battery and electronics power control module J15.

The purpose of the "T" formation of the modules is to provide an ergonomic handle for the observer while handling the mobile apparatus during its deployment onto or off of the optical image sources. It also shortens the length of the mobile apparatus. It allows for the position of its center of gravity to be controlled. It also allows for the position of the microphone and speaker in the end cap modules J9 and J16 to be controlled.

In order to accommodate FIG. 1 optical image sources: the mobile apparatus shown in FIG. 47 is configured with a clamping mechanism module J3, a eyepiece module J39, a zoom lens module J31 and a electronic image sensor array camera module J18, a electronics circuit module J13, and battery and electronics power control module J15.

In order to accommodate FIG. 2 optical image sources: the mobile apparatus shown in FIG. 47 is configured with a clamping mechanism module J3, (a eyepiece module J39 removed), a zoom lens module J31 and a electronic image sensor array camera module J18, a electronics circuit module J13, and battery and electronics power control module J15.

The method for attaching the mobile apparatus to the optical image source shown in FIG. 1 is as follows:
Initially slide the front end J3 of the mobile apparatus over the outside diameter of the barrel J21 of the optical image source.

The precision clamping mechanism J2 is then manually tightened around the barrel J21 of the optical image source using the knurled handgrip on J3 with a twist of the wrist.

Fine focus is achieved by operating the zoom lens electro-mechanical actuator J19.

The method for attaching the mobile apparatus to the optical image source shown in FIG. 2 is as follows:
Unscrew and remove the eyepiece J24 from the mobile apparatus at joint J4.

Initially slide the front end J3 of the mobile apparatus over the outside diameter of the barrel J21 of the optical image source.

The precision clamping mechanism J2 is then manually tightened around the barrel J21 of the optical image source using the knurled handgrip on J3.

Fine focus is achieved by operating the zoom lens electro-mechanical actuator J19.

Screw thread is shown in the figure as an example of a mechanical connecting means for mechanically connecting adjacent modular enclosures. Screw thread is an example of a mechanical connecting means.

Screw threaded joints are a simple, inexpensive and space saving method especially for connecting enclosures having a cylindrical profile. The front ends of the module's J3 and J31 and J18 cylindrical enclosures are under cut and threaded with female threads. The rear ends of the module's cylindrical enclosures are over cut and threaded with male threads.

The rear ends of the module's cylindrical enclosures i.e. J3 mates with the front end of the module's cylindrical enclosure J31 in order to connect the two modules together.

Screw thread is given in the present invention as an example of a mechanical connecting means. Other mechanical connecting means are also appropriate i.e. snap-fit connections.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIG. 47 are identified as follows:

J1 is the optical and mechanical axis of the mobile apparatus.

J2 is the clamping mechanism of the mobile apparatus, wherein J2 is mounted inside of J3.

J3 is the clamping mechanism module's extension device of the mobile apparatus, wherein J3 screws into J31. When J3 is unscrewed and disconnected from J31, J5 enables the eyepiece module shown in FIGS. 17C and 17D to be screwed on to J31 for the mobile apparatus to accommodate optical image sources that are manufactured without their own original equipment eyepieces.

J4 is a threaded joint for attaching the eyepiece shown in FIGS. 17A & 17B to J3.

J5 is the threaded joint between J3 and J31.

J6 is a zoom lens, wherein the zoom lens is operated using the electro-mechanical actuator J19.

The zoom lens receives afocal imagery and transforms the afocal imagery into focal imagery at the electronic image sensor array. The zoom lens focuses the focal imagery on to J17. The effective focal length of the zoom lens is adjustable. The effective focal length of the zoom lens is controlled by the observer. The observer controls the magnification of the zoom lens by varying the effective focal length of the zoom lens. The observer can manually change the magnification of the zoom lens or change the magnification by operating the zoom lens electronic actuator.

The observer controls the size of the imagery on the image sensor array by controlling the magnification. The observer can adjust the size of the field of view of the imagery on the image sensor array by varying the magnification. The observer can capture the full field of view of the imagery on the aperture stop of the eyepiece by just filling the size of the image of the aperture stop onto the image sensor array. The observer can also vary the brightness of the image on the image sensor array by varying the effective focal length of the zoom lens and the magnification, thereby changing the f-number of the imagery on the image sensor array. The observer can increase the brightness of the imagery by reducing the zoom lens magnification. The observer can also vary the brightness of the imagery by actuating the iris diaphragm, either manually, or electronically by controlling the zoom lens electronic actuator. The observer can sharply focus the imagery on the image sensor array by operating the focus control on the zoom lens, either manually, or electronically by controlling the zoom lens electronic actuator.

The zoom lens functions are magnification control, iris diaphragm control, and focus control.

When actuated manually by the observer, J23 controls the magnification of the zoom lens, J22 controls the iris diaphragm of the zoom lens, J20 controls the focus of the zoom lens.

The observer can maintain manual control of the zoom lens by rotating the adjustment rings by hand. The observer is enabled to adjust the focus for objects whose distances to the optical image source may be changing during an observing session.

J7 is the threaded joint between J31 and J18.

J8 is a threaded camera case for J17.

J9 is a threaded end cap module for access to, and maintenance of J13. J9 screws into J10. J9 is for protecting J13 from the environment. Details of the end cap module are shown in FIGS. 18A & 18B & 18C.

J10 is a "T" shaped housing. J10 has a cylindrically shaped aperture for housing J13 and J15. J10 has a mechanical means located substantially at the midpoint of its cylindrical length for connecting to J18 via J34 at the threaded joint J26.

The mechanical axis of J18 is perpendicular to the mechanical axis of J10 i.e. the mechanical axis of J13 and J15.

J11 is a antenna swivel for antenna J12.

J12 is a antenna. J12 is deployed on J10.

J13 is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities. Each one of the electronic circuits modules enables the observer to exercise different capabilities during an observing session.

The observer may choose to use an electronic circuits module which uses any one of the circuits described above in the figures in the mobile apparatus by simply loading the modular enclosure containing the circuit into J10 of the mobile apparatus. J13 threads into and joins with J15. J13 and J15 have cylindrical enclosures and have equal outside diameters.

J14 is a threaded joint between J13 and J15.

J15 is a battery and a power control module. J15 supplies electricity to all the mobile apparatus' electronics.

J16 is a threaded end cap module for access to, and maintenance of J15. J16 screws into J10. J16 is for protecting J15 from the environment. Details of the end cap module are shown in FIG. 18D.

J17 is a electronic optical image sensor array and its associated camera electronics.

J18 is the modular enclosure for J8 and J17 of the mobile apparatus, wherein J18 screws into J34 and J31.

J19 is the electro-mechanical actuator for the zoom lens J6.
J19 is used by the observer to remotely control the functions of the zoom lens.
The zoom lens functions are magnification control, iris diaphragm control, and focus control.
When actuated by the observer, J19 mechanically rotates J23 to control the magnification of the zoom lens.
When actuated by the observer, J19 mechanically rotates J22 to control the iris diaphragm of the zoom lens.
When actuated by the observer, J19 mechanically rotates J20 to control the focus of the zoom lens.
The observer can still maintain control of the zoom lens by manually rotating the adjustment rings.

J20 is the zoom lens' focus control ring for the electro-mechanical actuator J6.

J21 is the barrel of the optical image source. Refer to FIG. 1.

J22 is the zoom lens' iris diaphragm control ring for the electro-mechanical actuator J6.

J23 is the zoom lens' magnification control ring for the electro-mechanical actuator J6.

J24 is the eyepiece housing of the eyepiece module of the mobile apparatus.

J25 is the mating of the threaded male rear end of the zoom lens J6, and the threaded female front end of the camera case J8 for J17.

J26 is the threaded joint between J18 and J34.

J27 is the field stop of the eyepiece J24 of the mobile apparatus

J28 is the image plane of the optical image source. Refer to FIG. 1.

J29 is not shown.

J30 is the centerline of one of four typical radial shim slots disposed around the peripheral diameter of J3 at ninety degree intervals for shims, as needed, for tilting the eyepiece housing relative to J3, for correcting for any misalignment and centering errors found in the optical system of the optical image source to which the mobile apparatus is attached. J33 is also the centerline of one of four shim slots in the eyepiece housing shown in FIGS. 17E & 17F.

Shims, as needed, are placed into the slots in J3 by the observer and pass through the slots in J3 and go through their eyepiece slot counterparts radially opposite them shown in FIGS. 17E & 17F.

J31 is the zoom lens' J6 modular enclosure of the mobile apparatus, wherein J31 screws into J18 and J3.

J32 is a antenna.

J33 is a antenna swivel of J32.

J34 is the threaded "T" connection to J10 for J18.
J35 is the modular enclosure for J12.
J36 is the modular enclosure for J13.
J37 is the mechanical axis of J10.

Refer to FIG. 1 as a reference for the optical image source.

Initially J3 together with J2 are slid over the outside diameter of the barrel of the optical image source.

The precision clamping mechanism J2 is then manually tightened around the barrel of the optical image source by the observe using the knurled handgrip on J2.

Fine focus is achieved by operating the zoom lens focus control ring J20 using J19.

Refer to FIG. 22A and FIG. 22B and FIG. 23A and FIG. 23B and FIG. 24 and FIG. 25 and FIG. 26A and FIG. 26B for the layout of a preferred embodiment of the mobile apparatus' clamping mechanism J2.

The body of the mobile apparatus is configured into a "T" formation. The stem of the "T" is comprised of modules J3, J31, and J18. The cross member of the "T" is comprised of modules J13 and J15, i.e. via enclosure J10. The stem of the "T" is fastened to the cross member of the "T" via J26. The modules J3, J31, and J18 of the stem are fastened together using J5, J7. The stem is configured with modules for easy replacement of modules J3, J31, and J18 for achieving versatility of the mobile apparatus to gain compatibility with the variety of different optical image sources it operates with over time.

The "T" formation has a plurality of benefits.

Substitution of eyepieces, zoom lenses, image sensor arrays or electronics circuits with other eyepieces, zoom lenses, image sensor arrays, or electronics circuits to better match the job, match the environment, match the object, and match the audience, etc. can be accomplished by disassembly of the mobile apparatus into its respective modules and substituting more appropriate modules in their place.

The eyepiece module J24 optically acquires the optical image source's focal image of the object and optically transforms the focal image into a afocal image and optically transfers the afocal image to the zoom lens module J31 which optically transforms the afocal image into a focal image at J17 of J18.

The electronic image sensor array camera module J18 electronically transforms the focal image at J17 into electronic imagery signals, and the electronic circuits module J13 electronically transforms and transmits the electronic imagery signals from the output terminals of J13 and J9 and J16 to the observer and the observer's audience. The electronic imagery signals meet analog and/or digital protocols depending on the type of analog or digital electronics used by the observer in the electronic sensor array camera module J18 and the electronic circuits module J13.

The eyepiece module J24 optically acquires the optical image source's focal image of the object at J28 and optically transforms the focal image into a afocal image and optically transfers the afocal image to the zoom lens module J31 which optically transforms the afocal image into a focal image at J17 of J18.

The electronic image sensor array camera module J18 electronically transforms the focal image at J17 into electronic imagery signals, and the electronic circuits module J13 electronically transforms and transmits the electronic imagery signals from the output terminals of J13 and J9 and J16 to the observer and the observer's audience. The electronic imagery signals meet analog and/or digital protocols depending on the type of analog or digital electronics used by the observer in the electronic sensor array camera module J18 and the electronic circuits module J13.

FIG. 48

FIG. 48 shows a preferred embodiment of a mobile apparatus that is slip fitted into and attached to the barrel of the optical image source referred to in FIG. 1A.

FIG. 48 is similar to the preferred embodiment of the mobile apparatus shown in FIG. 31 configured with a manually operated zoom lens, two antennas where each one is mounted on its respective swivel, both antennas deployed externally in a common groove in the enclosure of the mobile apparatus.

The mobile apparatus disclosed in FIG. 48 is configured for being attached to and compatible with the optical image source shown in FIG. 1.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The eyepiece module K2 is for optically acquiring and transforming and transferring the focal optical imagery from the optical image source at K36 into afocal optical imagery to the zoom lens module K31.

The zoom lens module is for optically transforming the afocal optical imagery into focal optical imagery and for optically transferring the focal imagery to the electronic image sensor array camera module K18 for electronically transforming the focal optical imagery into electronic imagery signals.

The preferred embodiments of the mobile apparatus shown in FIG. 48 shows the modules configured in the form of a capital letter "T". The stem of the "T" is comprised of the eyepiece module K3, and the zoom lens module K31, and the electronic image sensor array camera module K18. The cross member of the "T" is comprised of the electronics circuit module K13 and the battery and electronics power control module K15.

The purpose of the "T" formation of the modules is to provide an ergonomic handle for the observer while handling the mobile apparatus during its deployment onto or off of the optical image sources. It also shortens the length of the mobile apparatus. It allows for the position of its center of gravity to be controlled. It also allows for the position of the microphone and speaker in the end cap modules K9 and K16 to be controlled.

The mobile apparatus shown in FIG. 48 is configured with a eyepiece module K3, a zoom lens module K31 and a electronic image sensor array camera module K18, a electronics circuit module K13, and battery and electronics power control module K15.

The method for attaching the mobile apparatus to the optical image source shown in FIG. 1 is as follows: Initially slide the front end K3 eyepiece module of the mobile apparatus into the inside diameter K35 of the barrel K21 of the optical image source. Rotate the mobile apparatus about K1 until the top of the image coincides with the top of the image sensor array.

Fine focus is achieved by operating the zoom lens focus control manually using K20.

Screw thread is shown in the figure as an example of a mechanical connecting means for mechanically connecting adjacent modular enclosures. Screw thread is an example of a mechanical connecting means. Screw threaded joints are a simple, inexpensive and space saving method especially for connecting enclosures having a cylindrical profile.

The front ends of the module's K3 and K31 and K18 cylindrical enclosures are under cut and threaded with female threads. The rear ends of the module's cylindrical enclosures are over cut and threaded with male threads. The rear ends of the module's cylindrical enclosures i.e. K3 mates with the front end of the module's cylindrical enclosure K31 in order to connect the two modules together.

Screw thread is given in the present invention as an example of a mechanical connecting means. Other mechanical connecting means are also appropriate i.e. snap-fit connections. In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIG. 48 are identified as follows:

K1 is the optical and mechanical axis of the mobile apparatus.

K2 is a eyepiece of the eyepiece module K3.

K3 is the eyepiece module showing the eyepiece module enclosure, wherein K3 screws into K31 at K5.

K4 is a shim and the shim slot in the eyepiece threaded modular enclosure K3.

K5 is the threaded joint between K3 and K31. When K3 is unscrewed and disconnected from K31, K5 enables the clamping mechanism module and clamping mechanism shown in FIG. 22 thru 26 to be screwed on to K31 for the mobile apparatus to accommodate optical image sources that are manufactured with their own original equipment eyepieces.

K6 is a zoom lens.
  The zoom lens receives afocal imagery and transforms the afocal imagery into focal imagery. The zoom lens focuses the focal imagery onto K17. The effective focal length of the zoom lens is adjustable. The effective focal length of the zoom lens is controlled by the observer. The observer controls the magnification of the zoom lens by varying the effective focal length of the zoom lens. The observer can manually change the magnification of the zoom lens or change the magnification by operating the zoom lens electronic actuator.
  The observer controls the size of the imagery on the image sensor array by controlling the magnification. The observer can adjust the size of the field of view of the imagery on the image sensor array by varying the magnification. The observer can capture the full field of view of the imagery on the aperture stop of the eyepiece by just filling the size of the image of the aperture stop onto the image sensor array. The observer can also vary the brightness of the image on the image sensor array by varying the effective focal length of the zoom lens and the magnification, thereby changing the f-number of the imagery on the image sensor array. The observer can increase the brightness of the imagery by reducing the zoom lens magnification. The observer can also vary the brightness of the imagery by actuating the iris diaphragm, either manually, or electronically by controlling the zoom lens electronic actuator. The observer can sharply focus the imagery on the image sensor array by operating the focus control on the zoom lens, either manually, or electronically by controlling the zoom lens electronic actuator.

K7 is the threaded joint between K31 and K18.

K8 is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.
  The electronic image sensor array camera as shown in the figure is comprised of a cover and an electronic image sensor array. The sensor array, for example is a CCD, CMOS or other sensor array type.

K9 is a threaded end cap module for access to, and maintenance of K13. K9 screws into K10. K9 is for protecting K3 from the environment. Details of the end cap module are shown in FIGS. 18A & 18B & 18C.

K10 is a "T" shaped housing. K10 has a cylindrically shaped aperture for housing K13 and K15. K10 has a mechanical means located substantially at the midpoint of its cylindrical length for connecting to K18 via K34 at the threaded joint K26.
  The mechanical axis of K18 is perpendicular to the mechanical axis of K10 i.e. the mechanical axis of K13 and K15. K10 is made from a RF transparent material so as not to interfere with the radiation to and from the antennas.

K11 is a antenna swivel.

K12 is a antenna. K12 is deployed in K30.

K13 is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities. Each one of the electronic circuits modules enables the observer to exercise different capabilities during an observing session.
  The observer may choose to use an electronic circuits module which uses any one of the circuits described above in the figures in the mobile apparatus by simply loading the modular enclosure containing the circuit into K10 of the mobile apparatus.
  K13 threads into and joins with K15. K13 and K15 have cylindrical enclosures and have equal outside diameters.

K14 is a heat sink for K13.

K15 is a battery and a power control module. K15 supplies electricity to all the mobile apparatus' electronics.

K16 is a threaded end cap module for access to, and maintenance of K15. K16 screws into K10. K16 is for protecting K15 from the environment. Details of the end cap module are shown in FIG. 18D.

K17 is a optical image sensor array and its associated camera electronics.

K18 is the camera threaded modular enclosure of the mobile apparatus, wherein 18 screws into 10.

K19 is a slot machined in K31 for K20.

K20 is the zoom lens' manual magnification control arm.

K21 is the barrel of the optical image source. Refer to FIG. 1 for the description of the optical image source.

K22 is the zoom lens' manual iris diaphragm control arm.

K23 is the zoom lens' manual focus control arm.

K24 is a slot machined in K31 for K23.

K25 is the mating of the threaded male rear end of the zoom lens, and the threaded female front end of the camera case.

K26 is the threaded joint between K18 and K10.

K27 is the zoom lens' slot for the manual focus control arm.

K28 is the zoom lens' slot for the manual iris diaphragm control arm.

K29 is the zoom lens' slot for the manual magnification control arm.

K30 is the antenna groove in K10 for storing and protecting antennas K12 and K32 prior to the observer unfolding and deploying antenna K12 and K32 using their swivels K11 and K33.

K31 is the zoom lens module enclosure, wherein K31 screws into K18 at K7.

K32 is a antenna.

K33 is a antenna swivel.

K34 is not shown.

K35 is the inside diameter of the barrel of the optical image source. Refer to FIG. 1.

K36 is the optical image plane of the optical image source. Refer to FIG. 1.

K37 is the field stop of the eyepiece K2 of the mobile apparatus.

If the optical image source already is configured with a field stop, then the special eyepiece's field stop K37 is unnecessary and will be unscrewed and removed from the special eyepiece K2, and the optical image source's field stop will be used instead.

Refer to FIG. 1 as a reference for the optical image source. K2 is inserted into the inside diameter of the optical image source's draw tube referred to in FIG. 1. Rough focus of the image is achieved by physically slipping and moving the mobile apparatus in the optical image source's draw tube. Fine focus is achieved by manually operating the zoom lens focus control arm K23.

The enclosure of the mobile apparatus is configured into a "T" formation. The stem of the "T" is comprised of modules K3, K31 and K18. The cross member of the "T" is comprised of elements K13 and K15, i.e. via enclosure K10. The stem of the "T" is fastened to the cross member of the "T" via K26. The modules K3, K31 and K18 of the stem are fastened together using K5, K7. The stem is configured with modular elements for easy replacement of K3, K31 and K18 for achieving versatility of the mobile apparatus to gain compatibility with the variety of different optical image sources it operates with over time.

The "T" formation has a plurality of benefits.

Substitution of eyepieces, zoom lenses, image sensor arrays or electronics circuits with other eyepieces, zoom lenses, image sensor arrays, or electronics circuits to better match the job, match the environment, match the object, and match the audience, etc. can be accomplished by disassembly of the mobile apparatus into its respective modules and substituting more appropriate modules in their place.

The eyepiece module K2 optically acquires the optical image source's focal image of the object at K36 and optically transforms the focal image into a afocal image and optically transfers the afocal image to the zoom lens module K31 which optically transforms the afocal image into a focal image at K17 of K18.

The electronic image sensor array camera module K18 electronically transforms the focal image at K17 into electronic imagery signals, and the electronic circuits module K13 electronically transforms and transmits the electronic imagery signals from the output terminals of K13 and K9 and K16 to the observer and the observer's audience. The electronic imagery signals meet analog and/or digital protocols depending on the type of analog or digital electronics used by the observer in the electronic sensor array camera module K18 and the electronic circuits module K13.

FIG. 49

FIG. 49 shows a side view center section of a layout of a preferred embodiment of a mobile apparatus, showing the special eyepiece shown in FIGS. 17E & 17F, two antennas mounted on their respective swivels deployed externally on the outside of the enclosure of the mobile apparatus, and the clamping mechanism module of the mobile apparatus housing a mating camera lens mount.

The mobile apparatus' mating camera lens mount is for attaching the mobile apparatus to optical image sources that are camera lenses that have lens mounts; like for example the large variety of 35 mm camera lenses that are available. The camera lens mounts come in several types. For example, the screw types, the bayonet types, the breech lock types, the double bayonet types, and the tab lock types.

Therefore the preferred embodiment shown in FIG. 49 enables observers to accommodate and attach to optical image sources like camera lenses that are manufactured with camera lens mounts.

The camera mounts are themselves configured with their own locking means. The camera mount's locking means is used to lock the mobile apparatus to the camera lens optical image source.

The top view of the preferred embodiment FIG. 49 of the mobile apparatus is similar to the top view shown in FIG. 33 for FIG. 30 and FIG. 31 showing two antennas, each one mounted on its respective swivel, wherein both antennas are deployed externally on the outside of the enclosure of the mobile apparatus, wherein the swivels are at opposite ends.

The mobile apparatus disclosed in FIG. 49 is configured for being attached to and compatible with the camera lens optical image source shown in FIG. 1B.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The eyepiece module L38 is for optically acquiring and transforming and transferring the focal optical imagery from the optical image source, see FIG. 1B, into afocal optical imagery to the zoom lens module L31.

The zoom lens module L31 is for optically transforming the afocal optical imagery into focal optical imagery and for optically transferring the focal imagery to the electronic image sensor array camera module L18 for electronically transforming the focal optical imagery into electronic imagery signals.

The preferred embodiments of the mobile apparatus shown in FIG. 49 shows the modules configured in the form of a capital letter "T". The stem of the "T" is comprised of the eyepiece module L38, and the zoom lens module L31, and the electronic image sensor array camera module L18. The cross member of the "T" is comprised of the electronics circuit module L13 and the battery and electronics power control module L15.

The purpose of the "T" formation of the modules is to provide an ergonomic handle for the observer while handling the mobile apparatus during its deployment onto or off of the optical image sources. It also shortens the length of the mobile apparatus. It allows for the position of its center of gravity to be controlled. It also allows for the position of the microphone and speaker in the end cap modules L9 and L16 to be controlled.

The mobile apparatus shown in FIG. 49 is configured with a lens mount extension module L2, a eyepiece module L38, a zoom lens module L31 and a electronic image sensor array camera module L18, a electronics circuit module L13, and battery and electronics power control module L15.

The method for attaching the mobile apparatus to the optical image source shown in FIG. 1B is as follows: Initially deploy the front end L2 of the mobile apparatus at L3 to the lens mount of the lens barrel. See 3C of FIG. 3B of the optical image source.

Bring the mobile apparatus' mating lens mount L3 in contact with the optical image source camera lens mount. Twist, snap and attach the mating lens mount L3 of the mobile apparatus to the lens mount of the camera lens optical image source.

Fine focus is achieved by the observer operating the zoom lens focus control L20 manually.

Screw thread is shown in the figure as an example of a mechanical connecting means for mechanically connecting adjacent modular enclosures. Screw thread is an example of a mechanical connecting means.

Screw threaded joints are a simple, inexpensive and space saving method especially for connecting enclosures having a cylindrical profile. The front ends of the module's L31 and L18 cylindrical enclosures are under cut and threaded with female threads. The rear ends of the module's cylindrical enclosures are over cut and threaded with male threads. The rear ends of the module's cylindrical enclosures i.e. L2 mates with the front end of the module's cylindrical enclosure L31 in order to connect the two modules together.

Screw thread is given in the present invention as an example of a mechanical connecting means. Other mechanical connecting means are also appropriate i.e. snap-fit connections.

The detailed physical elements disclosed in the drawings shown in FIG. 49 are identified as follows:

L1 is the optical and mechanical axis of the mobile apparatus.

L2 is the camera lens mount module's extension device of the mobile apparatus. L2 houses the mating camera lens mount L3. L2 screws into L31 at L5.

L3 is a mating camera lens mount of the mobile apparatus. L3 is connected mechanically to L2. L3 is for attaching the mobile apparatus to optical image sources that are camera lenses that have a corresponding mating lens mount.

L4 is a threaded joint for attaching the eyepiece shown if FIGS. 17A & 17B to L2.

L5 is the threaded joint between L2 and L31.

L6 is a zoom lens, wherein the zoom lens is operated using the electro-mechanical actuator L19.

The zoom lens receives afocal imagery and transforms the afocal imagery into focal imagery at the electronic image sensor array. The zoom lens focuses the focal imagery on to L17. The effective focal length of the zoom lens is adjustable. The effective focal length of the zoom lens is controlled by the observer. The observer controls the magnification of the zoom lens by varying the effective focal length of the zoom lens. The observer can manually change the magnification of the zoom lens or change the magnification by operating the zoom lens electronic actuator.

The observer controls the size of the imagery on the image sensor array by controlling the magnification. The observer can adjust the size of the field of view of the imagery on the image sensor array by varying the magnification. The observer can capture the full field of view of the imagery on the aperture stop of the eyepiece by just filling the size of the image of the aperture stop onto the image sensor array. The observer can also vary the brightness of the image on the image sensor array by varying the effective focal length of the zoom lens and the magnification, thereby changing the f-number of the imagery on the image sensor array. The observer can increase the brightness of the imagery by reducing the zoom lens magnification. The observer can also vary the brightness of the imagery by actuating the iris diaphragm, either manually, or electronically by controlling the zoom lens electronic actuator. The observer can sharply focus the imagery on the image sensor array by operating the focus control on the zoom lens, either manually, or electronically by controlling the zoom lens electronic actuator.

The zoom lens functions are magnification control, iris diaphragm control, and focus control. When actuated manually by the observer, L23 controls the magnification of the zoom lens, L22 controls the iris diaphragm of the zoom lens, L20 controls the focus of the zoom lens. The observer can maintain manual control of the zoom lens by rotating the adjustment rings by hand. The observer is enabled to adjust the focus for objects whose distances to the optical image source may be changing during an observing session.

L7 is the threaded joint between L31 and L18.

L8 is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.

The electronic image sensor array camera as shown in the figure is comprised of a cover and an electronic image sensor array. The sensor array, for example is a CCD, CMOS or other sensor array type.

L9 is a threaded end cap module for access to, and maintenance of L13. L9 screws into L10. L9 is for protecting L13 from the environment. Details of the end cap module are shown in FIGS. 18A & 18B & 18C.

L10 is a "T" shaped housing. L10 has a cylindrically shaped aperture for housing L13 and L15. L10 has a mechanical means located substantially at the midpoint of its cylindrical length for connecting to L18 via L34 at the threaded joint L26. The mechanical axis of L18 is perpendicular to the mechanical axis of L10 i.e. the mechanical axis of L13 and L15. L10 is made from a RF transparent material so as not to interfere with the radiation to and from the antennas.

L11 is a antenna swivel for antenna L12.

L12 is a antenna. L12 is deployed on L10.

L13 is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities.

Each one of the electronic circuits modules enables the observer to exercise different capabilities during an observing session.

The observer may choose to use an electronic circuits module which uses any one of the circuits described above in the figures in the mobile apparatus by simply loading the modular enclosure containing the circuit into L10 of the mobile apparatus.

L13 threads into and joins with L15. L13 and L15 have cylindrical enclosures and have equal outside diameters.

L14 is a threaded joint between L13 and L15.

L15 is a battery and a power control module. L15 supplies electricity to all the mobile apparatus' electronics.

L16 is a threaded end cap module for access to, and maintenance of L15. L16 screws into L10. L16 is for protecting L15 from the environment. Details of the end cap module are shown in FIG. 18D.

L17 is a electronic optical image sensor array and its associated camera electronics.

L18 is the camera L8 and L17 modular enclosure of the mobile apparatus, wherein L18 screws into L34 and L31.

L19 is the zoom lens' L6 electro-mechanical actuator.

L19 is used by the observer to remotely control the functions of the zoom lens.

The zoom lens functions are magnification control, iris diaphragm control, and focus control.

When actuated by the observer, L19 mechanically rotates L23 to control the magnification of the zoom lens.

When actuated by the observer, L19 mechanically rotates L22 to control the iris diaphragm of the zoom lens.

When actuated by the observer, L19 mechanically rotates L20 to control the focus of the zoom lens.

The observer can still maintain control of the zoom lens by manually rotating the adjustment rings.

L20 is the zoom lens' focus control ring for the electro-mechanical actuator L6.

L21 is not shown.

L22 is the zoom lens' iris diaphragm control ring for the electro-mechanical actuator L6.

L23 is the zoom lens' magnification control ring for the electro-mechanical actuator L6.

L24 is not shown.

L25 is the mating of the threaded male rear end of the zoom lens L6, and the threaded female front end of the camera case L8 for L17.

L26 is the threaded joint between L18 and L34.

L27 is not shown.

L28 is not shown.

L29 is not shown. L30 is the centerline of one of four typical radial shim slots disposed around the peripheral diameter of L3 at ninety degree intervals for shims, as needed, for tilting the eyepiece housing relative to L3, for correcting for any misalignment and centering errors found in the optical system of the optical image source to which the mobile apparatus is attached. L33 is also the centerline of one of four shim slots in the eyepiece housing shown in FIGS. 17E & 17F.

Shims, as needed depending on whether there are errors to correct, are placed into the slots in L3 by the observer and pass through the slots in L3 and go through their eyepiece slot counterparts radially opposite them shown in FIGS. 17E & 17F. The thickness of the shim depends on the size of the error to be corrected.

L31 is the zoom lens' L6 modular enclosure of the mobile apparatus, wherein L31 screws into L18 and L3.

L32 is a antenna.

L33 is a antenna swivel of L32.

L34 is the threaded "T" connection to L10 for L18.

L35 is the modular enclosure for L12.

L36 is the modular enclosure for L13.

L37 is the mechanical axis of L10.

Refer to FIG. 1 as a reference for the optical image source.

The body of the mobile apparatus is configured into a "T" formation. The stem of the "T" is comprised of modules L38, L2, L31 and L18. The cross member of the "T" is comprised of modules L13 and L15, i.e. via enclosure L10. The stem of the "T" is fastened to the cross member of the "T" via L26. The modules L38, L2, L31 and L18 of the stem are fastened together using L5, L7. The stem is configured with modules for easy replacement of modules L38, L2, L31, L13, L15 and L18 for achieving versatility of the mobile apparatus to gain compatibility with the variety of different optical image sources it operates with over time. The "T" formation has a plurality of benefits.

Substitution of eyepieces, zoom lenses, image sensor arrays or electronics circuits with other eyepieces, zoom lenses, image sensor arrays, or electronics circuits to better match the job, match the environment, match the object, and match the audience, etc. can be accomplished by disassembly of the mobile apparatus into its respective modules and substituting more appropriate modules in their place.

The eyepiece module L38 optically acquires the optical image source's focal image of the object and optically transforms the focal image into a afocal image and optically transfers the afocal image to the zoom lens module L31 which optically transforms the afocal image into a focal image at L17 of L18.

The electronic image sensor array camera module L18 electronically transforms the focal image at L17 into electronic imagery signals, and the electronic circuits module L13 electronically transforms and transmits the electronic imagery signals from the output terminals of L13 and L9 and L16 to the observer and the observer's audience. The electronic imagery signals meet analog and/or digital protocols depending on the type of analog or digital electronics used by the observer in the electronic sensor array camera module 18 and the electronic circuits module L13.

FIG. 50

FIG. 50 shows a side view center section of a layout of a preferred embodiment of a mobile apparatus, showing two antennas, mounted on their respective swivels, deployed externally on the outside of the enclosure of the mobile apparatus, and showing the lens mount extension module of the mobile apparatus housing a mating camera lens mount.

FIG. 50 shows the mobile apparatus attached to the lens mount of the optical image source camera lens.

FIG. 43B shows a top view of the preferred embodiment FIG. 50 of the mobile apparatus showing two antennas, mounted on their respective swivels, deployed externally on the outside of the enclosure of the mobile apparatus, where their swivels are opposite one another.

FIG. 50 shows the special eyepiece module shown in FIGS. 17E & 17F comprising the mobile apparatus as is shown in the preferred embodiment example in FIG. 50. Furthermore, the mobile apparatus is comprised of a mating camera lens mount for attaching the mobile apparatus to optical image sources that are camera lenses. The camera lens mounts come in several types. For example, the screw types, the bayonet types, the breech lock types, the double bayonet types, and the tab lock types.

Therefore the preferred embodiment shown in FIG. 50 enables observers to accommodate and attach to optical image sources like camera lenses that are manufactured with camera lens mounts.

The camera mounts are themselves configured with their own locking means. The camera mount's locking means is used to lock the mobile apparatus to the camera lens optical image source.

The mobile apparatus disclosed in FIG. 50 is configured for being attached to and compatible with the camera lens optical image source shown in FIG. 1B.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The eyepiece module M38 is for optically acquiring and transforming and transferring the focal optical imagery from the optical image source, see FIG. 1B, into afocal optical imagery to the zoom lens module M31. The zoom lens module M31 is for optically transforming the afocal optical imagery into focal optical imagery and for optically transferring the focal imagery to the electronic image sensor array camera module M18 for electronically transforming the focal optical imagery into electronic imagery signals.

The preferred embodiments of the mobile apparatus shown in FIG. 50 shows the modules configured in the form of a capital letter "T". The stem of the "T" is comprised of the lens mount extension module M2, the eyepiece module M38, and the zoom lens module M31, and the electronic image sensor array camera module M18. The cross member of the "T" is comprised of the electronics circuit module M13 and the battery and electronics power control module M15. The cross member of the "T" supports at least one antenna which is driven by the electronics circuit module M13.

The purpose of the "T" formation of the modules is to provide an ergonomic handle for the observer while handling the mobile apparatus during its deployment onto or off of the optical image sources. It also shortens the length of the mobile apparatus. It allows for the position of its center of gravity to be controlled. It also allows for the position of the microphone and speaker in the end cap modules M9 and M16 to be controlled.

The mobile apparatus shown in FIG. 50 is configured with a lens mount extension module M2, a eyepiece module M38, a zoom lens module M31 and a electronic image sensor array camera module M18, a electronics circuit module M13, and battery and electronics power control module M15.

The method for attaching the mobile apparatus to the optical image source camera lens shown in FIG. 1B is as follows: bring the mobile apparatus' mating lens mount M3 in contact with the optical image source camera lens mount M38. Twist, snap and attach the mating lens mount M3 of the mobile apparatus to the lens mount M38 of the camera lens optical image source.

Screw thread is shown in the figure as an example of a mechanical connecting means for mechanically connecting adjacent modular enclosures. Screw thread is an example of a mechanical connecting means.

Screw threaded joints are a simple, inexpensive and space saving method especially for connecting enclosures having a cylindrical profile. The front ends of the module's M31 and M18 cylindrical enclosures are under cut and threaded with female threads. The rear ends of the module's cylindrical enclosures are over cut and threaded with male threads. The rear ends of the module's cylindrical enclosures i.e. M2 mates with the front end of the module's cylindrical enclosure M31 in order to connect the two modules together.

Screw thread is given in the present invention as an example of a mechanical connecting means. Other mechanical connecting means are also appropriate i.e. snap-fit connections.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIG. 50 are identified as follows:

M1 is the optical and mechanical axis of the mobile apparatus.

M2 is the camera lens mount module's extension device of the mobile apparatus. M2 is for housing a mating camera lens mount. M2 screws into M31 at M5.

M3 is a mating camera lens mount of the mobile apparatus. M3 is connected mechanically to M2.
This connection is done typically using flat headed counter-sunk machine screws which fastens M3 to M2. M3 is for attaching the mobile apparatus to optical image sources that are camera lenses that have a mating lens mount.

M4 is a threaded joint for attaching the eyepiece shown if FIGS. 17A & 17B to M2.

M5 is the threaded joint between M2 and M31.

M6 is a zoom lens, wherein the zoom lens is operated using the electro-mechanical actuator M19.
The zoom lens receives afocal imagery and transforms the afocal imagery into focal imagery at the electronic image sensor array. The zoom lens focuses the focal imagery on to M17. The effective focal length of the zoom lens is adjustable. The effective focal length of the zoom lens is controlled by the observer. The observer controls the magnification of the zoom lens by varying the effective focal length of the zoom lens. The observer can manually change the magnification of the zoom lens or change the magnification by operating the zoom lens electronic actuator.
The observer controls the size of the imagery on the image sensor array by controlling the magnification. The observer can adjust the size of the field of view of the imagery on the image sensor array by varying the magnification. The observer can capture the full field of view of the imagery on the aperture stop of the eyepiece by just filling the size of the image of the aperture stop onto the image sensor array. The observer can also vary the brightness of the image on the image sensor array by varying the effective focal length of the zoom lens and the magnification, thereby changing the f-number of the imagery on the image sensor array. The observer can increase the brightness of the imagery by reducing the zoom lens magnification. The observer can also vary the brightness of the imagery by actuating the iris diaphragm, either manually, or electronically by controlling the zoom lens electronic actuator. The observer can sharply focus the imagery on the image sensor array by operating the focus control on the zoom lens, either manually, or electronically by controlling the zoom lens electronic actuator.

The zoom lens functions are magnification control, iris diaphragm control, and focus control. When actuated manually, the observer controls the magnification of the zoom lens, the iris diaphragm of the zoom lens, and the focus of the zoom lens. The observer can maintain manual control of the zoom lens by rotating the adjustment rings by hand. The observer is enabled to adjust the focus for objects whose distances to the optical image source may be changing during an observing session.

M7 is the threaded joint between M31 and M18.

M8 is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.

The electronic image sensor array camera as shown in the figure is comprised of a cover and an electronic image sensor array. The sensor array, for example is a CCD, CMOS or other sensor array type.

M9 is a threaded end cap module for access to, and maintenance of M13. M9 screws into M10. M9 is for protecting M13 from the environment. Details of the end cap module are shown in FIGS. 18A & 18B & 18C.

M10 is a "T" shaped housing. M10 has a cylindrically shaped aperture for housing M13 and M15. M10 has a mechanical means located substantially at the midpoint of its cylindrical length for connecting to M18 via M34 at the threaded joint M26.

The mechanical axis of M18 is perpendicular to the mechanical axis of M10 i.e. the mechanical axis of M13 and M15.

M10 is made from a RF transparent material so as not to interfere with the radiation to and from the antennas.

M11 is an antenna swivel for antenna M12.

M12 is a antenna. M12 is deployed on M10.

M13 is a electronics block module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic block modules, that contains a different circuit described in each of the different figures above, has different capabilities.

Each one of the electronic circuits modules enables the observer to exercise different capabilities during an observing session. The observer may choose to use an electronic circuits module which uses any one of the circuits described above in the figures in the mobile apparatus by simply loading the modular enclosure containing the circuit into M10 of the mobile apparatus.

M13 threads into and joins with M15. M13 and M15 have cylindrical enclosures and have equal outside diameters.

M14 is a threaded joint between M13 and M15.

M15 is a battery and a power control module. M15 supplies electricity to all the mobile apparatus' electronics.

M16 is a threaded end cap module for access to, and maintenance of M15. M16 screws into M10. M16 is for protecting M15 from the environment. Details of the end cap module are shown in FIG. 18D.

M17 is a electronic optical image sensor array and its associated camera electronics.

M18 is the camera M8 and M17 modular enclosure of the mobile apparatus, wherein M18 screws into M34 and M31.

M19 is the zoom lens' M6 electro-mechanical actuator.
M19 is used by the observer to remotely control the functions of the zoom lens.
The zoom lens functions are magnification control, iris diaphragm control, and focus control.
When actuated by the observer, M19 mechanically rotates M23 to control the magnification of the zoom lens.
When actuated by the observer, M19 mechanically rotates M22 to control the iris diaphragm of the zoom lens.
When actuated by the observer, M19 mechanically rotates M20 to control the focus of the zoom lens.
The observer can still maintain control of the zoom lens by manually rotating the adjustment rings.

M20 is the zoom lens' focus control ring for the electro-mechanical actuator M6.

M21 is not shown.

M22 is the zoom lens' iris diaphragm control ring for the electro-mechanical actuator M6.

M23 is the zoom lens' magnification control ring for the electro-mechanical actuator M6.

M24 is not shown.

M25 is the mating of the threaded male rear end of the zoom lens 6, and the threaded female front end of the camera case M8 for M17.

M26 is the threaded joint between M18 and M34.

M27 is not shown.

M28 is not shown.

M29 is not shown.

M30 is the centerline of one of four typical radial shim slots disposed around the peripheral diameter of M3 at ninety degree intervals for shims, as needed, for tilting the eyepiece housing relative to M3, for correcting for any misalignment and centering errors found in the optical system of the optical image source to which the mobile apparatus is attached. M33 is also the centerline of one of four shim slots in the eyepiece housing shown in FIGS. 17E & 17F.
Shims, as needed, are placed into the slots in M3 by the observer and pass through the slots in M3 and go through their eyepiece slot counterparts radially opposite them shown in FIGS. 17E & 17F.

M31 is the zoom lens' M6 modular enclosure of the mobile apparatus, wherein M31 screws into M18 and M3.

M32 is a antenna.

M33 is a antenna swivel of M32.

M34 is the threaded "T" connection to M10 for M18.

M35 is the modular enclosure for M12.

M36 is the modular enclosure for M13.

M37 is the mechanical axis of M10.

M38 is a optical image source camera lens mount.

Refer to FIG. 1 as a reference for the optical image source.
The body of the mobile apparatus is configured into a "T" formation. The stem of the "T" is comprised of modules M38, M2, M31 and M18. The cross member of the "T" is comprised of modules M13 and M15, i.e. via enclosure M10.
The stem of the "T" is fastened to the cross member of the "T" via M26. The modules M38, M2, M31 and M18 of the stem are fastened together using M5, M7. The stem is configured with modules for easy replacement of modules M38, M2, M31, M13, M15 and M18 for achieving versatility of the mobile apparatus to gain compatibility with the variety of different optical image sources it operates with over time. The "T" formation has a plurality of benefits.

The eyepiece module M38 optically acquires the optical image source's focal image of the object and optically transforms the focal image into a afocal image and optically transfers the afocal image to the zoom lens module M31 which optically transforms the afocal image into a focal image at M17 of M18.

The electronic image sensor array camera module M18 electronically transforms the focal image at M17 into electronic imagery signals, and the electronic circuits module M13 electronically transforms and transmits the electronic imagery signals from the output terminals of M13 and M9 and M16 to the observer and the observer's audience. The electronic imagery signals meet analog and/or digital protocols depending on the type of analog or digital electronics used by the observer in the electronic sensor array camera module M18 and the electronic circuits module M13.

FIG. 51A and FIG. 51B

FIG. 51A shows a side view center section of a layout of a preferred embodiment of a mobile apparatus, showing the electronic system circuits of the electronics circuits module, and where the mobile apparatus has a zoom lens actuator to operate the zoom lens functions, and where the mobile apparatus' enclosure has a threaded screw-on end cap module, and where the zoom lens has a magnification control, an iris diaphragm control and a focus control, and where the mobile apparatus has its own eyepiece.

FIG. 51B shows a front view of the layout of the mobile apparatus shown in FIG. 51A.

The mobile apparatus disclosed in FIGS. 51A & 51B is configured for being attached to and compatible with the optical image source shown in FIG. 1B.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The preferred embodiment of the mobile apparatus shown in FIG. 51 shows the mobile apparatus comprised of the lens mount extension module N34, the eyepiece module N9, and the zoom lens module N42, the electronic image sensor array camera module N43, and the electronics circuit module N38. The antennas N28 and N31, which are driven by the electronics circuit module N38, are enclosed within N42 and N43 and N38.

The mobile apparatus shown in FIG. 51 is configured with a lens mount extension module N34, a eyepiece module N9, a zoom lens module N42 and a electronic image sensor array camera module N43, and a electronics circuit module N38. The modules are connected coaxially in tandem with each other.

The method for attaching the mobile apparatus to the optical image source camera lens shown in FIG. 1B is as follows: bring the mobile apparatus' mating lens mount N6 in contact with the optical image source camera lens mount. Twist, snap and attach the mating lens mount N6 of the mobile apparatus to the optical image source camera lens mount of the camera lens.

The camera lens mounts come in several types. For example, the screw types, the bayonet types, the breech lock types, the double bayonet types, and the tab lock types.

Therefore the preferred embodiment shown in FIGS. 51A & 51B enables observers to accommodate and attach to optical image sources like camera lenses that are manufactured with camera lens mounts.

The camera mounts are themselves configured with their own locking means. The camera mount's locking means is used to lock the mobile apparatus to the camera lens optical image source.

Screw thread is shown in the figure as an example of a mechanical connecting means for mechanically connecting adjacent modular enclosures. Screw thread is an example of a mechanical connecting means. Screw threaded joints are a simple, inexpensive and space saving method especially for connecting enclosures having a cylindrical profile.

The front ends of the module's N42 and N43 an N38 cylindrical enclosures are under cut and threaded with female threads. The rear ends of the module's cylindrical enclosures are over cut and threaded with male threads. The rear ends of the module's cylindrical enclosures i.e. N34 mates with the front end of the module's cylindrical enclosure N42 in order to connect the two modules together.

Screw thread is given in the present invention as an example of a mechanical connecting means. Other mechanical connecting means are also appropriate i.e. snap-fit connections.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIGS. 51A & 51B are identified as follows:

N1 is an electronics circuits that is comprised of a audio amplifier, and a zoom lens actuator servo electronics package.

N2 is the battery and a power control module.

N3 is the DVR electronics.

N4 is the threaded screw-on end cap module on the mobile apparatus' enclosure. Details of the end cap module are shown in FIGS. 18E & 18F & 18G.

N5 is the analog transmitter.

N6 is a mating camera lens mount of the mobile apparatus. N6 is connected mechanically to N34.

This connection is done typically using flat headed counter-sunk machine screws which fasten N6 to N34. N6 is for attaching the mobile apparatus to optical image sources that are camera lenses that have a mating lens mount.

N7 is a typical marginal rim ray focused in the image plane of a typical eyepiece of a typical mobile apparatus by a typical optical image source (not shown).

N8 is a typical marginal rim ray focused in the image plane of a typical eyepiece of a typical mobile apparatus by a typical optical image source.

N9 is the modular enclosure for the eyepiece module.

N10 is the field lens of the eyepiece of the mobile apparatus.

N11 is the WiFi digital transceiver electronics.

N12 is the zoom lens actuator. N12 is used by the observer to remotely control the functions of the zoom lens.
  The zoom lens functions are magnification control, iris diaphragm control, and focus control.
  When actuated by the observer, N12 mechanically rotates N19 to control the magnification of the zoom lens.
  When actuated by the observer, N12 mechanically rotates N26 to control the iris diaphragm of the zoom lens.
  When actuated by the observer, N12 mechanically rotates N21 to control the focus of the zoom lens.
  The observer can still maintain control of the zoom lens by manually rotating the adjustment rings.
N13 is the front and first lens of a typical zoom lens optical assembly.
N14 is the second lens of the zoom lens optical assembly.
N15 is the third lens of the zoom lens optical assembly.
N16 is the threaded end of the right cylindrical tubular enclosure of the mobile apparatus.
N17 is the front end of the zoom lens housing. The zoom lens receives afocal imagery and transforms the afocal imagery into focal imagery at the electronic image sensor array. The zoom lens focuses the focal imagery on to N17.
  The effective focal length of the zoom lens is adjustable. The effective focal length of the zoom lens is controlled by the observer. The observer controls the magnification of the zoom lens by varying the effective focal length of the zoom lens. The observer can manually change the magnification of the zoom lens or change the magnification by operating the zoom lens electronic actuator.
  The observer controls the size of the imagery on the image sensor array by controlling the magnification. The observer can adjust the size of the field of view of the imagery on the image sensor array by varying the magnification. The observer can capture the full field of view of the imagery on the aperture stop of the eyepiece by just filling the size of the image of the aperture stop onto the image sensor array. The observer can also vary the brightness of the image on the image sensor array by varying the effective focal length of the zoom lens and the magnification, thereby changing the f-number of the imagery on the image sensor array. The observer can increase the brightness of the imagery by reducing the zoom lens magnification. The observer can also vary the brightness of the imagery by actuating the iris diaphragm, either manually, or electronically by controlling the zoom lens electronic actuator. The observer can sharply focus the imagery on the image sensor array by operating the focus control on the zoom lens, either manually, or electronically by controlling the zoom lens electronic actuator.
  The zoom lens functions are magnification control, iris diaphragm control, and focus control.
  When actuated manually, observer controls the magnification of the zoom lens, the iris diaphragm of the zoom lens, and the focus of the zoom lens. The observer can maintain manual control of the zoom lens by rotating the adjustment rings by hand. The observer is enabled to adjust the focus for objects whose distances to the optical image source may be changing during an observing session.
N18 is the system controller electronics.
N19 is the magnification adjustment ring of the zoom lens.
N20 is the Internet WIFI transceiver electronics.
N21 is the focus adjustment ring of a typical zoom lens.
N22 is the eye lens of a typical eyepiece of the mobile apparatus.

N23 is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.
  The electronic image sensor array camera as shown in the figure is comprised of a cover and an electronic image sensor array and its associated camera electronics. The sensor array, for example is a CCD, CMOS or other sensor array type
N24 is the field stop of the typical eyepiece of the mobile apparatus.
  If the optical image source already is configured with a field stop, then the special eyepiece's field stop is unnecessary and will be unscrewed and removed from the special eyepiece, and the optical image source's field stop will be used instead.
N25 is a typical principal ray in the image plane of the eyepiece of a typical mobile apparatus.
N26 is the iris diaphragm adjustment ring of a typical zoom lens.
N27 is the DVR storage memory device.
N28 is the analog transmitter's RF antenna.
N29 is the WiFi digital transceiver's WiFi antenna.
N30 is the image sensor array of N23.
N31 is the Internet WIFI transceiver's antenna.
N32 is a typical zoom lens iris diaphragm.
N33 is a threaded joint for attaching the eyepiece shown in FIGS. 17A & 17B to N42.
N34 is the camera lens mount module's extension device of the mobile apparatus. N34 is for housing a mating camera lens mount N6. N34 screws into N42 at N39.
N35 is switch for turning on or off the microphone.
N35 is switch for turning on or off the speaker.
N37 is the fourth lens of the zoom lens.
N38 is the modular enclosure for the electronics circuits which is comprised of N1, N2, N3, N5, N11, N18, N20 and N27. N38 is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities to match the challenges encountered during an observing session by the observer.
  Each one of the electronic circuits modules enables the observer to exercise different capabilities during an observing session. The observer may choose to use an electronic circuits module which uses any one of the circuits described above in the figures in the mobile apparatus by simply loading the module containing the circuit into the mobile apparatus.
N39 is the threaded joint joining N34 and N42.
N40 is the threaded joint for joining N42 and N43.
N41 is the threaded joint for joining N43 and N38.
N42 is the modular enclosure for the zoom lens module.
N43 is the modular enclosure for the electronic image sensor array camera module.
  Refer to FIG. 1B as a reference for the optical image source.
  The eyepiece module N9 optically acquires the optical image source's focal image of the object at N24 and optically transforms the focal image into a afocal image and optically transfers the afocal image to the zoom lens module N42 which optically transforms the afocal image into a focal image at N30 of N43.

The electronic image sensor array camera module N43 electronically transforms the focal image at N30 into electronic imagery signals, and the electronic circuits module N38 electronically transforms and transmits the electronic imagery signals from the output terminals of N38 and N4 to the observer and the observer's audience. The electronic imagery signals meet analog and/or digital protocols depending on the type of analog or digital electronics used by the observer in the electronic sensor array camera module N43 and the electronic circuits module N38.

FIG. 52

FIG. 52 shows a side view section of the optical system schematic of a preferred embodiment of a mobile apparatus, where the mobile apparatus has its own eyepiece, and where the optical image source is a camera lens with a lens mounting.

The mobile apparatus shown in FIG. 52 is configured with a eyepiece module, a zoom lens module and a electronic image sensor array camera module.

The mobile apparatus disclosed in FIG. 52 is configured for being attached to and compatible with the optical image source shown in FIG. 1B. The camera lens mounts come in several types. For example, the screw types, the bayonet types, the breech lock types, the double bayonet types, and the tab lock types.

Therefore the preferred embodiment shown in FIG. 52 enables observers to accommodate and attach to optical image sources like camera lenses that are manufactured with camera lens mounts.

The camera mounts are themselves configured with their own locking means. The camera mount's locking means is used to lock the mobile apparatus to the camera lens optical image source.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The preferred embodiment of the mobile apparatus shown in FIG. 52 shows the mobile apparatus comprised of the lens mount extension module P34, the eyepiece module P9, and the zoom lens module P42, the electronic image sensor array camera module P43, and the electronics circuit module P38. The antennas P28 and P31, which are driven by the electronics circuit module P38, are enclosed within P42 and P43 and P38.

The mobile apparatus shown in FIG. 52 is configured with a lens mount extension module P34, a eyepiece module P9, a zoom lens module P42 and a electronic image sensor array camera module P43, and a electronics circuit module P38. The modules are connected coaxially in tandem with each other.

The method for attaching the mobile apparatus to the optical image source camera lens shown in FIG. 1B is as follows: bring the mobile apparatus' mating lens mount P6 in contact with the optical image source camera lens mount. Twist, snap and attach the mating lens mount P6 of the mobile apparatus to the optical image source camera lens mount of the camera lens.

The camera lens mounts come in several types. For example, the screw types, the bayonet types, the breech lock types, the double bayonet types, and the tab lock types.

Therefore the preferred embodiment shown in FIGS. 51A & 51B enables observers to accommodate and attach to optical image sources like camera lenses that are manufactured with camera lens mounts.

The camera mounts are themselves configured with their own locking means. The camera mount's locking means is used to lock the mobile apparatus to the camera lens optical image source.

Screw thread is shown in the figure as an example of a mechanical connecting means for mechanically connecting adjacent modular enclosures. Screw thread is an example of a mechanical connecting means. Screw threaded joints are a simple, inexpensive and space saving method especially for connecting enclosures having a cylindrical profile.

The front ends of the module's P24 and P21 cylindrical enclosures are under cut and threaded with female threads. The rear ends of the module's cylindrical enclosures are over cut and threaded with male threads. The rear ends of the module's cylindrical enclosures i.e. P27 mates with the front end of the module's cylindrical enclosure P24 in order to connect the two modules together.

Screw thread is given in the present invention as an example of a mechanical connecting means. Other mechanical connecting means are also appropriate i.e. snap-fit connections.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawing shown in FIG. 52 are identified as follows:

P1 is a mating camera lens mount of the mobile apparatus. P1 is connected mechanically to P27.
  This connection is done typically using flat headed counter-sunk machine screws which fasten P1 to P27. P1 is for attaching the mobile apparatus to optical image sources that are camera lenses that have a mating lens mount. The optical image source, i.e. the camera lens, is not shown in FIG. 52.
P2 is the optical axis of the optical image source.
P3 is not shown.
P4 is the principal ray from the optical image source.
P5 is the image plane of the optical image source coincident with the original equipment eyepiece field stop P22.
P6 is a typical marginal rim ray of the optical image source.
P7 is not shown.
P8 is the is the modular enclosure for the eyepiece module.
P9 is the field lens of a typical eyepiece of the mobile apparatus.
P10 is the eye lens of the typical eyepiece of the mobile apparatus.
P11 is the housing of the typical zoom lens of the mobile apparatus.
  The zoom lens receives afocal imagery and transforms the afocal imagery into focal imagery at the electronic image sensor array. The zoom lens focuses the focal imagery on to P17. The effective focal length of the zoom lens is adjustable. The effective focal length of the zoom lens is controlled by the observer. The observer controls the magnification of the zoom lens by varying the effective focal length of the zoom lens. The observer can manually change the magnification of the zoom lens or change the magnification by operating the zoom lens electronic actuator.

The observer controls the size of the imagery on the image sensor array by controlling the magnification. The observer can adjust the size of the field of view of the imagery on the image sensor array by varying the magnification. The observer can capture the full field of view of the imagery on the aperture stop of the eyepiece by just filling the size of the image of the aperture stop onto the image sensor array. The observer can also vary the brightness of the image on the image sensor array by varying the effective focal length of the zoom lens and the magnification, thereby changing the f-number of the imagery on the image sensor array. The observer can increase the brightness of the imagery by reducing the zoom lens magnification. The observer can also vary the brightness of the imagery by actuating the iris diaphragm, either manually, or electronically by controlling the zoom lens electronic actuator. The observer can sharply focus the imagery on the image sensor array by operating the focus control on the zoom lens, either manually, or electronically by controlling the zoom lens electronic actuator.

The zoom lens functions are magnification control, iris diaphragm control, and focus control.

When actuated manually, the observer controls the magnification of the zoom lens, the iris diaphragm of the zoom lens, and the focus of the zoom lens.

The observer can maintain manual control of the zoom lens by rotating the adjustment rings by hand.

The observer is enabled to adjust the focus for objects whose distances to the optical image source may be changing during an observing session.

P12 is the outside diameter of the modular enclosure for the eyepiece.

P13 is the first lens of the mobile apparatus' zoom lens.

P14 is the second lens of the mobile apparatus' zoom lens.

P15 is the third lens of the mobile apparatus' zoom lens.

P16 is the fourth lens of the mobile apparatus' zoom lens.

P17 is the image plane of the mobile apparatus coincident with the optically active surface of the image sensor array P18.

P18 is the optically active surface of the image sensor array of the electronic image sensor array camera P26 of the mobile apparatus.

P19 is the optically inactive rear of the image sensor array.

P20 is the tail end of the mobile apparatus' zoom lens' housing P11.

P21 is the tail end of the mobile apparatus' of the electronic image sensor array camera module's enclosure of the electronic image sensor array camera P26. Hard wire cable (the cable is not shown) carries the video signal from an output port on the electronic image sensor array camera to the observer for the observer to hook up to and disseminate to his audience under the control of the observer. Alternately, if the observer prefers, the observer can run a cable from the output port on the electronic image sensor array camera directly to the observer's audience.

P22 is the field stop of the mobile apparatus' eyepiece. If the optical image source already is configured with a field stop, then the special eyepiece's field stop is unnecessary and will be unscrewed and removed from the special eyepiece, and the optical image source's field stop will be used instead.

P23 shows where P8 is joined and threaded into P24.

P24 is the modular enclosure for the zoom lens P11 module.

P25 is the threaded joint between P24 and P21.

P26 is the electronic image sensor array camera showing its cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.

The electronic image sensor array camera as shown in the figure is comprised of a cover and an electronic image sensor array and its associated camera electronics. The sensor array, for example is a CCD, CMOS or other sensor array type.

P27 is the camera lens mount module's extension device of the mobile apparatus. P27 is for housing a mating camera lens mount P1. P27 screws onto P24 at P28.

P28 is the threaded joint for joining P27 and P24.

P29 is the battery.

P30 is the end cap module.

Refer to FIG. 1B as a reference for the optical image source.

In the preferred embodiment shown in FIG. 52, the optical system of the mobile apparatus is comprised of an eyepiece module and a zoom lens module, and a image sensor array camera module. The eyepiece is used in tandem with the zoom lens and the image sensor array. The eyepiece and the zoom lens and the image sensor array share a common optical and mechanical axis P2.

The eyepiece examples shown in the figures of all three preferred embodiments are of the Plossl type. The Plossl type eyepiece is chosen in our examples because of its simplicity and the ease of explanation of an eyepiece's functions. The Plossl has two identical lenses that are mounted back to back to one another in its housing. The Plossl has good overall optical performance and enjoys ease of manufacture.

One of the needed desirable characteristics of the Plossl in the present invention, is its long eye relief. The long eye relief yields a long back focal length of the eyepiece and allows its exit pupil to be projected and refracted into the zoom lens coincident with the location of the zoom lens' entrance pupil which is the location of the eyepiece's aperture stop. This allows for the unvignetted passage of the eyepiece's light from the image formed by the optical image source's objective to the eyepiece's field stop and through the zoom lens without vignetting.

For example, for a typical Plossl eyepiece effective focal length, the eye relief is a pre-determined value. The eyepiece has a field stop which is imaged by the eyepiece to infinity, thereby collimating its image light to its exit pupil. The eyepiece refracts its exit pupil along the eyepiece's optical axis, and onto the entrance pupil of the zoom lens. The zoom lens sees an image, which is located at the field stop of the eyepiece, as though it was infinitely distant. The image is afocal.

There are standard eyepiece housing diameters in common use today. They are for example 0.965", 0.905", 1.18", 1.25", 2" and 2.7" diameters.

The zoom lens example shown is of the afocal type. The afocal type zoom lens is chosen for its simplicity and ease of explanation for the general usage and operation of zoom lenses.

The afocal type has four lens groups in its assemblage. All four lens groups of the assembly are mounted inside the zoom lens' housing and aligned along a common optical and mechanical axis. Collimated light enters the first lens group of the lens assembly, from the eyepiece. The first lens group has a net positive power. The first lens group de-collimates the light and refracts and focuses an image from its field stop through the second lens.

The second lens group is physically movable along the optical axis of the zoom lens assembly. The second lens group has a net negative power. Movement of the second lens group along the optical axis changes the magnification of the zoom lens assembly. The second lens group projects an image in through the third lens group.

The third lens group has a net positive power. During an observing session, the observer can adjust the location of the second lens group either manually or automatically using a zoom lens actuator. The zoom lens actuator, under the control of the observer, physically moves the second lens group to adjust the zoom lens' magnification.

The zoom lens is designed so that the light exiting the third lens group is afocal and collimated back to infinity, no matter what the location is of the second lens group along the optical axis. Therefore, the diameter of the exit pupil formed by the third lens group varies with the location of the second lens group along the optical axis. The first, second and third lens groups thereby comprise an afocal optical system. The power of the afocal optical system is the ratio of the diameter of the entrance pupil of the first lens group to the diameter of the exit pupil formed from the third lens group.

The fourth lens group has a net positive power. Light received into the entrance pupil of the fourth lens group, afocally from the third lens group, is imaged by the fourth lens group onto the focal plane of the fourth lens group. Its focal plane i.e. image plane, lies on and coincident with, the active photo sensitive surface of an image sensor array. The image sensor array is an electronic component of a CCD or CMOS camera for example. The image sensor array is aligned on the optical axis of the zoom lens assembly such that its electronic imaging center line lies on the optical axis of the zoom lens assembly. The image sensor array converts, i.e. transforms, the optical image it receives from the zoom lens assembly to electronic signals which represent the optical image.

Zoom lenses typically have three manual controls; a manually actuated control arm for magnification, a manually actuated control arm for the iris diaphragm, and a manually actuated control arm for focus for example.

The mobile apparatus shown in FIG. 52 is configured with a series of modular enclosures P21, P24, P27 and P8 that are threaded together back to back in tandem with one another with a common mechanical and optical axis P2. The enclosures are called modular because each one contains a single functional physical element, i.e. the eyepiece and the zoom lens and the image sensor array camera, where each modular enclosure and its elemental contents can be connected or disconnected from the other modular enclosures. The combination of the modular enclosure and its contents is referred to as a module.

The eyepiece of the mobile apparatus is mounted and aligned inside modular enclosure P3.

The zoom lens of the mobile apparatus is mounted and aligned inside modular enclosure P27.

The image sensor array of the mobile apparatus is mounted and aligned inside modular enclosure P1.

Modular enclosure P3 is threaded at its rear end.

Modular enclosure P27 is threaded at its front end and at its rear end.

Modular enclosure P1 is threaded at its front end and at its rear end.

P3 and P27 and P1 have common threads.

Modular enclosure P3 screws into and connects with modular enclosure P27 at P25.

Modular enclosure P27 screws into and connects with modular enclosure P1 at P26.

The mobile apparatus can be dissembled into its respective modular enclosures by unscrewing and disconnecting them from one another.

Maintenance and repair of the eyepiece, zoom lens, or image sensor array can be accomplished by disassembly of the mobile apparatus into its respective modular enclosures.

The dysfunctional physical elements like for example a defective eyepiece, zoom lens, or image sensor array are then removed from their respective modular enclosures, and then worked on as needed.

Replacement of dysfunctional eyepieces, zoom lenses, or image sensor arrays can be accomplished by removal of the dysfunctional physical element form its modular enclosure, and substituted for with a functional replacement physical element.

The eyepiece module P8 optically acquires the optical image source's focal image of the object at P5 and optically transforms the focal image into a afocal image and optically transfers the afocal image to the zoom lens module P24 which optically transforms the afocal image into a focal image at P17 of P18.

The electronic image sensor array camera module P18 electronically transforms the focal image at P17 into electronic imagery signals, and transmits the electronic imagery signals from the output terminals of P21 and P30 to the observer and the observer's audience. The electronic imagery signals meet analog and/or digital protocols depending on the type of analog or digital electronics used by the observer in the electronic sensor array camera module P18.

FIG. 53

FIG. 53 shows a side view section of the optical system schematic of a preferred embodiment of a mobile apparatus, where the mobile apparatus has its own eyepiece, and where the optical image source is a typical camera lens with a lens mounting, for example a 35 mm camera lens.

The mobile apparatus shown in FIG. 53 is configured with a eyepiece module, a zoom lens module and a electronic image sensor array camera module.

The mobile apparatus disclosed in FIG. 53 is configured for being attached to and compatible with the optical image source shown in FIG. 1B. The camera lens mounts come in several types. For example, the screw types, the bayonet types, the breech lock types, the double bayonet types, and the tab lock types.

Therefore the preferred embodiment shown in FIG. 53 enables observers to accommodate and attach to optical image sources like camera lenses that are manufactured with camera lens mounts.

The camera mounts are themselves configured with their own locking means. The camera mount's locking means is used to lock the mobile apparatus to the camera lens optical image source.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The preferred embodiment of the mobile apparatus shown in FIG. 53 shows the mobile apparatus comprised of the lens mount extension module Q27, the eyepiece module 8, and the zoom lens module Q24, and the electronic image sensor array camera module Q21.

The mobile apparatus shown in FIG. 53 is configured with a lens mount extension module Q27, a eyepiece module Q8, a zoom lens module Q24 and a electronic image sensor array camera module Q21. The modules are connected coaxially in tandem with each other.

The method for attaching the mobile apparatus to the optical image source camera lens shown in FIG. 1B is as follows: bring the mobile apparatus' mating lens mount Q29 in contact with the optical image source camera lens mount Q28. Twist, snap, attach and lock the mating lens mount Q29 of the mobile apparatus to the optical image source camera lens mount Q28 of the camera lens.

The camera lens mounts come in several types. For example, the screw types, the bayonet types, the breech lock types, the double bayonet types, and the tab lock types. These types are self locking.

Therefore the preferred embodiment shown in FIGS. 51A & 51B enables observers to accommodate, attach and lock to optical image sources like camera lenses that are manufactured with camera lens mounts.

The camera mounts are themselves configured with their own locking means. The camera mount's locking means is used to lock the mobile apparatus to the camera lens optical image source.

Screw thread is shown in the figure as an example of a mechanical connecting means for mechanically connecting adjacent modular enclosures. Screw thread is an example of a mechanical connecting means. Screw threaded joints are a simple, inexpensive and space saving method especially for connecting enclosures having a cylindrical profile.

The front ends of the module's Q24 and Q21 cylindrical enclosures are under cut and threaded with female threads. The rear ends of the module's cylindrical enclosures are over cut and threaded with male threads. The rear ends of the module's cylindrical enclosures i.e. Q27 mates with the front end of the module's cylindrical enclosure Q24 in order to connect the two modules together.

Screw thread is given in the present invention as an example of a mechanical connecting means. Other mechanical connecting means are also appropriate i.e. snap-fit connections.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawing shown in FIG. 53 are identified as follows:

Q1 is the aperture stop of the camera lens optical image source.

Q2 is the optical axis of the camera lens optical image source.

Q3 is the housing of the camera lens optical image source.

Q4 is the principal ray from the camera lens optical image source.

Q5 is the image plane of the camera lens optical image source coincident with the eyepiece field stop Q22.

Q6 is a typical marginal rim ray of the camera lens optical image source.

Q7 is the optical system of the camera lens optical image source.

For many camera lens optical image sources, the full and complete optical system of the camera lens optical image source is far more complex than just the single doublet lens shown in FIG. 1, and is comprised of multiple lenses, mirrors and prisms. The single doublet lens Q7 shown is only meant to simplify the drawing and only symbolically represents the full and complete optical system of the camera lens optical image source.

Q8 is the is the modular enclosure and housing for the eyepiece module of the mobile apparatus.

Q9 is the field lens of a typical eyepiece of the mobile apparatus.

Q10 is the eye lens of the typical eyepiece of the mobile apparatus.

Q11 is the housing of the typical zoom lens of the mobile apparatus.

The zoom lens Q11 receives afocal imagery and transforms the afocal imagery into focal imagery at the electronic image sensor array Q18. The zoom lens Q11 focuses the afocal imagery on to Q17. The effective focal length of the zoom lens is adjustable. The effective focal length of the zoom lens is controlled by the observer. The observer controls the magnification of the zoom lens by varying the effective focal length of the zoom lens. The observer can manually change the magnification of the zoom lens.

The observer controls the size of the imagery of the object on the image sensor array by controlling the magnification.

The observer can adjust the size of the field of view of the imagery of the object on the image sensor array by varying the magnification. The observer can capture the full field of view of the object's imagery on the aperture stop of the eyepiece by just filling the size of the image of the aperture stop onto the image sensor array. The observer can also vary the brightness of the object's image on the image sensor array by varying the effective focal length of the zoom lens and the magnification, thereby changing the f-number of the object's imagery on the image sensor array.

The observer can increase the brightness of the object's imagery by reducing the zoom lens' magnification. The observer can also vary the brightness of the imagery by manually actuating the iris diaphragm. The observer can sharply focus the object's imagery on the image sensor array by manually operating the focus control on the zoom lens.

The zoom lens functions are magnification control, iris diaphragm control, and focus control.

When actuated manually, the observer controls the magnification of the zoom lens, the iris diaphragm of the zoom lens, and the focus of the zoom lens.

The observer can maintain manual control of the zoom lens by rotating the adjustment rings by hand.

The observer is enabled to adjust the changing focus of the object's imagery when the object's distance to the optical image source may be changing during an observing session.

Q12 is the outside diameter of the modular enclosure and housing of the eyepiece.

Q13 is the first lens of the mobile apparatus' zoom lens.

Q14 is the second lens of the mobile apparatus' zoom lens.

Q15 is the third lens of the mobile apparatus' zoom lens.

Q16 is the fourth lens of the mobile apparatus' zoom lens.

Q17 is the image plane of the mobile apparatus coincident with the optically active surface of the image sensor array 18.

Q18 is the optically active surface of the image sensor array and its associated camera electronics of the electronic image sensor array camera Q26 of the mobile apparatus.

Q19 is the optically inactive rear of the image sensor array.

Q20 is the tail end of the mobile apparatus' zoom lens' housing Q11.

Q21 is the tail end of the mobile apparatus' modular enclosure of the electronic image sensor array camera module of the electronic image sensor array camera Q26. Hard wire cable (the cable is not shown) carries the video signal from an output port on the electronic image sensor array camera to the observer for the observer to hook up to and disseminate to his audience under the control of the observer. Alternately, if the observer prefers, the observer can run a cable from the output port on the electronic image sensor array camera directly to the observer's audience.

Q22 is the field stop of the mobile apparatus' eyepiece.

If the optical image source already is configured with a field stop, then the special eyepiece's field stop is unnecessary and will be unscrewed and removed from the special eyepiece, and the optical image source's field stop will be used instead.

Q23 shows where Q8 is joined and threaded into Q24.

Q24 is the modular enclosure for the zoom lens Q11 module.

Q25 is the threaded joint between Q24 and Q21.

Q26 is the electronic image sensor array camera showing its cover. The electronic image sensor array camera is configured for providing electronic imagery signals to the observer from a electrical connector port on its cover. The electronic image sensor array camera is configured for receiving electronic control commands from the observer for controlling the camera, and furnishing electronic status signals to the observer from a electrical connector port on its cover.

The electronic image sensor array camera as shown in the figure is comprised of a cover and an electronic image sensor array and its associated camera electronics. The sensor array, for example is a CCD, CMOS or other sensor array type, for controlling the camera.

Q27 is the camera lens mount module's extension device of the mobile apparatus. Q27 is for housing a mating camera lens mount Q1. Q27 screws onto Q24 at Q28.

Q28 is the camera lens mount for the optical image source. Q28 is typically fastened to Q3 for 35 mm camera lenses for example.

Q29 is a mating camera lens mount of the mobile apparatus. Q29 is connected mechanically to Q27.

This connection is done typically using flat headed counter-sunk machine screws which fasten Q29 to Q27. Q29 is for attaching the mobile apparatus to optical image sources that are camera lenses that have a mating lens mount Q28.

Q30 is the threaded joint for joining Q27 and Q24.

Q31 is the battery.

Q32 is the end cap module.

Refer to FIG. 1B as a reference for the camera lens optical image source.

In the preferred embodiment shown in FIG. 53, the optical system of the mobile apparatus is comprised of an eyepiece Q8 and a zoom lens Q11, and a image sensor array Q17. The eyepiece is used in tandem with the zoom lens and the image sensor array. The eyepiece and the zoom lens and the image sensor array share a common optical and mechanical axis Q2.

The eyepiece examples shown in the figures of all three preferred embodiments are of the Plossl type. The Plossl type eyepiece is chosen in our examples because of its simplicity and the ease of explanation of an eyepiece's functions.

The Plossl has two identical lenses that are mounted back to back to one another in its housing. The Plossl has good overall optical performance and enjoys ease of manufacture.

One of the needed desirable characteristics of the Plossl in the present invention, is its long eye relief. The long eye relief yields a long back focal length of the eyepiece and allows its exit pupil to be projected and refracted into the zoom lens coincident with the location of the zoom lens' entrance pupil which is the location of the eyepiece's aperture stop. This allows for the unvignetted passage of the eyepiece's light from the object's image formed by the optical image source's objective to the eyepiece's field stop and through the zoom lens without vignetting.

For example, for a typical Plossl eyepiece effective focal length, say 25 mm, the eye relief is a pre-determined value. The eyepiece has a field stop which is imaged by the eyepiece to infinity, thereby collimating its image light to its exit pupil. The eyepiece refracts its exit pupil along the eyepiece's optical axis, and onto the entrance pupil of the zoom lens. The zoom lens sees an image of the object which is located at the field stop of the eyepiece, as though it was infinitely distant. The object's image is afocal.

There are standard eyepiece housing diameters in common use today. They are for example 0.965", 0.905", 1.18", 1.25", 2" and 2.7" diameters.

The zoom lens example shown is of the afocal type. The afocal type zoom lens is chosen for its simplicity and ease of explanation for the general usage and operation of zoom lenses.

The afocal type has four lens groups in its assemblage. All four lens groups of the assembly are mounted inside the zoom lens' housing and aligned along a common optical and mechanical axis. Collimated light enters the first lens group of the lens assembly, from the eyepiece. The first lens group has a net positive power. The first lens group de-collimates the light and refracts and focuses an image from its field stop through the second lens.

The second lens group is physically movable along the optical axis of the zoom lens assembly. The second lens group has a net negative power. Movement of the second lens group along the optical axis changes the magnification of the zoom lens assembly. The second lens group projects an image in through the third lens group.

The third lens group has a net positive power. During an observing session, the observer can adjust the location of the second lens group manually. The zoom lens second lens group, under the control of the observer, is physically moved to adjust the zoom lens' magnification.

The zoom lens is designed so that the light exiting the third lens group is afocal and collimated back to infinity, no matter what the location is of the second lens group along the optical axis. Therefore, the diameter of the exit pupil formed by the third lens group varies with the location of the second lens group along the optical axis. The first, second and third lens groups thereby comprise an afocal optical system. The power of the afocal optical system is the ratio of the diameter of the entrance pupil of the first lens group to the diameter of the exit pupil formed from the third lens group.

The fourth lens group has a net positive power. Light received into the entrance pupil of the fourth lens group, afocally from the third lens group, is imaged by the fourth lens group onto the focal plane of the fourth lens group. Its focal plane i.e. image plane, lies on and coincident with, the active photo sensitive surface of an image sensor array. The image sensor array is an electronic component of a CCD or CMOS camera for example. The image sensor array is aligned on the optical axis of the zoom lens assembly such that its electronic imaging center line lies on the optical axis of the zoom lens assembly. The image sensor array converts, i.e. transforms, the optical image it receives from the zoom lens assembly to electronic signals which represent the optical image.

Zoom lenses typically have three manual controls; a manually actuated control arm for magnification, a manually actuated control arm for the iris diaphragm, and a manually actuated control arm for focus for example.

The mobile apparatus shown in FIG. 53 is configured with a series of modular enclosures Q21, Q24, Q27 and Q8 that are threaded together back to back in tandem with one another with a common mechanical and optical axis Q2. The enclosures are called modular because each one contains a single functional physical element, i.e. the eyepiece and the zoom lens and the image sensor array camera, where each modular enclosure and its elemental contents can be connected or disconnected from the other modular enclosures. The combination of the modular enclosure and its contents is referred to as a module.

The eyepiece of the mobile apparatus is mounted and aligned inside modular enclosure Q8.

The zoom lens of the mobile apparatus is mounted and aligned inside modular enclosure Q24.

The image sensor array of the mobile apparatus is mounted and aligned inside modular enclosure Q21.

Modular enclosure Q8 is threaded at its rear end.

Modular enclosure Q24 is threaded at its front end and at its rear end.

Modular enclosure Q21 is threaded at its front end and at its rear end.

Modular enclosure Q27 is threaded at its rear end.

Q8 and Q24 and Q21 and Q27 have common threads.

Modular enclosure Q8 screws into and connects with modular enclosure Q24 at Q23.

Modular enclosure Q24 screws into and connects with modular enclosure Q27 at Q30.

Modular enclosure Q24 screws into and connects with modular enclosure Q21 at Q25.

The mobile apparatus can be dissembled into its respective modular enclosures by unscrewing and disconnecting them from one another.

Maintenance and repair of the eyepiece, zoom lens, or image sensor array can be accomplished by disassembly of the mobile apparatus into its respective modular enclosures Q8, Q24 and Q21 respectively.

The dysfunctional physical elements like for example a defective eyepiece, zoom lens, or image sensor array are then removed from their respective modular enclosures, and then worked on as needed.

Replacement of dysfunctional eyepieces, zoom lenses, or image sensor arrays can be accomplished by removal of the dysfunctional physical element form its modular enclosure, and substituted for with a functional replacement physical element. Substitute eyepieces, zoom lenses, and image sensor arrays can also be employed in order to better match the job, match the environment, match the object, match the audience, etc. especially when the observer wishes to observe a different object than the previous one that the observer had been observing during the current observing session.

The eyepiece module 8 optically acquires the optical image source's focal image of the object at Q5 and optically transforms the focal image into a afocal image and optically transfers the afocal image to the zoom lens module Q24 which optically transforms the afocal image into a focal image at Q17 of Q21.

The electronic image sensor array camera module Q21 electronically transforms the focal image at Q17 into electronic imagery signals, and transmits the electronic imagery signals from the output terminals of Q21 and Q32 to the observer and the observer's audience. The electronic imagery signals meet analog and/or digital protocols depending on the type of analog or digital electronics used by the observer in the electronic sensor array camera module Q21.

FIG. 54

FIG. 54 shows a side view section of a layout of a preferred embodiment of a mobile apparatus, and showing the lens mount extension module of the mobile apparatus holding a precision clamping mechanism. The preferred embodiment shown in FIG. 54 is for accommodating optical image sources that are manufactured with their own original equipment original equipment eyepieces.

The preferred embodiment shown in FIG. 54 is for attaching the mobile apparatus to optical image sources having original equipment eyepiece housings with irregular surface profiles as shown in FIG. 2B.

The top view of the preferred embodiment FIG. 54 of the mobile apparatus is similar to the top view shown in FIG. 32 for FIG. 30 and FIG. 31 showing two antennas, each one mounted on its respective swivel, wherein both antennas are deployed externally in a common groove, wherein the swivels are at the same end of the groove.

The top view of the preferred embodiment FIG. 54 of the mobile apparatus is similar to the top view shown in FIG. 33 for FIG. 30 and FIG. 31 showing two antennas, each one mounted on its respective swivel, wherein both antennas are deployed externally in a common groove, wherein the swivels are at opposite ends of the groove.

The mobile apparatus disclosed in FIG. 54 is configured for being attached to and compatible with the optical image source shown in FIG. 2.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The preferred embodiments of the mobile apparatus shown in FIG. 54 shows the modules configured in the form of a capital letter "T". The stem of the "T" is comprised of the clamping mechanism module R3, and the zoom lens module R31, and the electronic image sensor array camera module R18. The cross member of the "T" is comprised of the electronics circuit module R13 and the battery and electronics power control module R15.

The purpose of the "T" formation of the modules is to provide an ergonomic handle for the observer while handling the mobile apparatus during its deployment onto or off of the optical image sources. It also shortens the length of the mobile apparatus. It allows for the position of its center of gravity to be controlled. It also allows for the position of the microphone and speaker in the end cap modules R9 and R16 to be controlled.

The mobile apparatus shown in FIG. 54 is configured with a clamping mechanism module R3, a zoom lens module R31 and a electronic image sensor array camera module R18, a electronics circuit module R13, and battery and electronics power control module R15. The clamping mechanism module R3, a zoom lens module R31 and a electronic image sensor array camera module R18 are coaxially connected. The electronics circuit module R13, and battery and electronics power control module R15 are coaxially connected.

The method for attaching the mobile apparatus to the optical image source shown in FIG. 2B is as follows: Initially slide the front end R3 of the mobile apparatus over the "O" rings on original equipment eyepiece housing of the optical image source.

Rotate the mobile apparatus about R1 until the top of the image coincides with the top of the image sensor array.

The precision clamping mechanism R2 is then manually tightened around the original equipment eyepiece housing of the optical image source using the knurled handgrip on R2 with a twist of the wrist.

Therefore, for irregular barrels and irregular original equipment eyepieces, the "O" rings improve the self centering and self aligning precision and gripping operation of the clamping mechanism module.

Fine focus is achieved by operating the zoom lens electro-mechanical actuator R19.

Screw thread is shown in the figure as an example of a mechanical connecting means for mechanically connecting adjacent modular enclosures.

Screw thread is an example of a mechanical connecting means.

Screw threaded joints are a simple, inexpensive and space saving method especially for connecting enclosures having a cylindrical profile.

The front ends of the module's R31 and R8 cylindrical enclosures are under cut and threaded with female threads. The rear ends of the module's cylindrical enclosures are over cut and threaded with male threads. The rear ends of the module's cylindrical enclosures i.e. R31 mates with the front end of the module's cylindrical enclosure R18 in order to connect the two modules together.

Screw thread is given in the present invention as an example of a mechanical connecting means. Other mechanical connecting means are also appropriate i.e. snap-fit connections.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The method for attaching the mobile apparatus to the optical image source shown in FIG. 2 is as follows: Initially slide the front end R3 of the mobile apparatus over the "O" rings on the outside diameter of the original equipment eyepiece housing R35 of the optical image source.

The precision clamping mechanism R2 is then manually tightened around the barrel R21 of the optical image source using the knurled handgrip on R3 with a twist of the wrist.

The detailed physical elements disclosed in the drawings shown in FIG. 54 and FIG. 32 and FIG. 33 are identified as follows:

R1 is the optical and mechanical axis of the mobile apparatus.

R2 is the clamping mechanism of the mobile apparatus, wherein R2 is mounted inside of R3.

R2 is mounted and threads into R3 at R4 where it is fixed.

R3 is the clamping mechanism module of the mobile apparatus, wherein R3 screws into R31 at R5. R3 mounts and holds R2 at R4.

R4 is a threaded joint for attaching R2 to R3. The eyepiece is not needed in this FIG. 54 because the optical image source already has an original equipment eyepiece R35.

R5 is the threaded joint between R3 and R31.

R6 is a zoom lens.

The zoom lens receives afocal imagery and transforms the afocal imagery into focal imagery at the electronic image sensor array. The zoom lens focuses the focal imagery on to R17. The effective focal length of the zoom lens is adjustable. The effective focal length of the zoom lens is controlled by the observer. The observer controls the magnification of the zoom lens by varying the effective focal length of the zoom lens. The observer can manually change the magnification of the zoom lens or change the magnification by operating the zoom lens electronic actuator.

The observer controls the size of the imagery on the image sensor array by controlling the magnification. The observer can adjust the size of the field of view of the imagery on the image sensor array by varying the magnification. The observer can capture the full field of view of the imagery on the aperture stop of the eyepiece by just filling the size of the image of the aperture stop onto the image sensor array. The observer can also vary the brightness of the image on the image sensor array by varying the effective focal length of the zoom lens and the magnification, thereby changing the f-number of the imagery on the image sensor array. The observer can increase the brightness of the imagery by reducing the zoom lens magnification. The observer can also vary the brightness of the imagery by actuating the iris diaphragm, either manually, or electronically by controlling the zoom lens electronic actuator. The observer can sharply focus the imagery on the image sensor array by operating the focus control on the zoom lens, either manually, or electronically by controlling the zoom lens electronic actuator.

The zoom lens functions are magnification control, iris diaphragm control, and focus control.

When actuated manually by the observer, R23 controls the magnification of the zoom lens, R22 controls the iris diaphragm of the zoom lens, R20 controls the focus of the zoom lens.

The observer can maintain manual control of the zoom lens by rotating the adjustment rings by hand.

The observer is enabled to adjust the focus for objects whose distances to the optical image source may be changing during an observing session.

R7 is the threaded joint between R31 and R18.

R8 is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.

The electronic image sensor array camera as shown in the figure is comprised of a cover and an electronic image sensor array. The sensor array, for example is a CCD, CMOS or other sensor array type R9 is a threaded end cap module for access to, and maintenance of R13. R9 screws into R10. R9 is for protecting R13 from the environment. Details of the end cap module are shown in FIGS. 18A & 18B & 18C.

R10 is a "T" shaped housing. R10 has a cylindrically shaped aperture for housing R13 and R15. R10 has a mechanical means located substantially at the midpoint of its cylindrical length for connecting to R18 via R34 at the threaded joint R26. The mechanical axis of R18 is perpendicular to the mechanical axis of R10 i.e. the mechanical axis of R13 and R15. R10 is made from a RF transparent material so as not to interfere with the radiation to and from the antennas.

R11 is a antenna swivel for antenna R12.

R12 is a antenna. R12 is deployed in R30.

R13 is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities.

Each one of the electronic circuits modules enables the observer to exercise different capabilities during an observing session.

The observer may choose to use an electronic circuits module which uses any one of the circuits described above in the figures in the mobile apparatus by simply loading the modular enclosure containing the circuit into R10 of the mobile apparatus.

R13 threads into and joins with R15. R13 and R15 have cylindrical enclosures and have equal outside diameters.

R14 is a heat sink for R13.

R15 is a battery and a power control module. R15 supplies electricity to all the mobile apparatus' electronics.

R16 is a threaded end cap module for access to, and maintenance of R15. R16 screws into R10. R16 is for protecting R15 from the environment. Details of the end cap module are shown in FIG. 18D.

R17 is a electronic optical image sensor array and its associated camera electronics.

R18 is the camera modular enclosure of the mobile apparatus, wherein R18 screws into R34 and R31.

R19 is the zoom lens R6 electro-mechanical actuator.

R19 is used by the observer to remotely control the functions of the zoom lens.

The zoom lens functions are magnification control, iris diaphragm control, and focus control.

When actuated by the observer, R19 mechanically rotates R23 to control the magnification of the zoom lens.

When actuated by the observer, R19 mechanically rotates R22 to control the iris diaphragm of the zoom lens.

When actuated by the observer, R19 mechanically rotates R20 to control the focus of the zoom lens.

The observer can still maintain control of the zoom lens by manually rotating the adjustment rings.

R20 is the zoom lens' focus control ring for the electro-mechanical actuator R6.

R21 is not shown.

R22 is the zoom lens' iris diaphragm control ring for the electro-mechanical actuator R6.

R23 is the zoom lens' magnification control ring for the electro-mechanical actuator R6.

R24 is not shown.

R25 is the mating of the threaded male rear end of the zoom lens, and the threaded female front end of the camera case for R17.

R26 is the threaded joint between R18 and R34.

R27 is not shown.

R28 is not shown.

R29 is not shown.

R30 is the antenna groove in R10 for storing and protecting antennas R12 and R32 prior to the observer unfolding and deploying antenna R12 and R32 using their swivels R11 and R33.

R31 is the zoom lens' modular enclosure of the mobile apparatus, wherein R31 screws into R18 and R3.

R32 is the mechanical axis of R10.

R33 is a antenna swivel (not shown).

R34 is the threaded "T" connection to R10 for R18.

R35 is the surface of the housing of the original equipment eyepiece of a arbitrary optical image source.

Observers sometimes find that the surface of R35 has an irregular cylindrical profile.

R36 is an "O" ring.

R37 is an "O" ring.

R38 is an "O" ring.

R39 is an "O" ring.

R40 is an "O" ring.

On occasion, observers find that the barrels of the optical image sources are too far removed and inaccessible for attaching the mobile apparatus to the optical image source barrel.

When this occurs the observe can attach the mobile apparatus to the original equipment eyepiece housing of the optical image source.

The original equipment eyepiece housings R35 of the optical image sources sometimes have irregular surface profiles.

The clamping mechanism R2 works best in performing its function of coaxially centering and aligning the mobile apparatus on the original equipment eyepieces of optical image sources when the original equipment eyepiece housing has a uniform cylindrical surface profile to clamp on to.

The following is a method for attaching the mobile apparatus to the original equipment eyepiece housings of optical image sources where the housings of the original equipment eyepieces have an irregular cylindrical profile.

The observer first measures the original equipment eyepiece housings' irregular profile.

This can be done with a micrometer calipers.

Secondly, the observer acquires and selects "O rings" having pre-determined diameters and thicknesses suitable for smoothing out the surface profile of the original equipment eyepiece housing to give the original equipment eyepiece housing a uniform cylindrical profile, parallel to the mechanical axis of the original equipment eyepiece housing for the mobile apparatus to clamp on and attach to.

Thirdly, the observer slips the "O rings" having the pre-determined diameters an thicknesses onto the original equipment eyepiece housing R35 at pre-determined locations along the ridges and valleys of the original equipment eyepiece housing to give the outside diameter of the surface of the original equipment eyepiece housing's "O rings" a uniform cylindrical profile.

The equality of the value of the outside diameters of the "O rings", when they are mounted on to the original equipment eyepiece housing, provides this uniformity. R36, R37, R38, R39 and R40 are examples of "O rings" slipped on to the original equipment eyepiece housing along its ridges and valleys to give surface of the original equipment eyepiece housing created by the "O rings" a uniform cylindrical profile.

Fourth, the observer slides R3 over the outside diameter of the original equipment eyepiece housing of the optical images source having the "O rings".

The precision clamping mechanism R2 is then manually tightened around the "O rings" on the original equipment eyepiece housing of the optical image source using the knurled handgrip on R2 with a twist of the wrist to coaxially align and center the mobile apparatus on the optical image source. Therefore, for irregular barrels and irregular original equipment eyepieces, the "O" rings improve the self centering and self aligning precision and gripping operation of the clamping mechanism module.

Fine focus is achieved by operating the zoom lens focus control ring R20 using R19.

Refer to FIG. 22A and FIG. 22B and FIG. 23A and FIG. 23B and FIG. 24 and FIG. 25 and FIG. 26A and FIG. 26B for the layout of a preferred embodiment of the mobile apparatus' clamping mechanism R2.

The enclosure of the mobile apparatus is configured into a "T" formation. The stem of the "T" is comprised of modules R3, R31, and R18. The cross member of the "T" is comprised of elements R13 and R15, i.e. via enclosure R10. The stem of the "T" is fastened to the cross member of the "T" via R26. The modules R3, R31, and R18 of the stem are fastened together using R5, R7. The stem is configured with modules for easy replacement of R3, R31, R13, R15 and R18 for achieving versatility of the mobile apparatus to gain compatibility with the variety of different optical image sources it operates with over time.

In cases where the optical image sources have a permanently mounted original equipment eyepiece there is no need to use the eyepiece so the eyepiece module has been easily unscrewed and removed from the front end of the mobile apparatus.

The zoom lens module R31 optically acquires and transforms the afocal image of the object from the optical image source into a focal image at R17 of R18.

The electronic image sensor array camera module R18 electronically transforms the focal image at R17 into electronic imagery signals, and the electronic circuits module R13 electronically transforms and transmits the electronic imagery signals from the output terminals of R13 and R9 and R16 to the observer and the observer's audience. The electronic imagery signals meet analog and/or digital protocols depending on the type of analog or digital electronics used by the observer in the electronic sensor array camera module R18 and the electronic circuits module R13.

FIG. 55

FIG. 55 shows a side view section of a layout of a preferred embodiment of a mobile apparatus, and showing the clamping mechanism module of the mobile apparatus holding a precision clamping mechanism. The preferred embodiment shown in FIG. 55 is for accommodating optical image sources that are manufactured with their own original equipment eyepieces, and barrels with irregular surface profiles as shown in FIG. 2B.

The preferred embodiment shown in FIG. 55 is for attaching the mobile apparatus to the barrels of the optical image sources wherein the barrels have irregular surface profiles.

The top view of the preferred embodiment FIG. 57 of the mobile apparatus is similar to the top view shown in FIG. 32 for FIG. 30 and FIG. 31 showing two antennas, each one mounted on its respective swivel, wherein both antennas are deployed externally in a common groove, wherein the swivels are at the same end of the groove.

The top view of the preferred embodiment FIG. 57 of the mobile apparatus is similar to the top view shown in FIG. 33 for FIG. 30 and FIG. 31 showing two antennas, each one mounted on its respective swivel, wherein both antennas are deployed externally in a common groove, wherein the swivels are at opposite ends of the groove.

The mobile apparatus disclosed in FIG. 55 is configured for being attached to and compatible with the optical image source shown in FIG. 1.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The preferred embodiments of the mobile apparatus shown in FIG. 55 shows the modules configured in the form of a capital letter "T". The stem of the "T" is comprised of the clamping mechanism module S3, and the zoom lens module S31, and the electronic image sensor array camera module S18. The cross member of the "T" is comprised of the electronics circuit module S13 and the battery and electronics power control module S15.

The purpose of the "T" formation of the modules is to provide an ergonomic handle for the observer while handling the mobile apparatus during its deployment onto or off of the optical image sources. It also shortens the length of the mobile apparatus. It allows for the position of its center of gravity to be controlled. It also allows for the position of the microphone and speaker in the end cap modules S9 and S16 to be controlled.

The mobile apparatus shown in FIG. 55 is configured with a clamping mechanism module S3, a zoom lens module S31 and a electronic image sensor array camera module S18, a electronics circuit module S13, and battery and electronics power control module S15. The clamping mechanism module S3, a zoom lens module S31 and a electronic image sensor array camera module S18 are coaxially connected. The electronics circuit module S13, and battery and electronics power control module S15 are coaxially connected.

The method for attaching the mobile apparatus to the optical image source shown in FIG. 2B is as follows: Initially slide the front end S3 of the mobile apparatus over the "O" rings on the outside diameter of the barrel housing S35 of the optical image source.

Rotate the mobile apparatus about 51 until the top of the image coincides with the top of the image sensor array.

The precision clamping mechanism S2 is then manually tightened around the "O" rings on the barrel of the optical image source using the knurled handgrip on S2 with a twist of the wrist.

Therefore, for irregular barrels and irregular original equipment eyepieces, the "O" rings improve the self centering and self aligning precision and gripping operation of the clamping mechanism module.

Fine focus is achieved by operating the zoom lens electromechanical actuator S19.

Screw thread is shown in the figure as an example of a mechanical connecting means for mechanically connecting adjacent modular enclosures. Screw thread is an example of a mechanical connecting means. Screw threaded joints are a simple, inexpensive and space saving method especially for connecting enclosures having a cylindrical profile.

The front ends of the module's S31 and S18 cylindrical enclosures are under cut and threaded with female threads. The rear ends of the module's cylindrical enclosures are over cut and threaded with male threads. The rear ends of the module's cylindrical enclosures i.e. S3 mates with the front end of the module's cylindrical enclosure S31 in order to connect the two modules together.

Screw thread is given in the present invention as an example of a mechanical connecting means. Other mechanical connecting means are also appropriate i.e. snap-fit connections.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIG. 55 are identified as follows:

S1 is the optical and mechanical axis of the mobile apparatus.

S2 is the clamping mechanism of the mobile apparatus, wherein S2 is mounted inside of S3. S2 is threaded into S3 at S4 where it is fixed to S3.

S3 is the clamping mechanism module of the mobile apparatus, wherein S3 screws into S31. S3 mounts and holds S2 at S4.

S4 is a threaded joint for attaching S2 to S3.

S5 is the threaded joint between S3 and S31.

S6 is a zoom lens.

The zoom lens receives afocal imagery and transforms the afocal imagery into focal imagery at the electronic image sensor array. The zoom lens focuses the focal imagery on to S17. The effective focal length of the zoom lens is adjustable. The effective focal length of the zoom lens is controlled by the observer. The observer controls the magnification of the zoom lens by varying the effective focal length of the zoom lens. The observer can manually change the magnification of the zoom lens or change the magnification by operating the zoom lens electronic actuator.

The observer controls the size of the imagery on the image sensor array by controlling the magnification. The observer can adjust the size of the field of view of the imagery on the image sensor array by varying the magnification. The observer can capture the full field of view of the imagery on the aperture stop of the eyepiece by just filling the size of the image of the aperture stop onto the image sensor array. The observer can also vary the brightness of the image on the image sensor array by varying the effective focal length of the zoom lens and the magnification, thereby changing the f-number of the imagery on the image sensor array. The observer can increase the brightness of the imagery by reducing the zoom lens magnification. The observer can also vary the brightness of the imagery by actuating the iris diaphragm, either manually, or electronically by controlling the zoom lens electronic actuator. The observer can sharply focus the imagery on the image sensor array by operating the focus control on the zoom lens, either manually, or electronically by controlling the zoom lens electronic actuator.

The zoom lens functions are magnification control, iris diaphragm control, and focus control.

When actuated manually by the observer, S23 controls the magnification of the zoom lens, S22 controls the iris diaphragm of the zoom lens, S20 controls the focus of the zoom lens.

The observer can maintain manual control of the zoom lens by rotating the adjustment rings by hand.

The observer is enabled to adjust the focus for objects whose distances to the optical image source may be changing during an observing session.

S7 is the threaded joint between S31 and S18.

S8 is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.

The electronic image sensor array camera as shown in the figure is comprised of a cover and an electronic image sensor array. The sensor array, for example is a CCD, CMOS or other sensor array type S9 is a threaded end cap module for access to, and maintenance of S13. S9 screws into S10. S9 is for protecting S13 from the environment. Details of the end cap module are shown in FIGS. 18A & 18B & 18C.

S10 is a "T" shaped housing. S10 has a cylindrically shaped aperture for housing S13 and S15. S10 has a mechanical means located substantially at the midpoint of its cylindrical length for connecting to S18 via S34 at the threaded joint S26. The mechanical axis of S18 is perpendicular to the mechanical axis of S10 i.e. the mechanical axis of S13 and S15.

S10 is made from a RF transparent material so as not to interfere with the radiation to and from the antennas.

S11 is a antenna swivel for antenna S12.

S12 is a antenna. S12 is deployed in S30.

S13 is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities.

Each one of the electronic circuits modules enables the observer to exercise different capabilities during an observing session. The observer may choose to use an electronic circuits module which uses any one of the circuits described above in the figures in the mobile apparatus by simply loading the modular enclosure containing the circuit into 10 of the mobile apparatus. S13 threads into and joins with S15. S13 and S15 have cylindrical enclosures and have equal outside diameters.

S14 is a heat sink for S13.

S15 is a battery and a power control module. S15 supplies electricity to all the mobile apparatus' electronics.

S16 is a threaded end cap module for access to, and maintenance of S15. S16 screws into S10. S16 is for protecting S15 from the environment. Details of the end cap module are shown in FIG. 18D.

S17 is a electronic optical image sensor array and its associated camera electronics.

S18 is the camera modular enclosure of the mobile apparatus, wherein S18 screws into S34 and S31.

S19 is the zoom lens S6 electro-mechanical actuator.
   S19 is used by the observer to remotely control the functions of the zoom lens.
   The zoom lens functions are magnification control, iris diaphragm control, and focus control.
   When actuated by the observer, S19 mechanically rotates S23 to control the magnification of the zoom lens.
   When actuated by the observer, S19 mechanically rotates S22 to control the iris diaphragm of the zoom lens.
   When actuated by the observer, S19 mechanically rotates S20 to control the focus of the zoom lens.
   The observer can still maintain control of the zoom lens by manually rotating the adjustment rings.

S20 is the zoom lens' focus control ring for the electro-mechanical actuator S6.

S21 is not shown.

S22 is the zoom lens' iris diaphragm control ring for the electro-mechanical actuator S6.

S23 is the zoom lens' magnification control ring for the electro-mechanical actuator S6.

S24 is not shown.

S25 is the mating of the threaded male rear end of the zoom lens, and the threaded female front end of the camera case for S17.

S26 is the threaded joint between S18 and S34.

S27 is not shown.

S28 is not shown.

S29 is not shown.

S30 is the antenna groove in S10 for storing and protecting antennas S12 and S32 prior to the observer unfolding and deploying antenna S12 and S32 using their swivels S11 and S33.

S31 is the zoom lens' modular enclosure of the mobile apparatus, wherein S31 screws into S18 and S3.

S32 is the mechanical axis of S10.

S33 is a antenna swivel (not shown).

S34 is the threaded "T" connection to S10 for S18.

S35 is the outside irregular surface of the barrel of an arbitrary optical image source.

S36 is an "O" ring.

S37 is an "O" ring.

S38 is an "O" ring.

S39 is an "O" ring.

S40 is an "O" ring.

Refer to FIG. 1 as a reference for the optical image source.

On occasion, observers find that the barrels of the optical image sources sometimes have irregular surface profiles. The clamping mechanism S2 works best in performing its function of coaxially centering and aligning the mobile apparatus on the barrels of optical image sources when the barrels have a uniform cylindrical surface profile to clamp on to.

The following is a method for attaching the mobile apparatus to the barrels of optical image sources where the surface of the barrels have an irregular cylindrical profile.

The observer first measures the barrels' surface irregular profile. This can be done with a micrometer calipers.

Secondly, the observer acquires and selects "O rings" having pre-determined diameters and thicknesses suitable for smoothing out the surface profile of the barrel to give the barrel surface a uniform cylindrical profile, parallel to the mechanical axis of the barrel for the mobile apparatus to clamp on and attach to.

Thirdly, the observer slips the "O rings" having the pre-determined diameters an thicknesses onto the barrel S35 at pre-determined locations along the ridges and valleys of the barrel's surface to give the outside diameter of the surface of the barrel's "O rings" a uniform cylindrical profile. The equality of the value of the outside diameters of the "O rings", when they are mounted on to the barrel's surface, provides this uniformity. S36, S37, S38, S39 and S40 are examples of "O rings" slipped on to the barrel's surface along its ridges and valleys to give surface of the barrel created by the "O rings" a uniform cylindrical profile.

Fourth, the observer slides S3 over the outside diameter of the barrel's surface having the "O rings".

The precision clamping mechanism S2 is then manually tightened around the "O rings" on the barrel's surface of the optical image source using the knurled handgrip on S2 with a twist of the wrist to coaxially align and center the mobile apparatus on the optical image source.

Fine focus is achieved by operating the zoom lens focus control ring S20 using S19.

Refer to FIG. 22A and FIG. 22B and FIG. 23A and FIG. 23B and FIG. 24 and FIG. 25 and FIG. 26A and FIG. 26B for the layout of a preferred embodiment of the mobile apparatus' clamping mechanism S2.

The enclosure of the mobile apparatus is configured into a "T" formation. The stem of the "T" is comprised of modules S3, S31, and S18. The cross member of the "T" is comprised of elements S13 and S15, i.e. via enclosure S10. The stem of the "T" is fastened to the cross member of the "T" via S26. The modules S3, S31, and S18 of the stem are fastened together using S5, S7. The stem is configured with modules for easy replacement of S3, S31, S13, S15 and S18 for achieving versatility of the mobile apparatus to gain compatibility with the variety of different optical image sources it operates with over time.

The "T" formation has a plurality of benefits.

In cases where the optical image sources have a permanently mounted eyepiece there is no need for the eyepiece so the eyepiece module has been easily unscrewed and removed from the front end of the mobile apparatus.

The zoom lens module S31 optically acquires and transforms the afocal image of the object from the optical image source into a focal image at S17 of S18.

The electronic image sensor array camera module S18 electronically transforms the focal image at S17 into electronic imagery signals, and the electronic circuits module S13 electronically transforms and transmits the electronic imagery signals from the output terminals of S13 and S9 and S16 to the observer and the observer's audience. The electronic imagery signals meet analog and/or digital protocols depending on the type of analog or digital electronics used by the observer in the electronic sensor array camera module S18 and the electronic circuits module S13.

FIG. 56

FIG. 56 shows a side view section of the optical system schematic of a preferred embodiment of a mobile apparatus, where the mobile apparatus has its own eyepiece, and where the optical image source is a camera lens with a lens mounting.

The mobile apparatus shown in FIG. 56 is configured with a field lens module, a macro zoom lens module and a electronic image sensor array camera module.

The mobile apparatus disclosed in FIG. 56 is configured for being attached to and compatible with the optical image source shown in FIG. 1B. The camera lens mounts come in several types. For example, the screw types, the bayonet types, the breech lock types, the double bayonet types, and the tab lock types.

Therefore the preferred embodiment shown in FIG. 56 enables observers to accommodate and attach to optical image sources like camera lenses that are manufactured with camera lens mounts.

The camera mounts are themselves configured with their own locking means. The camera mount's locking means is used to lock the mobile apparatus to the camera lens optical image source.

The mobile apparatus shown in FIG. 56 is an alternative optical configuration to using an eyepiece and a afocal zoom lens. The mobile apparatus shown in FIG. 56 uses a field lens T9 and a macro zoom lens T11 to replace the eyepiece and zoom lens in the mobile apparatus shown in FIG. 53. The purpose of the field lens T9 is for imaging the aperture stop T22 to the entrance pupil of the macro zoom lens T11.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The preferred embodiment of the mobile apparatus shown in FIG. 56 shows the mobile apparatus comprised of the lens mount extension module T27, the field lens module T8, and the zoom lens module T24, and the electronic image sensor array camera module T21.

The mobile apparatus shown in FIG. 56 is configured with a lens mount extension module T27, a field lens module T8, a zoom lens module T24 and a electronic image sensor array camera module T21. The battery T31 is shown mounted within the electronic image sensor array camera module T21.

The modules are connected coaxially in tandem with each other.

The method for attaching the mobile apparatus to the optical image source camera lens shown in FIG. 1B is as follows: bring the mobile apparatus' mating lens mount T29 in contact with the optical image source camera lens mount T28. Twist, snap, attach and lock the mating lens mount T29 of the mobile apparatus to the optical image source camera lens mount T28 of the camera lens.

The camera lens mounts come in several types. For example, the screw types, the bayonet types, the breech lock types, the double bayonet types, and the tab lock types. These types are self locking.

Therefore the preferred embodiment shown in FIG. 56 enables observers to accommodate, attach and lock the mobile apparatus to optical image sources like camera lenses that are manufactured with camera lens mounts.

The camera mounts are themselves configured with their own locking means. The camera mount's locking means is used to lock the mobile apparatus to the camera lens optical image source.

Screw thread is shown in the figure as an example of a mechanical connecting means for mechanically connecting adjacent modular enclosures. Screw thread is an example of a mechanical connecting means. Screw threaded joints are a simple, inexpensive and space saving method especially for connecting enclosures having a cylindrical profile.

The front ends of the module's T24 and T21 cylindrical enclosures are under cut and threaded with female threads. The rear ends of the module's cylindrical enclosures are over cut and threaded with male threads. The rear ends of the module's cylindrical enclosures i.e. T27 mates with the front end of the module's cylindrical enclosure T24 in order to connect the two modules together.

Screw thread is given in the present invention as an example of a mechanical connecting means. Other mechanical connecting means are also appropriate i.e. snap-fit connections.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawing shown in FIG. 56 are identified as follows:

T1 is the aperture stop of the camera lens optical image source.

T2 is the optical axis of the camera lens optical image source that is pointed at the object being observed.

T3 is the housing of the camera lens optical image source.

T4 is the principal ray from the camera lens optical image source.

T5 is the image plane of the camera lens optical image source coincident with the field stop T22.

T6 is a typical marginal rim ray of the camera lens optical image source.

T7 is the optical system of the camera lens optical image source.

For many camera lens optical image sources, the full and complete optical system of the camera lens optical image source is far more complex than just the single doublet lens shown in FIG. 1, and is comprised of multiple lenses, mirrors and prisms. The single doublet lens shown is only meant to simplify the drawing and only symbolically represents the full and complete optical system of the camera lens optical image source.

T8 is the field lens module of the mobile apparatus showing the modular enclosure and housing for the field lens T9.

T9 is the field lens of the mobile apparatus. The purpose of the field lens is for imaging the entrance pupil or the aperture stop T1 of the optical image source to the entrance pupil of the macro zoom lens and thereby prevent vignetting. The field lens has net positive power.

T10 is the first lens of the macro zoom lens of the mobile apparatus. The purpose of the first lens of the macro zoom lens is to transform the focal image it receives from the field lens T9 into an afocal image.

T11 is the housing of the macro zoom lens of the mobile apparatus.

The housed macro zoom lens receives focal imagery from T5 and transforms the focal imagery into focal imagery at the electronic image sensor array. The macro zoom lens focuses the focal imagery T5 to T17. The effective focal length of the macro zoom lens is adjustable. The effective focal length of the macro zoom lens is controlled by the observer. The observer controls the magnification of the macro zoom lens by varying the effective focal length of the macro zoom lens. The observer can manually change the magnification of the macro zoom lens.

The observer controls the size of the imagery on the image sensor array by controlling the magnification. The observer can adjust the size of the field of view of the imagery on the image sensor array by varying the magnification. The observer can capture the full field of view of the imagery on the aperture stop T22 by just filling the size of the image of the aperture stop onto the image sensor array. The observer can also vary the brightness of the image on the image sensor array by varying the effective focal length of the macro zoom lens and the magnification, thereby changing the f-number of the imagery on the image sensor array. The observer can increase the brightness of the imagery by reducing the macro zoom lens magnification. The observer can also vary the brightness of the imagery by actuating the iris diaphragm manually. The observer can sharply focus the imagery on the image sensor array by manually operating the focus control on the macro zoom lens.

The macro zoom lens functions are magnification control, iris diaphragm control, and focus control.

When actuated manually, the observer controls the magnification of the macro zoom lens, the iris diaphragm of the macro zoom lens, and the focus of the macro zoom lens.

The observer can maintain manual control of the macro zoom lens by rotating the adjustment rings by hand.

The observer is enabled to adjust the focus for objects whose distances to the optical image source may be changing during an observing session.

T12 is the outside diameter of the modular enclosure and housing of the field lens.

T13 is the second lens of the mobile apparatus' macro zoom lens.

T14 is the third lens of the mobile apparatus' macro zoom lens.

T15 is the fourth lens of the mobile apparatus' macro zoom lens.

T16 is the fifth lens of the mobile apparatus' macro zoom lens.

T17 is the image plane of the mobile apparatus coincident with the optically active surface of the image sensor array T18.

T18 is the optically active surface of the image sensor array and its associated camera electronics of the electronic image sensor array camera T26 of the mobile apparatus.

T19 is the optically inactive rear of the image sensor array.

T20 is the tail end of the mobile apparatus' macro zoom lens' housing T11.

T21 is the tail end of the mobile apparatus' modular enclosure of the electronic image sensor array camera module of the electronic image sensor array camera T26. Hard wire cable (the cable is not shown) carries the video signal from an output port on the electronic image sensor array camera to the observer for the observer to hook up to and disseminate to his audience under the control of the observer. Alternately, if the observer prefers, the observer can run a cable from the output port on the electronic image sensor array camera directly to the observer's audience.

T22 is the field stop of the mobile apparatus. If the optical image source already is configured with a field stop, then the field lens' field stop is unnecessary and will be unscrewed and removed from the field lens module T8, and the optical image source's field stop will be used instead.

T23 shows where T8 is joined and threaded into T24.

T24 is the modular enclosure for the zoom lens T11 module.

T25 is the threaded joint between T24 and T21.

T26 is the electronic image sensor array camera showing its cover. The electronic image sensor array camera is configured for providing electronic imagery signals to the observer from a electrical connector port on its cover. The electronic image sensor array camera is configured for receiving electronic control commands for controlling the camera from the observer, and furnishing electronic status signals to the observer from a electrical connector port on its cover.

The electronic image sensor array camera as shown in the figure is comprised of a cover and an electronic image sensor array. The electronic image sensor array, for example is a CCD, CMOS or other sensor array type.

T27 is the extension device enclosure of the camera lens mount module of the mobile apparatus. T27 is for housing a mating camera lens mount T29. T27 screws onto T24 at T28.

T28 is the camera lens mount. T28 is typically fastened to T3.

T29 is a mating camera lens mount of the camera lens mount module of the mobile apparatus. T29 is connected mechanically to T27. This connection is done typically using flat headed counter-sunk machine screws which fasten T29 to T27. T29 is for attaching the mobile apparatus to optical image sources that are camera lenses that have a mating lens mount T28.

T30 is the threaded joint for joining T27 and T24.

T31 is the battery.

T32 is the end cap module. See FIG. 18.

Refer to FIG. 1B as a reference for a camera lens optical image source.

In the preferred embodiment shown in FIG. 56, the optical system of the mobile apparatus is comprised of an field lens T9 and a macro zoom lens T11, and a image sensor array. The field lens is used in tandem with the macro zoom lens and the image sensor array T18. The field lens and the macro zoom lens and the image sensor array share a common coaxial optical and mechanical axis T2.

The field lens and first lens of the macro zoom lens are shown as achromatic doublets in FIG. 56 for simplicity as simple examples. The doublets in this application have good overall optical performance and enjoy ease of manufacture.

The purpose of the field lens is to image the aperture stop of the optical image source to the entrance pupil of the macro zoom lens. This is to prevent vignetting of the field of view of the object.

The optical image source images the object at the field stop of the optical image source where its image focal plane is located. The field lens of the mobile apparatus is located close to the field stop of the optical image source.

Surfaces of the field lens are deliberately not located directly at the image focal plane of the optical image source so as to prevent any dust or lint that may be present on its surfaces from being imaged on the image sensor array 18 that might result in disruptive artifacts in the final imagery to the observer and to the observer's audience.

The f/number specification of the macro zoom lens is chosen to match or be smaller than the f/number of the optical image source in order to collect all the light from the entrance pupil of the optical image source. The lower limit on the magnification specification of the macro zoom lens is chosen to enable the macro zoom lens to just fill the image sensor array with the image of the field stop. The upper limit on the magnification specification of the macro zoom lens is chosen to enable the macro zoom lens to magnify the fine details of the object on the image sensor array sufficiently to satisfy the observer's final image requirements.

The following is an example of the operation of a macro zoom lens.

The macro zoom lens has five lens groups in its assemblage. All five lens groups of the assembly are mounted inside the macro zoom lens housing T11 and aligned along a common optical and mechanical axis T2. The first lens group of the lens assembly has a net positive power. The first lens group collimates the light it receives from T5 to the second lens.

The second lens group is physically fixed along the optical axis of the macro zoom lens assembly. The second lens group has a net positive power.

Movement of the third lens group along the optical axis changes the magnification of the macro zoom lens assembly.

The second lens group projects an image in through the third lens group.

The third lens group has a net negative power. During an observing session, the observer can adjust the location of the third lens group either manually. The macro zoom lens, under the control of the observer, physically moves the third lens group to adjust the macro zoom lens magnification.

The macro zoom lens is designed so that the light exiting the fourth lens group is afocal and collimated back to infinity, no matter what the location is of the third lens group along the optical axis. Therefore, the diameter of the exit pupil formed by the fourth lens group varies with the location of the third lens group along the optical axis. The second, third and fourth lens groups thereby comprise an afocal optical system. The power of the afocal optical system is the ratio of the diameter of the entrance pupil of the second lens group to the diameter of the exit pupil formed from the fourth lens group.

The fourth lens group has a net positive power. Light received into the entrance pupil of the fourth lens group, afocally from the third lens group, is imaged by the fourth lens group onto the focal plane of the fourth lens group. Its focal plane i.e. image plane, lies on and coincident with, the active photo sensitive surface of an image sensor array. The image sensor array is an electronic component of a CCD or CMOS camera for example. The image sensor array is aligned on the optical axis of the zoom lens assembly such that its electronic imaging center line lies on the optical axis of the zoom lens assembly. The image sensor array converts, i.e. transforms, the optical image it receives from the zoom lens assembly to electronic signals which represent the optical image.

Macro zoom lenses typically have three manual controls: a manually actuated control arm for magnification, a manually actuated control arm for the iris diaphragm, and a manually actuated control arm for focus for example.

The mobile apparatus shown in FIG. 56 is configured with a series of modular enclosures T21, T24, T27 and T8 that are threaded together back to back in tandem with one another with a common mechanical and optical axis T2. The enclosures are called modular because each one contains a single functional physical element, i.e. the field lens and the macro zoom lens and the image sensor array camera, where each modular enclosure and its elemental contents can be connected or disconnected from the other modular enclosures. The combination of the modular enclosure and its contents is referred to as a module. It is important to note that the image sensor array camera does not comprise a camera lens.

The field lens of the mobile apparatus is mounted and aligned inside modular enclosure T8.

The macro zoom lens of the mobile apparatus is mounted and aligned inside modular enclosure T24.

The image sensor array of the mobile apparatus is mounted and aligned inside modular enclosure T21.

Modular enclosure T8 is threaded at its rear end.

Modular enclosure T24 is threaded at its front end and at its rear end.

Modular enclosure T21 is threaded at its front end and at its rear end.

T8 and T24 and T21 have common threads.

Modular enclosure T8 screws into and connects with modular enclosure T24 at T23.

Modular enclosure T24 screws into and connects with modular enclosure T21 at T25.

The mobile apparatus can be dissembled into its respective modular enclosures by unscrewing and disconnecting them from one another.

Maintenance and repair of the field lens, macro zoom lens, or image sensor array can be accomplished by disassembly of the mobile apparatus into its respective modular enclosures.

The dysfunctional physical elements like for example a defective field lens, macro zoom lens, or image sensor array are then removed from their respective modular enclosures, and then worked on as needed.

Replacement of dysfunctional field lens, macro zoom lens, or image sensor arrays can be accomplished by removal of the dysfunctional physical element form its modular enclosure, and substituted for with a functional replacement physical element. Substitute field lens, macro zoom lens, and image sensor arrays can also be employed in order to better match the job, match the environment, match the object, match the audience, etc. especially when the observer wishes to observe a different object than the previous one that the observer had been observing during the current observing session.

The macro zoom lens module T24 optically acquires and transforms the focal image of the object from the optical image source at T5 into a focal image at T17 of T21.

The electronic image sensor array camera module T21 electronically transforms the focal image at T17 into electronic imagery signals, and transmits the electronic imagery signals from the output terminals of T21 and T32 to the observer and the observer's audience. The electronic imagery signals meet analog and/or digital protocols depending on the type of analog or digital electronics used by the observer in the electronic sensor array camera module T21.

FIG. 57

FIG. 57 shows a side view section of a layout of a preferred embodiment of a mobile apparatus, and showing the clamping mechanism module of the mobile apparatus holding a precision clamping mechanism. The preferred embodiment shown in FIG. 57 is for accommodating optical image sources that are manufactured with their own original equipment eyepieces.

The preferred embodiment shown in FIG. 57 is for attaching the mobile apparatus to optical image sources having original equipment eyepiece housings that have irregular surface profiles.

The top view of the preferred embodiment FIG. 57 of the mobile apparatus is similar to the top view shown in FIG. 32 for FIG. 30 and FIG. 31 showing two antennas, each one mounted on its respective swivel, wherein both antennas are deployed externally in a common groove, wherein the swivels are at the same end of the groove.

The top view of the preferred embodiment FIG. 57 of the mobile apparatus is similar to the top view shown in FIG. 33 for FIG. 30 and FIG. 31 showing two antennas, each one mounted on its respective swivel, wherein both antennas are deployed externally in a common groove, wherein the swivels are at opposite ends of the groove.

The mobile apparatus disclosed in FIG. 57 is configured for being attached to and compatible with the optical image source shown in FIG. 2B.

The mobile apparatus is comprised of modules. The modules are interconnected with one another to form the mobile apparatus. Each module serves at least one functional purpose. Each module has an enclosure. Each enclosure mounts the contents of its module. Each enclosure protects the contents of its module. Each enclosure is configured with a connection means for connecting to adjacent module's enclosures.

The preferred embodiments of the mobile apparatus shown in FIG. 57 shows the modules configured in the form of a capital letter "T". The stem of the "T" is comprised of the clamping mechanism module U3, and the zoom lens module U31, and the electronic image sensor array camera module U18. The cross member of the "T" is comprised of the electronics circuit module U13 and the battery and electronics power control module U15.

The purpose of the "T" formation of the modules is to provide an ergonomic handle for the observer while handling the mobile apparatus during its deployment onto or off of the optical image sources. It also shortens the length of the mobile apparatus. It allows for the position of its center of gravity to be controlled. It also allows for the position of the microphone and speaker in the end cap modules U9 and U16 to be controlled.

The mobile apparatus shown in FIG. 57 is configured with a clamping mechanism module U3, a zoom lens module U31 and a electronic image sensor array camera module U18, a electronics circuit module U13, and battery and electronics power control module U15. The clamping mechanism module U3, a zoom lens module U31 and a electronic image sensor array camera module U18 are coaxially connected. The electronics circuit module U13, and battery and electronics power control module U15 are coaxially connected.

The method for attaching the mobile apparatus to the optical image source shown in FIG. 2B is as follows: Initially slide the front end U3 of the mobile apparatus over the "O" rings on original equipment eyepiece housing of the optical image source.

Rotate the mobile apparatus about U1 until the top of the image coincides with the top of the image sensor array.

The precision clamping mechanism U2 is then manually tightened around the original equipment eyepiece housing of the optical image source using the knurled handgrip on U2 with a twist of the wrist.

Fine focus is achieved by operating the zoom lens electromechanical actuator U19.

Screw thread is shown in the figure as an example of a mechanical connecting means for mechanically connecting adjacent modular enclosures. Screw thread is an example of a mechanical connecting means. Screw threaded joints are a simple, inexpensive and space saving method especially for connecting enclosures having a cylindrical profile.

The front ends of the module's U31 and U18 cylindrical enclosures are under cut and threaded with female threads. The rear ends of the module's cylindrical enclosures are over cut and threaded with male threads. The rear ends of the module's cylindrical enclosures i.e. U31 mates with the front end of the module's cylindrical enclosure U18 in order to connect the two modules together.

Screw thread is given in the present invention as an example of a mechanical connecting means. Other mechanical connecting means are also appropriate i.e. snap-fit connections.

In another preferred embodiment, the screw thread form of connecting means used at each of the threaded module connection joints is replaced with the snap-fit snap together attachment connector means at the module connection joints for connecting the modules of the mobile apparatus together at the joints. The snap-fit attachment connector means has an advantage. The advantage is speed of assembly and disassembly of the mobile apparatus enabling the observer to more quickly reconfigure the mobile apparatus for adapting to different optical image sources and operating environments.

The detailed physical elements disclosed in the drawings shown in FIG. 57 and FIG. 32 and FIG. 33 are identified as follows:

U1 is the optical and mechanical axis of the mobile apparatus.

U2 is the clamping mechanism of the mobile apparatus, wherein U2 is mounted inside of U3.

U3 is the clamping mechanism module's extension device of the mobile apparatus, wherein the clamping mechanism module screws into U31 at U5. U3 mounts and houses U2. U2 is mounted to U3 at U4.

U4 is a threaded joint for attaching U2 to U3. The eyepiece is not needed in this FIG. 57 because the optical image source already has an original equipment eyepiece U35.

U5 is the threaded joint between U3 and U31.

U6 is a zoom lens.

The zoom lens receives afocal imagery from U35 and transforms the afocal imagery into focal imagery at the electronic image sensor array U17. The zoom lens focuses the focal imagery on to U17. The effective focal length of the zoom lens is adjustable. The effective focal length of the zoom lens is controlled by the observer. The observer controls the magnification of the zoom lens by varying the effective focal length of the zoom lens. The observer can manually change the magnification of the zoom lens or change the magnification by operating the zoom lens electronic actuator.

The observer controls the size of the imagery on the image sensor array by controlling the magnification. The observer can adjust the size of the field of view of the imagery on the image sensor array by varying the magnification. The observer can capture the full field of view of the imagery on the aperture stop of the eyepiece by just filling the size of the image of the aperture stop onto the image sensor array. The observer can also vary the brightness of the image on the image sensor array by varying the effective focal length of the zoom lens and the magnification, thereby changing the f-number of the imagery on the image sensor array. The observer can increase the brightness of the imagery by reducing the zoom lens magnification. The observer can also vary the brightness of the imagery by actuating the iris diaphragm, either manually, or electronically by controlling the zoom lens electronic actuator. The observer can sharply focus the imagery on the image sensor array by operating the focus control on the zoom lens, either manually, or electronically by controlling the zoom lens electronic actuator.

The zoom lens functions are magnification control, iris diaphragm control, and focus control.

When actuated manually by the observer, U23 controls the magnification of the zoom lens, U22 controls the iris diaphragm of the zoom lens, U20 controls the focus of the zoom lens.

The observer can maintain manual control of the zoom lens by rotating the adjustment rings by hand.

The observer is enabled to adjust the focus for objects whose distances to the optical image source may be changing during an observing session.

U7 is the threaded joint between U31 and U18.

U8 is the electronic image sensor array camera showing the cover. The electronic image sensor array camera is configured for providing electronic imagery signals to the observer from a electrical connector port on its cover. The electronic image sensor array camera is configured for receiving electronic control commands from the observer, and furnishing electronic status signals to the observer from a electrical connector port on its cover.

The electronic image sensor array camera as shown in the figure is comprised of a cover and an electronic image sensor array. The sensor array, for example is a CCD, CMOS or other sensor array type U9 is a threaded end cap module for access to, and maintenance of U13. U9 screws into U10. U9 is for protecting U13 from the environment. Details of the end cap module are shown in FIGS. 18A & 18B & 18C.

U10 is a "T" shaped housing. U10 has a cylindrically shaped aperture for housing U13 and U15. U10 has a mechanical means located substantially at the midpoint of its cylindrical length for connecting to U18 via U34 at the threaded joint U26.

The mechanical axis of U18 is perpendicular to the mechanical axis of U10 i.e. the mechanical axis of U13 and U15.

U10 is made from a RF transparent material so as not to interfere with the radiation to and from the antennas.

U11 is a antenna swivel for antenna U12.

U12 is a antenna. U12 is deployed in U30.

U13 is a electronics circuits module. Descriptions of the different circuits that the electronic circuits modules can use that the observer can choose from, are given in the following figures: FIG. 7, FIG. 8, FIG. 9, FIG. 10, and FIG. 11. Each figure describes the physical elements that comprise each circuit. Each of the different electronic circuits modules, that contains a different circuit described in each of the different figures above, has different capabilities to match the challenges encountered during an observing session by the observer.

Each one of the electronic circuits modules enables the observer to exercise different capabilities during an observing session. The observer may choose to use an electronic circuits module which uses any one of the circuits described above in the figures in the mobile apparatus by simply loading the module containing the circuit into U10 of the mobile apparatus. U13 threads into and joins with U15. U13 and U15 have cylindrical enclosures and have equal outside diameters.

U14 is a heat sink for U13.

U15 is a battery and a electronics' power control module. U15 supplies electricity to all the mobile apparatus' electronics.

U16 is a threaded end cap module for access to, and maintenance of U15. U16 screws into U10. U16 is for protecting U15 from the environment. Details of the end cap module are shown in FIG. 18D.

U17 is a electronic optical image sensor array and its associated camera electronics of the electronic optical image sensor array camera module.

U18 is the electronic optical image sensor array camera modular enclosure of the electronic optical image sensor array camera module of the mobile apparatus, wherein U18 screws into U34 and U31.

U19 is the zoom lens U6 electro-mechanical actuator.
U19 is used by the observer to remotely control the functions of the zoom lens.

The zoom lens functions are magnification control, iris diaphragm control, and focus control.

When actuated by the observer, U19 mechanically rotates U23 to control the magnification of the zoom lens.

When actuated by the observer, U19 mechanically rotates U22 to control the iris diaphragm of the zoom lens.

When actuated by the observer, U19 mechanically rotates U20 to control the focus of the zoom lens.

The observer can still maintain control of the zoom lens by manually rotating the adjustment rings.

U20 is the zoom lens' focus control ring for the electro-mechanical actuator U6.

U21 is not shown.

U22 is the zoom lens' iris diaphragm control ring for the electro-mechanical actuator U6.

U23 is the zoom lens' magnification control ring for the electro-mechanical actuator U6.

U24 is not shown.

U25 is the mating of the threaded male rear end of the zoom lens, and the threaded female front end of the camera case for U17.

U26 is the threaded joint between U18 and U34.

U27 is not shown.

U28 is not shown.

U29 is not shown.

U30 is the antenna groove in U10 for storing and protecting antennas U12 and U32 prior to the observer unfolding and deploying antenna U12 and U32 using their swivels U11 and U33.

U31 is the zoom lens' modular enclosure of the zoom lens' module of the mobile apparatus, wherein U31 screws into U18 and U3.

U32 is the mechanical axis of U10.

U33 is a antenna swivel (not shown).

U34 is the threaded "T" connection to U10 for U18.

U35 is the irregular surface of the housing of the original equipment eyepiece of a typical optical image source.
Observers sometimes find that the surface of U35 has an irregular axial cylindrical diameter profile.

U36 is an "O" ring that has been removed and is no longer there.

U37 is an "O" ring.

U38 is an "O" ring that has been removed and is no longer there.

U39 is an "O" ring that has been removed and is no longer there.

U40 is an "O" ring.

On occasion, observers find that the barrels of the optical image sources are too far removed and inaccessible for attaching the mobile apparatus to the optical image source enclosure barrel.

When this occurs the observer can attach the mobile apparatus to the original equipment eyepiece housing of the optical image source. The original equipment eyepiece housings of the optical image sources sometimes have irregular surface profiles. The clamping mechanism U2 works optimally in performing its function of coaxially centering and aligning the mobile apparatus on the original equipment eyepieces of optical image sources when the original equipment eyepiece housing has a uniform cylindrical surface profile to clamp on to.

The following is a method for attaching the mobile apparatus to the original equipment eyepiece housings of optical image sources where the housings of the original equipment eyepieces have an irregular cylindrical profile.

The observer first measures the original equipment eyepiece housings' irregular profile.

This can be done with a micrometer calipers.

Secondly, the observer acquires and selects "O rings" having pre-determined diameters and thicknesses suitable for smoothing out the surface profile of the eyepiece housing to give the original equipment eyepiece housing a uniform cylindrical profile, parallel to the mechanical axis of the original equipment eyepiece housing for the mobile apparatus to clamp on and attach to.

Thirdly, the observer slips the "O rings" having the pre-determined diameters an thicknesses onto the original equipment eyepiece housing U35 at pre-determined locations along the ridges and valleys of the original equipment eyepiece housing to give the outside diameter of the irregular surface of the original equipment eyepiece housing's "O rings" a uniform cylindrical profile.

The equality of the value of the outside diameters of the "O rings", when they are mounted on to the original equipment eyepiece housing, provides this uniformity.

U37 and U40 are examples of "O rings" slipped on to the eyepiece housing along its ridges and valleys to give surface of the eyepiece housing created by the "O rings" a uniform cylindrical profile. "O" rings U39, U38 and U36 have been deleted purposely from those shown in FIG. 54 in order to give each of the trolley gripping jaws of the clamping mechanism U2 two points of contact to avoid ambiguity in the contact surface. Fourth, the observer slides U3 over the outside diameter of the eyepiece housing of the optical images source having the "O rings". The precision clamping mechanism U2 is then manually tightened around the "O rings" on the eyepiece housing of the optical image source using the knurled handgrip on U2 with a twist of the wrist to coaxially align and center the mobile apparatus on the optical image source. Therefore, for irregular barrels and irregular original equipment eyepieces, the "O" rings improve the self centering and self aligning precision and gripping operation of the clamping mechanism module.

Fine focus is achieved by operating the zoom lens focus control ring U20 using U19.

Refer to FIG. 22A and FIG. 22B and FIG. 23A and FIG. 23B and FIG. 24 and FIG. 25 and FIG. 26A and FIG. 26B for the layout of a preferred embodiment of the mobile apparatus' clamping mechanism U2.

The enclosure of the mobile apparatus is configured into a "T" formation. The stem of the "T" is comprised of modules U3, U31, and U18. The cross member of the "T" is comprised of elements U13 and U15, i.e. via enclosure U10. The stem of the "T" is fastened to the cross member of the "T" via U26. The modules U3, U31, and U18 of the stem are fastened together using U5, U7. The stem is configured with modules for easy replacement of U3, U31, U13, U15 and U18 for achieving versatility of the mobile apparatus to gain compatibility with the variety of different optical image sources it operates with over time.

The "T" formation has a plurality of benefits.

In cases where the optical image sources have a permanently mounted eyepiece there is no need for the eyepiece so the eyepiece module has been easily unscrewed and removed from the front end of the mobile apparatus.

The zoom lens module U31 optically acquires and transforms the afocal image of the object from the optical image source into a focal image at U17 of U18.

The electronic image sensor array camera module U18 electronically transforms the focal image at U17 into electronic imagery signals, and the electronic circuits module U13 electronically transforms and transmits the electronic imagery signals from the antennas and output terminals of U13 and U9 and U16 to the observer and the observer's audience. The electronic imagery signals meet analog and/or digital protocols depending on the type of analog or digital electronics used by the observer in the electronic sensor array camera module U18 and the electronic circuits module U13.

DRAWINGS

The following drawings are not drawn to scale, but are drawn rather to make details of the current invention apparent and recognizable.

What is claimed as being new and desired to be protected by Letters Patent of the United States is as follows:

1. A mobile apparatus for optically and mechanically adapting itself to universally interface with any one of a large variety of different types of afocal optical image sources and focal optical image sources, said mobile apparatus configured of combinations of selected functional modules from a menu of said functional modules comprising:

a clamping mechanism module;
an extension module;
a camera lens mount module;
a zoom lens module; an eyepiece module;
a field lens module;
a macro zoom lens module;
an electronic image sensor array camera module;
an electronic circuits module;
an end cap module;
wherein said mobile apparatus is configurable as any one of the following combinations of said functional modules:
a 1st combination,
a 2nd combination,
a 3rd combination,
a 4th combination,
a 5th combination,
a 6th combination,
a 7th combination, or
an 8th combination;
wherein the choice of which one of said combinations of said functional modules to configure to use for interfacing to the particular said optical image source immediately at hand is made by an observer based on the particular interfacing needs of that particular said optical image source to be interfaced to, as follows:

a) said 1st combination of functional modules, is configured for interfacing to any one of said afocal optical image sources having a 1st original equipment eyepiece, and a 1st optical axis, and a 1st mechanical axis, and a 1st afocal optical imagery, and a 1st entrance pupil, and a 1st exit pupil, for acquiring said 1st afocal optical imagery from said 1st original equipment eyepiece of said afocal optical image source types, and for transmitting said 1st afocal optical imagery from said mobile apparatus to said observer and to said observer's audience;

b) said 2nd combination of functional modules, is configured for interfacing to any one of said afocal optical image sources having a 1st barrel enclosure, and said 1st optical axis, and said 1st mechanical axis, and said 1st afocal optical imagery, and said 1st entrance pupil, and said 1st exit pupil, for acquiring said 1st afocal optical imagery from said afocal optical image source types, and for transmitting said 1st afocal optical imagery from said mobile apparatus to said observer and to said observer's audience;

c) said 3rd combination of functional modules, is configured for interfacing to any one of said focal optical image sources having said 1st barrel enclosure, and said 1st optical axis, and said 1st mechanical axis, and said 1st focal optical imagery, and said 2nd entrance pupil, for acquiring said 1st focal optical imagery from the image plane of said focal optical image source types, and for transmitting said 1st focal optical imagery from said mobile apparatus to said observer and to said observer's audience;

d) said 4th combination of functional modules, is configured for interfacing to any one of said focal optical image sources having said 1st barrel enclosure, and said 1st optical axis, and said 1st mechanical axis, and said 1st focal optical imagery, and said 2nd entrance pupil, for acquiring said 1st focal optical imagery from the image plane of said focal optical image source types, and for transmitting said 1st focal optical imagery from said mobile apparatus to said observer and to said observer's audience;

e) said 5th combination of functional modules, is configured for interfacing to any one of said focal optical image sources having a camera lens mount, and said 1st optical axis, and said 1st mechanical axis, and said 1st focal optical imagery, and said 2nd entrance pupil, for acquiring said 1st focal optical imagery from the image plane of said focal optical image source types, and for transmitting said 1st focal optical imagery from said mobile apparatus to said observer and to said observer's audience;

f) said 6th combination of functional modules, is configured for interfacing to any one of said focal optical image sources having said 1st barrel enclosure, and said 1st optical axis, and said 1st mechanical axis, and said 1st focal optical imagery, and said 2nd entrance pupil, for acquiring said 1st focal optical imagery from the image plane of said focal optical image source types, and for transmitting said 1st focal optical imagery from said mobile apparatus to said observer and to said observer's audience;

g) said 7th combination of functional modules, is configured for interfacing to any one of said focal optical image sources having said 1st barrel enclosure, and said 1st optical axis, and said 1st mechanical axis, and said 1st focal optical imagery, and said 2nd entrance pupil, for acquiring said 1st focal optical imagery from the image plane of said focal optical image source types, and for transmitting said 1st focal optical imagery from said mobile apparatus to said observer and to said observer's audience;

h) said 8th combination of functional modules, is configured for interfacing to any one of said focal optical image sources having said camera lens mount, and said 1st optical axis, and said 1st mechanical axis, and said 1st focal optical imagery, and said 2nd entrance pupil, for acquiring said 1st focal optical imagery from the image plane of said focal optical image source types, and for transmitting said 1st focal optical imagery from said mobile apparatus to said observer and to said observer's audience;

wherein: a) said 1st combination of functional modules, is mounted on said afocal optical image source and positioned along said 1st optical axis using said clamping mechanism module, for preventing vignetting of said 1st afocal optical imagery;

b) said 2nd combination of functional modules, is mounted on said afocal optical image source and positioned along said 1st optical axis using said extension module, for preventing vignetting of said 1st afocal optical imagery;

c) said 3rd combination of functional modules, is mounted on said focal optical image source and positioned along said 1st optical axis using said clamping mechanism module, for preventing vignetting of said 1st focal optical imagery;

d) said 4th combination of functional modules, is mounted on said focal optical image source and positioned along said 1st optical axis using said extension module, for preventing vignetting of said 1st focal optical imagery;

e) said 5th combination of functional modules, is mounted on said focal optical image source and positioned along said 1st optical axis using said camera lens mount module, for preventing vignetting of said 1st focal optical imagery;

f) said 6th combination of functional modules, is mounted on said focal optical image source and positioned along said optical axis using said clamping mechanism module, for preventing vignetting of said 1st focal optical imagery;

g) said 7th combination of functional modules, is mounted on said focal optical image source and positioned along said 1st optical axis using said extension module, for preventing vignetting of said 1st focal optical imagery;

h) said 8th combination of functional modules, is mounted on said focal optical image source and positioned along said optical axis using said camera lens mount module, for preventing vignetting of said 1st focal optical imagery;

wherein said 1st combination of functional modules, is comprised of: an ordered pre-determined connected modular sequence of: said clamping mechanism module and said zoom lens module and said electronic image sensor array camera module and said electronic circuits module and said end cap module;

wherein said 2nd combination of functional modules, is comprised of: an ordered pre-determined connected modular sequence of: said extension module and said zoom lens module and said electronic image sensor array camera module and said electronic circuits module and said end cap module;
wherein said 3rd combination of functional modules, is comprised of: an ordered pre-determined connected modular sequence of: said clamping mechanism module and said field lens module and said macro zoom lens module and said electronic image sensor array camera module and said electronic circuits module and said end cap module;
wherein said 4th combination of functional modules, is comprised of: an ordered pre-determined connected modular sequence of: said extension module and said field lens module and said macro zoom lens module and said electronic image sensor array camera module and said electronic circuits module and said end cap module;
wherein said 5th combination of functional modules, is comprised of: an ordered pre-determined connected modular sequence of: said camera lens mount module and said field lens module and said macro zoom lens module and said electronic image sensor array camera module and said electronic circuits module and said end cap module;
wherein said 6th combination of functional modules, is comprised of: an ordered pre-determined connected modular sequence of: said clamping mechanism module and said eyepiece module and said zoom lens module and said electronic image sensor array camera module and said electronic circuits module and said end cap module;
wherein said 7th combination of functional modules, is comprised of: an ordered pre-determined connected modular sequence of: said extension module and said eyepiece module and said zoom lens module and said electronic image sensor array camera module and said electronic circuits module and said end cap module;
wherein said 8h combination of functional modules, is comprised of: an ordered pre-determined connected modular sequence of: said camera lens mount module and said eyepiece module and said zoom lens module and said electronic image sensor array camera module and said electronic circuits module and said end cap module;
wherein said clamping mechanism module is, comprised of:
a clamping mechanism, for mounting said mobile apparatus to said optical image source, and
a 2nd enclosure, configured for coaxially mounting and housing said clamping mechanism;
wherein said extension module is, comprised of:
a 1st enclosure, configured as a hollow cylinder having pre-determined inside and outside diameters for mounting said mobile apparatus to said optical image sources;
wherein said camera lens mount module, is comprised of:
a camera lens mount, for mounting said mobile apparatus to said optical image source, and
an 11th enclosure, configured for coaxially mounting and housing said camera lens mount;
wherein said 11th enclosure, is configured with:
an 11th front end, for joining said 11th enclosure with the rear end of other said functional modules, and
an 11th rear end, for joining said 11th enclosure with the rear end of other said functional modules;
wherein said front end of said 11th enclosure faces the direction of said optical image source;
wherein said front end of said 11th enclosure, is configured with:
a screw type connector, for joining said 11th enclosure with said optical image source,
a bayonet type connector, for joining said 11th enclosure with said optical image source,
a breech lock type connector, for joining said 11th enclosure with said optical image source,
a double bayonet type connector, for joining said 11th enclosure with said optical image source, or
a tab lock type connector, for joining said 11th enclosure with said optical image source;
wherein said zoom lens module, is comprised of:
a zoom lens, for acquiring said 1st afocal optical imagery, and
a 3rd enclosure, configured for mounting and housing said zoom lens;
wherein said zoom lens, is comprised of:
an entrance pupil, for
a) locating said exit pupil produced by said afocal optical image source, or
b) locating said exit pupil produced by said eyepiece module;
wherein said zoom lens is a commercial off the shelf item;
wherein said zoom lens is chosen by said observer for having said entrance pupil location close at hand optically near to the front optical element of said zoom lens, and for minimizing any said zoom lens structural interferences in the object space before said front optical element for optimizing the freedom to locate said exit pupil coincident with said entrance pupil;
wherein said eyepiece module, is comprised of:
an eyepiece, for acquiring said 1st focal optical imagery, and
a 9th enclosure, configured for mounting and housing said commercial off the shelf eyepiece;
wherein said eyepiece is a commercial off the shelf item, comprised of:
an eye relief, for locating an exit pupil of said focal optical image source at said entrance pupil of said zoom lens;
wherein said eyepiece is a commercial off the shelf item chosen by said observer for having a long predetermined said eye relief for locating said exit pupil at the entrance pupil of said zoom lens module and for controlling the size of said exit pupil;
wherein the eyepiece module is used to make the entrance pupil of the zoom lens module optically accessible to the exit pupil in each of the following configurations of the mobile apparatus: the 6th combination of functional modules, the 7th combination of functional modules, and the 8th combination of functional modules to prevent vignetting;
wherein said field lens module, is comprised of:
a field lens, configured for acquiring said 1st focal optical imagery and
an 8th enclosure, for mounting and housing said field lens;
wherein said field lens is a commercial off the shelf item chosen by said observer for imaging said entrance pupil of said focal optical imaging source for producing an exit pupil of said focal optical imaging source located at said entrance pupil of said macro zoom lens module and for controlling the size of said exit pupil;
wherein the field lens module is used to make the entrance pupil of the macro zoom lens module optically accessible to the exit pupil in each of the following configurations of the mobile apparatus: the 3rd combination of functional modules, the 4$^{th}$ combination of functional modules, and the 5th combination of functional modules to prevent vignetting;

wherein said macro zoom lens module, is comprised of:

a macro zoom lens, for acquiring said 1st focal optical imagery, and a 10th enclosure, configured for mounting and housing said macro zoom lens;

wherein said macro zoom lens is, comprised of:

a macro zoom lens entrance pupil, for receiving said exit pupil of said 1st focal optical imagery;

wherein said macro zoom lens is a commercial off the shelf item for receiving said exit pupil produced by said field lens module at said entrance pupil of said macro zoom lens module;

wherein said electronic image sensor array camera module, is comprised of:

an electronic image sensor array camera, for capturing said 2nd focal optical imagery, and a 4th enclosure, for mounting and housing said electronic image sensor array camera;

wherein said electronic image sensor array camera is comprised of:

an electronic image sensor array, for transforming said 2nd focal optical imagery into a 1st electronic imagery signal;

wherein said electronic circuits module is, comprised of:

an electronics circuits, for acquiring said 1st electronic imagery signal from said electronic image sensor array, a 5th enclosure, configured for mounting and housing said electronic circuits;

wherein said 1st enclosure; said 2nd enclosure; said 3rd enclosure; said 4th enclosure; said 5th enclosure; said 8th enclosure; said 9th enclosure; said 10th enclosure; are each configured with:

a 1st front end, for joining with the rear end of adjacent said functional module enclosures, a 1st rear end, for joining with the front end of adjacent said functional module enclosures, a 2nd front end, for joining with the rear end of adjacent said functional module enclosures, a 2nd rear end, for joining with the front end of adjacent said functional module enclosures, a 3rd front end, for joining with the rear end of adjacent said functional module enclosures, a 3rd rear end, for joining with the front end of adjacent said functional module enclosures, a 4th front end, for joining with the rear end of adjacent said functional module enclosures, a 4th rear end, for joining with the front end of adjacent said functional module enclosures, a 5th front end, for joining with the rear end of adjacent said functional module enclosures, a 5th rear end, for joining with the front end of adjacent said functional module enclosures, an 8th front end, for joining with the rear end of adjacent said functional module enclosures, an 8th rear end, for joining with the front end of adjacent said functional module enclosures, a 9th front end, for joining with the rear end of adjacent said functional module enclosures, a 9th rear end, for joining with the front end of adjacent said functional module enclosures, a 10th front end, for joining with the rear end of adjacent said functional module enclosures, and a 10th rear end, for joining with the front end of adjacent said functional module enclosures;

wherein said front end of each said enclosure faces said optical image source;

wherein said rear end of said 1st enclosure and said 2nd enclosure; and said front end and said rear end of said 3rd enclosure, and said 4 enclosure, and said 5t enclosure, and said 8t enclosure, and said 9th enclosure, and said 10 enclosure and said 11th enclosure are each configured with:

a 2nd mechanical means, for joining and connecting said functional modules together in a predetermined arrangement;

wherein said 2nd mechanical means is comprised of:

a) a snap-fit snap together connector, for connecting adjacent said functional modules, or b) a screw thread connector, for connecting adjacent said functional modules;

wherein said 1st enclosure, and said 2nd enclosure, and said 3rd enclosure, and said 4th enclosure, and said 5th enclosure, and said 8th enclosure, and said 9th enclosure, and said 10th enclosure, and said 11th enclosure are each configured with:

said 2nd mechanical means, for enabling said observer to immediately sequentially join and connect said functional modules of said mobile apparatus together into said combination suitable for universally adapting said mobile apparatus to optically and mechanically interface with any one of a variety of different types of said optical image sources, and providing for modular interchangeability among said functional modules;

wherein said clamping mechanism module, is configured for: attaching, centering, aligning, gripping and locking said mobile apparatus to said optical image source;

wherein said extension module, is configured for: mounting and slip fitting said mobile apparatus on to said optical image source;

wherein said camera lens mount module, is configured with one of: said screw type connector, said bayonet type connector, said breech lock type connector, said double bayonet type connector, or said tab lock type connector for mounting said mobile apparatus to said optical image source;

wherein said zoom lens module, is configured for:

a) receiving said 1st exit pupil from said original equipment eyepiece of said afocal optical image source at said entrance pupil of said zoom lens module, for preventing vignetting, b) for transforming said 1st afocal optical imagery from said afocal optical image source into an 2nd focal optical imagery, c) receiving said 2nd afocal optical imagery from said eyepiece module of said mobile apparatus, and for transforming said 2nd afocal optical imagery into a 2nd focal optical imagery, d) for receiving said 1st exit pupil from said eyepiece module of said mobile apparatus at said entrance pupil of said zoom lens module, for preventing vignetting, and e) adjusting said 2nd focal optical imagery size on said electronic image sensor array to fill said electronic image sensor array for covering the entire field of view of said optical image source;

wherein said eyepiece module, is configured for:

a) transforming and transferring said 1st focal optical imagery from said focal optical image source to an 2nd afocal optical imagery to said zoom lens module at the said entrance pupil of said zoom lens module, for preventing vignetting, b) imaging and locating and setting said 2nd entrance pupil of said focal optical image source to said entrance pupil of said zoom lens module, for preventing vignetting,
c) for imaging and setting the size of said 2nd entrance pupil of said focal optical image source to equal the size of the said entrance pupil of said macro zoom lens module, to optimize the brightness of said 2nd focal optical imagery when said observer deems necessary,
d) whereby enabling said observer to use said mobile apparatus on a variety of different types of said afocal optical image sources that have said original equipment eyepieces that can be and are removed from said optical image sources, and
e) whereby enabling said observer to use said mobile apparatus on a variety of different types of said focal optical image sources that have no said original equipment eyepiece at all;

wherein said field lens module, is configured for:
a) transferring said 1st focal optical imagery from the image plane of said focal optical image source to the entrance pupil of said macro zoom lens module,
b) for imaging and locating and setting said 2nd entrance pupil of said focal optical image source to said entrance pupil of said macro zoom lens module, for preventing vignetting, and
c) for imaging and setting the size of said 2nd entrance pupil of said focal optical image source to equal the size of the said entrance pupil of said macro zoom lens module, to optimize the brightness of said 2nd focal optical imagery;

wherein said macro zoom lens module, is configured for:
a) receiving said 1st focal optical imagery from the image plane of said focal optical image source from said field lens module,
b) transforming said 1st focal optical imagery into a 2nd focal optical imagery,
c) receiving the image of said 2nd entrance pupil of said focal optical image source from said field lens module at said entrance pupil of said macro zoom lens module, for preventing vignetting, and
d) adjusting said 2nd focal optical imagery size on said electronic image sensor array to fill said electronic image sensor array for covering the entire field of view of said optical image source;

wherein said electronic image sensor array camera module, is configured for:
a) receiving said 2nd focal optical imagery from said zoom lens module for said afocal optical image sources, and for electronically transforming said 2nd focal optical imagery into a 1s electronic imagery signal,
b) receiving said 2nd focal optical imagery from said zoom lens module for said focal optical image sources, and for electronically transforming said 2nd focal optical imagery into a 1s electronic imagery signal, and
c) receiving said 2nd focal optical imagery from said macro zoom lens module for said focal optical image sources, and for electronically transforming said 2nd focal optical imagery into said 1st electronic imagery signal;

wherein said electronic circuits module, is configured for acquiring said 1st electronic imagery signal from said electronic image sensor array camera module, and for transmitting said 1st electronic imagery signal to said observer and to said observer's audience;

wherein each said macro zoom lens of each said macro zoom lens module, is configured with:
f) a range of magnification adjustability for filling said electronic image sensor array;
wherein each said macro zoom lens module, is interchangeable with each of another said macro zoom lens module having at least:
a) the same said range of magnification adjustability, or
b) a different said range of magnification adjustability;
wherein each said field lens of each said field lens module, is chosen from a selection of commercial off the shelf field lenses having a range of different effective focal lengths, for preventing vignetting;
wherein each said field lens module, is interchangeable with each of another said field lens module, having at least: a) the same said effective focal length, or b) a different said effective focal length;
wherein each said zoom lens of each said zoom lens module, is configured with: a range of magnification adjustability, for filling said optical sensor array with the full field of view of said optical image source;
wherein each said zoom lens module, is interchangeable with each of another said zoom lens module, having at least:
a) the same said range of magnification adjustability, or
b) a different said range of magnification adjustability;
wherein each said eyepiece of each said eyepiece module, is chosen from a selection of eyepieces having a range of different effective focal lengths, for preventing vignetting;
wherein each said eyepiece module, is interchangeable with each other said eyepiece module having at least:
a) the same said effective focal length, or
b) an different said effective focal length; wherein said electronics circuits is, comprised of: a RF antenna, configured for radiating said 1st electronic imagery signal and wirelessly transmitting said 1st electronic imagery signal to said observer and to said observer's audience, or
a WIFI antenna, configured for radiating said 1st electronic imagery signal and wirelessly transmitting said 1st electronic imagery signal to said observer and to said observer's audience;
wherein said electronics circuits of said electronics circuits module, is comprised of:
a 1st microprocessor, configured for running:
a 1st software, for enabling said observer to perform and store a voice recognition data, for each of said 1st audio electronic signal from said observer and said 2nd audio electronic signal from said observer's audience for generating:
a 1st text file archive, for storing audio archival data, and
a 1st firmware, for enabling said observer to perform and store said voice recognition data, for each of said 1st audio electronic signal from said observer and said 2nd audio electronic signal from said observer's audience for generating said 1st text file archive, for storing audio archival data;
wherein said end cap module is, comprised of:
a 6th enclosure, for mounting the physical elements,
an electronic microphone, for producing said 1st audio electronic signal from said observer,
an electronic speaker, for converting said 2nd audio electronic signal from said observer's audience for voice communication with said observer,
a label, for identifying which side of said mobile apparatus is up, a heat sink, for cooling said electronic circuits module,
a power on/off switch, for controlling the distribution of voltage,
an electrical connector port, for inputting external electrical power to said mobile apparatus for charging said battery,
a 1st hard wire cable port, for enabling bi-directional hard wire coaxial signal cable to be connected to said mobile apparatus,
and a 1st fiber optics cable port, for enabling bi-directional fiber optics signal cable to be connected to said mobile apparatus; wherein said end cap module is joined and connected mechanically and electrically to said electronic circuits module;
wherein said end cap module is configured with:
a wireless bi-directional communication link, for wirelessly communicating content with said observer and said observer's audience;
wherein said 6th enclosure is configured with:
a 6th closed front end surface, for sealing and for protecting said electronics circuits of said electronics circuits module;
wherein said electronic microphone is mounted on said 6th closed front end surface of said 6th enclosure;
wherein said electronic microphone is configured for hearing:
a 1st sound, for communicating background sound from the vicinity of said optical image source during said observer's observing session to said observer and to said observer's audience,
a 1st audio, for communicating voice content from said observer in said vicinity of said optical image source during said observer's observing session to said observer's audience, and for transforming said 1st sound into:
a 1st sound electronic signal, for electronically communicating said 1st sound from the vicinity of said optical image source to said observer and to said observer's audience, and
a 1st audio electronic signal, for electronically communicating said 1st audio from the vicinity of said optical image source to said observer and to said observer's audience;
wherein said electronic speaker is mounted on said 6th closed front end surface of said 6th enclosure for said observer receiving: a 2nd audio, for communicating voice content from said observer's audience;
wherein said label is for a instructions for said observer for identifying to said observer which side is up for aligning said electronic image sensor array camera module to the top side of said 2nd focal optical imagery;
wherein said heat sink is mounted to said 6th enclosure for removing heat from said electronics circuits module;
wherein said power on/off switch is for turning on and off a source of electrical power to said mobile apparatus;
wherein said electrical connector port is for charging said battery from said source of electrical power which is external to said mobile apparatus;
wherein said 1st hard wire cable port is for transmitting said 1st electronic imagery signal to said observer and to said observer's audience via a hard wire cable medium;
wherein said 1st fiber optics cable port is for transmitting said 1st electronic imagery signal to said observer and to said observer's audience via a fiber optics cable medium; wherein said end cap module is interchangeable with each of another said end cap module;
wherein said mobile apparatus is further comprised of:
an audio amplifier, for adjusting and buffering said audio signals of said microphone,
a speaker, for transforming audio electronic signals into sounds,
a servo electronics package, for receiving an electronic control signals from said observer,
a unidirectional signal line, for carrying an analog video and said analog audio signals,
a unidirectional signal line, for carrying said analog video encoded streams of signals and said analog audio encoded streams of signals,
a bidirectional data bus, for delivering said encoded audio content and said encoded video content,
a bidirectional fiber optic port for transmitting content, and for transmitting and receiving administrative data via fiber optic protocol to any external fiber optic network,
a D.C. power bus, supplied by said USB port for supplying electric power to charge said battery,
a mechanical swivel, for pointing said antenna during set-up and initialization time by said observer, for adjusting said antenna's radiation pattern to maximize the signal communicated to and from said antenna to said observer to maximize signal to noise content,
a notch, configured into said mobile apparatus' enclosure out of harms' way to protect said mechanical swivel and said antenna, and reduce the need for said swivel and for said antenna maintenance,
a bidirectional control signal line, for carrying an administrative control commands,
an administrative bi-directional data link, for controlling the power-up cycle, and for reading the state of said battery life remaining, and a time to fully charge said battery, and a cumulative time on said battery, a means configured for multiple mobile apparatuses to be used simultaneously in close proximity to one another with respect to their WiFi coverage, and
a system controller electronics, configured for hard wired, fiber optics and wireless bi-directional communication capability, and for holding an operating radio frequency configuration file;
wherein said applications software and firmware is for:
a) managing the connectivity to said USB, Ethernet and fiber optics ports,
b) enabling each of the multiplicity of said mobile apparatuses to communicate to said observer the best choice of said radio frequencies for said observer to use for each one of said multiplicity of the mobile apparatuses operating in proximity to one another in order to minimize a radio frequency interference created between said multiplicity of the mobile apparatuses operating in proximity to one another,
c) enabling the observer to remotely or locally reset said radio frequencies used by each of said mobile apparatuses to minimize the potential interference, and
d) enabling the observer to re-poll each of said mobile apparatuses over and over again at said observer's command to determine the effectiveness of said observer's new chosen radio frequency settings;
wherein each mobile apparatus is configured with said applications software and firmware for enabling said observer to control said multiple mobile apparatuses simultaneously to transmit and receive signals in the form of digital data packets;

wherein each said mobile apparatus is configured with said system controller electronics for controlling all of said functions of said mobile apparatus;

wherein said microprocessor, is further configured for:
a) managing the wireless transmission of said electronic audio signals to said observer and to said observer's audience,
b) managing the wireless receiving said electronic audio signals from said observer's audience, under the control of said observer,
c) managing the electronic storing of said electronic audio signals from said observer's audience under the control of said observer, and
d) managing the electronic retrieval of said observer's audience said electronic audio signals from said microprocessor memory on demand by said observer's audience, under the control of said observer;

wherein each of said multiplicity of said mobile apparatuses is configured with said applications software enabling each of said multiplicity of said mobile apparatuses to be commanded by said observer to communicate to said observer the best choice of said radio frequencies for said observer to use for each one of the multiplicity of said mobile apparatuses operating in proximity to one another in order to minimize said radio frequency interference effects created between the multiplicity of the other said mobile apparatuses operating in proximity to one another.

2. The mobile apparatus of claim 1,
configured as said 1st combination of functional modules,
wherein said clamping mechanism module is configured for: attaching, centering, aligning, gripping and locking said mobile apparatus to said afocal optical image source; wherein said zoom lens module is configured for optically acquiring said 1st afocal optical imagery from said original equipment eyepiece of said afocal optical image source, and for transforming said 1st afocal optical imagery into said 2nd focal optical imagery;
wherein said electronic image sensor array camera module is configured for receiving said 2nd focal optical imagery from said zoom lens module, and for electronically transforming said 2nd focal optical imagery into said 1st electronic imagery signal;
wherein said zoom lens is, furthermore comprised of: an electro-mechanical actuator, configured for enabling said observer to locally and remotely adjust each of: a magnification of said zoom lens, a iris diaphragm of said zoom lens, and a focus of said zoom lens.

3. The mobile apparatus of claim 1,
configured as said 2nd combination of functional modules,
wherein said extension module is configured for: mounting and slip fitting said mobile apparatus to said afocal optical image source; wherein said zoom lens module is configured for: optically acquiring said 1st afocal optical imagery from said afocal optical image source, and for transforming said 1st afocal optical imagery into an 2nd focal optical imagery;
wherein said electronic image sensor array camera module is configured for receiving said 2nd focal optical imagery from said zoom lens module, and for electronically transforming said 2nd focal optical imagery into said 1st electronic imagery signal;
wherein said zoom lens is, furthermore comprised of:
an electro-mechanical actuator, configured for enabling said observer to locally and remotely adjust:
a magnification of said zoom lens,
an iris diaphragm of said zoom lens, and
a focus of said zoom lens.

4. The mobile apparatus of claim 1,
configured as said 3rd combination of functional modules,
wherein said clamping mechanism module, is configured for: attaching, centering, aligning, gripping and locking said mobile apparatus to said focal optical image source;
wherein said electronic image sensor array camera module is configured for receiving said 2nd focal optical imagery from said macro zoom lens module, and for electronically transforming said 2nd focal optical imagery into said 1st electronic imagery signal;
wherein said macro zoom lens is, further comprised of: an electro-mechanical actuator, configured for enabling said observer to locally and remotely adjust: a magnification of said macro zoom lens, a iris diaphragm of said macro zoom lens, and a focus of said macro zoom lens.

5. The mobile apparatus of claim 1,
configured as said 4th combination of functional modules,
wherein said extension module, is configured for: mounting and slip fitting said mobile apparatus to said focal optical image source;
wherein said electronic image sensor array camera module is configured for receiving said 2nd focal optical imagery from said macro zoom lens module, and for electronically transforming said 2nd focal optical imagery into said 1st electronic imagery signal;
wherein said macro zoom lens is, further comprised of: an electro-mechanical actuator, configured for enabling said observer to locally and remotely adjust: a magnification of said macro zoom lens, a iris diaphragm of said macro zoom lens, and a focus of said macro zoom lens.

6. The mobile apparatus of claim 1,
configured as said 5th combination of functional modules,
wherein said camera lens mount module is configured with: said screw type connector, and said bayonet type connector, and said breech lock type connector, and said double bayonet type connector, and said tab lock type connector for mounting said mobile apparatus to said focal optical image source;
wherein said electronic image sensor array camera module is configured for: receiving said 2nd focal optical imagery from said macro zoom lens module, and for electronically transforming said 2nd focal optical imagery into a 1st electronic imagery signal;
wherein said macro zoom lens is, further comprised of: an electro-mechanical actuator, configured for:
enabling said observer to locally and remotely adjust: a magnification of said macro zoom lens, a iris diaphragm of said macro zoom lens, and a focus of said macro zoom lens.

7. The mobile apparatus of claim 1,
configured as said 6th combination of functional modules,
wherein said clamping mechanism module, is configured for: attaching, centering, aligning, gripping and locking said mobile apparatus to said focal optical image source;
wherein said eyepiece module is configured for: transforming and transferring said 1st focal optical imagery of said focal optical image source to a 2nd afocal optical imagery;
wherein said zoom lens module is configured for: optically acquiring said 2nd afocal optical imagery from said eyepiece module and transforming said 2nd afocal optical imagery into a 2nd focal optical imagery;
wherein said eyepiece module is, further comprised of:
a plurality of radial shim slots, configured for enabling said observer to insert shims for correcting for any misalignment and centering errors found between said 1st optical axis and said 1st mechanical axis of said optical image source;
wherein said electronic image sensor array camera module is configured for receiving said 2nd focal optical imagery from said zoom lens module, and for electronically transforming said 2nd focal optical imagery into a 1st electronic imagery signal;
wherein said zoom lens is, further comprised of: an electro-mechanical actuator, configured for enabling said observer to locally and remotely adjust:
a) a magnification of said zoom lens,
b) an iris diaphragm of said zoom lens, and
c) a focus of said zoom lens.

8. The mobile apparatus of claim 1,
configured as said 7th combination of functional modules,
wherein said extension module, is configured for: mounting and slip fitting said mobile apparatus onto said focal optical image source;
wherein said eyepiece module, is configured for: transforming and transferring said 1st focal optical imagery of said focal optical image source to a 2nd afocal optical imagery;
wherein said zoom lens module, is configured for: optically acquiring said 2nd afocal optical imagery from said eyepiece module and transforming said 2nd afocal optical imagery into said 2nd focal optical imagery;
wherein said electronic image sensor array camera module, is configured for: receiving said 2nd focal optical imagery from said zoom lens module, and for electronically transforming said 2nd focal optical imagery into said 1st electronic imagery signal;
wherein said zoom lens is, further comprised of: an electro-mechanical actuator, configured for: enabling said observer to locally and remotely adjust: a magnification of said macro zoom lens, a iris diaphragm of said macro zoom lens, and a focus of said macro zoom lens.

9. The mobile apparatus of claim 1,
configured as said 8th combination of functional modules,
wherein said camera lens mount module is configured with said screw type connector, and said bayonet type connector, and said breech lock type connector, and said double bayonet type connector, and said tab lock type connector for mounting said mobile apparatus to said focal optical image source;
wherein said eyepiece module, is configured for: transforming and transferring said 1st focal optical imagery of said focal optical image source to a 2nd afocal optical imagery; wherein said zoom lens module is configured for: optically acquiring said 2nd afocal optical imagery from said eyepiece module and transforming said 2nd afocal optical imagery into said 2nd focal optical imagery;
wherein said electronic image sensor array camera module, is configured for: receiving said 2nd focal optical imagery from said zoom lens module, and for electronically transforming said 2nd focal optical imagery into said 1st electronic imagery signal;
wherein said electronic circuits module, is configured for:
a) acquiring said 1st electronic image signal from said electronic image sensor array camera module b) wirelessly transmitting said 1st electronic imagery signal to said observer and to said observer's audience;
wherein said zoom lens is, further comprised of: an electro-mechanical actuator, configured for: enabling said observer to locally and remotely adjust: a magnification of said macro zoom lens, a iris diaphragm of said macro zoom lens, and a focus of said macro zoom lens.

10. The mobile apparatus of claim 1,
wherein said clamping mechanism module, is comprised of:
a clamping mechanism, configured for: attaching, centering, aligning, gripping and locking said mobile apparatus to an optical image source for acquiring an optical imagery of an object produced by said optical image source during an observer's observing session, and
a 2nd enclosure, configured for: coaxially mounting and housing said clamping mechanism with said V4 mechanical axis;
wherein said 2nd front end of said 2nd enclosure of said clamping mechanism module faces said optical image source;
wherein said optical image source is comprised of at least: a barrel enclosure, and/or an original equipment eyepiece; wherein said optical imagery, is: a focal optical imagery, or an afocal optical imagery;
wherein said clamping mechanism is, comprised of: a plurality of four identical trolleys;
wherein each of said trolleys is, comprised of: a plurality of two synchronous conical roller pressure bearing jaws for attaching, centering, aligning, constraining, gripping and for locking said mobile apparatus, to:
a) said barrel enclosure, or
b) said original equipment eyepiece.

11. The mobile apparatus of claim 1
wherein said electro-mechanical actuator is configured for enabling said observer to manually and electronically adjust said focus, iris and magnification of said zoom lens locally and/or remotely for controlling said focus, depth of field, f-number, brightness, and magnification of said 2nd focal optical imagery to said electronic image sensor array camera module;
wherein said electro-mechanical actuator, is configured for:
a) enabling said observer to manually and electronically adjust said magnification of said zoom lens locally and remotely,
b) controlling said magnification of said 2nd focal optical imagery to said electronic image sensor array camera module,
c) controlling the sizing of said 2nd focal optical imagery to said electronic image sensor array camera module,
d) making said 2nd focal optical imagery field of view fully fit within the dimensions of said electronic image sensor array, and
e) optimizing the resolution of fine detail of said 2nd focal optical imagery to said electronic image sensor array camera module.

12. The mobile apparatus of claim 1
wherein said electronics circuits module is configured with said electronics circuits for electronically acquiring:
a 2nd audio electronic signal, from said observer's audience, and
a 2nd sound electronic signal, from said observer's audience;

wherein said electronics circuits module is further, comprised of:

an antenna groove, configured into said 5th enclosure of said electronics circuits module for storing and for protecting at least:
a) said RF antenna before and after said observer's observing session, and
b) said WIFI antenna before and after said observer's observing session; wherein at least said WIFI antenna is configured with: a swivel for enabling said observer to manually deploy and point said WIFI antenna in order to avoid and mitigate radio frequency noise interference and maximize the signal levels transmitted and received by each said WIFI antenna;

wherein each said WIFI antenna, is configured for:
a) wirelessly radiating said 1st electronic imagery signal to said observer from said mobile apparatus, and
b) wirelessly radiating said 1st electronic imagery signal and said 1st audio electronic signal and said 1st sound electronic signal from said mobile apparatus to said observer's audience, and configured for:

wirelessly enabling said observer for receiving radiated said 2nd audio electronic signal and radiated said 2nd sound electronic signal from said observer's audience;

wherein furthermore each said WIFI antenna is configured for wirelessly radiating:

a digital WIFI streaming of said 1st electronic imagery signal and said 1st audio electronic signal and said 1st sound electronic signal to said observer, and to the Internet, and to a local WIFI LAN of said observer and said observer's audience's smart phones, and said observer's audience's tablets and said observer's audience's PC's;

wherein furthermore said 1st electronic imagery signal is transmitted to said observer and to said observer's audience by said mobile apparatus under the control of said observer via at least:
a) said 2nd hard wire cable port via: a hard wire cable, and
b) said 3rd fiber optics cable port via: a fiber optics cable, and via: at least one said WiFi antenna; wherein said 1st software and said 1st firmware are configured for: enabling said observer to select the frequency of said WIFI antenna transmissions; wherein at least said RF antenna is configured with: a swivel, for enabling said observer to manually deploy and point said RF antenna in order to avoid and mitigate radio frequency noise interference and maximize the signal levels transmitted and received by each said RF antenna;

wherein each said RF antenna, is configured for:
a) wirelessly radiating said 1st electronic imagery signal to said observer, and
b) wirelessly radiating said 1st electronic imagery signal and said 1st audio electronic signal and said 1st sound electronic signal to said observer's audience, and configured for wirelessly enabling said observer for receiving radiated said 2nd audio electronic signal and radiated said 2nd sound electronic signal from said observer's audience;

wherein furthermore each said RF antenna is configured for wirelessly radiating: a digital RF streaming, of said 1st electronic imagery signal and said 1st audio electronic signal and said 1st sound electronic signal
a) to said observer,
b) to the Internet,
c) to a local RF LAN of said observer and said observer's audience's smart phones,
d) to said observer's audience's tablets, and
e) to said observer's audience's PC's, and smart mobile devices; wherein said 1st software and said 1st firmware, are configured for: enabling said observer to select the frequency of said RF antenna transmissions;

wherein said 1st software and said 1st firmware, are configured for: enabling said observer to a) adjust said magnification of said zoom lens, b) adjust said focus of said zoom lens, and c) adjust said iris diaphragm of said zoom lens.

13. The mobile apparatus of claim 1,
wherein said electronics circuits module, is configured for: enabling said observer to simultaneously control and share with said observer's audience said 1st electronic imagery signal acquired simultaneously from each of a plurality of said mobile apparatus, when each said plurality of said mobile apparatus is individually simultaneously interfaced with and attached individually to each of a variety of said optical image sources.

14. The mobile apparatus of claim 1,
wherein each said electronic image sensor array of each said electronic image sensor array camera module, is configured with: a physical array size dimension;
wherein each said electronic image sensor array camera module, is interchangeable with each other said electronic image sensor array camera module having:
a) the same said physical array size dimension, or
b) a different said physical array size dimension.

15. The mobile apparatus of claim 1,
wherein said 1st software, is configured for: enabling said observer to choose and control the mode of transmission of said 1st electronic imagery signal and said 1st sound electronic signal and said 1st audio electronic signal to said observer and to said observer's audience via at least said 1st hard wire cable port, and said 1st fiber optics cable port, and said WIFI antenna, and said RF antenna;

wherein each said 1st microprocessor of each of a plurality of said mobile apparatus that is individually interfaced with and attached individually to each individual said optical image source of a multiplicity of different varieties of said optical image sources, and is configured with: said 1st software;

wherein said 1st software, is configured for: enabling each of a plurality of said mobile apparatus to be individually commanded by said observer to transmit to said observer the best choice of a radio frequencies to use for each of said plurality of said mobile apparatus in order to minimize the effects of a radio frequency interference on each said mobile apparatus, thereby allowing said observer to transmit and reset each of said mobile apparatus' said radio frequencies used by each individual said mobile apparatus, and re-poll each individual said mobile apparatus' over and over again to assure that the best radio frequency choices have been made.

16. The mobile apparatus of claim 1,
wherein said electronics circuits is, comprised of: a digital video recorder, configured for enabling said observer to record and play back said 1st electronic imagery signal a solid state digital recorder, for recording and archiving said 1st audio electronic signal and said 1st sound electronic signal captured during said observer's observing session;

wherein said observer is configured with at least a lap top computer, and a tablet, and a smart phone;

wherein said observer's audience is configured with at least lap top computer, and a tablet, and a smart phone;

wherein said electronics circuits is configured for acquiring said 1st audio electronic signal and said 1st sound electronic signal from said end cap module, and for transmitting said 1st audio electronic signal and said 1st sound electronic signal to: said observer's
a) said lap top computer,
b) said tablet,
c) said smart phone,
d) smart mobile devices, and to:
said observer's audience's
a) said lap top computer,
b) said tablet,
c) said smart phone, and
d) smart mobile devices.

17. The mobile apparatus of claim 1,
wherein said clamping mechanism of said clamping mechanism module is further, comprised of: a four manually operated synchronous clamping jaws;
wherein said four manually operated synchronous clamping jaws is configured for: centering and aligning and gripping and locking said mobile apparatus on to:
a) said 1st barrel enclosure of said optical image source, or
b) said 1st original equipment eyepiece of said optical image source.

18. The mobile apparatus of claim 1,
wherein said clamping mechanism module, is further comprised of: at least two or more:
o-rings, made from an elastic resilient material and having predetermined outside diameters, and predetermined thicknesses for deploying said o-rings in combination around the perimeter of:
a) said 1st barrel enclosure having a substantially irregular axial circularly symmetric cylindrical diameter profile, and for substantially smoothing the irregular axial circularly symmetric right cylindrical diameter profile of said 1st barrel enclosure, or
b) said 1st original equipment eyepiece having a substantially irregular axial circularly symmetric right cylindrical diameter profile, and for substantially smoothing the irregular axial circularly symmetric right cylindrical diameter profile of said 1st original equipment eyepiece;
wherein said clamping mechanism module, of said mobile apparatus, is configured for: enabling said mobile apparatus to optically and mechanically adapt and accommodate to said optical image sources that have other than right cylindrical profiles for each:
a) said 1st barrel enclosure, or
b) said 1st original equipment eyepiece.

19. The mobile apparatus of claim 1,
wherein said mobile apparatus is further, comprised of: a battery and a power control module, configured for supplying a regulated voltage to said mobile apparatus;
wherein said battery and power control module is, comprised of:
a battery, for supplying an electrical voltage,
a power control electronics, configured for electronically regulating said battery voltage, and for regulating the charging of said battery, and for distributing said battery voltage to said mobile apparatus from said battery, and
a 7th enclosure, having a substantially cylindrical shape and predetermined outside diameter, and configured for housing said battery and said power control electronics;
wherein said 7h enclosure is configured with: a 7th front end, and a 7th rear end;
wherein said 61 enclosure is configured with:
a 6th front end, and
a 6th rear end;
wherein said 1st rear end of said 1st enclosure of said extension module is configured with:
a 2nd mechanical means, for joining said 1st enclosure together in a predetermined coaxial arrangement with said 3rd front end of said 3rd enclosure of said zoom lens module;
wherein said 1st front end of said 1st enclosure of said extension module is further configured with: a knurled handle set screw, for locking said mobile apparatus on to:
a) said 1st barrel enclosure of said optical image source, or
b) said 1st original equipment eyepiece of said optical image source;
wherein said 1st enclosure, and said 2nd enclosure, and said 3rd enclosure, and said 41 enclosure, and said 5t enclosure, and said 6th enclosure, and said 7th enclosure are each configured with having a substantially cylindrical shape and predetermined outside diameter.

20. The mobile apparatus of claim 1,
wherein said electronic image sensor array camera module is, comprised of: an analog electronic image sensor array camera;
wherein said electronics circuits is, comprised of: an analog electronic circuit;
wherein said mobile apparatus is configured with said analog electronic image sensor array camera, and said electronics circuits for transmitting said 1st electronic imagery signal and said 1st audio electronic signal and said 1st sound electronic signal in real time with zero latency to said observer and to said observer's audience during said observer's observing session.

21. The mobile apparatus of claim 1,
wherein said mobile apparatus is configured with said electronics circuits module for bi-directionally transmitting and receiving said 1st electronic imagery signal and said 1st audio electronic signal and said 1st sound electronic signal to and from the cloud;
wherein said mobile apparatus is configured with said electronics circuits module for bi-directionally transmitting and receiving said 1st electronic imagery signal and said 1st audio electronic signal and said 1st sound electronic signal to and from the Internet.

22. A mobile apparatus for optically and mechanically adapting itself to universally interface with any one of a large variety of different types of afocal optical image sources and focal optical image sources, said mobile apparatus configured of combinations of selected functional modules from a menu of said functional modules comprising: a clamping mechanism module;
an extension module;
a camera lens mount module;
a zoom lens module;
an eyepiece module;
a field lens module;
a macro zoom lens module;
an electronic image sensor array camera module;
an electronic circuits module;
a battery and a power control module;
an end cap module;
wherein said mobile apparatus is configurable as any one of the following combinations of said functional modules:

a 9th combination,
a 10th combination,
an 11th combination,
a 12th combination,
a 13th combination,
a 14th combination,
a 15th combination, or
a 16th combination;
wherein the choice of which one of said combinations of said functional modules to configure to use for interfacing to the particular said optical image source immediately at hand is made by an observer based on the particular interfacing needs of that particular said optical image source to be interfaced to, as follows:
a) said 9th combination of functional modules, is configured for interfacing to any one of said afocal optical image sources having an 1st original equipment eyepiece, and a 1st optical axis, and a 1st mechanical axis, and a 1st afocal optical imagery, and a 1st entrance pupil, and a 1st exit pupil, for acquiring said 1st afocal optical imagery from said 1st original equipment eyepiece of said afocal optical image source types, and for transmitting said 1st afocal optical imagery from said mobile apparatus to said observer and to said observer's audience;
b) said 10th combination of functional modules, is configured for interfacing to any one of said afocal optical image sources having an 1st barrel enclosure, and a 1st optical axis, and a 1st mechanical axis, and a 1st afocal optical imagery, and a 1st entrance pupil, and a 1st exit pupil, for acquiring said 1st afocal optical imagery from said afocal optical image source types, and for transmitting said 1st afocal optical imagery from said mobile apparatus to said observer and to said observer's audience;
c) said 11th combination of functional modules, is configured for interfacing to any one of said focal optical image sources having an 1st barrel enclosure, and a 1st optical axis, and a 1st mechanical axis, and a 1st local optical imagery, and a 2nd entrance pupil, for acquiring said 1st focal optical imagery from the image plane of said local optical image source types, and for transmitting said 1st focal optical imagery from said mobile apparatus to said observer and to said observer's audience;
d) said 12th combination of functional modules, is configured for interfacing to any one of said focal optical image sources having an 1st barrel enclosure, and a 1st optical axis, and a 1st mechanical axis, and a 1st focal optical imagery, and a 2nd entrance pupil, for acquiring said 1st focal optical imagery from the image plane of said focal optical image source types, and for transmitting said 1st focal optical imagery from said mobile apparatus to said observer and to said observer's audience;
e) said 13th combination of functional modules, is configured for interfacing to any one of said focal optical image sources having an camera lens mount, and a 1st optical axis, and a 1st mechanical axis, and a 1st focal optical imagery, and a 2nd entrance pupil, for acquiring said 1st focal optical imagery from the image plane of said focal optical image source types, and for transmitting said 1st focal optical imagery from said mobile apparatus to said observer and to said observer's audience;
f) said 14th combination of functional modules, is configured for interfacing to any one of said focal optical image sources having an 1st barrel enclosure, and a 1st optical axis, and a 1st mechanical axis, and a 1st focal optical imagery, and a 2nd entrance pupil, for acquiring said 1st focal optical imagery from the image plane of said focal optical image source types, and for transmitting said 1st focal optical imagery from said mobile apparatus to said observer and to said observer's audience;
g) said 15th combination of functional modules, is configured for interfacing to any one of said focal optical image sources having an 1st barrel enclosure, and a 1st optical axis, and a 1st mechanical axis, and a 1st focal optical imagery, and a 2nd entrance pupil, for acquiring said 1st focal optical imagery from the image plane of said focal optical image source types, and for transmitting said 1st focal optical imagery from said mobile apparatus to said observer and to said observer's audience;
h) said 16th combination of functional modules, is configured for interfacing to any one of said focal optical image sources having an camera lens mount, and a 1st optical axis, and a 1st mechanical axis, and a 1st focal optical imagery, and a 2nd entrance pupil, for acquiring said 1st focal optical imagery from the image plane of said focal optical image source types, and for transmitting said 1st focal optical imagery from said mobile apparatus to said observer and to said observer's audience;
wherein:
a) said 9th combination of functional modules, is mounted on said afocal optical image source and positioned along said 1st optical axis using said clamping mechanism module, for preventing vignetting of said 1st afocal optical imagery;
c) said 10th combination of functional modules, is mounted on said afocal optical image source and positioned along said 1st optical axis using said extension module, for preventing vignetting of said 1st afocal optical imagery;
c) said 11th combination of functional modules, is mounted on said local optical image source and positioned along said 1st optical axis using said clamping mechanism module, for preventing vignetting of said 1st focal optical imagery;
d) said 12th combination of functional modules, is mounted on said focal optical image source and positioned along said optical axis using said extension module, for preventing vignetting of said 1st focal optical imagery;
e) said 13th combination of functional modules, is mounted on said focal optical image source and positioned along said 1st optical axis using said camera lens mount module, for preventing vignetting of said 1st focal optical imagery;
f) said 14th combination of functional modules, is mounted on said focal optical image source and positioned along said 1st optical axis using said clamping mechanism module, for preventing vignetting of said 1st focal optical imagery;
g) said 15th combination of functional modules, is mounted on said focal optical image source and positioned along said 1st optical axis using said extension module, for preventing vignetting of said 1st focal optical imagery;
h) said 16th combination of functional modules, is mounted on said focal optical image source and positioned along said optical axis using said camera lens mount module, for preventing vignetting of said 1st focal optical imagery;

wherein said 9th combination of functional modules, is comprised of:

an ordered pre-determined connected sequence of: said clamping mechanism module and said zoom lens module and said electronic image sensor array camera module and said electronic circuits module and said end cap module;

wherein said 10th combination of functional modules, is comprised of:

an ordered pre-determined connected sequence of: said extension module and said zoom lens module and said electronic image sensor array camera module and said electronic circuits module and said end cap module;

wherein said 11th combination of functional modules, is comprised of: an ordered pre-determined connected sequence of: said clamping mechanism module and said field lens module and said macro zoom lens module and said electronic image sensor array camera module and said electronic circuits module and said end cap module;

wherein said 12th combination of functional modules, is comprised of: an ordered pre-determined connected sequence of: said extension module and said field lens module and said macro zoom lens module and said electronic image sensor array camera module and said electronic circuits module and said end cap module;

wherein said 13th combination of functional modules, is comprised of: an ordered pre-determined connected sequence of: said camera lens mount module and said field lens module and said macro zoom lens module and said electronic image sensor array camera module and said electronic circuits module and said end cap module;

wherein said 14th combination of functional modules, is comprised of: an ordered pre-determined connected sequence of: said clamping mechanism module and said eyepiece module and said zoom lens module and said electronic image sensor array camera module and said electronic circuits module and said end cap module;

wherein said 15th combination of functional modules, is comprised of: an ordered pre-determined connected sequence of: said extension module and said eyepiece module and said zoom lens module and said electronic image sensor array camera module and said electronic circuits module and said end cap module;

wherein said 16th combination of functional modules, is comprised of: an ordered pre-determined connected sequence of: said camera lens mount module and said eyepiece module and said zoom lens module and said electronic image sensor array camera module and said electronic circuits module and said end cap module;

wherein furthermore said mobile apparatus is for:

a) receiving a background audio and a background sound from in the vicinity of said mobile apparatus, b) receiving an observer's audio and an observer's background sound from said observer from in the vicinity of said mobile apparatus, c) receiving a observer's audience' audio and a observer's audience' background sound from said observer's audience from in the vicinity of said mobile apparatus, d) transmitting said background audio and said background sound to said observer and to said observer's audience, e) transmitting said observer's audio and said observer's background sound to said observer's audience, and f) transmitting said observer's audience' audio and said observer's audience' background sound to said observer;

wherein said clamping mechanism module, is comprised of: a clamping mechanism, for mounting said mobile apparatus to said optical image sources, and a 2nd enclosure, configured for coaxially mounting and housing said clamping mechanism; wherein said extension module, is comprised of:

a 1st enclosure, configured as a hollow cylinder having pre-determined inside and outside diameters for mounting said mobile apparatus to said optical image sources;

wherein said camera lens mount module, is comprised of: a camera lens mount, for mounting said mobile apparatus to said optical image sources, and a 11th enclosure, configured for coaxially mounting and housing said camera lens mount;

wherein said 11h enclosure, is configured with:

a front end, for joining said 11th enclosure with the rear end of other said functional modules, and a rear end, for joining said 11th enclosure with the rear end of other said functional modules;

wherein said front end of said 11h enclosure faces said optical image source; wherein said front end of said 11h enclosure, is configured with:

a screw type connector, for joining said 11th enclosure with said optical image sources, a bayonet type connector, for joining said 11th enclosure with said optical image sources, a breech lock type connector, for joining said 11th enclosure with said optical image sources, a double bayonet type connector, for joining said 11th enclosure with said optical image sources, or a tab lock type connector, for joining said 11th enclosure with said optical image sources;

wherein said zoom lens module, is comprised of:

a zoom lens, for acquiring said 1st afocal optical imagery, and a 3rd enclosure, configured for mounting and housing said zoom lens;

wherein said zoom lens, is comprised of:

an entrance pupil, for a) locating said exit pupil produced by said afocal optical image source, or b) locating said exit pupil produced by said eyepiece module;

wherein said zoom lens is a commercial off the shelf item;

wherein said zoom lens is chosen by said observer for having said entrance pupil location close at hand optically near to the front optical element of said zoom lens, and for minimizing any said zoom lens structural interferences in the object space before said front optical element for optimizing the freedom to locate said exit pupil coincident with said entrance pupil;

wherein said eyepiece module, is comprised of:

an eyepiece, for acquiring said 1st focal optical imagery, and a 9th enclosure, configured for mounting and housing said commercial off the shelf eyepiece;

wherein said eyepiece is a commercial off the shelf item, comprised of:

an eye relief, for locating an exit pupil of said focal optical image source at said entrance pupil of said zoom lens;

wherein said eyepiece is a commercial off the shelf item chosen by said observer for having a long predetermined said eye relief for locating said exit pupil at the entrance pupil of said zoom lens module and for controlling the size of said exit pupil;

wherein the eyepiece module is used to make the entrance pupil of the zoom lens module optically accessible to the exit pupil in each of the following configurations of the mobile apparatus:

the 14th combination of functional modules, the 15th combination of functional modules, and the 16th combination of functional modules to prevent vignetting;

wherein said field lens module, is comprised of: a field lens, configured for acquiring said 1st focal optical imagery and a 8th enclosure, for mounting and housing said field lens;

wherein said field lens is a commercial off the shelf item chosen by said observer for imaging said entrance pupil of said focal optical imaging source for producing an exit pupil of said focal optical imaging source located at said entrance pupil of said macro zoom lens module and for controlling the size of said exit pupil;

wherein the field lens module is used to make the entrance pupil of the macro zoom lens module optically accessible to the exit pupil in each of the following configurations of the mobile apparatus:

the 11th combination of functional modules, the 12th combination of functional modules, and the 13th combination of functional modules to prevent vignetting;

wherein said macro zoom lens module, is comprised of:

a macro zoom lens, for acquiring said 1st focal optical imagery, and a 10th enclosure, configured for mounting and housing said macro zoom lens;

wherein said macro zoom lens is, comprised of:

a macro zoom lens entrance pupil, for receiving said exit pupil of said 1st focal optical imagery;

wherein said macro zoom lens is a commercial off the shelf item for receiving said exit pupil produced by said field lens module at said entrance pupil of said macro zoom lens module;

wherein said electronic image sensor array camera module, is comprised of:

an electronic image sensor array camera, for capturing said 2nd focal optical imagery, and a 4th enclosure, for mounting and housing said electronic image sensor array camera;

wherein said electronic image sensor array camera is comprised of:

an electronic image sensor array, for transforming said 2nd focal optical imagery into a 1st electronic imagery signal;

wherein said electronic circuits module is, comprised of:

an electronics circuits, for acquiring said 1st electronic imagery signal from said electronic image sensor array, a 5th enclosure, configured for mounting and housing said electronic circuits;

wherein said battery and a power control module, is comprised of:

a battery, for supplying voltage to said mobile apparatus, a power control electronics, for regulating said voltage to said mobile apparatus, a 7th enclosure, having a substantially cylindrical shape and predetermined outside diameter, and configured for housing said battery and said power control electronics;

wherein said end cap module, is comprised of:

a 6th enclosure, for mounting the physical elements of said end cap module as follows:

an electronic microphone, for acquiring an audio and a background sound content from the vicinity of said mobile apparatus, an electronic speaker, for enabling said observer to hear said audio and said background sound content from said observer's audience, a 1st hard wire cable port, for connecting a hard wire coaxial signal cable to said mobile apparatus, and a 1st fiber optics cable port, for connecting a fiber optics signal cable to said mobile apparatus;

wherein said 1st enclosure, and said 2nd enclosure, and said 3rd enclosure, and said 4th enclosure, and said 5th enclosure, and said 8th enclosure, and said 9th enclosure, and said 10th enclosure are each configured with:

a front end, for joining with the rear end of adjacent said functional module enclosures, and a rear end, for joining with the front end of adjacent said functional module enclosures;

wherein said front end faces said optical image source;

wherein said rear end of said 1st enclosure and said 2nd enclosure; and said front end and said rear end of said 3rd enclosure, and said 4th enclosure, and said 5th enclosure, and said 8th enclosure, and said 9th enclosure, and said 10th enclosure and said 11th enclosure are each configured with:

a 2nd mechanical means, for joining and connecting said functional modules together in a predetermined arrangement;

wherein said 2nd mechanical means is comprised of one of:

a) a snap-fit snap together connector, for connecting adjacent said functional modules, and b) a screw thread connector, for connecting adjacent said functional modules;

wherein said 1st enclosure, and said 2nd enclosure, and said 3rd enclosure, and said 4th enclosure, and said 5th enclosure, and said 8 enclosure, and said 9th enclosure, and said 10t enclosure, and said 11 enclosure are each configured with:

said 2nd mechanical means, for enabling said observer to immediately sequentially configure and connect said functional modules of said mobile apparatus together into a said combination suitable for universally adapting said mobile apparatus to optically and mechanically interface with a variety of different types of said optical image sources, and provide for modular interchangeability among said functional modules;

wherein said clamping mechanism module is configured for attaching, centering, aligning, gripping and locking said mobile apparatus to said optical image source;

wherein said extension module, is configured for:

mounting and slip fitting said mobile apparatus on to said optical image source;

wherein said camera lens mount module, is configured with:

a screw type connector, a bayonet type connector, a breech lock type connector, a double bayonet type connector, or a tab lock type connector;

wherein said zoom lens module, is configured for:
a) receiving said 1st exit pupil from said original equipment eyepiece of said afocal optical image source at said entrance pupil of said zoom lens module, for preventing vignetting,
b) for transforming said 1st afocal optical imagery from said afocal optical image source into an 2nd focal optical imagery,
c) receiving said 2nd afocal optical imagery from said eyepiece module of said mobile apparatus, and for transforming said 2nd afocal optical imagery into a 2nd focal optical imagery,
d) for receiving said 1st exit pupil from said eyepiece module of said mobile apparatus at said entrance pupil of said zoom lens module, for preventing vignetting, and
e) adjusting said 2nd focal optical imagery size on said electronic image sensor array to fill said electronic image sensor array for covering the entire field of view of said optical image source;
wherein said eyepiece module, is configured for:
a) transforming and transferring said 1st focal optical imagery from said focal optical image source to an 2nd afocal optical imagery to said zoom lens module at the said entrance pupil of said zoom lens module, for preventing vignetting,
b) imaging and locating said 2nd entrance pupil of said focal optical image source to said entrance pupil of said zoom lens module, for preventing vignetting,
c) for imaging and setting the size of said 2nd entrance pupil of said focal optical image source to equal the size of the said entrance pupil of said macro zoom lens module, to optimize the brightness of said 2nd focal optical imagery when said observer deems necessary,
d) whereby enabling the observer to use said mobile apparatus on a variety of different types of manufactured afocal optical image sources that have original equipment eyepieces that can be and are removed from the optical image sources, and
e) whereby enabling said observer to use said mobile apparatus on a variety of different types of manufactured focal optical image sources that have no original equipment eyepiece at all;
wherein said field lens module, is configured for:
a) transferring said 1st focal optical imagery from the image plane of said focal optical image source to the entrance pupil of said macro zoom lens module,
b) for imaging and locating said 2nd entrance pupil of said focal optical image source to said entrance pupil of said macro zoom lens module, for preventing vignetting, and
c) for imaging and setting the size of said 2nd entrance pupil of said focal optical image source to equal the size of the said entrance pupil of said macro zoom lens module, to optimize the brightness of said 2nd focal optical imagery;
wherein said macro zoom lens module, is configured for:
a) locating and receiving said 1st focal optical imagery from the image plane of said focal optical image source from said field lens module,
b) transforming said t focal optical imagery into a 2nd focal optical imagery,
c) locating and receiving the image of said 2nd entrance pupil of said focal optical image source from said field lens module at said entrance pupil of said macro zoom lens module, for preventing vignetting, and
d) adjusting said 2nd focal optical imagery size on said electronic image sensor array to fill said electronic image sensor array for covering the entire field of view of said optical image source;
wherein said electronic image sensor array camera module, is configured for:
a) receiving said 2nd focal optical imagery from said zoom lens module for said afocal optical image sources, and for electronically transforming said 2nd focal optical imagery into a 1st electronic imagery signal,
b) receiving said 2nd focal optical imagery from said zoom lens module for said focal optical image sources, and for electronically transforming said 2nd focal optical imagery into a 1st electronic imagery signal, and
c) receiving said 2nd focal optical imagery from said macro zoom lens module for said focal optical image sources, and for electronically transforming said 2nd focal optical imagery into a 1st electronic imagery signal; wherein said electronic circuits module, is configured for acquiring said 1st electronic imagery signal from said electronic image sensor array camera module, and for transmitting said 1st electronic imagery signal to said observer and to said observer's audience;
wherein each said macro zoom lens of each said macro zoom lens module, is configured with: a macro zoom lens range of magnification adjustability;
wherein each said macro zoom lens module, is interchangeable with each of another said macro zoom lens module having at least:
a) the same said range of magnification adjustability, or
b) a different said range of magnification adjustability; wherein each said field lens of each said field lens module, is chosen from a selection of commercial off the shelf field lenses having a field lens range of different effective focal lengths, for preventing vignetting;
wherein each said field lens module, is interchangeable with each of another said field lens module, having:
a) the same said effective focal length, or
b) a different said effective focal length;
wherein each said zoom lens of each said zoom lens module, is configured with:
a zoom lens range of magnification adjustability, for filling said optical sensor array with the full field of view of said optical image source;
wherein each said zoom lens module, is interchangeable with each of another said zoom lens module, having:
a) the same said range of magnification adjustability, or
b) a different said range of magnification adjustability;
wherein each said eyepiece of each said eyepiece module, is chosen from a selection of eyepieces having a eyepiece range of different effective focal lengths, for preventing vignetting;
wherein each said eyepiece module, is interchangeable with each of another said eyepiece module having at least:
a) the same said effective focal length, or
b) a different said effective focal length;
wherein said electronics circuits is, comprised of:
a RF antenna, configured for radiating said 1st electronic imagery signal and wirelessly transmitting said 1st electronic imagery signal to said observer and to said observer's audience, or a WIFI antenna, configured for radiating said 1st electronic imagery signal and wirelessly transmitting said 1st electronic imagery signal to said observer and to said observer's audience;

wherein said electronics circuits of said electronics circuits module is, comprised of:

a 1st microprocessor, configured for running:

a 1st software, for enabling said observer to perform and store a voice recognition data, for each of said 1st audio electronic signal from said observer and said 2nd audio electronic signal from said observer's audience for generating:

a 1st text file archive, for storing audio archival data, and a 1st firmware, for enabling said observer to perform and store said voice recognition data, for each of said 1st audio electronic signal from said observer and said 2nd audio electronic signal from said observer's audience for generating said 1st text file archive, for storing audio archival data;

wherein said electronic circuits module, is configured for:

a) acquiring said 1st electronic imagery signal from said electronic image sensor array camera module, b) transmitting said 1st electronic imagery signal to said observer and to said observer's audience, c) acquiring said 1st sound electronic signal and said 1st audio electronic signal from said end cap module of said mobile apparatus, d) transmitting said 1st sound electronic signal and said 1st audio electronic signal to:

a) said observer's lap top computer, and tablet, and smart phone, and smart mobile devices, and b) said observer's audience's lap top computer, and tablet, and smart phone, and smart mobile devices;

wherein each said electronic circuits module, is configured for being interchangeable with other said electronic circuits module; wherein said battery and a power control module, is configured for:

a) electronically regulating said battery voltage, b) regulating the charging of said battery, and c) distributing said battery voltage to said mobile apparatus from said battery;

wherein each said battery and a power control module, is configured for being interchangeable with each of another said battery and a power control module;

wherein said end cap module is, comprised of:

a 6th enclosure, for mounting the physical elements, an electronic microphone, for producing said 1st audio electronic signal from said observer, an electronic speaker, for converting said 2nd audio electronic signal from said observer's audience for voice communication with said observer, a label, for identifying which side of said mobile apparatus is up, a heat sink, for cooling said electronic circuits module, a power on/off switch, for controlling the distribution of voltage, an electrical connector port, for inputting external electrical power to said mobile apparatus for charging said battery, a 1st hard wire cable port, for enabling bi-directional hard wire coaxial signal cable to be connected to said mobile apparatus, and a 1st fiber optics cable port, for enabling bi-directional fiber optics signal cable to be connected to said mobile apparatus; wherein said end cap module is joined and connected mechanically and electrically to said electronic circuits module;

wherein said end cap module is configured with:

a wireless bi-directional communication link, for wirelessly communicating content with said observer and said observer's audience;

wherein said 6th enclosure is configured with:

a 6th closed front end surface, for sealing and for protecting said electronics circuits of said electronics circuits module;

wherein said electronic microphone is mounted on said 6 closed front end surface of said 6 enclosure;

wherein said electronic microphone is configured for hearing:

a 1st sound, for communicating background sound from the vicinity of said optical image source during said observer's observing session to said observer and to said observer's audience, a 1st audio, for communicating voice content from said observer in said vicinity of said optical image source during said observer's observing session to said observer's audience, and for transforming said 1st sound into:

a 1st sound electronic signal, for electronically communicating said 1st sound from the vicinity of said optical image source to said observer and to said observer's audience, and a 1st audio electronic signal, for electronically communicating said 1st audio from the vicinity of said optical image source to said observer and to said observer's audience;

wherein said end cap module, is configured for capturing:

a 1st sound, from the vicinity of said optical image source during said observer's observing session, and a 1st audio, from said observer in said vicinity of said optical image source during said observer's observing session; wherein said end cap module, is configured for:

transforming said 1st sound into a 1st sound electronic signal;

wherein said end cap module, is configured for:

transforming said 1st audio into a 1st audio electronic signal;

wherein said end cap module, is configured for:

said observer to receive a 2nd audio electronic signal, from said observer's audience, and a 2nd sound electronic signal, from said observer's audience;

wherein said end cap module, is configured for:

transforming said 2nd audio electronic signal and said 2nd sound electronic signal into a 2nd audio, for said observer to hear;

wherein said 1st enclosure, and said 2nd enclosure, and said 3rd enclosure, and said 4th enclosure, and said 5th enclosure, and said 6th enclosure, and said 7th enclosure, and said 8th enclosure, and said 9th enclosure, and said 10th enclosure, and said 11th enclosure are each configured with:

a front end, and a rear end;

wherein said front end of each said enclosure faces said optical image source;

wherein said rear end of said 1st enclosure and said 2nd enclosure, and said 1st enclosure; and said front end and said rear end of each of said 3rd enclosure, said 4th enclosure, said 5th enclosure, said 6 enclosure, said 7th enclosure, said 8th enclosure, said 9th enclosure, said 10th enclosure, are each configured with:

a 2nd mechanical means, configured for:

joining and connecting selected said functional modules together in a predetermined arrangement;

wherein said 2nd mechanical means is comprised of:
a) a snap-fit snap together connector, or
b) a screw thread connector, and
wherein said 1st enclosure, said 2nd enclosure, said 3rd enclosure, said 4th enclosure, said 5th enclosure, said 6th enclosure, said 7th enclosure, said 8t enclosure, said 9th enclosure, said 10th enclosure, and said 11th enclosure are each configured with said 2nd mechanical means for enabling said observer to immediately sequentially configure and connect said functional modules of said mobile apparatus together into a said combination suitable for universally adapting said mobile apparatus to interface with a variety of different types of said optical image sources, and provide for modular interchangeability among said functional modules;
wherein said mobile apparatus is furthermore configured as:
a 1st group of modules, for being deployed as an ergonomic handle, and a 2nd group of modules, for being deployed as an ergonomic handle top;
wherein said 1st group of modules and said 2nd group of modules are joined and connected mechanically to one another, and mechanically disposed mutually perpendicular to one another;
wherein said 1st group of modules is configured coaxially with: a Ws' coaxially common mechanical axis, for being the mechanical axis of said 1st group of modules, and a Ws' coaxially common optical axes, for being the optical axis of said 1st group of modules;
wherein said 1st group of modules is sequentially configured having:
said 1st mechanical module joined and sequentially connected in combination with:
a) said zoom lens module, joined and sequentially connected with said electronic image sensor array module,
b) said eyepiece module, joined and sequentially connected with said zoom lens module, and joined and sequentially connected in combination with said electronics image sensor array module, and
c) said field lens module, joined and sequentially connected with said macro zoom lens module, and joined and sequentially connected in combination with said electronic image sensor array module;
wherein said 2nd group of modules is configured with:
a 2nd coaxially common optical axes, for being the mechanical axis of said 2nd group of modules, and a 2nd coaxially common mechanical axis, for being the optical axis of said 2nd group of modules;
wherein said 2nd group of modules is sequentially configured having:
said electronics circuits module joined and sequentially connected with said battery and power control module, and said battery and power control module joined and sequentially connected with said end cap module;
wherein furthermore said 1st group of modules is joined and connected to said 2nd group of modules at:
a predetermined location, for perpendicularly locating said 1st group of modules to said 2nd group of modules;
wherein said predetermined location on said 2nd group of modules is configured with:
an exterior side surface, for attaching said 1st group of modules to said 2nd group of modules;
wherein said exterior side surface of said 2nd group of modules is configured with: a midpoint, for locating and serving as the attachment point on said exterior side surface of said 2nd group of modules;
wherein said 1st coaxially common mechanical axis of said 1st group of modules and said 2nd coaxially common mechanical axis of said 2nd group of modules are disposed mutually perpendicular to one another at said midpoint and configured to form:
an ergonomic handle shape, for configuring said 1st group of modules connection to said 2nd group of modules;
wherein said shape, is configured as:
a capital letter T, for serving as said ergonomic handle shape pattern;
wherein said ergonomic handle shape, is for:
a) ergonomically handling of said mobile apparatus by said observer during the deployment of said mobile apparatus onto and off of said optical image source,
b) shortening the physical length of said mobile apparatus, and
c) controlling the position of the center of gravity of said mobile apparatus;
wherein said mobile apparatus is further comprised of:
an audio amplifier, for adjusting and buffering said audio signals of said microphone,
a speaker, for transforming said audio electronic signals into audible sounds,
a servo electronics package, for receiving an electronic control signals from said observer,
a unidirectional signal line, for carrying an analog video signals and said audio signals,
a unidirectional signal line, for carrying said analog video signals and said encoded audio signal streams,
a bidirectional data bus, for delivering said encoded audio content and said encoded video content,
a bidirectional fiber optic port for connecting fiber optic cable for transmitting content, and for transmitting and receiving administrative data via fiber optic protocol to any external fiber optic network,
a D.C. power bus, supplied by said USB port for supplying electric power to charge said battery,
a mechanical swivel, for pointing said antenna during set-up and initialization time by said observer, for adjusting said antenna's radiation pattern to maximize the signal communicated to and from said antenna to said observer to maximize signal to noise ratio,
a notch, configured into said mobile apparatus' enclosure for housing said antenna temporarily out of harms' way to protect said mechanical swivel and said antenna prior to being deployed, and to reduce the need for maintenance of said swivel and for said antenna,
a bidirectional control signal line, for carrying an administrative control commands,
an administrative bi-directional data link, for controlling the power-up cycle, and for reading the state of said battery life remaining, and
a time to fully charge said battery, and
a cumulative time on said battery,
a means configured for multiple mobile apparatuses to be used simultaneously in close proximity to one another with respect to their WiFi coverage, and
a system controller electronics, configured for hard wired, fiber optics and wireless bi-directional communication capability, and for holding an operating radio frequency configuration file;
wherein said applications software and firmware is for:
a) managing the connectivity to said USB, Ethernet and fiber optics ports, b) enabling each of the multiplicity of said mobile apparatuses to communicate to said observer the best choice of said radio frequencies for said observer to use for each one of said multiplicity of the mobile apparatuses operating in proximity to one another in order to minimize a radio frequency interference created between said multiplicity of the mobile apparatuses operating in proximity to one another, c) enabling the observer to remotely or locally reset said radio frequencies used by each of said mobile apparatuses to minimize the potential interference, and d) enabling the observer to re-poll each of said mobile apparatuses over and over again at said observer's command to determine the effectiveness of said observer's new chosen radio frequency settings;

wherein each mobile apparatus is configured with said applications software and firmware for enabling said observer to control said multiple mobile apparatuses simultaneously to transmit and receive signals in the form of digital data packets;

wherein each said mobile apparatus is configured with said system controller electronics for controlling all of said functions of said mobile apparatus;

wherein said microprocessor, is further configured for:
a) managing the wireless transmission of said electronic audio signals to said observer and to said observer's audience,
b) managing the wireless receiving said electronic audio signals from said observer's audience, under the control of said observer,
c) managing the electronic storing of said electronic audio signals from said observer's audience under the control of said observer, and
e) managing the electronic retrieval of said observer's audience' said electronic audio signals from said microprocessor memory on demand by said observer's audience, under the control of said observer;

wherein each one of a multiplicity of said mobile apparatuses is configured to interface simultaneously with each one of said optical image sources with said applications software enabling each of said multiplicity of said mobile apparatuses to be commanded by said observer to communicate to said observer the best choice of said radio frequencies for said observer to use for each one of said multiplicity of said mobile apparatuses operating in proximity to one another in order to minimize said radio frequency interference effects created between said multiplicity of said mobile apparatuses operating in proximity to one another.

* * * * *